United States Patent [19]

Buckler et al.

[11] Patent Number: 5,050,088

[45] Date of Patent: Sep. 17, 1991

[54] PRODUCTION CONTROL SYSTEM AND METHOD

[75] Inventors: Andrew J. Buckler, Ontario; Richard A. Roland, Fairport; Christopher W. Nerkowski, Rochester, all of N.Y.

[73] Assignee: Eastman Kodak Company, Rochester, N.Y.

[21] Appl. No.: 330,327

[22] Filed: Mar. 29, 1989

[51] Int. Cl.⁵ .............................................. G06F 15/46
[52] U.S. Cl. .................................. 364/468; 364/478; 364/474.11
[58] Field of Search ................ 364/468, 478, 131-136, 364/146, 188-192, 513, 473, 474.11, 474.13, 474.15, 474.66, 474.22-474.24, 474.27

[56] References Cited

U.S. PATENT DOCUMENTS

| | | | |
|---|---|---|---|
| 4,472,783 | 10/1984 | Johnstone et al. | 364/132 |
| 4,698,766 | 10/1987 | Entwistl et al. | 364/94.11 |
| 4,719,586 | 1/1988 | Moyer et al. | 364/468 |
| 4,802,094 | 1/1989 | Nakamura et al. | 364/468 |
| 4,827,395 | 5/1989 | Anders et al. | 364/468 |
| 4,827,423 | 5/1989 | Bensley et al. | 364/468 |
| 4,852,001 | 7/1989 | Tsushima et al. | 364/468 |
| 4,870,590 | 9/1989 | Kawata et al. | 364/468 |
| 4,878,176 | 10/1989 | Teranishi et al. | 364/468 |
| 4,887,218 | 12/1989 | Natarajan | 364/468 |
| 4,896,269 | 1/1990 | Tong | 364/468 |
| 4,901,243 | 2/1990 | Kotan | 364/468 |
| 4,931,944 | 6/1990 | Richter et al. | 364/468 |
| 4,956,783 | 9/1990 | Teranishi et al. | 364/468 |
| 4,956,784 | 9/1990 | Hadavi et al. | 364/468 |
| 4,961,148 | 10/1990 | Holda et al. | 364/468 |
| 4,994,980 | 2/1991 | Lee et al. | 364/474.11 |
| 4,998,206 | 3/1991 | Jones et al. | 364/468 |

Primary Examiner—Jerry Smith
Assistant Examiner—Jim Trammell
Attorney, Agent, or Firm—Edward Dugas

[57] ABSTRACT

The present invention is a production control system and an associated method for interfacing automated material handling systems to manufacturing workcells, which workcells have processing equipment therein for performing processing jobs on provided material. An addressable library contains a plurality of program modules with each module defining a sequence of operations that are to be performed by at least one piece of processing equipment. In accordance with job descriptions and process scripts, program modules are selected to provide the capability of concurrently performing processing operations on the provided material. Each piece of processing equipment is programmed to be responsive to the sequence of operations defined by the program modules. The flow of material to and through each workstation is controlled by the job descriptions and process scripts. The processing operations are event tracked for signalling the occurrence of particular operations in the defined sequence of operations.

81 Claims, 125 Drawing Sheets

LEGEND FOR ERD DIGRAM NOTATION USING DACOM IDEF FORMAT:

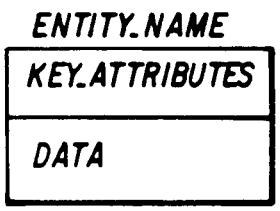

→ AN INDEPENDENT ENTITY WHICH CAN BE IDENTIFIED SOLELY BY ITS KEY ATTRIBUTES.

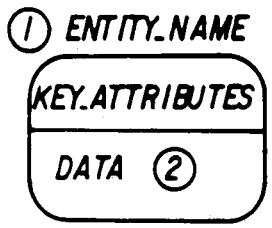

→ A DEPENDENT ENTITY WHICH REQUIRES ATTRIBUTES FROM OTHER ENTITIES FOR UNIQUE IDENTIFICATION.

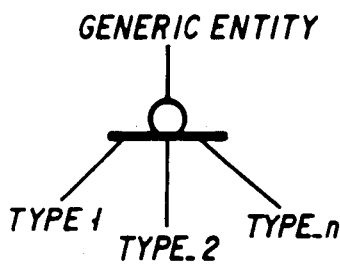

→ A CATEGORY DISCRIMINATOR WHICH REPRESENTS THAT A GENERIC ENTITY CAN BE ONE OF THE TYPES LISTED.

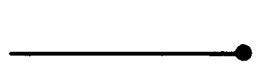

→ THE KEY OF THE DOT ENTITY CONTAINS THE KEY OF THE OTHER ENTITY, WHICH MUST EXIST.

→ THE DATA OF THE DOT ENTITY CONTAINS THE KEY OF THE OTHER ENTITY, WHICH MUST EXIST.

→ CARDINALITY (C) CAN BE DESCRIBED AS FOLLOWS:
BLANK - ZERO, ONE OR MORE,
Z     - ZERO OR ONE,
P     - ONE OR MORE,
n     - A SPECIFIC NUMBER (n),
A-B   - RANGE

→ TEXT INDICATING THE BASIC RELATIONSHIP(S) BETWEEN CONNECTED ENTITIES; Rn REFERENCES THE SPECIFIC BUSINESS RULE THAT DESCRIBES THIS IN DETAIL.

NOTES:
1 - A DASHED-LINE ENTITY INDICATES THAT ENTITY IS REFERENCED ON MORE THAN ONE DIAGRAM.
2 - ONLY PERTINENT DATA ARE SHOWN ON THE ER DIAGRAMS; REFER TO THE ENTITY/ATTRIBUTE LISTS (APPENDIX A) AND BUSINESS RULES (APPENDIX B) FOR MORE DETAILED INFORMATION.

*Fig. 3*

DATA FLOW DIAGRAM SYMBOLOGY
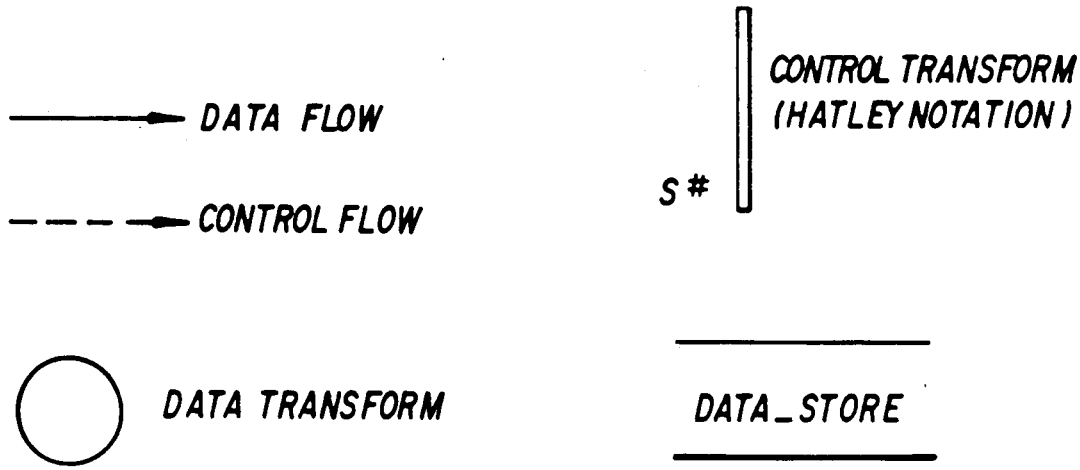
— Fig. 7 —
STATE TRANSITION DIAGRAM SYMBOLOGY
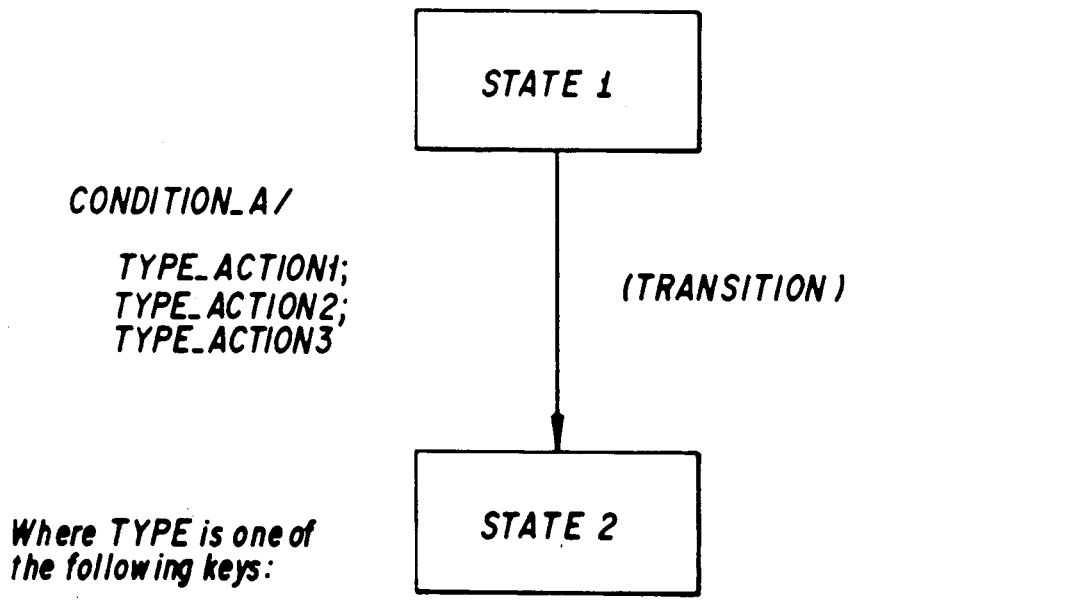
Where TYPE is one of the following keys:
- t: TRIGGER
- s: SIGNAL
- e: ENABLE
- d: DISABLE
- r: RAISE
- l: LOWER
NOTE: Upon occurrence of condition A, the actions are invoked and the state of this control process transitions from STATE 1 to STATE 2.
— Fig. 8 —

STRUCTURE CHART SYMBOLOGY
 LIBRARY MODULE
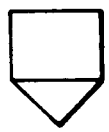 OFF-PAGE CONNECTOR
 ON-PAGE CONNECTOR
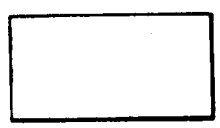 MODULE
 DATA COUPLE
 CONTROL COUPLE
 HYBRID COUPLE
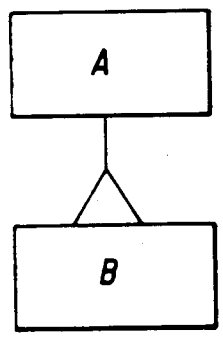 B IS CONTAINED PHYSICALLY AS CODE WITHIN A (INCLUSION)
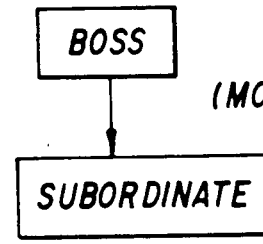 (MODULE CALL)
Fig. 9
DATA DICTIONARY SYMBOLOGY
= IS COMPOSED OF         [ ] SELECT ONE OF
+ AND                    < > SELECT ONE OR MORE OF
( ) OPTIONAL             | OR
{ } ITERATION OF         * * COMMENT
Fig. 10

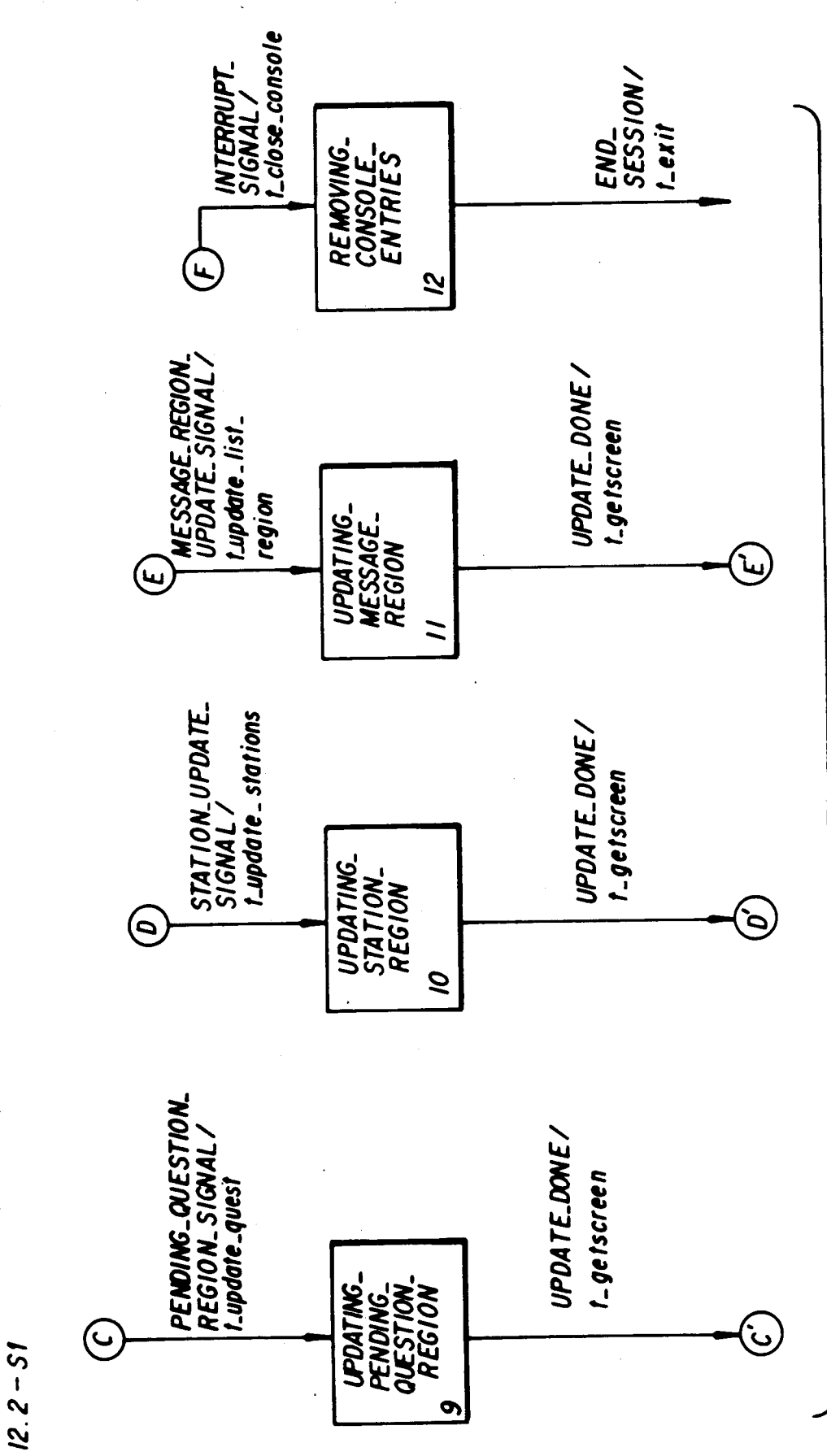

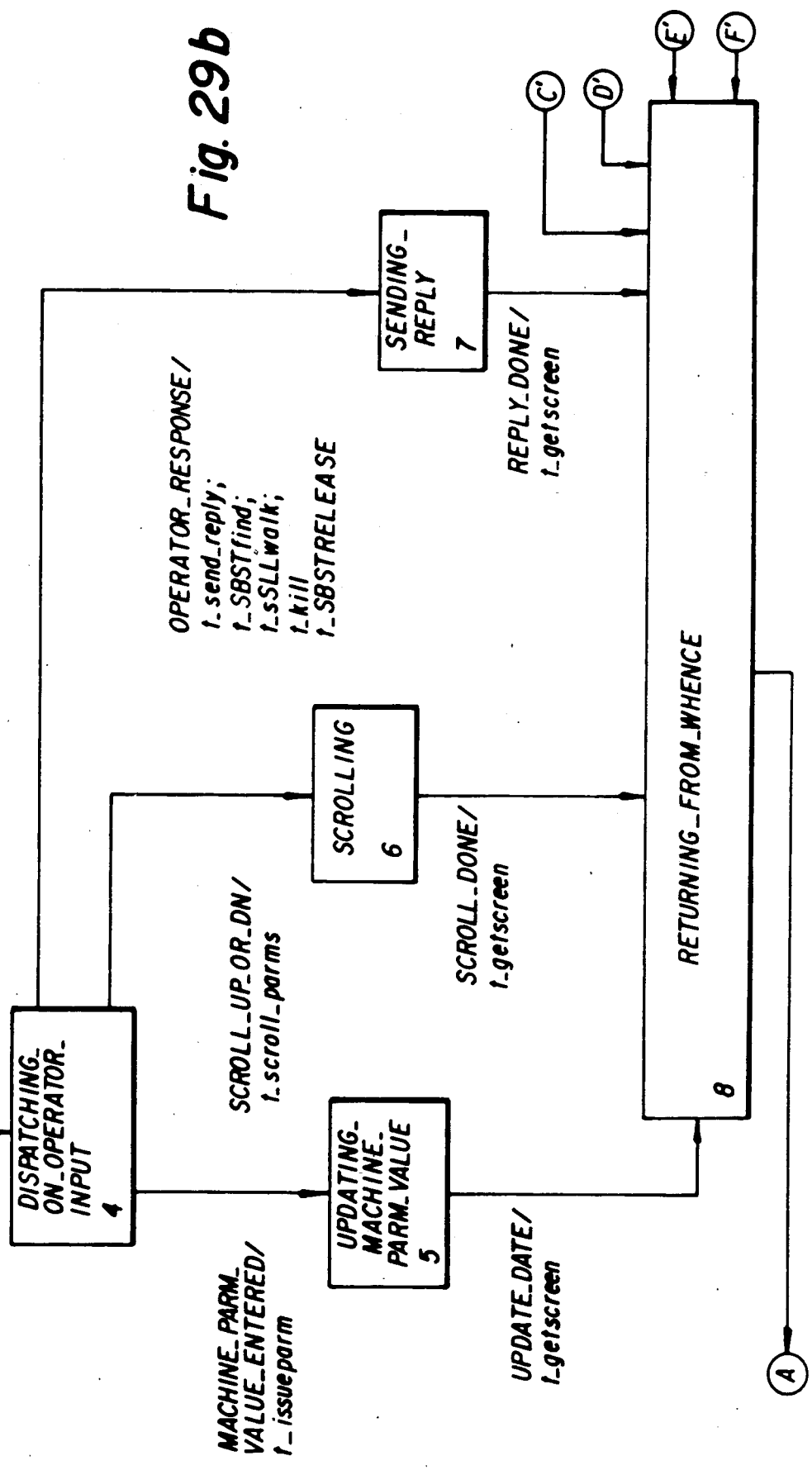

2-S1 enable_LOTCTL/
t_getopt;
t_getques;
t_opendb;
t_init_context;
t_setstatn

INITIALIZING_PROCESSING_STATION
1

INITIALIZATION_DONE/
t_wreq

WAITING_ON_REQUEST
2

PROCESS_REQUEST_RECVD/
t_acshmti;
t_sgsem;
t_process

PROCESSING_LOT
3

LOT_PROCESSED/
t_deshm;
t_send_reply

SENDING_REPLY
4

REPLY_DONE/
t_wreq

---

Valid actions are indicated by the following keys t: Trigger
s: Signal
e: Enable
d: Disable
r: Raise
l: Lower

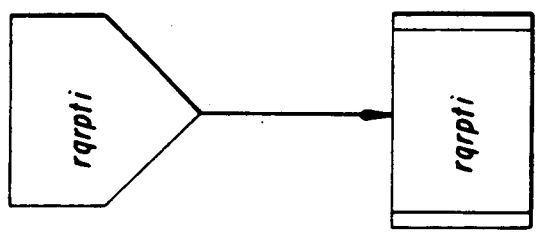
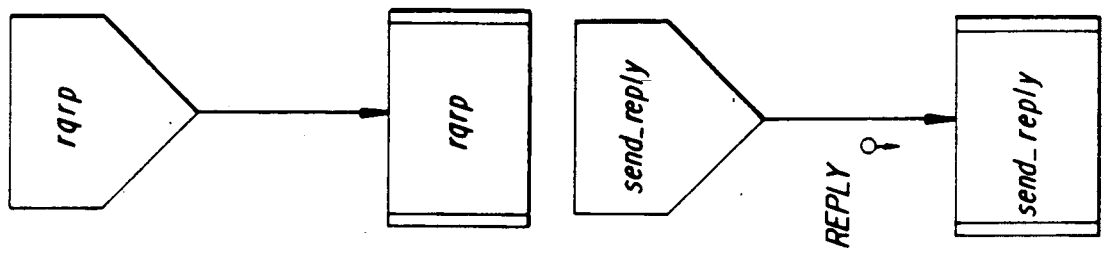
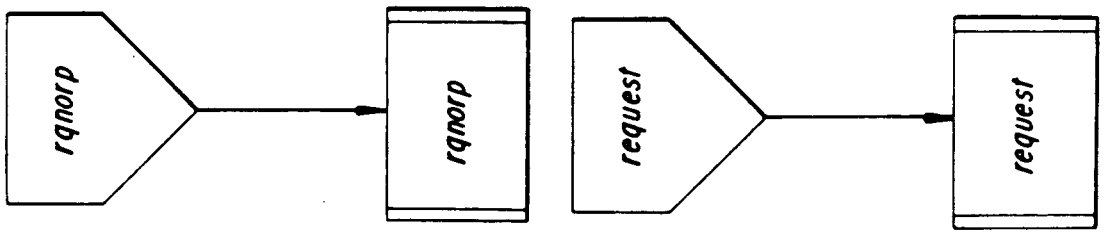
PCOM_MSG
Fig. 78a

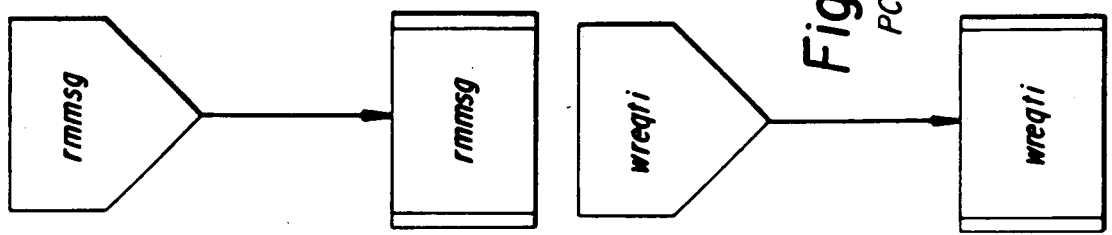
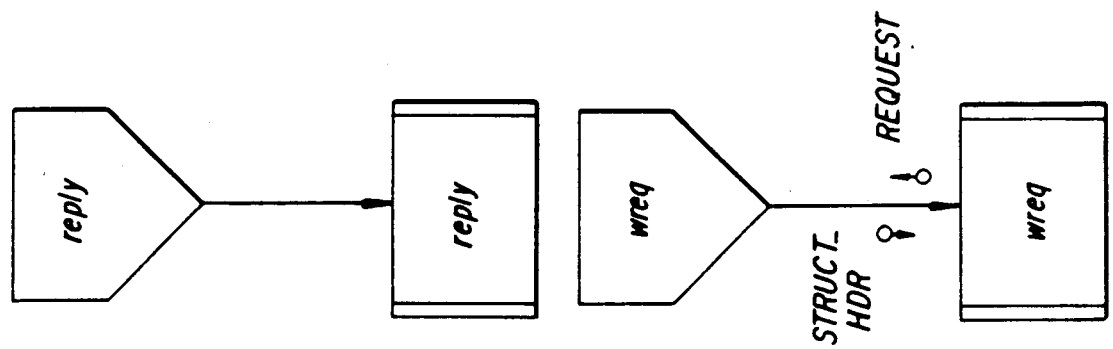
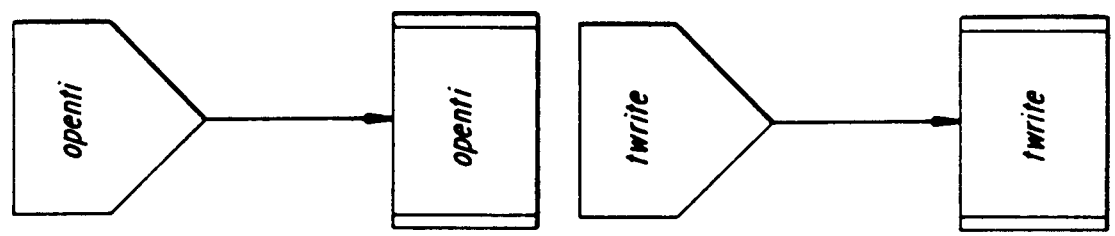
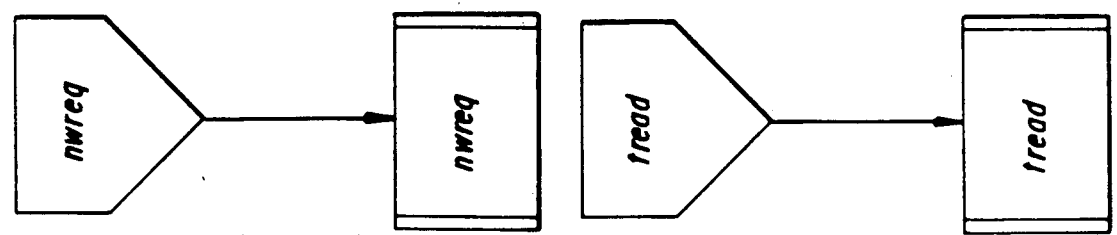
Fig.78b

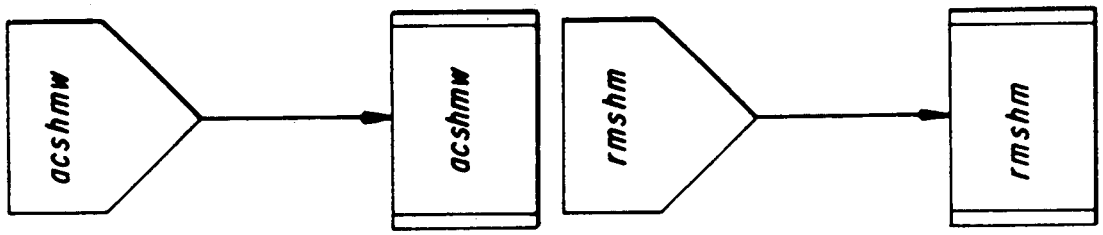
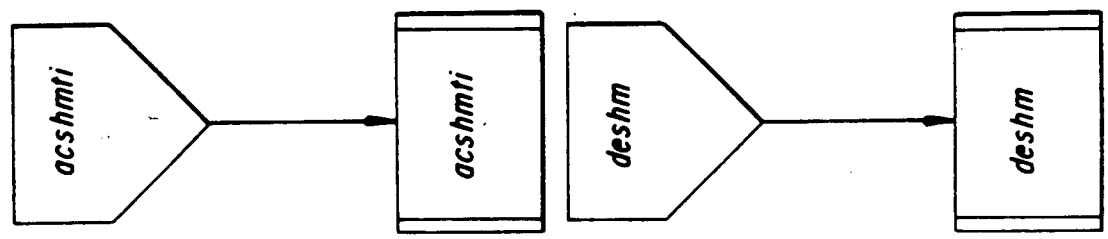
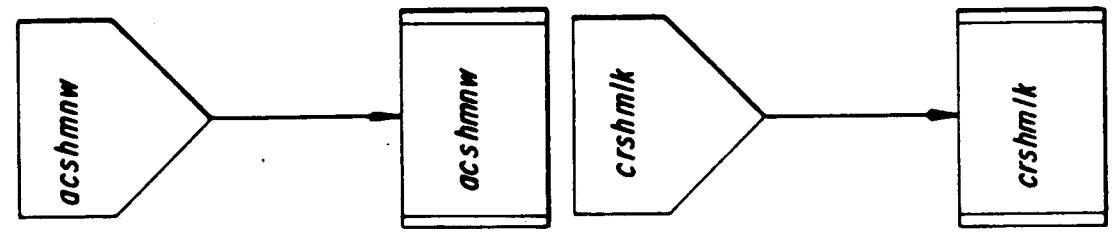
PCOM_SHM
Fig. 80

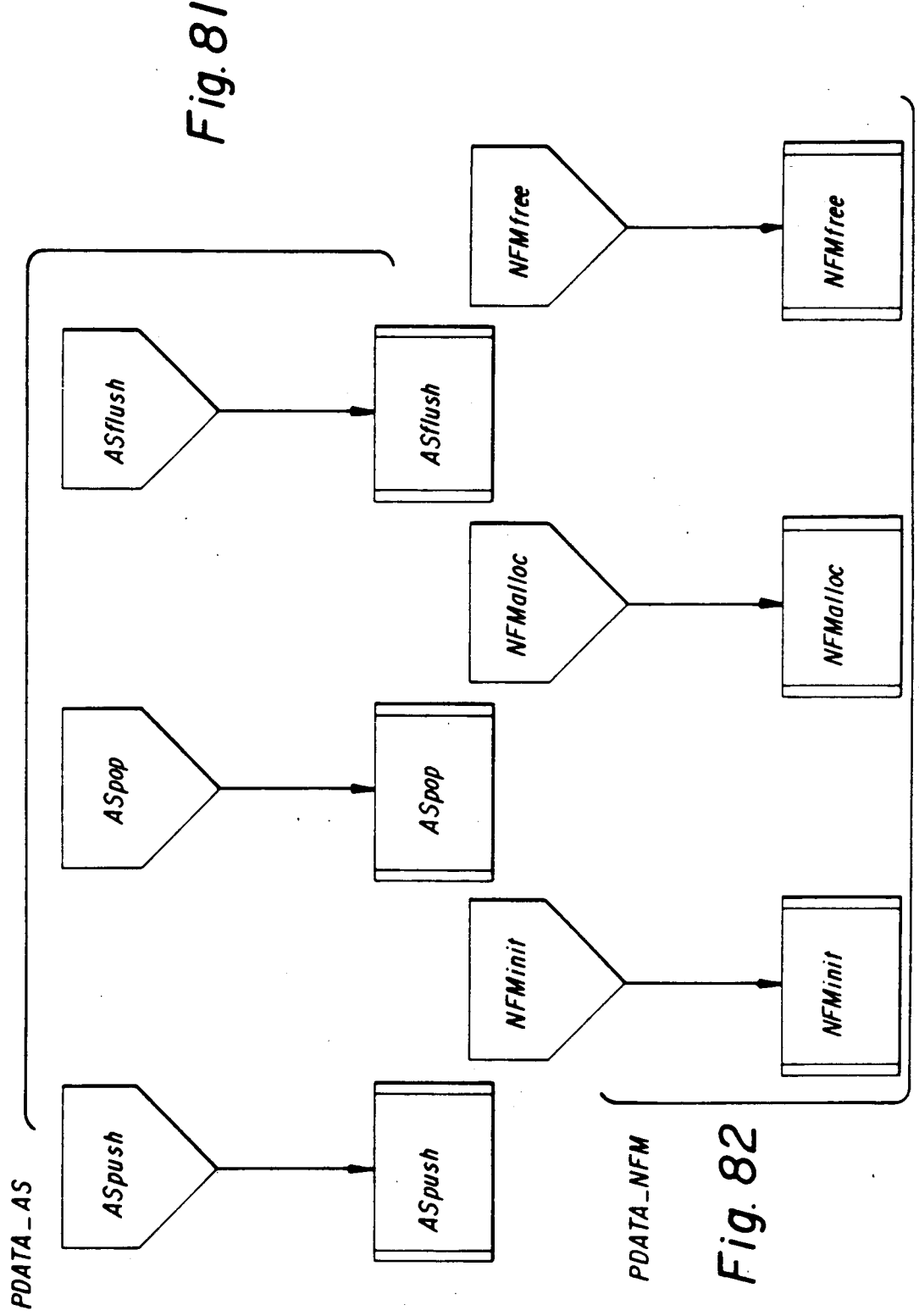

PDATA_BST

PDATA_BST

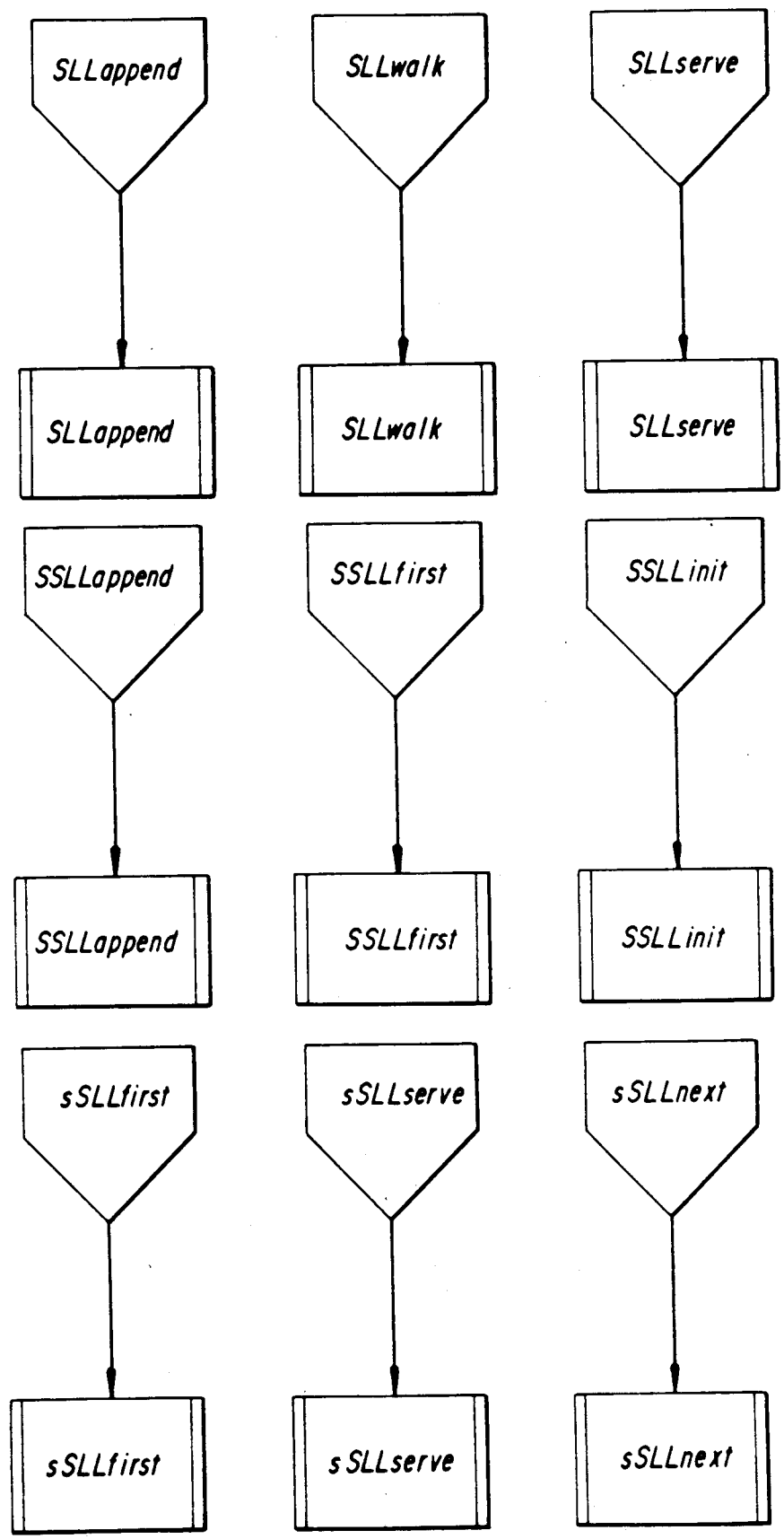
Fig. 84a   PDATA_SLL

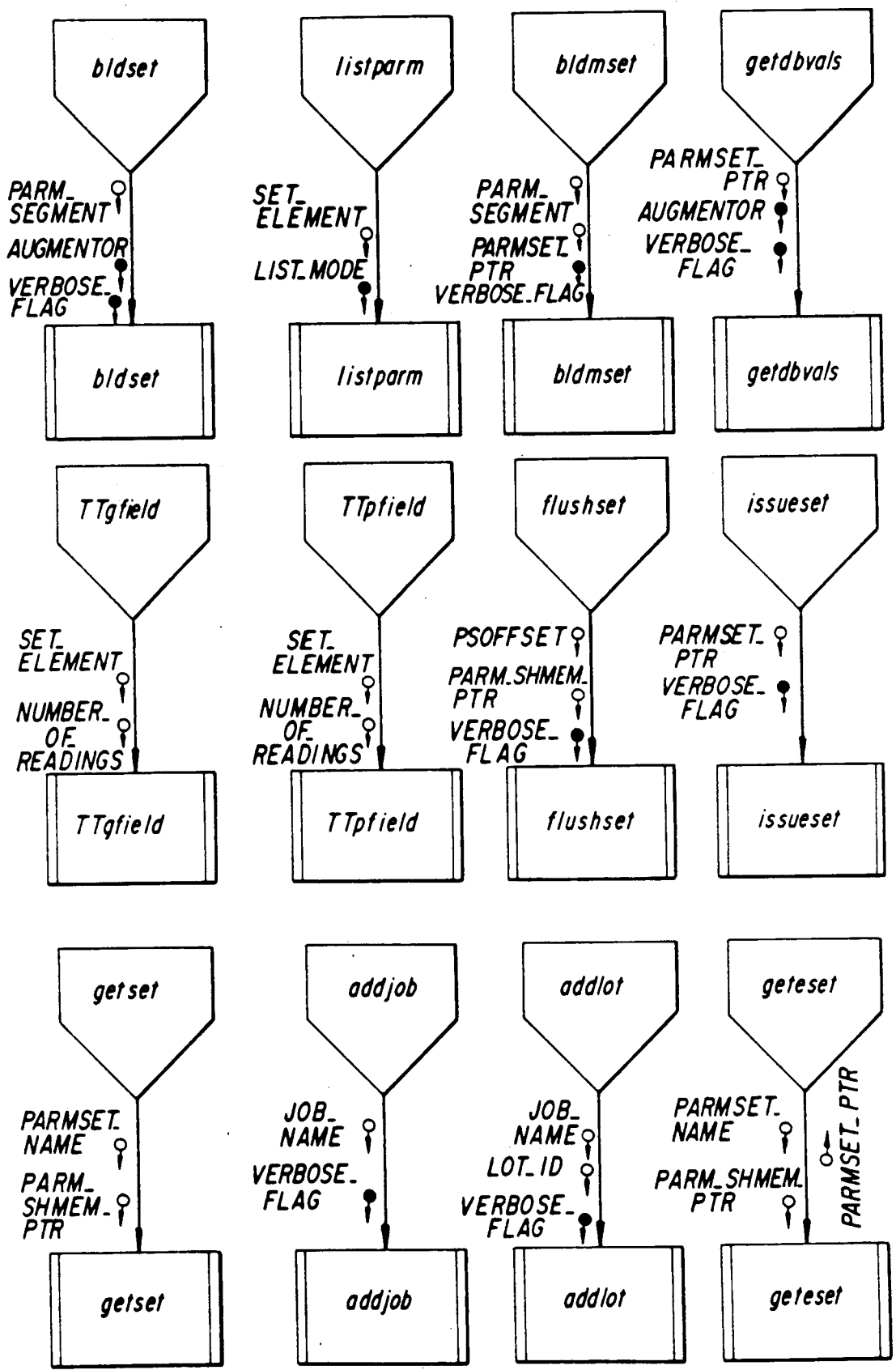
Fig. 85a PSET

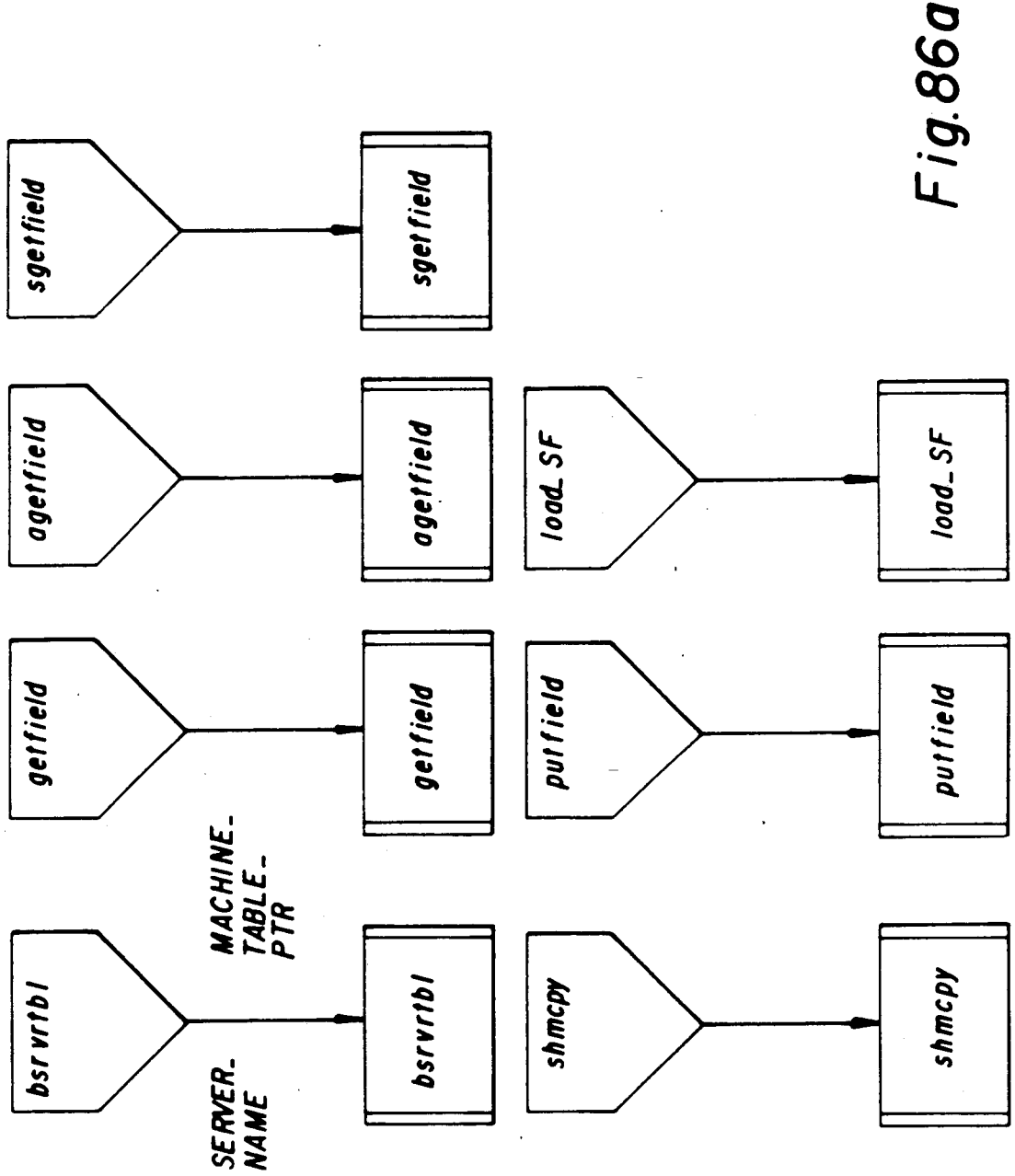

SCROP_APP_SPECIFIC

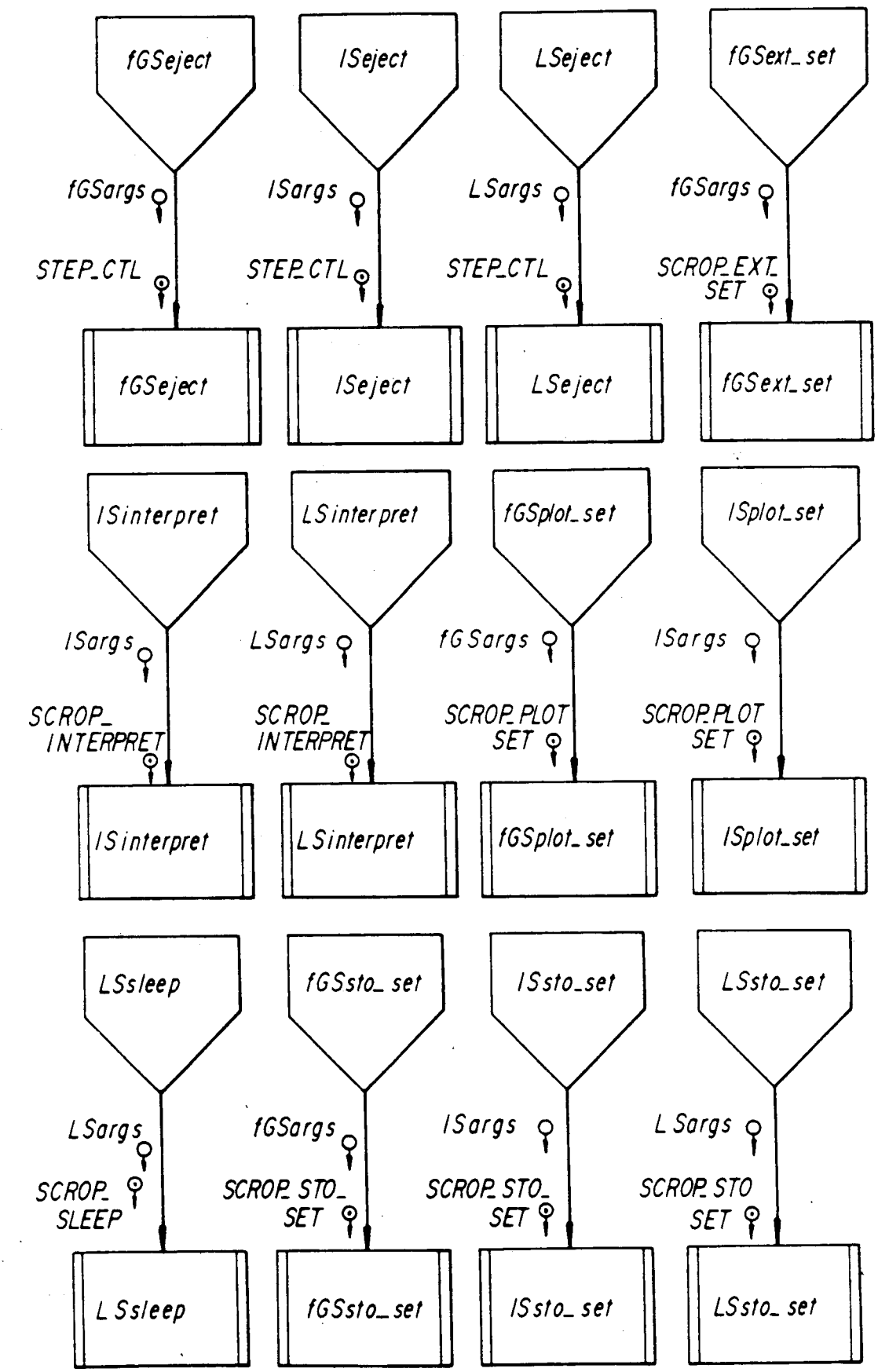
Fig. 90a  SCROP_MISC

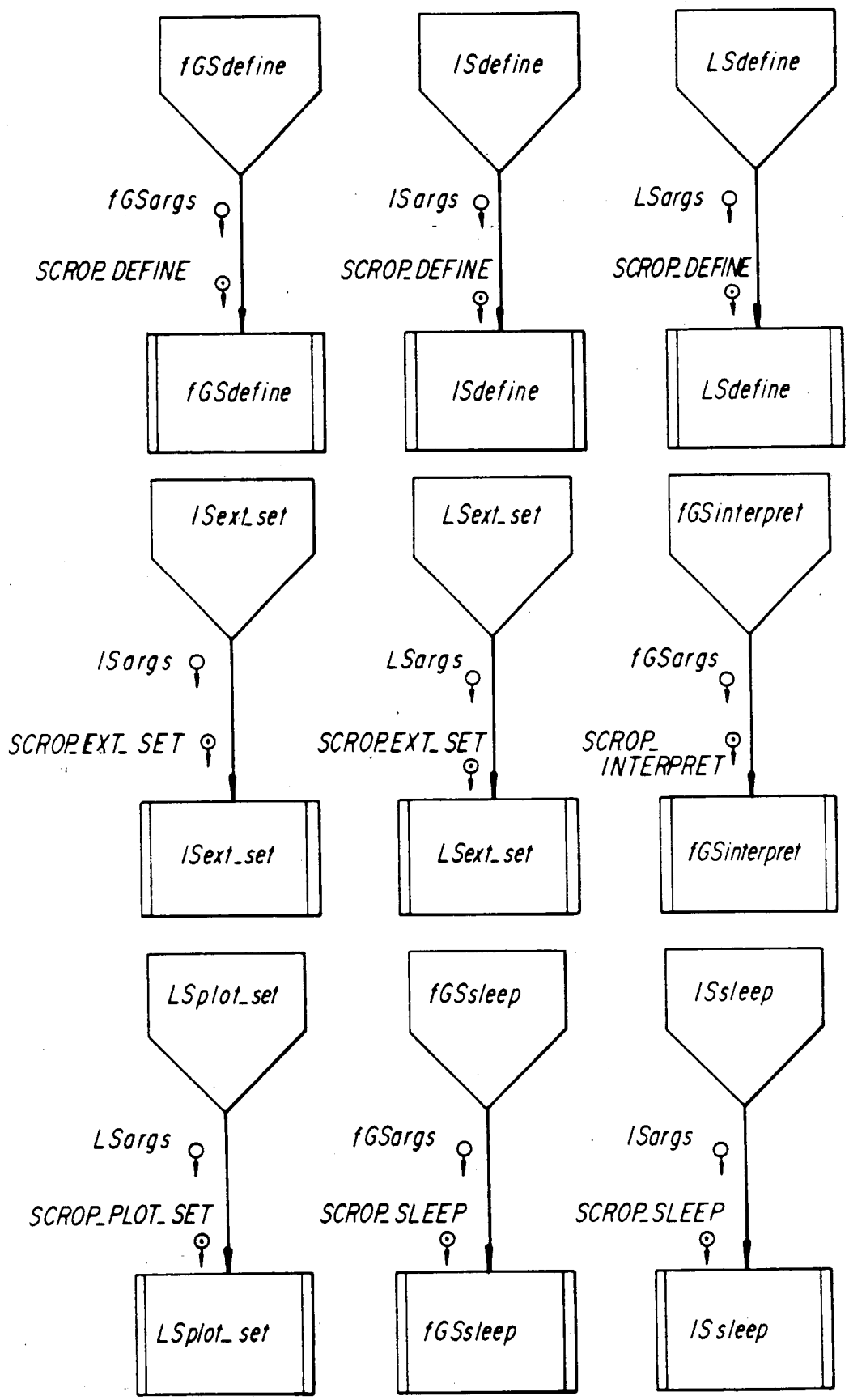
Fig. 90b SCROP_MISC

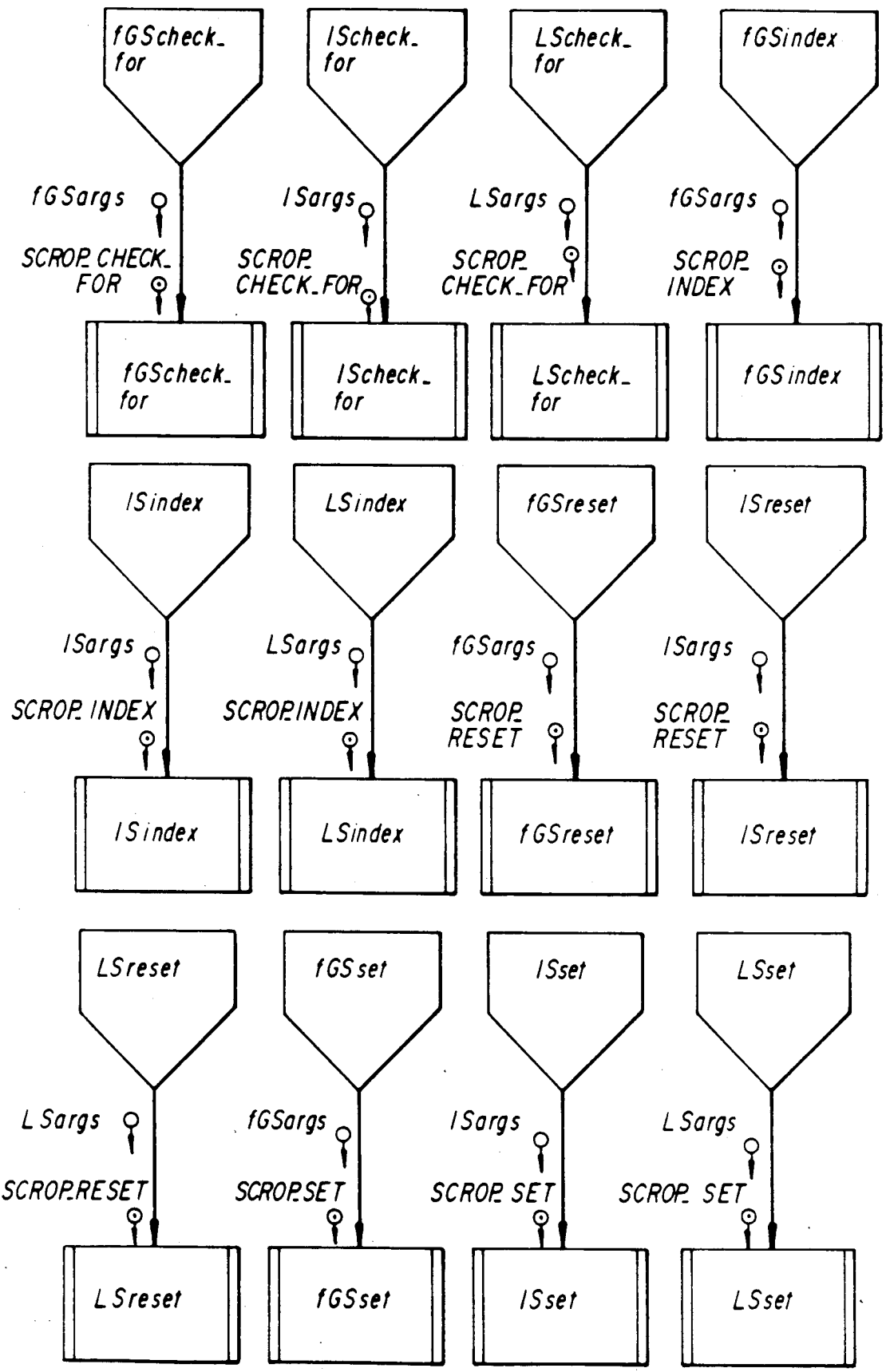
Fig. 93 SCROP_WIPTRCK

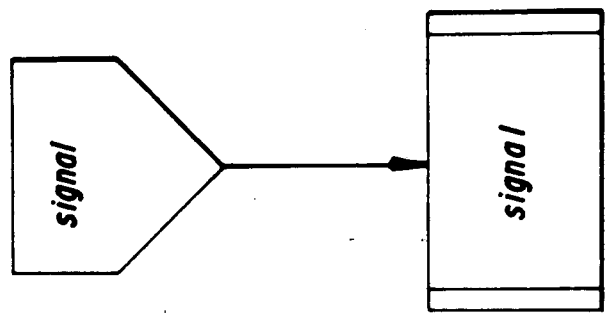
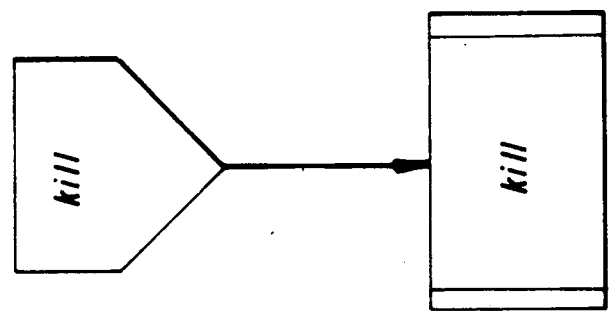
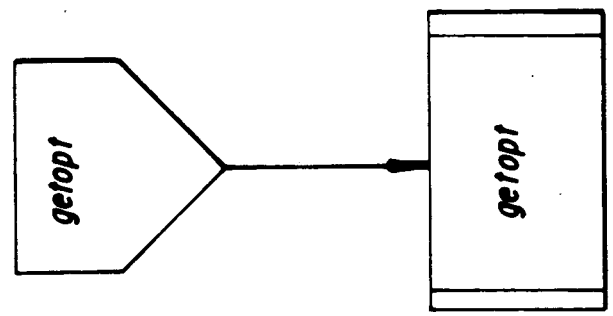
UNIX
Fig. 94

"lot_data" for "prod-1"
routing = Script-I at Station-1 +
Script-II at Station-2

UNWIND          WIND

Fig. 100

```
[console]          Workcell Control Software     XX MONTH 19XX-XX:XX
                         Open a Console Pending question (if any):
PROCEED TO PROCESS ORDER ORD-25 BATCH BAT-X ?
-> Process-Y

| Station |          | Station |          | Station |
Name            Infeed-Y             Process-X            Process-Y
Status          Ready                Ready                Pending
Operation       load chem            mat-256              formula-20
Job, Lot        ORD-25, BAT-X        ORD-25, BAT-X        ORD-25, BAT-X
Product         2583                 2583                 2583
Unit            1                    1                    1

| Station |
                                                          Process-Z
                                                          Cleaning
                                                          clean-all Informational Messages:
    Vessel cleaning completed
Material for "ORD-25, BAT-X" loaded at "Infeed-Y"
Material for "ORD-25, BAT-X" Ready at "Process-X"
```

*Fig. 101*

[station]   Workcell Control Software   XX MONTH 19XX-XX:XX

Pending question (if any):
Proceed to finish order ORD-25 batch Bat-X?
-> Vessel

| Station | Machines | Work in Queue |
|---|---|---|
| | Vessel | Job Lot Product Operation |
| | robot | |

Name       Process-Y
Status     PENDING
Operation  formula-20
Job, Lot   ORD-25, BAT-X
Product    2583
Unit       1

ORD-8 BAT-Q 2582 formula-X1
ORD-9 BAT-Y exps expmt-56

Station Transcript:
checking for "ORD-25 BAT-X" materials at "Infeed-Y"
   ...found
down loaded "formula-20" to "Vessel" controller
enabled notice "prior-clean-complete" ...noticed

Fig. 102

[machctl]     Workcell Control Software     XX MONTH 19XX-XX:XX

Pending question (if any):
Proceed to Process order ORD-25 batch BAT-X ?
->/Y

| Machine Name | Status |
|---|---|
| Vessel | AUTO |

| General Parameters | | | | Events | |
|---|---|---|---|---|---|
| Name | Type | Value | | Name | Setting |
| preheat_temp | R | < 120.2 > | | at_temp | NOT_SET |
| disperser_speed | I | < 50 > | | mtl_xferred | NOT_SET |
| ramp_rate_cool | I | < 15 > | | prior_clean_complete | SET |
| ramp_rate_heat | I | < 20 > | | t_critical | NOT_SET |
| conts_1st_add | I | < 5 > | | | |
| transfer_to | S | <proc_w> | | | |

*Fig. 103*

```
MOVER PD:  Deliver ?
           Set PD "Busy"
             (oper)
           Set PD "Input Ready"
LOT CONTROL:
           Checkfor ?
```

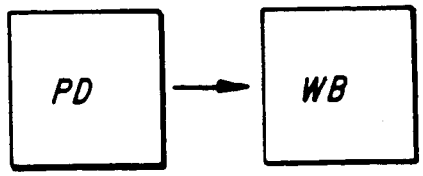
```
LOT CONTROL:
           Move pallet PD,WB
           Set PD "Empty"
           Set WB "Process"
```

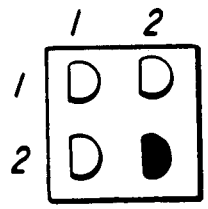
```
MACHINE CONTROL:  (oper)
           Update 1,1 GOOD
           Update 1,2 GOOD
           Update 2,1 GOOD
           Update 2,2 BAD
```

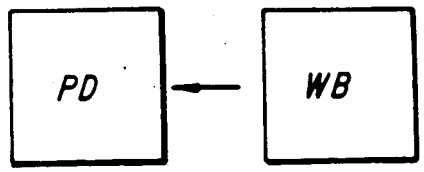
```
LOT CONTROL:
           Move pallet WB, PD
           Set PD "Output
                   Waiting"
           Set WB "Empty"
```

```
MOVER PD:  Pick-up ?
           Set PD "Busy"
             (oper)
           Set PD "Empty"
```

Fig. 105

PRODUCTION CONTROL SYSTEM AND METHOD

BACKGROUND OF THE INVENTION

A portion of the disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

The present invention is directed to a production control system and to an associated method for interfacing automated material handling systems to manufacturing workcells.

The present invention is an integrator of computer controlled machines, operations personnel, and information systems.

There is a manufacturing trend toward "workcells" comprised of a group of related machinery and/or processes for automatically making a product. The machinery within a workcell may include discrete units such as, but not limited to, numerically controlled machines and robots; or continuous process machinery such as, but not limited to, etching process machinery or film developing process machinery. The machinery is operated under the control of a workcell computer. The computer generally is responsible for coordinating multiple workstations, machines or unit operations which have information processing capability and for tracking and otherwise managing materials. Within a workcell materials are automatically handled, fabricated and assembled into products.

One patent of particular interest for its general teachings is U.S. Pat. No. 4,698,766 entitled "Industrial Processing and Manufacturing Systems", by B. Entwistle et al. One system of the patent utilizes a controlling computer coupled to programmer selectable software modules that are interfaced to computer responsive hardware. Each software module is designed to carry out a particular element of the overall control functions with or without the assistance of the other modules. The system is operatively directed to an installation wherein a sequence of one or more items of work from each of a plurality of different kinds of activity is required.

A production control system that can be configured to select what system resources are required, what workcell resources are used and what user views into the workcell's operation are desired provides a system with a high degree of versatility.

The production control system of the present invention is configured to handle multilevel tasks via high level process scripts that are created through a configuration procedure incorporating a displayed menu tree.

Each workstation in the system is assigned a work-queue. The work-queues are served by one or more interpreters. The interpreters are responsive to the process script of the particular lot to be processed. A concurrency of activities takes place in parallel when the interpreters run in a multitasking fashion, using a job management capability of the present invention.

Process scripts and tables are configured interactively by an operator through the menu-based system.

SUMMARY OF THE INVENTION

In accordance with one preferred embodiment of the invention there is provided an automated facility control system utilizing distributed processing and modular software for interfacing an automated material handling system to manufacturing workcells for discrete or continuous processes.

The system supports an arbitrary number of stations at a workcell, as well as a number of workcells within a facility. The stations, tools and workcells are coupled to the computer system such that an application programmer, through a menu driven interface, controls select software modules from a library of modules in accordance with scripts and tables.

It is an object of the present invention to provide a system and a method for controlling an integrated manufacturing workcell.

It is another object of the present invention to provide a system and a method which is capable of performing multiple functions in concurrence.

It is yet a further object of the present invention to provide a system that is configurable, interactively, through high level scripts, configuration tables and data files.

It is yet another object of the present invention to provide a system which is script responsive for performing work in queue.

These and other objects of the present invention will become more apparent when taken in conjunction with the following description and figures wherein like characters indicate like parts, and which figures form a part of the present application.

BRIEF DESCRIPTION OF THE DRAWINGS

FIG. 3 defines some of the legends that are used in FIGS. 4–6.

FIG. 7 illustrates the data flow symbols used in some of the following figures.

FIG. 8 illustrates state transition diagram symbols used in some of the following figures.

FIG. 9 illustrates structure chart symbols used in some of the following figures.

FIG. 10 illustrates a data dictionary of symbols used in some of the following figures.

FIGS. 23a, 23b, and 23c Console Process: state transition diagram.
FIGS. 29a, 29b, and 29c Console Process: state transition diagram.
FIG. 49 Lot Control Process: state transition diagram.
FIGS. 78a, and 78b form a diagram illustrating the PCOM_MSG library modules.
FIG. 80 is a diagram illustrating the PCOM_SHM library modules.
FIG. 81 is a diagram illustrating the PDATA_AS library modules.
FIG. 82 is a diagram illustrating the PDATA_NFM library modules.
FIGS. 84a, and 84b form a diagram illustrating the PDATA_SLL library modules.
FIGS. 85a, 85b, and 85c form a diagram illustrating the PSET library modules.
FIGS. 86a, and 86b illustrate PTXT library modules.
FIGS. 90a, 90b, and 90c form a diagram illustrating SCROP_MISC library modules.
FIG. 93 is a diagram illustrating SCROP_WIPTRCK library modules.
FIG. 94 is a diagram illustrating selected UNIX TM library modules.
FIG. 100 illustrates a status screen displayed for work in process stations.
FIG. 101 is a screen displayed for an operator console.
FIG. 102 is a screen displayed for a station.
FIG. 103 is a screen displayed for machine control.
FIG. 105 is a diagram illustrating sequential steps of moving parts on pallets to and from different workstations.

TABLE OF CONTENTS

I. DESCRIPTION OF THE PREFERRED SYSTEM AND METHOD
  1. Process Summaries

2. Description of Menu Hierarchy
3. Description of Data Models
4. Description of Methodology and Symbology Used
5. Context and Structure of the Invention
6. Detailed Process Descriptions
    6.1 Ad-Hoc
    6.2 Console
    6.3 Data Preparation
    6.4 Event Tracker
    6.5 Interval Tracker
    6.6 Lot Control
    6.7 Machine Control
    6.8 Master Control
    6.9 Mover-PD
    6.10 Plotter
    6.11 Restart
    6.12 Server
7. Library Descriptions
    7.1 DBMS
    7.2 PCOM
    7.3 PDATA
    7.4 PSET
    7.5 PTXT
    7.6 SCROP
    7.7 UNIX
II. EXAMPLES
    1. Discrete Example Overview
    2. Continuous Example Overview
    3. Preferred Method Components
    4. Product Data Acquisition and Scheduler Front-End
    5. Flexible Script Assembler and Interpreter
    6. Flexible Data Acquisition and Dispatch System
    7. Event Tracking Subsystem
    8. WIP Tracking Subsystem
    9. Ad-Hoc Operation and Development Toolchest
    10. Plotting and Calibration Subsystem
    11. Robotic Guidance Data Post-Processing
    12. Arbitration of Material Delivery, and Feeding-Forward Quality Data
III. APPENDICES
    A—Entity/Attribute Lists
    B—Business Rules
    C—Data Dictionary
    D—Module Specifications
    E—PCOM Manual Pages
    F—PDATA Manual Pages
    G—PTXT Manual Pages
    H—Script Operation References
    I—Continuous Example Script I
    J—Continuous Example Script II
    K—Discrete Example Script
    L—System Resource Configuration, Continuous Example
    M—Configurable Parameter Listings
    N—Workcell Resource Configuration, Continuous Example
    O—Sample Cell Capability Database, Discrete Example
    P—Sample Process Definition, Discrete Example
    Q—Sample CAD Data File, Discrete Example
    R—Sample Token File, Discrete Example
IV. FIGURES
V. CLAIMS

NOTE

UNIX is a registered Trademark of AT&T
UNIFY is a registered Trademark of Unify Corp.
TEAMWORK is a registered Trademark of Cadre Technologies, Inc.
XENIX is a registered Trademark of Microsoft Corp.

I.

DESCRIPTION OF THE PREFERRED SYSTEM AND METHOD

Figure 1:
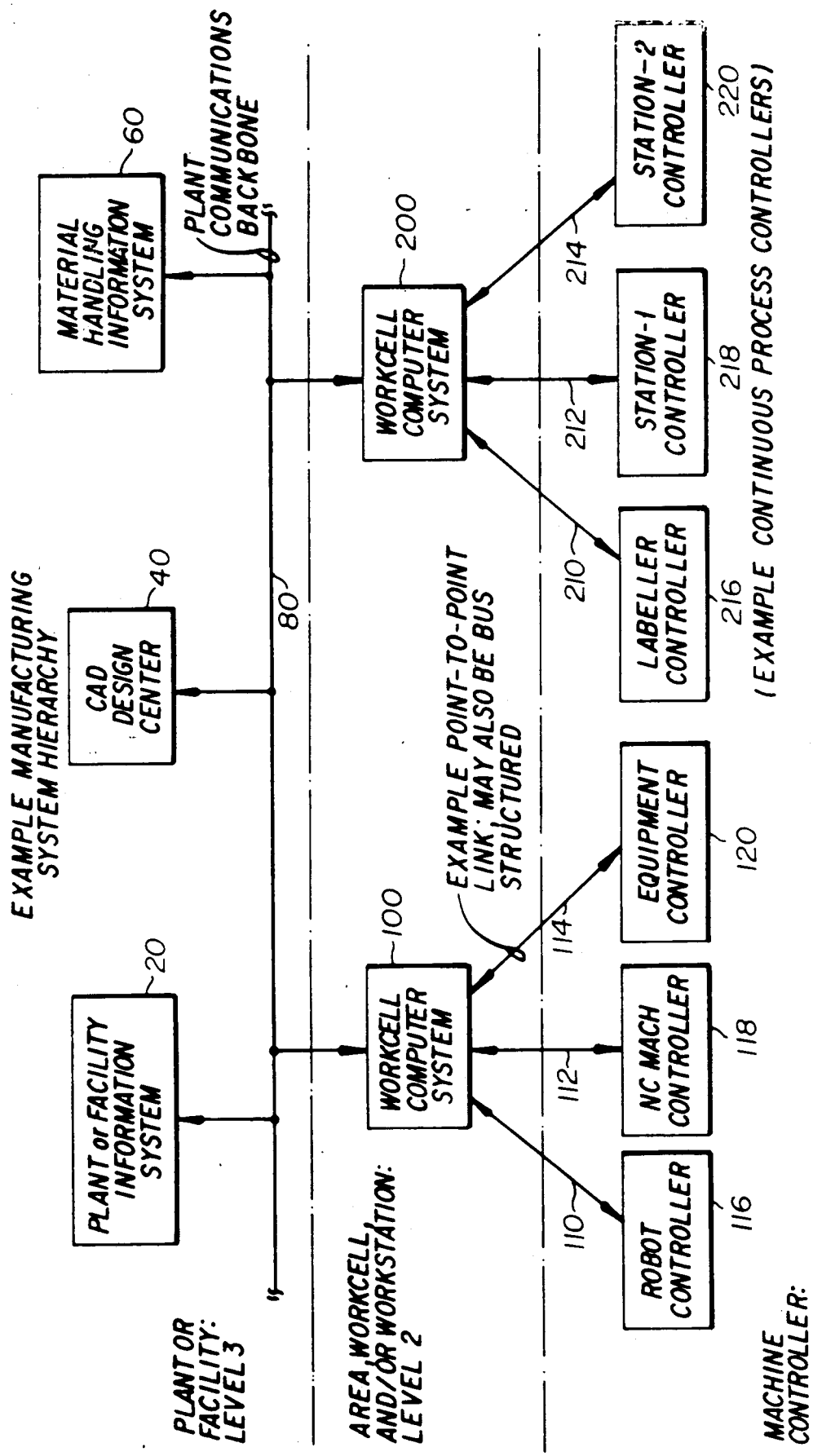
FIG. 1 is an organizational block diagram of a manufacturing system hierarchy for performing discrete and continuous processes.

Referring to FIG. 1, wherein an example of a hierarchical manufacturing system for performing discrete and continuous processes is shown formed as an organizational block diagram having three levels.

Level 3 represents a plant or other type of facility level which is generally comprised of a plant or facility information system 20 (mainframe computer), a CAD design center 40, and a material handling system 60.

Level 2 represents an area workcell and/or workstation level, comprised of computers 100 and 200 which are located within the plant or facility and which are connected to the components of level 3 by means of a plant communications bus 80.

Level 1 shows a machine controller level which contains, for example, controllers 116, 118 and 120 representing the configuration of a discrete process and controllers 216, 218 and 220 representing an example of a continuous process.

Controller 116 is used to control robotic functions, controller 118 is used to control numerically controlled machines and controller 120 is used to control other equipment in the discrete process.

The workcell computer 100 is operatively connected to controllers 116, 118 and 120, by means of bidirectional busses 110, 112 and 114, respectively, but may be connected in other ways.

In a like manner, the workcell computer 200 is connected by means of bidirectional busses 210, 212 and 214 to the labeller controller 216, station-1 controller 218 and station-2 controller 220, respectively.

The specific configuration shown is for example purposes only, with many other configurations being possible.

The CAD design center 40 is shown connected to the Plant Communications bus 80 to provide information, on a somewhat real time basis, to various ones of the controlled manufacturing machines. The material handling information system 60 is connected to the bus 80 for controlling the receipt and the removal of raw materials and partially finished product from one area of the manufacturing facility to another area.

As a demonstration of the versatility of the present system, two examples will be described in detail later in the specification, one a discrete process and the other a continuous process.

1. Process Summaries

The main components of the workcell computer systems 100 and 200 are a group of detached software processes. A synopsis of each of the processes is as follows (presented alphabetically as opposed to any order of significance):

Ad-Hoc

An operation that can be implemented in a process script is available for Ad-Hoc invocation. This means that the operation is performed immediately, on invocation, as opposed to on an event or in order of sequence as scripted.

Console

Consoles define the screens that operators use during workcell operations. There are three levels of screens that allow operator interaction, all of which contain an interactive message area for pending questions and informal messages. In addition, the first level has a summary section for each of the stations configured for a particular console showing the current product information at the station. The station level, accessed by entering a station name, also displays a list of machines associated with a particular station. Inputting a machine name gives the operator access to the third level, a fully interactive machine control screen, that enables the operator to update machine parameter values.

Data Preparation

This process performs post-processing of CAD derived robotic feature data (in neutral data format) into robot known variable and translation point space. It also assembles and verifies process scripts with validation against configuration data.

Event Tracker

This process performs external event tracking, when requested, based on a previously loaded event table. The event table is loaded before data collection and tracking is initiated. It also provides synchronization of scripted operations between concurrently executing scripts for machine operations, WIP (Work-In-Process) tracking, supervisory transactions, etc.

Interval Tracker

This process performs process parameter tracking on a previously loaded interval table. The interval table specifies the rate at which each parameter is to be sampled.

Lot Control

Prior to material delivery, Lot Control performs appropriate "soft" setup operations, such as machine "recipe" download and calibration of equipment or tooling. When materials arrive, the process script operations are read and executed. These include workcell commands, data collection commands, and work-in-process transactions. Within each workcell, a multiple number of work-in-process stations may exist. Also, a number of lot-control processes (hereafter referred to as "interpreters") may be selected for association with each workstation.

Machine Control

This process receives requests to perform process script operations, decomposes process script operations when required and requests machine servers to perform the specified machine operations. It also performs machine controller program management and synchronizes operations of the machines. It also provides controlled access for synchronization of server tasks and enables concurrent operations to be performed by the service.

Master Control

Master Control is responsible for initializing a workcell and administering the processing of jobs in the workcell, each of which results in the processing of a plurality of "lots" of product on scripts. This includes schedule requests made by an external manufacturing system as well as, Ad-Hoc requests made by an operator. Requests for mode change, job processing and workcell configuration are synchronized with the current workcell priority list and status.

Mover-PD

This process handles all automated material handling services. These include maintenance of a database holding dock statuses, handling the communication protocol for the material handling equipment interface, and handling the requests from either this system or those collected from the operating system message queue designated as the dock monitor process' request queue. When material transfer takes place, quality data descriptive of the prior process as it affected the transferred materials is made available to the workcell recipient of the materials. This process is used to interact with a network of peer workcells in support of this function. The module also feeds forward process data to subsequent processes to provide conditioning of said processes as materials are moved. (Manual material handling services are handled directly through either scripted operations, such as "load" or "unload", or their corresponding Ad-Hocs.).

Plotter

This process drives a multi-pen plotter to plot arbitrary parameter sets per user supplied algorithm(s).

Setup parameters for the plotter include axis rotation, plotter origin, scaling factors, plot title and axis labels. These are configured as a parameter set in the database and are used to adjust plotter operation.

Restart

This process is used to administer operating system resources, processes of the current invention, and custom workcell computer programs. It is used to establish the environment in which the software modules will run. The process sets up the environment according to what is found in the specified configuration file or, if none is used, the program uses a default configuration file.

Server

This process performs commands (of a standard set) as requested by Machine Control; these include issuing and reporting on process parameters, uploading and downloading process files and starting or stopping of machine operations. The machine servers also listen to machine communications for messages relating to process performance, product quality and error conditions.

2. Description of Menu Hierarchy

Figure 2A:
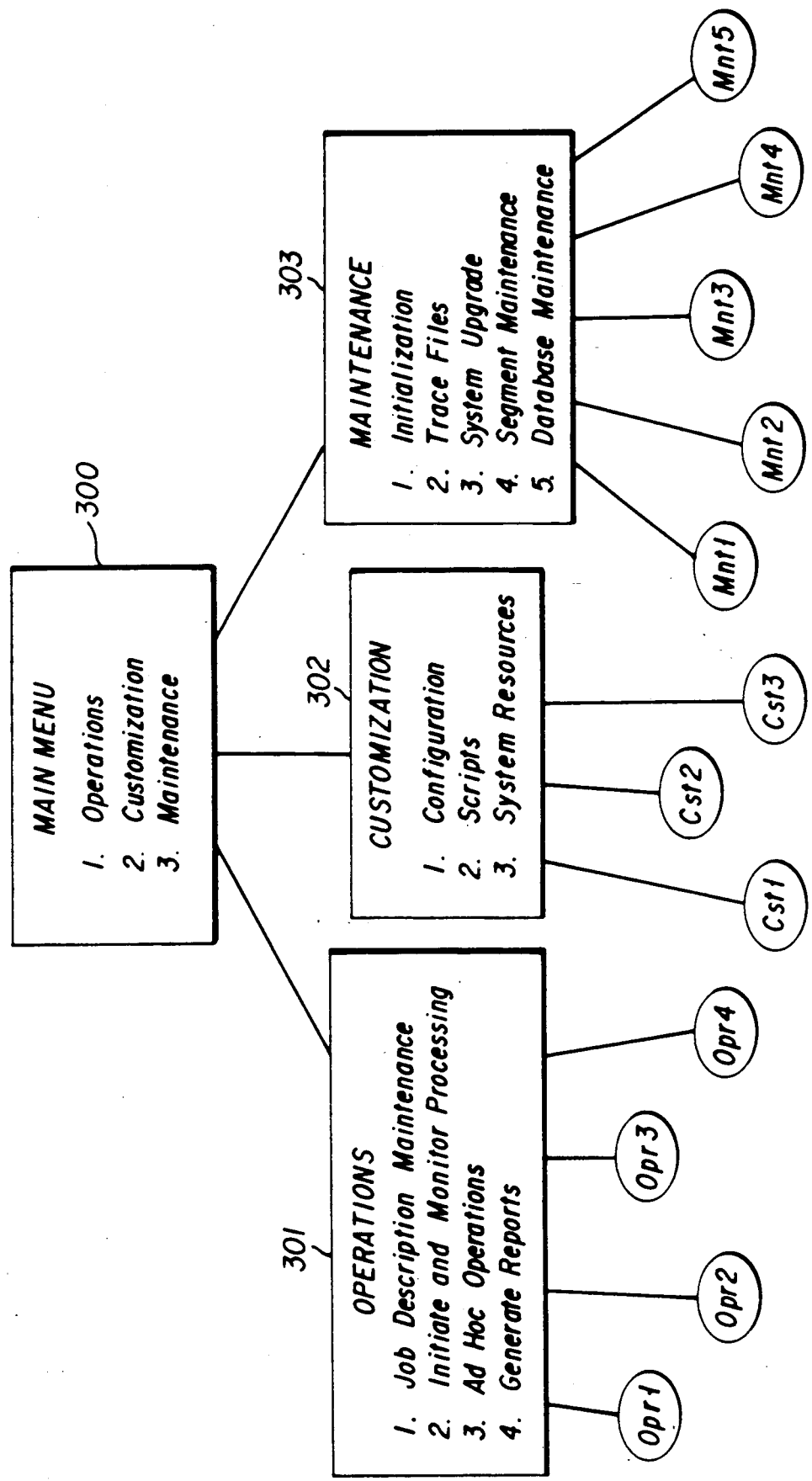
FIGS. 2a, 2b, 2c, 2d and 2e illustrate in block diagram form a menu tree of the flow operation of the workcell computer system.

Referring to FIG. 2A, the top level menu by which a user may obtain access to the workcell control software is shown. Individuals with proper security access are presented with the "MAIN MENU" 300 as shown in the figure upon logging in. Other security classifications exist that would cause entry to the system at various levels based on assigned privileges.

In any event, the user may either use the menu hierarchy or immediately access a particular end function by typing it at the screen cursor. When using the menus explicitly, the number of the selection is typed.

Again referring to the "MAIN MENU" 300, we see that there exists three choices: "OPERATIONS", "CUSTOMIZATION", and "MAINTENANCE". This represents three basic areas of functionality of the system. Proceeding through the hierarchy, we look to the "OPERATIONS" menu 301. Here are listed functional areas to describe jobs for processing at the workcell, to initiate and monitor workcell activity, to cause an Ad-Hoc activity, and to generate production and other reports descriptive of the workcell's activity. Drawing our attention to the "CUSTOMIZATION" menu 302, we recognize the functional areas to characterize the specific application of the generic software as establishment of the "static" configuration of the workcell, establishment of the scripts which are the threads of activity that the workcell executes, and establishment of the system resources used by the workcell control software in support of the workcell. Proceeding to the "MAINTENANCE" menu 303, we find functionality to initialize the workcell control software, to review traced process events descriptive of the workcell's activity, to upgrade the system to a new or old release of software, to perform maintenance on the various encapsulated system data segments, and to perform maintenance on the database.

Figure 2B:
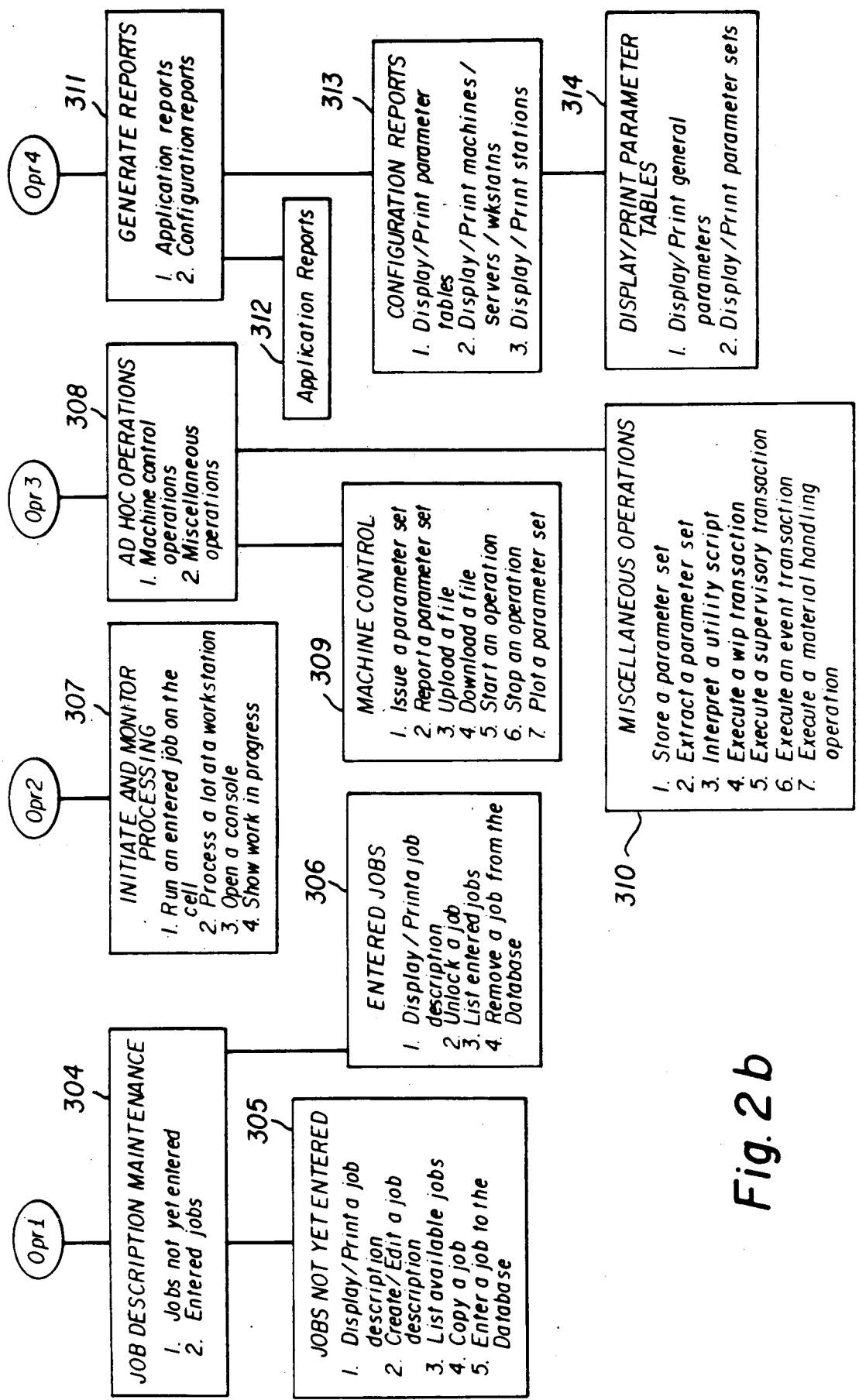

Now looking deeper at the selections available through "OPERATIONS", as shown in FIG. 2B, we turn our attention to the "JOB DESCRIPTION MAINTENANCE" menu 304. A job may be either "not yet entered", meaning that its description has either not yet been acquired or is in an editable state; or "entered", meaning that its description is locked and entered to the database for processing. Various functions are appropriate for jobs in these two states and are accessible via the "JOBS NOT YET ENTERED" and "ENTERED JOBS" menus 305 and 306, respectively. With regard to the "INITIATE AND MONITOR PROCESSING" menu 306, there are two options with regard to processing and two for monitoring. Either a job may be processed on the workcell, implying that some set of the workstations will be exercised to properly process each of the lots which make up the job, or a more focused processing of one lot at a specified workstation may be requested. The former is generally used for normal processing, where the latter is useful for such activities as rework or other forms of more limited processing. The two selections associated with monitoring include the ability to "open" an operator view into the workcell's activity by virtue of initiating a "console" session, or the less interactive but more global view of all work that is in process within the workcell. Continuing to the next high level "OPERATIONS" selection, the various free-form capabilities of a plethora of "AD-HOC OPERATIONS" are accessed by the menu 308 of that name. These operations are decomposed and associated with menus according to whether they interact directly with a piece of workcell equipment or not. "MACHINE CONTROL" 309 and "MISCELLANEOUS OPERATIONS" 310 are presented on the figure. Another functional area explicitly referenced on the figure as "GENERATE REPORTS" 311 alludes to the capability to draw inquiries and reports. Aside from the obviously available "CONFIGURATION REPORTS" 313, "APPLICATION REPORTS" 312 are generally available based on the existing SQL and report scripts which have been written. The reports from the CONFIGURATION REPORTS menu 313 can be selectively displayed along with print general parameters and print parameter sets using the "DISPLAY/PRINT PARAMETER TABLES" 314.

Figure 2C:
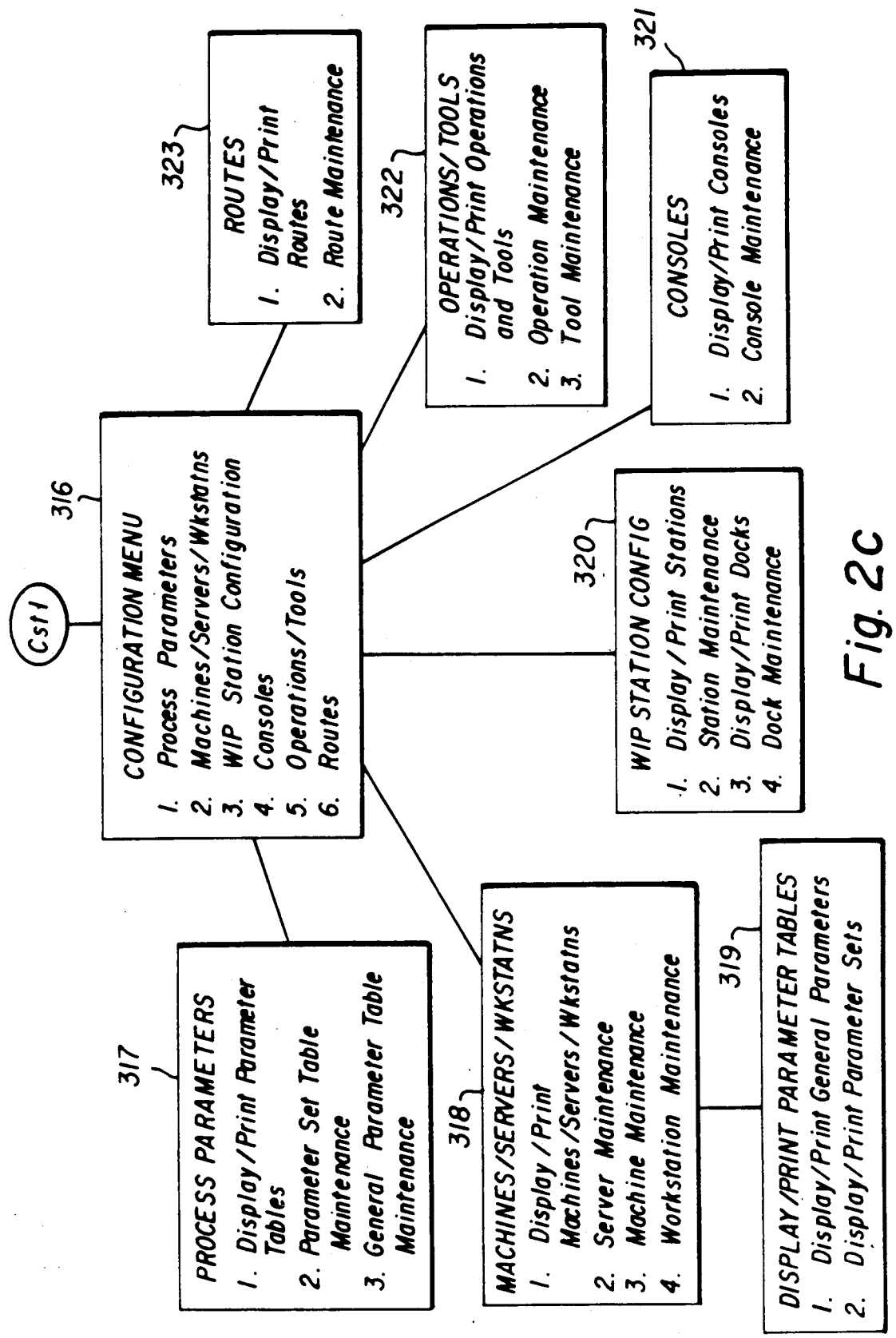
Figure 2D:
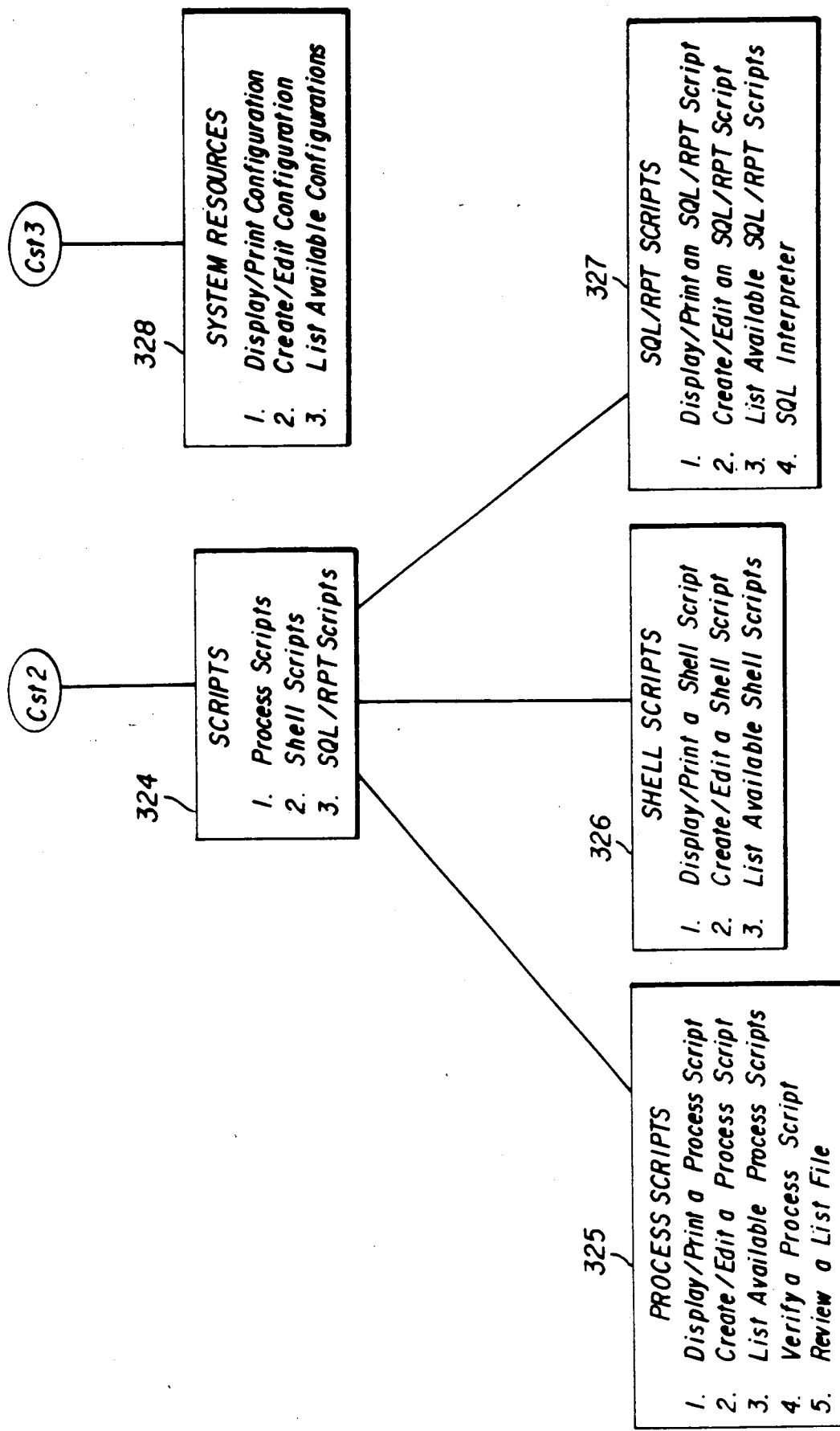

FIG. 2C elaborates the "CONFIGURATION MENU", available as a selection off of the "CUSTOMIZATION" menu 302 previously referenced. Those configurable aspects of the system that are explicitly configurable through this menu include "PROCESS PARAMETERS" 317, "MACHINES/SERVERS/WORKSTATIONS" 318 and its associated "DISPLAY/PRINT PARAMETER TABLES" menu 319, "WIP STATION CONFIGURATION" 320, "CONSOLES" 321, "OPERATIONS/TOOLS" 322, and standard "ROUTES" 323. These entities are best described using the logical model of the invention to be discussed. FIG. 2D completes the "CUSTOMIZATION" selections. "SCRIPTS" 324 breaks down according to whether the script is "PROCESS SCRIPTS" 325, used to choreograph workcell activity; or "SHELL SCRIPTS" 326, used for various high level system functions such as exporting data, archiving, or application specific needs; or "SQL/RPT SCRIPTS" 327, used to flexibly access the database for purposes of inquiries, updates, or reports. Also, on the figure, "SYSTEM RESOURCES" 328 allows the user a means to easily do configuration management for operating system resources.

Figure 2E:
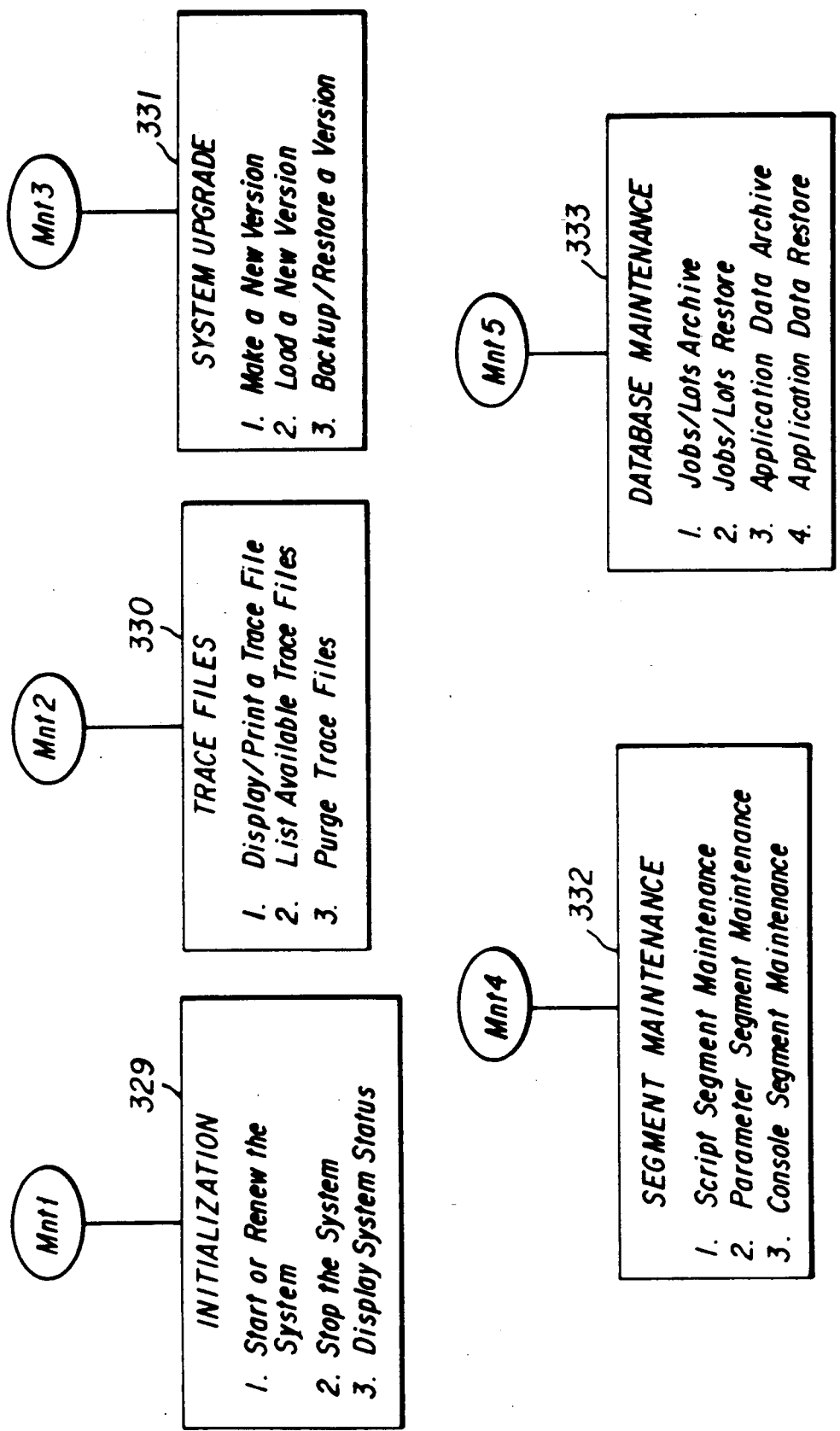

Finally, FIG. 2E indicates maintenance functions accessible through menus. Listed first is "INITIALIZATION" 329, it is used to start, renew, or stop the system configuration. "TRACE FILES" 330 allows one to selectively review traced process events for purpose of either debugging an application or for any other reason which necessitates a historical perspective. "SYSTEM UPGRADE" 331 provides an automated and controlled procedure to modify the versions of system software. "SEGMENT MAINTENANCE" 332 is used to review statistics on segment usage, repair or purge segments, etc. "DATABASE MAINTENANCE" 333 gives access to explicit archival and restoration functions.

It should be noted that a "root" menu, which is not shown, provides system administrator access to database and forms package utilities such as: database design, database maintenance, security and forms tools. These utilities were used to develop the flexible schema used by the invention, as represented by the physical model, security classifications and applications screens, some examples of which are included in this disclosure. Refer to the "Unify Developers Reference Manual" for further detail on these utilities.

3. Description of Data Models

The subject matter of FIGS. 3-6 is used along with the relevant portion of the written specification, to describe the logical data model of the process control software. The figures illustrate the Entity-Relationship approach to data modeling with DACOM (D. Appleton Co.) IDEF notation.

FIG. 3 illustrates the legend describing IDEF notation.

Figure 4:
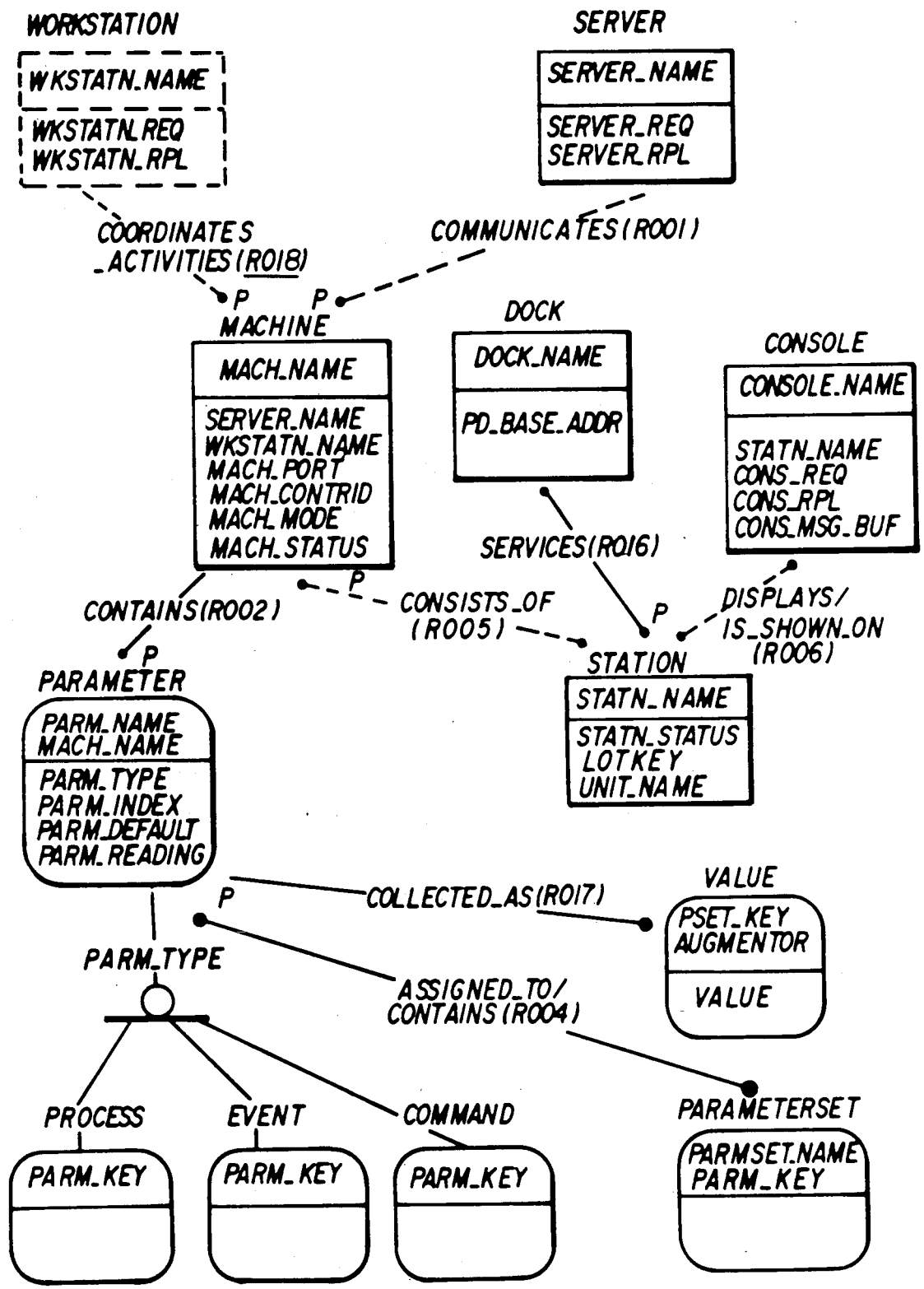
FIG. 4 illustrates a multi-table flexible schema using the legends of FIG. 3 to logically model a portion of the operating interface of the present invention.
Figure 5:
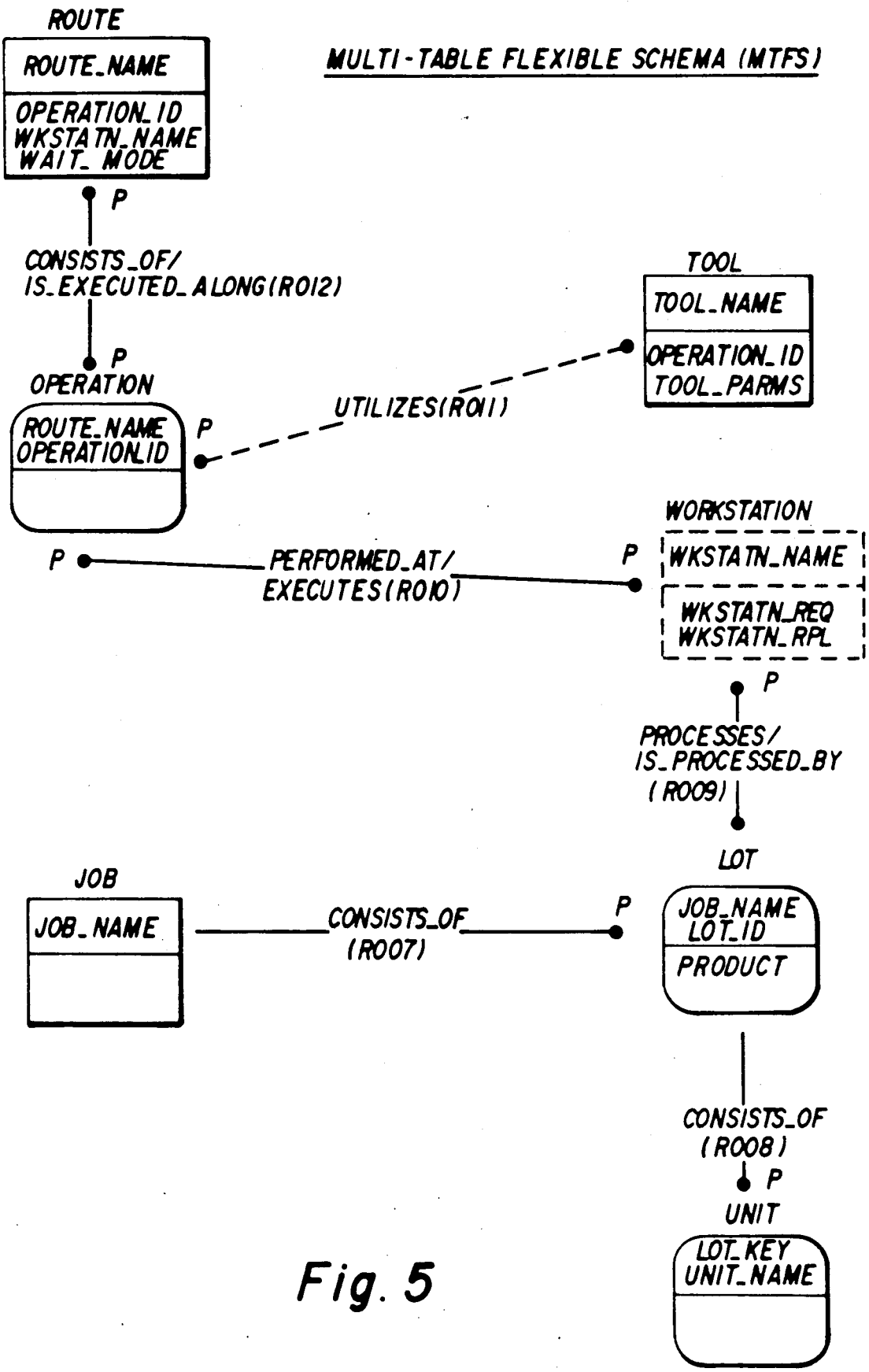
FIG. 5 illustrates a multi-table flexible schema using the legends of FIG. 3 to logically model another portion of the operating interface of the present invention.
Figure 6:
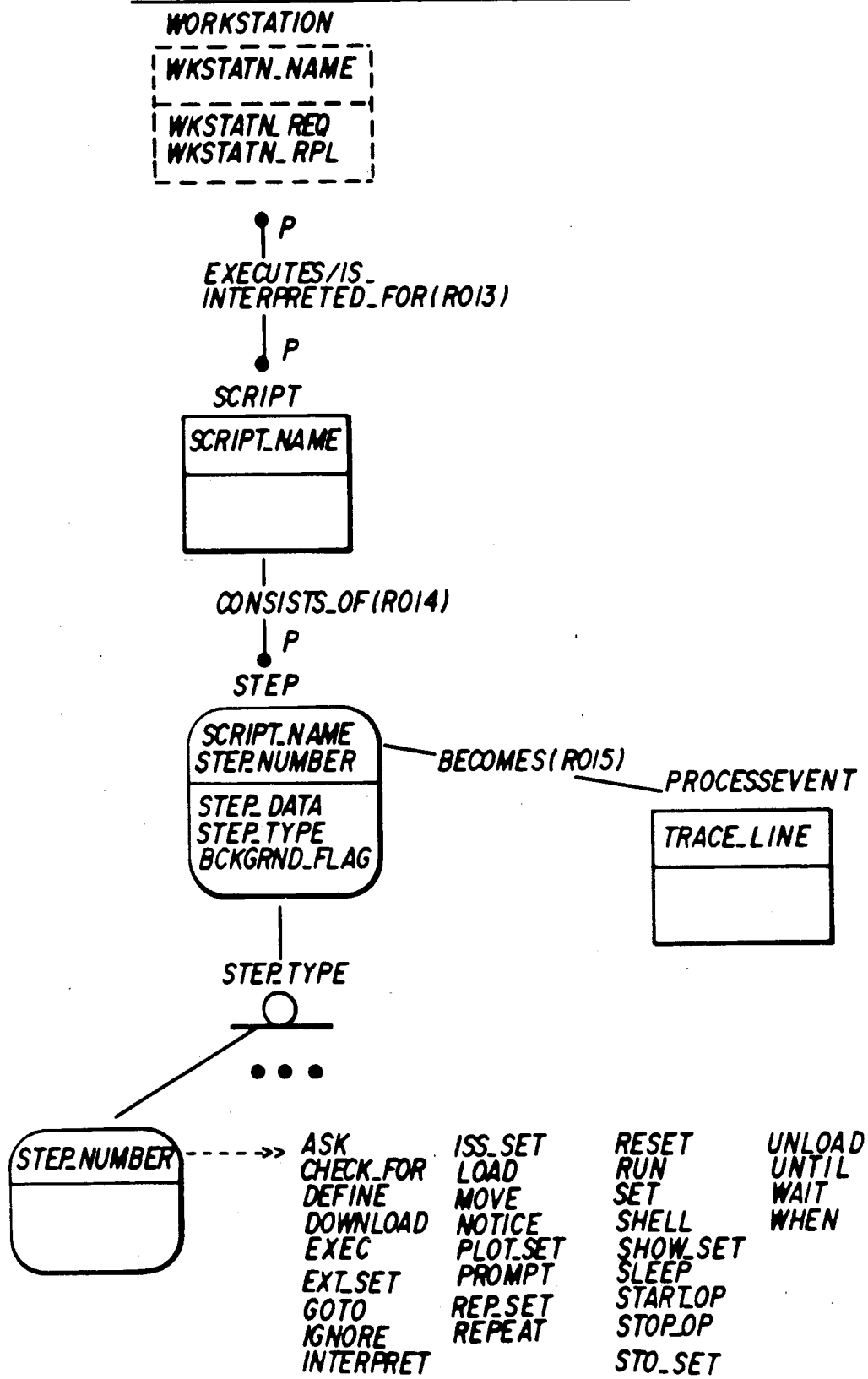
FIG. 6 illustrates a multi-table flexible schema using the legends of FIG. 3 to logically model yet another portion of the operating interface of the present invention.

This data model will be referred to as the Multi-Table Flexible Schema (MTFS). It conveys the logical model of data, necessary to support the invention, as follows:

The graphic diagrams of FIGS. 4-6 show pertinent entities, attributes and associations between entities (i.e. business rules).

An Entity/Attribute list is provided in Appendix A which describes in more detail each entity and attribute.

A set of Business Rules is provided in Appendix B which describes in more detail the associations between the entities represented.

As a logical data model, this representation is independent of any particular database implementation and could be applied to other databases instead of that which was used for the purpose of the invention (Unify Relational Database from Unify Corp.)

The physical data model is realized by virtue of the supporting Yourdon diagrams and data dictionary provided in Appendix C.

4. Description of Methodology and Symbology Used

Figure 11:
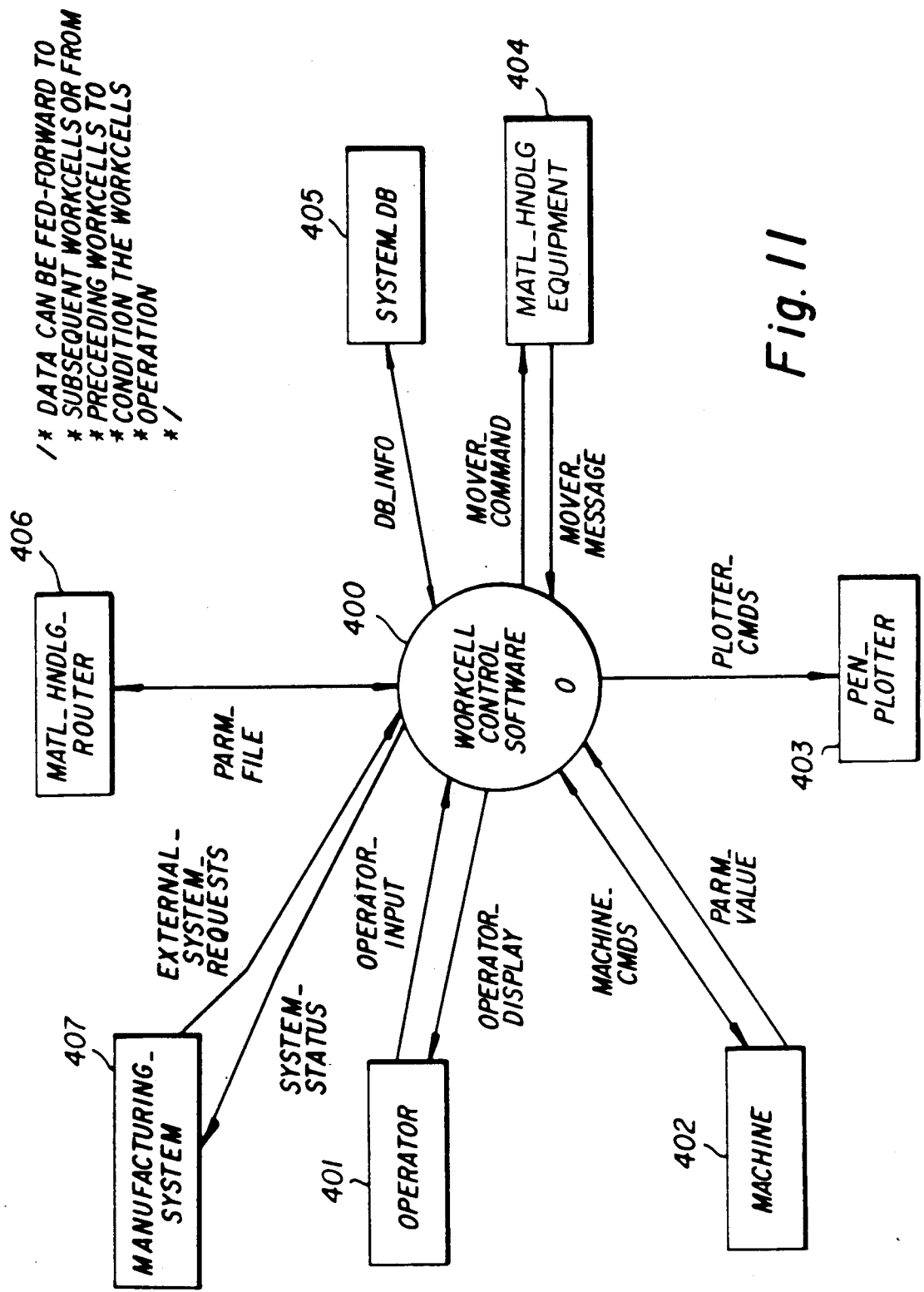
FIG. 11 Context data flow diagram.

The design tools used to provide the diagrams in support of this invention were Cadre Technologies TeamWork Tools. The following information is provided as a courtesy to the reader for interpreting the model diagrams (FIGS. 11-94). The types of diagrams utilized consist of Data Flow Diagrams, State Transition Diagrams, and Structure Charts. Module specifications (Appendix D) are also provided as documentation referencing the Structure Charts. It should be noted that, in most cases, standard Yourdon methodology and symbology was used in construction of the diagrams; exceptions to the standard Yourdon methodology and symbology are noted in the following descriptions of each of the diagrams (FIGS. 7-10).

FIG. 7 indicates the standard elements used to construct the Data Flow Diagrams. Exceptions to using the standard Yourdon methodology and symbology include the following:

the use of data flows to show the flow of data between data transforms and stores only, and does not show the flow of data between data transforms.

The Hatley Notation Control Symbol, a vertical bar, is used in lieu of the Yourdon Control Transforms symbol, the dashed bubble.

The Data Transformation receives inputs indicated by the data flow symbol and translates the input data flows into output data flows.

The Control Transforms symbol is a direct reference to a State Transition Diagram. Inputs and outputs consist of Event Flows.

The Data Store symbol represents a meaningful storage location for data that is acted upon by a data transformation.

The Data Flow symbol shows the occurrence and direction of data flowing between a Data Transform and a Store.

The Event Flow indicates the occurrence of a signal or command between Control Transforms and Data Transforms. The Event Flow label may be referenced on the State Transition Diagram which is termed either an event or a condition.

FIG. 8 illustrates the standard elements used to construct State Transition Diagrams. A State Transition Diagram is a model used to define the behavior of the system.

The symbology used to construct a State Transition Diagram consists of a box, termed a state, connected to another state with an arrow, termed a transition. The transition label consists of text describing an event or condition that occurs and the action(s) that result. The format of a transition label is an event followed by one or more actions.

The symbols in FIG. 9 are used to construct Structure Charts. The Structure Chart is used for the partitioning of a task into modules and indicates the hierarchical organization of modules.

Exceptions to using the standard Yourdon methodology and symbology for constructing Structure Charts include the following:

Couples (Data, Control and Hybrid) are shown on Figures only where they aid in understanding the concepts of the invention.

The Library Module represents a single callable unit of code that exists in a library of functions. Since many processes may utilize Library Modules, these modules are aggregated by function into what are termed library sheets (FIGS. 77-94).

The Module represents a single callable unit of code. Typically a Module is "local" to a particular task.

The Off-page Connector is used to directly reference the continuation of a module or collection of modules that appear on another physical page.

The On-Page Connector is used to reference a single module or a collection of modules that are located on the same physical page.

The Inclusion symbol is used to accentuate the existence of code that exists physically within a module, although the subordinate module appears separately on the diagram.

The Module Call indicates the activation of a module; it is used to show the relationship between a "boss" module and a "subordinate" module.

A Couple is used to indicate the type and direction of data passed between modules. There are three types of couples:

Data Couple which represents data that is processed,

Control Couple represents control information that controls the logic of the receiver, Hybrid Couple which represents both the flow of data and control.

FIG. 10 shows the elements used to assemble a Data Dictionary (Appendix C). The data dictionary is used to define the data elements referenced throughout the model. The exception to the standard Yourdon methodology is that not all data elements were broken down into their atomic units where doing so would not yield insight.

5. Context and Structure of the Invention

We now describe the physical model. Two diagrams, FIGS. 11-12, diagram the invention as a whole, in terms first of its external environment and then in terms of its internal structure.

FIG. 11 represents the context of the Workcell Control Software 400 relative to its operating environment. The figure depicts the communications that occur between the system boundary and the external environment. More specifically, there is illustrated the data paths between the Workcell Control Software 400 and the operator 401, Machines 402, pen-plotter 403, equipment for handling material 404, the system data base 405, the material handling router 406 and the manufacturing system 407 which is shown generally in FIG. 1.

Figure 12A:
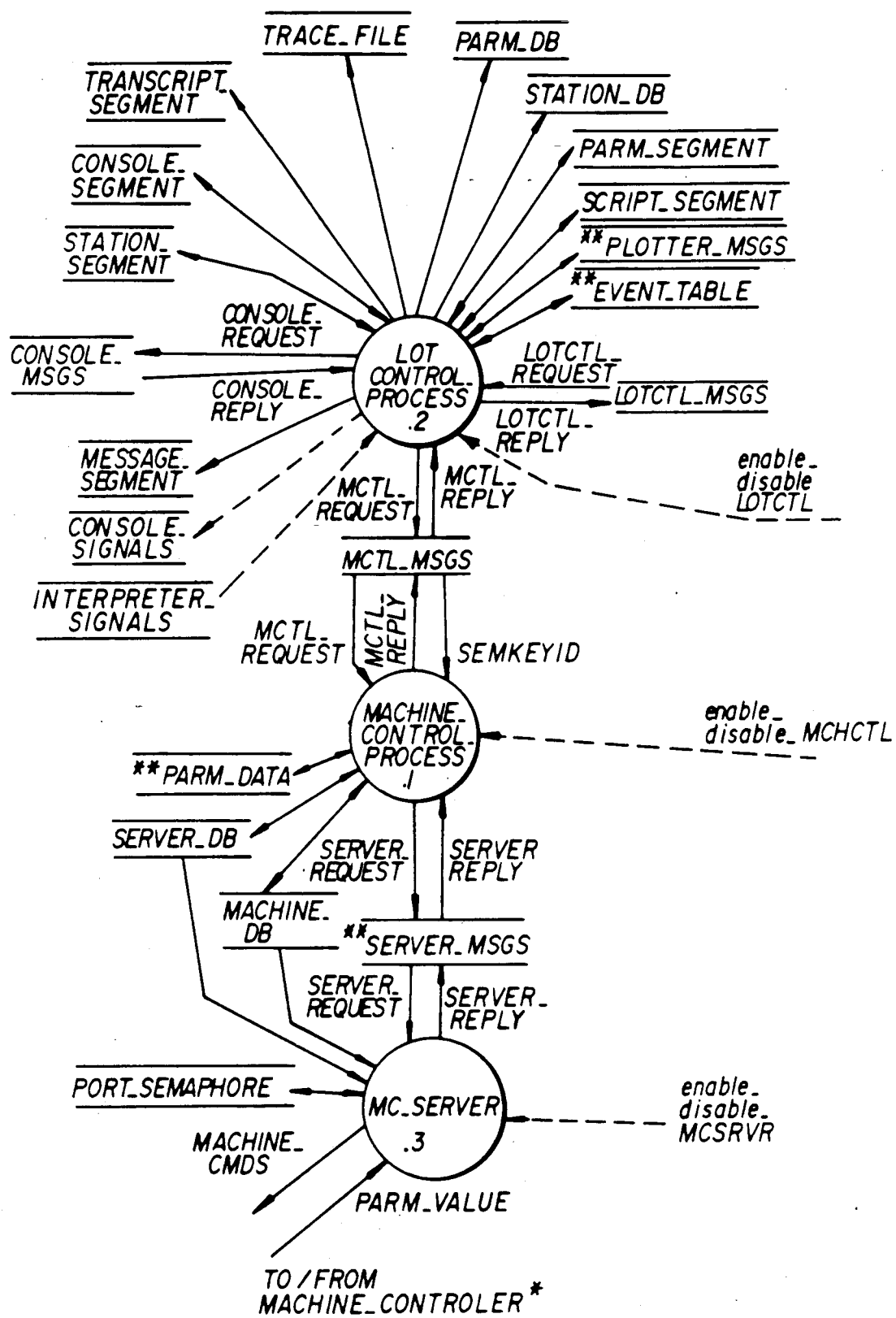
FIGS. 12a, 12b, 12c, and 12d Level Zero data flow diagram.
Figure 12B:
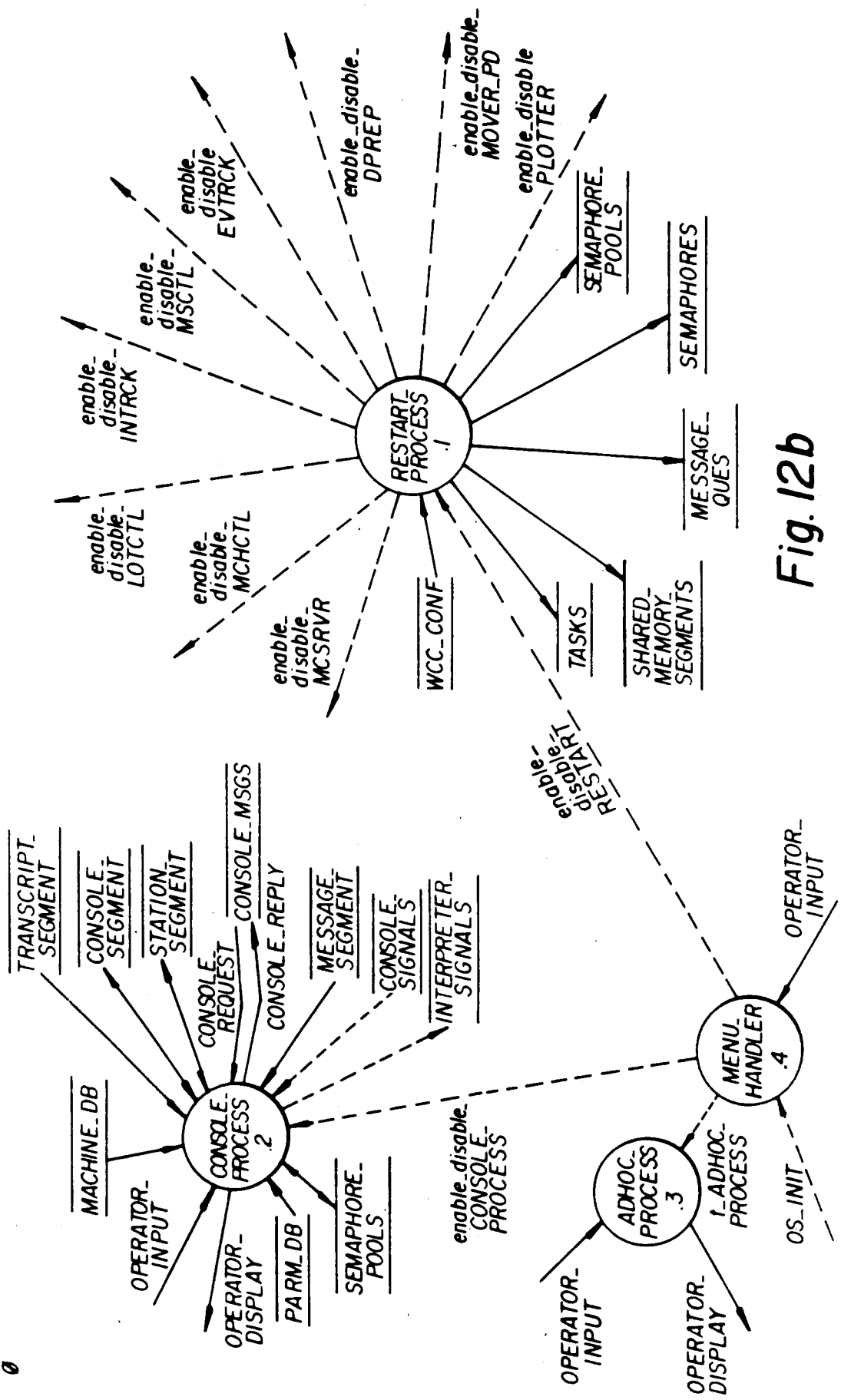
Figure 12C:
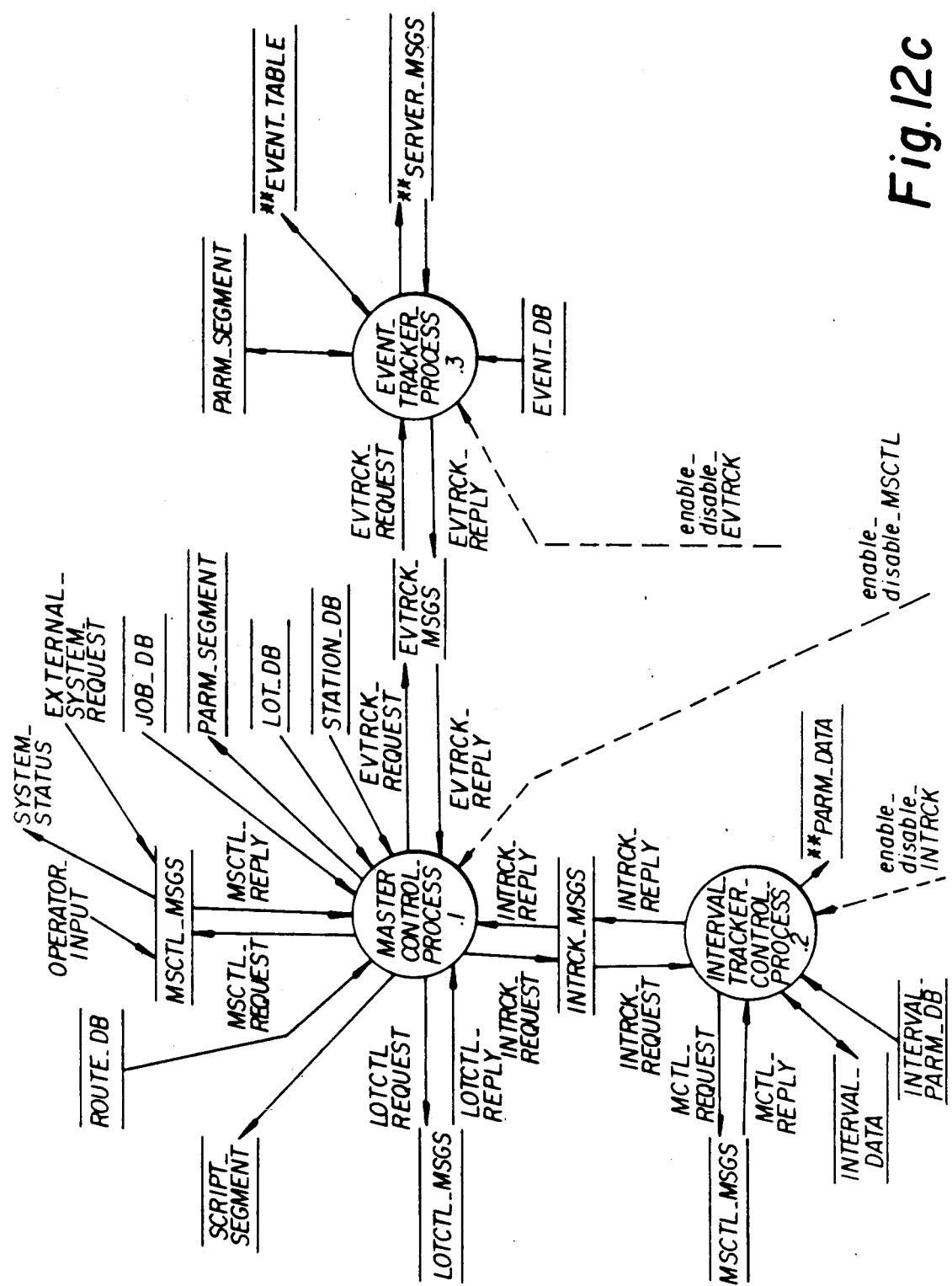
Figure 12D:
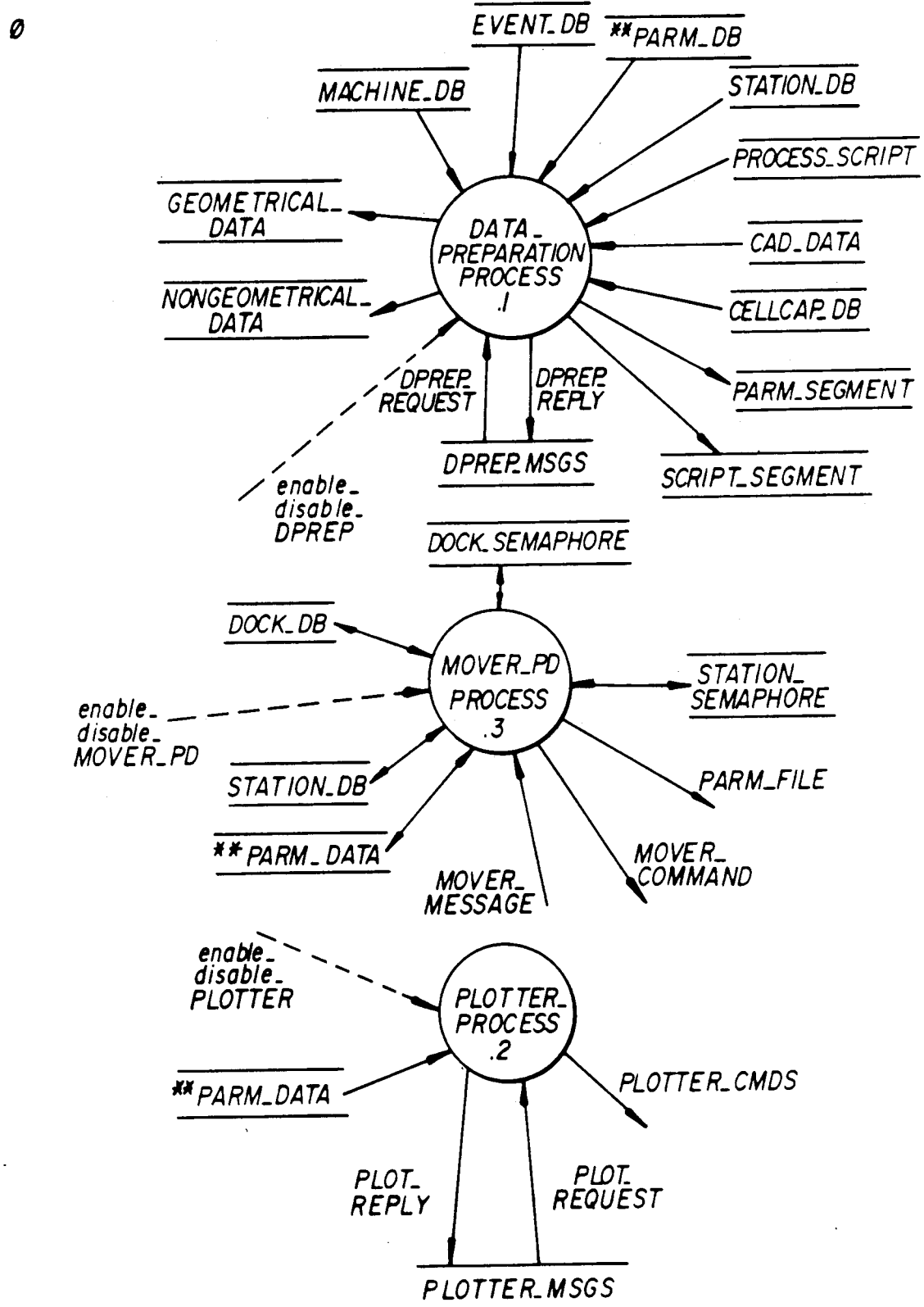

FIGS. 12a, b, c, and d show the processes that exist internally within the Workcell Control Software 400 and how they interact with one another, as well as the interaction between:

1) the processes and the operator.

2) the processes and the operating system.

3) the processes and the supervisory system.

6. Detailed Process Descriptions

Note that of the processes described, there exist two distinct execution methods. "Ad-Hoc" and "Console" processes are executed in a conventional manner, i.e., they are created when an operator uses them and terminate when no longer required. Other processes are different, however, in that they are permanently resident, detached processes, which operate asynchronously with user processes.

6.1: Ad-Hoc

Figure 13:
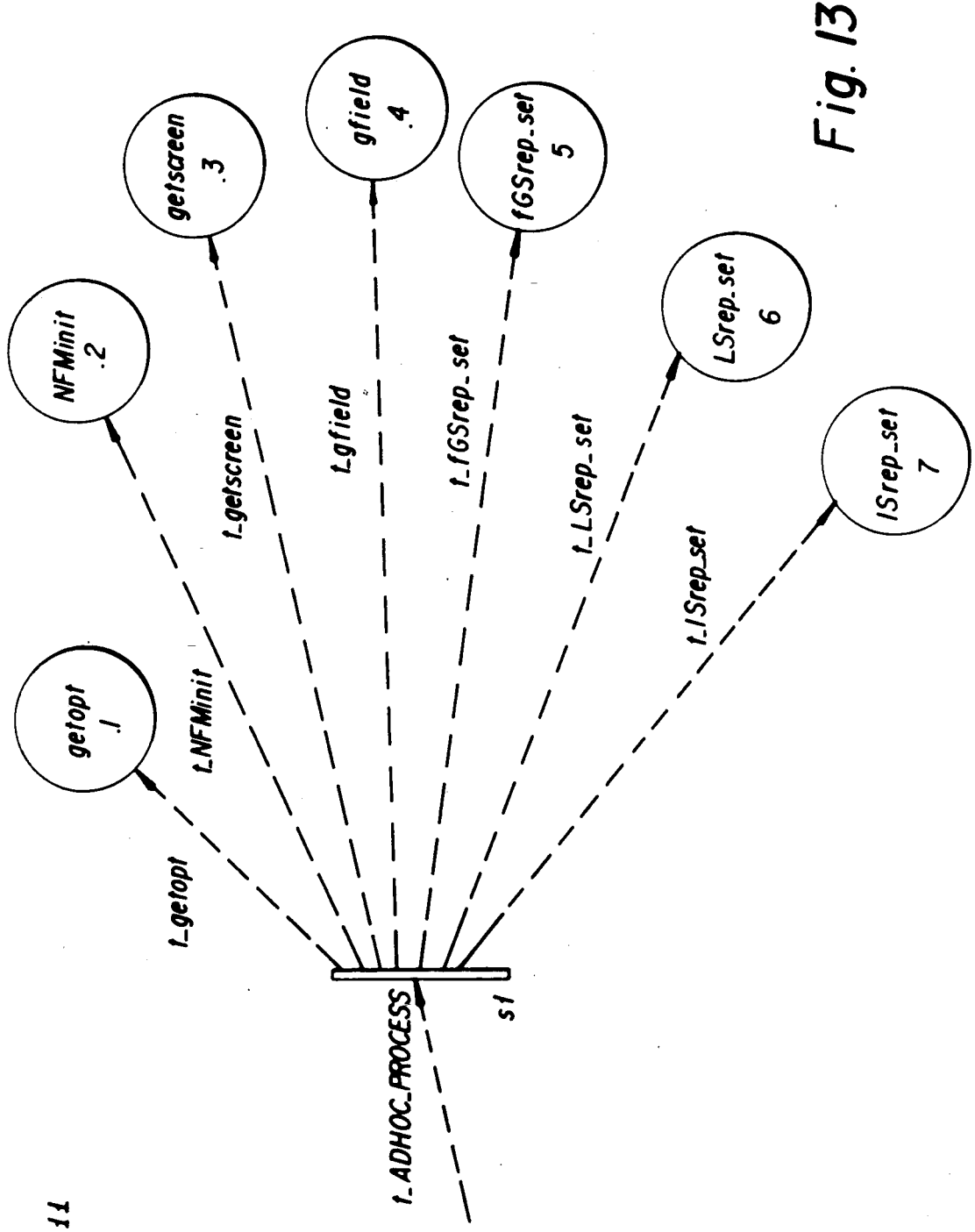
FIG. 13 Ad-Hoc Process: data flow diagram.
Figure 14:
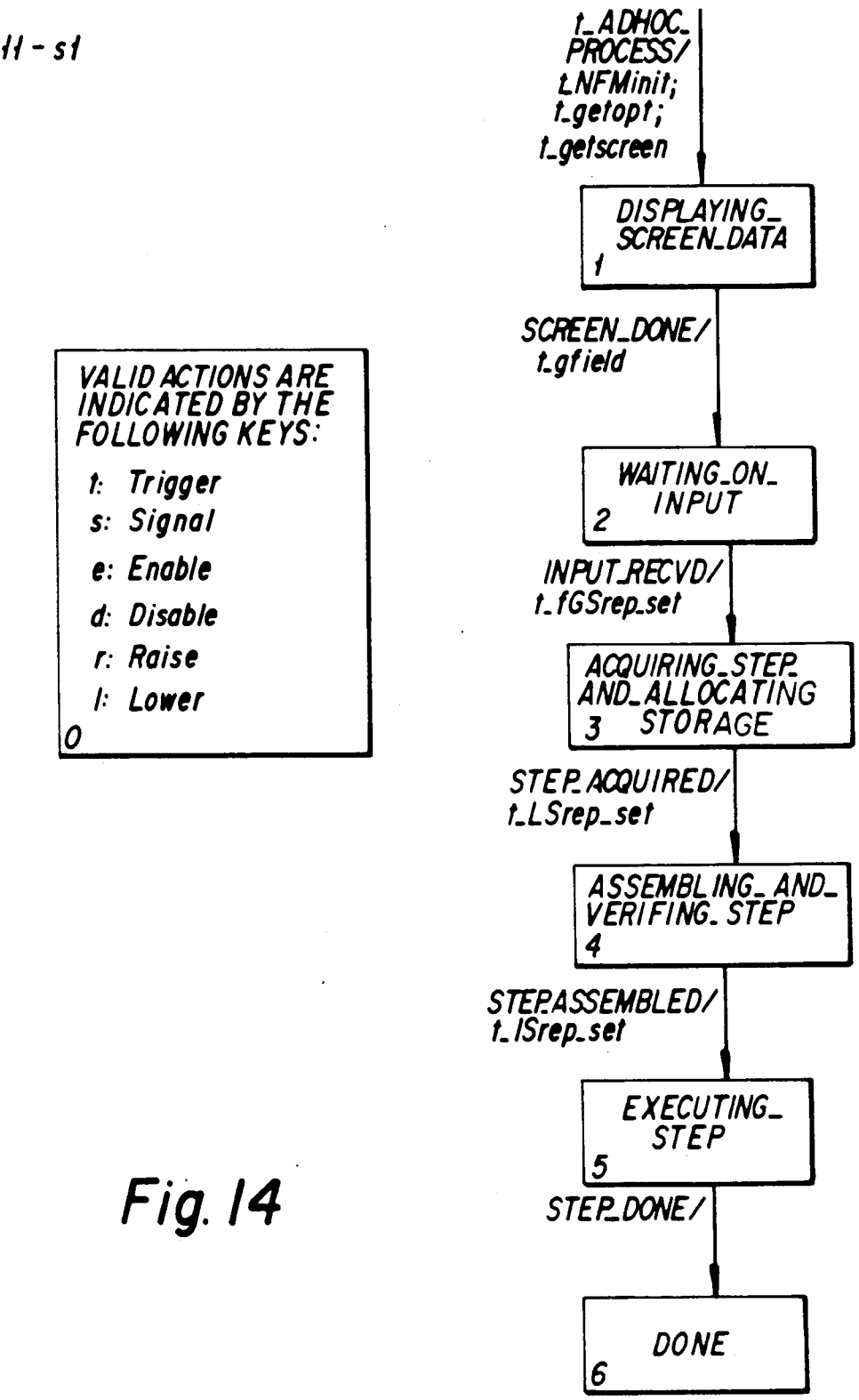
FIG. 14 Ad-Hoc Process: state transition diagram.
Figure 15:
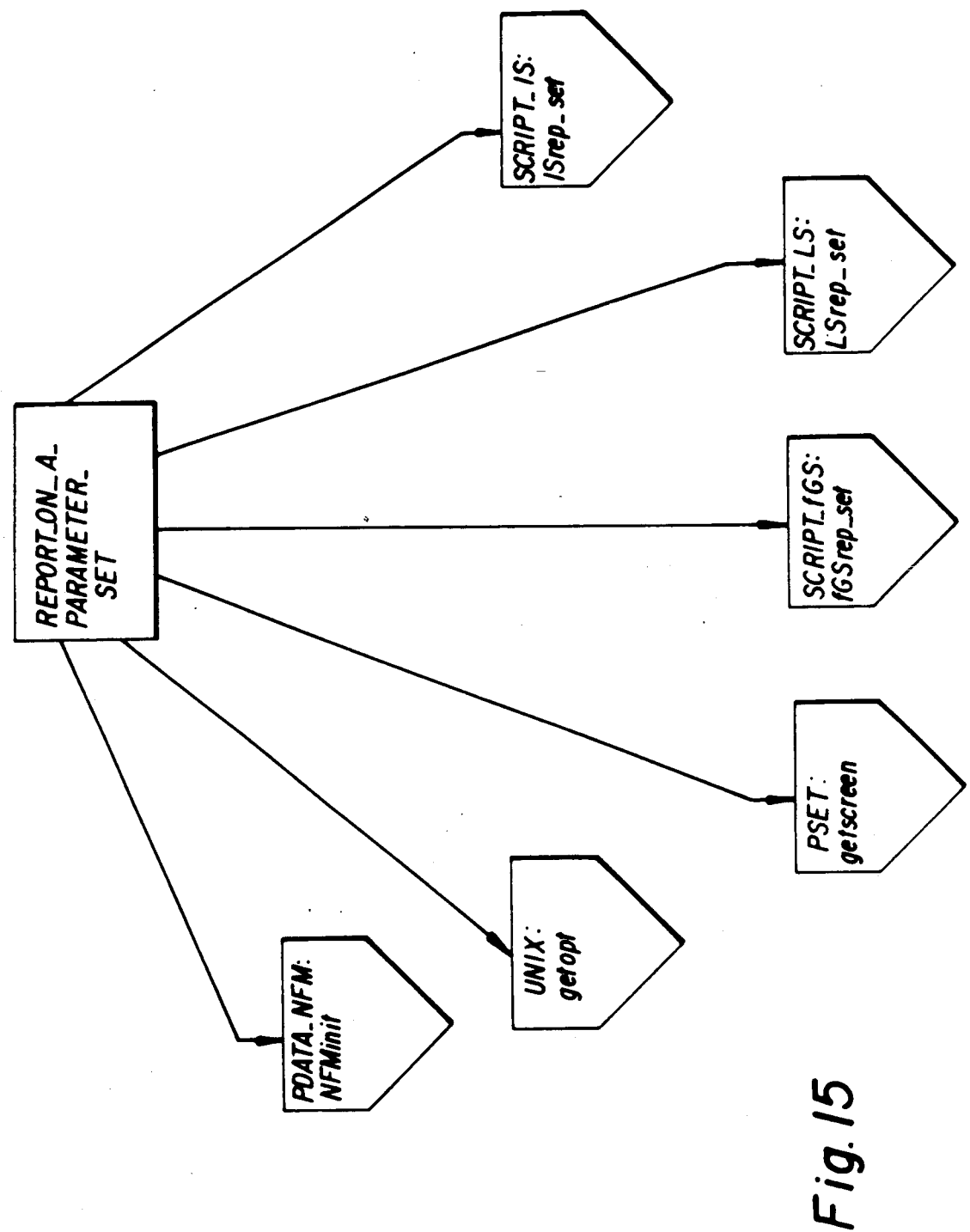
FIG. 15 Ad-Hoc Process: structure chart.
Figure 16:
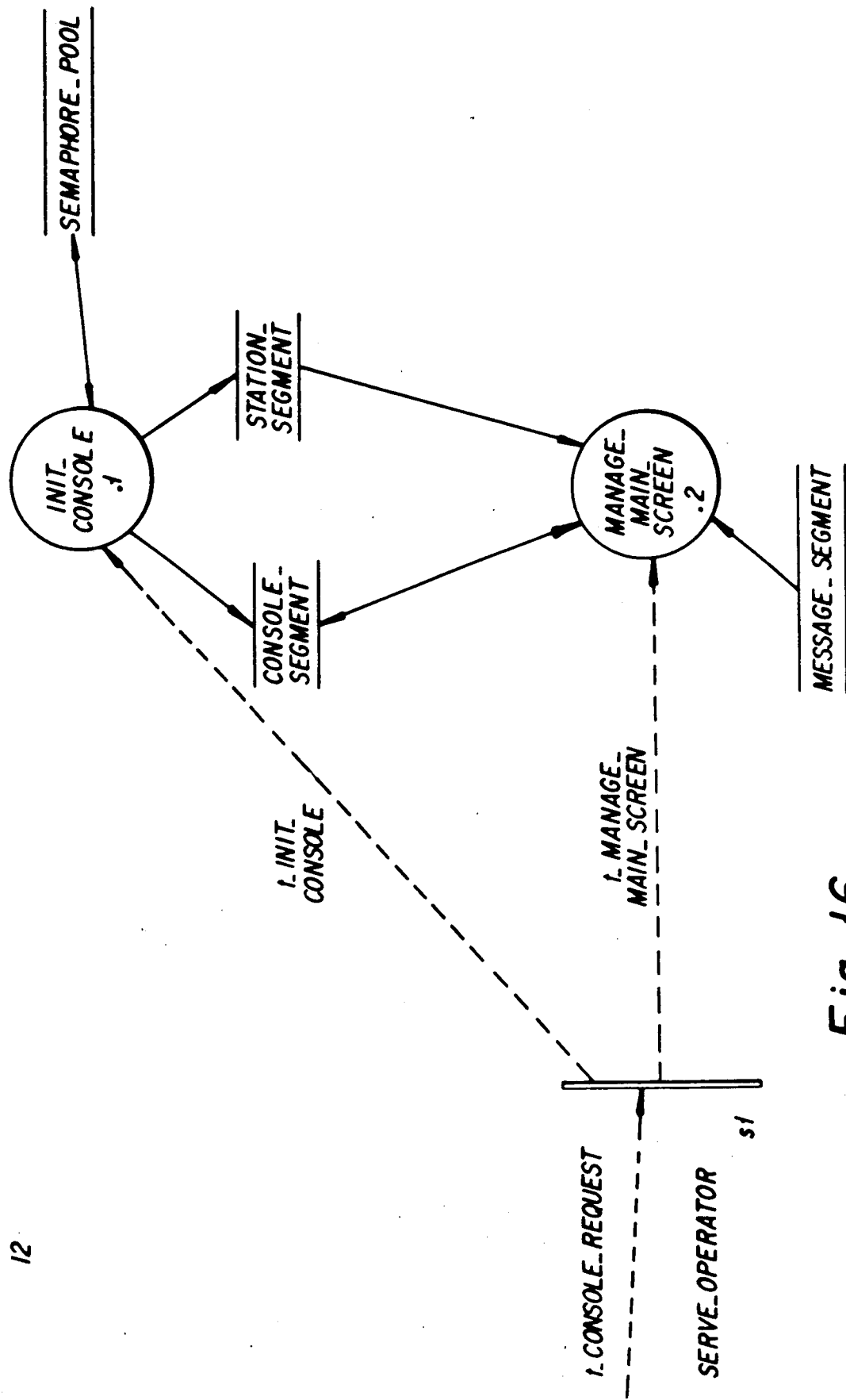
FIG. 16 Console Process: data flow diagram.
Figure 17:
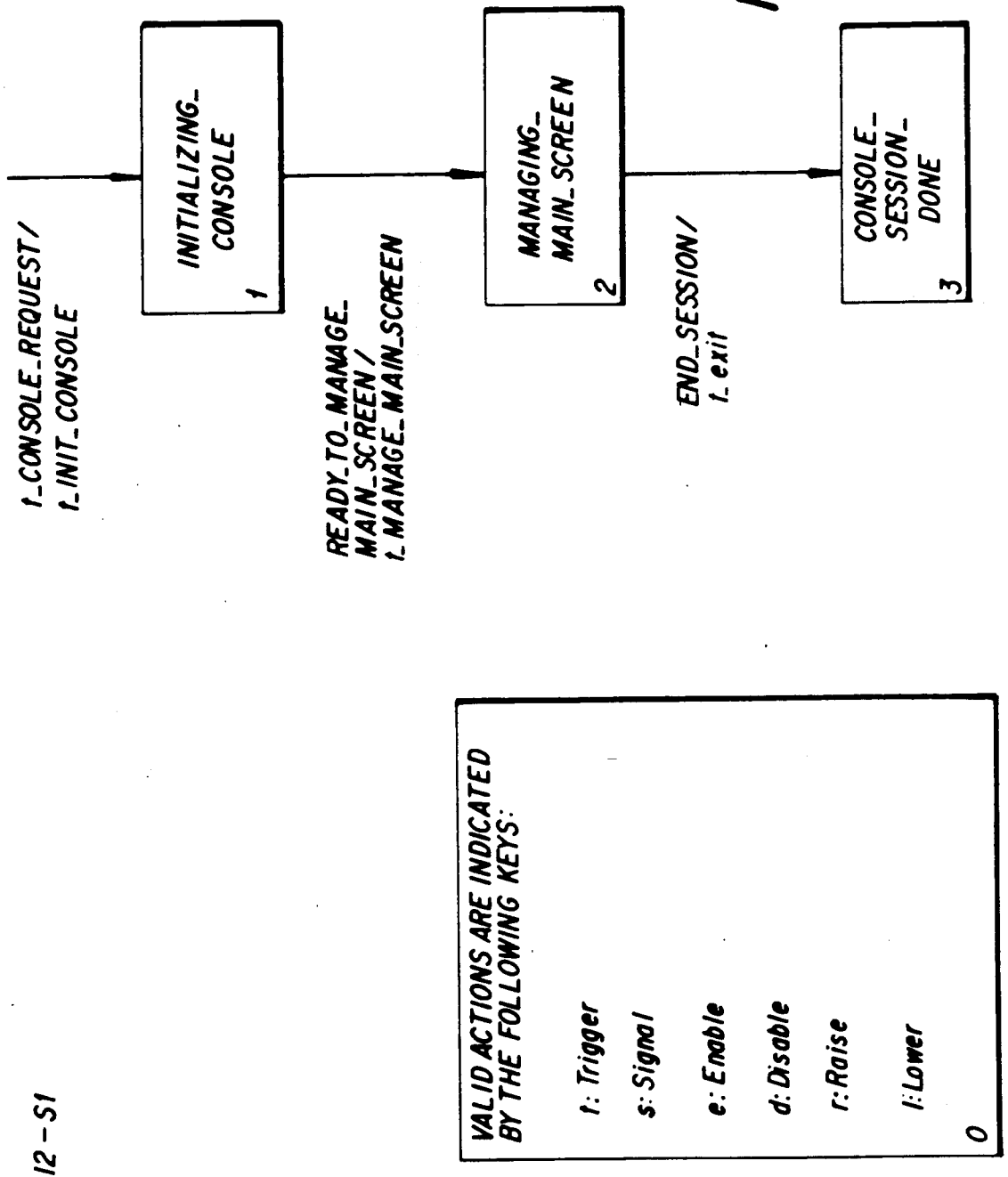
FIG. 17 Console Process: state transition diagram.
Figure 18:
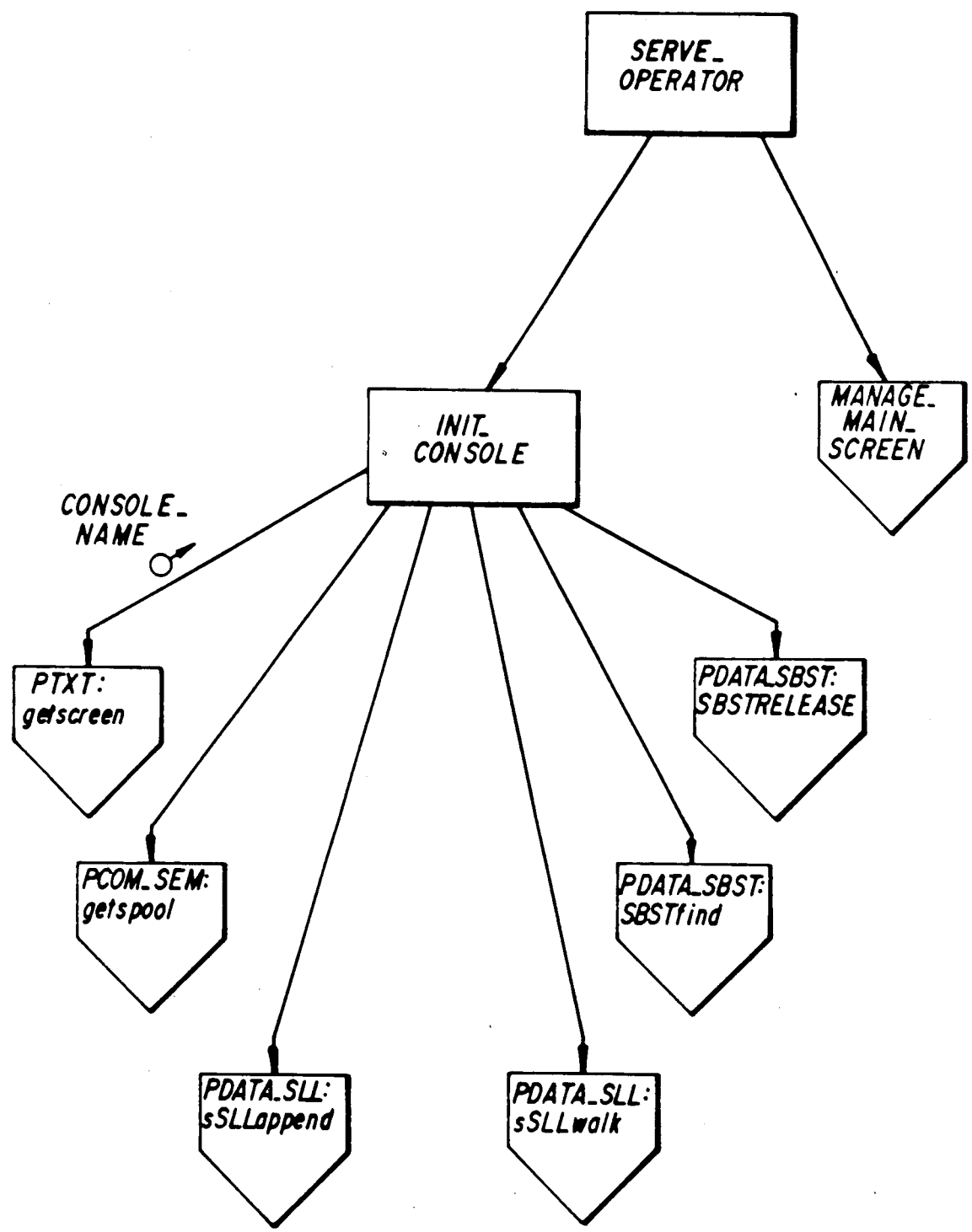
FIG. 18 Console Process: structure chart.
Figure 19:
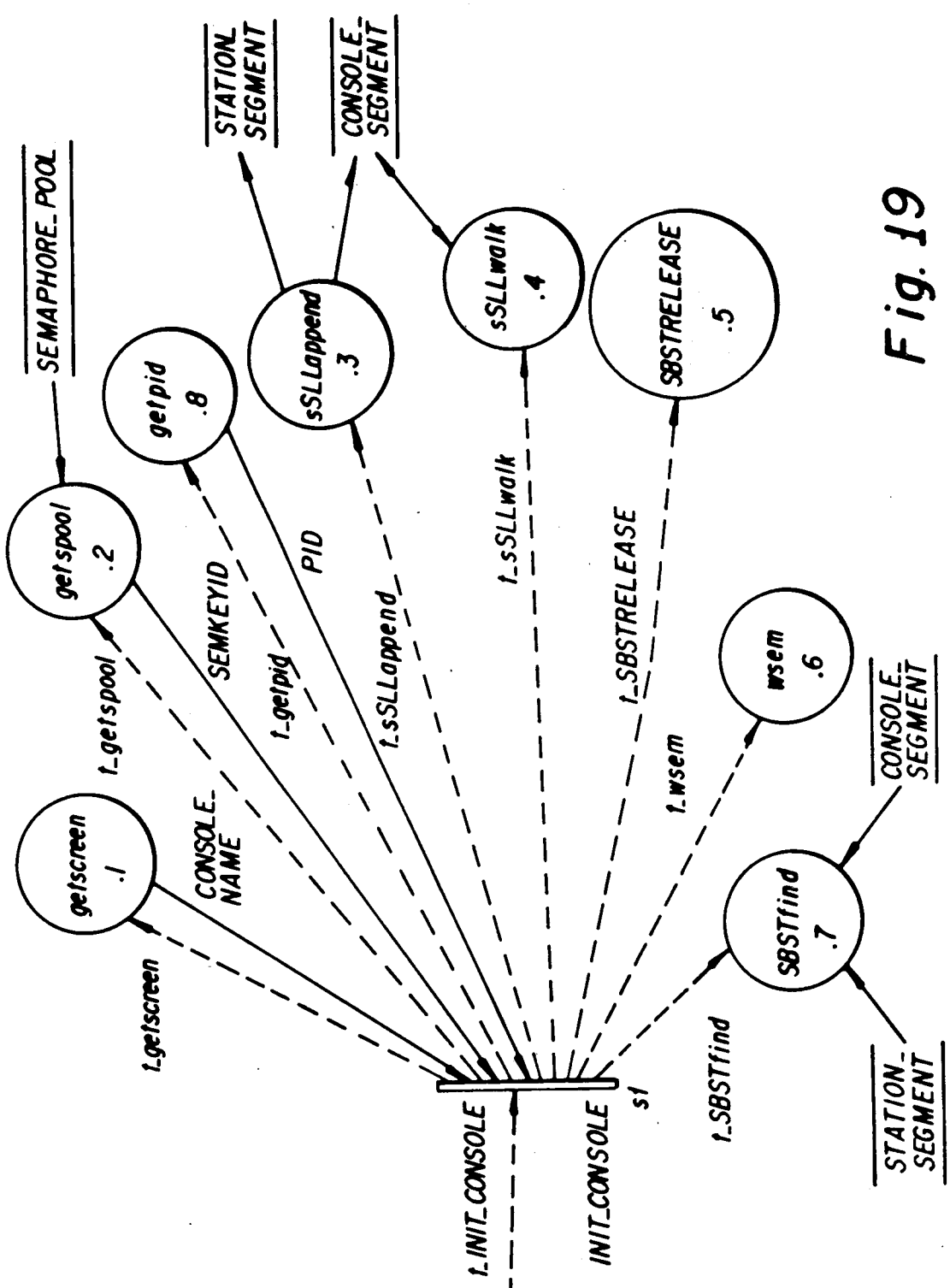
FIG. 19 Console Process: data flow diagram.
Figure 20:
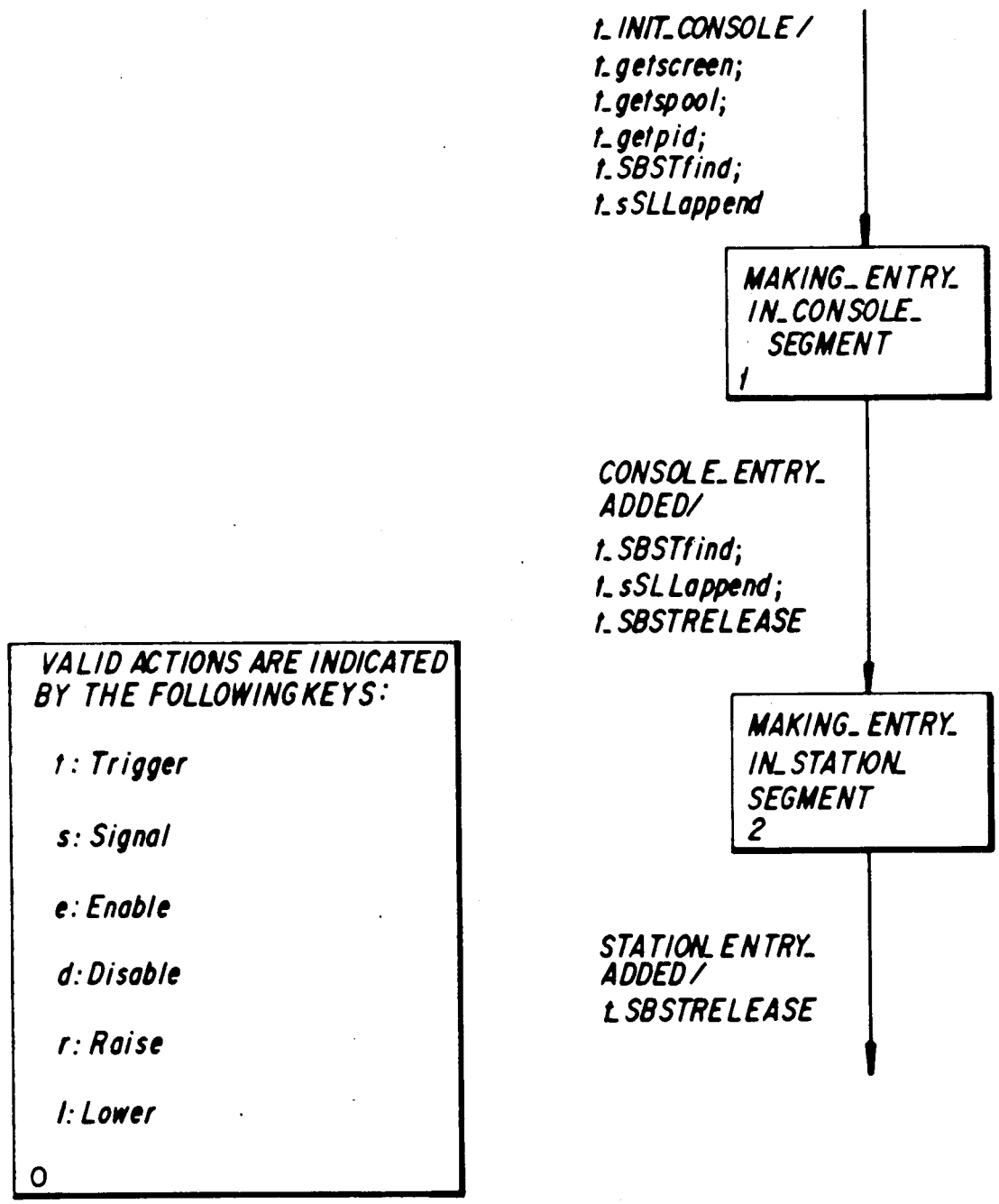
FIG. 20 Console Process: state transition diagram.
Figure 21A:
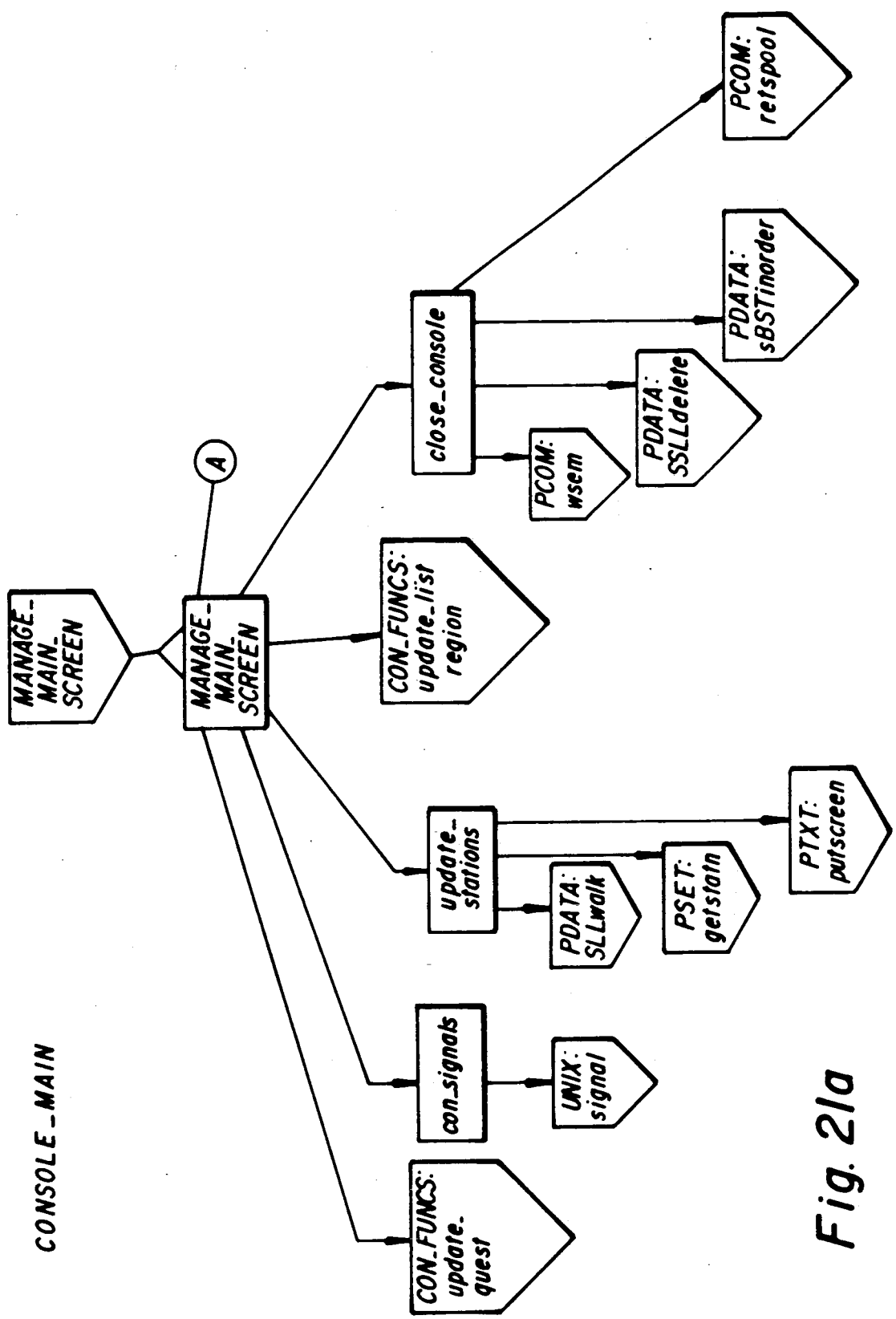
FIGS. 21a, and 21b Console Process: structure chart.
Figure 21B:
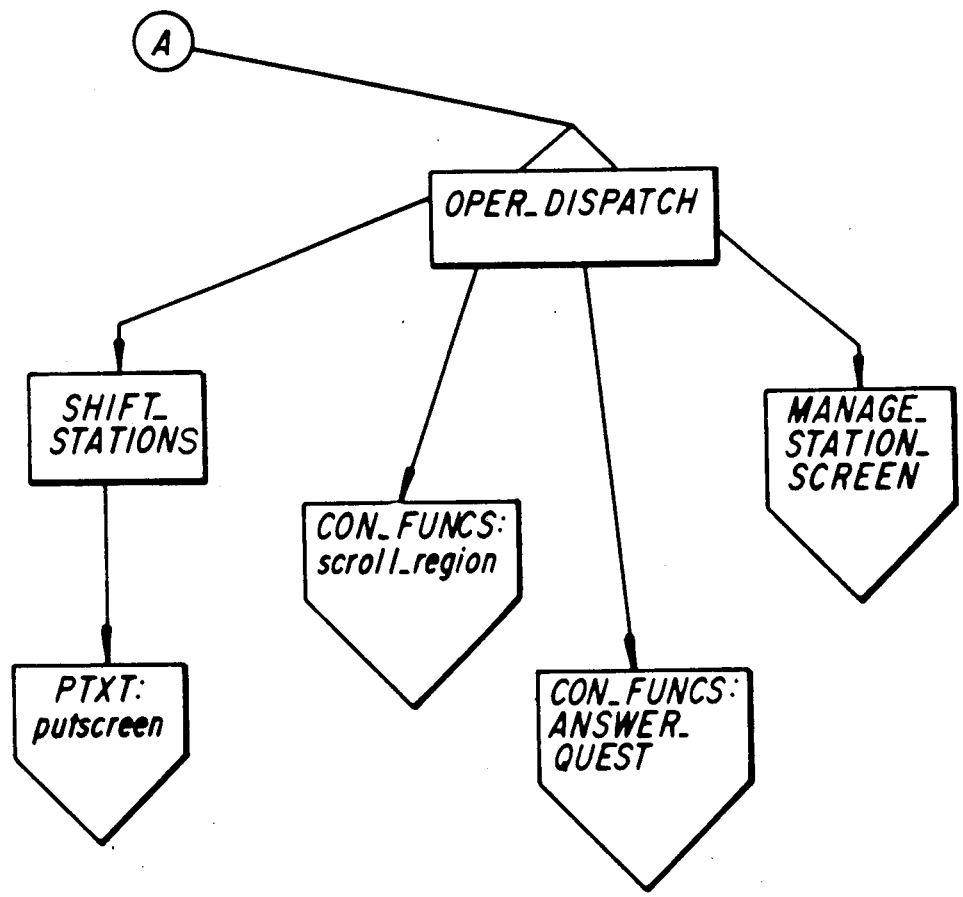
Figure 22:
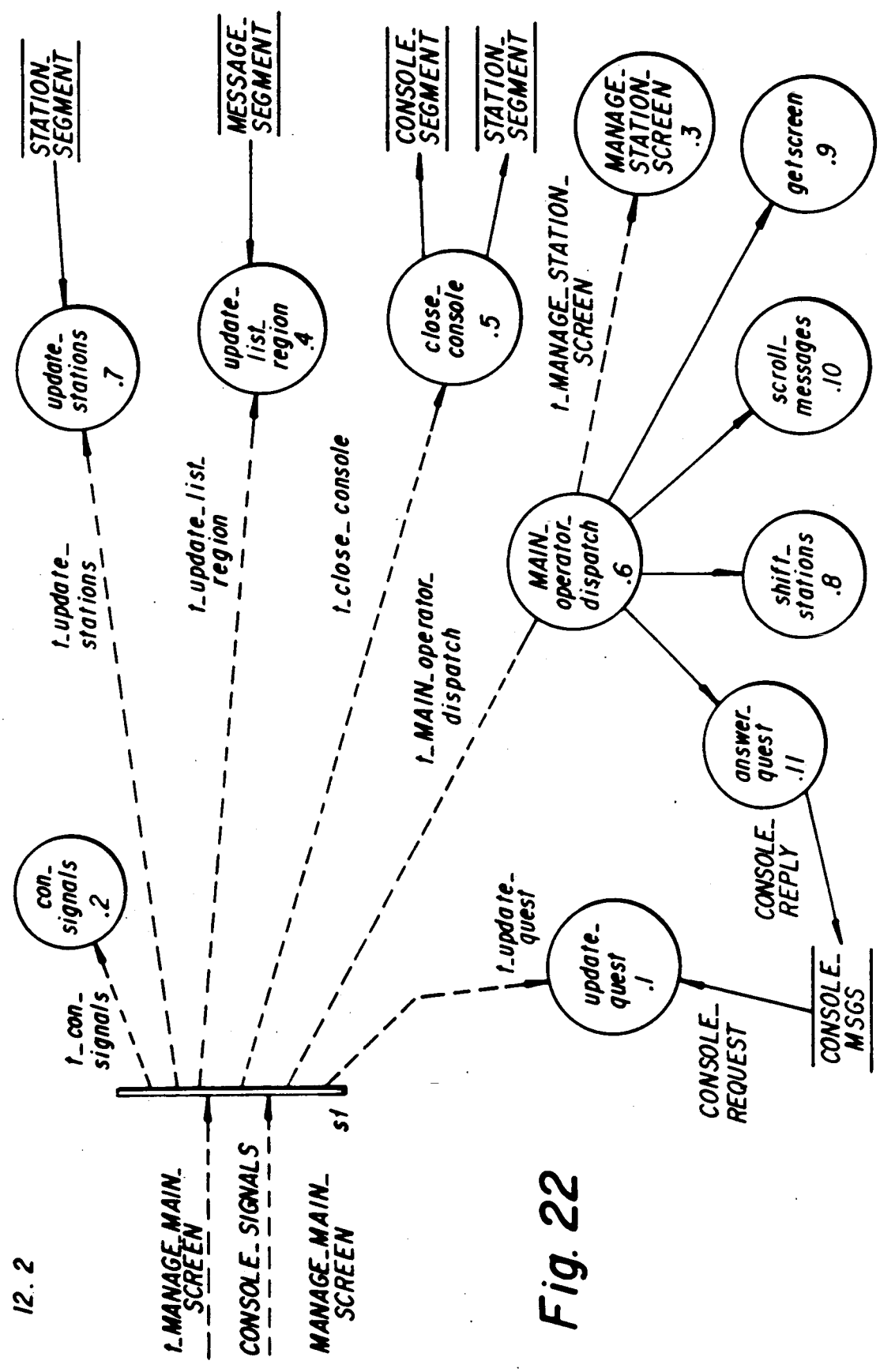
FIG. 22 Console Process: data flow diagram.
Figure 23A:
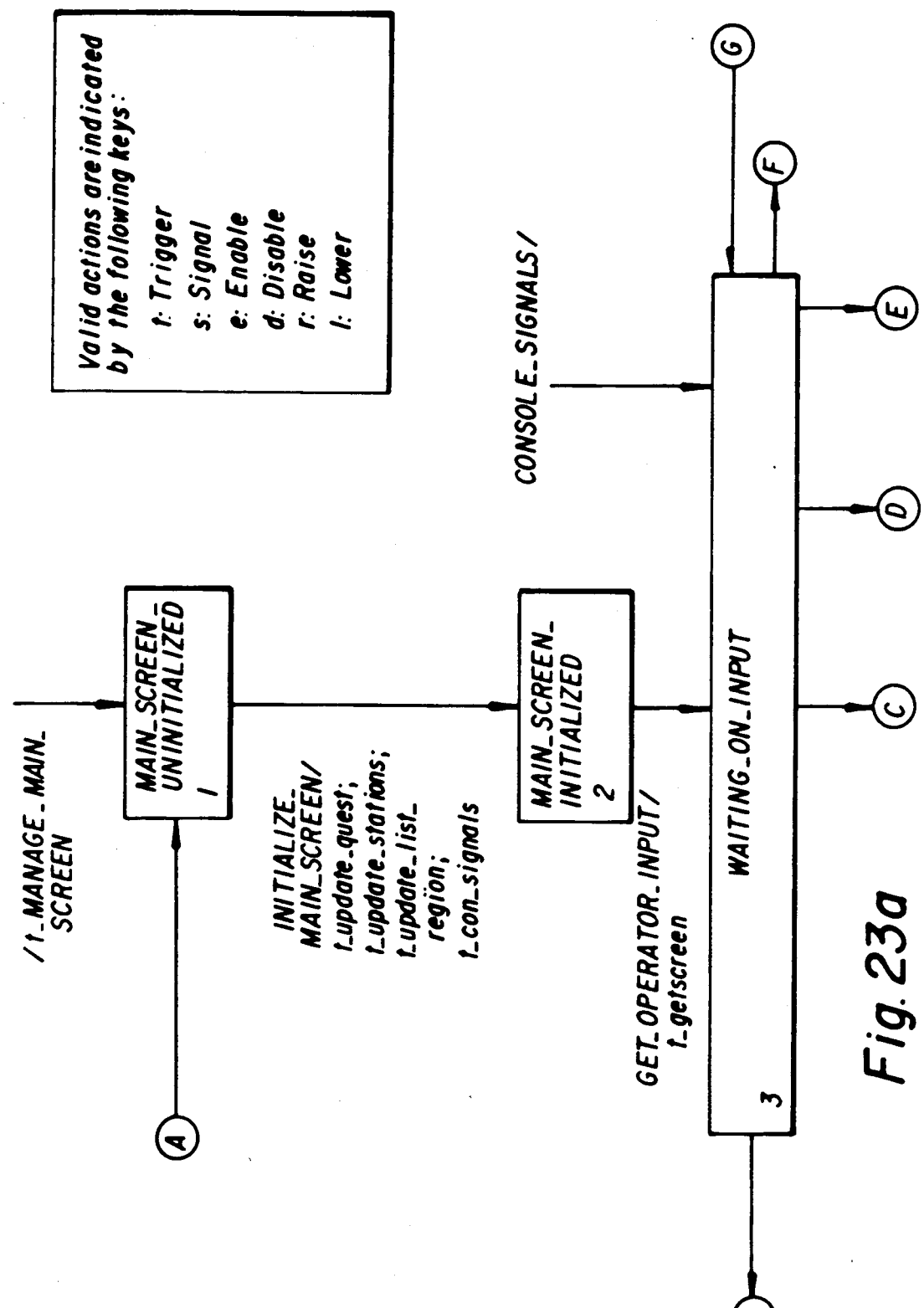
Figure 23B:
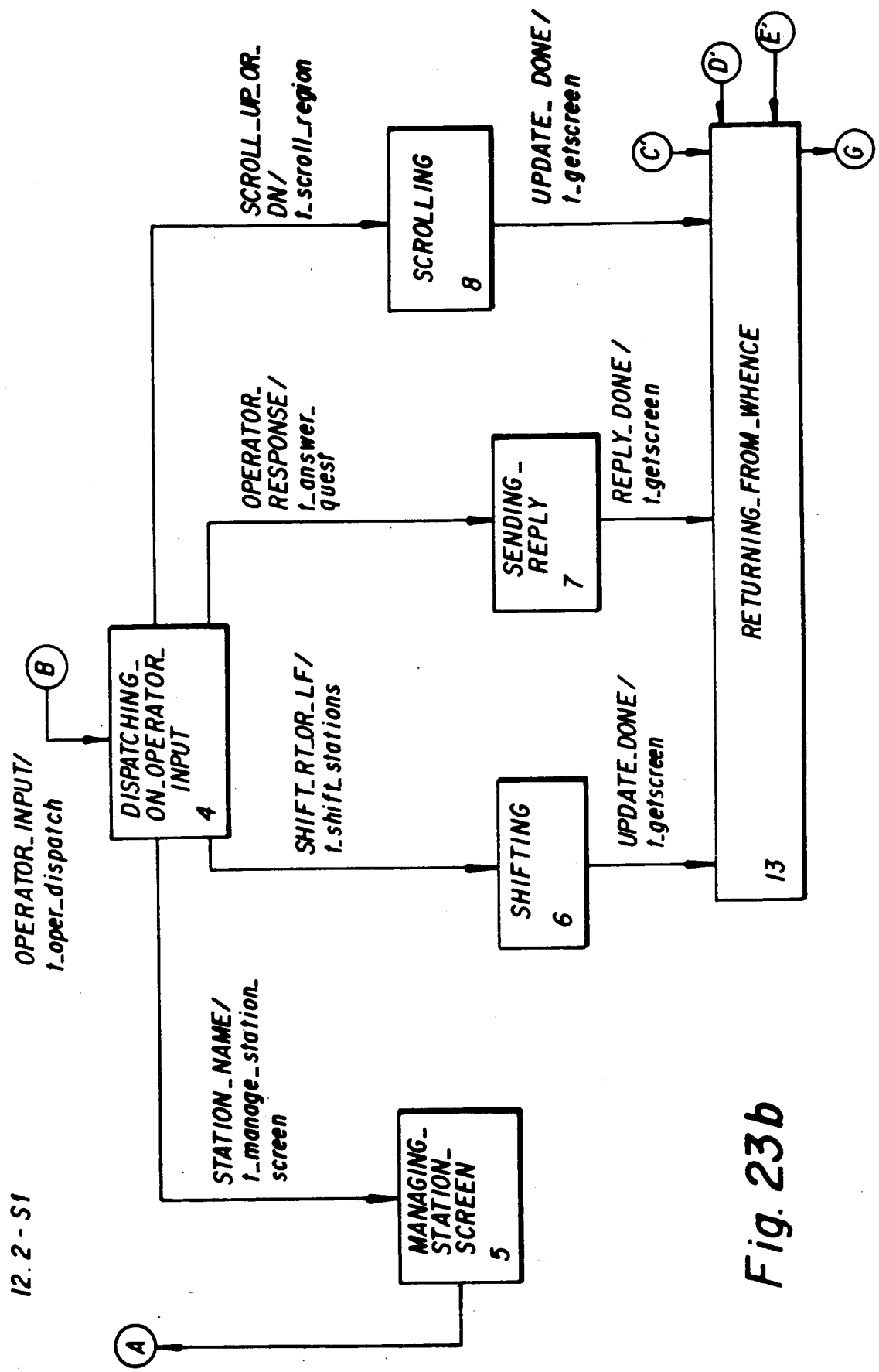
Figure 24:
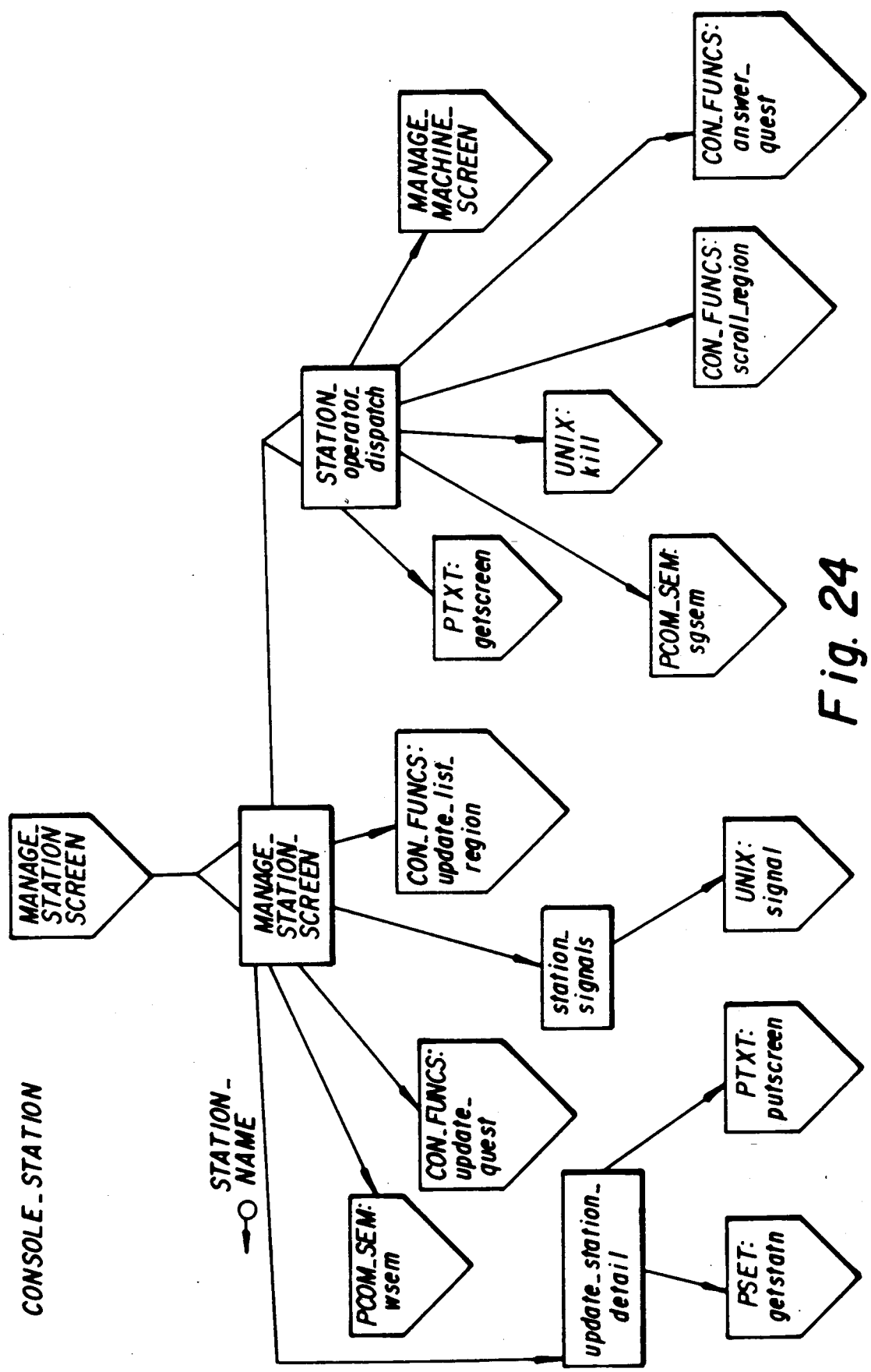
FIG. 24 Console Process: structure chart.
Figure 25:
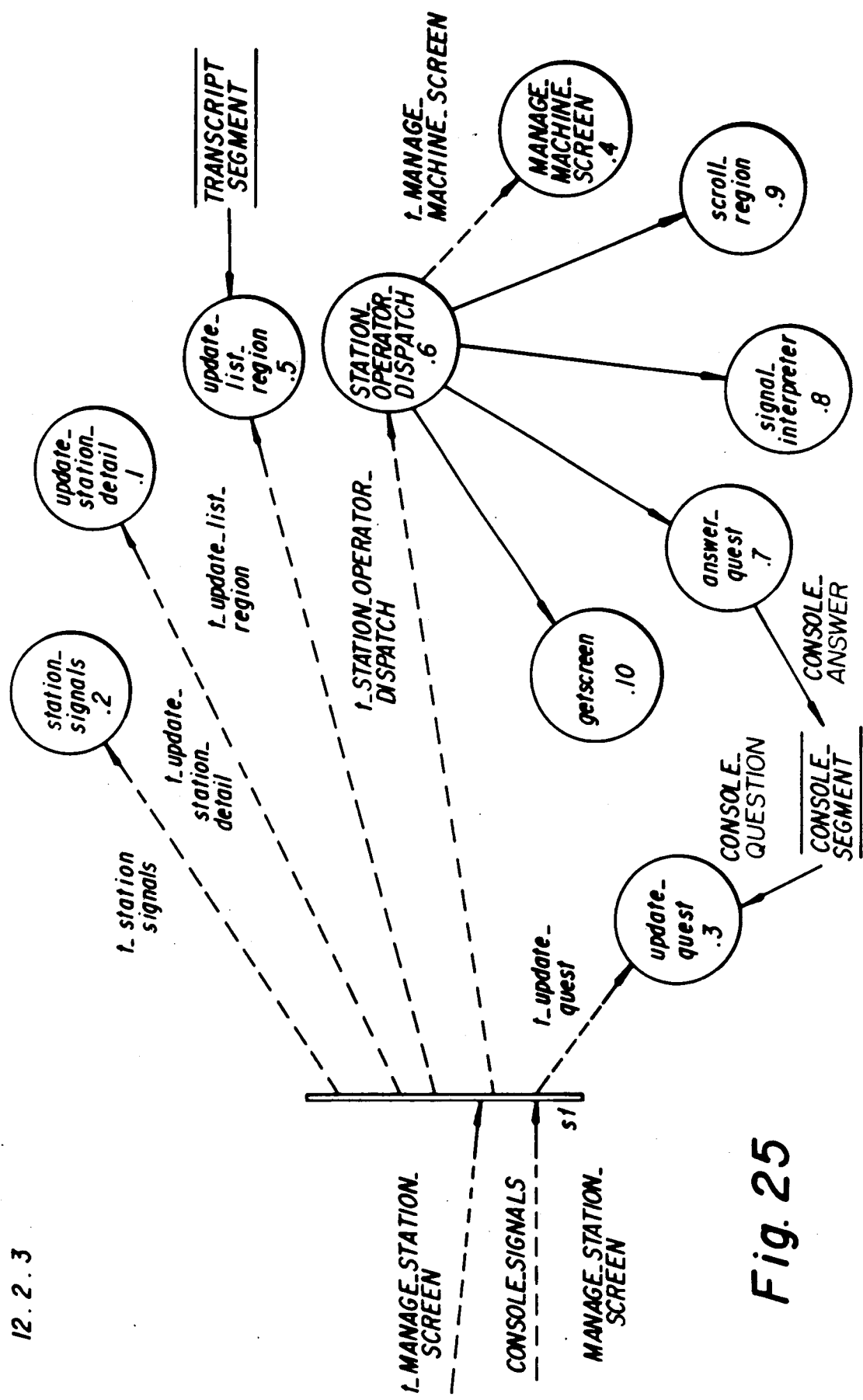
FIG. 25 Console Process: data flow diagram.
Figure 26A:
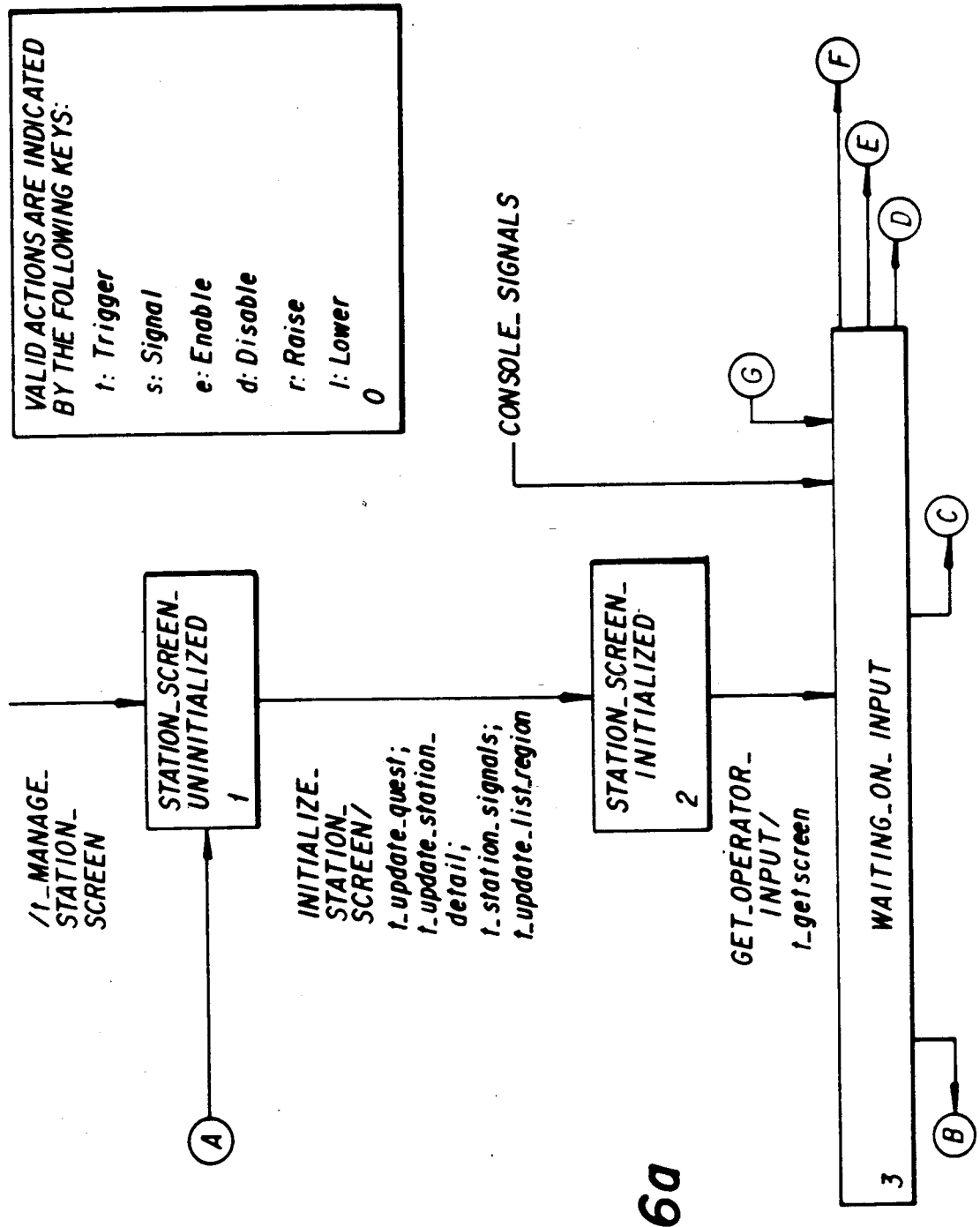
FIGS. 26a, 26b, and 26c Console Process: state transition diagram.
Figure 26B:
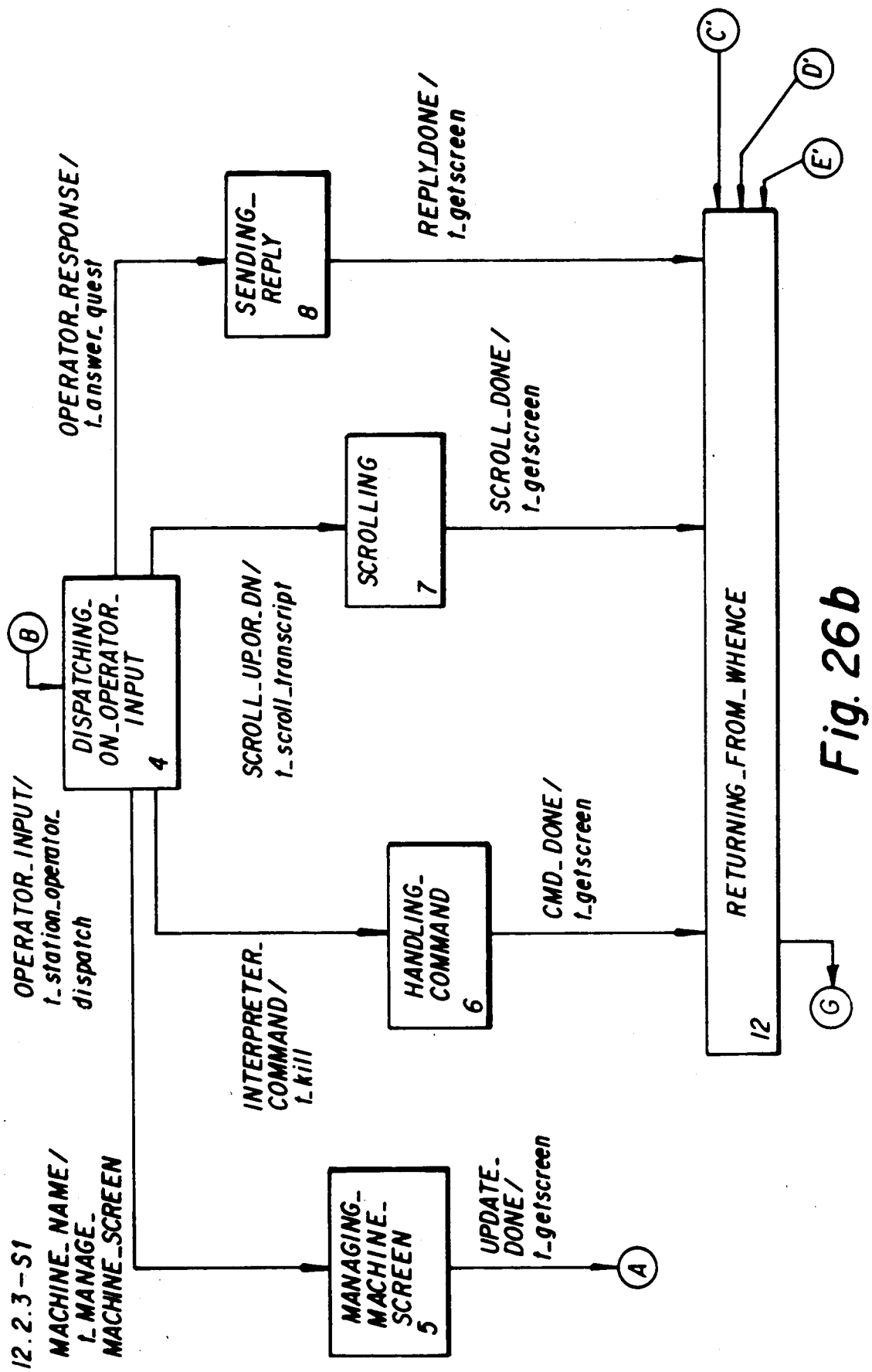
Figure 26C:
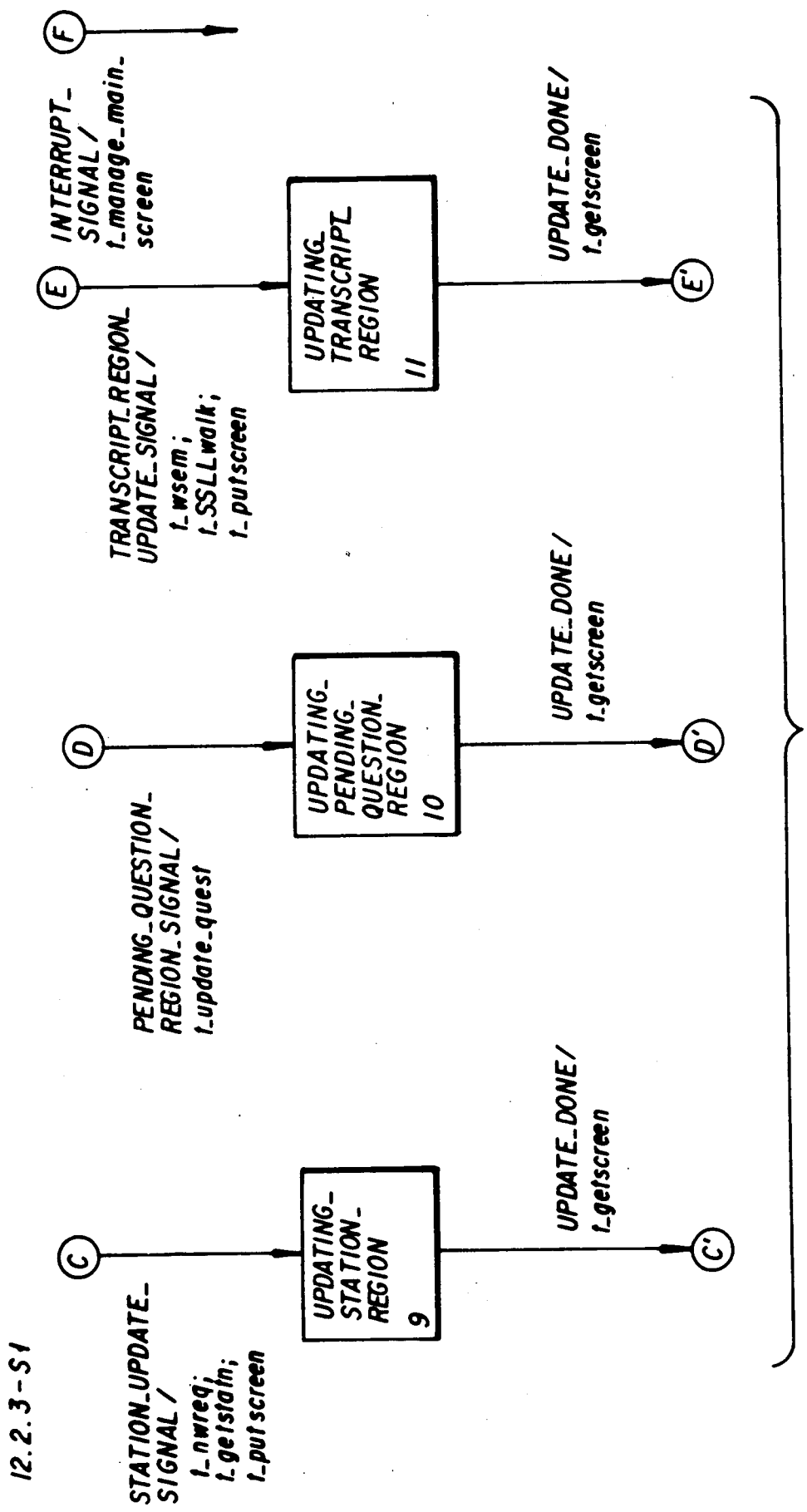
Figure 27:
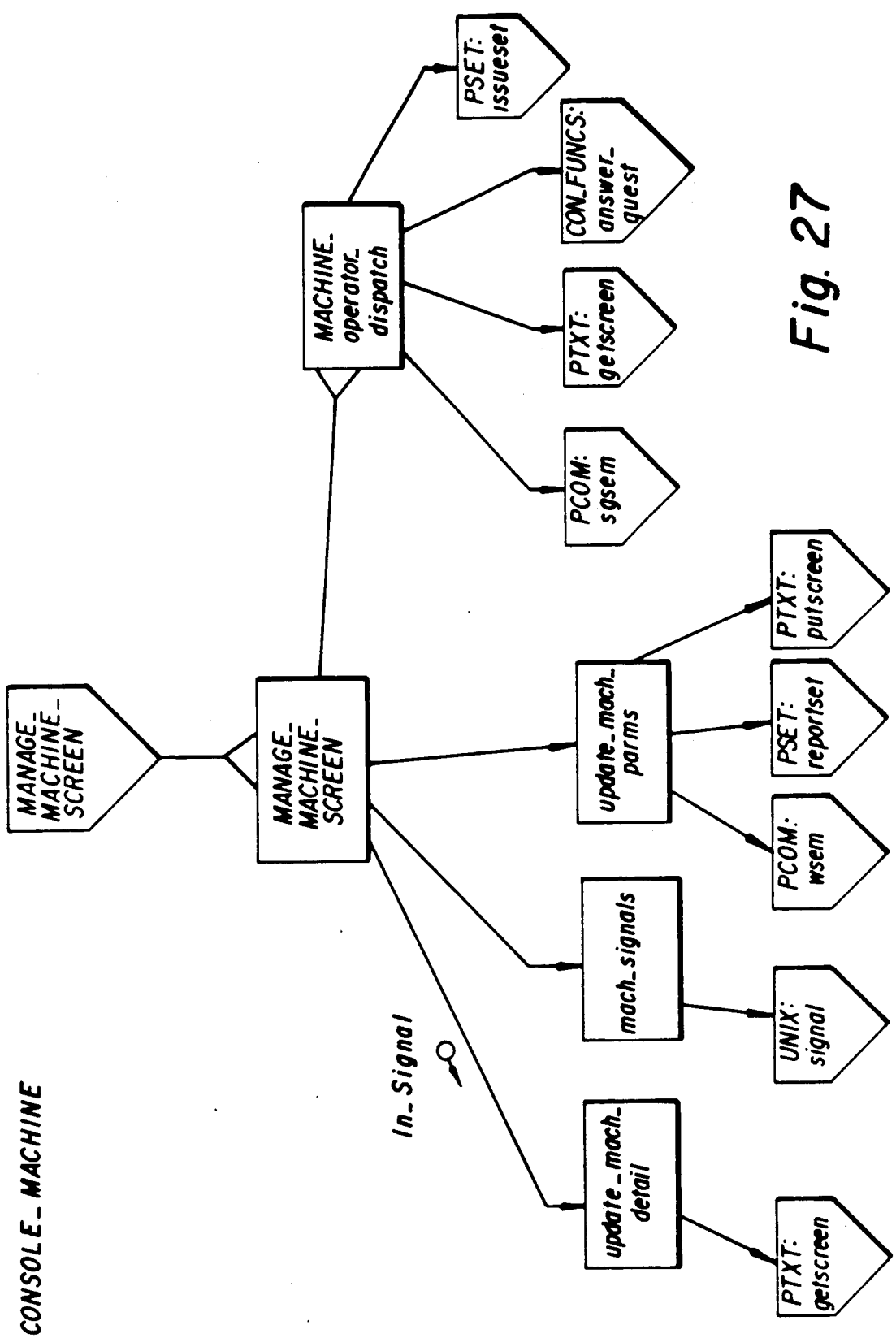
FIG. 27 Console Process: structure chart.
Figure 28:
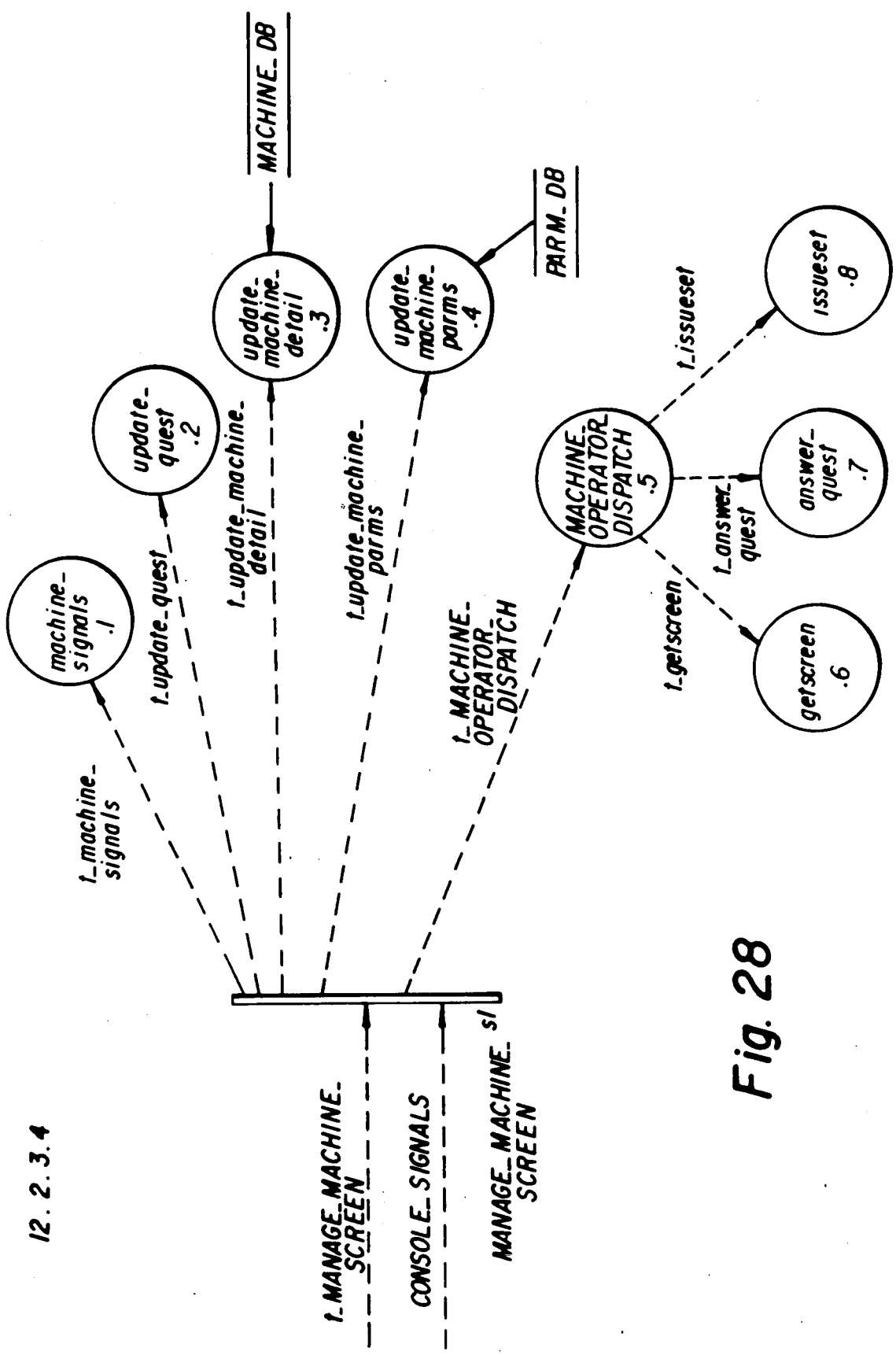
FIG. 28 Console Process: data flow diagram.
Figure 29A:
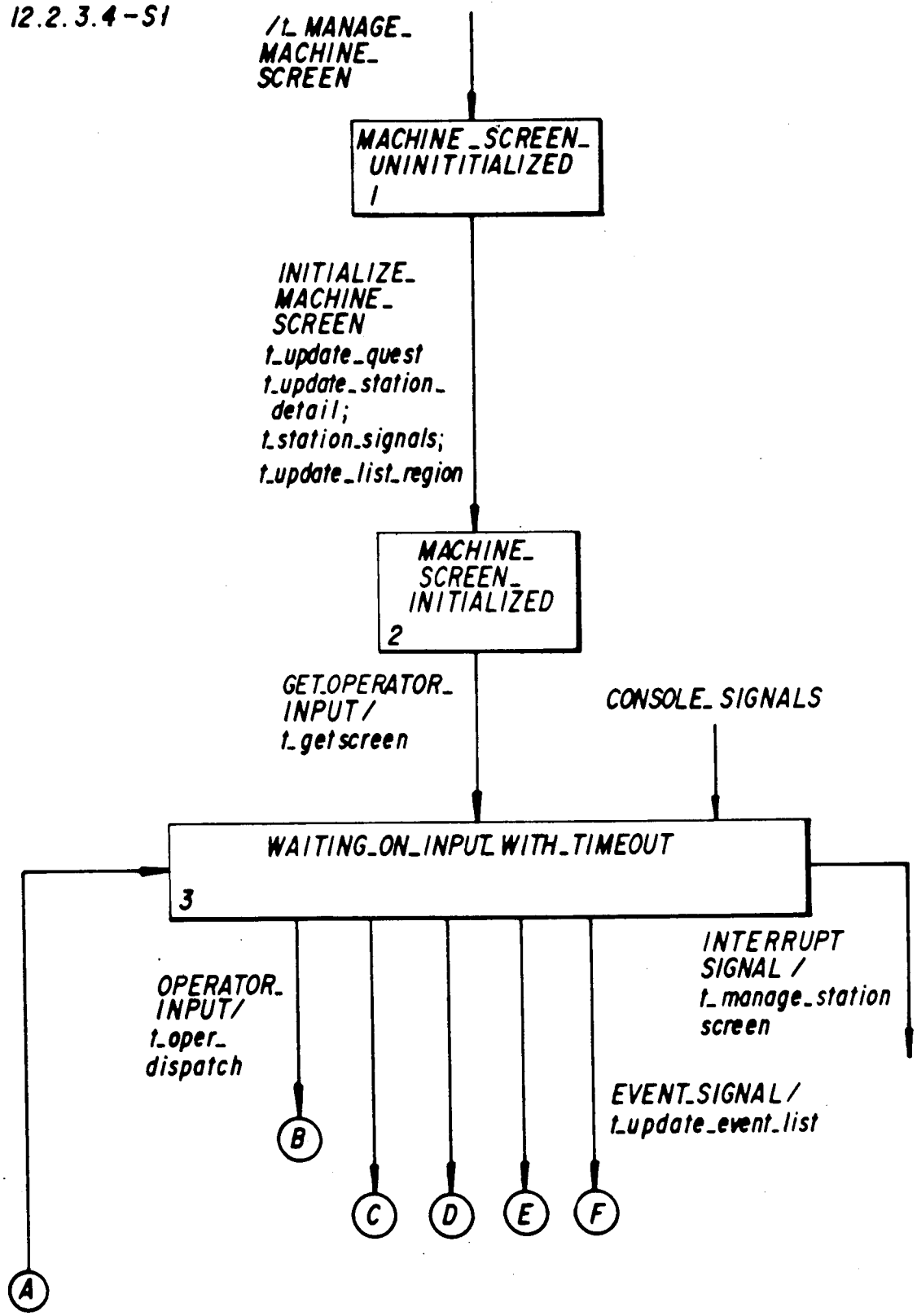
Figure 29C:
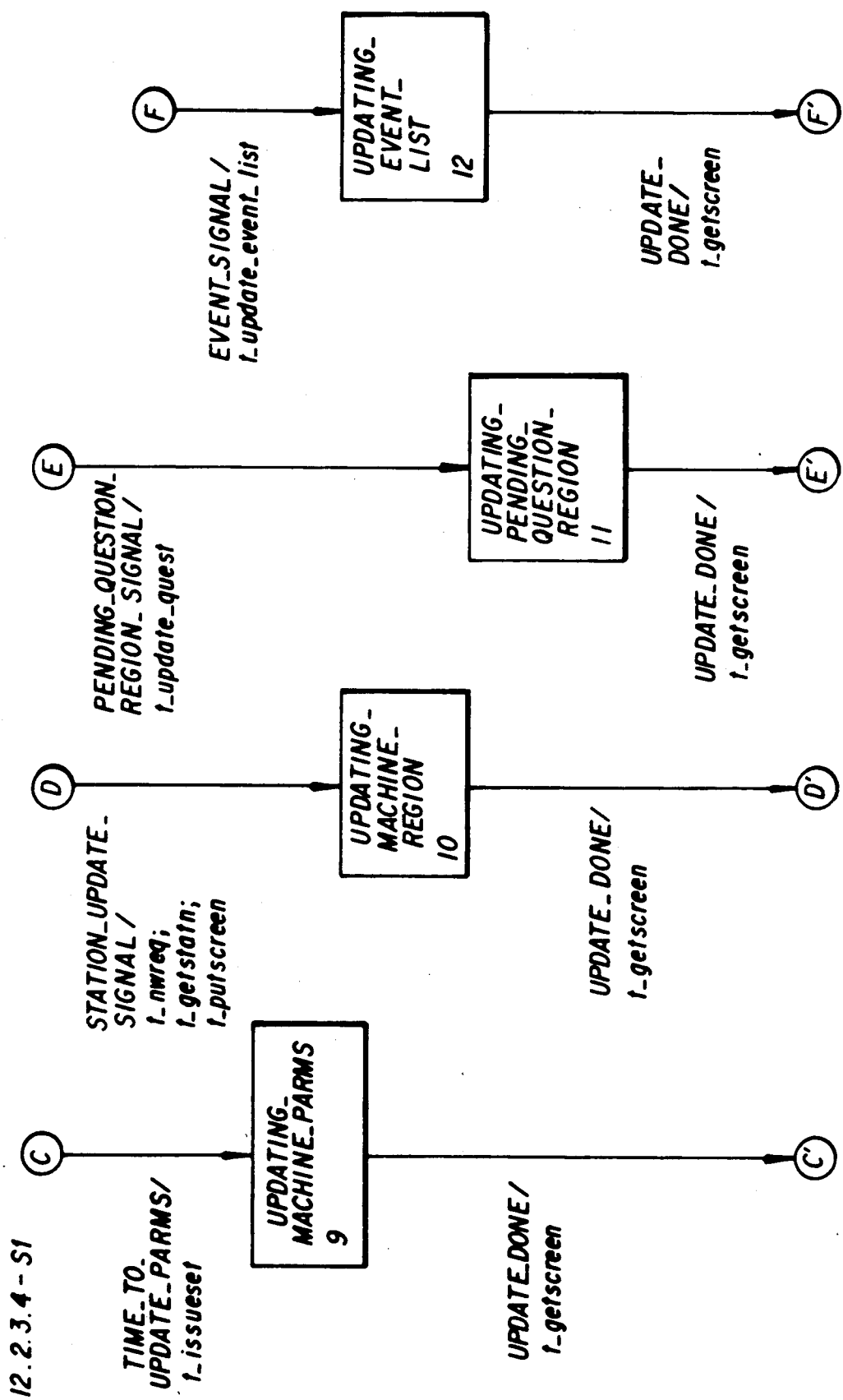
Figure 30:
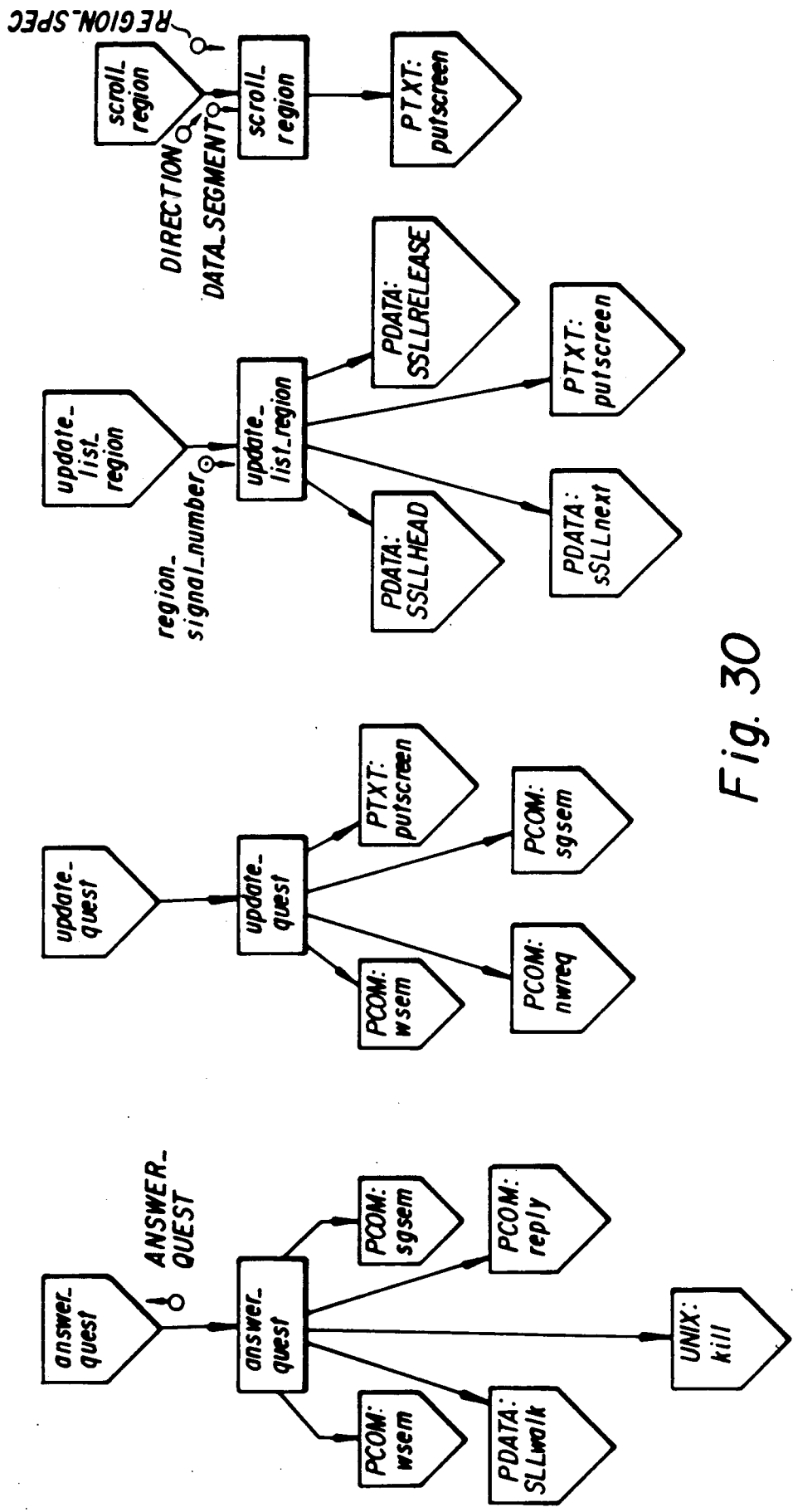
FIG. 30 Console Process: structure chart.
Figure 31:
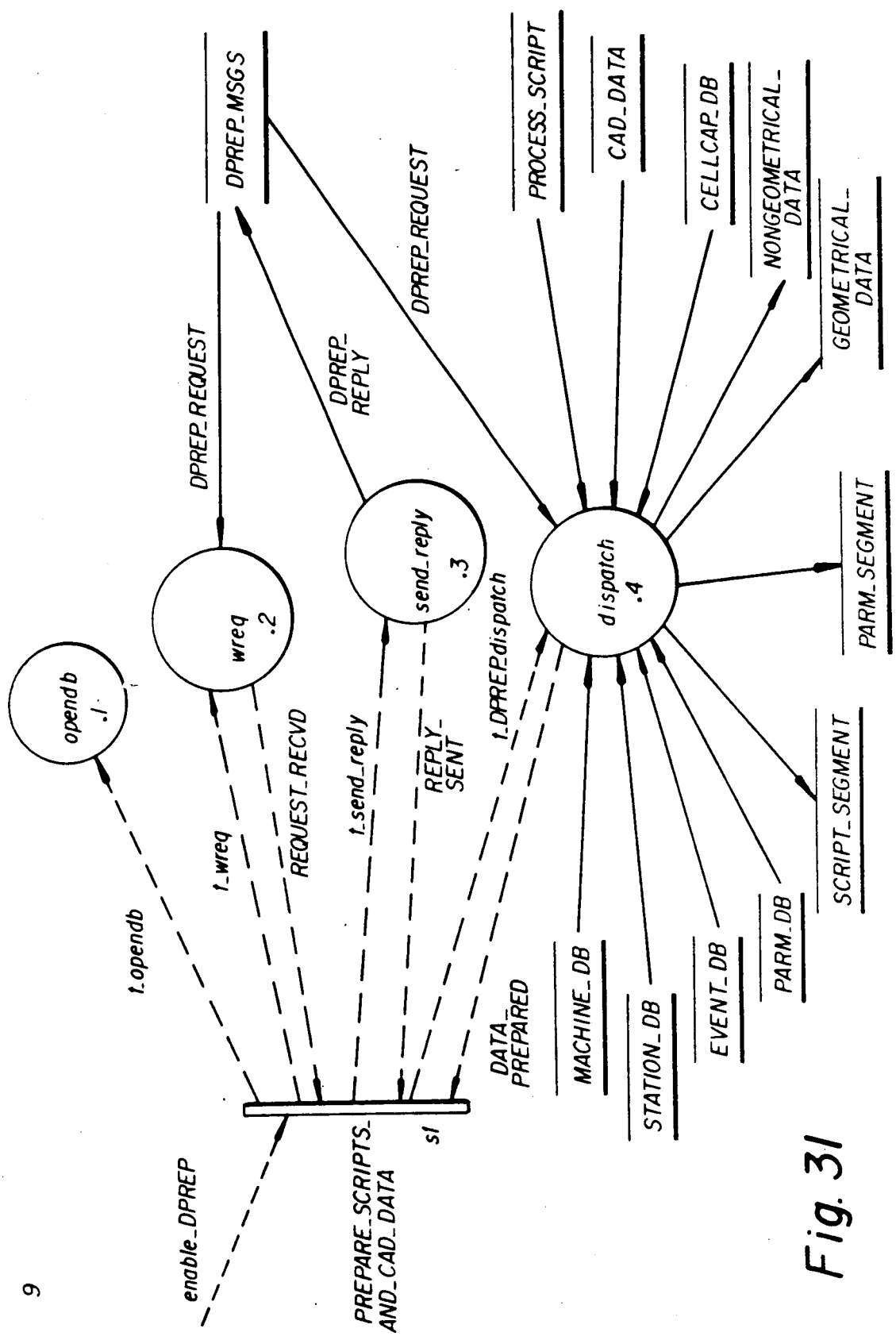
FIG. 31 Data Preparation Process: data flow diagram.
Figure 32:
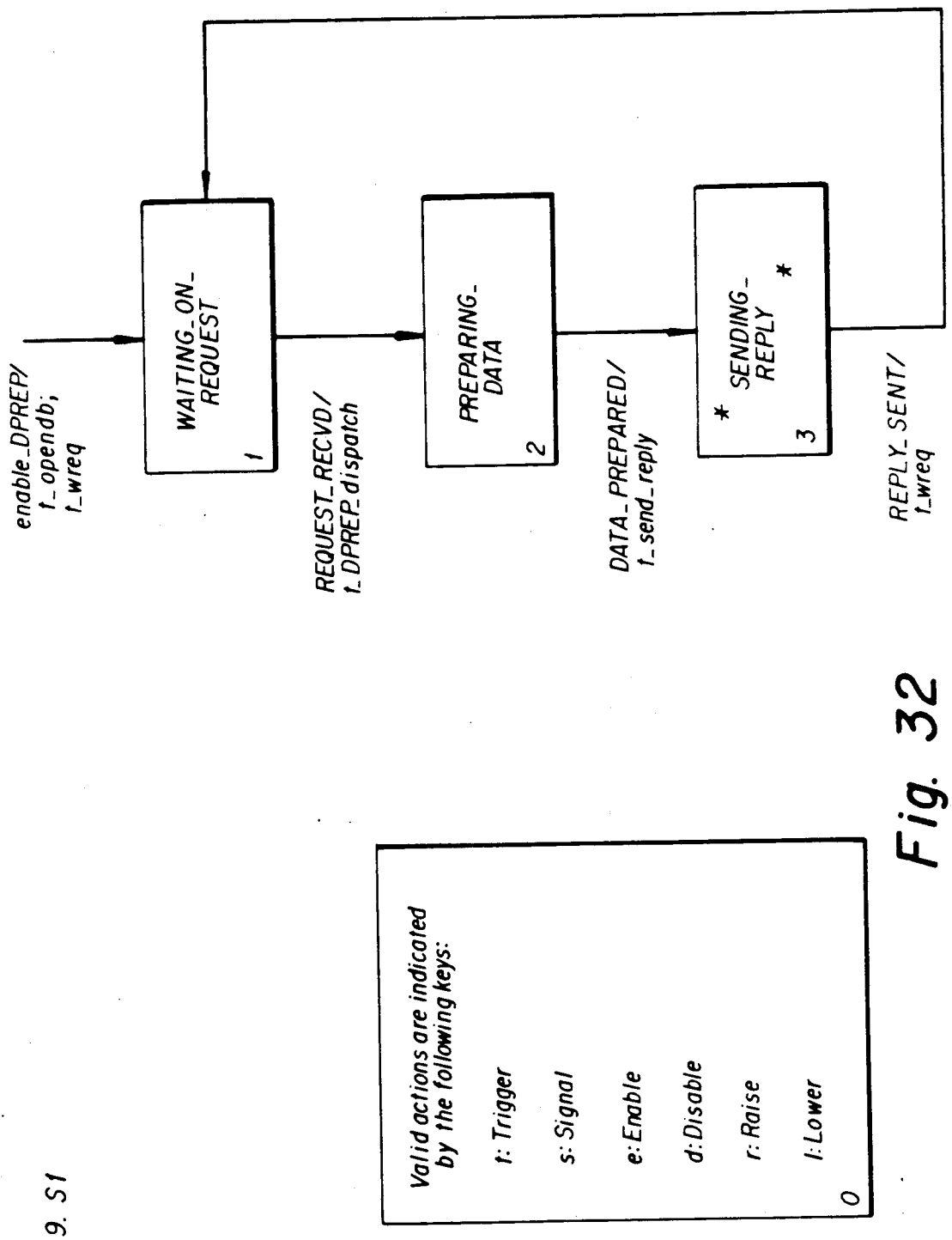
FIG. 32 Data Preparation Process: state transition diagram.
Figure 33:
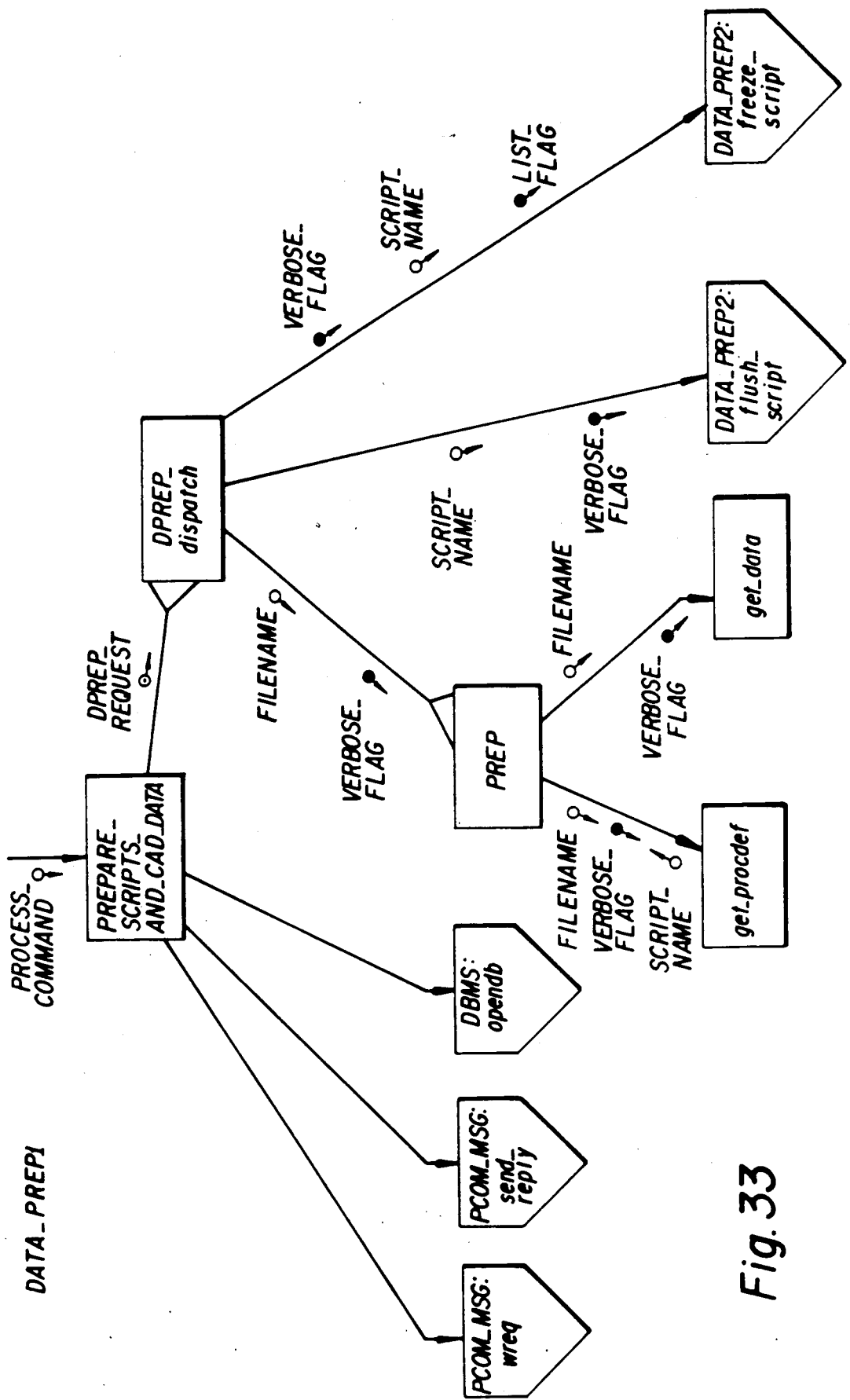
FIG. 33 Data Preparation Process: structure chart.
Figure 34:
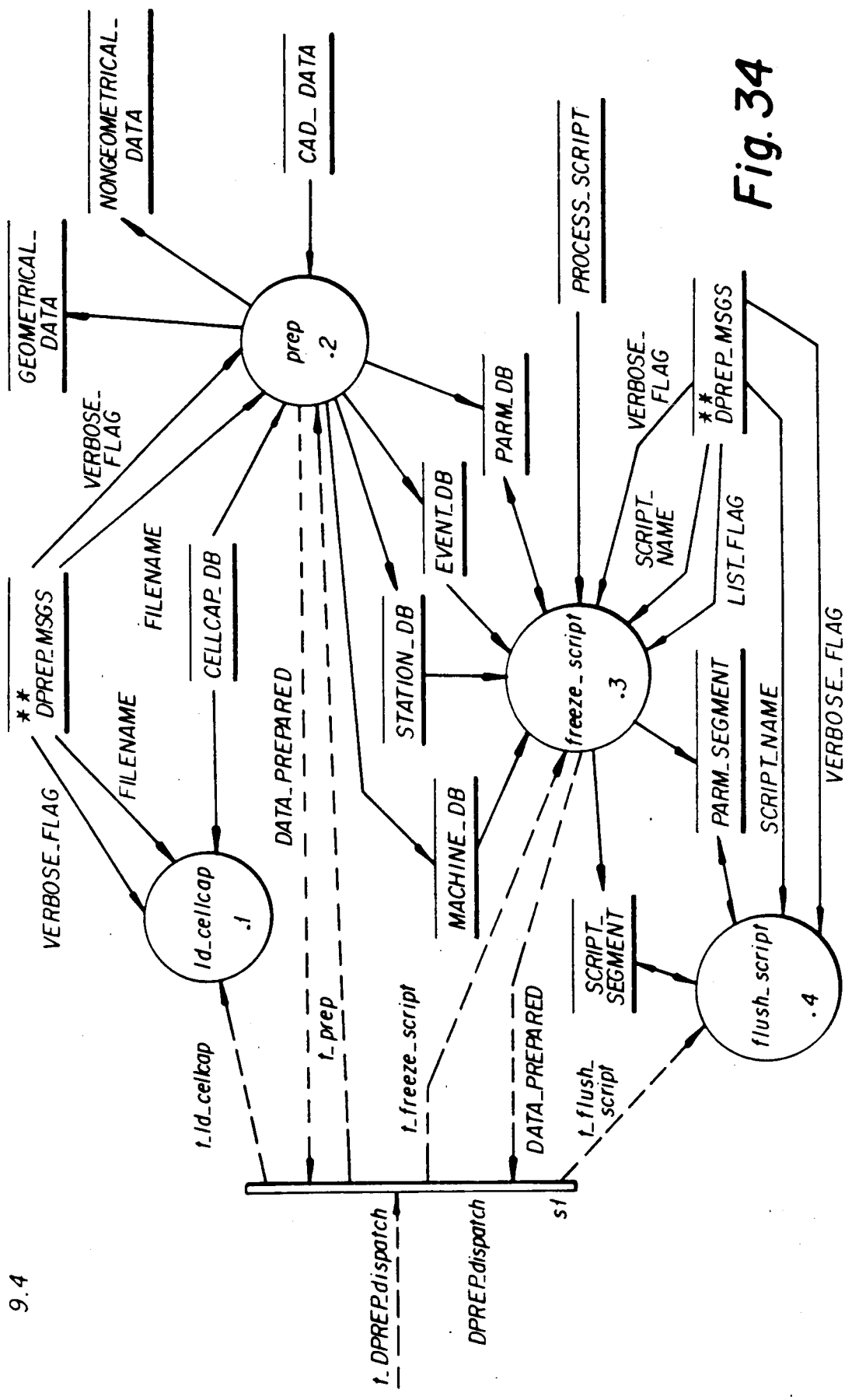
FIG. 34 Data Preparation Process: data flow diagram.
Figure 35:
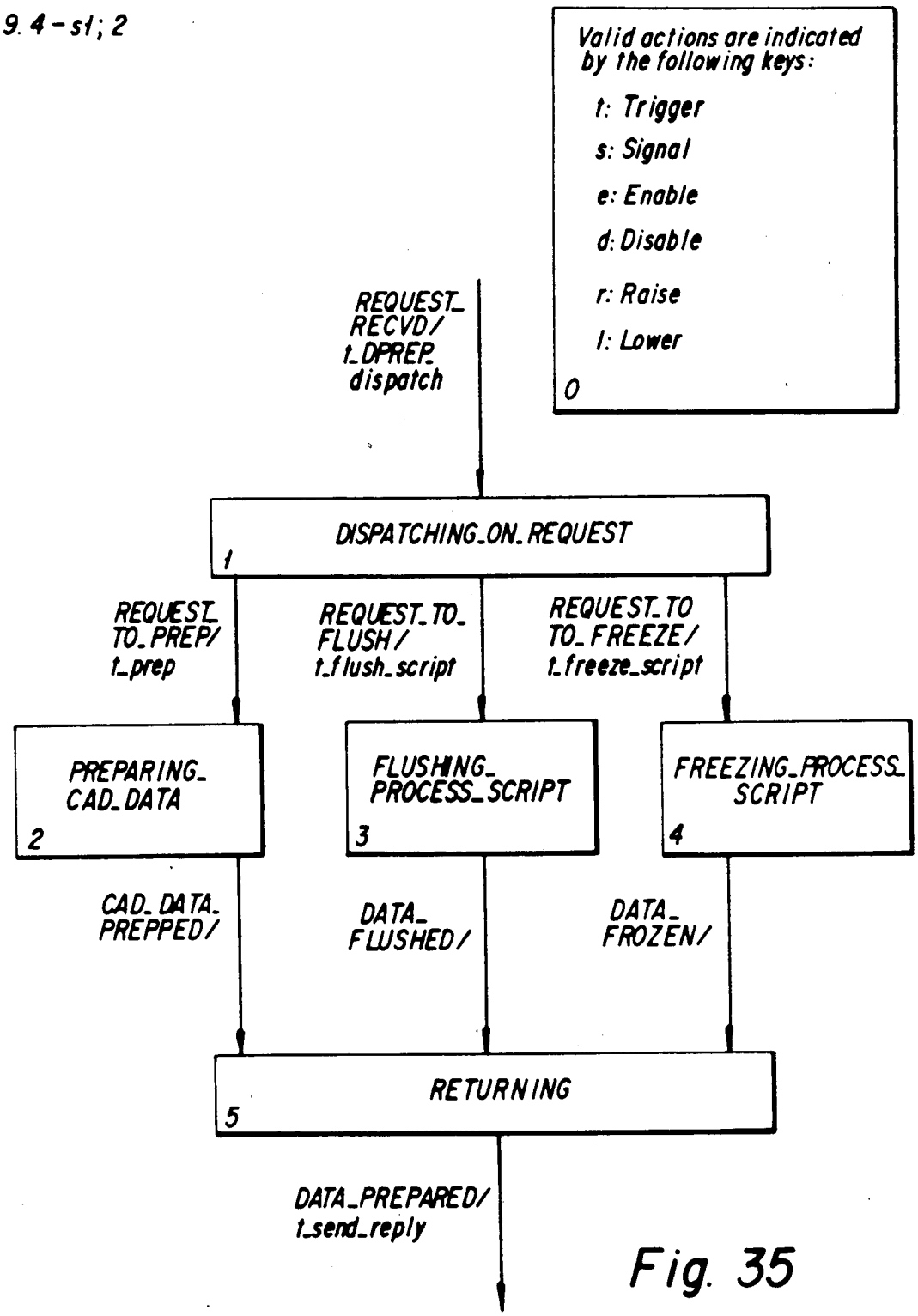
FIG. 35 Data Preparation Process: state transition diagram.
Figure 36:
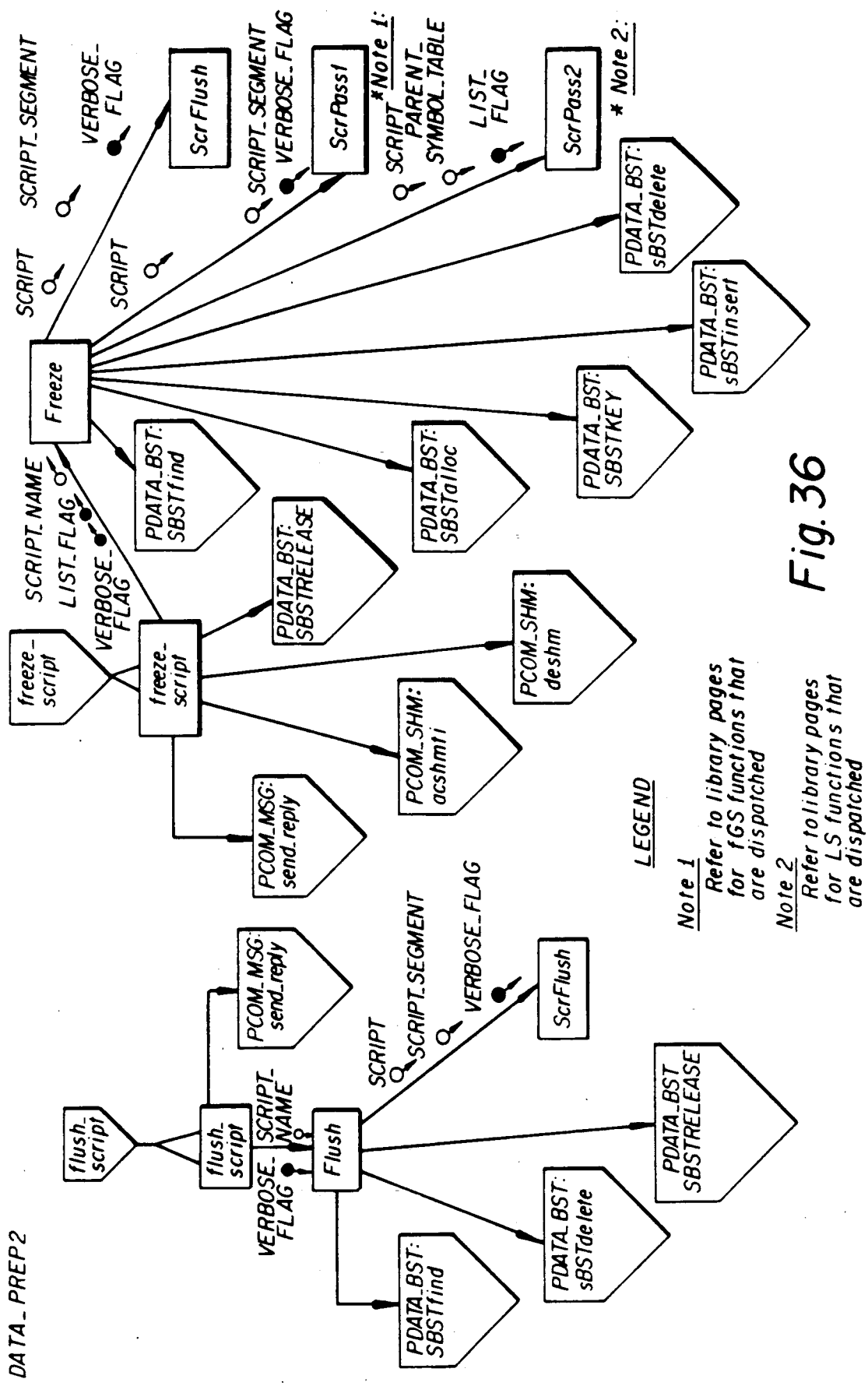
FIG. 36 Data Preparation Process: structure chart.
Figure 37:
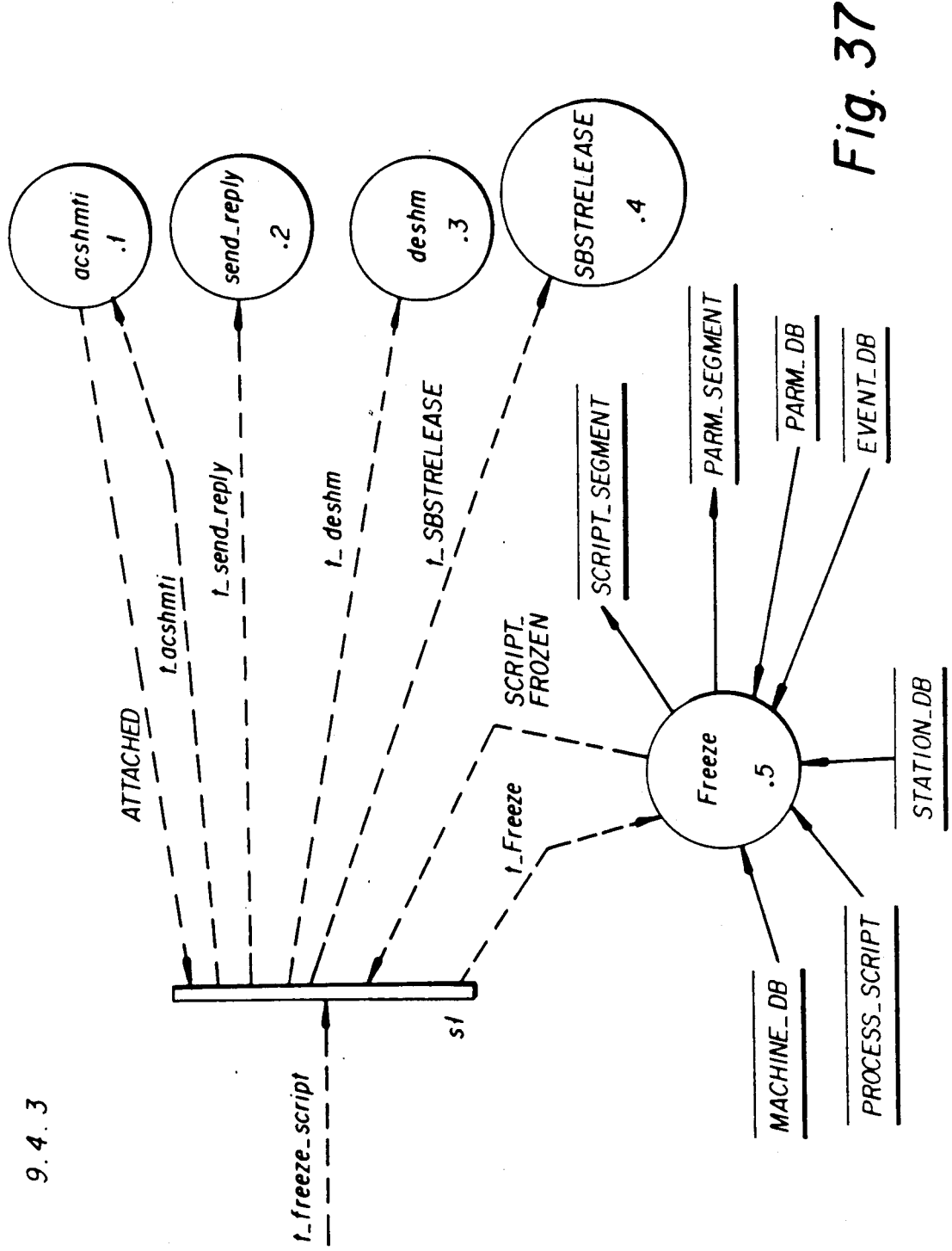
FIG. 37 Data Preparation Process: data flow diagram.
Figure 38:
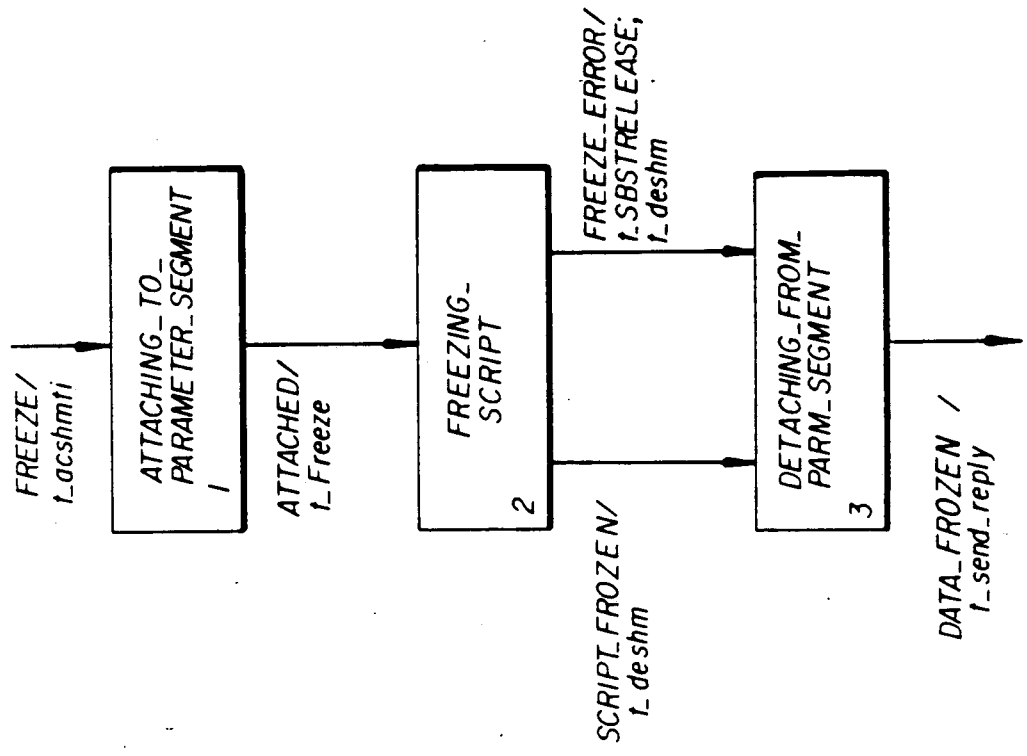
FIG. 38 Data Preparation Process: state transition diagram.
Figure 39:
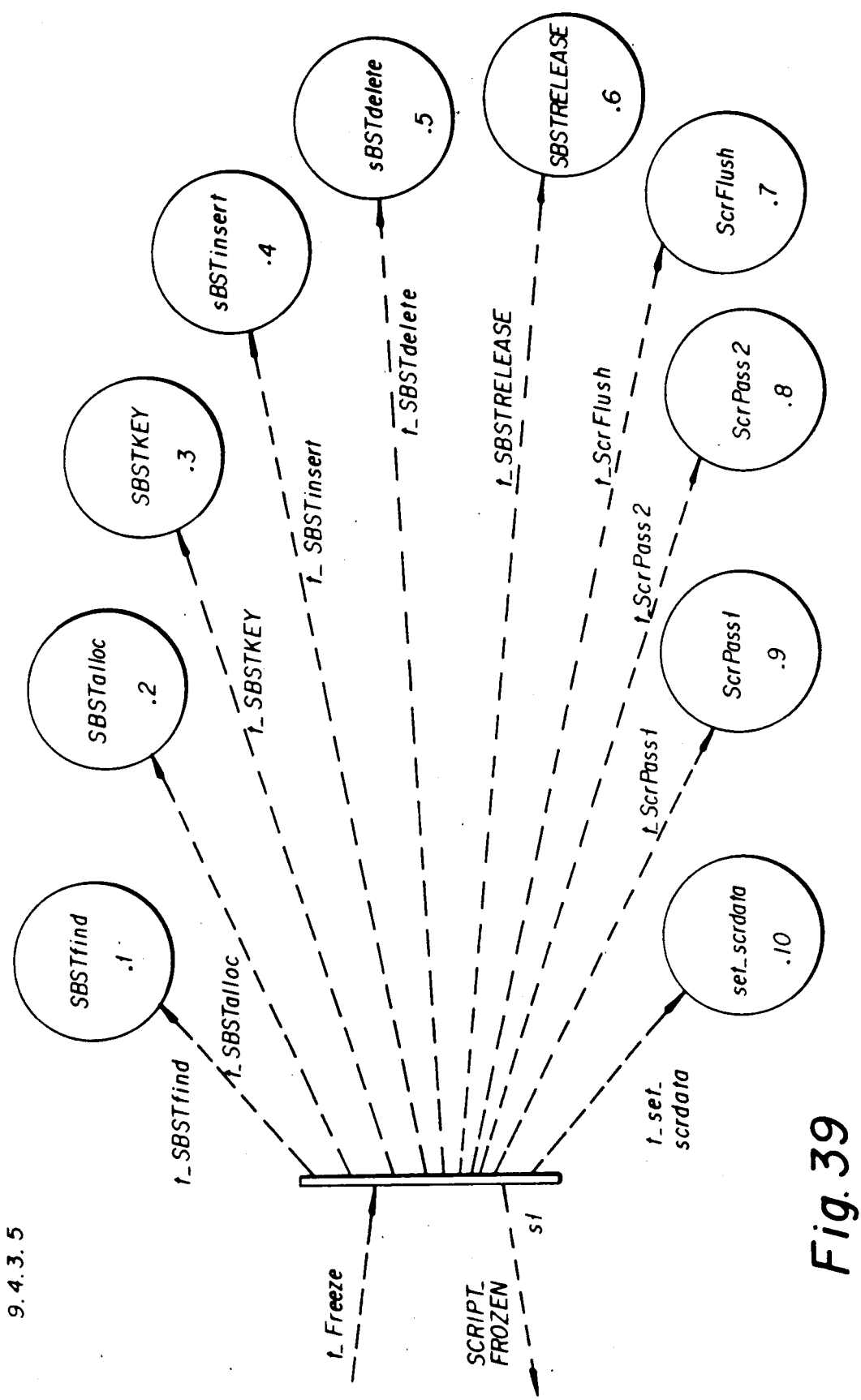
FIG. 39 Data Preparation Process: data flow diagram.
Figure 40:
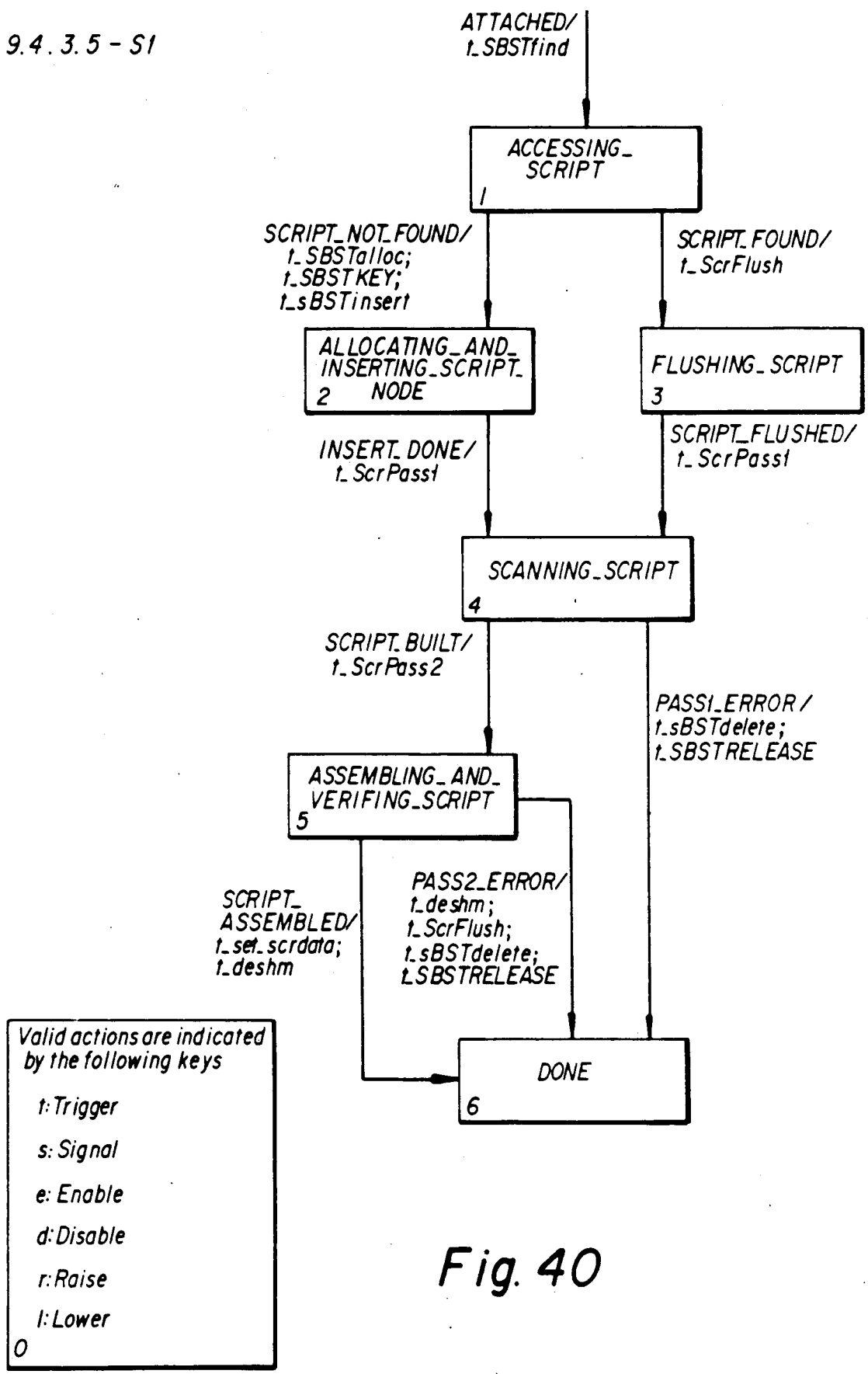
FIG. 40 Data Preparation Process: state transition diagram.
Figure 41:
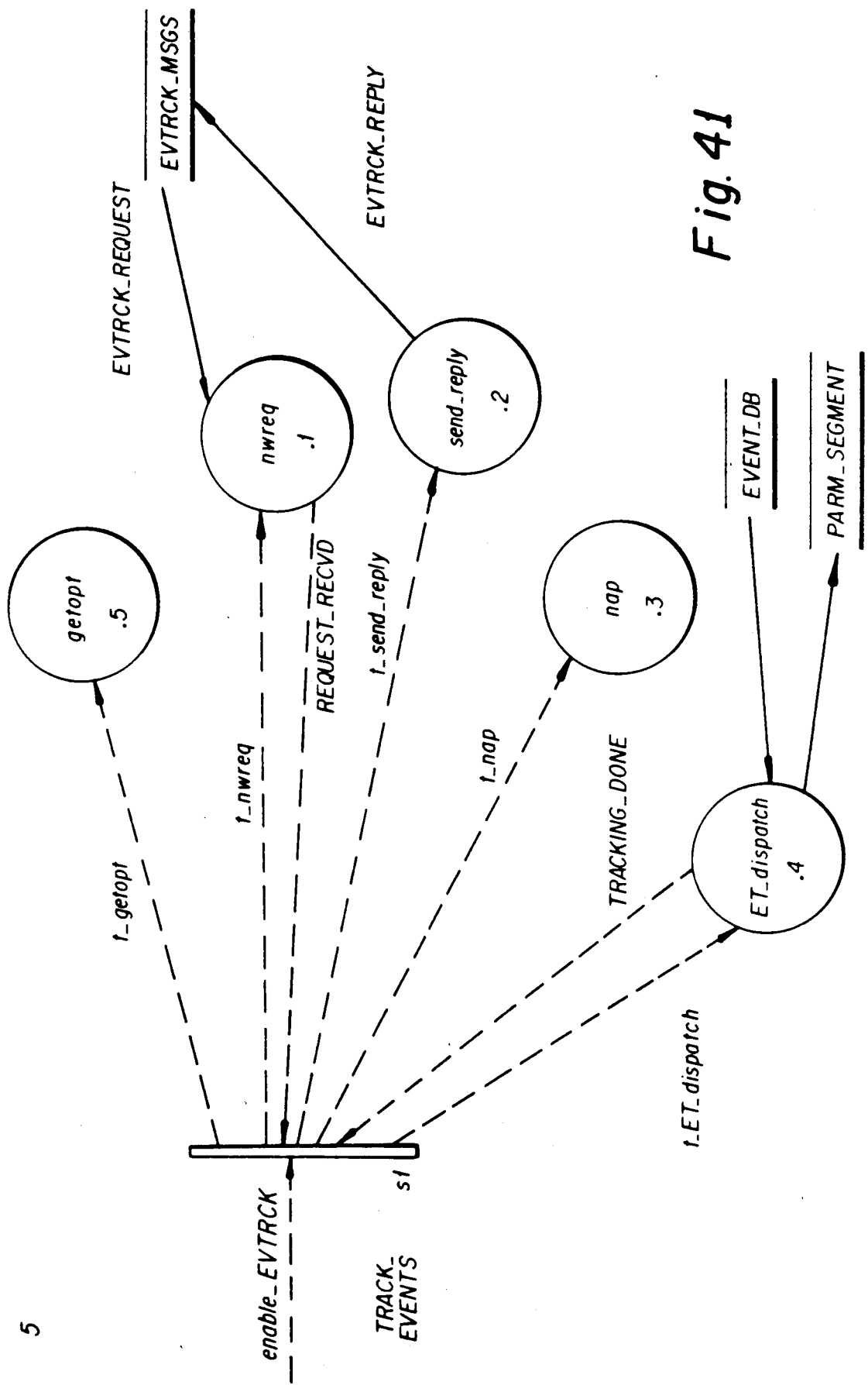
FIG. 41 Event Tracker Process: data flow diagram.
Figure 42:
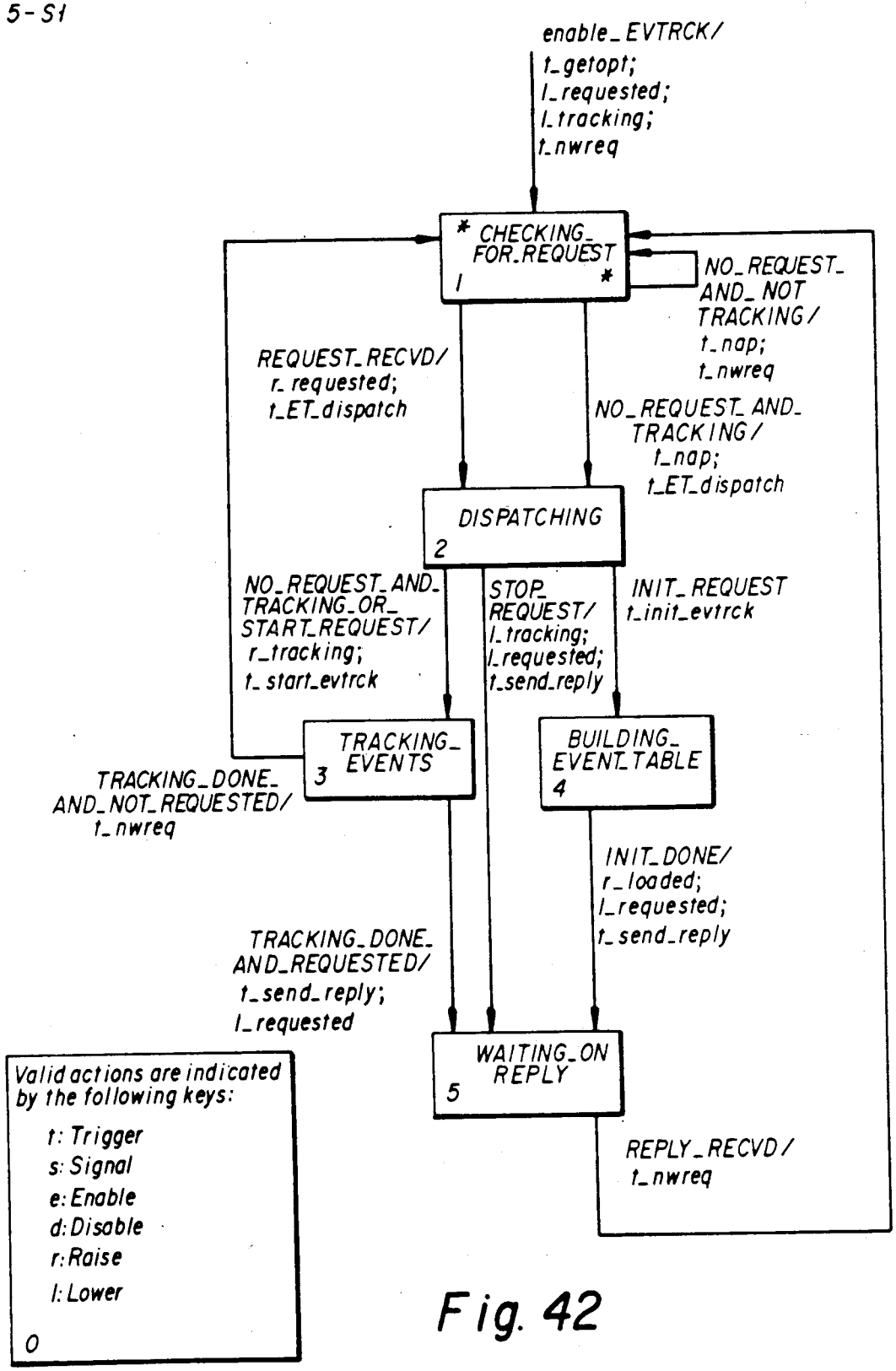
FIG. 42 Event Tracker Process: state transition diagram.

Ad-Hoc programs exist for operations that are otherwise executed within the context of process scripts. An Ad-Hoc is executed immediately, on invocation, typically by a user for display of process information, diagnosis of problems or debug of new applications. A typical Ad-Hoc program (FIGS. 13-15) is presented. Ad-Hoc programs are written to achieve maximal reuse of code, in that each is comprised of SCROP library functions also used by the Data Preparation (fGS, LS) and Lot Control (IS) programs.

Each Ad-Hoc executes the following steps:
1) If command-line arguments were provided, validate them; otherwise invoke the appropriate data entry screen to capture data required.
2) Invoke the appropriate fGS (get step) function to acquire the operations arguments.
3) Invoke the appropriate LS (link step) function to build necessary structure and perform verification.
4) Invoke the appropriate IS (interpret step) function to execute said operation.

6.2: Console

Console processes, (ref. FIGS. 16-30), provide a multiscreen interface which permits the operator to view detailed information regarding the workcell's operation and provides the means for the operator to interact with the workcell's operation during the processing of one or more jobs or lots. Each console represents a "view" into the system tailored to meet the specific requirements set forth for that console.

Operator interaction occurs at three distinct levels within the console process:
1) Console level
2) Station level
3) Machine level When the "open a console" option is selected, the operator will be prompted for the desired console name. (Each console is defined by giving it a name and a set of the workcell's stations that have been configured for a particular console.) A screen is provided that displays screen regions that include an interactive area used by the operator, a summary section for each of the stations, and a scrolling prompt region that displays application messages.

The operator may enter a station name to produce a new screen display. The screen provided displays an interactive area used by the operator, a list of machines associated with this particular station, and a transcript of the script steps executing at the station.

The machine level screen is a fully interactive screen summarizing the activities of the machine. Values are updated to the screen for all the parameters associated with the particular machine on an interval basis. These parameter values may also be updated, as appropriate, through operator intervention using the facilities of the screen.

We now proceed to describe the permanently resident processes.

6.3: Data Preparation

Referring to FIGS. 12d and 31-40, the Data Preparation Process is generally responsible for acquiring various types of configuration and procedural data, verifying it, and freezing it into internal representations used by other processes efficiently. Two primary responsibilities of this process are:

6.3.1: Process Script Assembly and Verification

Assembly and verification of scripts is done with the function "Freeze", which exists for that purpose. Freeze locks the assembled script in a shared segment, thereby being available to any process which may require it. Scripts may be removed from the shared segment with the function "Flush" which unlocks the specified scripts(s) and flushes them. Busy scripts (scripts in execution) may not be flushed until they have completed.

Note that it is generally desired that scripts be assembled, verified, and frozen in this fashion before they are executed; and that thereafter they may be executed any number of times between products. This is useful for efficiency and because it offers the ability to pre-verify. An exception is that, if the Ad-Hoc "interpret" program is used, no assembly is required (it is bundled within that program).

The Freeze function (FIGS. 33-39) first attempts to find the script to be frozen within the script segment, to ascertain if this is a modified script or if it is new. If it is found, the old image of the script is flushed before assembly is undertaken; otherwise, the script is established.

A brief description of the assembly/verification process is given here:

The first pass obtains script steps from the text files, recursing where necessary, and leaves established step lists for the second pass;

The second pass: accesses the data base for extraction of configuration data; resolves references to abstract quantities; verifies block structure and data integrity; and performs assemble-time symbol substitution.

The function leaves a shared image of the script for interpreter processes' use, with parameter set structures in the parameter segment and the script headers and steplists in the script segment.

The Flush function (FIGS. 33-36, 39) first attempts to find the script to be flushed within the script segment. If it is found, the image of the script is flushed along with its associated parameter segment structures.

The flushing of a script (FIGS. 36, 39 and 40) is useful when it is being reassembled, or for any other reason it needs to be removed and its space in the segments regained.

The function ScrPass1 (FIGS. 36, 39 and 40) reads scripts, building a dynamically allocated list of source steps. In doing so, it may be recursed by the function fGSinterpret to build the requisite steplists for scripts that are interpreted by the source script.

As the pass progresses, a table of labels is built for the script. Each script's label table is "local", in the sense that labels may be used from script to script without confusion, and more importantly, without risk of branching to somewhere unexpected at run-time.

The function ScrPass2 (FIGS. 36, 39 and 40) is used to freeze in assemble-time parameters and verify each step's operation. To do this, it uses a library of LS functions, of which there exists one per step type. They are used to: scan fields for symbols, perform assembly-time symbol substitution, generate a list output before and after substitution (if required), and verify the operation.

Part of the second pass functionality is to build and use a local symbol table. When performing symbol substitution, a value for the symbol is taken first from the local table; if the symbol has not yet been defined in the local table, a search through the parent script's symbol table is done. If still no value is found, an error is given and the second pass stops. Note that only values defined prior to the given usage are available. This is to be considered an advantage, in that defined parameters serve as an argument passing mechanism between scripts such that the same script may be interpreted on another script but with different arguments. Also, within a given script, symbols may take on different values in different parts of the script. Symbols may be defined by other symbols, although self definitions will cause the function to loop indefinitely. "Run-time" symbols are left unevaluated.

Labels are only allowed within the context of the step's script and, of course, may be for steps subsequent to the current step. This is implemented by building the label table as a function of the first, rather than the second, pass.

6.3.2: Post-Processing for Robotic Guidance

This request causes the process definition file specified to be read, and the CAD data files required for this particular product to be post-processed. It will verify that any operations and tools required are a current capability of the workcell by checking the cell capability table "CELLCAP". The robot files generated are "deftpt" (t-point file) and "defvar" (variable definition file). A roadmap to these assignments is given in the file "deftoken", which may be displayed or printed on the line printer.

Note that the process definition is a file augmented with references to the mentioned CAD data files. These files are in a "neutral data format" which defines how the coordinate data and process operation data are to be described, such that the information may be easily extracted and assigned in the robot known variable and translation point space.

The get_procdef function (FIG. 33) reads, verifies and maintains process definition data describing the product to be processed. This includes, but is not limited to, lot specification data, material sequence data, product operations, etc.

The get_data function (FIG. 33) reads, verifies and maintains CAD data associated with robotic systems. The coordinate and operation data is extracted, assigned and written to process data files to be downloaded to the robot controller in synchronization with other machine operations. The neutral data format implemented provides a common interface for CAD systems and robot controllers.

6.4: Event Tracker

Figure 43:
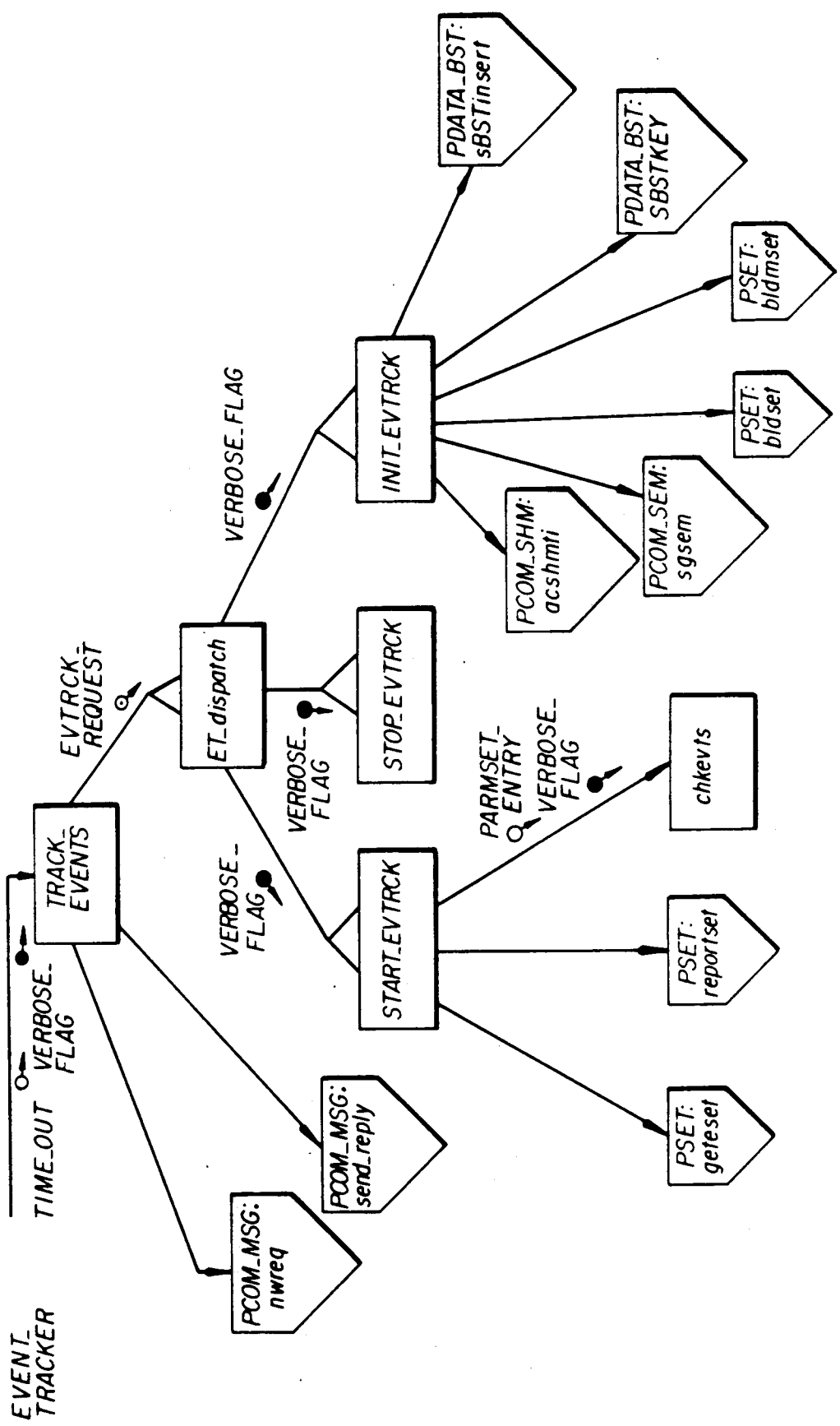
FIG. 43 Event Tracker Process: structure chart.
Figure 44:
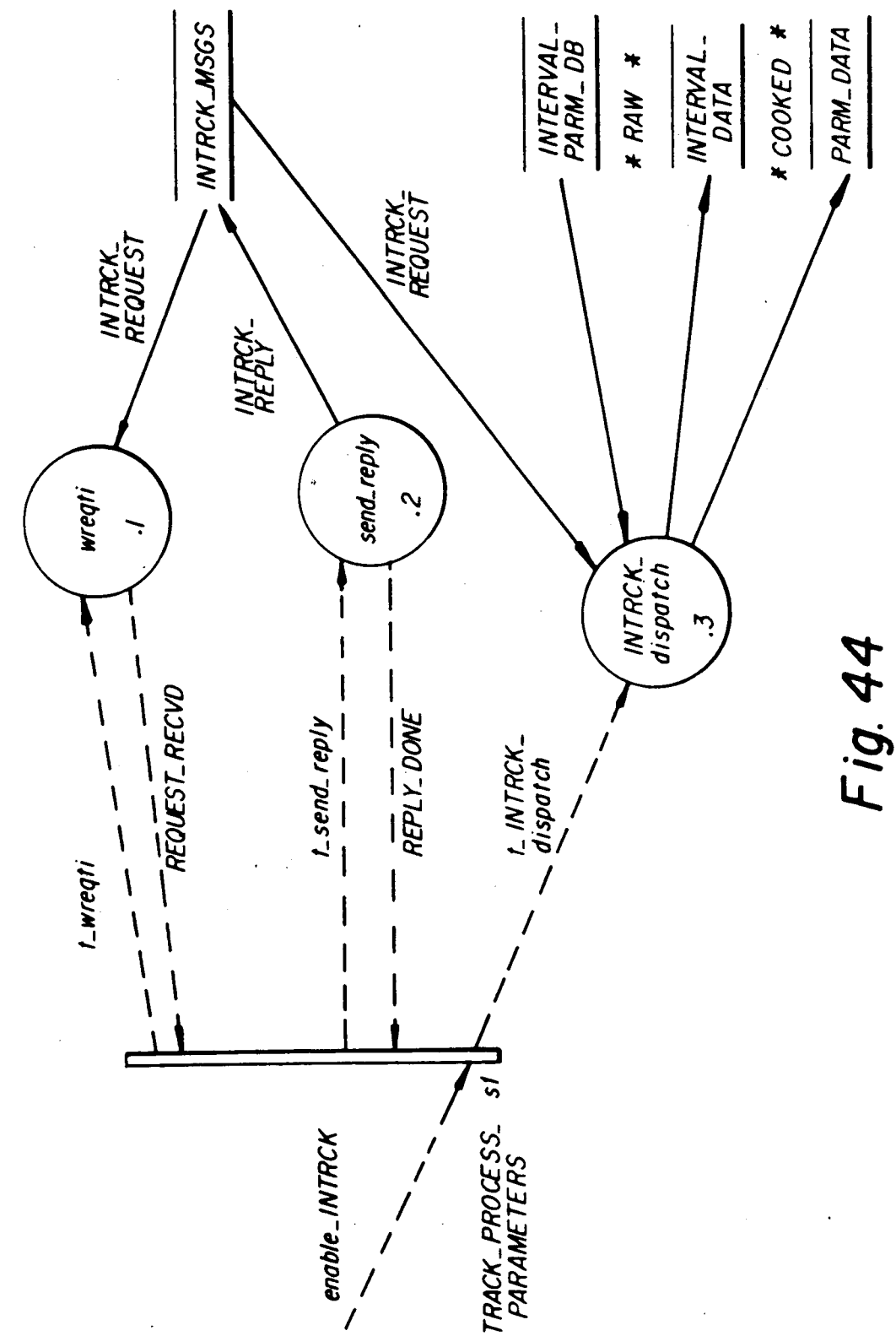
FIG. 44 Interval Tracker Process: data flow diagram.
Figure 45:
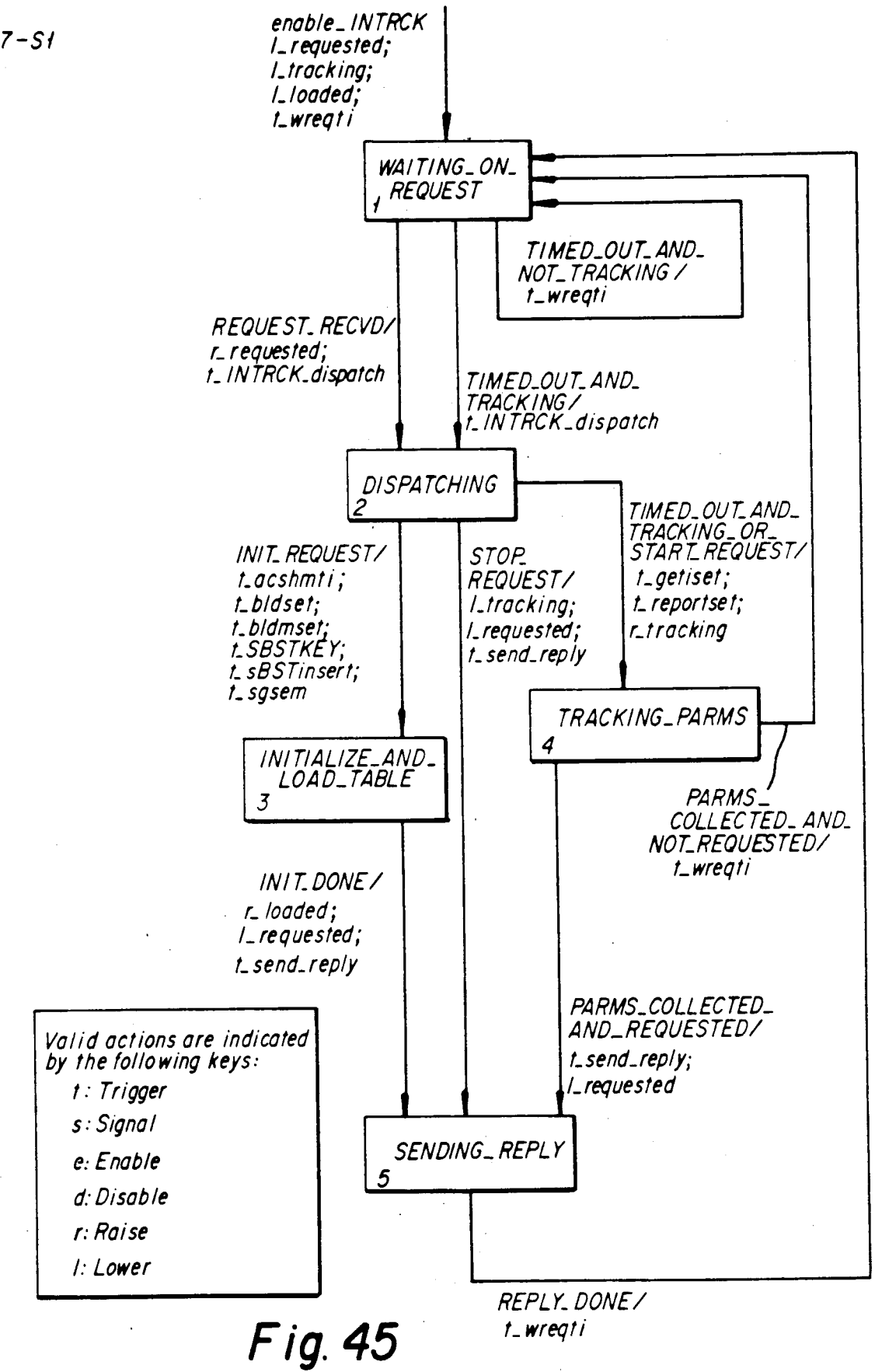
FIG. 45 Interval Tracker Process: state transition diagram.
Figure 46:
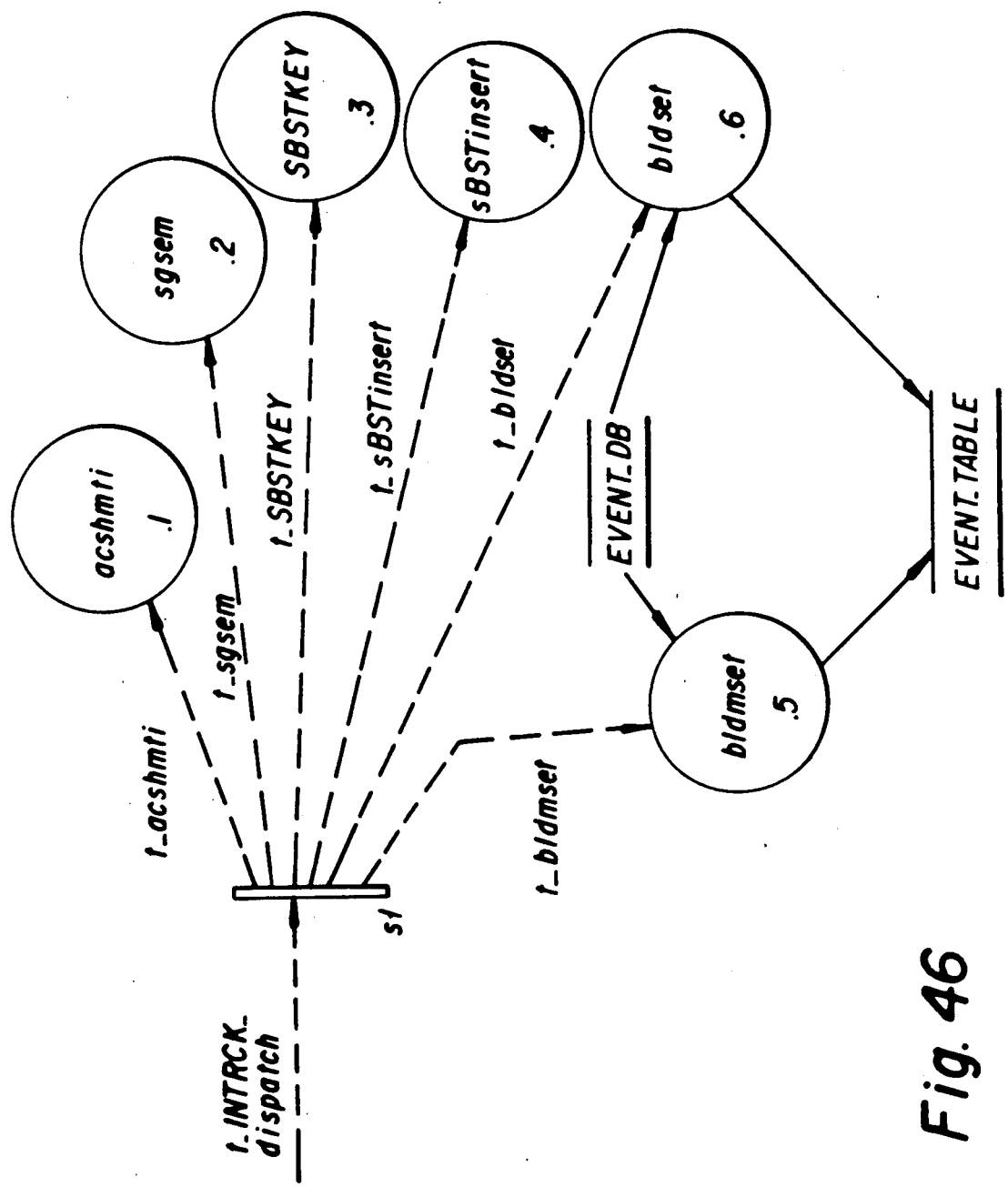
FIG. 46 Interval Tracker Process: data flow diagram.
Figure 47:
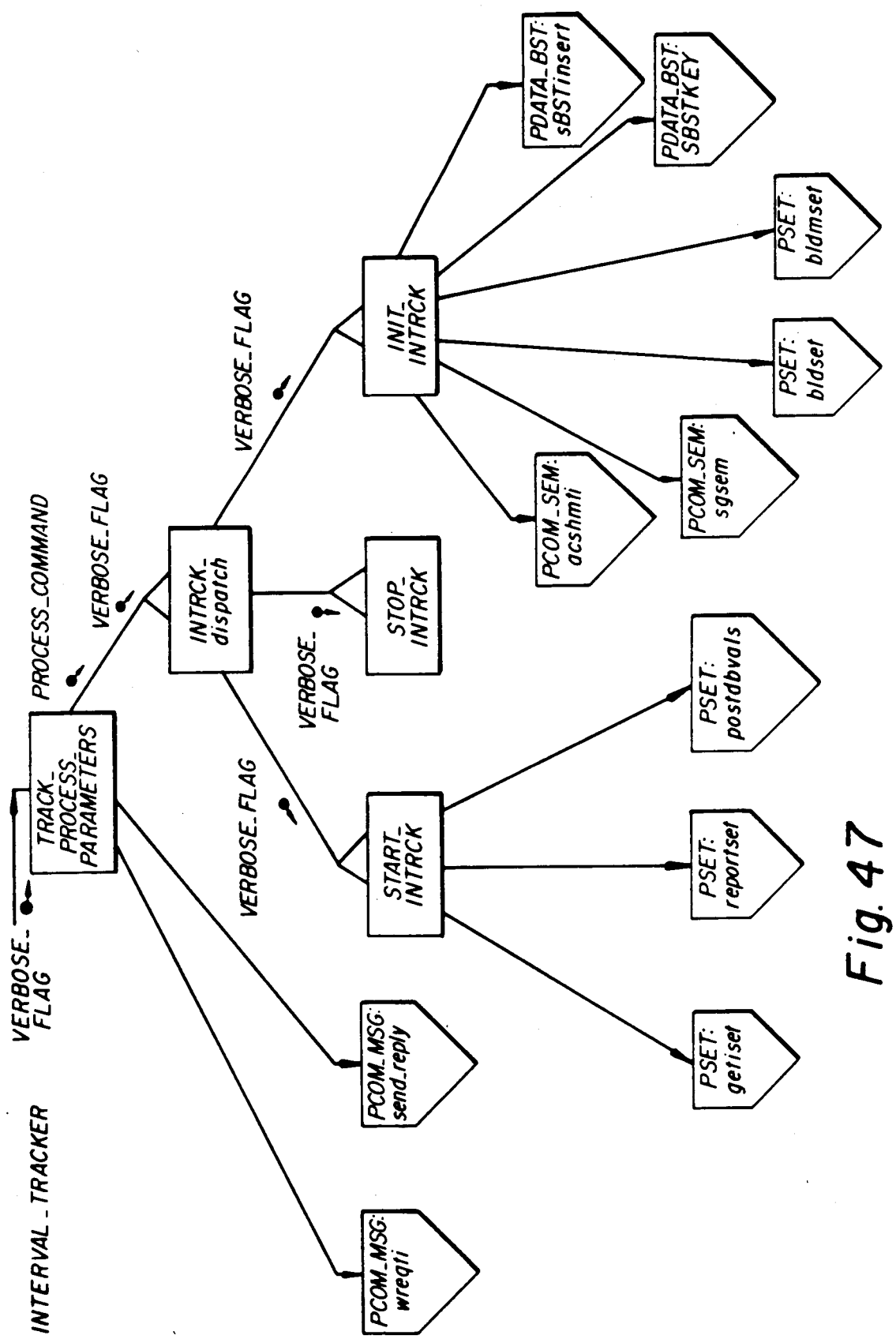
FIG. 47 Interval Tracker Process: structure chart.
Figure 48:
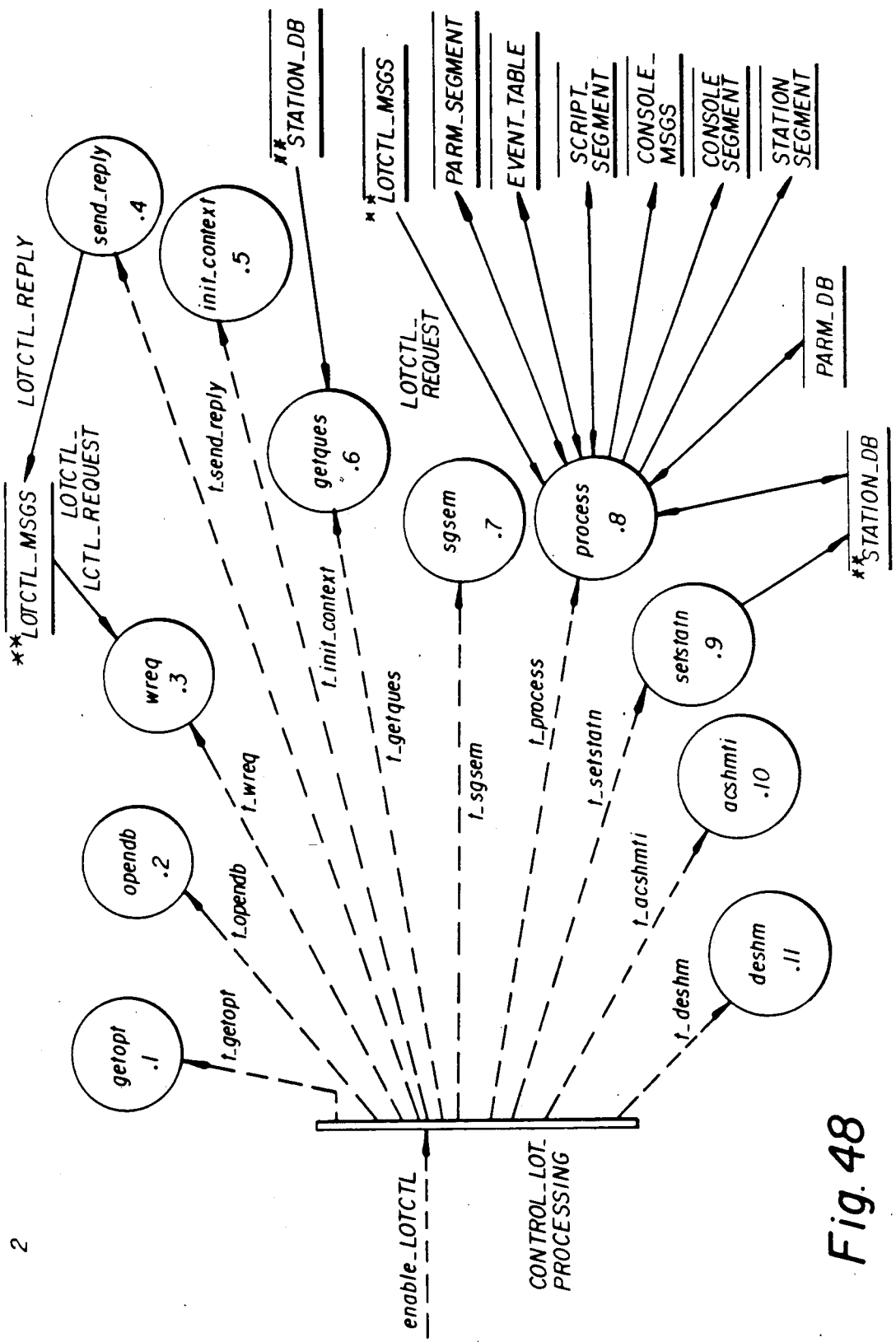
FIG. 48 Lot Control Process: data flow diagram.
Figure 50:
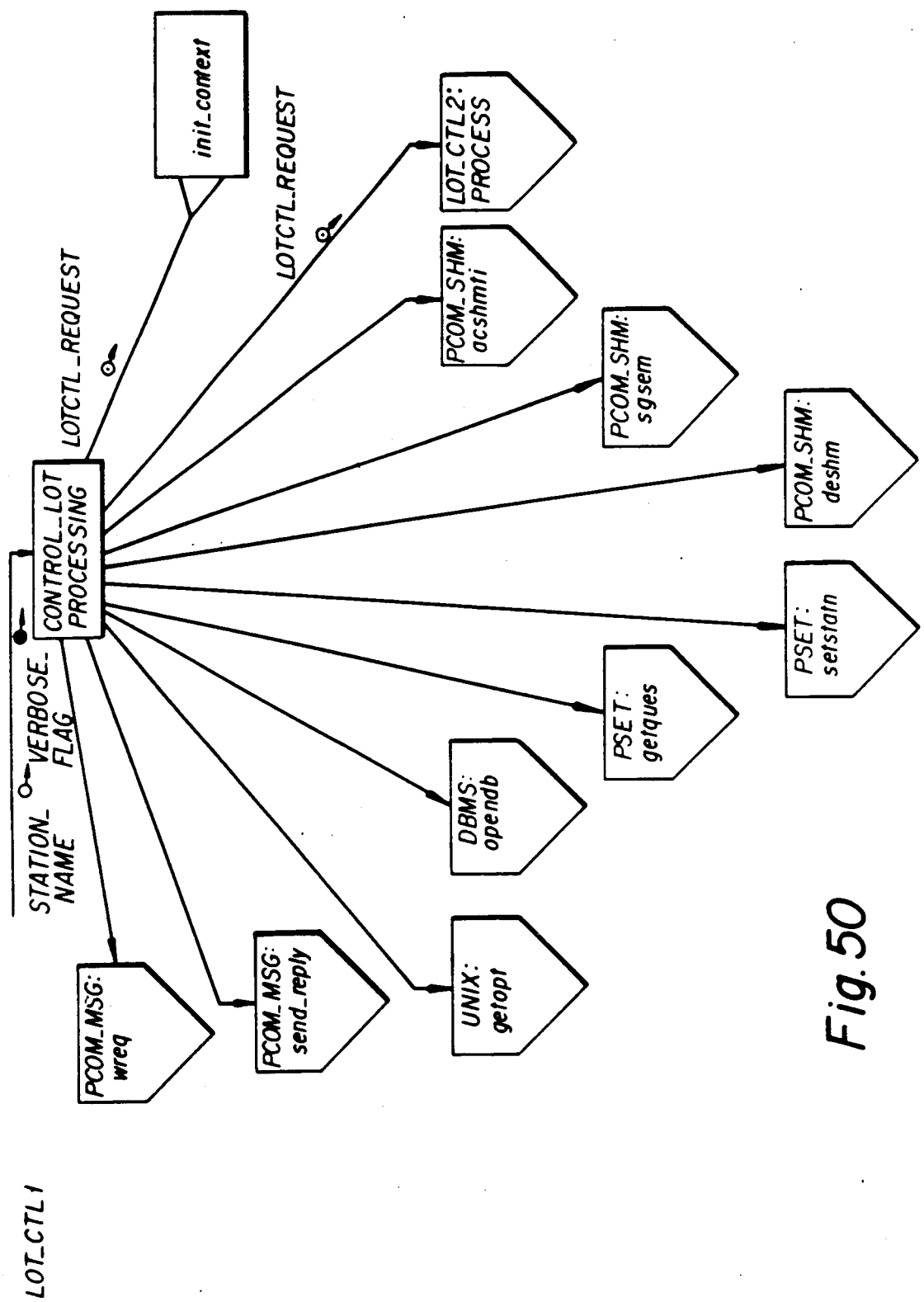
FIG. 50 Lot Control Process: structure chart.
Figure 51:
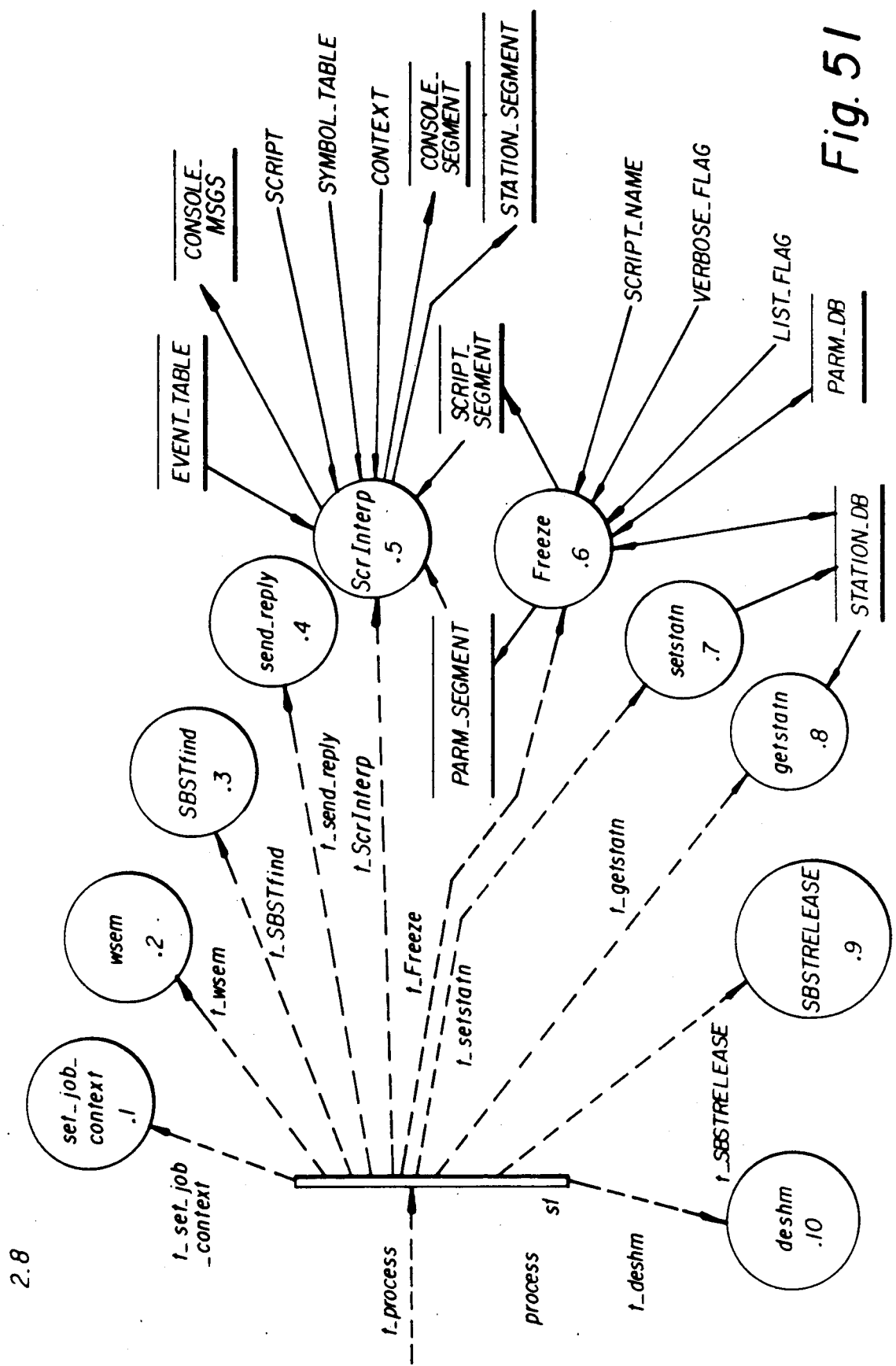
FIG. 51 Lot Control Process: data flow diagram.
Figure 52:
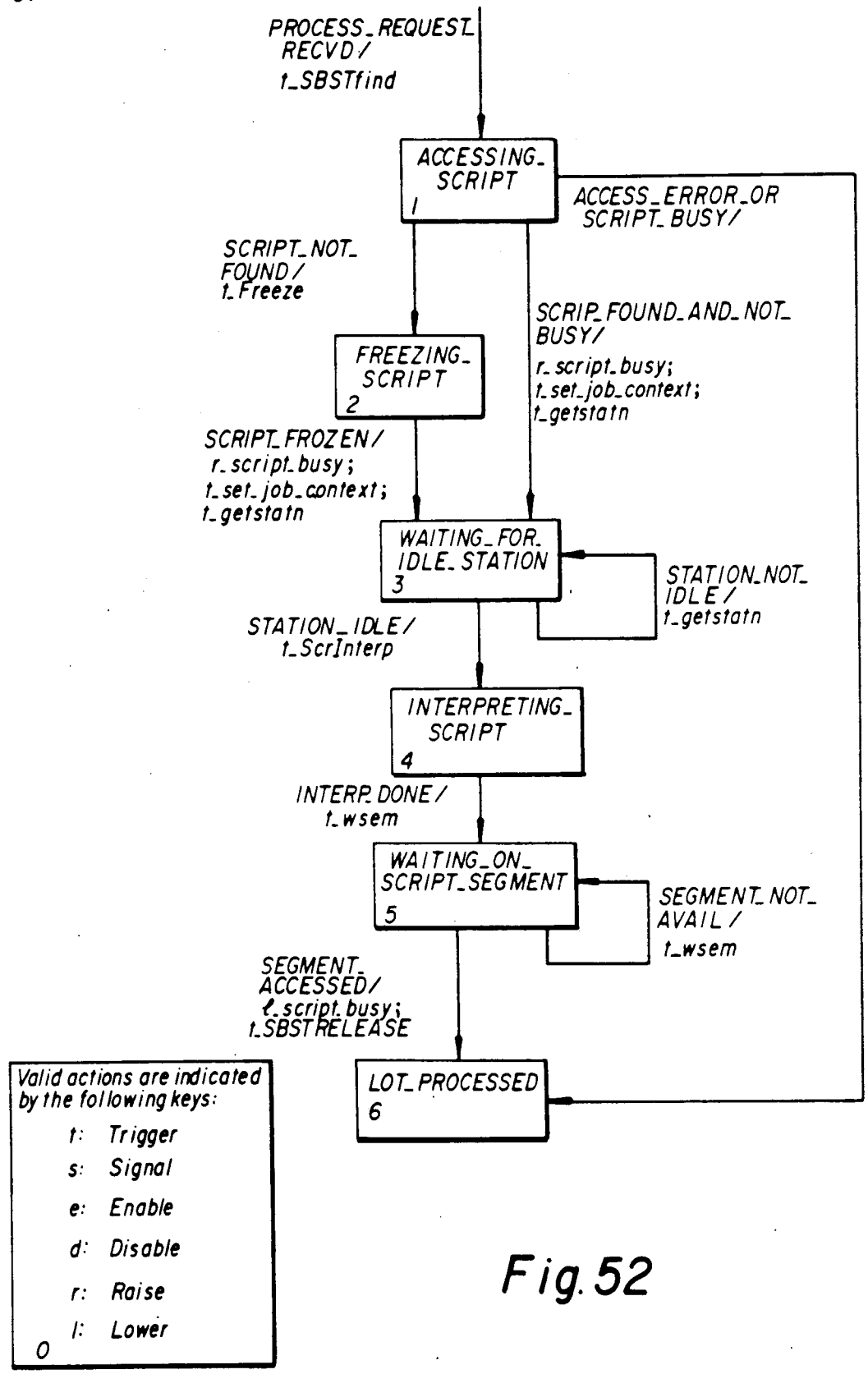
FIG. 52 Lot Control Process: state transition diagram.
Figure 53:
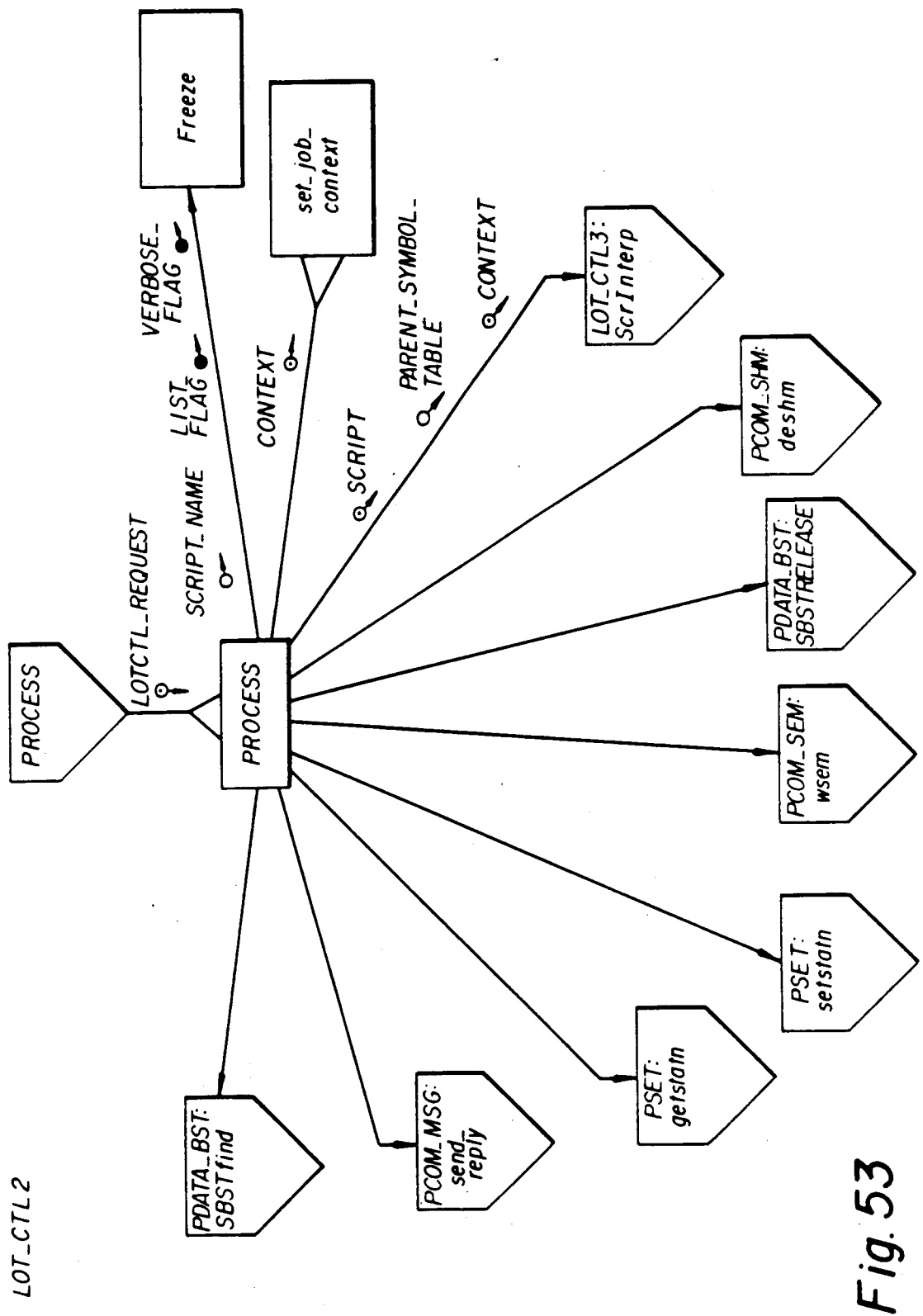
FIG. 53 Lot Control Process: structure chart.
Figure 54:
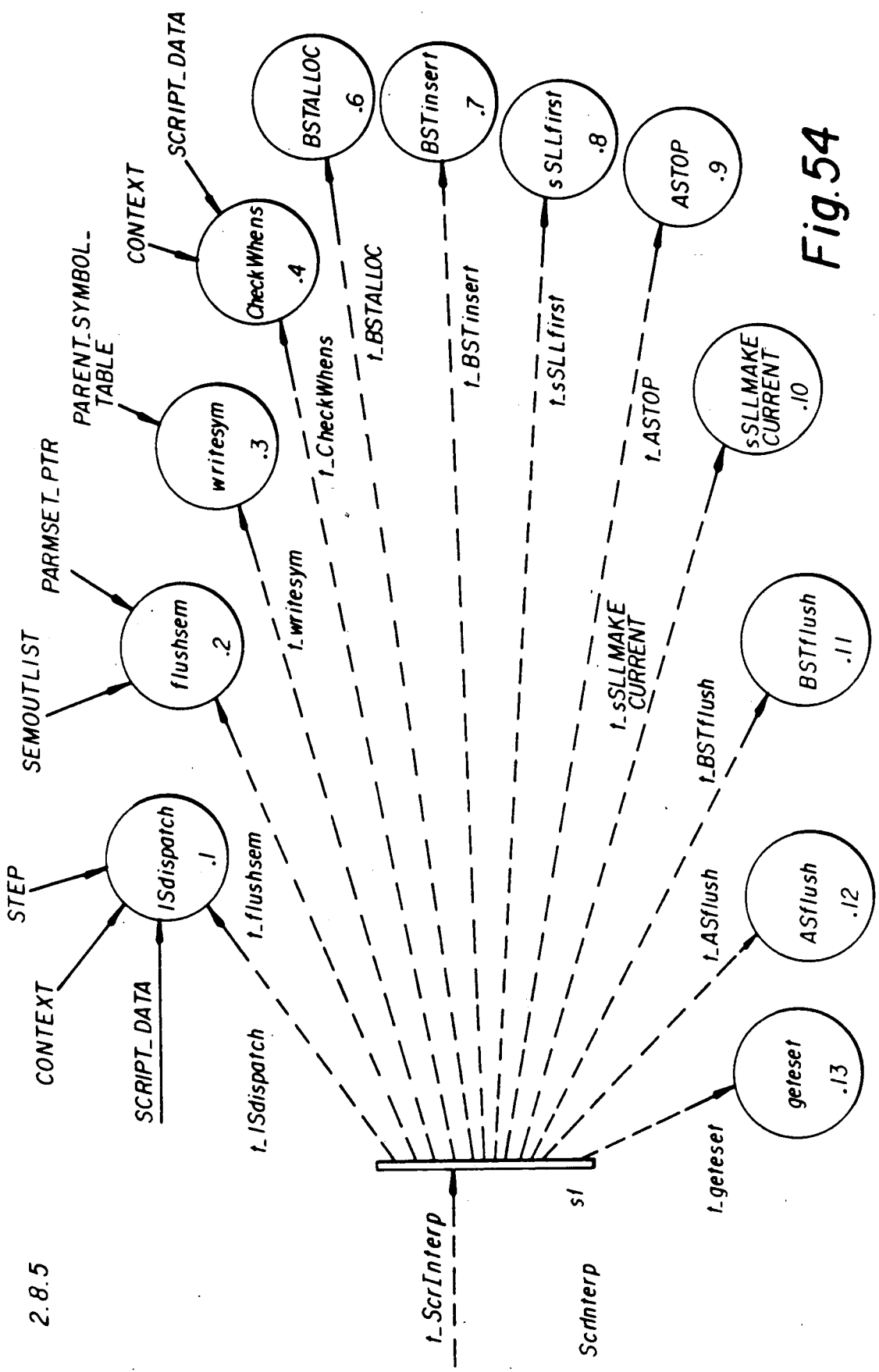
FIG. 54 Lot Control Process: data flow diagram.
Figure 55:
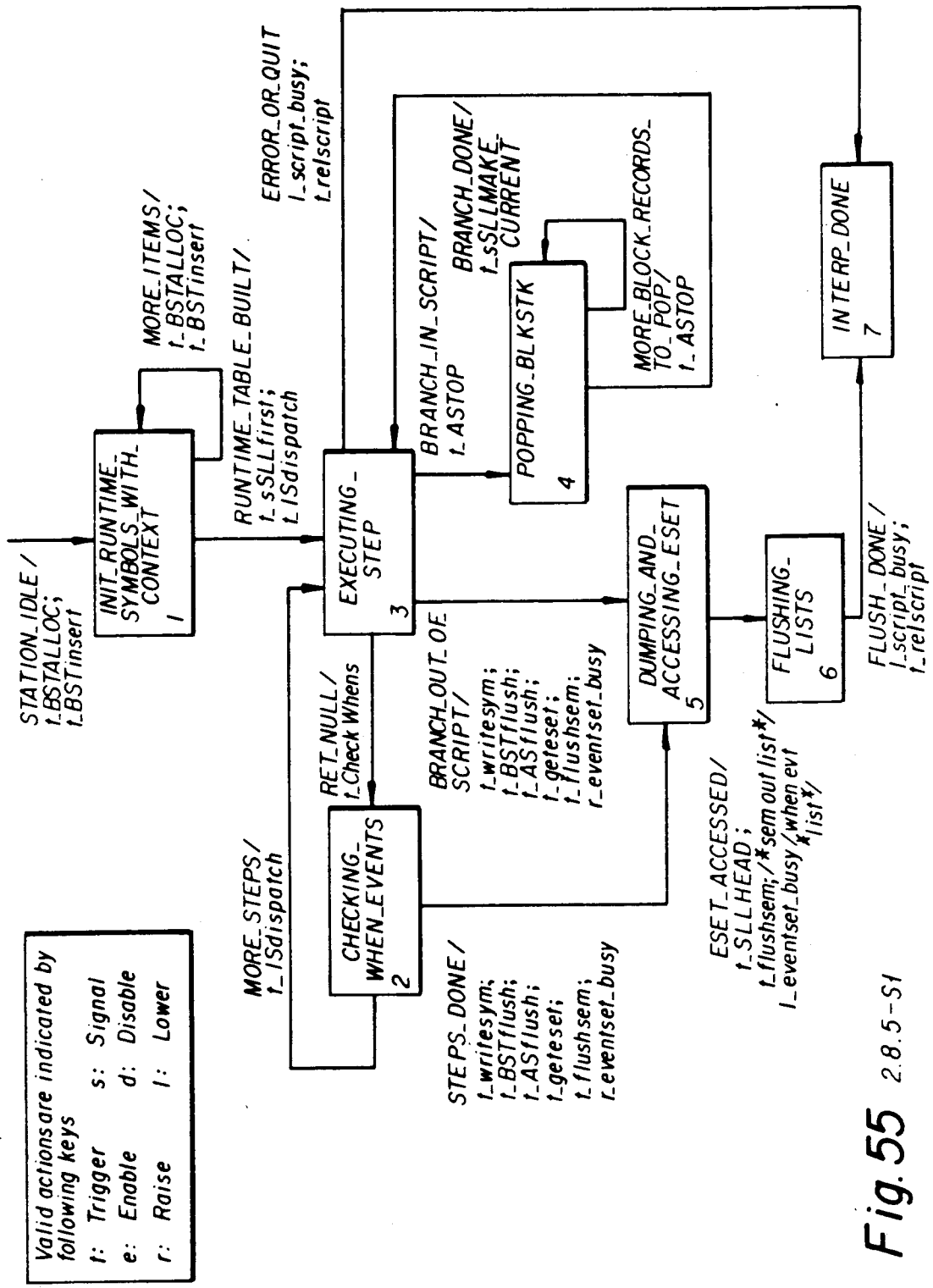
FIG. 55 Lot Control Process: state transition diagram.
Figure 56:
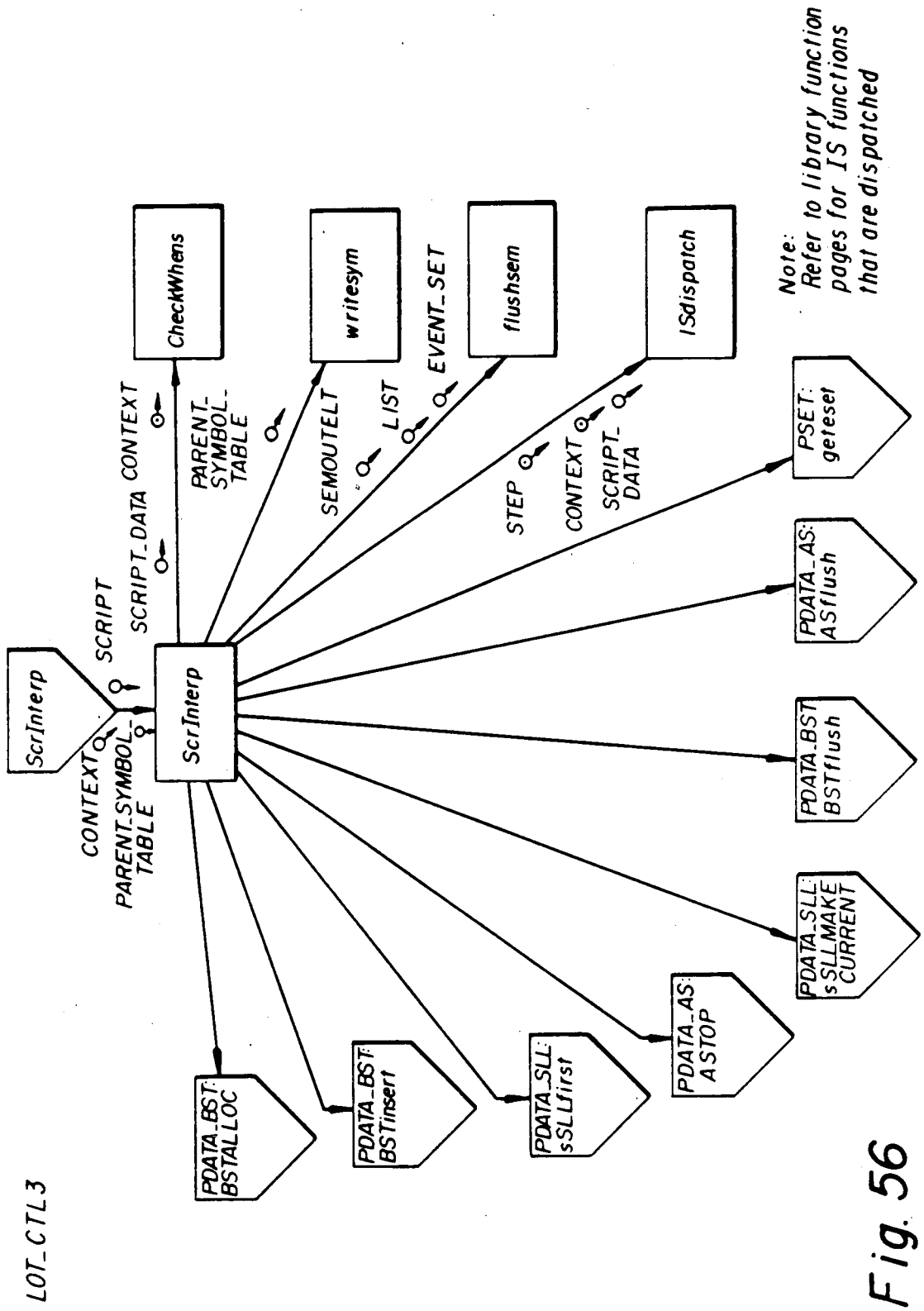
FIG. 56 Lot Control Process: structure chart.
Figure 57:
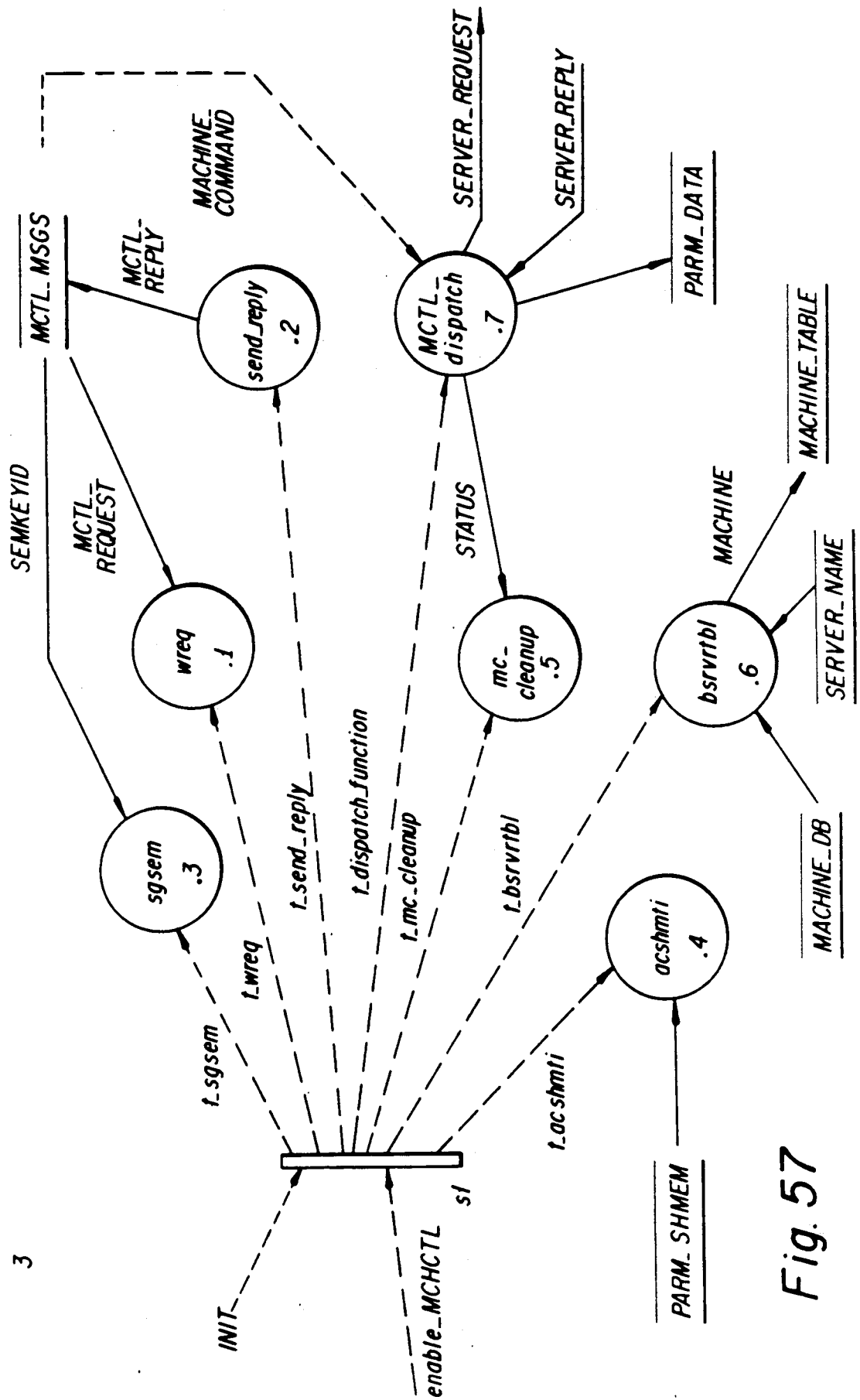
FIG. 57 Machine Control Process: data flow diagram.
Figure 58:
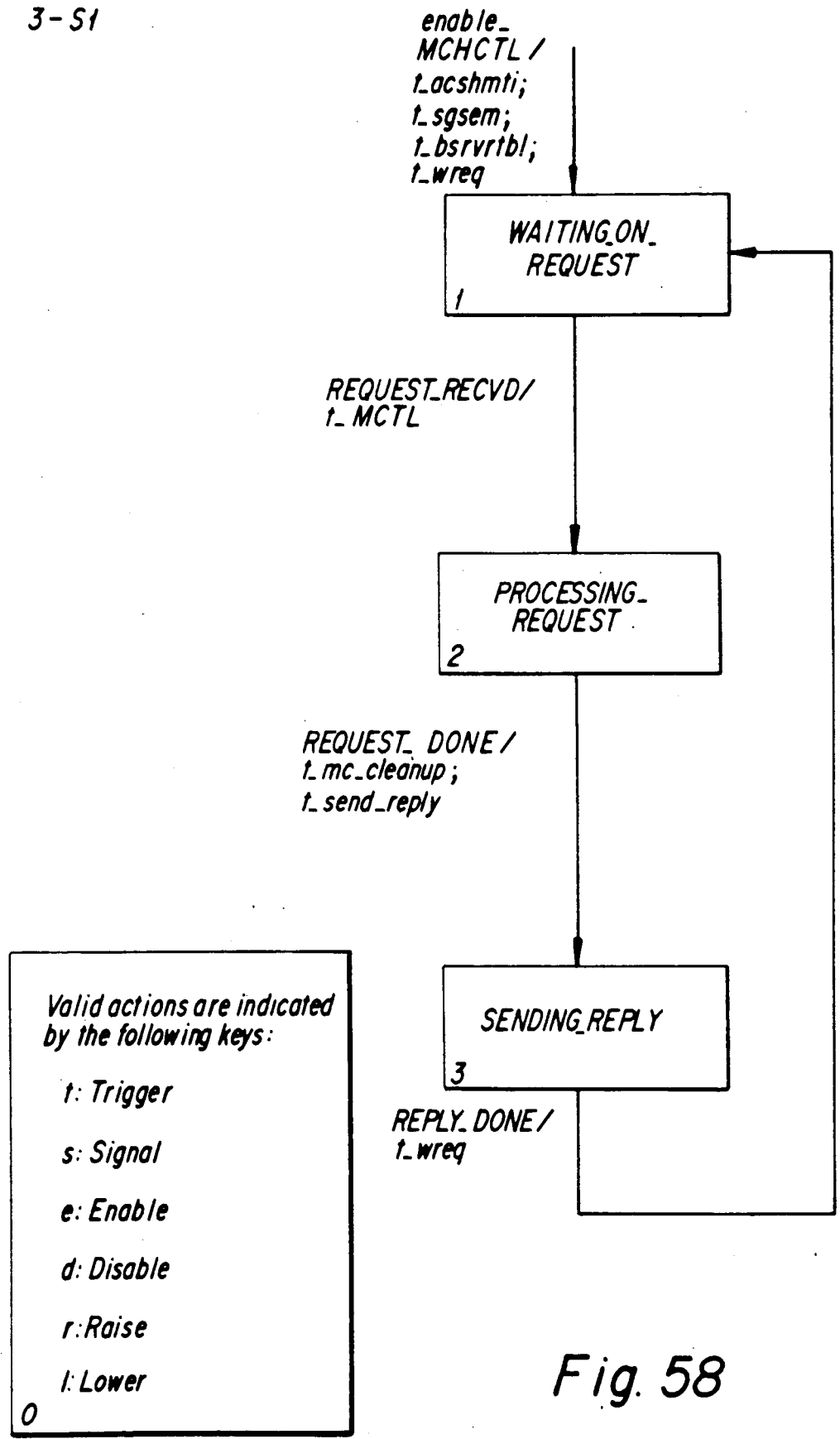
FIG. 58 Machine Control Process: state transition diagram.
Figure 59:
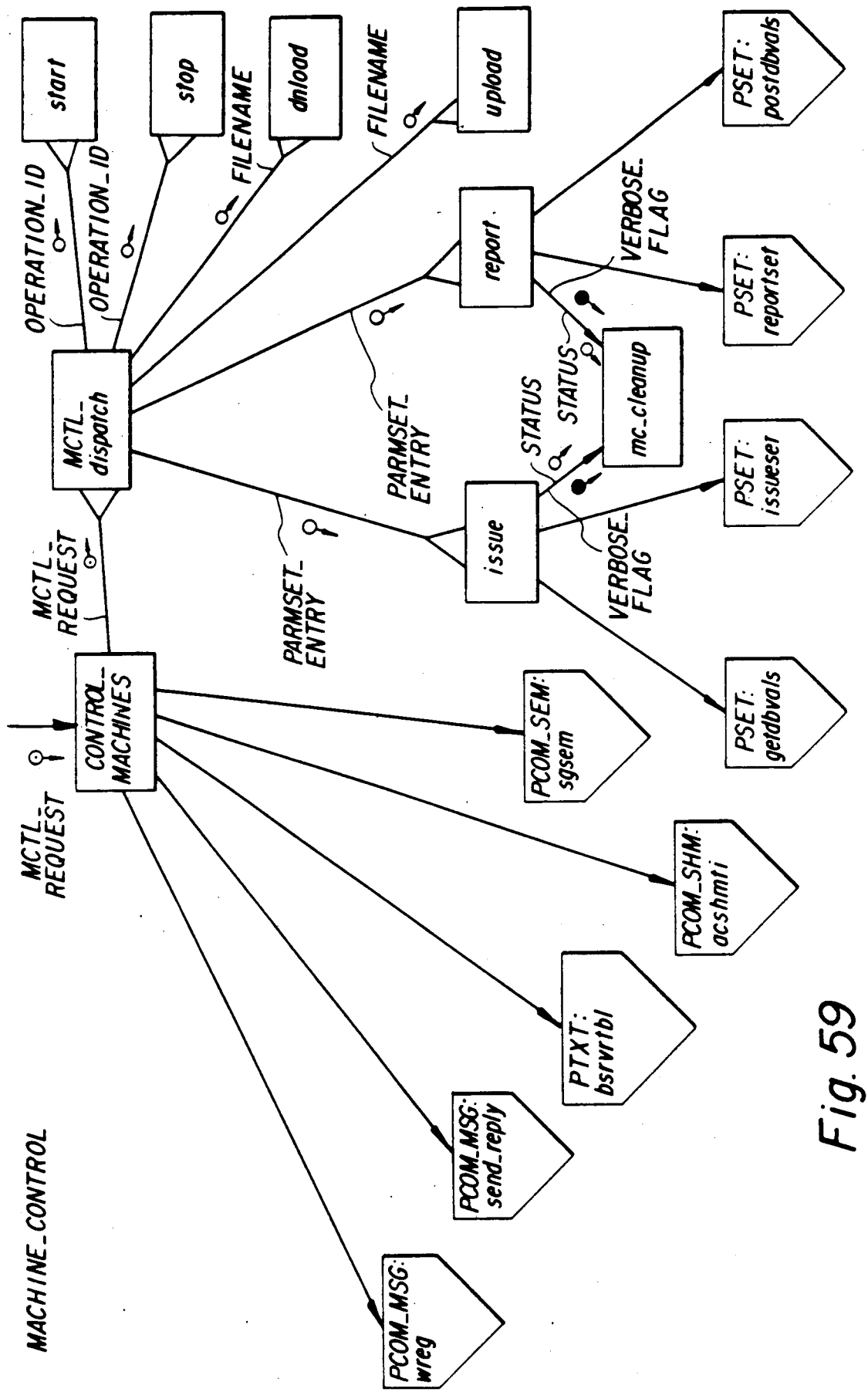
FIG. 59 Machine Control Process: structure chart.
Figure 60:
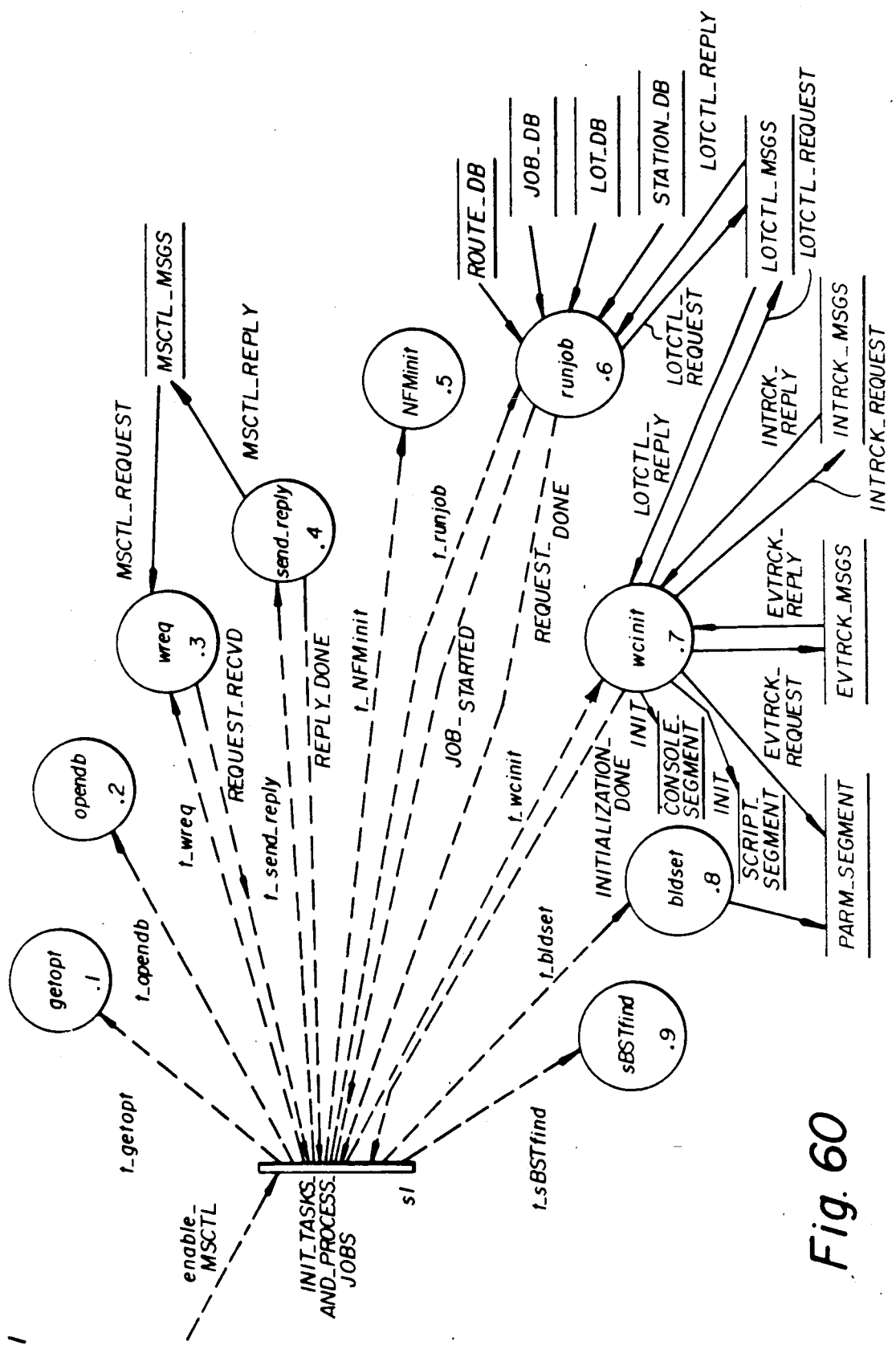
FIG. 60 Master Control Process: data flow diagram.
Figure 61:
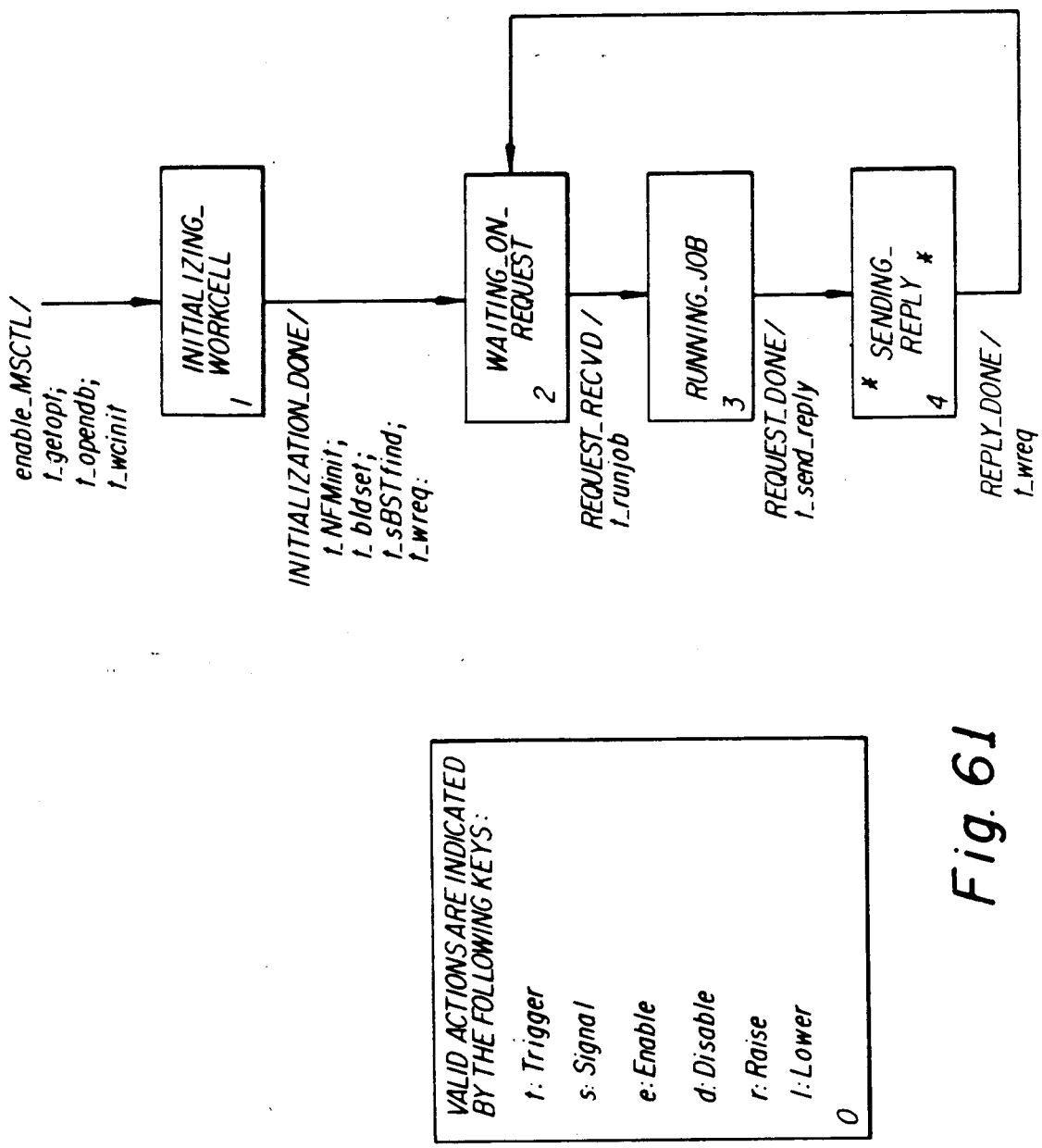
FIG. 61 Master Control Process: state transition diagram.
Figure 62:
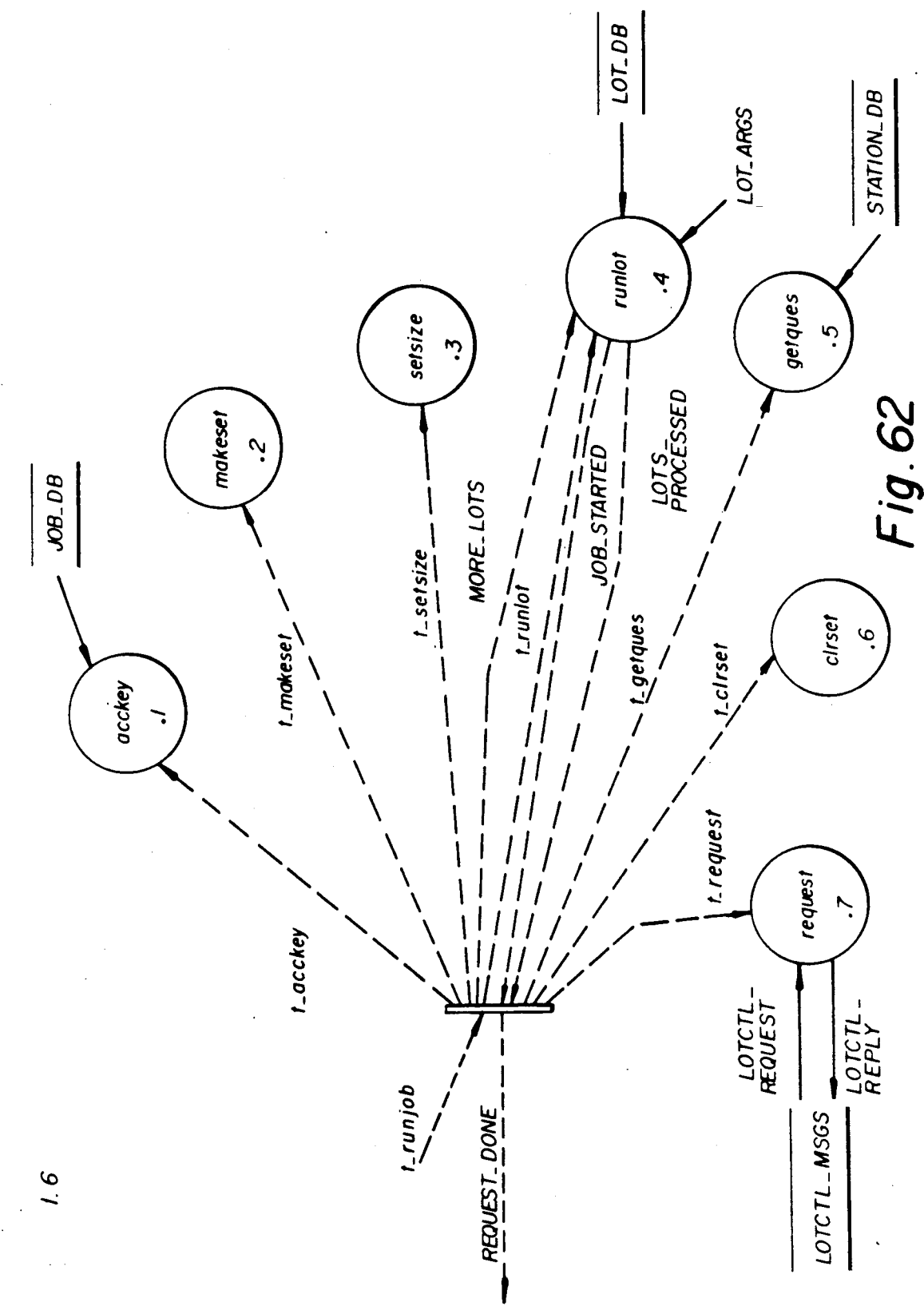
FIG. 62 Master Control Process: structure chart.
Figure 63:
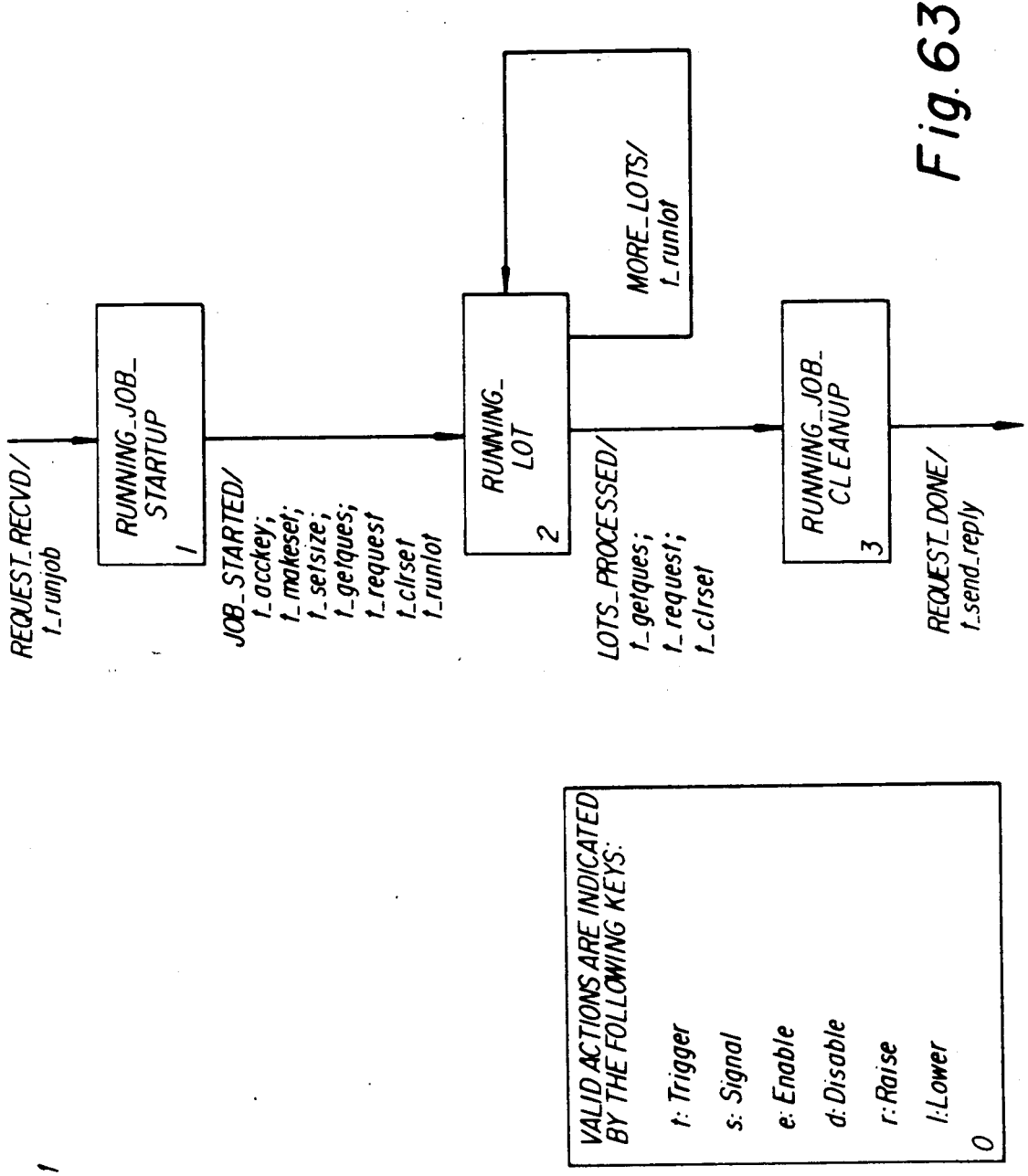
FIG. 63 Master Control Process: data flow diagram.
Figure 64:
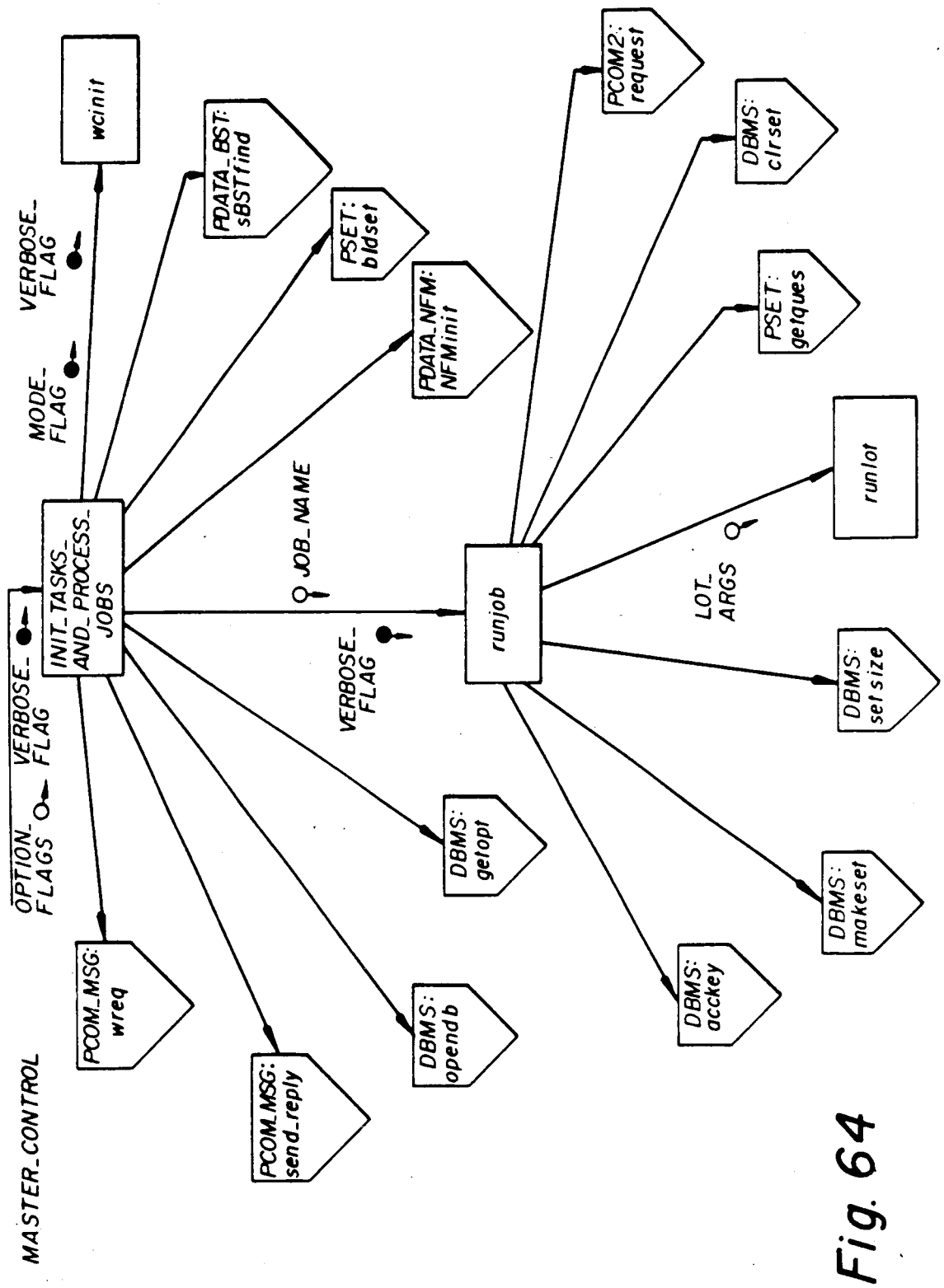
FIG. 64 Master Control Process: state transition diagram.
Figure 65:
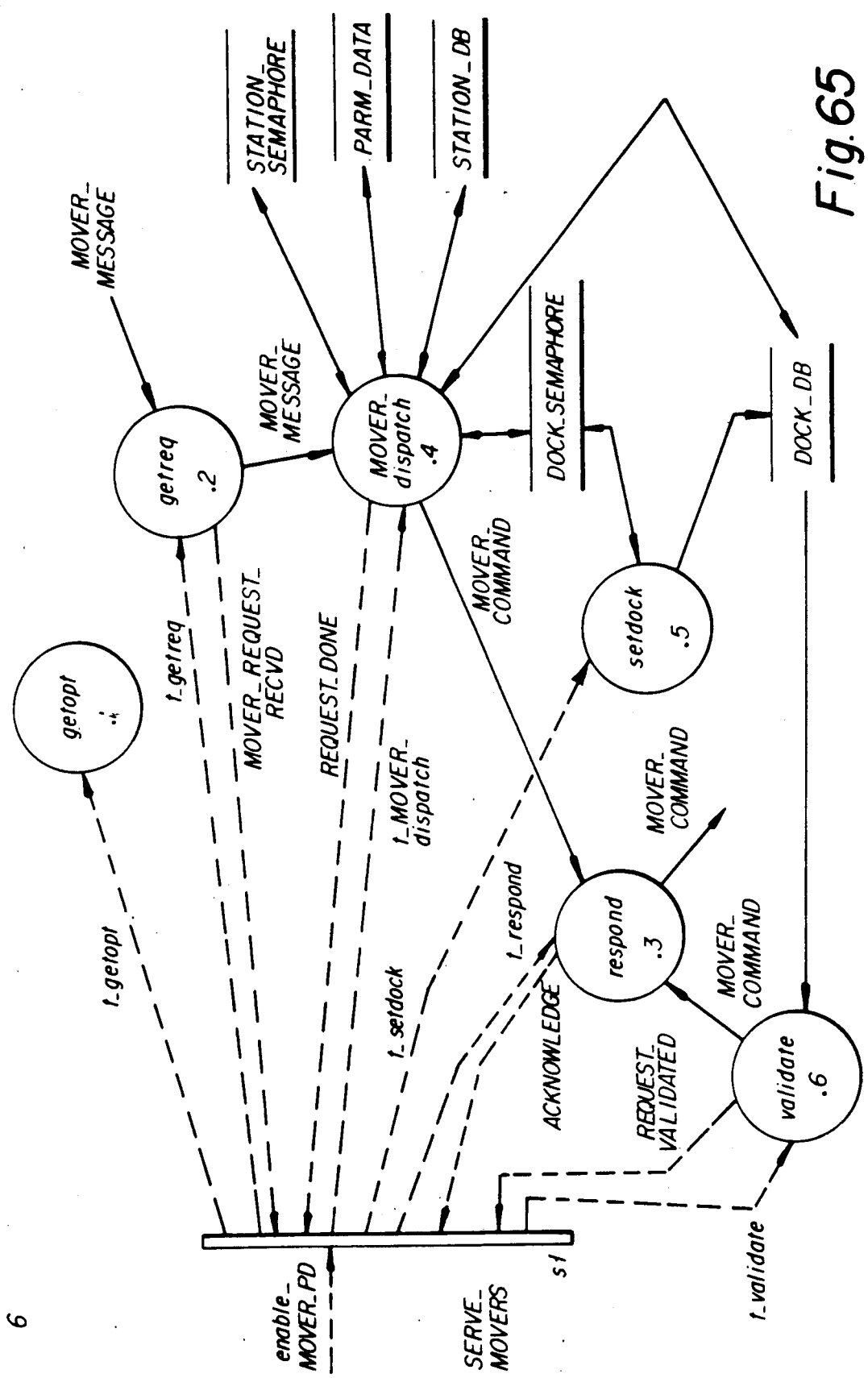
FIG. 65 Mover-PD Process: data flow diagram.
Figure 66:
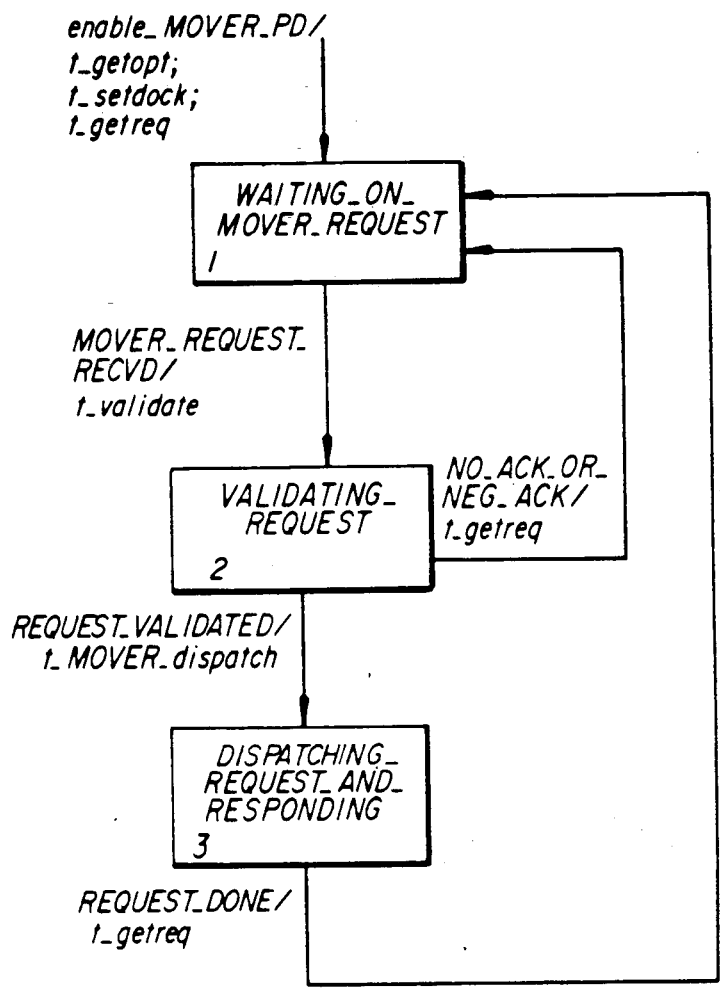
FIG. 66 Mover-PD Process: state transition diagram.
Figure 67:
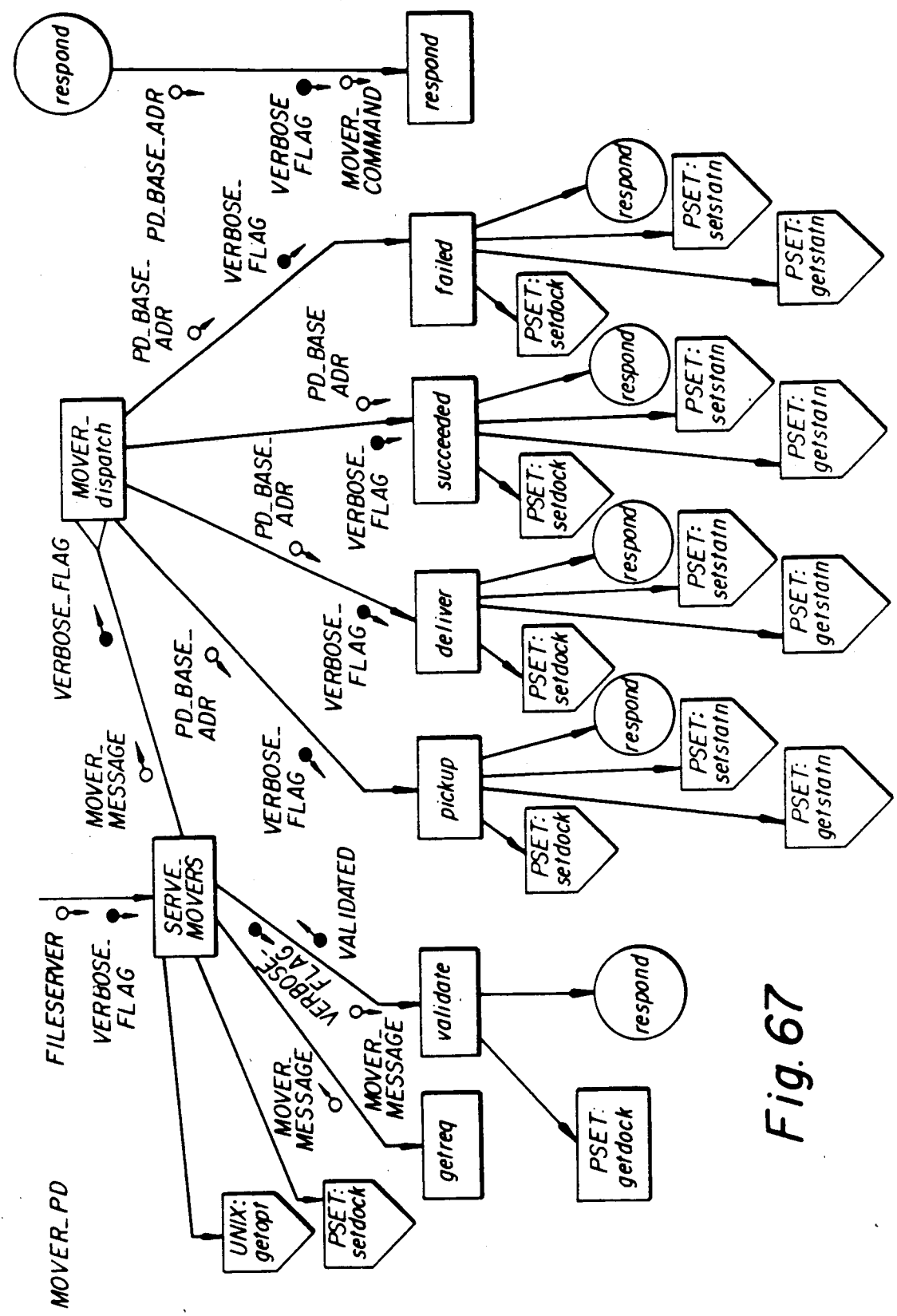
FIG. 67 Mover-PD Process: structure chart.
Figure 68:
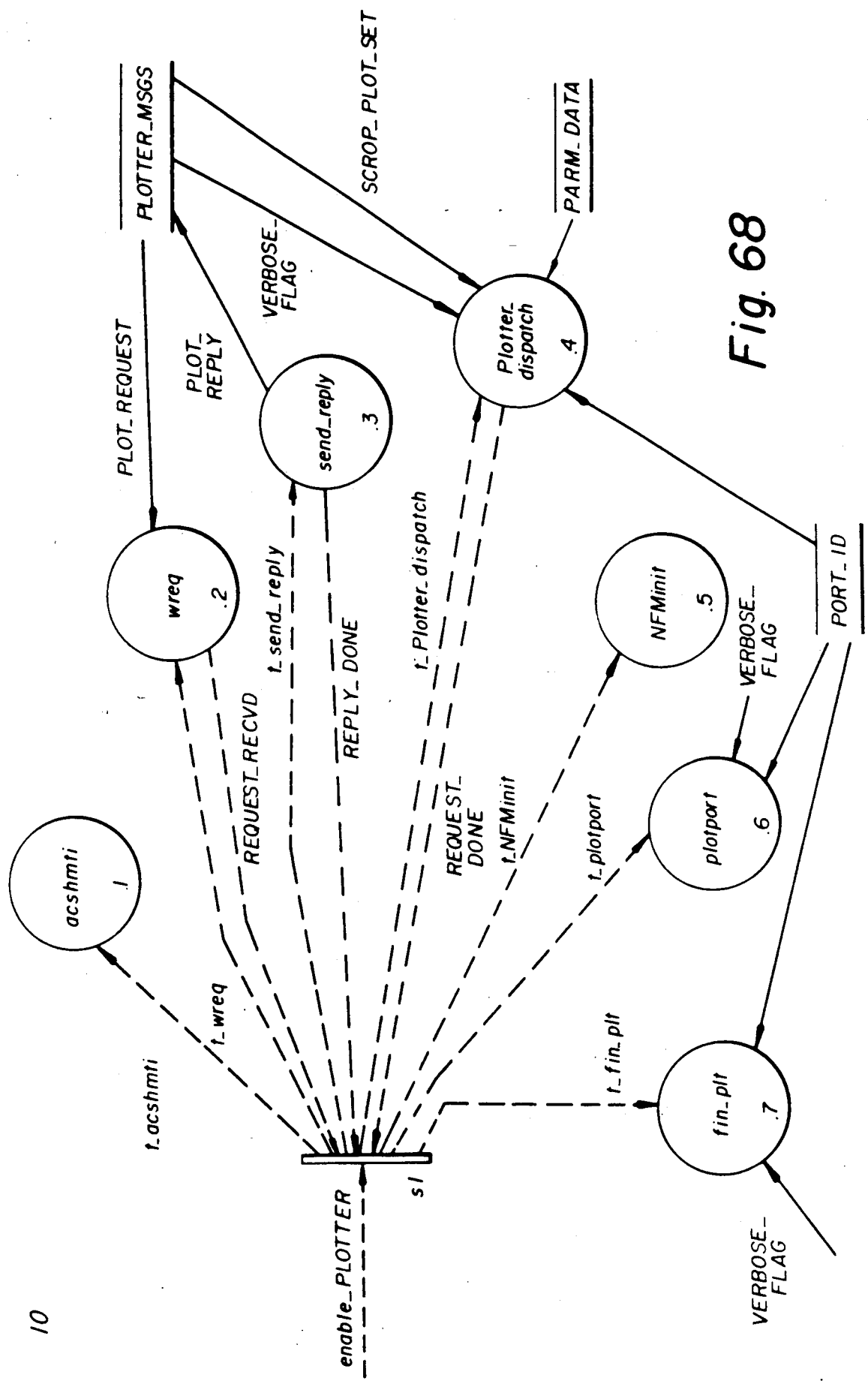
FIG. 68 Plotter Process: data flow diagram.
Figure 69:
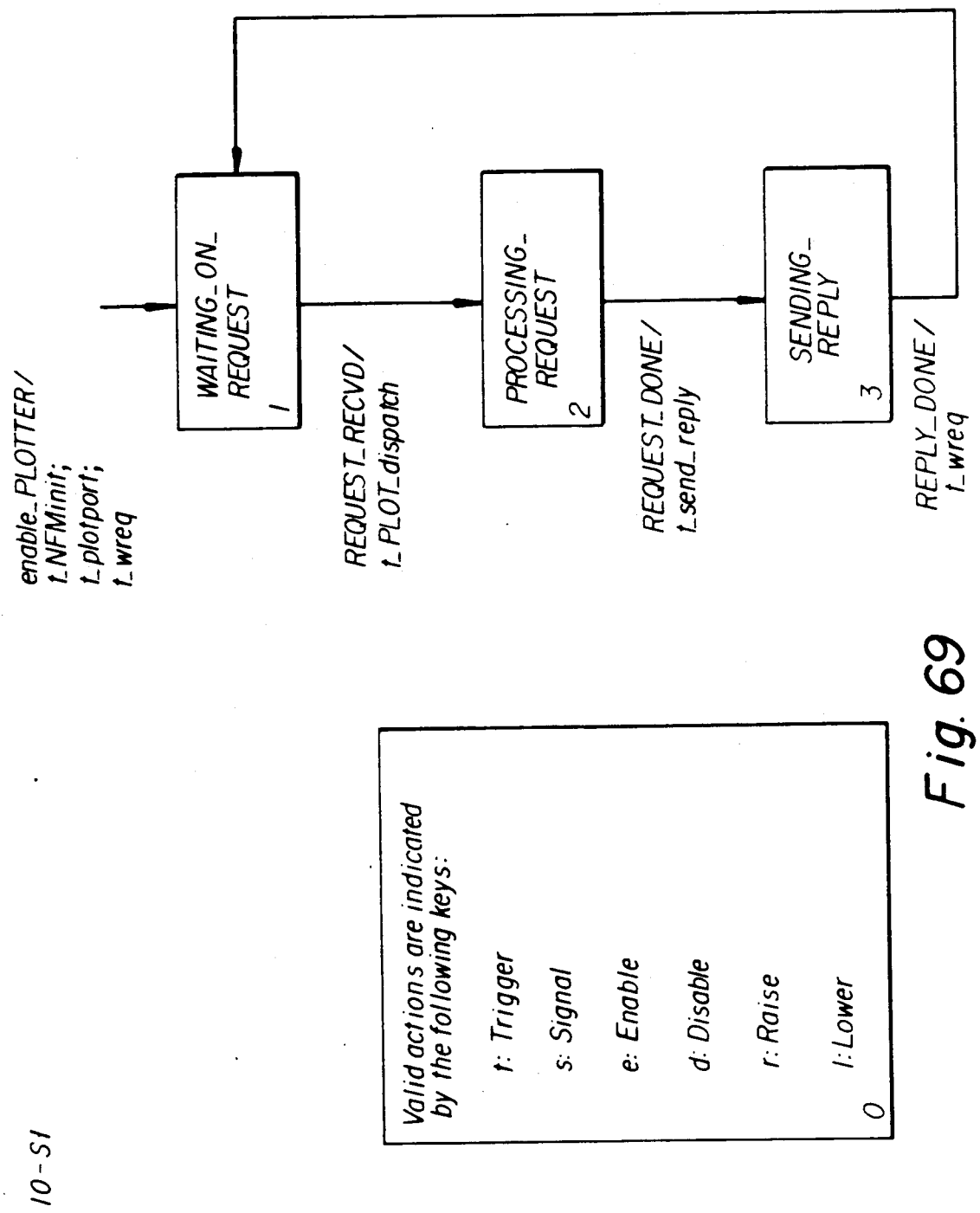
FIG. 69 Plotter Process: state transition diagram.
Figure 70:
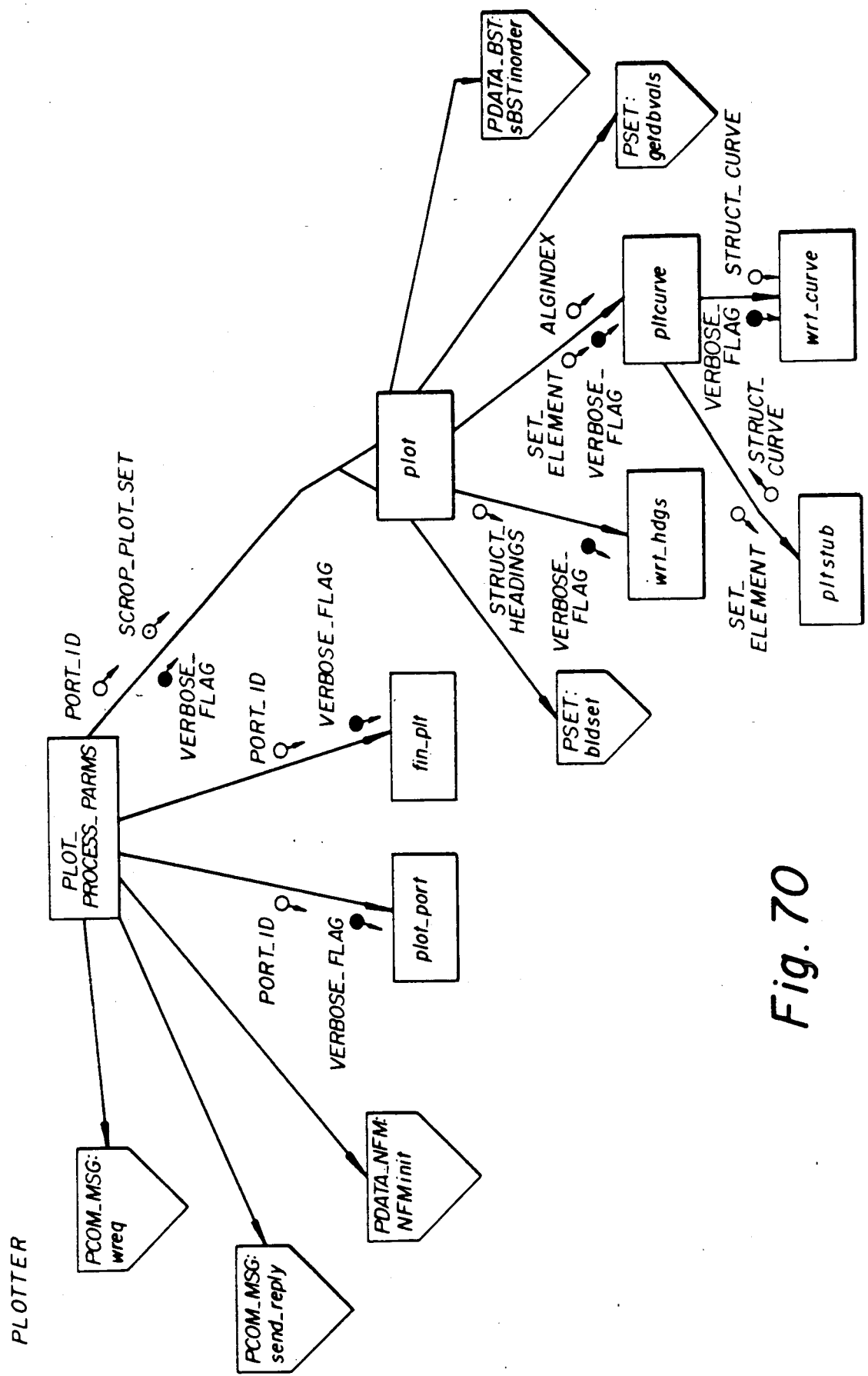
FIG. 70 Plotter Process: structure chart.
Figure 71:
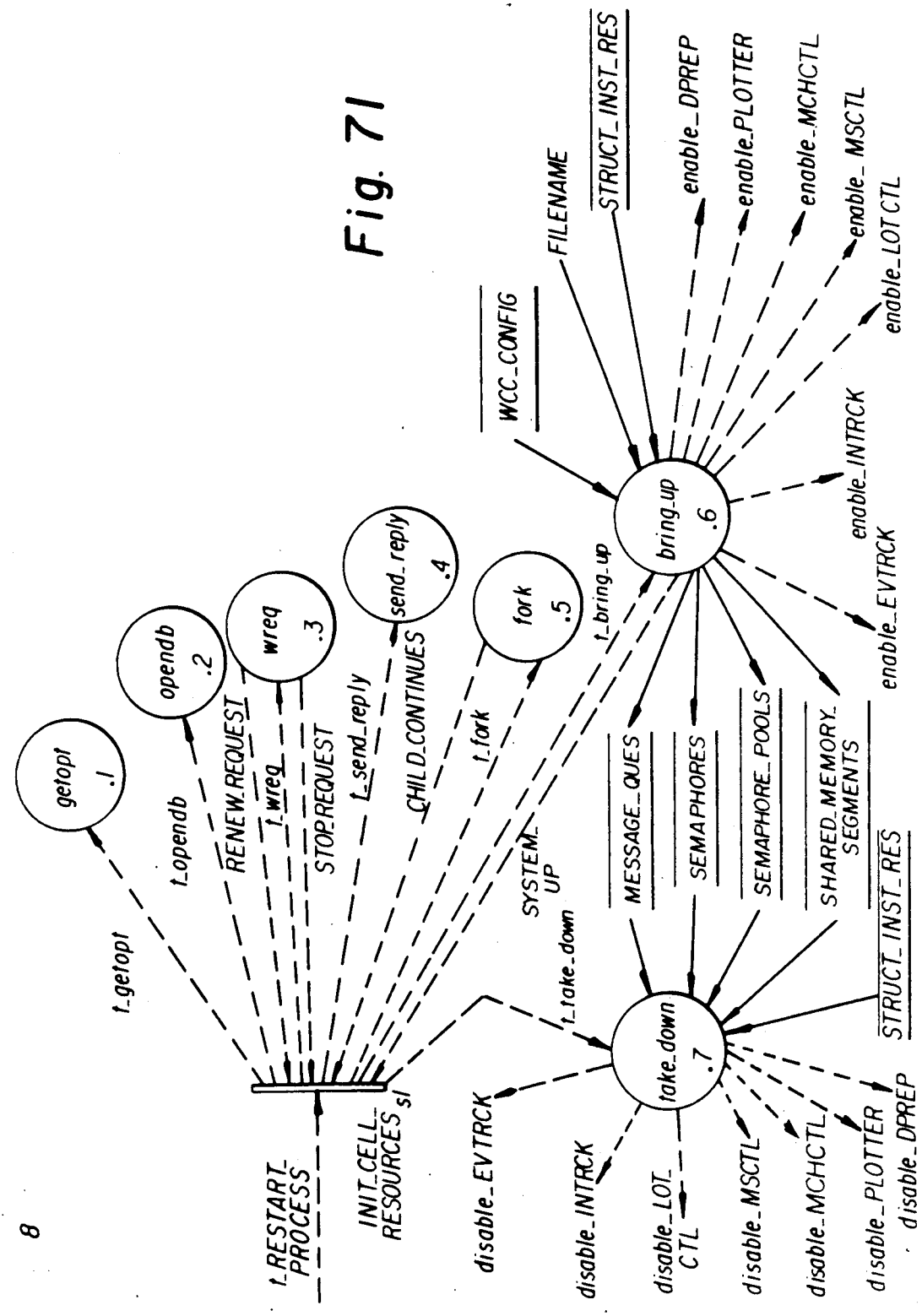
FIG. 71 Restart Process: data flow diagram.
Figure 72:
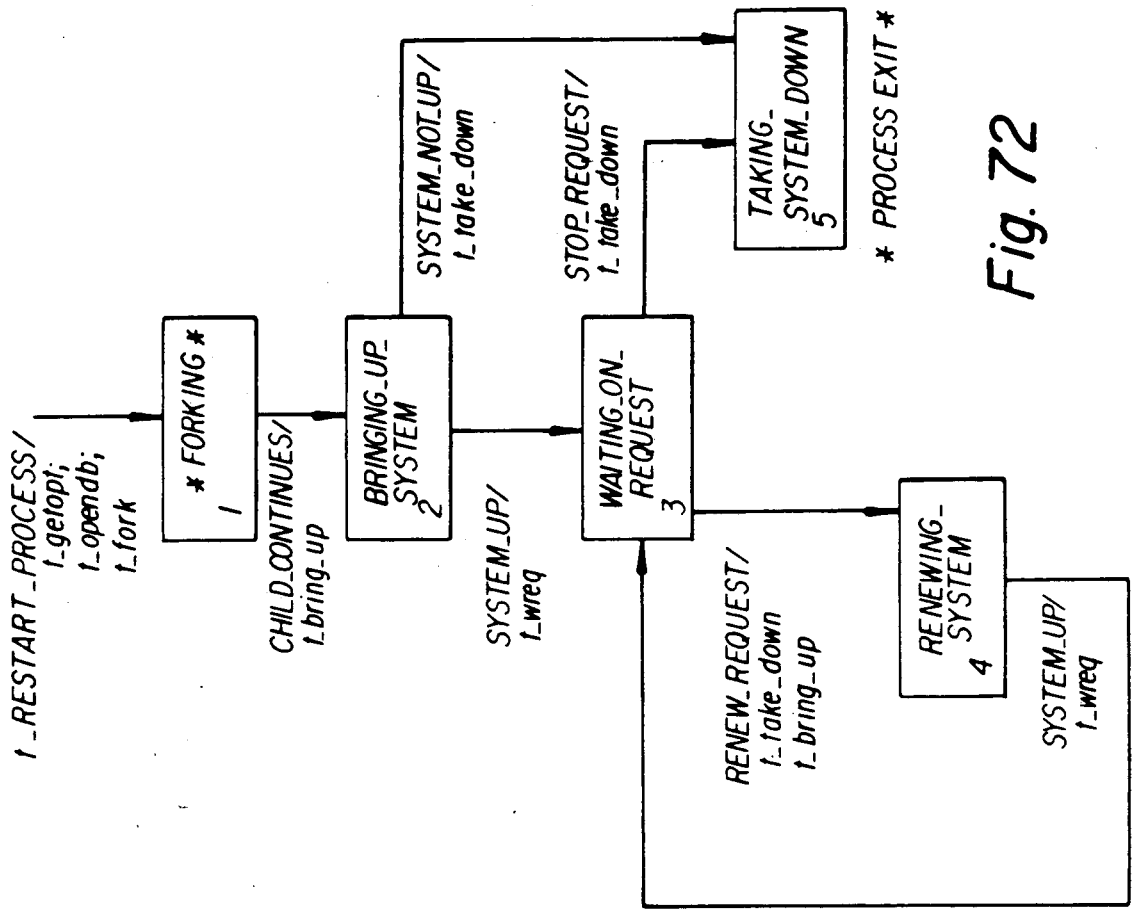
FIG. 72 Restart Process: state transition diagram.
Figure 73:
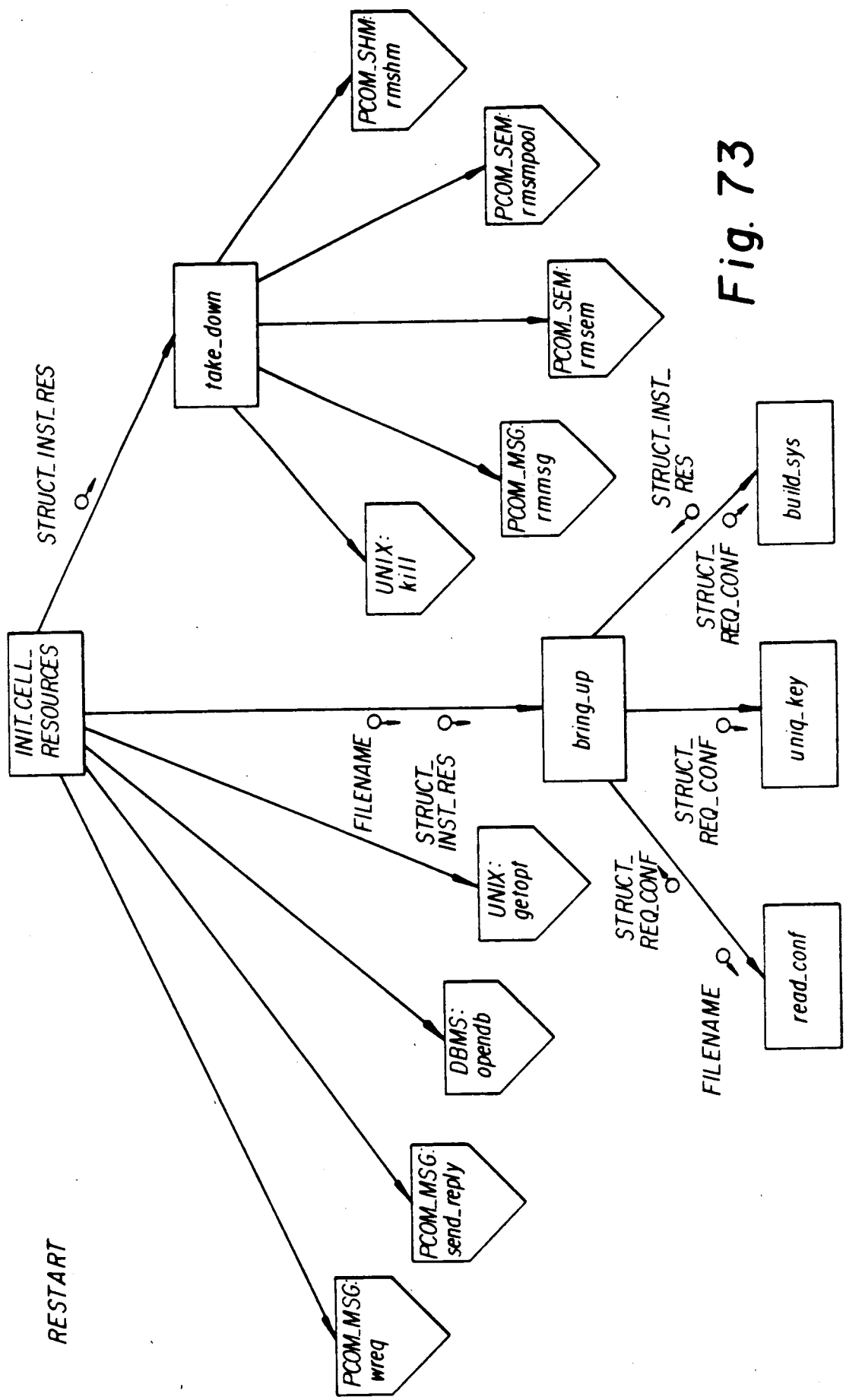
FIG. 73 Restart Process: structure chart.
Figure 74:
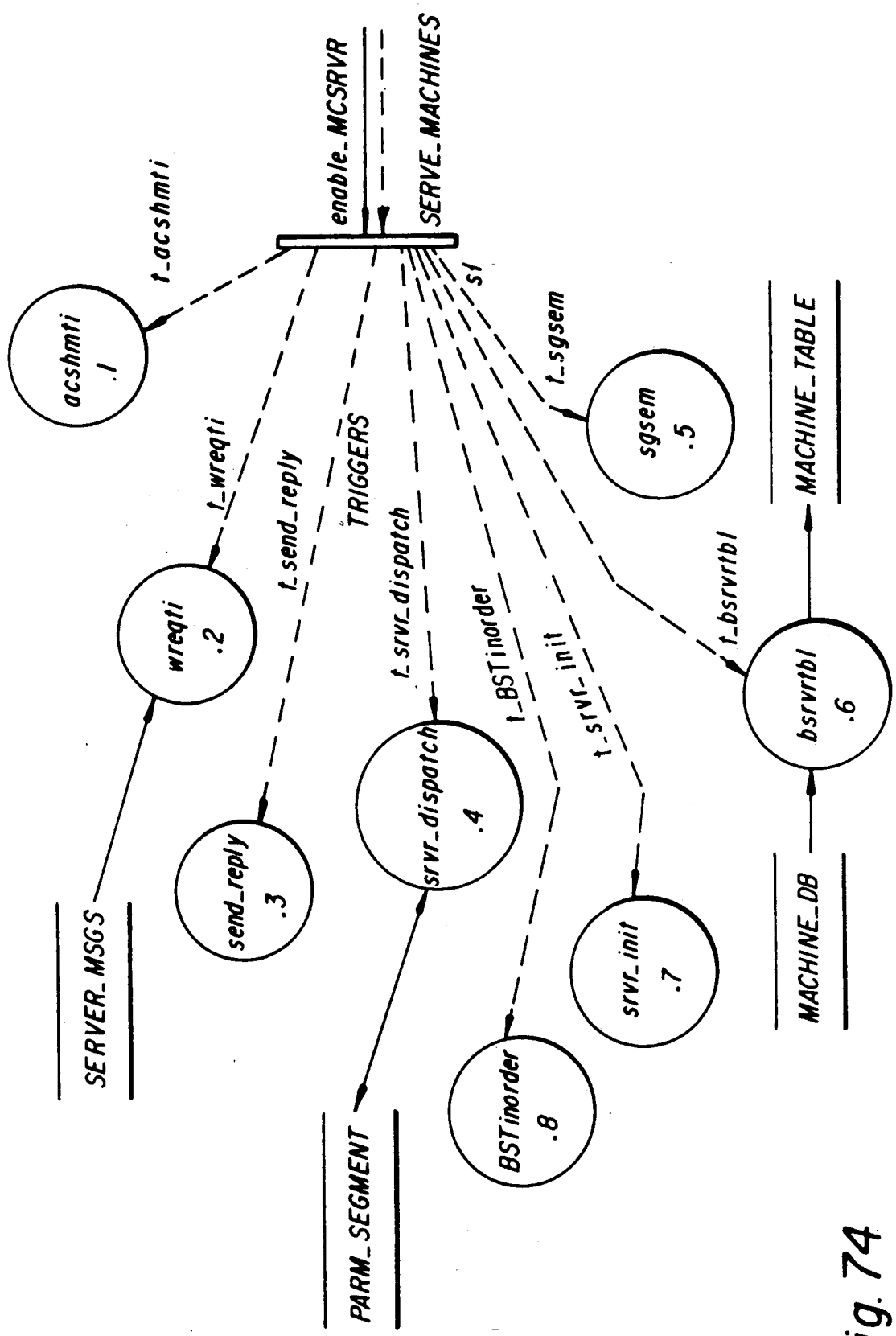
FIG. 74 Server Process: data flow diagram.
Figure 75:
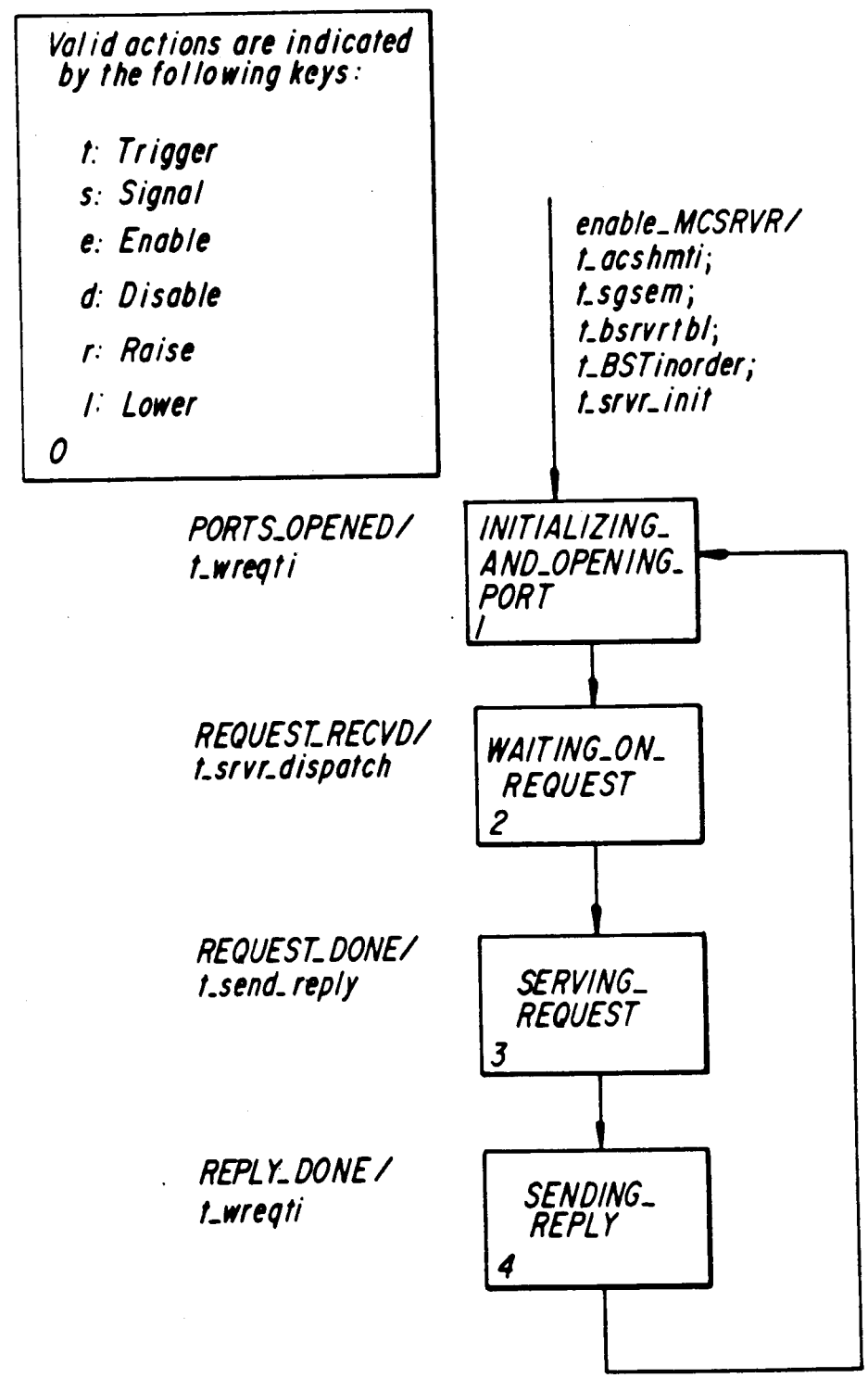
FIG. 75 Server Process: state transition diagram.
Figure 76:
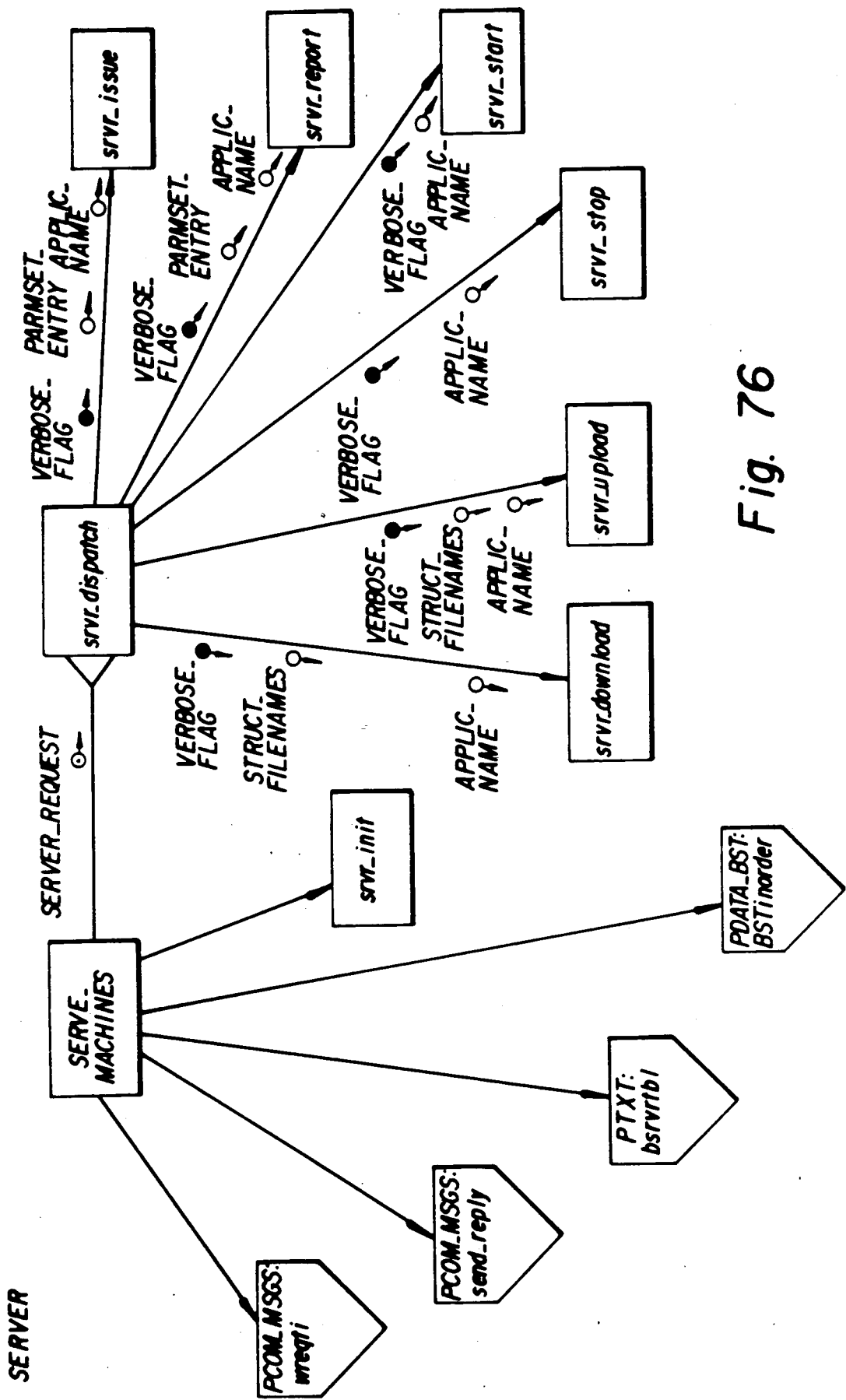
FIG. 76 Server Process: structure chart.

The Event Tracker Process (FIGS. 12c, 41-43) performs process event tracking when requested based on a previously loaded event table. The event table is loaded before tracking is initiated. When tracking is started Event Tracker performs the following functions (Refer to FIG. 43):

geteset—Gains access to the parameter set "events" to be tracked.

reportset—Requests the machine server(s) to report (collect) the appropriate events as specified in the parameter set "events".

chkevts—Checks the event buffer received from the machine server(s) for "active" events and, if enabled, signals the associated semaphore. Events that were enabled and set (previously by a Lot Control process during script interpretation), are then reset.

6.5: Interval Tracker

The Interval Tracker Process (FIGS. 12c, 44-47) performs process parameter tracking when requested based on a previously loaded interval table. The interval table specifies the rate at which each parameter is to be sampled. It first waits on a message request to perform one of the listed functions. The interval table is loaded before tracking is initiated. When tracking is started Interval Tracker performs the following functions:

getiset
  Gains access to the parameter segment for interval parameters.
  Finds the parameters to be sampled, checking the scheduled sampling time against the current time.

reportset—Requests the machine server(s) to report (collect) the appropriate parameter values as listed in the interval table.

postdbvals
  Posts the values collected by reportset, into the database.
  Scans the table to find the next scheduled sample time and loads a timeout variable; Interval Tracker then sleeps until either the timeout has elasped or another request message is received.

6.6: Lot Control

The Lot Control (FIGS. 12a, 48-56) process is used to assemble/verify scripts, and to process lots on them.

Processing of the lot currently includes interpretation of the script specified by the data. This involves accessing the shared script segment, assuring the script is idle and then making it busy, performing the interpretation (recursively), and then making the script idle again.

The ScrInterp function (FIGS. 53-56) is used to interpret the given script: freezing in run-time parameters where appropriate; handling events and errors as they occur; and writing trace information. It does so by walking the steplist left by the assembly process, and calling operation-specific functions (the IS functions) for each step. In doing so, it may be recursed by ISinterpret.

Each of the IS functions, of which there exists one per step type, are used to: scan fields for run-time symbols; perform run-time symbol substitution; generate a trace (if required); and, of course, carry out the operation.

Part of the functionality is to build and use symbol tables. This is distinguished from a similar function of the second pass of script assembly in the sense that the "define" step type is not used (indeed, it is a "no-op" as far as interpretation is concerned). Rather, the symbol table is built implicitly with contextual variables and by virtue of scripted "extract" steps. Otherwise, processing is similar to that done during assembly. Note that run-time symbols may not be defined in terms of assemble-time symbols.

The CheckWhens function (FIGS. 54-56) is used to check if any event listed as "when-event" has occurred. (A "when-event" is an event for which a trap has been scripted.) If a when-event is found to have occurred, the semaphore passed to Event Tracker is returned to the pool, and the previously scripted operation is performed. If the operation is a "goto", however, an appropriate return address is given so that if it is a jump in a parent script that ScrInterp may reach an appropriate level before the jump is actually taken.

Note that if more than one when-event has occurred, the most recently scripted (i.e., the last trap encountered) will be found and the search will be terminated. This is so that when-events are serviced in a deterministic order, and may be used to prioritize response if the scripted application requires.

6.7: Machine Control

The Machine Control Process (FIGS. 12a, 57-59) communicates commands and receives information from the workcell machine controller(s) through the machine server interface. A server table is loaded on initialization and includes information for mapping the appropriate server for a given machine request. Machine Control exists for two primary reasons. First, and foremost it provides for execution of machine operations (through interaction with various Server processes) asynchronously with interpretation of one or more process scripts (by various Lot Control processes). Second, it provides dynamic routing of machine requests to the appropriate server(s) by using a previously loaded server table to perform mapping of machines to servers. A by-product of this control scheme coupled with scripted operations is synchronization of machine operations across server(s). The following operations are provided:

INITCOM—initialize module and communications.
ISSUE—issue parameter data.
REPORT—report on parameter data.
UPLOAD—upload a process file.
DOWNLOAD—download a process file.
START_OP—start an operation.
STOP_OP—stop an operation.

6.8: Master Control

The Master Control Process (FIGS. 12c, 60-64) is used to initialize the workcell and administer job processing.

The Master Control Process takes responsibility on start-up for initialization of the workcell; the initialization is done based on the flags, or modes, passed to it. These modes are described later in this section.

Additionally, this process is used to execute jobs on the workcell. This entails traversing the job's lots, requesting a process of each lot on each workstation of the lot's route. A function "runlot" is used for this purpose, and it is passed flags which capture application-specific conventions on how script names are synthesized and what "wait mode" should be used when requesting the interpreters.

Requests to run jobs may come from the menu selection "startjob", or from a supervisory system.

The runlot function (FIGS. 61-64) administers lot processing, i.e., moving a lot through its route. Process Script names used in the requests are derived based on one or more of the following: route, product, operation, and/or workstation. Generally, applications differ in how the correct scripts are identified; but some combination of the listed items is certain to be appropriate.

In order to support differing applications, e.g., continuous versus discrete, it is necessary to define and use a "wait mode" that causes interpreters to process the lot with differing degrees of concurrency.

The "wcinit" function (FIGS. 60 and 62) is used to initialize shared resources of the process control system.

The initialization proceeds in a carefully ordered manner as follows:

MODE P: The parameter segment is initialized.
MODE M: The machine control subsystem is initialized by Machine Control based on a request from this function.
MODE E: The event tracking subsystem is initialized by a request to Machine Control.
MODE T: The Event Tracker(s) are requested to start their tracking immediately.
MODE S: The script segment is initialized by a script interpreter process based on a command from this function.

6.9: Mover-PD

The Mover-PD Process (FIGS. 12d, 65-67) handles all automated material handling services. These include maintenance of a database holding dock statuses, handling the communication protocol for the material handling equipment and handling the requests for this equipment. When material transfer takes place, quality data descriptive of prior processing as it affected the transferred materials is made available to the process recipient of the materials. This process is used to interact with a network of peer workcells in support of this function.

Given a material handling equipment request, validation of the request is performed to assure that it is valid for the prior status of the addressed station.

The "getreq" function (FIGS. 66 and 67) obtains a request from the material handling equipment.

The "validate" function (FIGS. 65-67) operates to validate a material handling equipment request.

The "pick_up" function (FIG. 67) is used to accept or reject a material handling vehicle's request to pick-up materials from a station. It does so based on the station's status; if accepted it modifies the status of the station to reflect the activity.

The "deliver" function (FIG. 67) is used to accept or reject a request to deliver materials to a WIP station based on the station's status. It updates the status of the station to indicate the activity taking place there.

The "succeeded" function (FIG. 67) is used to handle dock and station status changes and to feed forward process data relative to materials transferred.

The "failed" function (FIG. 67) annunciates and handles a failed material transfer operation.

The "respond" function (FIGS. 65-67) is used to respond to a material handling equipment request. This function is called by other functions to perform the required material handling equipment communications. It does not determine what a response should be, rather it simply passes along a response determined in other functions.

6.10: Plotter

The Plotter process (FIGS. 12d, 68-70) drives a multi-pen plotter to plot arbitrary parameter sets. It does so largely through the use of a function "wrt_hdgs", to prepare the heading of the next page, and multiple calls to "wrtcurve", to write the curves.

The page is prepared at the plotter, including the setting of scalings, orientation, writing any necessary labels or titles, and annotating the page with the key augmentation data (i.e., for example, if the request was to plot the set with values for a particular unit, the lot and unit identifications are written).

For each of the parameters in the set to be plotted:
The algorithm specified in the request is called with the raw data and returns processed data (a stub is available if no algorithm is needed);
The curve is written on the page with the specified pen.

The plot is completed by ejecting the page from the plotter.

The "pltstub" stub function (FIG. 70) is used as a default plotting analysis routine. This function may serve as a template from which development of an application specific algorithm may begin. As it stands, it writes the input values directly to the y array in the curve structure, and writes an index into the corresponding x array. Conversion of the index and the value is performed as required.

6.11: Restart

The Restart process (FIGS. 12b, 71-73) is used to administer operating system resources and workcell computer processes. Its primary use is to establish the environment in which workcell computer processes will run; this entails creating the required message queues, semaphore pools, semaphores, and shared memory segments required for these tasks. The processes themselves are also spawned, and are passed appropriate arguments.

The process sets up this environment according to what it finds in a "configuration file"; if none has been specified on the command line, the program uses a default configuration file. After the file has been read, verification takes place relative to the uniqueness of the various resource keys; thus the requested configuration is checked for errors or internal inconsistencies to this extent.

Once the program has gen'ed (brought up) the system, it waits for a request to either remove the system and exit, or re-gen the system according to a new (or the same) configuration file.

The "bring-up" function (FIGS. 71-73) brings the system up in phases. First, the requested configuration is captured from the specified file. Then, a check is run to verify the uniqueness of keys within required sets, then the system resources are created and an "installed" configuration structure is built and retained.

The "read_conf" function (FIG. 73) is used to read the configuration file. The specified workcell system configuration is read, and a structure of requested configuration is built.

The "uniq_key" function (FIG. 73) is used to verify the uniqueness of various Inter-Process Communication (IPC) resource keys.

The "build_sys" function (FIG. 72) creates resources required for the process control system.

The "take_down" function (FIGS. 71-73) is used to take down the workcell computer system resources indicated as being up in memory, per the installed configuration structure.

6.12: Server

The Server process (FIGS. 12a, 74-76) provides a two layer architecture. The first layer or "front end" provides a standard interface for access by other processes. Various workcell computer processes interact with server(s) by making requests to perform some machine command (of the standard set). As the request is processed by the server(s) the second layer or "back end" translates the request into the appropriate format and protocol for the machine controller specified and communicates this message to the machine. Each server process is created by linking the specified library of functions (i.e. "back end") into the "front end" template. In this way both generic server processes, as well as custom processes can be easily created with server operation and protocol transparent to other workcell processes. Many servers may exist on a process control system at any point in time, each communicating a particular protocol for servicing process equipment.

7. Library Descriptions 7.1: DBMS Library

Figure 77:
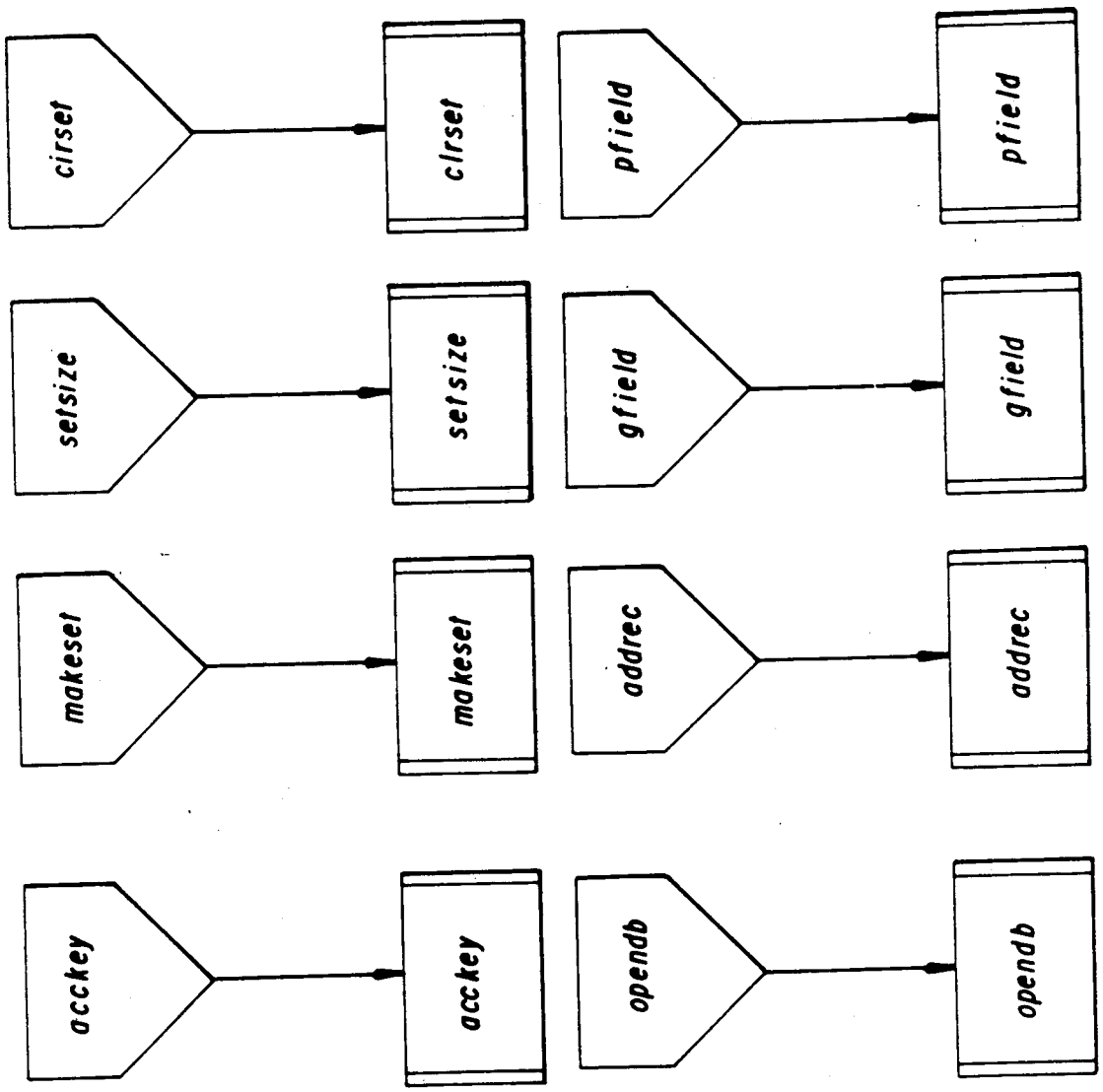
FIG. 77 DBMS library diagram.
Figure 79:
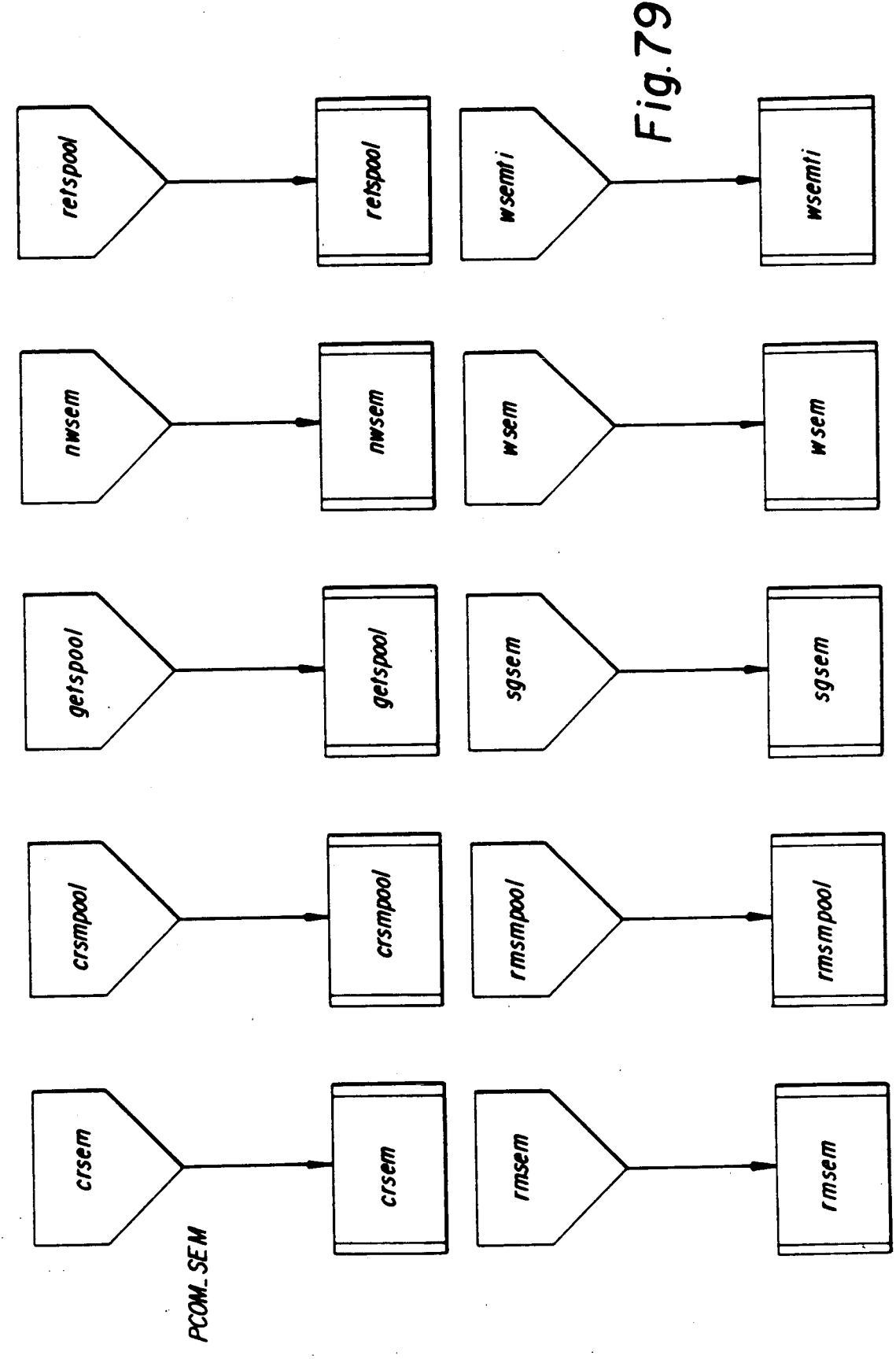
FIG. 79 is a diagram illustrating the PCOM_SEM library modules.
Figure 83A:
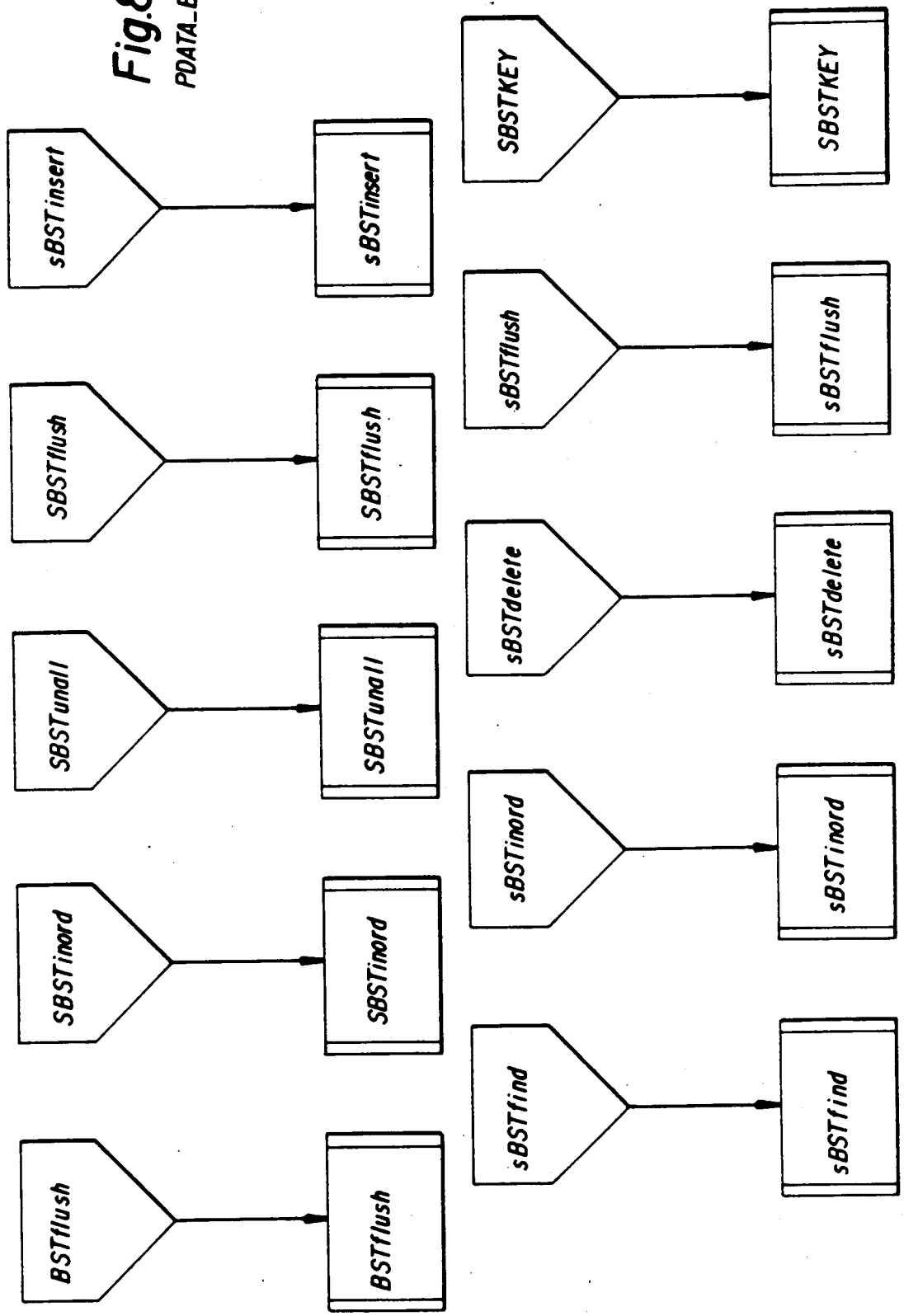
FIGS. 83a, and 83b form a diagram illustrating the PDATA_BST library modules.
Figure 83B:
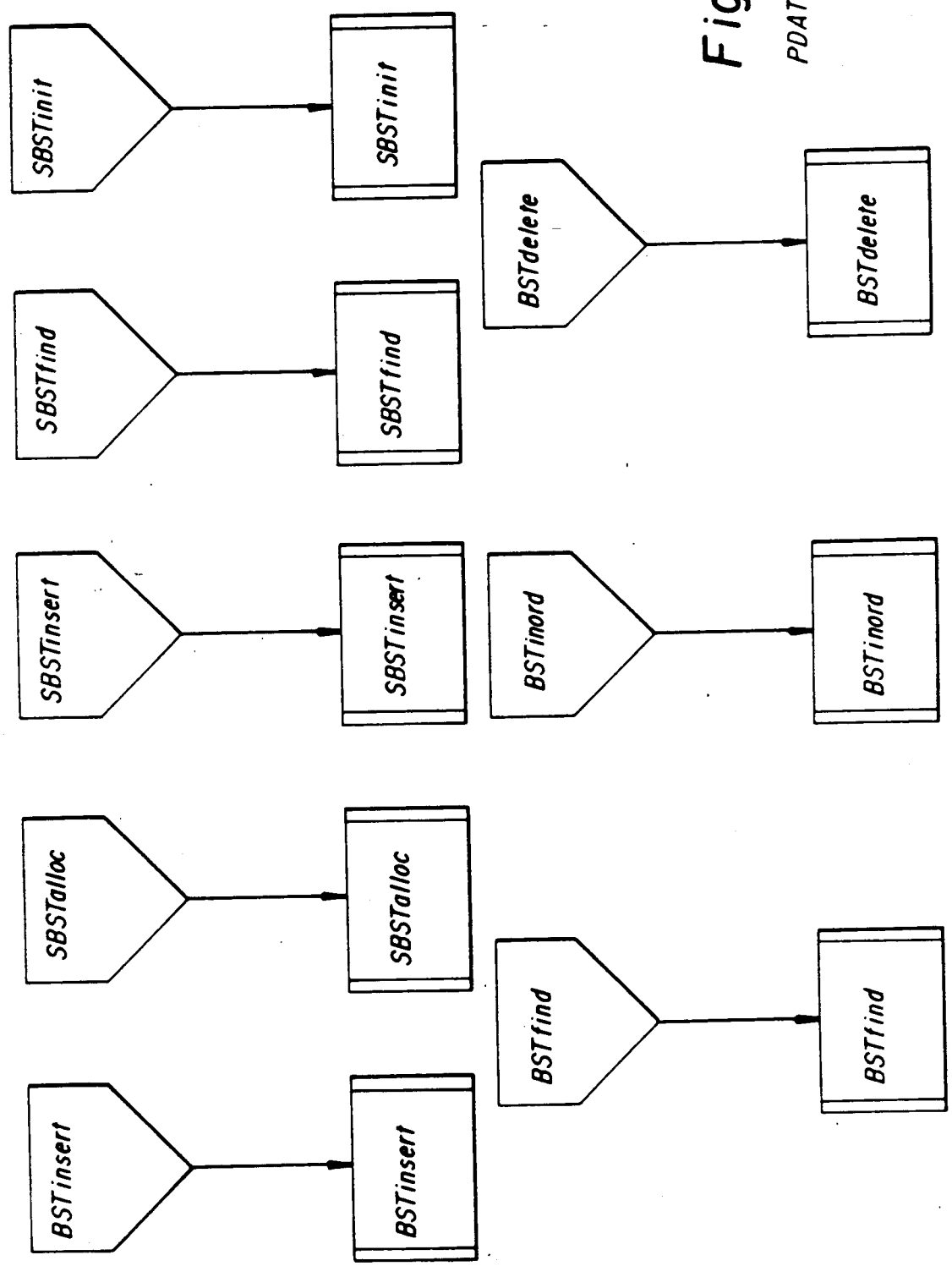
Figure 84B:
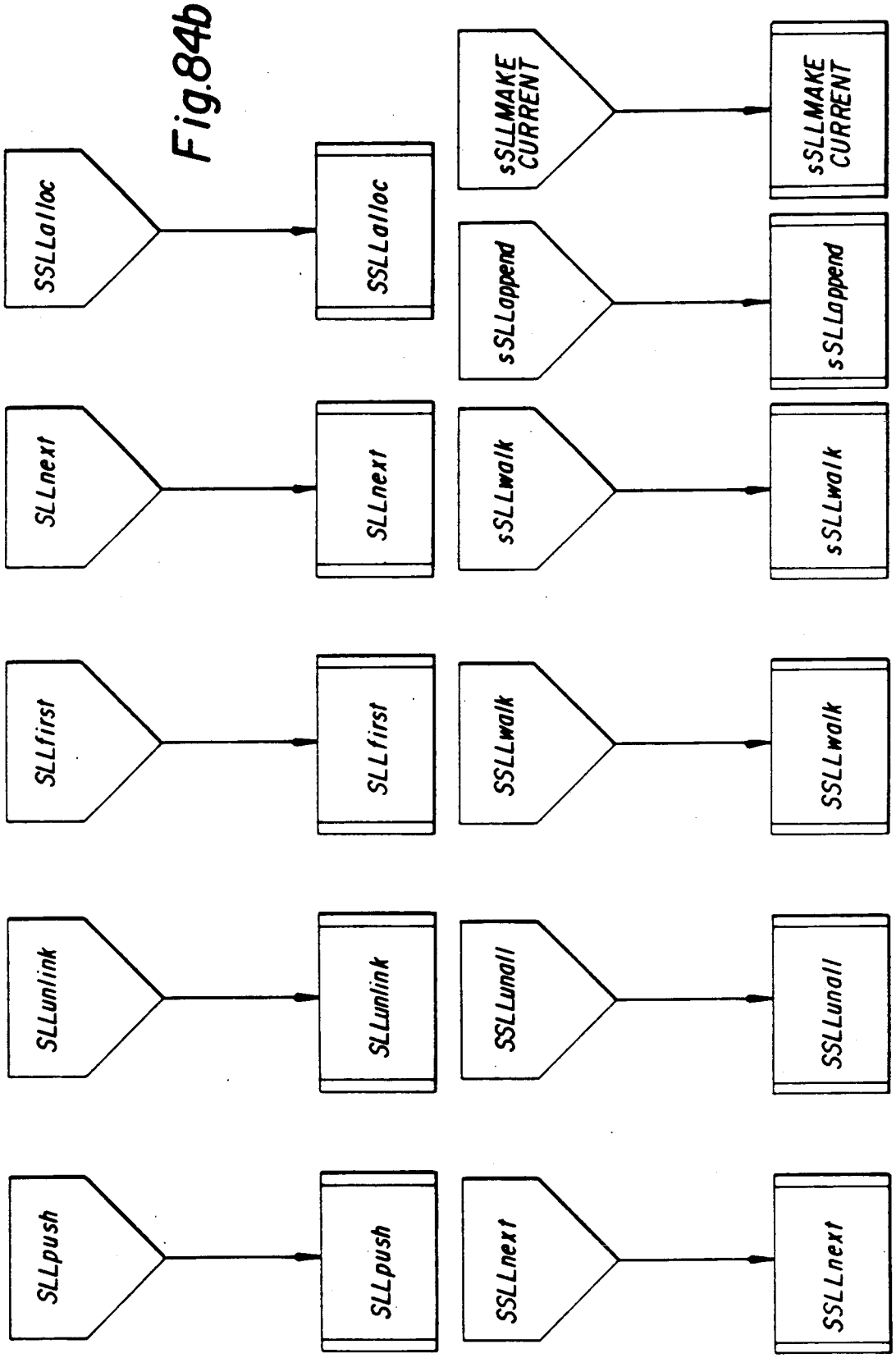
Figure 85B:
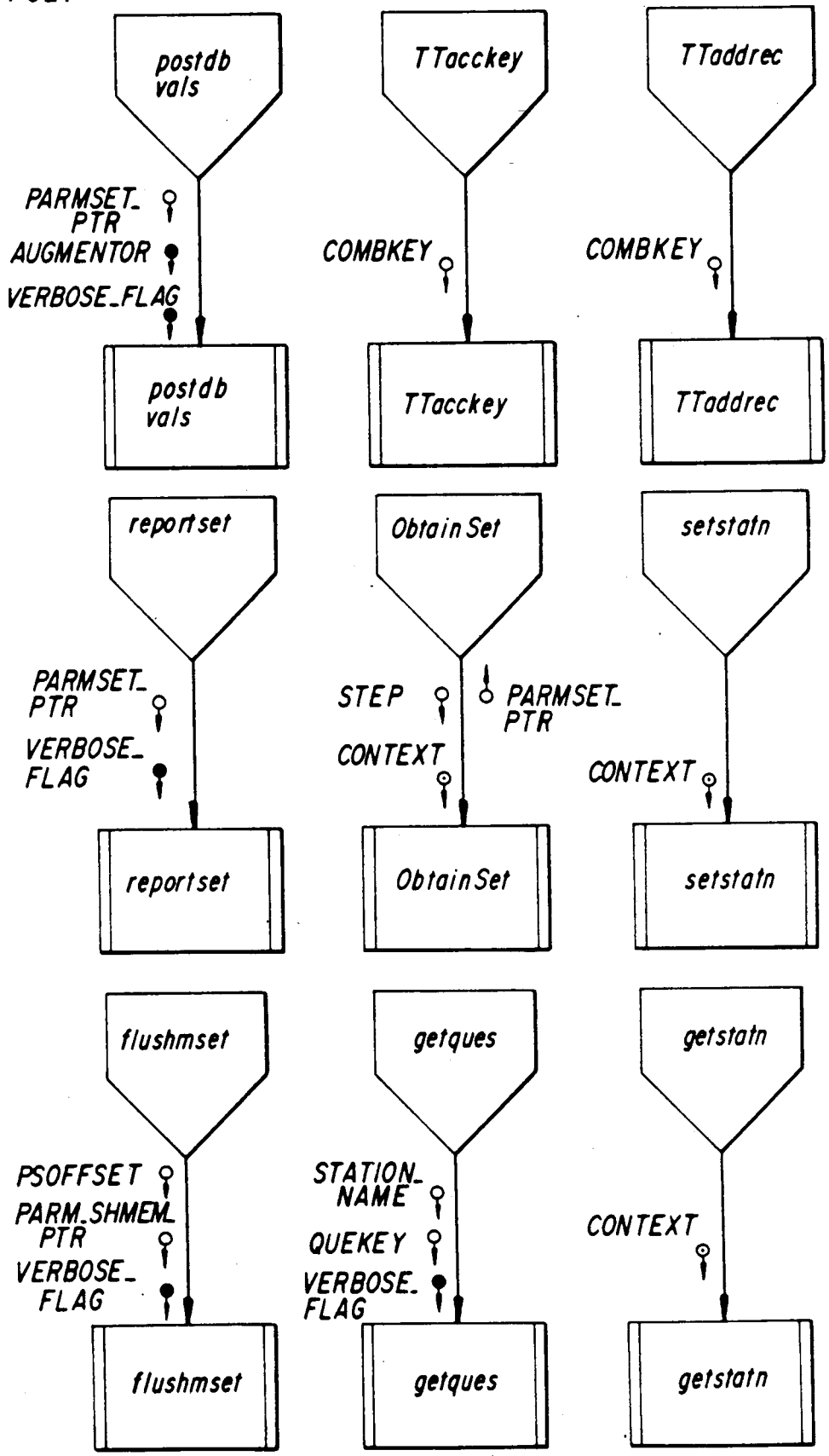
Figure 85C:
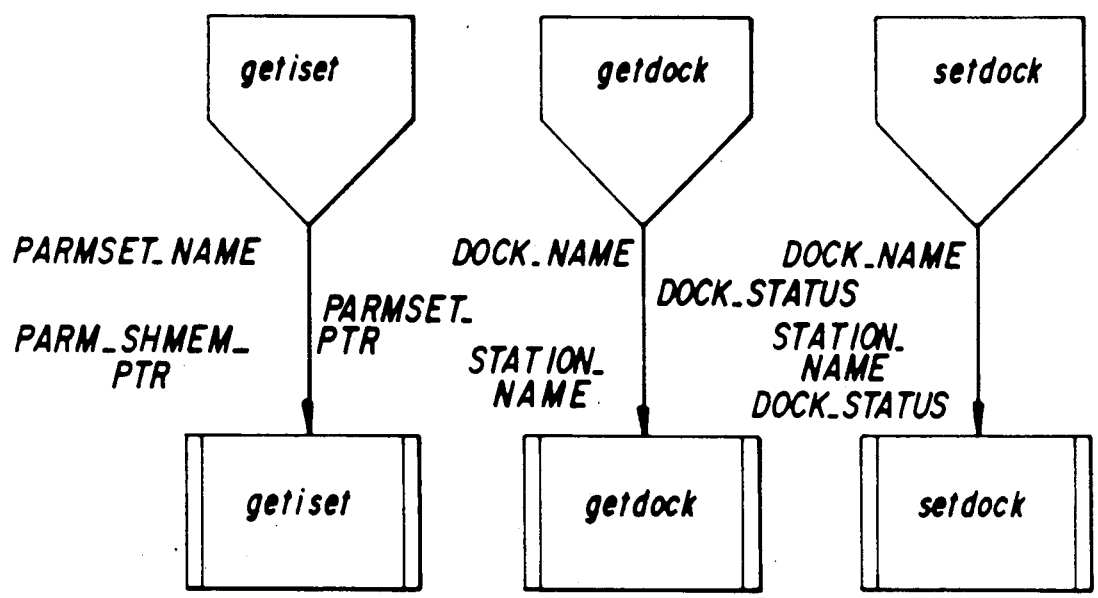
Figure 86B:
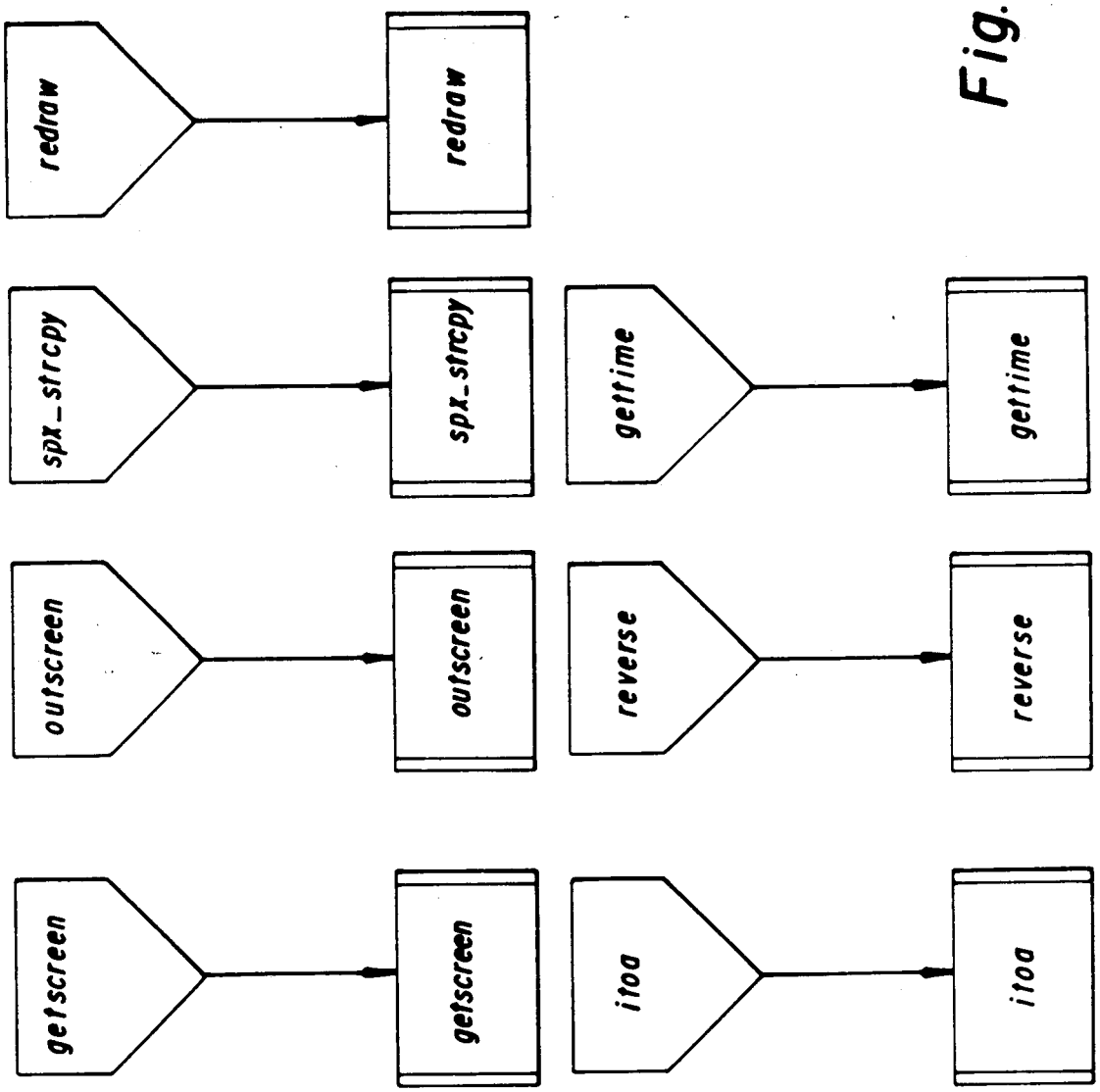
Figure 87:
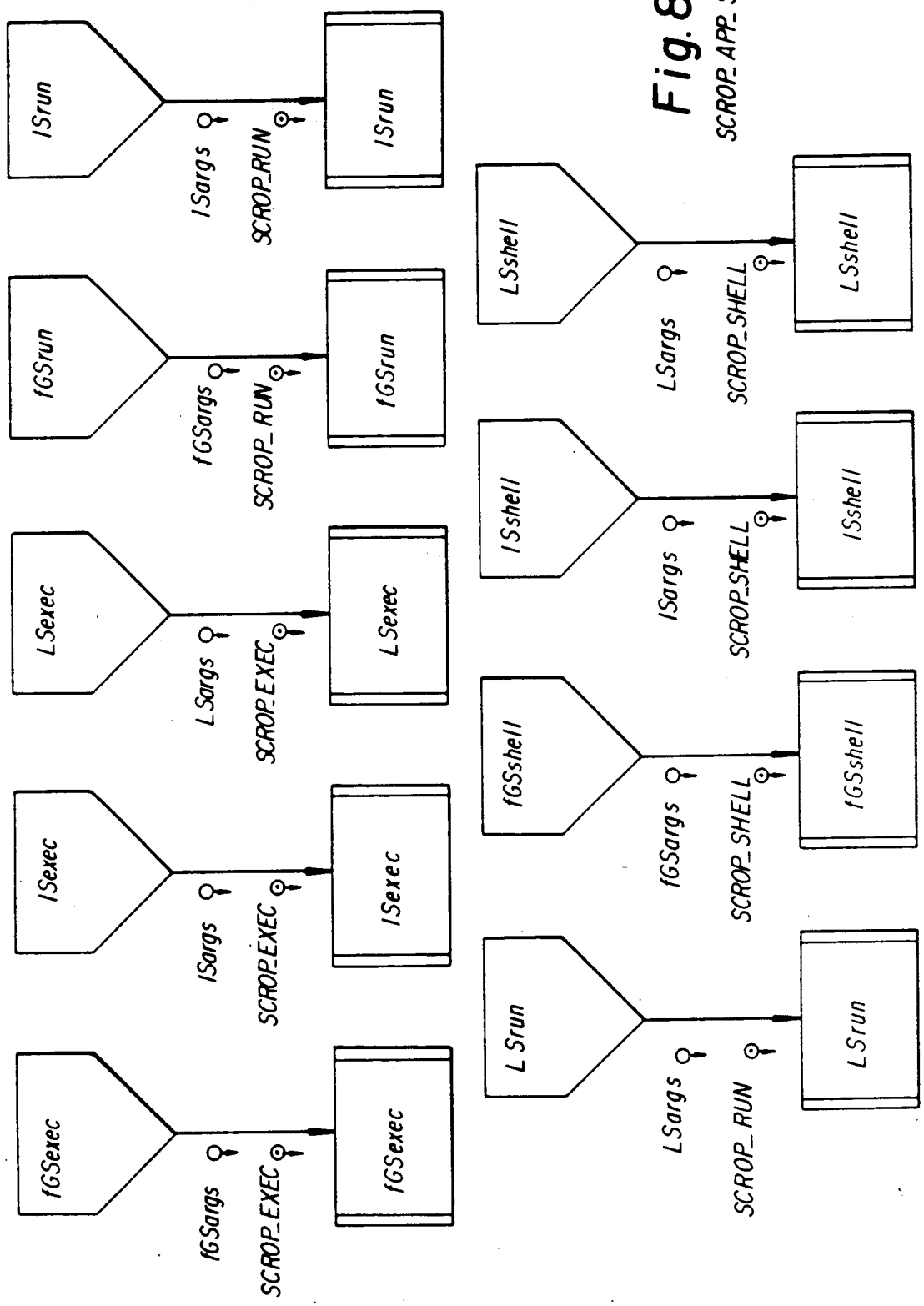
FIG. 87 is a diagram illustrating the SCROP_APP SPECIFIC library modules.
Figure 88A:
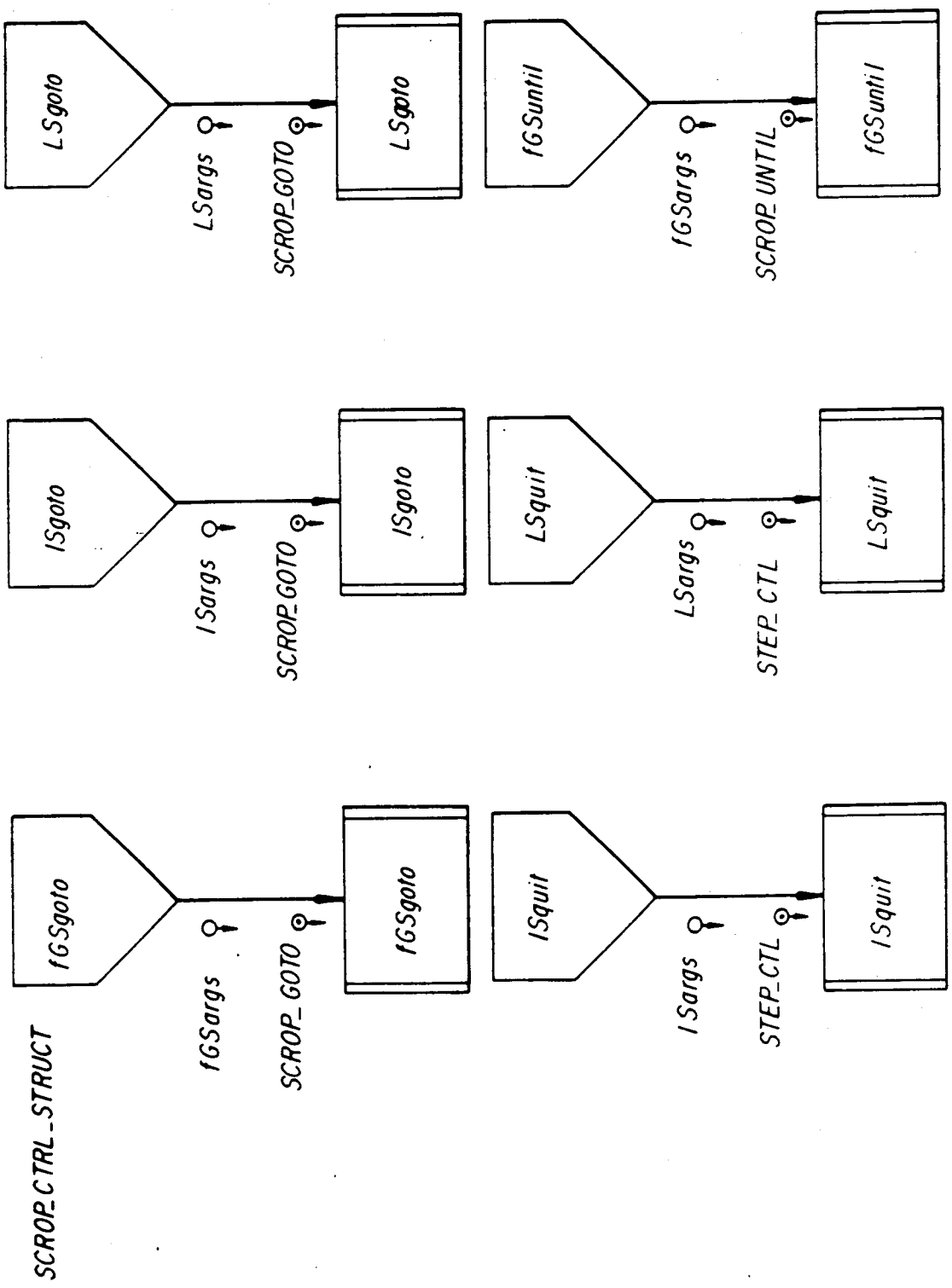
FIGS. 88a, and 88b form a diagram illustrating SCOP_CTRL_STRUCT library modules.
Figure 88B:
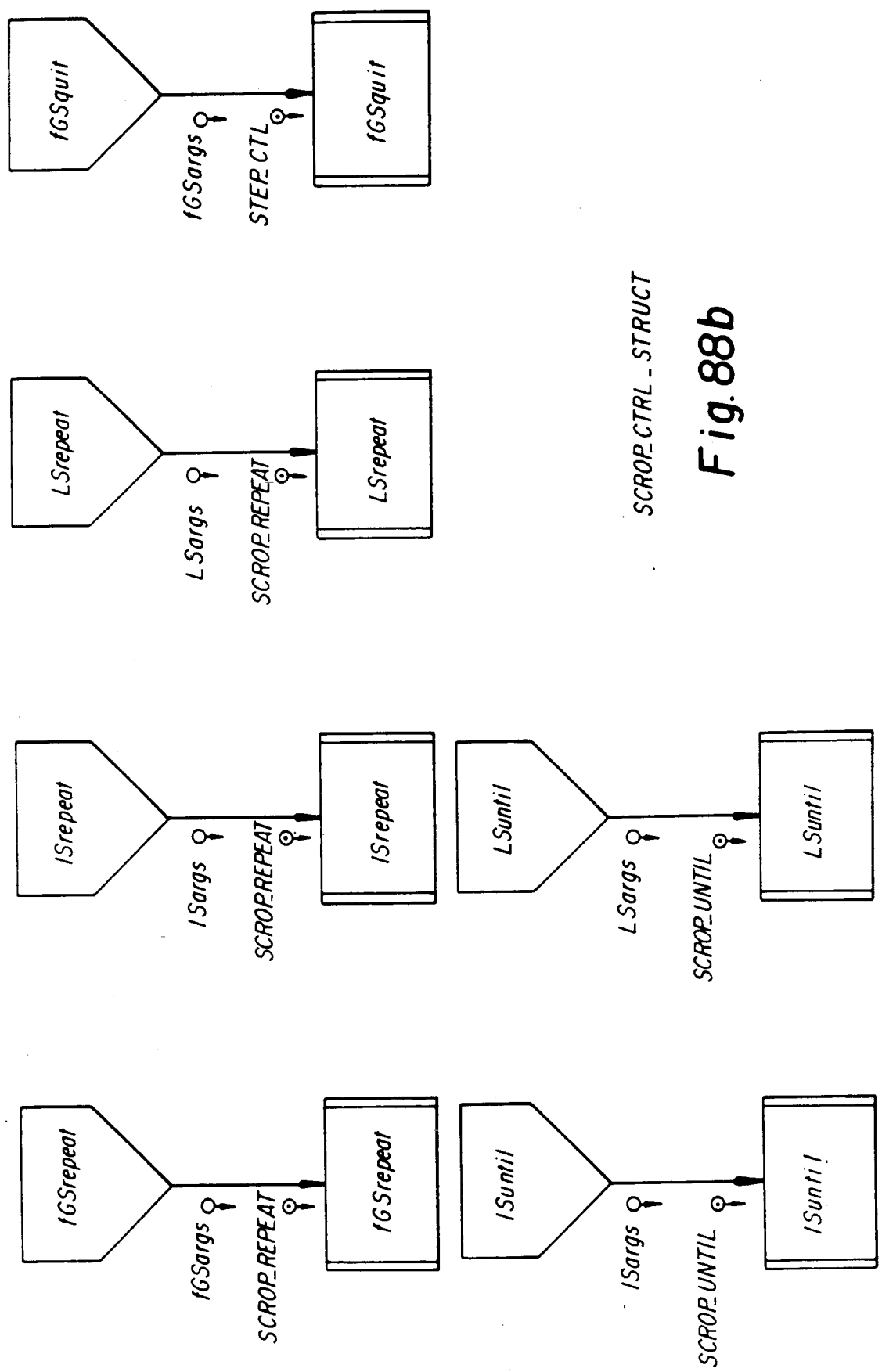
Figure 89A:
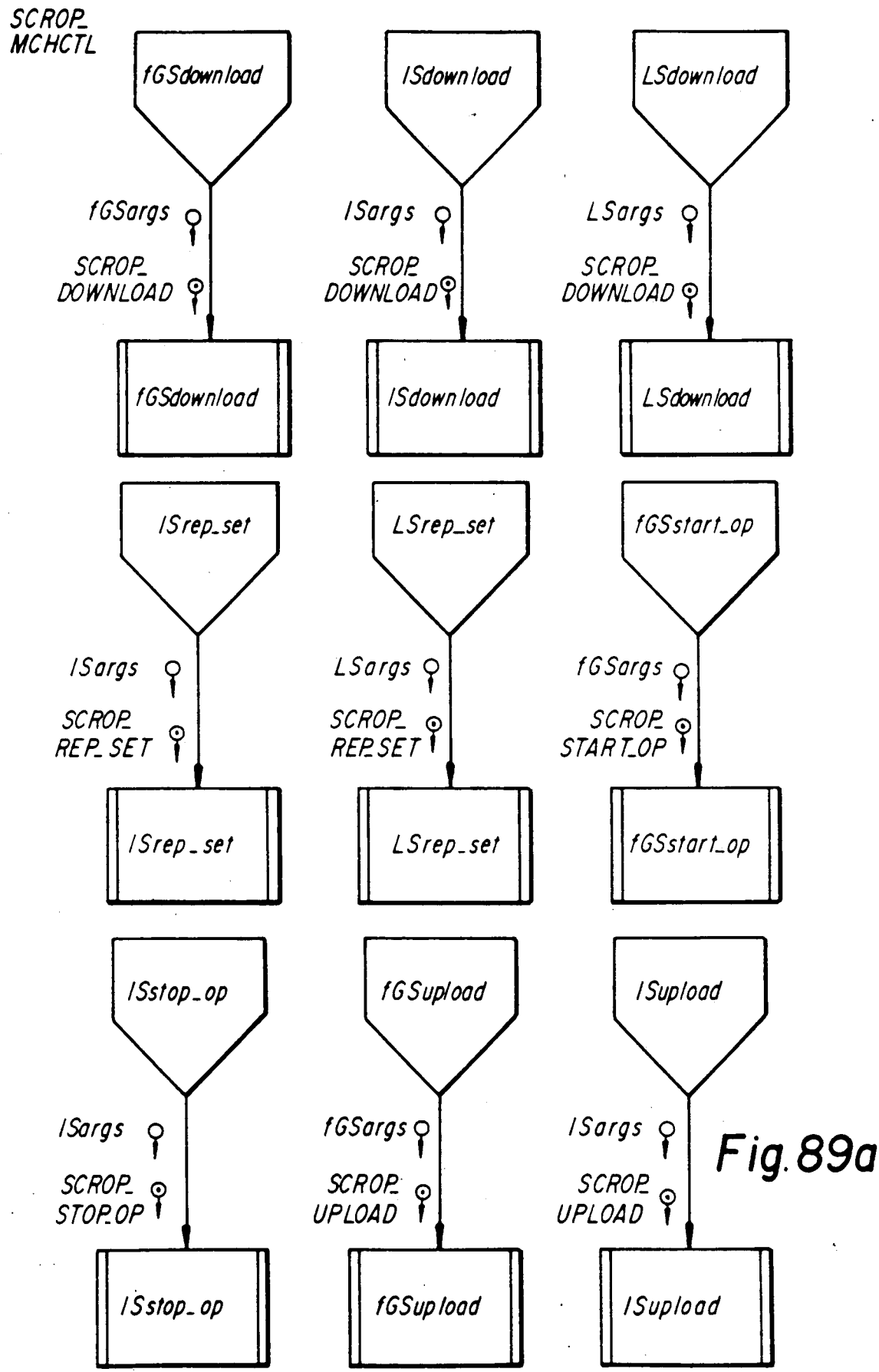
FIGS. 89a, and 89b form a diagram illustrating SCROP_MCHCTL library modules.
Figure 89B:
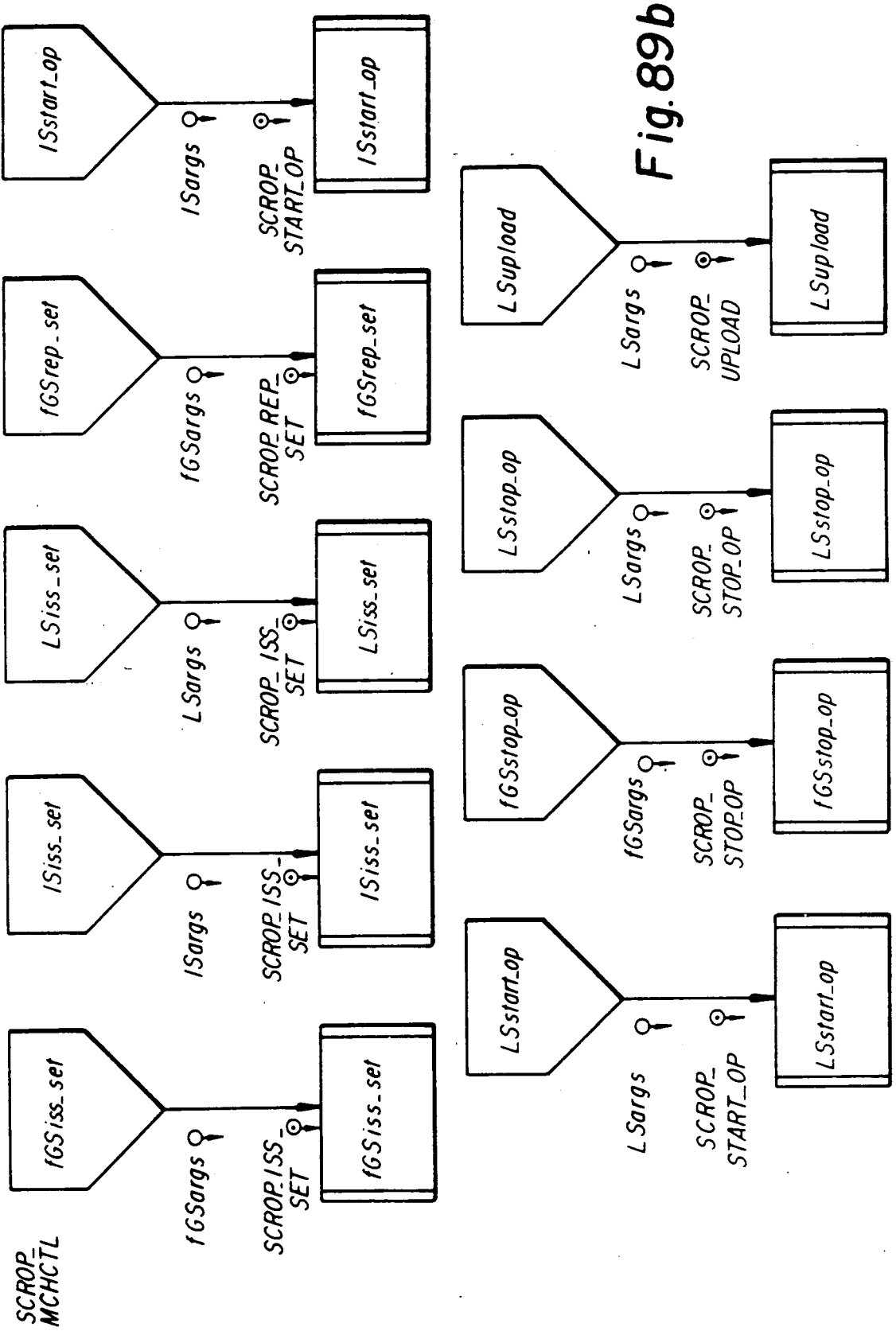
Figure 90C:
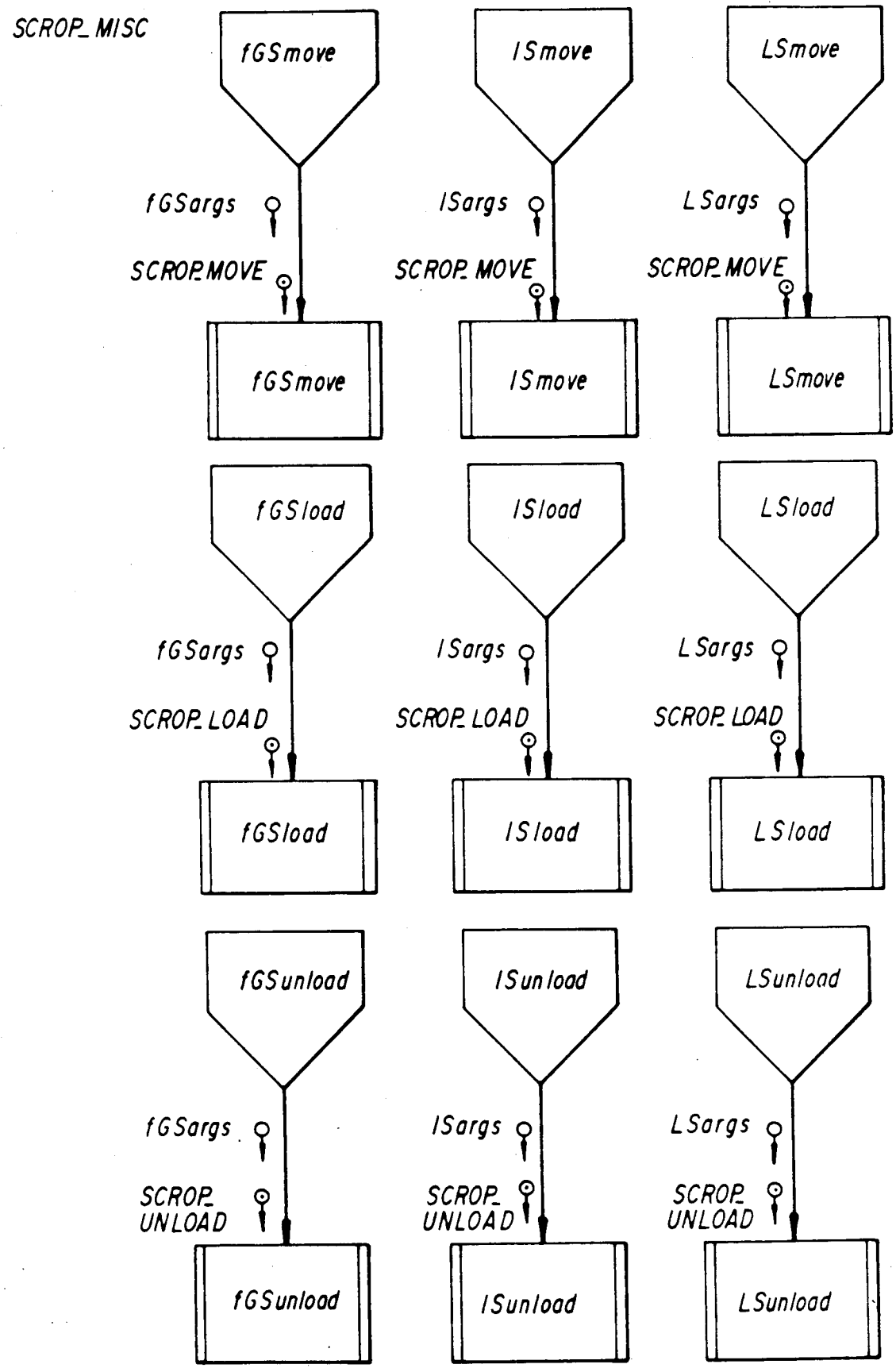
Figure 91:
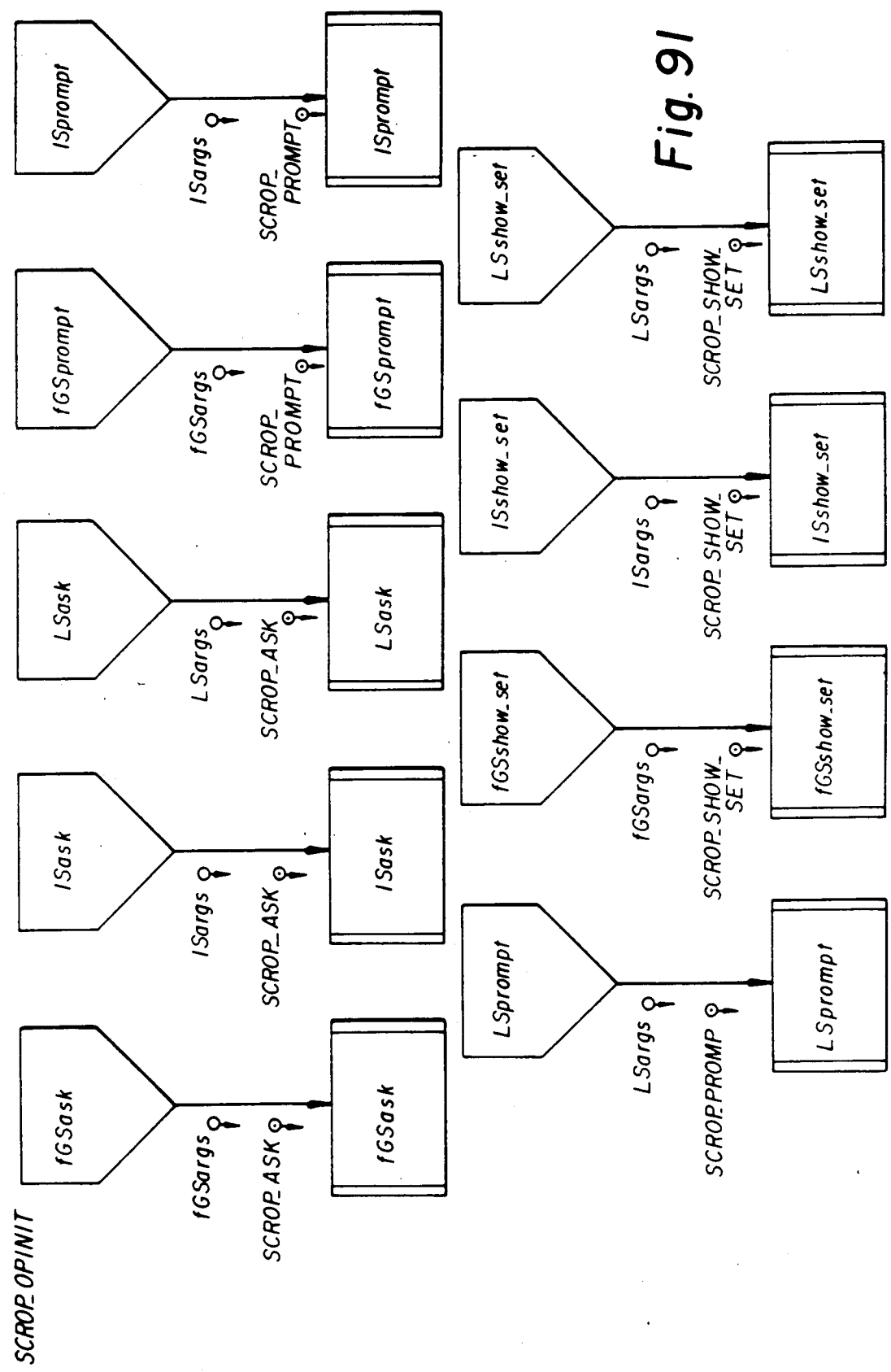
FIG. 91 illustrating SCROP_OPINIT library modules.
Figure 92A:
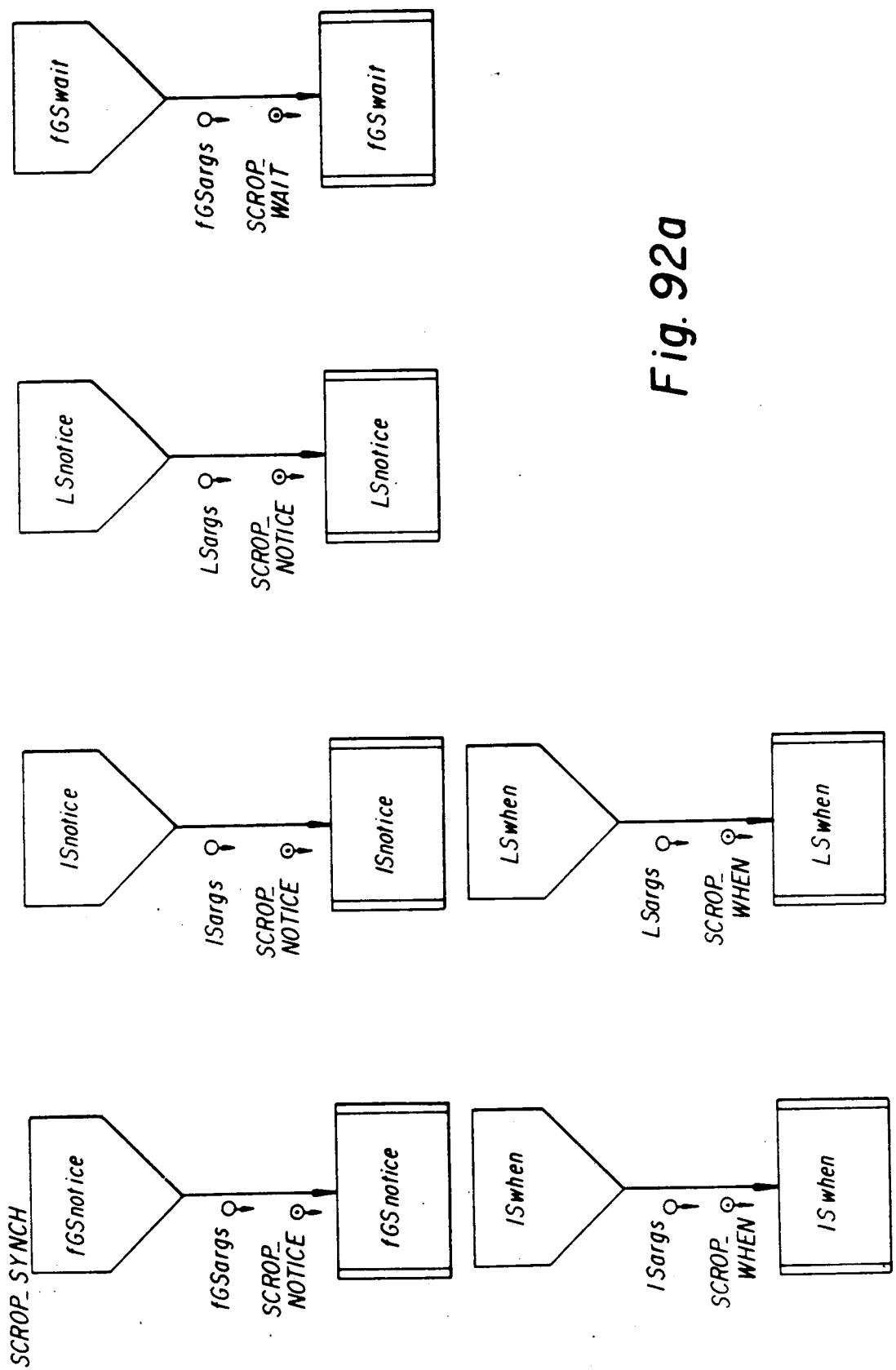
FIGS. 92a, and 92b form a diagram illustrating SCROP_SYNCH library modules.
Figure 92B:
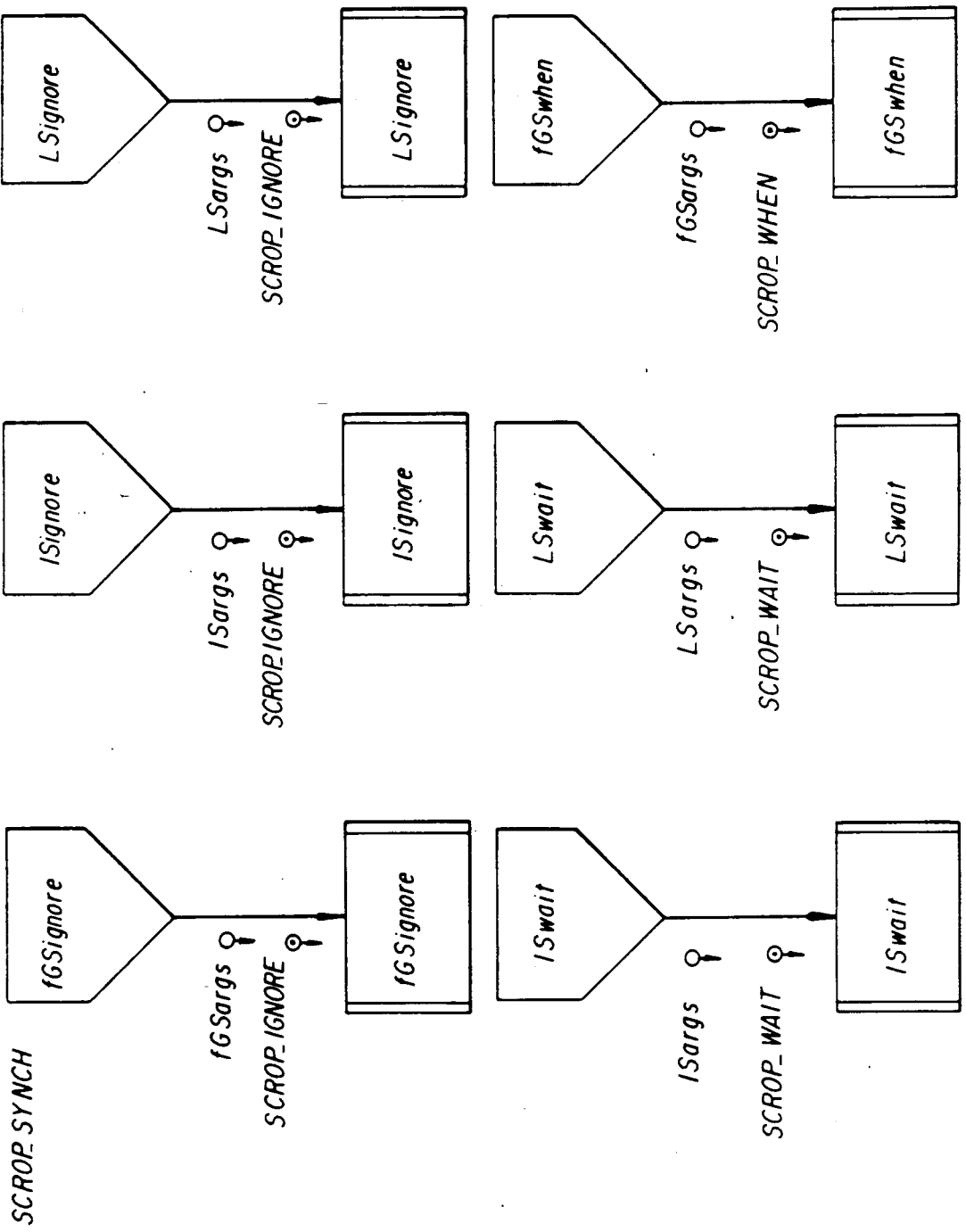

FIG. 77 depicts the Unify database functions (DBMS) that are directly referenced. The reader may refer to the Unify Technical Reference Manual for the manual pages associated with each of these functions. Unify is the relational database implemented in the embodiment of this invention; however, other relational database systems could have been implemented as well.

7.2: PCOM Library

The Interprocess Communication software layer can be functionally broken down into the following five categories of utilities:

7.2.1. Request Process Execution
7.2.2. Resource Access Arbitration
7.3.3. Shared Memory
7.2.4. Semaphore Pool
7.2.5. File and Physical Input/Output Following is the functional description of these utilities as implemented under XENIX SYS V (UNIX SYS V) operating system.

For the most detailed description of all IPC software utilities refer to the Appendix E containing manual pages extracted from the source code listings. Each manual page contains detailed information about the operation performed, function call syntax, parameters required, return status etc.

7.2.1: Request Process Execution Utilities

This set of utilities provides the mechanism for a process to request the execution of another process to perform a specified operation. Let us call the requesting process CLIENT and the destination process SERVER. A given process can act both as a CLIENT to some processes and as a SERVER to others. There are three types of requests:

1. Request a process for execution, do not wait on reply.
2. Request process for execution, wait indefinitely on reply.
3. Request a process for execution wait on reply with timeout.

Media used to send all requests and replies is the "message queue" under XENIX SYS V (UNIX SYS V). Each request or reply message consists of two basic parts, the header and the message text. The message header is fixed and contains information such as requesting process id, command to be performed, request type and error status. The message text part is variable in length and the contents are application specific.

Each process in the system that can act as a SERVER process has two message queues associated with it. The first one is the REQUEST message queue. All requests from CLIENT processes to the SERVER are deposited in the SERVER's REQUEST queue in a first in first out (FIFO) order. The SERVER, while having nothing else to do, is normally waiting to receive a request on its REQUEST queue. If the queue is empty (no requests pending), the SERVER is suspended by the operating system and therefore does not consume any CPU cycles. Upon receiving of the request, the SERVER resumes execution to perform the specified operation.

The other message queue associated with SERVER process is the REPLY message queue. It is used to send the reply back to the requesting CLIENT process. The reply message contains the status of the operation performed by the SERVER and optionally the data as required by a particular application. The data portion if present can contain data of any type, the only stipulation obviously being that the SERVER and respective CLIENT processes strictly adhere to the particular format chosen for the application.

7.2.2: Resource Access Arbitration Utilities

The semaphore concept is widely used in the concurrent processing environment for the purpose of arbitrating access to shared resources. It provides an essential synchronization mechanism when different processes have a need to access the same resource in a mutually exclusive manner. Mutual exclusion is necessary to assure the data integrity of the target resource. If processes were allowed to use the resource without first securing an exclusive access to it, the result could be corruption of the data possibly leading to a system crash.

The Resource Access Arbitration utilities have been developed on the base of XENIX Sys V (UNIX Sys V) operating system provided "semaphore" facilities; the emphasis was on simplifying the use of semaphore facilities at the level of application programming, thus freeing the application programmer from getting heavily involved with the internal intricacies of the particular operating system. Another important enhancement was adding the timeout feature, not normally provided by the operating system. The timeout, while waiting on a particular semaphore to become available (resource unlocked for use), prevents occurrence of deadlocks, a major concern in a concurrent processing environment.

The important notion to understand about the semaphore use is, that semaphores only provide a synchronization mechanism to access the shared resource and not resource protection. It means, that any process wishing to use the shared resource must without an exception strictly follow the procedure presented in the next paragraph.

Semaphore operations fall into two major categories: "wait on semaphore" and "signal semaphore". The "wait on semaphore" type currently consists of three functions "nwsem", "wsem" and "wsemti". The "signal semaphore" type has currently only one function "sgsem". Each access to a shared resource must be bracketed by function calls of types "wait on semaphore" and "signal semaphore".

It means, that any process wishing to gain access to this resource must first execute the function call of type "wait on semaphore". If the resource is already in use (locked) by another process, the calling process suspends, waiting for it to become available (unlocked). When the resource becomes available (unlocked), the function returns with success, meaning that the calling process has gained an exclusive access and can proceed with using the resource. While the process enjoys exclusive access to the resource, the resource is unavailable (locked) to other processes. After the process is done with using the resource, it must execute the function call of type "signal semaphore" making the resource available (unlocked) for use by other processes vying for access.

7.2.3: Shared Memory Utilities

Shared memory utilities provide a mechanism for controlled access to shared memory segments by different processes. In XENIX (UNIX) operating systems, each process executing under the operating system's control is assigned a unique area of memory space for its program and data sections. This provides a security mechanism so that one process cannot inadvertently access and alter the memory image of another process, which could prove disastrous for the system. Because of the need of cooperating processes in a multitasking environment to exchange and communicate data, the XENIX (UNIX) operating system provides the facility called "shared memory" (the same name is used but the system services are at a lower level). Shared memory is the portion of main computer memory which can be directly accessed by one or more processes. In other words, the same portion of main memory is mapped into the address space of one or more processes. The mapping is controlled by the operating system and associated hardware. By sharing memory, processes can communicate with one another in a fast and efficient manner by reading and writing that memory.

Unfortunately, however, the shared memory facility as provided by the operating system only offers the mechanism of accessing shared memory segments without providing any access synchronization by means of mutual exclusion. Sharing memory in itself is not sufficient to assure controlled access to that memory by competing processes. The Shared Memory Utilities offer that functionality by incorporating semaphores to arbitrate access to shared memory segments in a mutually exclusive manner. The use of semaphores has been made totally transparent to the application programmer. Another important enhancement provided by the Shared Memory Utilities is the use of timeouts to prevent deadlocks in the situation when a process is waiting on the shared memory segment to become available, and the shared memory segment for whatever reason is permanently locked (never becoming free).

Some explanation is due, at this point, to contrast the use of shared memory with that of messaging, because they may appear to duplicate each other's functionality.

Shared memory should mainly be used for relatively "static" data, that can be updated or otherwise accessed by more than just two processes. It may also be used when very frequent and rapid access to data (such as machine or cell status, configuration etc.) is required and other methods of data storage and retrieval such as data base system or file system cannot be used because of the very short access time required. Messaging on the other hand will be typically used for "short lived" data associated with request process execution utilities and for exchanging messages between two processes.

7.2.4: Semaphore Pool Utilities

Semaphore Pool Utilities have been implemented to provide means of creating pools of semaphores to be used by processes that have needs for using semaphores in a dynamic fashion. The semaphore pool is implemented as a message queue with semaphore identifiers stored on that queue in first in first out (FIFO) order. When the process needs a semaphore, it executes "getspool" function call which will receive the semaphore identifier from the head of the queue and pass it back to the process. After the process is done with using the semaphore, it executes "retspool" function call which returns the semaphore identifier back to the pool by appending it to the tail of the message queue.

The Semaphore Pool concept is utilized by the Request Process Execution utilities and specifically those providing deadlock recovery by means of timeouts. The semaphore obtained from the Semaphore Pool is used to synchronize the requesting CLIENT and requested SERVER process activities, such as to prevent the SERVER process from sending the reply message to the CLIENT process, in a case when the latter one has already timed out and is not waiting for a reply any more.

7.2.5: File and Physical I/O Utilities

I/O utilities provide enhanced file and peripheral read/write capability. The main feature is incorporating timeouts for read and write operations. The use of timeouts prevents the occurrence of deadlock situation if the I/O operation can not complete. In that case, after the timeout expires, the calling process returns from wait on I/O with the timeout error indication and can take recovery action rather than waiting forever on the I/O completion.

7.3: PDATA Library

The following abstract data types (ADTs) are supported by the PDATA library, with their abreviations:

7.3.1. AS: Array Stack.

7.3.2. BST: Linked Binary Search Tree (sorted list, or set).

7.3.3. NFM: "Next-Fit" Shared Memory Pool.

7.3.4. SLL: Singly-linked List (may also serve as a linked queue, stack, or hybrid).

7.3.5. SBST: Shared BST (also sBST).

7.3.6. SSLL: Shared SLL (also sSLL).

Refer to Appendix F for usage and conventions for the modules.

A brief description of each type, with specific module references, follows:

7.3.1. AS: Array Stack (local).

The array implementation is the most efficient means to implement a stack, but SLL is more flexible.

STACK: Process allocates memory for an element to be pushed (ASALLOC).

Process adds elements to the stack (ASpush).

Process may review the top element for service (ASTOP).

Process may serve the top element (ASpop).

7.3.2. BST: Sorted list or set (linked Binary Search Tree).

SORTED LIST: Process allocates memory for elements to be added (BSTALLOC).

Process inserts into the list (BSTinsert).

Process may traverse the set in order of keys, applying a function to each element (BSTinorder).

Process may flush a list (BSTflush).

SET: Process may add elements to the set as mentioned above.

Process may find elements by key (BSTfind).

Process may delete elements by key (BSTdelete).

Process may flush a set (BSTflush).

7.3.3. NFM: Shared "Next-Fit" Memory Pool (shared OR local).

MEMORY POOL: Process may initialize the pool (NFMinit).

Process may allocate memory from the pool (NFMalloc).

Process may return allocated blocks to the pool (NFMfree).

7.3.4. SLL: Singly-linked List (may also serve as a linked queue, stack, or hybrid).

LIST: Process allocates for elements to be added (SLLALLOC).

Process adds items by appending after current (SLLappend).

Process traverses list either one element at a time (SLLfirst, next), or applies a function to each element with a single call (SLLwalk).

Process may remove specific elements (SLLpeek, unlink).

QUEUE: Process allocates for elements to be enqueued (SLLALLOC).

Process enqueues by appending at the tail (SLLappend).

Process reviews the head element for service (SLLHEAD).

Process "serves" the head element (SLLserve).

STACK: Process allocates for elements to be pushed (SLLALLOC).

Process pushes elements to be added (SLLpush).

Process reviews the head element for service (SLLHEAD).

Process "serves" the head element (SLLserve).

7.3.5. SBST: Shared BST (also sBST).

Refer to BST (7.3.2) for application examples. This ADT supports the same applications but in such a way as to allow the resultant structure to be shared amongst processes. As with other shared types, there are two "groupings" of functions, those that are "protected" and those that are not. A given application may use the unprotected functions only to the extent that timing between cooperating processes is ensured through direct use of the pcom shared memory functions; the protected functions handle this implicitly and as such may be used in a more cavalier fashion.

It is possible to have different types of trees in a shared segment. A tree is said to be "primary" if its root is accessable by multiple processes with only the host segment's key (name). However, shared trees may also be accessed by more arbitrary structures; in this case they are not "primary" to the segment. Generally, the protected functions access only primary trees, while the unprotected functions are more flexible.

The unprotected functions may access a segment's primary tree through use of the macro (FINDROOT) for this purpose.

7.3.6. SSLL: (shared) Singly-linked List (may also serve as a linked queue, stack, or hybrid)

Refer to SLL (7.3.4) for application examples. This ADT supports the same applications but in such a way as to allow the resultant structure to be shared amongst processes.

As with other shared types, there are two "groupings" of functions, those that are "protected" and those that are not. A given application may use the unprotected functions only to the extent that timing between cooperating processes is ensured through direct use of the pcom shared memory functions; the protected functions handle the pcom implicitly and as such may be used in a more cavalier fashion.

It is possible to have different types of lists in a shared segment. A list is said to be "primary" if its header is accessable by multiple processes with only the host segment's key (name). However, shared lists may also be accessed by more arbitrary structures; in this case they are not "primary" to the segment. Generally, the protected functions access only primary lists, while the unprotected functions are more flexible. The unprotected functions may access a segment's primary list through use of the macro (FINDSSLL) for this purpose.

7.4: PSET Library

The PSET library supports the following types of functions:

7.4.1. Parameter Set Management—building, listing, flushing 7.4.2. Parameter Value Managment—access, update, query 7.4.3. Work-In-Process (WIP) Management—access, update, query For the preferred embodiment these functions are layered on top of the UNIFY Relational Database Management System's (RDBMS) Host Language Interface (CHLI), however, by simply rewriting these functions for another alternate RDBMS the same functionality can be realized without affecting the application layer of the embodiment.

For a more detailed description of all PSET utilities, refer to the corresponding library diagram (FIG. 85) and module specifications (Appendix D). Described below, however, are brief explanations of how each of these groups of functions are used by a process.

7.4.1. Parameter Set Management

These functions are used to access and/or update database records that describe process parameters that are of interest to the control system. They can be associated with a job, lot (of product), unit (of product), time of day or entity (such as a resource).

- bldset—Builds a structure in shared memory for the specified parameter set.
- bldmset—Extends the structure above for data to be either issued or reported to/from machine servers; refer to the section on "Server Architecture" for a more detailed description of this usage.
- getset—Gains access to a parameter set in shared memory.
- geteset—Gains access to an event set in shared memory.
- obtainset—Interpret-time function to obtain a script step's parameter set.
- flushset—Flushes parameter set from memory (see bldset).
- flushmset—Flushes extensions to the parameter set structure from memory (see bldmset).
- listparm—Lists parameter information of parameters in a set by invoking this function through SBSTinorder.

7.4.2. Parameter Value Management

These functions are used to access and/or update parameter "value" records for the purposes of process configuration, data dispatch and data acquisition.

- issueset—Issues parameter values for a parameter set (collected by getdbvals) to the specified machine server.
- getdbvals—Accesses database by parameter set name (TTacckey) and table type (association), gathers appropriate values (TTGfield) and stuffs them into the parameter set structure built by the "bldset" function described above.
- TTacckey—Accesses parameter record by primary key.
- TTgfield—gathers parameter data from the parameter record.
- reportset—Reports (collects) parameter values from the specified machine server and adds database records (postdbvals) to this effect.
- postdbvals—Adds and/or updates (TTaddrec) parameter value records to the database by walking the parameter set structure, accessing the associated values and posting them into the database (TTpfield). The records are added based on the association requested; i.e., job, lot, unit, time or entity.
- TTaddrec—Adds/updates parameter records by primary key.
- TTpfield—Posts values into the parameter record.

7.4.3. Work-In-Process Management

These functions are used to access and/or update database records required for use in tracking products and processes being controlled.

- addjob—Adds a new job entry into the database.
- addlot—Adds associated lot(s) to be processed for this job.
- getques—Gets the message queue id's for the specified WIP station.
- getstatn—Gets the station information (status, job, lot, etc) for the specified WIP station.
- setstatn—Sets the station information for the specified WIP station.

7.5: PTXT Library

This library contains functions supporting the following areas; more detailed information on these functions may be found in Appendix G:

7.5.1. Field acquisition:
functions to read and separate delimited fields from files or strings: agetfield, getfield—from files.
- sgetfield—from strings.

7.5.2. Structured files:
function to load data from a structured file: load_SF.

7.5.3. Screen handling:
functions to put data to forms on screens and/or get data.
- getscreen—function to get a particular screen's data from an operator.
- putfield—function to put a single field to a particular screen.
- putscreen—function to put a particular screen with data.
- redraw—function to redraw a listed region of tuples to a particular screen.

7.5.4. Miscellaneous:
- itoa, reverse—functions due to Kernighan and Ritchie.
- gettime—gets and formates system time.
- shmcpy—copies from one long pointer to another.
- spx_strcpy—copies strings without null terminators.

7.6: SCROP Library

FIGS. 87-93 reference the library modules supplied for process script operations, Appendix D includes specifications for each function so referenced. These modules (functions) comprise three distinct libraries: the first two used for script assembly and verification and the latter for script interpretation. Each library has a representative function for each of the supported script operations, and is named with a prefix descriptive of which library it is in: fGS, for "get step", includes the functionality to acquire script operation arguments and perform syntactic checking; LS, for "link step", performs necessary structural synthesis and semantic verification against configuration data tables; IS, for "interpret step", actually executes the operation based on the results of the prior passes. Appendix H gives a reference sheet for each script operation "as a whole", giving brief remarks relative to the assembly and execution of the operation's library functions.

Included below are notes describing the general nature of process scripts and the operations which may be embedded on them.

7.6.1: Features of Process Scripts

There are several features of the process script language and its execution. A brief sub-section on the major features provided by the workcell computer software follows, sometimes with directed references to selected script operations; otherwise, the comments apply more generally:

CONTROL FLOW:

Normal flow is to take the steps in the sequence they appear in the source. When the file ends, regardless of whether a "Quit" was scripted, the script is considered terminated.

It is possible to terminate script execution by embedding a "Quit" at any desired spot.

Subroutine scripts may be interpreted using the "Interpret" operation. Such scripts are allowed access to the containing script's symbols (though preference is to those created for/by the subroutine itself). In so doing, an argument passing mechanism is provided.

Branching may be performed to a (labelled) step, as long as the step is in the same script as the branch operation, with "Goto".

A scripted "When ... Goto" will allow, however, the occurrence of an event to cause a jump back to a label in the containing script during subroutine execution.

Iteration may be scripted using the "Repeat ... Until" block, or "Repeat ... }". Block open and close must appear within the same source.

Execution of a script may be suspended for a time using "Sleep".

SYMBOL TABLE:

Evaluation and substitution of symbols is performed both during assembly as well as at run-time. This allows tokenization of "magic numbers", enhances readability, serves as an argument passing mechanism, and allows capture of contextual variables. The evaluation is iterative in the sense that symbols may be defined in terms of other symbols. Assemble- and run-time usage differs; each is described briefly below:

Assemble-time: The script writer adds to the assemble-time symbol table using "#define". Use of defined symbols is indicated by "de-referencing" the token with a '$'.

Run-time: Run-time symbols may be categorized as those which are implicitly defined from the "context" (see section on "Execution Context" below) and those which take on values are both used the same, however, by de-referencing with a '!'. Contextual variables automatically available include, but are not limited to, !JOB, !LOT, !UNIT, !STATION, !STATUS, and !OPERATION. Also, !TIME evaluates to the time at which the evaluation takes place.

BACKGROUND PROCESSING:

Several of the supported operations may be done in the "background". This means that the script's execution continues after having started the operation as opposed to the default case of the script being paused until the operation has been completed. This is a feature of the multiple process architecture.

Syntactically, such operations are scripted by virtue of placing an '&' as the final field on a step's source line. Refer to Appendix H for a given operation, however, to see if it is one of those possible to execute in the background and, in particular, to understand the semantics of doing so.

It is possible to "rendezvous" with the operation later in the script by using a label on the line specifying start of the operation, and using a "Wait" with the label at the point where it is desired to pause the script until completion.

EXECUTION CONTEXT:

As has been previously alluded to, a script executes in a given "context," that is, specifically identified materials are processed at workstations according to a script with the material identification considered as the script's context. Other items, such as the station at which the script is executing, are also placed into the context. Contextual variables within the symbol table include at least:

Job name (!JOB);
Lot id (!LOT);
Unit id (!UNIT);
Product (!PRODUCT);
Station (!STATION);
Operation (!OPERATION);
Station status (!STATUS).

This is useful for the following reasons:

Elements of the context are available as run-time tokens as discussed above.

System trace files and information are appropriately tagged and indexed.

Provides the information to support the complex database associations as discussed in the next sub-section.

DATABASE ASSOCIATIONS:

It is possible to associate data items with either:
the current job of context;
the current lot of context;
the current unit of context;
the current time; or
without any explicit association.

This is done using "augmentors", per the discussion below:

Several of the database related script operations take an argument called an "augmentor". This argument is used to either find or create records within the database by augmenting the key with additional information (with all database accesses, a key is used which has information independent of the augmentor as well). This additional information may be, for example, the identification of the lot currently being processed (a member of the "context" discussed elsewhere). Instead of specifying this information explicitly, which generally cannot be done anyway, the script writer uses one of the supported augmentors to indicate his desire. At run-time, the appropriate action will be taken. Supported augmentors include, but are not limited to, JOB, LOT, UNIT, TIME, and SETUP "SETUP indicating no extra augmentation at all).

7.6.2: Process Script Operation Applications

We take the opportunity to make directed references to various selected operations which have not already been mentioned in connection with other subsections.

DIRECTING SUBORDINATE MACHINERY: Download, Issue-set, Start-op, Stop-op

Depending upon the nature of machine controller used, an Issue-set or Start-op may be used to initiate activity. These operations differ in two ways: first, the Issue operations do not themselves discern between data and commands, and when executed in the foreground will return upon completion of the data transfer as opposed to any machine activity implied by it. The Start-op, however, always has the connotation of a command; if done in the foreground then it will not return until the machine activity commanded has finished. Stop-op is useful to stop the activity of a machine, and Download is used to transfer data in file format to a machine.

CONTROLLING MATERIAL FLOW: Check-for, Index, Load, Reset, Set, Unload

Index, Set, and Reset all change material identifications in the context as well as the database. This is useful not only for the screen images of material location but is also fundamental to the use of the augmentors discussed previously. Set, Reset, and Check-for manipulate WIP station statuses and perform internal synchronization based on material flow.

Load and Unload are used to feed-forward product quality data to peer workcells and to synchronize on the activity of facility material handling systems. They operate as a pair in a sense similar to the Set/Check-for pair of the previous paragraph, but have the additional functionality of transferring quality data for units from the upstream workcell (using an Unload) to the downstream workcell (using a Load). When materials are coming in from outside the workcell, the Load serves a role similar to that indicated for the Set of the previous paragraph, thus satisfying any Check-for which may be pending or will be pending. The concept provides for mixing and matching these operations as a given application requires.

COLLECTING DATA: Report-set, Upload

The Report operations are used to collect specific parameters or parameter sets from machine storage space. Upload differs in that it implies the transfer of a file from the subordinate machine, and as such is only supported for controllers that support a file system.

As with other parameter set operations, multiple machines and/or servers may be accessed from a single parameter set.

INTERACTING WITH OPERATORS: Ask, Prompt, Show-set

There are, of course, many ways in which operators interact with the workcell computer software. These are the most explicitly scripted ways in which operators are involved as scripts execute. Obviously, however, there are many more implicit interactions with operators by virtue of the menu tree and console sessions.

Ask is used to pose a question to an operator at a designated console and to perform another script operation if the answer he provides is not as expected. Prompt is straightforward (e.g. message is displayed for prompting), and Show-set is similar to Issue-set but that it interacts with an operator at a console as opposed to machines.

SYNCHRONIZING WITH EXTERNAL EVENTS: Ignore, Notice, Wait, When

Oftentimes script execution must take place synchronous with a subordinate process capable of sensing and/or generating "events". Generally, response to events must be done in a context-sensitive manner; that is, not only the fact that the event has occurred, but also the context in which it has occurred is significant in determining what action to take. Thus, scripted Notices and Whens may show up on scripts in many ways depending upon the application.

The When operation is generally used to set a trap for an event when it is not known when the event will occur with respect to executing the rest of the script. One use might be to interpret another script based on the occurrence of the given event; another might be to branch to another point within the current script. A subsequent Ignore will remove the trap.

Notice may be used in the foreground to suspend execution of the script until the named event has occurred. A background Notice may be used to cause the event to be enabled, but not to wait on its occurrence. The background usage is usually in conjunction with a subsequent Wait. Ingnore will clear the effects of background Notices.

WORKING DIRECTLY WITH THE DATABASE: Extract-set, Plot-set, Store-set, Show-set

Store-set is useful to store values for parameters into the database. Extract-set is primarily used to take information collected from operators and/or machines and write it to the run-time symbol table. Plot-set is used for the plotting of data in the database. Show-set displays data, read from the database, to an operator as described in the prior section "Interacting with Operators".

CALLING SITE-SPECIFIC CODE: Exec, Run, Shell

It may be desirable to call a site-specific program, function, or shell script from within a process script. An example might be to perform archival procedures using SQL/RPT extractions and interacting with storage devices from within a process script. Many other examples may be cited. The workcell computer software supports these requirements by providing three different mechanisms, choice of which to use depends upon how the particular code is packaged. In general, contextual arguments are passed to the program/function/shell script for its use.

7.7: UNIX Library

FIG. 94 shows the UNIX library functions (UNIX) that are directly referenced. The reader may refer to the UNIX System V Programmers Reference Manual and the XENIX Operating System Programmers Reference Manual for the manual pages associated with each of these functions.

II.

EXAMPLES

Two example applications of the current invention are described herein. We first provide an overview for each of the examples; then indicate general information about the embodiment as used in support of the examples; and then provide sections on each major area of support, indicating how the examples are supported by the current invention.

1. Discrete Example Overview

Figure 95:
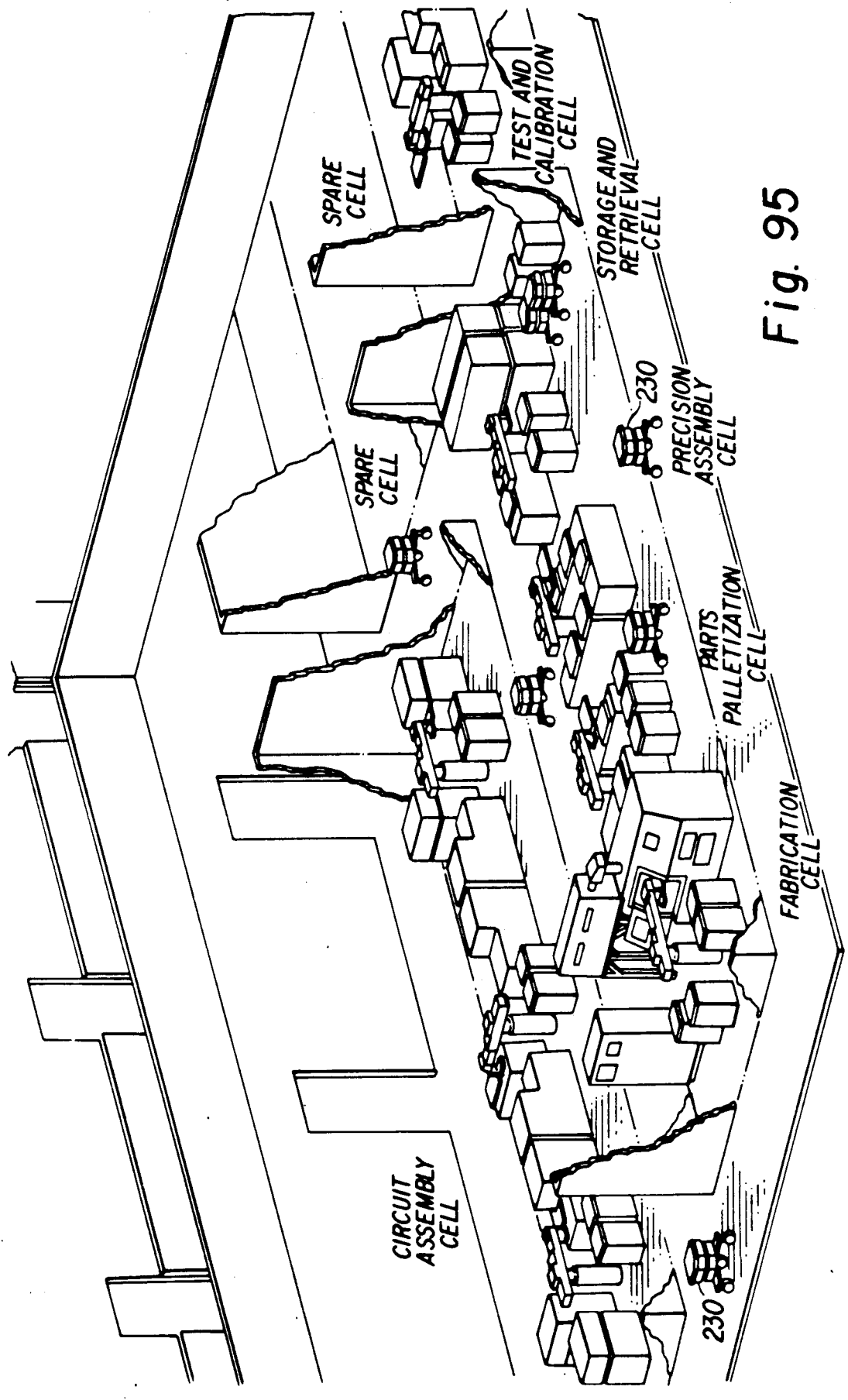
FIG. 95 is a perspective diagram a manufacturing environment utilizing the present invention.

An example is described to control several different discrete part processing workcells distributed within a facility as in FIG. 95. The workcells are linked by a material handling system utilizing automated vehicles 230 and supplemented by manual carry by material handling operators. The workcells also share a facility scheduling and management system, as well as a Computer-Aided-Design (CAD) system responsible for the generation of designs. From these designs, the CAD system has programs to postprocess the designs and generate Numerically-Controlled (NC) machine programs as well as raw geometry ultimately to be used by processing robotics.

Figure 96:
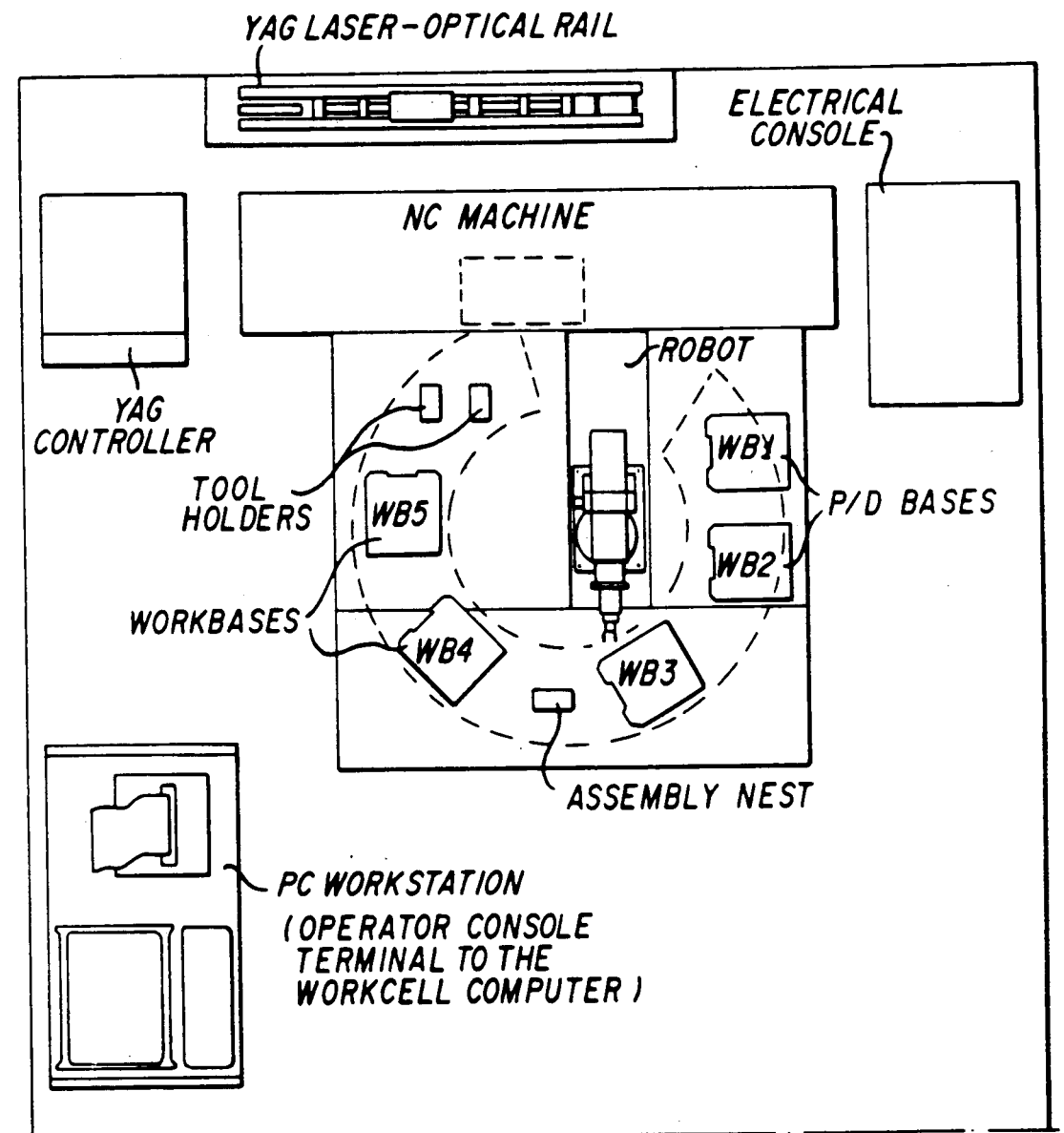
FIG. 96 is a plan view of a typical discrete part manufacturing workcell.

Each of the workcells in the facility has some processing capability, such as an ability to cut or machine parts, to perform various types of assembly, to test product, etc, an example of which is shown in FIG. 96. To support these processes, various robotic, NC, vision, and other processing equipment is installed. In general, all machines are controlled by the current invention in a coordinated fashion. To support a distributed environment allowing each workcell capability to work autonomously, a separate processor is used at each workcell for the current invention.

It is the object of each application of the current invention within the described facility to properly set-up and control the various machines within each of the facility's workcells per the widely varied requirements of each job processed in the facility, and to provide operators with all required interfaces.

2. Continous Example Overview

Figure 97:
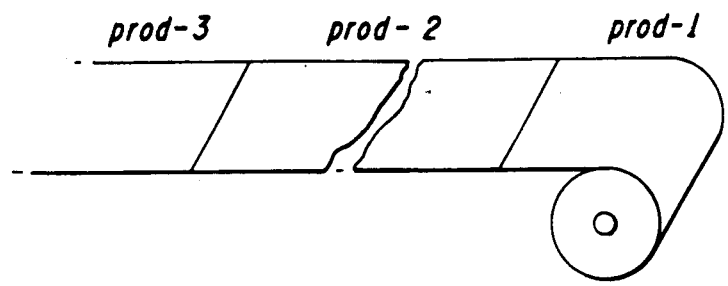
FIG. 97 is a diagram illustrating a web of the material used in an example continuous process.
Figure 98:
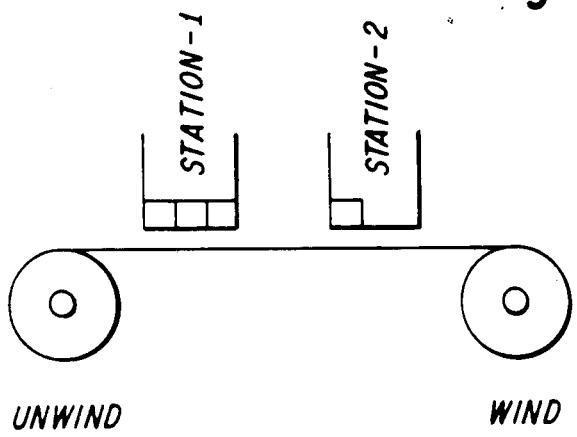
FIG. 98 is a diagram illustrating a web of material in relation to two processing stations.

An example is described to control continuous processes along a web-path on spliced products; prod-1, -2, and -3, per FIG. 97. Physically, the processes may be of arbitrary nature; we posit for purposes of example that they are "activity-A" which takes place at "station-1" and "activity-B" taking place at "station-2". Reference FIG. 98 for a schematic diagram of these processes and their physical relationship with one another.

The routing, i.e., the stations through which product flows, may indicate that a process will occur at either or both of the stations along the web path. In this application, the routing of product is usually to route it through both; but the processes applied at each differ in terms of the parameters and number of repetitions of activity-A and activity-B that are performed while the product is at each of the stations.

It is the object of the application of the current invention to properly set-up and control the various machines within the described workcell per the widely varied requirements of each job processed on the cell, and to provide the operator with all required interfaces.

3. Preferred Method Components

The method of the current invention as applied to these examples is considered to include the following components:

The processes described for the current invention.

The libraries described for the current invention.

Menu-based operator interface; developed as part of the current invention using tools provided as adjunct to the UNIFY TM forms package. The menu interface is a multi-level system of menus and screen forms allowing various types of users to interact with the system at different levels of capability. There are three levels of activity supported; activity as a "system administrator", as a "process engineer", and as an "operator". Refer to FIG. 2 for the hierarchy of menus; note that only menus where selections between end functions is made are shown. Individuals in the "system administrator" group "log in" at the UNIFY main menu (also referred to as the "root" menu), from which the current invention "MAIN MENU" is selectable; "process engineers" log in at the current invention "MAIN MENU" (shown as the top level menu in FIG. 2); and "operators" log in at the "OPERATIONS" menu.

Commercial relational database management system; UNIFY TM from Unify Corporation. Special purpose queries and reports may be easily written to use the data that the current invention maintains. The current invention itself makes extensive use of a programmatic interface with the database.

UNIX TM System V operating system; XENIX TM from Santa Cruz Operation. The operating system serves as the "host" of the current invention, which may also host other packages such as the development system used to develop site-specific functions and programs accessed by the current invention. Unrelated programs may also reside as long as performance and capacity of the hardware allows. The current invention uses the services of the operating system extensively but in a portable fashion.

The current invention is given the "personality" of the example application largely by being configured according to the described MTFS of the current invention. Each of the sub-systems described below are configured using the "CONFIGURATION" menu access, and the process scripts are developed using the "PROCESS SCRIPTS" menu access. Configuration and scripts are exhibited in appendices.

4. Product Data Acquisition and Scheduler Front-End

A job to be run on the workcell is described either by an operator (using the "CREATE/EDIT JOB DESCRIPTION") or through a file appropriately formatted and passed to the current invention for this purpose by another computer application. The data describes application-specific data pertaining to the job (which in the continuous example is a roll of products and for the discrete example is the group of lots associated with an end order), as well as individually for each lot (the individual products spliced to form the roll in the continuous example, and the stack of one or more pallets in the discrete example). Special parameter sets are used for this; i.e., the name "job-data" is reserved for a set of application-chosen parameters used to describe the job, and "lot-data" is reserved to name a set of application-chosen parameters describing each lot in the job.

Regardless of the source of the data, at such time that the job is accepted for processing it is entered to the database, again using either manual or automated tools of the current invention.

Figure 99:
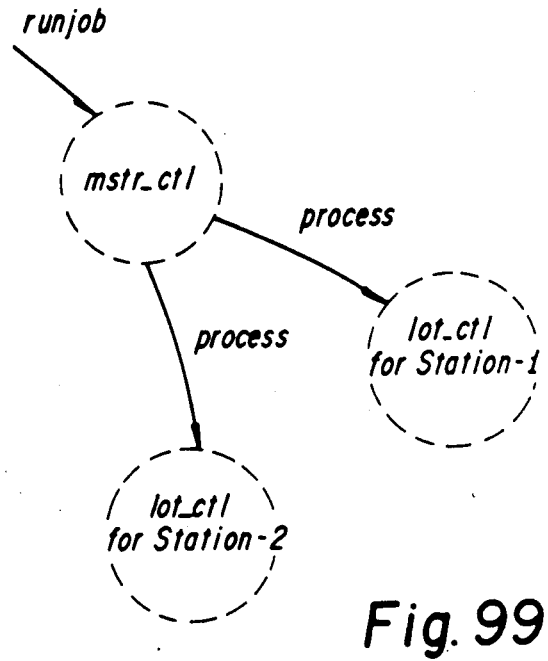
FIG. 99 is a data flow for a job run.

Upon receiving the request to initiate processing, the system proceeds to queue up the required operations into internal queues, one of which exists for each workstation. These queues are served by the interpreters which interpret scripts at the processing stations. These stations are organized on the web-path in the continuous example, and throughout the facility in the discrete example. Refer to FIG. 99 to see roughly how the current invention allocates work to the queues based on the job description (continous example).

5. Flexible Script Assembler and Interpreter

Refer to Appendices I, J, and K, for exhibits of the continous and discrete example process scripts. Although only product-processing scripts are exhibited, process scripts are also written for other purposes, such as cold-starting process machinery, handling errors, and manipulating the process between jobs.

Configurable aspects include what work-in-process (WIP) stations are within the workcell and which of them are served by interpreters (i.e., at which of them does processing occur). Refer to Appendix N for an example configuration of WIP stations. System resources are configured as in the example of Appendix L and are used for initializing system resources and causing processes to execute in the background, including the interpreter processes associated with WIP stations.

6. Flexible Data Acquisition and Dispatch System

The example applications exercise this link by virtue of the operations scripted, and using the "Ad-Hoc operation and development tool chest" to be described.

Configurable aspects include what machines are used, what servers exist to serve them, and descriptions of parameters and sets of parameters that are significant. All of these aspects are configured through the "CONFIGURATION MENU" reachable by individuals classified as process engineers. Appendix M provides sample listings of these configurable parameters for the continuous example.

7. Event Tracking Subsystem

The example applications exercise this subsystem by virtue of the previously mentioned script operations shown in Appendix I, J, and K; and by the Ad-Hoc operation and development tool chest to be mentioned below.

Events of interest are configured, just like parameters, through the "PROCESS PARAMETER" configuration menu by the process engineer. A specific parameter set, called "events", associates the events of interest which are tracked under process control. Given the configuration, script-writers cause action to occur in reaction to events in a manner appropriate for the application at a very high level, without concerning themselves with the means by which events are collected or with the efficiency of their collection. Refer to Appendix M, parameter set "events", for a listing of the events of interest to the continuous example.

8. WIP Tracking Subsystem

Refer to the example scripts and configurations to see how the current invention is used to perform WIP tracking and synchronization. Remember also that implied tracking beyond the explicitly scripted tracking is taking place.

As mentioned, the tracking is required to reference data for queries and reports after processing is done; it also may be viewed "on-line" to monitor the progress of a job or lot's operation. Refer to FIGS. 100-103 which shows what data is shown for each "WIP Station" in the system, as the process is running. These status screens are available to an operator through the "SHOW WORK-IN-PROGRESS" and the "OPEN A CONSOLE" menu selections.

WIP stations are configured much in the same way as other configurable aspects of the application, as selected on the CONFIGURATION MENU, and as mentioned each may or may not be assigned an interpreter capable of executing process scripts. Refer to Appendix N for the configuration as used by the continuous examples.

9. Ad-Hoc Operation and Development Toolchest

Almost all operations possible to put on process scripts are also available for Ad-Hoc use. These are particularly useful for development and de-bugging of processes and lower level machine programs. Many Ad-Hocs are shown in the menu hierarchy.

10. Plotting and Calibration Subsystem

The current invention supports plotting of parameter sets online from a script using the "plot-set" script operation; use of the operation is illustrated in Appendix J. In this usage, a plot is generated once per repetition of activity-B—provided the plotting device can keep up with the roll moving through the cell, plots are completed immediately after each repeated application of the activity. To account for the situation of the plotting device unable to plot at this rate, the operation has been placed into the background such that it proceeds asynchronously for the example.

In the continuous example, the plotting device is a Brunning ZETA 8-pen plotter. The algorithms used by the site make use of database facilities to access calibration data previously entered.

This data is also maintained in the database for other uses, such as site-specific database extractions to drive analyses on other computers and for other purposes. The current invention includes various SQL scripts for archival of this data, on a lot and job basis, to storage media.

11. Robotic Guidance Data Post-Processing

Though typically more useful in discrete applications than continuous, the current invention includes capability, as has been mentioned, to post-process data for purposes of robotic guidance. Related to this capability is the ability to model the unique capabilities of the particular workcell in the database for use in post-processing and offering opportunity for validation.

Information captured in the cell capability tables for the discrete example includes:

Robotic operations (dispense, pick, vision register, etc.)

Robotic tools (conductive epoxy tool, vacuum cup, camera, etc.)

Reference parameters (parameters required for data extraction or assignment)

Workcell operations (destack, calibrate, assemble, etc.)

Workcell tools (pallet grip, vision camera, etc.)

Refer to Appendix O for a sample cell capability listing.

A simple process definition file for the discrete example is shown in Appendix P. This example file contains, but is not limited to, four blocks of data; lot data, stack sequence data, workstation data, and the name of the process script to be used to process the materials. Lot data contains the product identifier and lot size of the materials to be processed. Stack sequence data indicates to the workcell what the stack order of the pallets of materials will be on delivery and pickup, as well as the number of pallets and the destination station within the workcell for each pallet. The pallet names are actually used as pointers to the CAD files containing part location and operation data associated with this pallet, which is used by another function for the extraction of this data. Workstation data indicates any fixtures that may be used for processing of this product and, as with pallets, is a name which points to a CAD file containing part and operation data associated with this fixture.

Sample CAD data files are shown in Appendix Q. Typically one of these files exists for each physical unit to be operated on within a workcell; this include(s) not only pallets of parts, but also workbases, workstations (assembly nests), tool holders, etc. Each file contains part identification, operation and location data associated with this physical unit. The file, as shown in the appendix, contains block information, array data, registration data and processing data (identification, operation, tool and location identifiers) associated with each part on this physical unit.

Three process data files are generated by the Data Preparation Process:

1. deftoken—this token file contains the user's "roadmap" to the assignments that were made in "defvar" and "deftpt". An example of this file is shown as Appendix R.
2. defvar—file of variable and pallet definition assignments referenced in the deftoken file. (Pallets are associated with frames of reference.)
3. deftpt—file of robot translation point (coordinate) assignments referenced in the deftoken file.

The following data is specified for each of the workcells.

configuration of workcell capability data in the database.

registration data of material to be registered using a vision system camera.

process definition data, including reference to process scripts written for this product to be processed on this workcell(s).

robot dispense data for conductive epoxy dots placed onto the sheets of material.

robot inspection data for the dots using a vision system and camera.

placement data for the components placed on the circuit at an Assembly Workcell.

12. Arbitration of Material Delivery, and Feeding-Forward Quality Data

We only present a description for the discrete example, since our definition of the continuous example only included one workcell with only manual roll loading. The following description for the discrete example can easily be generalized.

Figure 104:
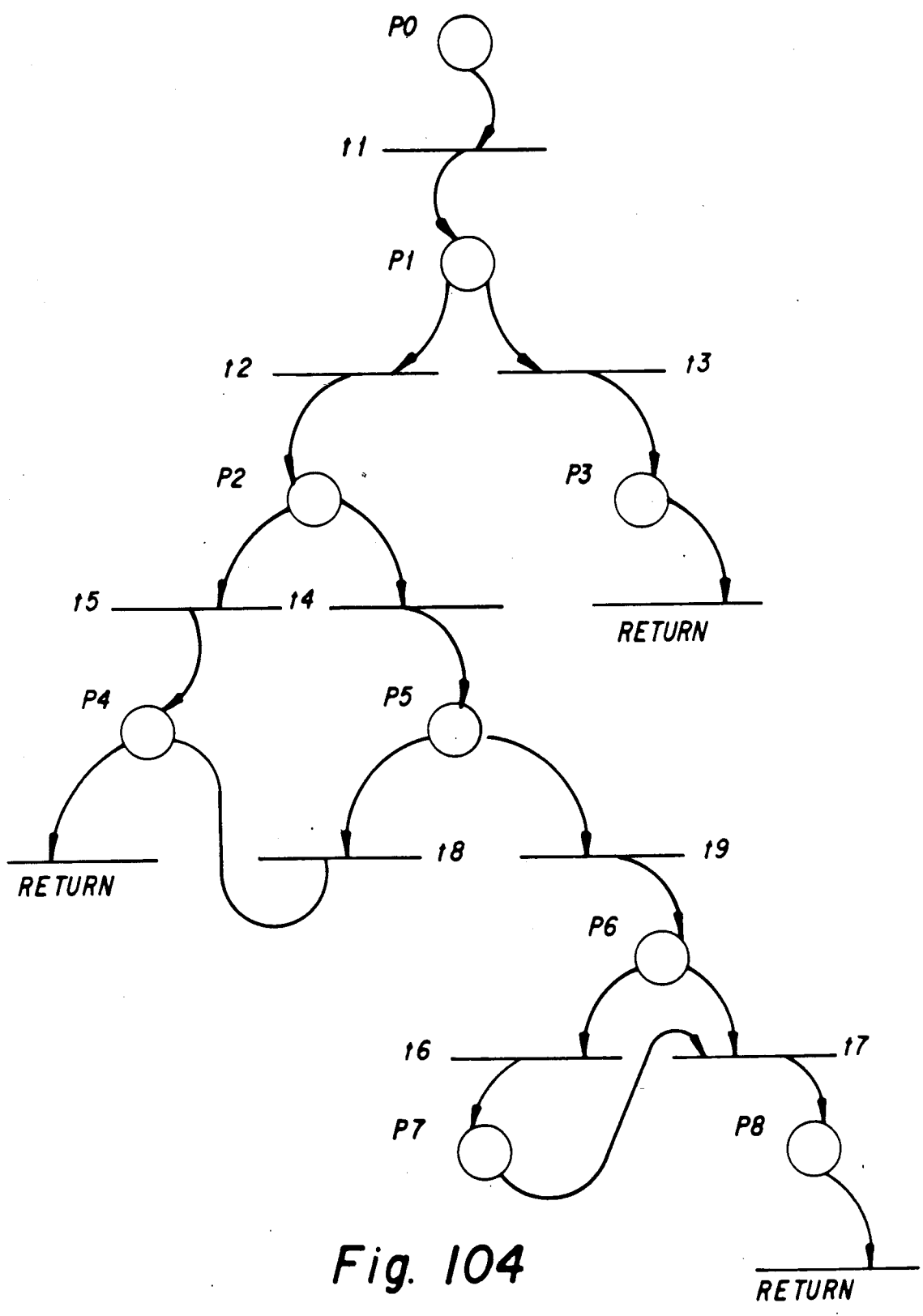
FIG. 104 is a diagram illustrating a Petri-net for a local vehicle interface.

Reference FIG. 104 for operation of a "Local Vehicle Interface", used in the facility to interface with material handling vehicles.

Key to FIG. 104:
PETRI-NET OF THE LOCAL VEHICLE INTERFACE
MAIN CODE LOOPS, CHECKING FOR ADDRESSED
TRANSITIONS; AND VALIDATES THE TRANSITION
FOR THE PORT/STATION FOR WHICH THE
TRANSITION APPLIES.

| Transition | Event | Recognition |
|---|---|---|
| T1 | Vehicle Requests to Dock | Bit 4 True |
| T2 | Mover-PD Accepts Request | Received 'A' |
| T3 | Mover-PD Rejects Request | Received 'R' |
| T4 | Vehicle Reports Success | Bit 2 True |
| T5 | Vehicle Reports Failure | Bit 2 False |
| T6 | Mover-PD Holds Vehicle | Received 'H' |
| T7 | Mover-PD Dismisses Vehicle | Received 'L' |
| T8 | P/D Station Loaded Improperly | Bits 5, 6 |
| T9 | P/D Station Loaded Properly | Bits 5, 6 |

| Place | Code Executed |
|---|---|
| P1 | Request Mover-PD with 'P' or 'D' according to Bit 1; Set Port status to "requesting". |
| P2 | Write Bit 2 True (OK to dock); Set port status to "operating". |
| P3 | Write Bit 2 False (not OK to dock). |
| P4 | Request Mover-PD with 'F'. |
| P5 | Check Bits 5, 6 for proper state. |
| P6 | Request Mover-PD with 'S'; Set port status to "done". |
| P7 | Write Bit 1 False (not OK to leave). |
| P8 | Write Bit 1 True (OK to leave); Set port status to "idle". |

The materials at a given station are kitted. It is possible to transfer some of the units from one station to another, as long as kitting rules are followed.

The following scenario illustrates how the subsystem works in the discrete example diagrammed per FIG. 105:

1) The material handling system delivers materials to a P/D station at the workcell, the workcell having allowed the delivery since the station had been EMPTY. The station is changed to BUSY while the delivery is taking place, and thereafter to INPUT READY.

2) The workcell finishes what it had been working on while the delivery was taking place, and considers starting the next scheduled operation.

3) Finding that the materials have indeed been delivered, the top carrier of the materials is removed and placed at a workbase. The P/D station is changed to BUSY, and the workbase to PROCESS. Similarily; other carriers are moved; when the last carrier is removed, the P/D station is given status EMPTY.

4) Since a robot at the workcell will process units at, say, two of the workbases, the quality values associated with the units at each of the two workbases are downloaded to the robot, for use in conditioning his process.

5) While the robot processes the parts, readings of process sensors results in assignment of meaningful quality values for each. The updated quality values are uploaded for each unit, in real-time, by the current invention, where updates are made to the database.

6) Finding that there are no other operations to be performed, the carriers being worked on are placed at a P/D station. As the workbases are emptied, their status is changed to EMPTY, and the P/D station is set to BUSY. When all carriers to be removed are at the P/D station, its status is changed to OUTPUT WAITING.

7) Sometime later, either before or after other materials have been left at the workcell, the materials handling system will pick-up the processed materials. It will be allowed to do so based on the OUTPUT WAITING status; the station transitions to BUSY while the pick-up is taking place; and thereafter to EMPTY.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

Appendix A

ENTITY/ATTRIBUTE LIST

```
Console     :  An interactive set of screens (zero or more) that
               operators use during workcell operations to
               perform the following: view or modify process
               data; to respond to pending questions; to display
               informational messages; to view the transcript of
               an interpreter; to selectively modify the state of
               an interpreter; to view machine status and/or
               process parameters and events; or to modify
               process parameters directly.

Cons_Msg_Buf  :  The set of informational messages to be
                    displayed on the console.
```

Cons_Req        : The request queue by which the operator
                  is solicited for information.

Cons_Rpl        : The reply queue by which information is
                  obtained from the operator.

Console_Name    : Character representation which specifies
                  a particular operator console.

---

Dock            : A physical location where material handling
                  transactions may take place.

Dock_Name       : Character representation which specifies
                  a particular pickup or delivery dock.

PD_Base_Addr    : The address by which a station is
                  uniquely located at a dock.

---

Job             : A job is comprised of one or more lots, each of
                  the lots being processed through a sequence of
                  Work Stations; each Work Station usually using a
                  different process script to process the product of
                  each lot.

Job_Name        : The name by which a job is referred.

---

Lot             : A lot is comprised of information pertaining to
                  the product that it describes.

Job_Name        : The name by which a job is referred.

Lot_ID          : The alpha-numeric label associated with
                  a particular lot of product.

Product         : The name of the particular product
                  flowing through a station at any given
                  time.

---

Machine         : A virtual or physical device with which to
                  communicate and associate process information.

Mach_Contrid    : A numeric representation which
                  identifies the unique address of the
                  machine controller which is required in
                  a multiple machine per server
                  configuration.

Mach_Mode       : Identifies the mode of operation of a
                  particular machine. Acceptable modes
                  include; 'PRODUCTION', 'MAINTENANCE' and
                  'TESTING'.

| | | |
|---|---|---|
| Mach_Name | : | The name associated with a given machine, typically correlated to the process performed by the machine. |
| Mach_Port | : | Identifies the particular port to which the communications channel is attached. |
| Mach_Status | : | Identifies the state of a particular machine at a given instant in time. |
| Server_Name | : | Character representation which identifies a particular machine server. |
| Wkstatn_Name | : | Character representation which identifies a particular Work Station. |

---

| | | |
|---|---|---|
| Operation | : | An operation is a named activity which can be performed to transform product from some initial state to some processed state. |
| Operation_ID | : | Character representation which specifies a particular operation. |
| Route_Name | : | Character representation which specifies a particular route. |

---

| | | |
|---|---|---|
| Parameter | : | A process variable of interest to an application; which can be collected, displayed, or issued. Typically a parameter is correlated to the function it performs - a command, an event or a process value. |
| Mach_Name | : | The name associated with a given machine, typically correlated to the process performed by the machine. |
| Parm_Default | : | The default value to be used for a parameter when one is not explicitly provided. |
| Parm_Index | : | The address of a parameter in a machine's memory map. |
| Parm_Name | : | Character representation which identifies a specific parameter. |
| Parm_Reading | : | The number of readings (sample values) that are associated with a parameter. |
| Parm_Type | : | The data type associated with a particular parameter; String, Real, or Integer. |

---

ParameterSet : An aggregation of parameters to be referred to and acted on as a whole.

ParmSet_Name : The name by which to call the set
(aggregation) of process parameters.

Parm_Key : The parameter key which is comprised of
Parm_Name and Mach_Name attributes.

---

ProcessEvent : A logged occurrance of a process script step while
processing a specific lot.

Trace_Line : An event as listed in the trace file.

---

Route : A route is a sequence of operations performed at
stations.

Operation_ID : Character representation which specifies
a particular operation.

Route_Name : Character representation which specifies
a particular route.

Wait_Mode : Mode with which operations along a route
are executed; typical modes are
sequential or some variation of
concurrent.

Wkstatn_Name : Character representation which
identifies a particular Work Station.

---

Script : An ordered set of steps that describe the
procedure by which product is processed.

Script_Name : Character representation which
identifies a particular process script;
typically created by a name generation
function as an encryption of the
following: route, operation, product
and/or station.

---

Server : A server is a means of communication which
according to determined protocol allows
communication with 1 or more different machines.

Server_Name : Character representation which
identifies a particular machine server.

Server_Req : The request queue associated with the
server process that communicates
information to machines.

| | | |
|---|---|---|
| Server_Rpl | : | The reply queue associated with the server process that communicates information to the machines. |

---

| | | |
|---|---|---|
| Station | : | A Station is a location through which material flow occurs. Some stations are processing stations in that they transform the material in some way. |
| Lot_Key | : | The lot key which is comprised of Job_Name and Lot_ID attributes. |
| Statn_Name | : | Character representation which identifies a particular station. |
| Statn_Status | : | Character representation detailing the processing state of a particular station. Acceptable entries include 'IDLE', 'BUSY', 'INPUT-READY', OUTPUT-WAITING', 'PROCESS', and 'PENDING'. The default value is 'IDLE'. |
| Unit_Name | : | The alpha-numeric label given to a unit of a lot; usually relates to the appropriate unit of measure being used, or to the serialization of units within discrete part lots. |

---

| | | |
|---|---|---|
| Step | : | A single script operation (step) as listed in a process script and executed by an interpreter at a Work Station. |
| BckGrnd_Flag | : | A flag indicating that the step may OR may not be executed in background mode. |
| Script_Name | : | Character representation which identifies a particular process script; typically created by a name generation function as an encryption of the following: route, operation, product and/or station. |
| Step_Data | : | Information required for the operation associated with a specific script step. |
| Step_Number | : | The sequence number assigned to the step on assembly of the process script. |
| Step_Type | : | Designated type of the script step. |

---

| | | |
|---|---|---|
| Tool | : | An instrument used in the performance of an operation. |
| Operation_ID | : | Character representation which specifies a particular operation. |

| | | |
|---|---|---|
| Tool_Name | : | Character representation designating a particular tool. |
| Tool_Parms | : | Information required to operate a tool. |

---

| | | |
|---|---|---|
| Unit | : | A unit is some portion of a lot as designated by its name; process values are usually associated with a unit of product, but may also be associated with a lot or a job. |
| Lot_Key | : | The lot key which is comprised of Job_Name and Lot_ID attributes. |
| Unit_Name | : | The alpha-numeric label given to a unit of a lot; usually relates to the appropriate unit of measure being used, or to the serialization of units within discrete part lots. |

---

| | | |
|---|---|---|
| Value | : | A value collected for a parameter, which is typically associated with one of the following; job, lot, unit (of product), resource (machine or process) or time of day. |
| Augmentor | : | The association of information with one of the following entities; job, lot, unit, resource (machines or processes) or time of day. |
| Pset_Key | : | The parameter set key which is comprised of ParmSet_Name and Parm_Key attributes. |
| Value | : | An assigned representation for the quantity or meaning of the parameter. |

---

| | | |
|---|---|---|
| WorkStation | : | An aggregation of machines with corresponding stations which are controlled through a process script, executed by an interpreter assigned to the WorkStation. |
| Wkstatn_Name | : | Character representation which identifies a particular Work Station. |
| Wkstatn_Req | : | The request queue associated with the interpreter process executing a script at the Work Station at a given time. |
| Wkstatn_Rpl | : | The reply queue associated with the interpreter process executing a script at the Work Station at a given time. |

Appendix B

BUSINESS RULES
---------------

R001 : Each machine is associated with 1 specific server, but a single server may be used to communicate a particular protocol with one or more machines.

R002 : Each general parameter is associated with a specific machine, and each machine may have zero, one or more general parameters that it refers to.

R003 : Selected general parameters are assigned to the interval parameter table for parameter data collection on a time interval basis, all parameters associated with the interval parameter table are general parameters.

R004 : Selected general parameters are assigned to zero, one or more parameter sets, all parameter sets are made up of general parameters.

R005 : Each station comprises zero, one or more machines, and each machine is assigned to one or more stations.

R006 : A Console displays processing information about one or more stations and station information may be displayed on zero or more consoles.

R007 : Each job comprises one or more individual lots to be processed, and each lot is associated with a specific job.

R008 : Each lot is made up of one or more units of a product, and each unit is part of a lot.

R009 : A Work Station may process zero, one or more lots of product (according to a process script), and a lot of product may be processed by one or more Work Stations.

R010 : An operation is performed at one or more Work Stations (possibly using tools) and a Work Station may execute one or more operations.

R011 : An operation may require use of zero or more tools and a tool may be utilized by one or more operations.

R012 : A route consists of one or more operations and an operation may be executed along one or more routes; Routes define the flow of product within the workcell.

R013 : A Work Station executes one or more scripts in the processing of product and a process script may be interpreted for one or more Work Stations.

R014 : A script may contain one or more steps (process operations) that are executed and each step is associated with a particular script.

R015 : A script step, when executed, becomes a process event, and a process event is a transcript of a step as executed at an instant in time.

R016 : Each Dock services one or more stations, and a station may be serviced by one or more docks.

R017 : A parameter is collected as one or more values, and a value represents the quantity or meaning of a parameter as associated with some augmenter (job, lot, unit, resource or time of day).

R018 : A Work Station coordinates activities for one or more machines (by executing a process script), and a machine is requested to perform various operations by a particular Work Station.

Report Complete

Appendix C

APPLICATION_SEGMENT (store) =
  * CONTAINS INFORMATION AS REQUIRED BY THE APPLICATION *

APPLICATION_SEMAPHORE (store) =
  * SEMAPHORE PROTECTING THE APPLICATION SEGMENT *

AUGMENT_KEY (data flow) =
  [ JOB_NAME | JOB_NAME + LOT_ID | JOB_NAME + LOT_ID + UNIT_ID | TIME ].

AUGMENTOR (data flow) =
  [ "JOB" | "LOT" | "UNIT" | "TIME" | "ENTITY"].

BLOCK_STACK (store) =
  {STACK_RECORD}.

CAD_DATA (store) =
  * FILE(S) CONTAINING CAD DATA, IN NEUTRAL FILE FORMAT, WHICH DESCRIBES THE PRODUCT(S) TO BE PROCESSED IN A DISCRETE PART APPLICATION *.

CELLCAP_DB (store) =
  OPERATION_DB + TOOL_DB

CONSOLE (data flow) =
  CONSOLE_NAME + CONSOLE_REQUEST_KEY + CONSOLE_REPLY_KEY + CONSOLE_MSG_SEG_KEY + CONSOLE_MSG_SEM_KEY CONSOLE_DB (store) =
  {CONSOLE}

CONSOLE_ENTRY (data flow) =
  CONSOLE + {STATION_NAME + STATION_SEQUENCE} + PENDING_QUESTION +
  STRUCT_HEADER + PROCESS_LIST CONSOLE_MSGS (store) =
  < {CONSOLE_REQUEST} | {CONSOLE_REPLY} >

CONSOLE_NAME (data flow) =
  * THE NAME OF AN OPERATOR'S CONSOLE WHICH PROVIDES A PARTICULAR
  VIEW INTO THE CURRENT PROCESS *.

CONSOLE_REPLY (data/control flow) =
  STRUCT_HDR + ANSWER

CONSOLE_REQUEST (data/control flow) =
  STRUCT_HDR + PENDING_QUESTION

CONSOLE_SEGMENT (store) =
  {CONSOLE_ENTRY}

CONSOLE_SEMAPHORE (store) =
  * SEMAPHORE PROTECTING THE CONSOLE_SEGMENT *

CONSOLE_SIGNALS (store) =
  [
   PENDING_QUESTION_REGION_SIGNAL |
   STATION_UPDATE_SIGNAL          |
   MESSAGE_REGION_UPDATE_SIGNAL   |
   TRANSCRIPT_UPDATE_SIGNAL       |
   MACHINE_UPDATE_SIGNAL
  ]

CONTEXT (data/control flow) =
  JOB_NAME + LOT_ID + PRODUCT_NAME + STATION_NAME + OPERATION +
  UNIT_ID + STATION_STATUS + TRACE_FLAG + VERBOSE_FLAG + WHEN_EVENT_LIST.

DATA_TYPE (data flow) =
  [ "REAL" | "INTEGER" | "STRING" ].

DB_INFO (store) =
   CELLCAP_DB + CONSOLE_DB + DOCK_DB + EVENT_DB + PARM_DB +
   INTERVAL_PARM_DB + JOB_DB + LOT_DB + MACHINE_DB + PARMSET_DB +
   ROUTE_DB + SERVER_DB + STATION_DB DISPLAYING_PROCESS (data flow) =
   PID + SEMKEYID DOCK (data flow) =
   DOCK_NAME + {PD_BASE_ADR}

DOCK_DB (store) =
   {DOCK}

DOCK_NAME (data flow) =
   * NAME OF A PARTICULAR PICKUP/DELIVERY (PD)
     DOCK ASSOCIATED WITH MATERIAL MOVEMENT *

DOCK_SEMAPHORE (store) =
   * SEMAPHORE PROTECTING MATERIAL PICKUP/DELIVERY DOCKS *.

DPREP_MSGS (store) =
   < {DPREP_REQUEST} | {DPREP_REPLY} >

DPREP_REPLY (data/control flow) =
   STRUCT_HDR.

DPREP_REQUEST (data/control flow) =
   STRUCT_HDR + FILENAME + SCRIPT_NAME + LIST_FLAG + VERBOSE_FLAG .

ERROR_FLAG (data flow) =
   * FLAG USED TO REPRESENT AN ERROR CODE FOR AN OPERATION
     THAT HAS FAILED *

EVENT (data flow) =
   PARMSET_NAME + PARMKEY + ENABLED_FLAG + SET_FLAG + SEMKEYID EVENT_DB (store) =
   { EVENTSET }

EVENT_SEMAPHORE (store) =
   * SEMAPHORE ASSOCIATED WITH A PROCESS EVENT, AS ASSIGNED
     (FROM A SEMAPHORE POOL) WHEN THE EVENT IS ENABLED; USED
     TO SIGNAL WHEN THE EVENT HAS OCCURRED *

EVENT_TABLE (store) =
  { EVENT }

EVENTSET (store) =
  { PARMSET_NAME + PARMKEY }

EVTRCK_MSGS (store) =
  < { EVTRCK_REQUEST } | { EVTRCK_REPLY } > .

EVTRCK_REPLY (data/control flow) =
  STRUCT_HDR.

EVTRCK_REQUEST (data/control flow) =
  STRUCT_HDR + VERBOSE_FLAG.

fGSargs (data flow) =
  GETFIELD_REC + NFIELDS + VERBOSE_FLAG

FILENAME (data flow) =
  * name of a program or file to be transferred
  transferred to or from a machine *.

GEN_PARM_DB (store) =
  { PARAMETER }

GEOMETRICAL_DATA (store) =
  * FILE CONTAINING COORDINATE DATA DESCRIBING LOCATION OF PRODUCT
  COMPONENTS, IN A DISCRETE PART APPLICATION, RELATIVE TO SOME ORIGIN *.

GETFIELD_REC (store) =
  FIELD_BUFFER + {FIELD_POINTERS} + FILENAME + CURRENT_LINE INTERPRETER_SIGNALS (store) =
  [ PAUSE_SIGNAL | RESUME_SIGNAL | HALT_SIGNAL ]

INTERRUPT_SIGNAL (control flow) =
  * SIGNAL GENERATED BY OPERATOR PRESSING THE DELETE (OR EQUIVALENT) KEY *

INTERVAL_DATA (store) =
  { PARM_VALUE_RECORD + TIMESTAMP }

INTERVAL_PARM_DB (store) =
  { PARMKEY + SAMPLE_INTERVAL }

INTRCK_MSGS (store) =
  < { INTRCK_REQUEST } | { INTRCK_REPLY } > .

INTRCK_REPLY (data/control flow) =
  STRUCT_HDR

INTRCK_REQUEST (data/control flow) =
  STRUCT_HDR + VERBOSE_FLAG

ISargs (data flow) =
  SCRIPT_DATA + CONTEXT

JOB_DB (store) =
  { JOB_NAME }

JOB_NAME (data flow) =
  * THE NAME OF THE JOB TO BE RUN ON THE WORKCELL; JOBS
  ARE TYPICALLY PROCESSED IN THIS ORDER: SPECIFY JOB,
  ENTER JOB TO THE DATABASE, AND THEN START A JOB ON
  THE WORKCELL *

LABEL_TABLE (store) =
  { [LABEL + STEP ] }.

LIST_FLAG (control flow) =
  * FLAG REPRESENTING THAT AN ASSEMBLY LISTING IS REQUESTED *

LOT_ARGS (data flow) =
  JOB_NAME + LOT_ID

LOT_DB (store) =
  { LOT_RECORD }

LOT_ID (data flow) =
  * ALPHA-NUMERIC NAME ASSIGNED TO THE LOT OF PRODUCT *.

LOT_KEY (data flow) =
  LOT_ID + JOB_NAME + PRODUCT_NAME

LOT_RECORD (data flow) =
  LOT_KEY + ROUTE

LOTCTL_MSGS (store) =
  < { LOTCTL_REQUEST } | { LOTCTL_REPLY } > .

LOTCTL_REPLY (data/control flow) =
  STRUCT_HDR

LOTCTL_REQUEST (data/control flow) =
  STRUCT_HDR + OPERATION_ID + LOTKEY + SCRIPT_NAME +
  VERBOSE_FLAG + TRACE_FLAG LSargs (data flow) =
  SCRIPT + PARENT_SYMBOL_TABLE + LIST_FLAG MACHINE (data flow) =
  MACHINE_NAME + SERVER_NAME + WKSTATN_NAME + PORT_NAME +
  MACHINE_ADDRESS + MODE_OF_OPERATION + MACHINE_STATUS MACHINE_CMDS (data flow) =
  { MACHINE_ADDRESS + MACHINE_COMMAND + PARMKEY + PARAMETER_ADDRESS +
    PARM_VALUE }

MACHINE_COMMAND (control flow) =
  [ INIT | ISSUE | REPORT | UPLOAD | DNLOAD | START_OP | STOP_OP ]

MACHINE_DB (store) =
  { MACHINE }.

MACHINE_LIST (store) =
  { MACHINE_NAME + MSET_LIST }.

MACHINE_NAME (data flow) =
  * THE MACHINE NAME OF THE PROCESS CONTROLLER
    E.G. DENSITOMETER, FINISHER, ETC. *.

MACHINE_TABLE (store) =
  { MACHINE + MACHINE_STATUS } .

MACHINE_TABLE_PTR (data flow) =
  * POINTER TO THE MACHINE_TABLE *.

MCTL_MSGS (store) =
  < { MCTL_REQUEST } | { MCTL_REPLY } >.

MCTL_REPLY (data/control flow) =
  STRUCT_HDR.

MCTL_REQUEST (data/control flow) =
   STRUCT_HDR + [PSETOFFSET + AUGMENTOR | FILENAME +
   MACHINE_NAME | MACHINE_NAME + OPERATION_ID] +
   SEMKEYID + VERBOSE_FLAG.

MESSAGE_QUES (store) =
   CONSOLE_MSGS + DPREP_MSGS + EVTRCK_MSGS + INTRCK_MSGS + LOTCTL_
   MSGS + MCTL_MSGS + MSCTL_MSGS + PLOTTER_MSGS + SERVER_MSGS MESSAGE_SEGMENT (store) =
   {MESSAGE_LINE}.

MESSAGE_SEMAPHORE (store) =
   * SEMAPHORE PROTECTING THE MESSAGE SEGMENT *

MOVER_COMMAND (data/control flow) =
   [ Accept | Reject | Leave | Stay ] .

MOVER_MESSAGE (data/control flow) =
   MOVER_REQUEST + PD_BASE_ADR

MOVER_REQUEST (data/control flow) =
   [ PICK_UP | DELIVER | SUCCEEDED | FAILED ]

MSCTL_MSGS (store) =
   < { MSCTL_REQUEST } | { MSCTL_REPLY } > .

MSCTL_REPLY (data/control flow) =
   STRUCT_HDR.

MSCTL_REQUEST (data/control flow) =
   STRUCT_HDR + JOB_NAME + VERBOSE_FLAG.

MSET_LIST (store) =
   { SET_ELEMENT_PTR }.

MSETKEY (data flow) =
   MACHINE_NAME + DATA_TYPE + PARM_INDEX.

MSETOFFSET (data flow) =
   * OFFSET, AS CALCULATED FROM THE BEGINNING OF THE PARM_SEGMENT,
   USED TO FIND MSET_LIST (WHICH HAS BEEN ORDERED BY MSETKEY)
   FOR EACH PROCESS NEEDING ACCESS (IN PARTICULAR THE MACHINE_
   CONTROL AND MC_SERVER PROCESSES *

NONGEOMETRICAL_DATA (store) =
* FILE CONTAINING INFORMATION DESCRIBING ASSIGNMENT OF PRODUCT(S),
OPERATION(S), TOOL(S) AND COORDINATE POINTS, IN A DISCRETE PART
APPLICATION *

OPERATION_DB (store) =
{ OPERATION_ID + ROUTE_NAME }

OPERATION_ID (data flow) =
* THE IDENTIFICATION FOR THE PRODUCT OR PROCESS OPERATION
TO BE PERFORMED *

OPERATOR_INPUT (data flow) =
[ MENU_SELECTION | CONSOLE_COMMAND | OPERATOR_DATA ]

PARAMETER (data flow) =
PARMKEY + DATA_TYPE + PARAMETER_ADDRESS + NUMBER_OF_READINGS +
DEFAULT_VALUE .

PARAMETER_LIST (store) =
{ [ PARAMETER_NAME + MACHINE_NAME + VALUE ] }.

PARAMETER_LIST2 (store) =
{ [ PARAMETER_NAME + MACHINE_NAME + TOKEN ] }

PARAMETER_NAME (data flow) =
* THE NAME OF THE PARAMETER OF INTEREST, E.G.
TEMPERATURE, DENSITY, ETC. OR IN THE CASE OF
AN EVENT PARAMETER E.G. MEASURE-DONE, END-COATING *.

PARENT_SYMBOL_TABLE (store) =
SYMBOL_TABLE

PARM_DATA (data flow) =
{ PARM_VALUE_RECORD }.

PARM_DB (store) =
GEN_PARM_DB + PARMSET_LIST + PARMSET_DB .

PARM_SEGMENT (store) =
{ PARMSET_ENTRY }

PARM_SEMAPHORE (store) =
* SEMAPHORE PROTECTING THE PARAMETER SEGMENT *

PARM_SHMEM (store) =
   PARM_SEGMENT + PARM_SEMAPHORE + ACCESS_TIMEOUT.

PARM_SHMEM_PTR (data flow) =
   * POINTER TO PARM_SHMEM *.

PARM_VALUE (data flow) =
   * THE ASSIGNED OR CALCULATED QUANTITY REPRESENTING A PROCESS
     PARAMETER AT SOME INSTANT IN TIME *

PARM_VALUE_RECORD (store) =
   PSETKEY + (AUGMENT_KEY) + {PARM_VALUE}

PARMKEY (data flow) =
   PARAMETER_NAME + MACHINE_NAME.

PARMSET (data flow) =
   { PARMSET_NAME + PARMKEY }

PARMSET_DB (store) =
   { PARMSET }.

PARMSET_ENTRY (store) =
   BUSY_FLAG + PARMSET_NAME + STRUCT_AUGMENT + SET_LIST + SERVER_LIST.

PARMSET_LIST (data flow) =
   { PARMSET_NAME + ACCESS_FLAG }.

PARMSET_PTR (data flow) =
   * POINTER TO A PARMSET_ENTRY *.

PD_BASE_ADR (data flow) =
   DOCK_NAME + STATION_NAME .

PID (data flow) =
   * PROCESS IDENTIFICATION NUMBER, AS ASSIGNED BY THE OPERATING
     SYSTEM WHEN A PROCESS IS SPAWNED *

PLOT_REPLY (data/control flow) =
   STRUCT_HDR

PLOT_REQUEST (data/control flow) =
   STRUCT_HDR + SCROP_PLOT_SET + VERBOSE_FLAG PLOTTER_CMDS (data flow) =
* APPROPRIATE COMMANDS AND DATA AS REQUIRED BY THE PEN PLOTTER FOR
DEFINING COORDINATE FRAME OF REFERENCE, SCALING, PAPER FEED,
PEN CONTROL, ETC. *

PLOTTER_MSGS (store) =
< { PLOTTER_REQUEST } | { PLOTTER_REPLY } > .

PORT_SEMAPHORE (store) =
* SEMAPHORE FOR PROTECTING A COMMUNICATIONS PORT *

PROCESS_COMMAND (data flow) =
[ "ISSUE" | "REPORT" | "DOWNLOAD" | "UPLOAD" | "START_OP" | "STOP_OP" ].

PROCESS_LIST (data flow) =
{DISPLAYING_PROCESS}

PROCESS_SCRIPT (store) =
* FILE CONTAINING A SCRIPT DESCRIBING A PROCESS WHICH IS ASSEMBLED AND
VERIFIED BY THE DATA PREPARATION PROCESS AND INTERPRETED BY THE
LOT CONTROL (INTERPRETER) PROCESS *

PSETKEY (data flow) =
PARMSET_NAME + PARMKEY.

PSOFFSET (data flow) =
* OFFSET, AS CALCULATED FROM THE BEGINNING OF THE PARM_SEGMENT,
USED TO INITIALIZE PARMSET_PTR FOR EACH PROCESS NEEDING ACCESS *

ROUTE (data flow) =
ROUTE_NAME + { OPERATION_ID + WKSTATN_NAME } + WAIT_MODE

ROUTE_DB (store) =
{ ROUTE }

SCRIPT (data flow) =
SCRIPT_NAME + STEP_LIST + LABEL_TABLE + SYMBOL_TABLE + BLOCK_STACK.

SCRIPT_DATA (data flow) =
SCRIPT + PARENT_SYMBOL_TABLE + SEMOUTLIST

SCRIPT_NAME (data flow) =
* NAME ASSIGNED TO THE PROCESS SCRIPT *

SCRIPT_NODE (data flow) =
   SCRIPT_BUSY + TIME_FROZEN + ASSEMBLER_PID + NUMBER_STEPS + MEMORY_USED + SCRIPT SCRIPT_SEGMENT (store) =
   { SCRIPT_NODE }.

SCRIPT_SEMAPHORE (store) =
   * SEMAPHORE PROTECTING THE SCRIPT SEGMENT *

SCROP_ASK (data flow) =
   STEP_CTL + PROMPT_LIST + EXPECTED_RESPONSE + STEP_OFFSET + CONSOLE_ENTRY.

SCROP_CHECK_FOR (data flow) =
   STEP_CTL + STATION_STATUS + STATION_NAME.

SCROP_DEFINE (data flow) =
   STEP_CTL + SYMBOL_DEF.

SCROP_DOWNLOAD (data flow) =
   STEP_CTL + SEMKEYID + FILENAME + MACHINE_NAME.

SCROP_EXEC (data flow) =
   STEP_CTL + PROCESS_ID + COMMAND_TO_EXEC.

SCROP_EXT_SET (data flow) =
   STEP_CTL + PSOFFSET + AUGMENTOR + PARAMETER_LIST2 + PARMSET_NAME.

SCROP_GOTO (data flow) =
   STEP_CTL + SCRIPT_NAME + [ LABEL | STEP_OFFSET ].

SCROP_IGNORE (data flow) =

STEP_CTL + EVENT_NAME + MACHINE_NAME.

SCROP_INDEX (data flow) =
   STEP_CTL + AMOUNT

SCROP_INTERPRET (data flow) =
   STEP_CTL + SCRIPT_NAME.

SCROP_ISS_SET (data flow) =
   STEP_CTL + SEMKEYID + PSOFFSET + AUGMENTOR + PARMSET_NAME.

SCROP_LOAD (data flow) =
   STEP_CTL + STATION_NAME.

SCROP_MOVE (data flow) =
    STEP_CTL + FROM_STATION_NAME + TO_STATION_NAME.

SCROP_NOTICE (data flow) =
    STEP_CTL + SEMKEYID + EVENT_NAME + MACHINE_NAME.

SCROP_PLOT_SET (data flow) =
    STEP_CTL + SEMKEYID + PARMSET_NAME + AUGMENTOR + HEADINGS_NAME +
    STRUCT_HEADINGS + ALGORITHM_NAME + ALGINDEX.

SCROP_PROMPT (data flow) =
    PROMPT_LIST + CONSOLE_NAME + CONSOLE_MSG_SEG_KEY +
    CONSOLE_MSG_SEM_KEY SCROP_REP_SET (data flow) =
    STEP_CTL + SEMKEYID + PSETOFFSET + AUGMENTOR + PARMSET_NAME.

SCROP_REPEAT (data flow) =
    STEP_CTL + CLOSE_NUMBER.

SCROP_RESET (data flow) =
    STEP_CTL + STATION_PARAMETER + STATION_NAME.

SCROP_RUN (data flow) =
    STEP_CTL + FUNCTION_TO_RUN.

SCROP_SET (data flow) =
    STEP_CTL + STATION_PARAMETER + STATION_NAME + VALUE.

SCROP_SHELL (data flow) =
    STEP_CTL + COMMAND_TO_SHELL.

SCROP_SHOW_SET (data flow) =
    STEP_CTL + PSOFFSET + AUGMENTOR + PARMSET_NAME + CONSOLE_NAME +
    CONSOLE_MSG_SEG_KEY + CONSOLE_MSG_SEM_KEY SCROP_SLEEP (data flow) =
    STEP_CTL + SECOND_STRING + NUMBER_OF_SECONDS.

SCROP_START_OP (data flow) =
    STEP_CTL + SEMKEYID + PROGRAM_TO_START + MACHINE_NAME.

SCROP_STO_SET (data flow) =
    STEP_CTL + PSOFFSET + AUGMENTOR + PARAMETER_LIST + PARMSET_NAME.

SCROP_UNLOAD (data flow) =
    STEP_CTL + STATION_NAME.

SCROP_UNTIL (data flow) =
    STEP_CTL + ITERATION_STRING + NUMBER_OF_ITERS.

SCROP_WAIT (data flow) =
    STEP_CTL + [ LABEL | STEP_OFFSET ].

SCROP_WHEN (data flow) =
    STEP_CTL + SEMKEYID + EVENT_NAME + MACHINE_NAME + STEP_OFFSET.

SEM_ID (data flow) =
    * SEMAPHORE IDENTIFIER *

SEMAPHORE_POOLS (store) =
    * POOLS OR BLOCKS OF SEQUENTIAL SEMAPHORES THAT PROCESSES CAN PULL
      FROM AS NECESSARY *

BACKGROUND_POOL + DISPLAYING_PROCESS_POOL + MESSAGING_POOL

SEMAPHORES (store) =
    PARM_SEMAPHORE + SCRIPT_SEMAPHORE + {PORT_SEMAPHORE} +
    {DOCK_SEMAPHORE} + STATION_SEMAPHORE + {APPLICATION_SEMAPHORE} +
    CONSOLE_SEMAPHORE + {TRANSCRIPT_SEMAPHORE} + {MESSAGE_SEMAPHORE}

SEMKEYID (data flow) =
    POOL_ID + SEM_KEY + SEM_ID.

SEMOUTELT (data flow) =
    SEMOUT_TYPE + SCRIPT_NAME + STEP.

SEMOUTLIST (store) =

{ SEMOUTELT }

SERVER_DB (store) =
    { SERVER_NAME + SERVER_REQUEST_KEY + SERVER_REPLY_KEY }

SERVER_LIST (store) =
    { SERVER_NAME + MACHINE_LIST }.

SERVER_MSGS (store) =
  < {SERVER_REQUEST} | {SERVER_REPLY} >

SERVER_NAME (data flow) =
  * NAME BY WHICH TO REFER TO THE MACHINE SERVER; A SERVER
    TRANSLATES A DATA REQUEST INTO THE APPROPRIATE PROTOCOL
    OF THE MACHINE CONTROLLER BEING SERVED *.

SERVER_REPLY (data/control flow) =
  STRUCT_HDR

SERVER_REQUEST (data/control flow) =
  STRUCT_HDR + MSETOFFSET + VERBOSE_FLAG .

SET_ELEMENT (data flow) =
  MSETKEY + PARMKEY + PSETKEY + PARAMETER_NAME + MACHINE_NAME +
  NUMBER_OF_READINGS + PARAMETER_INDEX + DATA_TYPE + EVENT_SEMAPHORE +
  SCRIPT_TOKEN + VALUE_LIST.

SET_ELEMENT_PTR (data flow) =
  * POINTER TO SET_ELEMENT *

SET_LIST (data flow) =
  {SET_ELEMENT}

SHARED_MEMORY_SEGMENTS (store) =
  PARM_SEGMENT + SCRIPT_SEGMENT + CONSOLE_SEGMENT +
  STATION_SEGMENT + {TRANSCRIPT_SEGMENT} + {MESSAGE_SEGMENT} +
  {APPLICATION_SEGMENT}

STACK_RECORD (store) =
  [BLOCK_TYPE + CLOSE_NUMBER + OPEN_STEP + ITERS_SO_FAR].

STATION (data flow) =
  * ASSOCIATES STATION WITH THE LOT_CTL PROCESS THAT WILL SERVE IT *

STATION_NAME + STATION_STATUS + LOTKEY + UNIT_NAME +
  REQUEST_KEY + REPLY_KEY + STATION_TRANSCRIPT_SEG_KEY +
  STATION_TRANSCRIPT_SEM_KEY

STATION_DB (store) =
  { STATION } .

STATION_ENTRY (data flow) =
  STATION + PROCESS_LIST + WORK_QUEUE + INTERPRETER_PID .

STATION_SEGMENT (store) =
  {STATION_ENTRY}

STATION_SEMAPHORE (store) =
  * SEMAPHORE PROTECTING THE STATION_SEGMENT *.

STATUS (data flow) =
  [ "SUCCESS" | "FAILURE" ].

STEP (data flow) =
  [ STEP_CTL | SCROP_ASK | SCROP_CHECK_FOR | SCROP_DEFINE |
  SCROP_DOWNLOAD | SCROP_EXEC | SCROP_EXT_SET | SCROP_GOTO |
  SCROP_IGNORE | SCROP_INTERPRET | SCROP_ISS_SET | SCROP_LOAD |
  SCROP_MOVE | SCROP_NOTICE | SCROP_PLOT_SET | SCROP_PROMPT |
  SCROP_REP_SET | SCROP_REPEAT | SCROP_RESET | SCROP_RUN |
  SCROP_SET | SCROP_SHELL | SCROP_SHOW_SET | SCROP_SLEEP |
  SCROP_START_OP | SCROP_STO_SET | SCROP_UNLOAD | SCROP_UNTIL |
  SCROP_WAIT | SCROP_WHEN | STOP_OP ].

STEP_CTL (data/control flow) =
  STEP_NUMBER + STEP_TYPE + BACKGROUND_FLAG.

STEP_LIST (store) =
  { STEP }.

STRUCT_AUGMENT (data flow) =
  [ JOB_NAME | STRUCT_LOT | STRUCT_UNIT | TIME ].

STRUCT_CURVE (data flow) =
  PEN + NUMBER_POINTS + X_VALUES + Y_VALUES.

STRUCT_HDR (data/control flow) =
    MESSAGE_TYPE + PROCESS_COMMAND + SEMKEYID +
    REPLY_FLAG + ERROR_FLAG.

STRUCT_HEADINGS (data flow) =
  MIN_X + MAX_X + MIN_Y + MAX_Y + FORM_TYPE + TITLE + X_LABEL +
  Y_LABEL + AUGMENTOR + (AUGMENT_KEY).

STRUCT_INST_RES (data flow) =
  {MESSAGE_QUE_ID} + {SEMKEYID} + {SEMPOOLID} +
  {SHMEM_SEGMENT_ID + SEMKEYID} + {TASK_PID}

STRUCT_LOT (data flow) =
  JOB_NAME + LOT_ID.

STRUCT_REQ_CONF (data flow) =
  {MESSAGE_QUE_ID} + {SEMKEYID} + {SEMPOOLID + NUMBER_OF_SEMS} +
  {SHMEM_SEGMENT_ID + SEMKEYID} + {TASK_NAME + TASK_ARGUMENTS}

STRUCT_UNIT (data flow) =
  JOB_NAME + LOT_ID + UNIT_ID.

SYMBOL (data flow) =
  TOKEN + VALUE.

SYMBOL_TABLE (store) =
  { SYMBOL }.

TIMESTAMP (data flow) =
  * A TIME VALUE ASSOCIATED WITH OR STAMPED ON SOME
  PARAMETER OR EVENT OF INTEREST *.

TOOL_DB (store) =
  { TOOL_NAME + TOOL_PARAMETERS + OPARATION_ID }

TOOL_NAME (data flow) =
  * NAME OF AN INSTRUMENT USED IN AN OPERATION
  ASSOCIATED WITH A DISCRETE PART APPLICATION *

TRACE_FILE (store) =
  * FILE CONTAINING LINES OF TRANSCRIPT WHICH REPRESENT INFORMATION
  ABOUT PROCESS EVENT OCCURRENCE *

TRACE_FLAG (data flow) =
  * FLAG INDICATING THAT TRANSCRIPT LINES SHOULD BE WRITTEN
  TO THE TRACE_FILE FOR THE SCRIPT IN PROCESS *

TRANSCRIPT_SEGMENT (store) =
  {TRANSCRIPT_LINE}

UNIT_ID (data flow) =
  * NAME OF A UNIT OF PRODUCT; USUALLY ASSIGNED AS
  A NUMERIC, E.G. UNIT 1, 2, 3, ETC. *.

VALUE_LIST (store) =
  { VALUE }.

VERBOSE_FLAG (control flow) =
  * VERBOSE MODE FLAG - INDICATES TO THE PROCESS WHAT DIAGNOSTIC
  MESSAGES SHOULD BE DISPLAYED *

( [ "V" | "VV" ] ).

VERBOSE_MODE (control flow, alias) =
  * SAME AS VERBOSE_FLAG *

WCC_CONFIG (store) =
  * FILE CONTAINING A DESCRIPTION OF THE RESOURCES (MESSAGE_QUEUES, SEMAPHORES, SEMAPHORE_POOLS, SHARED_MEMORY_SEGMENTS AND PROCESS TASKS) REQUIRED FOR A PARTICULAR APPLICATION *

WHEN_EVENT_LIST (store) =
  { SEMOUTELT }.

Appendix D

NAME:
addjob;3

TITLE:
Mini-Spec

PARAMETERS:
JOB_NAME : data_In
VERBOSE_FLAG : control_In

LOCALS:

BODY:

Compose the job record key from JOB_NAME ;

Add (call DBMS:addrec) a database record for the specified job ;

NAME:
addlot;3

TITLE:
Mini-Spec

PARAMETERS:
JOB_NAME : data_In
LOT_ID : data_In
VERBOSE_FLAG : control_In

LOCALS:

BODY:

Compose the lot record key from JOB_NAME and LOT_ID ;

Add (call DBMS:addrec) a database record for the specified lot ;

NAME:
answer_quest;5

TITLE:
CON_MS

PARAMETERS:
ANSWER_QUEST : data_out

LOCALS:

BODY:

(call PCOM:wsem(CONSOLE_SEMAPHORE)) ;

Verify that pending question was still valid ;

Construct a response from the user's input and the CONSOLE->STRUCT_HEADER ;

"null" out the CONSOLE->PENDING_QUESTION ;

For each DISPLAYING_PROCESS on CONSOLE->PROCESS_LIST except this process (call PCOM:wsem(DISPLAYING_PROCESS->SEM)) to wait until
  process is ready to be signalled ;

(call UNIX:kill(DISPLAYING_PROCESS->PID, PENDING_QUESTION_REGION_SIGNAL))
  to inform the process of the update ;

(call PCOM:reply) to provide the response to the interpreter process
which posed the question ;

```
/*
** now release the console
*/
```
(call PCOM:sgsem(CONSOLE_SEMAPHORE)) ;

NAME:
bldmset;5

TITLE:
Mini_Spec

PARAMETERS:
PARMSET_PTR : data_In
PARM_SEGMENT: data_In
VERBOSE_FLAG : data_In

LOCALS:

BODY:

For all (call PDATA_BST:sBSTinorder) parameters in the PARAMETER_LIST
  Access the parameters associated machine by MACHINE_NAME ;
  Access the server for this machine by SERVER_NAME ;

If the server is not found (call PDATA_BST:sBSTfind) in the SERVER_LIST
    Allocate (sBSTALLOC), initialize and insert one for SERVER_NAME ;

If the machine is not found (call PDATA_BST:sBSTfind) in the MACHINE_LIST
   Allocate (call PDATA_BST:sBSTALLOC), initialize and insert one
    for MACHINE_NAME;

Allocate (call PDATA_BST:sBSTALLOC) a parameter set element
 (MSET_ELEMENT) ordered by an appropriate key ;

Calculate the appropriate offset point to the corresponding
 SET_ELEMENT, initialize it and insert (call PDATA_BST:sBSTinsert) it
 into the list (MSET_LIST) by key (MSETKEY) ;

NAME:
bldset;5

TITLE:
Mini_Spec

PARAMETERS:
PARM_SEGMENT : data_in
VERBOSE_FLAG : data_in
AUGMENTOR: control_in
PARMSET_NAME : data_in
PSOFFSET : data_out

LOCALS:

BODY:

Allocate memory for a parameter set structure in PARM_SEGMENT ;

Calculate the offset from the beginning of the segment (PSOFFSET) ;

Initialize the PARAMETER_LIST ;

Initialize the SERVER_LIST ;

Access the parameter set specified by PARMSET_NAME ;

Find the set (call DBMS:makeset) of parameter records associated
   with PARMSET_NAME ;

For all PARAMETERS in the set
   Access the parameters database record (PARM_REC) ;
   Find (call DBMS:faccess) the corresponding General parameter table
    entry for this parameter ;

Allocate a SET_ELEMENT (call PDATA_BST:sBSTALLOC) and load its composite
    members from the database ;

Allocate space for the parameter's value array (call PDATA_NFM:NFMalloc)
    and initialize it for the data type (DATA_TYPE) specified ;

Insert (call PDATA_BST:sBSTinsert) the parameter element in the parameter tree ;

Return (PSOFFSET);

NAME:
bring_up;3

TITLE:
Mini-spec

PARAMETERS:
FILENAME : data_In
STRUCT_INST_RES : data_In

LOCALS:

BODY:

```
/*
** Reading requested resource configuration
*/
Read the requested configuration (call read_conf) from FILENAME
 into STRUCT_REQ_CONF ;

Verify that the file had no duplicate keys (call uniq_key) within
 the appropriate set ;

Attempt to build the system (call build_sys) according to the
  STRUCT_REQ_CONF creating STRUCT_INST_RES ;
```

NAME:
bsrvrtbl;4

TITLE:
Mini-spec

PARAMETERS:
SERVER_NAME : data_In
MACHINE_TABLE_PTR : data_out

LOCALS:

BODY:

```
If SERVER_NAME = "All"
   Sequentially access (call DBMS:seqacc) each machine server record
    beginning with the first one ;

For each Server in the list
      Find the set (call DBMS:makeset) of machines associated with this server ;

For each Machine
         Access the machines database record ;
         Allocate a Machine_Element (call PDATA_BST:BSTALLOC) ;
         Load the elements composite parts with MACHINE_NAME,
          PORT_NAME, MACHINE_ADDRESS, and SERVER_KEYS ;

Insert the element into the Server table (call PDATA_BST:BSTinsert) ;

Return(MACHINE_TABLE_PTR) ;
```

NAME:
build_sys;4

TITLE:
Mini-spec

PARAMETERS:
STRUCT_INST_RES : data_In
STRUCT_REQ_CONF : data_In

LOCALS:

BODY:

```
/*
** Function to create resources required for the WCC
*/

/*
** Create message queues
*/
While more queues requested
    Create message queues (call UNIX:msgget) ;
    Store the message queue key ;
    Track number of installed queues ;

/*
** Create semaphore pools
*/
While more pools requested
    Create semaphore pools (call PCOM_SEM:crsmpool) ;
    Store the pool key, MIN & MAX keys ;
    Track number of installed pools ;

/*
** Create shared memory segments
*/
While more segments requested
    Create shared memory segments (PCOM_SEM:crshmlk) ;
    Store shared memory address ;
    Track number of installed segments ;

/*
** Create tasks to be spawned
*/
While more tasks requested
    Spawn a child process (call UNIX:fork) ;
    Overlay child process (call UNIX:execv) ;
    Store child process ID ;
    Track number of installed tasks ;
```

NAME:
CheckWhens;4

TITLE:
Mini_Spec

PARAMETERS:
SCRIPT_DATA : data_In
CONTEXT : data_In

LOCALS:

BODY:

```
/*
** Walk the when-event list to see if any events have occurred
*/

For all events on CONTEXT->WHEN_EVENT_LIST
   Set 'step' to SEMOUTELT->STEP ;

If step->SEMKEYID is locked
      Continue loop ;

/*
   ** If this point is reached, the when-event has occurred
   */
   If CONTEXT->TRACE_MODE
      Write a record to the trace file ;

If the operation to perform is a Goto
      Return the target ;
   Else
      Save the current step in SCRIPT_DATA->STEP_LIST
        (call ISdispatch[step->substep->STEP_CTL->STEP_TYPE](ISargs,CONTEXT)) ;
      Restore the saved step as current in SCRIPT-DATA->STEP_LIST ;

Return (NULL) ;
```

NAME:
chkevts;5

TITLE:
Mini-Spec

PARAMETERS:
PARMSET_ENTRY : data_In
VERBOSE_FLAG : control_In

LOCALS:

BODY:

```
Initialize the local parameter set pointer from PARMSET_ENTRY;

For all servers (call PDATA_BST:sBSTinorder(chkmach)) in MACHINE_TABLE
   For all machines (call PDATA_BST:sBSTinorder(chkmset) in MACHINE_TABLE
```

Allocate (call PDATA_NFM:NFMalloc) and copy machine name into tree for
 resetting of events ;
Initialize the offset for this parameter set (MSETOFFSET) ;
Initialize the reset events flag to FALSE ;

For all parameters (call PDATA_BST:sBSTinorder(chkevelt)) in the set
 associated with this machine
    If the current event is set (i.e. active) AND it was enabled
       Signal (call PCOM_SEM:sgsem) the corresponding semaphore associated
        with this event ;
       Disable this event, such that it may be enabled again ;
       Set the reset events flag to TRUE ;
       Allocate (call PDATA_BST:sBSTALLOC) copy and insert (call PDATA_BST:sBSTinsert) a
        parameter set element for this parameter ;

If verbose
          Display message indicating that event on machine was SET/enabled ;
       Else
          If verbose
             Display message indicating that event on machine was NOTSET/enabled ;

If the reset events flag is TRUE (i.e. there are events to reset)
   Issue (i.e. reset) the appropriate events (call PSET:issueset) ;
   Flush (call PSET:flushmset) the temporary (reset) parameter set ;
   Remove (call PDATA_NFM:NFMfree) the temporary machine tree ;

NAME:
close_console;5

TITLE:
CON_MS

PARAMETERS:

LOCALS:

BODY:

(call PCOM:wsem(CONSOLE_SEMAPHORE)) to gain exclusive access
 to console segment ;

Find and remove this process' DISPLAYING_PROCESS element
   on CONSOLE->PROCESS_LIST (call PCOM:wsem(STATION_SEMAPHORE)) to gain exclusive access to
 station segment ;

For each station associated with this console
   Find and remove this process' DISPLAYING_PROCESS
    element on STATION->PROCESS_LIST ;

(call PCOM:retspool()) to return the semaphore used by this process ;

(call UNIX:exit()) to exit the process ;

NAME:
con_signals;8

TITLE:
CON_MS

PARAMETERS:

LOCALS:

BODY:

Set up service routines with UNIX:signal() as follows:

```
PENDING_QUESTION_REGION_SIGNAL : "update_quest" ;
STATION_UPDATE_SIGNAL          : "update_stations" ;
MESSAGE_REGION_UPDATE_SIGNAL   : "update_list_region" ;
INTERRUPT_SIGNAL               : "close_console" ;
TRANSCRIPT_UPDATE_SIGNAL       : SIG_IGN ;
ALARM_SIGNAL                   : SIG_IGN ;
MACHINE_UPDATE_SIGNAL          : SIG_IGN ;
```

NAME:
CONTROL_LOT_PROCESSING;3

TITLE:
Mini-Spec

PARAMETERS:
STATION_NAME : data_in
VERBOSE_FLAG : control_in

LOCALS:

BODY:

Initialize the trace file (call UNIX:fopen) for transaction logging ;
Initialize database access (call DBMS:opendb) ;
Initialize the station (call PSET:setstatn) ;

Wait on a message request (call PCOM:wreq) ;

Obtain the command_line arguments (call UNIX:getopt) and initialize the processing station request ;

On receipt of a message request, branch on the command
   switch(LCTL_REQUEST->PROCESS_COMMAND)

case "PROCESS":
         Find the process script (call PDATA_BST:SBSTfind) to use for this
           process request at this station ;

If the script wasn't found then freeze (call Freeze) it into SCRIPT_SEGMENT ;

If the script is busy then indicate so to the calling
           process (call PCOM_MSG:send_reply) ;

Wait for the station to become "IDLE" (call PSET:getstatn) ;

Update the station status (call PSET:setstatn) & information with the
 lot of product being processed ;

Execute (call ScrInterp) the process script to control & synchronize
 operations for this station in processing this product ;

Wait (call PCOM_SEM:wsem) on the script ;
Set the script status to available ;
Release the segment (call PDATA_BST:SBSTRELEASE) ;

Send reply (call PCOM_MSG:send_reply) to the requesting process ;

Deaccess the parameter segment (call PCOM_SHM:deshm) ;

NAME:
CONTROL_MACHINES;12

TITLE:
Mini-spec

PARAMETERS:
MCTL_REQUEST: data_In

LOCALS:

BODY:

Access the parameter segment (call PCOM_SHM:acshmti) to initialize PARMSEG_PTR ;
Release the segment (call PCOM_SEM:sgsem) ;

Build a table (MISC_FUNCS:bldsrvrtbl) to associate machines with
 their respective servers as configured in the database ;

Wait on a message request (call PCOM_MSG:wreq) ;

On receipt of a message request, branch on the command:
  Switch (PROCESS_COMMAND)

Case "ISSUE":  Get the data values to issue (call PSET:getdbvals);
                   Issue PARMSET_ENTRY values to appropriate machine
                    server (call PSET:issueset) ;

Case "REPORT": Request the appropriate machine server to report
                    on the process PARMSET_ENTRY values (call PSET:reportset) ;

Case "UPLOAD": Request (call PCOM_MSG:request) the appropriate machine server
                    to transfer (upload) the FILENAME specified ;

Case "DNLOAD": Request (call PCOM_MSG:request) the appropriate machine server
                    to transfer (dnload) the FILENAME specified ;

Case "START_OP:Request (call PCOM_MSG:request) the appropriate machine server
                    to start (start) the OPERATION_ID specified ;

Case "STOP_OP: Request (call PCOM_MSG:request) the appropriate machine server to stop (stop) the OPERATION_ID specified ;

NAME:
deliver;3

TITLE:
Mini-spec

PARAMETERS:
PD_BASE_ADR : data_In
VERBOSE_FLAG : control_In

LOCALS:

BODY:

(call pset:getstatn(PD_BASE_ADR->STATION_NAME)) ;

Verify that status of station is appropriate for a
 load operation;

If verification passes
    (call respond(ACCEPT, PD_BASE_ADR->DOCK_NAME, VERBOSE_MODE)) ;
    Set status of station to BUSY ;
    Set status of dock to DELIVERING ;
    Return (SUCCESS) ;
else
    (call respond(REJECT, PD_BASE_ADR->DOCK_NAME, VERBOSE_MODE)) ;
    Return (ERROR) ;

NAME:
failed;4

TITLE:
Mini-Spec

PARAMETERS:
VERBOSE_FLAG : control_In
PD_BASE_ADR : data_In

LOCALS:

BODY:

Annunciate the failure ;

/*
** Hold the mover until problem is corrected
*/
(call respond(HOLD, PD_BASE_ADR->DOCK_NAME, VERBOSE_MODE)) ;

(call corrective action routine) ;

NAME:
fGSask;4

TITLE:
Mini_Spec

PARAMETERS:
fGSargs : data_In
SCROP_ASK : data+control_In

LOCALS:

BODY:

```
/*
** Audit the source data
*/
Check the source data in fGSargs for correct type
 and length ;

/*
** Allocate the step
*/

Allocate memory in the SCRIPT_SEGMENT for
 a new SCROP_ASK ;

Fill in data for question, console and expected response ;

(call fGSdispatch) to process sub-step; i.e., the step
 to be executed at run-time if operator gives answer
 different than expected ;

Set the STEP_NUMBER in STEP_CTL ;
```

NAME:
fGSbrace;3

TITLE:
Mini_Spec

PARAMETERS:
fGSargs : data_In
SCROP_BRACE : data+control_In

LOCALS:

BODY:

```
/*
** Audit the source data
*/
Check argument count ;
```

```
If VERBOSE_FLAG
   List the step to stdout ;

/*
** Allocate the step
*/
Allocate memory in the SCRIPT_SEGMENT for
 a new SCROP_BRACE ;

Set the STEP_NUMBER in STEP_CTL ;
```

NAME:
fGScheck_for;3

TITLE:
Mini_Spec

PARAMETERS:
fGSargs : data_In
SCROP_CHECK_FOR : data+control_In

LOCALS:

BODY:

```
/*
** audit the source data
*/
Check argument count
Check string length of "status" and "station"

If VERBOSE_FLAG
   List the step to stdout ;

/*
** Allocate the step
*/
Allocate memory in the SCRIPT_SEGMENT for
 a new SCROP_CHECK_FOR ;

/*
** Fill in the data
*/
Copy STATUS into SCROP_CHECK_FOR ;
Copy STATION_NAME into SCROP_CHECK_FOR ;

Set the STEP_NUMBER in STEP_CTL ;
```

NAME:
fGSdefine;4

TITLE:
Mini_Spec

PARAMETERS:
fGSargs : data_In
SCROP_DEFINE : data+control_In

LOCALS:

BODY:

```
/*
** audit the source data
*/
Check argument count ;

If VERBOSE_FLAG
   List the step to stdout ;

/*
** Allocate the step
*/
Allocate memory in the SCRIPT_SEGMENT for
 a new SCROP_DEFINE ;

/*
** Allocate and set the definition
*/
Allocate memory for SYMBOL and point
 SYMBOL_DEF of SCROP_DEFINE to it ;

Copy TOKEN into SYMBOL ;
Copy VALUE into SYMBOL ;
```

NAME:
fGSdownload;7

TITLE:
Mini_Spec

PARAMETERS:
fGSargs : data_In
SCROP_DOWNLOAD : data+control_In

LOCALS:

BODY:

```
/*
** Audit the source data
*/
Check argument count ;
Check string length of "file" and "machine" ;
```

```
If VERBOSE_FLAG
   List step to stdout ;

/*
** Allocate the step
*/
Allocate memory in the SCRIPT_SEGMENT for
 a new SCROP_DOWNLOAD ;

/*
** Fill in the data
*/
Copy FILENAME to SCROP_DOWNLOAD ;
Copy MACHINE_NAME to SCROP_DOWNLOAD ;

/*
** Set background flag and step number
*/
If the last field is a '&',
   Set in STEP_CTL the BACKGROUND_FLAG ;

Set the STEP_NUMBER in STEP_CTL
```

NAME:
fGSeject;5

TITLE:
Mini_Spec

PARAMETERS:
STEP_CTL : data+control_In
fGSargs : data_In

LOCALS:

BODY:

```
/*
** Audit the source data
*/
Check argument count ;

/*
** Allocate the step
*/
Allocate memory in the SCRIPT_SEGMENT for
 a new SCROP_EJECT ;
```

NAME:
fGSexec;9

TITLE:
Mini_Spec

PARAMETERS:
fGSargs : data_In
SCROP_EXEC : data+control_In

LOCALS:

BODY:

```
/*
** Audit the source data
*/
Check argument count ;
Check string length of "command" ;

If VERBOSE_FLAG
    List source step to stdout ;

/*
** Allocate the step
*/
Allocate memory in the SCRIPT_SEGMENT for
 a new SCROP_EXEC ;

/*
** Fill in the data
*/
Copy COMMAND_TO_EXEC into SCROP_EXEC ;

/*
** Set background flag and step number
*/
If the last field is a '&',
    Set in STEP_CTL the BACKGROUND_FLAG ;

Set the STEP_NUMBER in STEP_CTL ;
```

NAME:
fGSext_set;3

TITLE:
Mini_Spec

PARAMETERS:
SCROP_EXT_SET : data+control_In
fGSargs : data_In

LOCALS:

BODY:

```
/*
** Audit the source data
```

```
*/
Check argument count ;
Check string length of "parameter set name" ;
Validate AUGMENTOR ;
Check string length of "parameter names", "machine
 names" and "tokens" ;

If VERBOSE_FLAG
   List step to stdout ;

/*
** Allocate the step
*/
Allocate memory in the SCRIPT_SEGMENT for
 a new SCROP_EXT_SET ;

/*
** Fill in the data
*/
Copy PARMSET_NAME to SCROP_EXT_SET ;
Set the AUGMENTOR in SCROP_EXT_SET ;

/*
** Fill in the data
*/
For all parameter triples
   Allocate memory for PARAMETER_LIST2 element ;
   Copy PARAMTER_NAME to PARAMETER_LIST2 element ;
   Copy MACHINE_NAME to PARAMETER_LIST2 element ;
   Copy TOKEN to PARAMETER_LIST2 element ;
   Append the element to the PARAMETER_LIST2 in the
    SCROP_EXT_SET ;

If VERBOSE_FLAG
   List step to stdout ;

Set the STEP_NUMBER in STEP_CTL ;
```

NAME:
fGSextract;4

TITLE:
Mini_Spec

PARAMETERS:
SCROP_EXT_SET : data+control_In
fGSargs : data_In

LOCALS:

BODY:

```
/*
** Audit the source data
*/
Check argument count ;
Check string length of "parameter set name" ;
```

```
Check type ;
Check string length of "parameter names", "machine
 names" and "tokens" ;

If VERBOSE_FLAG
   List step to stdout ;

/*
** Allocate the step
*/
Allocate memory in the SCRIPT_SEGMENT for
 a new SCROP_EXT_SET ;

/*
** Fill in the data
*/
Copy PARMSET_NAME to SCROP_EXT_SET ;

/*
** Fill in the data
*/
For all parameter triples
   Allocate memory for PARAMETER_LIST2 element ;
   Copy PARAMTER_NAME to PARAMETER_LIST2 element ;
   Copy MACHINE_NAME to PARAMETER_LIST2 element ;
   Copy TOKEN to PARAMETER_LIST2 element ;
   Append the PARAMETER_LIST to the
     SCROP_EXT_SET ;

If VERBOSE_FLAG
   List step to stdout ;

Set the STEP_NUMBER in STEP_CTL ;
```

NAME:
fGSgoto;4

TITLE:
Mini_Spec

PARAMETERS:
fGSargs : data_In
SCROP_GOTO : data+control_In

LOCALS:

BODY:

```
/*
** Audit the source data
*/
Check argument count ;

If VERBOSE_FLAG
   List step to stdout ;

/*
** Allocate the step
```

```
*/
Allocate memory in the SCRIPT_SEGMENT for
 a new SCROP_GOTO ;

/*
** Fill in the data
*/
Copy LABEL into SCROP_GOTO ;

Set the STEP_NUMBER in STEP_CTL ;
```

NAME:
fGSignore;3

TITLE:
Mini_Spec

PARAMETERS:
fGSargs : data_In
SCROP_IGNORE : data+control_In

LOCALS:

BODY:

```
/*
** Audit the source data
*/
Check argument count ;
Check string length of "event" and "machine" ;

If VERBOSE_FLAG
   List step to stdout ;

/*
** Allocate the step
*/
Allocate memory in the SCRIPT_SEGMENT for
 a new SCROP_IGNORE ;

/*
** Fill in the data
*/
Copy EVENT_NAME to SCROP_IGNORE ;
Copy MACHINE_NAME to SCROP_IGNORE ;

Set the STEP_NUMBER in STEP_CTL ;
```

NAME:
fGSindex;4

TITLE:
Mini_Spec

PARAMETERS:
fGSargs : data_In
SCROP_INDEX : data+control_In

LOCALS:

BODY:

```
/*
** Audit the source data
*/
Check argument count ;
Check string length of "station name" and "value" ;

If VERBOSE_FLAG
   List step to stdout ;

/*
** Allocate the step
*/
Allocate memory in the SCRIPT_SEGMENT for
 a new SCROP_INDEX ;

/*
** Fill in the data
*/
Copy STATION_NAME into SCROP_INDEX ;
Copy VALUE into SCROP_INDEX ;

Set the STEP_NUMBER in STEP_CTL ;
```

NAME:
fGSinterpret;5

TITLE:
Mini_Spec

PARAMETERS:
SCROP_INTERPRET : data+control_In
fGSargs : data_In

LOCALS:

BODY:

```
/*
** Audit the source data
*/
Check argument count ;
Check string length of "scriptspec" ;

If VERBOSE_FLAG
   List step to stdout ;

/*
** Allocate the step
*/
Allocate memory in the SCRIPT_SEGMENT for
 a new SCROP_INTERPRET ;

Set the STEP_NUMBER in STP_CTL ;
```

```
/*
** Fill in the data
*/
Copy SCRIPT_NAME into SCROP_INTERPRET ;
(call ScrPass1(SCRIPT_NAME,SCRIPT_SEGMENT,VERBOSE_FLAG)) ;

Check for first pass to be a SUCCESS ;
```

NAME:
fGSiss_set;4

TITLE:
Mini_Spec

PARAMETERS:
fGSargs : data_In
SCROP_ISS_SET : data+control_In

LOCALS:

BODY:

```
/*
** Audit the source data
*/
Check argument count ;
Check string length of "parameter set name" ;
Validate AUGMENTOR ;

If VERBOSE_FLAG
   List step to stdout ;

/*
** Allocate the step
*/
Allocate memory in the SCRIPT_SEGMENT for
 a new SCROP_ISS_SET ;

/*
** Fill in the data
*/
Set the AUGMENTOR in SCROP_ISS_SET ;
Copy PARMSET_NAME into SCROP_ISS_SET ;

/*
** Set background flag and step number
*/
If the last field is a '&',
   Set in STEP_CTL the BACKGROUND_FLAG ;

Set the STEP_NUMBER in STEP_CTL ;
```

NAME:
fGSissue;3

TITLE:
Mini_Spec

PARAMETERS:
fGSargs : data_In
SCROP_ISSUE : data+control_In

LOCALS:

BODY:

```
/*
** Audit the source data
*/
Check argument count ;
Check string length of "parameter set name" ;
Check type ;

If VERBOSE_FLAG
   List step to stdout ;

/*
** Allocate the step
*/
Allocate memory in the SCRIPT_SEGMENT for
 a new SCROP_ISSUE ;

/*
** Fill in the data
*/
Set the AUGMENTOR ;
Copy PARMSET_NAME into SCROP_ISS_SET ;

/*
** Set background flag and scrop type
*/
If the last field is a '&',
   Set in STEP_CTL the BACKGROUND_FLAG ;

Set the STEP_NUMBER in STEP_CTL ;
```

NAME:
fGSload;3

TITLE:
Mini_Spec

PARAMETERS:
SCROP_LOAD : data+control_In
fGSargs : data_In

LOCALS:

BODY:

```
/*
** Audit the source data
*/
Check argument count ;
Check string length of "station" ;

If VERBOSE_FLAG
   List step to stdout ;

/*
** Allocate the step
*/
Allocate memory in the SCRIPT_SEGMENT for
 a new SCROP_LOAD ;

/*
** Fill in the data
*/
Copy STATION_NAME into SCROP_LOAD ;

Set the STEP_NUMBER in STEP_CTL ;
```

NAME:
fGSmove;4

TITLE:
Mini_Spec

PARAMETERS:
SCROP_MOVE : data+control_In
fGSargs : data_In

LOCALS:

BODY:

```
/*
** Audit the source data
*/
Check argument count ;
Check string length of "to station" ;
Check string length of "from station" ;

If VERBOSE_FLAG
   List step to stdout ;

/*
** Allocate the step
*/
Allocate memory in the SCRIPT_SEGMENT for
 a new SCROP_MOVE ;

/*
** Fill in the data
*/
Copy TO_STATION_NAME into SCROP_MOVE ;
Copy FROM_STATION_NAME into SCROP_MOVE ;

Set the STEP_NUMBER in STEP_CTL ;
```

NAME:
fGSnotice;4

TITLE:
Mini_Spec

PARAMETERS:
fGSargs : data_In
SCROP_NOTICE : data+control_In

LOCALS:

BODY:

```
/*
** Audit the source data
*/
.Check argument count ;
Check string length of "event" and "machine" ;

If VERBOSE_FLAG
    List step to stdout ;

/*
** Allocate the step
*/
Allocate memory in the SCRIPT_SEGMENT for
 a new SCROP_NOTICE ;

/*
** Fill in the data
*/
Copy EVENT_NAME to SCROP_NOTICE ;
Copy MACHINE_NAME to SCROP_NOTICE ;

/*
** Set background flag and step number
*/
If the last field is a '&',
    Set in STEP_CTL the BACKGROUND_FLAG ;

Set the STEP_NUMBER in STEP_CTL ;
```

NAME:
fGSplot_set;5

TITLE:
Mini_Spec

PARAMETERS:
SCROP_PLOT_SET : data+control_In
fGSargs : data_In

LOCALS:

BODY:

```
/*
** Audit the source data
*/
Check argument count ;
Check string length of "parameter set name",
 "form" and "algorithm" ;
Verify AUGMENTOR ;

If VERBOSE_FLAG
   List step to stdout ;

/*
** Allocate the step
*/
Allocate memory in the SCRIPT_SEGMENT for
 a new SCROP_PLOT_SET ;

/*
** Fill in the data
*/
Set the AUGMENTOR in SCROP_PLOT_SET ;
Copy PARMSET_NAME to SCROP_PLOT_SET ;
Copy HEADINGS_NAME "form" to SCROP_PLOT_SET ;
Copy ALGORITHM_NAME to SCROP_PLOT_SET ;

/*
** Set background flag and step number
*/
If the last field is a '&',
   Set in STEP_CTL the BACKGROUND_FLAG ;

Set the STEP_NUMBER in STEP_CTL ;
```

NAME:
fGSprompt;4

TITLE:
Mini_Spec

PARAMETERS:
fGSargs : data_In
SCROP_PROMPT : data+control_In

LOCALS:

BODY:

```
/*
** Audit the source data
*/
Check the source data in fGSargs for correct type
 and length ;

/*
** Allocate the step
*/
Allocate memory in the SCRIPT_SEGMENT for
 a new SCROP_PROMPT ;
```

NAME:
fGSquit;6

TITLE:
Mini_Spec

PARAMETERS:
fGSargs : data_In
STEP_CTL : data+control_In

LOCALS:

BODY:

```
/*
** Audit the source data
*/
Check argument count ;

If VERBOSE_FLAG
   List step to stdout ;

/*
** Allocate the step
*/
Allocate memory in the SCRIPT_SEGMENT for
 a new STEP_CTL ;

Set the STEP_NUMBER in STEP_CTL ;
```

NAME:
fGSrep_set;3

TITLE:
Mini_Spec

PARAMETERS:
fGSargs : data_In
SCROP_REP_SET : data+control_In

LOCALS:

BODY:

```
/*
** Audit the source data
*/
Check argument count ;
Check string length of "parameter set name" ;
Validate AUGMENTOR ;

If VERBOSE_FLAG
   List step to stdout ;

/*
```

```
**      Allocate the step
*/
Allocate memory in the SCRIPT_SEGMENT for
 a new SCROP_REP_SET ;

/*
**      Fill in the data
*/
Set the AUGMENTOR in SCROP_REP_SET ;
Copy PARMSET_NAME into SCROP_REP_SET ;

/*
**      Set background flag and step number
*/
If the last field is a '&',
    Set in STEP_CTL the BACKGROUND_FLAG ;

Set the STEP_NUMBER in STEP_CTL ;
```

NAME:
fGSrepeat;3

TITLE:
Mini_Spec

PARAMETERS:
fGSargs : data_in
SCROP_REPEAT : data+control_in

LOCALS:

BODY:

```
/*
**      Audit the source data
*/
Check argument count ;

If VERBOSE_FLAG
   List step to stdout ;

/*
**      Allocate the step
*/
Allocate memory in the SCRIPT_SEGMENT for
 a new SCROP_REPEAT ;

Set the STEP_NUMBER in STEP_CTL ;
```

NAME:
fGSreset;3

TITLE:
Mini_Spec

PARAMETERS:
fGSargs : data_In
SCROP_RESET : data+control_In

LOCALS:

BODY:

```
/*
** Audit the source data
*/
Check argument count ;
Check string length of "station parameter" and "station name" ;

If VERBOSE_FLAG
   List step to stdout ;

/*
** Allocate the step
*/
Allocate memory in the SCRIPT_SEGMENT for
 a new SCROP_RESET ;

/*
** Fill in the data
*/
Copy STATION_PARAMETER into SCROP_RESET ;
Copy STATION_NAME into SCROP_RESET ;

Set the STEP_NUMBER in STEP_CTL ;
```

NAME:
fGSrun;5

TITLE:
Mini_Spec

PARAMETERS:
fGSargs : data_In
SCROP_RUN : data+control_In

LOCALS:

BODY:

```
/*
** Audit the source data
*/
Check argument count ;
Check string length of "function" ;
```

```
If VERBOSE_FLAG
   List step to stdout ;

/*
** Allocate the step
*/
Allocate memory in the SCRIPT_SEGMENT for
 a new SCROP_RUN ;

/*
** Fill in the data
*/
Copy FUNCTION_TO_RUN into SCROP_RUN ;

Set the STEP_NUMBER in STEP_CTL ;
```

NAME:
fGSset;3

TITLE:
Mini_Spec

PARAMETERS:
fGSargs : data_In
SCROP_SET : data+control_In

LOCALS:

BODY:

```
/*
** Audit the source data
*/
Check argument count ;
Check string length of "station parameter",
 "station name" and "value" ;

If VERBOSE_FLAG
   List step to stdout ;

/*
** Allocate the step
*/
Allocate memory in the SCRIPT_SEGMENT for
 a new SCROP_SET ;

/*
** Fill in the data
*/
Copy STATION_PARAMETER into SCROP_SET ;
Copy STATION_NAME into SCROP_SET ;
Copy VALUE into SCROP_SET ;

Set the STEP_NUMBER in STEP_CTL ;
```

NAME:
fGSshell;5

TITLE:
Mini_Spec

PARAMETERS:
fGSargs : data_In
SCROP_SHELL : data+control_In

LOCALS:

BODY:

```
/*
** Audit the source data
*/
Check argument count ;
Check string length of "shellscript" ;

If VERBOSE_FLAG
   List step to stdout ;

/*
** Allocate the step
*/
Allocate memory in the SCRIPT_SEGMENT for
 a new SCROP_SHELL ;

/*
** Fill in the data
*/
Copy COMMAND_TO_SHELL into SCROP_SHELL ;

Set the STEP_NUMBER in STEP_CTL ;
```

NAME:
fGSshow_set;8

TITLE:
Mini_Spec

PARAMETERS:
fGSargs : data_In
SCROP_SHOW_SET : data+control_In

LOCALS:

BODY:

```
/*
** Audit the source data
*/
Check argument count ;
Check string length of "parameter set name" ;
Validate AUGMENTOR ;
Check string length of "parameter names", "machine
``` names" and "tokens" ;
Validate CONSOLE_NAME ;

If VERBOSE_FLAG
   List step to stdout ;

/*
** Allocate the step
*/
Allocate memory in the SCRIPT_SEGMENT for
 a new SCROP_SHOW_SET ;

/*
** Fill in the data
*/
Copy PARMSET_NAME to SCROP_SHOW_SET ;
Set the AUGMENTOR in SCROP_SHOW_SET ;

/*
** Fill in the data
*/
For all parameter triples
   Allocate memory for PARAMETER_LIST2 element ;
   Copy PARAMTER_NAME to PARAMETER_LIST2 element ;
   Copy MACHINE_NAME to PARAMETER_LIST2 element ;
   Copy TOKEN to PARAMETER_LIST2 element ;
   Append the element to the PARAMETER_LIST2 in the
    SCROP_SHOW_SET ;

Fill in data for CONSOLE_NAME in SCROP_SHOW_SET ;
Set the STEP_NUMBER in STEP_CTL ;

NAME:
fGSsleep;3

TITLE:
Mini_Spec

PARAMETERS:
SCROP_SLEEP : data+control_In
fGSargs : data_In

LOCALS:

BODY:

/*
** Audit the source data
*/
Check argument count ;
Check string length of "seconds" ;

If VERBOSE_FLAG
   List step to stdout ;

/*
** Allocate the step

```
*/
Allocate memory in the SCRIPT_SEGMENT for
 a new SCROP_SLEEP ;

/*
** Fill in the data
*/
Copy NUMBER_OF_SECONDS into SCROP_SLEEP ;

Set the STEP_NUMBER in STEP_CTL ;
```

NAME:
fGSstart_op;4

TITLE:
Mini_Spec

PARAMETERS:
fGSargs : data_In
SCROP_START_OP : data+control_In

LOCALS:

BODY:

```
/*
** Audit the source data
*/
Check argument count ;
Check string length of "program" and "machine" ;

If VERBOSE_FLAG
   List step to stdout ;

/*
** Allocate the step
*/
Allocate memory in the SCRIPT_SEGMENT for
 a new SCROP_START_OP ;

/*
** Fill in the data
*/
Copy PROGRAM_TO_START into SCROP_START_OP ;
Copy MACHINE_NAME into SCROP_START_OP ;

/*
** Set background flag and scrop type
*/
If the last field is a '&'
   Set in STEP_CTL the BACKGROUND_FLAG Set the STEP_NUMBER in STEP_CTL ;
```

NAME:
fGSsto_set;2

TITLE:
Mini_Spec

PARAMETERS:
SCROP_STO_SET : data+control_In
fGSargs : data_In

LOCALS:

BODY:

/* audit the source data */
check argument count
check string length of "parameter set name",
   "parameter name", "machine name" and
   "value"
validate AUGMENTOR if VERBOSE_FLAG
   list the step to stdout /* allocate the step */ allocate memory in the SCRIPT_SEGMENT for
a new SCROP_STO_SET

/* fill in the data */
copy PARMSET_NAME into SCROP_STO_SET
set the AUGMENTOR in SCROP_EXT_SET for all data triples
   allocate memory for PARAMETER_LIST
   set the AUGMENTOR
   copy PARAMETER_NAME to PARAMETER_LIST
   copy MACHINE_NAME to PARAMETER_LIST
   copy VALUE to PARAMETER_LIST
   append the element to the PARAMETER_LIST2 in
   the SCROP_STO_SET if VERBOSE_FLAG
   list the step to stdout set the STEP_NUMBER in STEP_CTL return (SUCCESS)

NAME:
fGSstop_op;1

TITLE:
Mini_Spec

PARAMETERS:
fGSargs : data_in
SCROP_STOP_OP : data+control_in

LOCALS:

BODY:

```
/* audit the source data */
check argument count
check string length of "program" and "machine"

if VERBOSE_FLAG
   list the step to stdout

/* allocate the step */ allocate memory in the SCRIPT_SEGMENT for
a new SCROP_STOP_OP

/* fill in the data */
copy PROGRAM_TO_STOP into SCROP_STOP_OP.
copy MACHINE_NAME into SCROP_STOP_OP /* Set background flag and step number */ if the last field is a '&',
   then set in STEP_CTL the BACKGROUND_FLAG
set the STEP_NUMBER in STEP_CTL return (SUCCESS)
```

NAME:
fGSstore;3

TITLE:
Mini_Spec

PARAMETERS:
SCROP_STO_SET : data+control_in
fGSargs : data_in

LOCALS:

BODY:

```
/*
** Audit the source data
*/
Check argument count ;
Check string length of "parameter set name",
 "parameter name", "machine name" and "value" ;
Check type ;

If VERBOSE_FLAG
   List step to stdout ;
```

```
/*
** Allocate the step
*/
Allocate memory in the SCRIPT_SEGMENT for
 a new SCROP_STO_SET ;

/*
** Fill in the data
*/
Copy PARMSET_NAME into SCROP_STO_SET ;

For all data triples
   Allocate memory for PARAMETER_LIST ;
   Set the AUGMENTOR ;
   Copy PARAMETER_NAME to PARAMETER_LIST ;
   Copy MACHINE_NAME to PARAMETER_LIST ;
   Copy VALUE to PARAMETER_LIST ;
   Append the PARAMETER_LIST to SCROP_STO_SET ;

If VERBOSE_FLAG
   List step to stdout ;

Set the STEP_NUMBER in STEP_CTL ;
```

NAME:
fGSunload;3

TITLE:
Mini_Spec

PARAMETERS:
SCROP_UNLOAD : data+control_In
fGSargs : data_In

LOCALS:

BODY:

```
/*
** Audit the source data
*/
Check argument count ;
Check string length of "station" ;

If VERBOSE_FLAG
   List step to stdout ;

/*
** Allocate the step
*/
Allocate memory in the SCRIPT_SEGMENT for
 a new SCROP_UNLOAD ;

/*
** Fill in the data
*/
Copy STATION_NAME into SCROP_UNLOAD ;

Set the STEP_NUMBER in STEP_CTL ;
```

NAME:
fGSuntil;5

TITLE:
Mini_Spec

PARAMETERS:
fGSargs : data_in
SCROP_UNTIL : data+control_in

LOCALS:

BODY:

```
/*
** Audit the source data
*/
Check argument count ;
Check string length of "iterations" ;

If VERBOSE_FLAG
   List step to stdout ;

/*
** Allocate the step
*/
Allocate memory in the SCRIPT_SEGMENT for
 a new SCROP_UNTIL ;

/*
** Fill in the data
*/
Copy ITERATION_STRING into SCROP_UNTIL ;

Set the STEP_NUMBER in STEP_CTL ;
```

NAME:
fGSupload;2

TITLE:
Mini_Spec

PARAMETERS:
fGSargs : data_in
SCROP_UPLOAD : data+control_in

LOCALS:

BODY:

```
/*
** Audit the source data
*/
Check argument count ;
Check string length of "file" and "machine" ;

If VERBOSE_FLAG
   List step to stdout ;
```

```
/*
** Allocate the step
*/
Allocate memory in the SCRIPT_SEGMENT for
 a new SCROP_UPLOAD ;

/*
** Fill in the data
*/
Copy FILENAME to SCROP_UPLOAD ;
Copy MACHINE_NAME to SCROP_UPLOAD ;

/*
** Set background flag and scrop type
*/
If the last field is a '&'
   Set in STEP_CTL the BACKGROUND_FLAG ;

Set the STEP_NUMBER in STEP_CTL ;
```

NAME:
fGSwait;3

TITLE:
Mini_Spec

PARAMETERS:
fGSargs : data_in
SCROP_WAIT : data+control_in

LOCALS:

BODY:

```
/*
** Audit the source data
*/
Check argument count ;

If VERBOSE_FLAG
   List step to stdout ;

/*
** Allocate the step
*/
Allocate memory in the SCRIPT_SEGMENT for
 a new SCROP_WAIT ;

/*
** Fill in the data
*/
Copy LABEL to SCROP_WAIT ;

Set the STEP_NUMBER in STEP_CTL ;
```

NAME:
fGSwhen;3

TITLE:
Mini_Spec

PARAMETERS:
fGSargs : data_In
SCROP_WHEN : data+control_In

LOCALS:

BODY:

```
/*
** Audit the source data
*/
Check argument count ;
Check string length of "event" and "machine" ;

If VERBOSE_FLAG
   List step to stdout ;

/*
** Allocate the step
*/
Allocate memory in the SCRIPT_SEGMENT for
 a new SCROP_WHEN ;

/*
** Fill in the data
*/
Copy EVENT_NAME into SCROP_WHEN ;
Copy MACHINE_NAME into SCROP_WHEN ;

Execute fGSdispatch for the operation to perform
 at run-time when the event occurs ;
```

NAME:
fin_plt;4

TITLE:
Mini_Spec

PARAMETERS:
PORT_ID : data_In
VERBOSE_FLAG : control_In

LOCALS:

BODY:

Move plotter back to the current origin position (call plot) ;

Reset plotter origin back to the initial origin position (call origin) ;

Terminate the plot and move the pen to the initial origin
position (call plot) ;

Move plotter to the next page (call plots,zunit,plot) ;

NAME:
Flush;5

TITLE:
Mini_Spec

PARAMETERS:
VERBOSE_MODE : control_In
SCRIPT_NAME : data_In

LOCALS:

BODY:

```
/*
** Try to find the script in the SCRIPT_SEGMENT
*/
If (call PDATA:SBSTfind(SCRIPT_NAME,SCRIPT_SEGMENT)) does not return NULL:
   If SCRIPT_NODE is busy:
      return( WARNING) ;   /* can't flush a busy script */
   else
      (call ScrFlush(SCRIPT_NODE->SCRIPT,SCRIPT_SEGMENT)) ;
      (call sBSTdelete(SCRIPT_NAME,SCRIPT_SEGMENT)) ;
      (call sBSTrelease(SCRIPT_SEGMENT)) ;
```

NAME:
Freeze;5

TITLE:
Mini_Spec

PARAMETERS:
VERBOSE_FLAG : control_In
SCRIPT_NAME : data_In
LIST_FLAG : control_In

LOCALS:

BODY:

```
/*
** Try to find the script in the SCRIPT_SEGMENT
*/
If (call PDATA:SBSTfind(SCRIPT_NAME,SCRIPT_SEGMENT) does not return NULL:
   If SCRIPT_NODE is busy:
      Return(ERROR) ;   /* can't assemble a busy script */
   Else
      (call ScrFlush(SCRIPT_NODE->SCRIPT,SCRIPT_SEGMENT)) ;
Else
   /*
   ** The script is new.  Establish a node for it
```

```
*/
(call PDATA:SBSTalloc) ;

/*
** Initialize and key the node
** Insert it to the segment
*/
(call PDATA:sBSTinsert) ;
```

/*
** Acquire source steps
*/
(call ScrPass1(SCRIPT_NODE->SCRIPT,SCRIPT_SEGMENT)) ;

/*
** Freeze in database configuration, verify script steps, and link
*/
(call ScrPass2(SCRIPT_NODE->SCRIPT,NULL)) ;

On error from either pass (call ScrFlush) ;

/*
** Write assembly statistic data to the script node and
** Release the script segment
*/

NAME:
flushmset;3

TITLE:
Mini-Spec

PARAMETERS:
PSOFFSET : data_In
PARM_SHMEM_PTR : data_In
VERBOSE_FLAG : control_In

LOCALS:

BODY:

Initialize the parameter segment pointer by calculating
  it (adding PSOFFSET to PARM_SHMEM_PTR) ;

If verbose (VERBOSE_FLAG)
   Indicate that traversal of the parameter set's server and
   machine lists are now beginning;

Flush the parameter set's server list (call PDATA_BST:sBSTinorder(flushmach);

Flush the parameter set's machine list (call PDATA_BST:flushmelt) ;

Flush the machine tree (call PDATA_BST:sBSTflush) ;

Flush the server tree (call PDATA_BST:sBSTflush) ;

If verbose
   Indicate that flushing of server and machine lists is completed ;

NAME:
flushsem;6

TITLE:
Mini_Spec

PARAMETERS:
EVENT_SET : data_In
LIST : data_In
SEMOUTELT : data_In

LOCALS:

BODY:

Unlock the SEMOUTELT->SEMKEYID if it was locked ;

If a MCTL type
   Notify machine control that we are no longer interested --
     i.e., that semaphore is no longer valid ;
Else
   If a TRKR type
     Find and disable event in event set ;

Remove the SEMOUTELT from the list

Return semaphore to the pool ;

NAME:
flushset;3

TITLE:
Mini-Spec

PARAMETERS:
PSOFFSET : data_In
PARM_SHMEM_PTR : data_In
VERBOSE_FLAG : control_In

LOCALS:

BODY:

Initialize the parameter segment pointer by calculating
 it (adding PSOFFSET to PARMSHMEM_PTR) ;

If verbose (VERBOSE_FLAG)
   Indicate that traversal of the parameter set is now beginning ;

Flush the parameter's value arrays (call PDATA_BST:sBSTinorder(flushval) ;

Flush the parameter set (call PDATA_BST:sBSTflush) ;

Flush the server and machine lists (call PSET:flushmset) ;

Remove the parameter set header in the segment (call PDATA_BST:sBSTUNALLOC) ;

If verbose
   indicate that flushing is completed;

NAME:
get_data;4

TITLE:
Mini-Spec

PARAMETERS:
FILENAME : data_In
VERBOSE_FLAG : control_In

LOCALS:

BODY:

Access the cell capability database (OPERATIONS and TOOLS) ;

Check for existence of the two data files to be written (Geometrical (DEFTPT) and
   NonGeometrical (DEFTOKEN) Data Files);

```
/*
** Geometrical Data File will contain translation points (coordinate points in
** space) that a robot will use to guide it's motion ;
** NonGeometrical Data File will contain robotic variable assignments to
** be used in conditioning it's processing ;
*/
```
If they exist
   Back them up into name.OLD Files first ;
Otherwise
   Create them ;

Write file headers for the CAD data being processed ;

FOR all the CAD data files (pallets of material) associated with this product
   Open the CAD data file for reading ;
   Process the blocks of data contained within this CAD file branching on block type,
     switch (block)
       case "ARRAY_DATA":
          Process the row, column and depth array data ;
          Validate Operations and Tools specified against the cell capability database ;
          Write assignments to NonGeometrical data file ;
          Write coordinate points to Geometrical data file ;

case "REGISTRATION_DATA":
          Process the operation data to be used to coordinate
           the CAD System frame of reference to that of the machine ;
          Validate Operations and Tools specified against the cell capability database ;
          Write assignments to NonGeometrical data file ;
          Write coordinate points to Geometrical data file ;

case "PROCESS_DATA":
          Process the operation data associated with parts of this product ;
          Validate Operations and Tools specified against the cell capability database ;
          Write assignments to NonGeometrical data file ;
          Write coordinate points to Geometrical data file ;

Close the CAD data files ;
Close the NonGeometrical and Geometrical data files ;

NAME:
get_procdef;3

TITLE:
Mini-Spec

PARAMETERS:
FILENAME : data_in
VERBOSE_FLAG : control_in
SCRIPT_NAME : data_out

LOCALS:

BODY:

```
Open the process definition file FILENAME for access ;

Read the PROCESS_ID for this product ;

Load the names of the CAD data files to be processed for this
 PROCESS_ID from the list as specified in the section labeled
   STACK_SEQUENCE ;

Load the process SCRIPT_NAME to be used for this PROCESS_ID ;

Return(SCRIPT_NAME) ;
```

NAME:
getdbvals;12

TITLE:
Mini-spec

PARAMETERS:
PARMSET_PTR : data_in
AUGMENTOR : control_in
VERBOSE_FLAG : control_in

LOCALS:

BODY:

```
Determine how this record is to be accessed and branch on it ;
Switch ( AUGMENTOR )
    Case JOB   : compose JOBKEY ;
    Case UNIT  : compose UNITKEY ;
    Case LOT   : compose LOTKEY ;
    Case TIME  : compose TIMEKEY ;
    Case SETUP : compose SETUPKEY ;

Determine the parameter's data type and branch on it;
Switch ( PARMSET->TYPE )
    Case "I" : set data_type = INT ;
    Case "R" : set data_type = REAL ;
    Case "S" : set data_type = STRING ;
```

For all parameters in PARMSET
   For all parametes values to be retrieved from the database
     Compose parameter's key (PARMSET_KEY) ;
     Compute the FUNCTION_INDEX (type + (TABLE * MAX_TYPES)) ;

Dispatch TTacckey() function on appropriate record in table
       from the function index ;
     Access the record of the appropriate type ;

Dispatch TTgfield() function on appropriate field in record
       from the function index ;
     Get the value from the field indicated ;

NAME:
getdock;4

TITLE:
Mini-Spec

PARAMETERS:
DOCK_NAME : data_In
STATION_NAME : data_In
DOCK_STATUS : data_out

LOCALS:

BODY:

Wait (call PCOM:wsem) on the dock to become available and then lock it ;

Compose the dock key from the DOCK_NAME and STATION_NAME ;

Access (call DBMS:acckey) the dock specified by key (DOCKKEY) ;

Get the dock's status (DOCK_STATUS) of this database record ;

Return(DOCK_STATUS) ;

NAME:
geteset;2

TITLE:
Mini-Spec

PARAMETERS:
PARMSET_NAME : data_In
PARM_SHMEM_PTR : data_In
PARMSET_PTR : data_out

LOCALS:

BODY:

Wait on semaphore for access to the parameter
 segment (PARM_SHMEM->PARM_SEMAPHORE) ;

Locate the root of the segment's primary tree (call PDATA_BST:FINDROOT) ;

Find (call PDATA_BST:sBSTfind) the event set specified (PARMSET_NAME) ;

While the event set is busy (PARMSET->BUSY_FLAG = TRUE), i.e. accessed by
 another process,
  Release (call PCOM_SEM:sgsem) the parameter segment for other processes use ;
  Nap (UNIX:nap) for a short time ;
  Get access (call PCOM_SEM:wsemti) to the parameter segment and check again ;

The Event set is now available for exclusive use, so set it to
 busy (PARMSET->BUSY_FLAG = TRUE) ;

Release (PCOM_SEM:sgsem) the parameter segment for other processes use ;

Return(PARMSET_PTR) ;

NAME:
getiset;2

TITLE:
Mini-Spec

PARAMETERS:
PARMSET_PTR : data_out
PARM_SHMEM_PTR : data_In
PARMSET_NAME : data_In

LOCALS:

BODY:

Wait on semaphore (call PCOM_SEM:wsem) for access to the parameter
 segment (PARM_SHMEM->PARM_SEMAPHORE) ;

Locate the root of the segment's primary tree (PDATA_BST:FINDROOT) ;

Find (call PDATA_BST:sBSTfind) the interval parmset specified (PARMSET_NAME) ;

While the interval parmset is busy (PARMSET->BUSY_FLAG = TRUE),
 i.e. accessed by another process
    Release (call PCOM_SEM:sgsem) the parameter segment for other processes use ;
    Nap (call UNIX:nap) for a short time ;
    Get (call PCOM_SEM:wsemti) access to the parameter segment and check again ;

The Interval parmset is now available for exclusive use, so set it to
 busy (PARMSET->BUSY_FLAG = TRUE) ;

Release (call PCOM_SEM:sgsem) the parameter segment for other processes use ;

Return(PARMSET_PTR) ;

NAME:
getques;2

TITLE:
Mini-Spec

PARAMETERS:
STATION_NAME : data_In
QUEKEY : data_In
VERBOSE_FLAG : control_In

LOCALS:

BODY:

Access (call DBMS:acckey) the station specified (STATION_NAME) ;

Get the request queue identifier from the database record
 and place it into the Queue key structure specified (QUEKEY->REQKEYID) ;

Get the reply queue identifier from the database record
 and place it into the Queue key structure specified (QUEKEY->RPLKEYID) ;

NAME:
getreq;3

TITLE:
Mini-Spec

PARAMETERS:
MOVER_MESSAGE : data_out

LOCALS:

BODY:

```
/*
** Wait on a message from the mover formatted per
** "Local Vehicle Interface" convention
*/
```
Read character string from the serial port ;

Compose MOVER_MESSAGE from the input string ;

Return(MOVER_MESSAGE) ;

NAME:
getset;2

TITLE:
Mini-Spec

PARAMETERS:
PARMSET_PTR : data_out
PARMSET_NAME : data_in
PARM_SHMEM_PTR : data_in

LOCALS:

BODY:

Wait on semaphore (call PCOM_SEM:wsem) for access to the
 parameter segment (PARM_SHMEM->PARM_SEMAPHORE) ;

While the parameter set is busy (PARMSET->BUSY_FLAG = TRUE),
  i.e. accessed by another process
    Release (call PCOM_SEM:sgsem) the parameter segment for other processes use ;
    Nap (call UNIX:nap) for a short time ;
    Get (call PCOM_SEM:wsemti) access to the parameter segment and check again ;

The parameter set is now available for exclusive use, so set it to
  busy (PARMSET->BUSY_FLAG = TRUE) ;

Release (call PCOM_SEM:sgsem) the parameter segment for other processes use ;

Return(PARMSET_PTR) ;

NAME:
getstatn;2

TITLE:
Mini-Spec

PARAMETERS:
CONTEXT : data+control_in

LOCALS:

BODY:

Access (call DBMS:acckey) the station specified (CONTEXT->STATION_NAME) ;

Get the job component of this database record placing it into current
  context (CONTEXT->JOB_NAME) ;

Get the lot component of this database record placing it into current
  context (CONTEXT->LOT_ID) ;

Get the unit component of this database record placing it into current
  context (CONTEXT->UNIT_ID) ;

Get the station's status of this database record placing it into current
context (CONTEXT->STATION_STATUS) ;

Get the product name (currently being processed) of this database record placing it
into current context (CONTEXT->PRODUCT_NAME) ;

NAME:
INIT_CONSOLE;7

TITLE:
CON_MS

PARAMETERS:

LOCALS:

BODY:

Acquire CONSOLE_NAME (call PTXT: getscreen) ;

```
/*
** Form a DISPLAYING_PROCESS from this process'
** PID and the semaphore obtained
*/
```
Obtain a semaphore for use by this process (call PCOM:getspool) ;
Obtain process id (PID) (call PCOM:getpid) ;

(call PDATA:SBSTfind (CONSOLE_NAME,CONSOLE_SEGMENT)) ; /* Retain the ptr returned */

Add the formed DISPLAYING_PROCESS to CONSOLE->PROCESS_LIST (call PDATA:sSLLappend) ;

For each CONSOLE->CONSOLE_STATION_ASSOCIATION:
   (call SBSTfind (STATION_NAME,STATION_SEGMENT)) ;   /* Retain the ptr returned */
   Add DISPLAYING_PROCESS to STATION->PROCESS_LIST ;
   (call SBSTRELEASE (STATION_SEGMENT)) ;

call PDATA:SBSTRELEASE(CONSOLE_SEGMENT) ;

NAME:
init_mach_parms;6

TITLE:
CON_MS

PARAMETERS:

LOCALS:

BODY:

Build a set of general parameters and events for display ; /* the "display set" */

(call update_mach_parms(NULL)) to initialize the
screen display and set alarms for interval tracking ;

NAME:
INIT_TASKS_AND_PROCESS_JOBS;6

TITLE:
Mini_Spec

PARAMETERS:
OPRION_FLAGS : data_In
VERBOSE_FLAG : control_In

LOCALS:

BODY:

Obtain the command-line arguments (call UNIX:getopt) and initialize options requested
by OPTION_FLAGS ;

Initialize workcell resources (call wcinit) ;

Initialize the local segment (call PDATA_NFM:NFMinit) and
build (call PSET:bldset) parameter sets to be used for job and lot data ;

Wait on a message request (call PCOM:wreq) ;

On receipt of a message request, branch on the command:
   switch (MSCTL_REQUEST->PROCESS_COMMAND):

case "RUNJOB":
        Access (call DBMS:acckey) the job requested ;
        Access (call DBMS:makeset) the lot records for this job ;

Determine the message queue ids (call PSET:getques) for appropriate
         processing stations to be used ;

Run the requested job (runjob) ;

Clear the set (call DBMS:clrset) of lot records for the job just
         processed ;

NAME:
ISask;6

TITLE:
Mini_Spec

PARAMETERS:
ISargs : data_In
SCROP_ASK : data+control_In

LOCALS:

BODY:

If VERBOSE_FLAG
   List the step prior to processing ;

Perform run-time symbol substitution on the PROMPT_LIST ;

```
/*
** Post the question
*/
Wait until console is available ;
Verify no currently pending question for the console ;
Write question(i.e., SCROP_ASK->PROMPT_LIST)
 to CONSOLE->PENDING_QUESTION ;
(call pcom:rq(CONSOLE_REQUEST_KEY)) ;

If CONSOLE->PROCESS_LIST is empty
   release the console (call PDATA_BST:SBSTRELEASE()) ;
else
   /*
   ** Notify all processes displaying console of new pending question
   */
   For all processes on CONSOLE->PROCESS_LIST
       (call pcom:wsem(DISPLAYING_PROCESS->SEM)) ;
       (call UNIX:kill(DISPLAYING_PROCESS->PID,NEW_PENDING_QUESTION_SIGNAL)) ;

/*
** Wait for response
*/
(call pcom:rp(CONSOLE_REPLY_KEY)) ;

/*
** Evaluate the expected response
*/
Copy SCROP_ASK->EXPECTED_RESPONSE into local variable 'expected'
 run-time symbol substitution of 'expected' ;

/*
** Compare the response obtained with what was expected
*/
If the input response is different than the expected response
   Do the requested operation; i.e., (call ISdispatch()) ;

If TRACE_FLAG
   List the processed step to the trace ;

/*
** Make the next step in the steplist current
*/
(call sSLLnext(ISargs->SCRIPT_DATA->SCRIPT->STEP_LIST, ISargs->SCRIPT_DATA->SCRIPT)) ;
```

NAME:
ISbrace;3

TITLE:
Mini_Spec

PARAMETERS:
ISargs : data_In
SCROP_BRACE : data+control_In

LOCALS:

BODY:

```
If VERBOSE_FLAG
   List the step prior to processing ;

/*
** Retrieve the block opening step
*/
(call ASTOP(ISargs->SCRIPT->BLOCK_STACK)) to retrieve STACK_RECORD ;

If TRACE_FLAG
   List the processed step to the trace ;

/*
** Make the block opener step current
*/
(call sSLLMAKECUR(STACK_RECORD->OPEN_STEP,
            ISargs->SCRIPT_DATA->SCRIPT->STEP_LIST,
            ISargs->SCRIPT_DATA->SCRIPT)) ;

(call sSLLnext (ISargs->SCRIPT_DATA->SCRIPT->STEP_LIST,
            ISargs->SCRIPT_DATA->SCRIPT)) ;
```

NAME:
IScheck_for;4

TITLE:
Mini_Spec

PARAMETERS:
ISargs : data_In
SCROP_CHECK_FOR : data+control_In

LOCALS:

BODY:

```
If VERBOSE_FLAG
   List the step prior to processing ;

Wait until the product of context appears at the station
 and, further, for the station to assume the named STATUS ;

/*
** unload  the STATION_NAME and load CONTEXT->STATION
*/
```

Null out job and lot of STATION_NAME and set its status to IDLE ;

Set CONTEXT->STATION->STATUS to PROCESS ;

If TRACE_FLAG
   List the processed step to the trace ;

```
/*
** Make the next step current
*/
(call sSLLnext (ISargs->SCRIPT_DATA->SCRIPT->STEP_LIST,
             ISargs->SCRIPT_DATA->SCRIPT)) ;
```

NAME:
ISdefine;5

TITLE:
Mini_Spec

PARAMETERS:
ISargs : data_In
SCROP_DEFINE : data+control_In

LOCALS:

BODY:

If VERBOSE_FLAG
   List the step prior to processing ;

```
/*
** Step is no-op at run time
*/

/*
** Make the next step current
*/
(call sSLLnext(ISargs->SCRIPT_DATA->SCRIPT->STEP_LIST,
             ISargs->SCRIPT_DATA->SCRIPT)) ;
```

NAME:
ISdispatch;3

TITLE:
Mini_Spec

PARAMETERS:
CONTEXT : data_In
ISargs : data_In
STEP_TYPE : data_In

LOCALS:

BODY:

Call the IS function indexed by STEP_TYPE, passing it
ISargs and CONTEXT ;

NAME:
ISdownload;6

TITLE:
Mini_Spec

PARAMETERS:
ISargs : data_In
SCROP_DOWNLOAD : data+control_In

LOCALS:

BODY:

```
If VERBOSE_FLAG
   List the step prior to processing ;

/*
** Set request data
*/
MCTL_REQUEST->FILENAME = SCROP_DOWNLOAD->FILENAME ;
MCTL_REQUEST->MACHINE_NAME = SCROP_DOWNLOAD->MACHINE_NAME ;

If SCROP_DOWNLOAD->SEMKEYID is assigned
   Wait on it's completion ;
Else
   Assign a new semaphore and add it to SEMOUTLIST ;

/*
** Request machine control
*/
Set MCTL_REQUEST->SEMKEYID= SCROP_DOWNLOAD->SEMKEYID ;
Set MCTL_REQUEST->VERBOSE_FLAG= ISargs->VERBOSE_FLAG ;
(call PCOM:request) using MCTL_REQUEST ;

If this is a foreground operation
   Wait on the semaphore ;

If TRACE_FLAG
   List the processed step to the trace ;

/*
** Make the next step in the steplist current
*/
(call sSLLnext(ISargs->SCRIPT_DATA->SCRIPT->STEP_LIST,
            ISargs->SCRIPT_DATA->SCRIPT)) ;
```

NAME:
ISeject;5

TITLE:
Mini_Spec

PARAMETERS:
STEP_CTL : data+control_In
ISargs : data_In

LOCALS:

BODY:

```
If VERBOSE_FLAG
   List the step prior to processing ;

/*
** Step is no-op at run time
*/

/*
** Make the next step in the steplist current
*/
(call sSLLnext(ISargs->SCRIPT_DATA->SCRIPT->STEP_LIST,
            ISargs->SCRIPT_DATA->SCRIPT)) ;
```

NAME:
ISexec;8

TITLE:
Mini_Spec

PARAMETERS:
SCROP_exec : data+control_In
ISargs : data_In

LOCALS:

BODY:

```
If VERBOSE_FLAG
   List the step prior to processing ;

(call  UNIX:fork) and (call UNIX:exec) to spawn a new process
 of the correct name, store PID in SCROP_EXEC->PID ;

If TRACE_FLAG
   List the processed step to the trace ;

If step is in foreground
   Wait on spawned process to execute ;

/*
** Make the next step in the steplist current
*/
(call sSLLnext (ISargs->SCRIPT_DATA->SCRIPT->STEP_LIST,
            ISargs->SCRIPT_DATA->SCRIPT)) ;
```

NAME:
ISext_set;6

TITLE:
Mini_Spec

PARAMETERS:
SCROP_EXT_SET : data+control_In
ISargs : data_In

LOCALS:

BODY:

Switch SCROP_EXT_SET->AUGMENTOR:

Case UNIT:
      Copy ISargs->CONTEXT->LOT_ID into PARMSET->STRUCT_AUGMENT ;
      Copy ISargs->CONTEXT->UNIT_ID into PARMSET->STRUCT_AUGMENT ;
      Copy ISargs->CONTEXT->JOB_NAME into PARMSET->STRUCT_AUGMENT ;

Case LOT:
      Copy ISargs->CONTEXT->LOT_ID into PARMSET->STRUCT_AUGMENT ;
      Copy ISargs->CONTEXT->JOB_NAME into PARMSET->STRUCT_AUGMENT ;

Case JOB:
      Copy ISargs->CONTEXT->JOB_NAME into PARMSET->STRUCT_AUGMENT ;

If VERBOSE_FLAG
   List the step prior to processing ;

```
/*
** Get the values from the database
*/
```
(call PSET:getdbvals(PARMSET, SCROP_EXT_SET->AUGMENTOR, ISargs->VERBOSE_FLAG)) ;

Write the values to the run time symbol table using tokens specified for each parameter ;

If TRACE_FLAG
   List the processed step to the trace ;

```
/*
** Make the next step in the steplist current
*/
```
(call sSLLnext(ISargs->SCRIPT_DATA->SCRIPT->STEP_LIST,
        ISargs->SCRIPT_DATA->SCRIPT)) ;

NAME:
iSgoto;6

TITLE:
Mini_Spec

PARAMETERS:
ISargs : data_In
SCROP_GOTO : data+control_In

LOCALS:

BODY:

If VERBOSE_FLAG
   List the step prior to processing ;

/*

```
** Make the next step in the steplist current
*/
(call sSLLMAKECUR(SCROP_GOTO + SCROP_GOTO->STEP_OFFSET,
            ISargs->SCRIPT_DATA->SCRIPT->STEP_LIST,
            ISargs->SCRIPT_DATA->SCRIPT)) ;

If TRACE_FLAG
   List the processed step to the trace ;
```

NAME:
ISignore;7

TITLE:
Mini_Spec

PARAMETERS:
ISargs : data_In
SCROP_IGNORE : data+control_In

LOCALS:

BODY:

```
If VERBOSE_FLAG
   List the step prior to processing ;

/*
** Obtain exclusive access to the event set
*/
(call pset:geteset()) ;

Find the event in the event set ;

If the event is enabled
   Remove the SEMOUTLIST or WHEN_EVENT_LIST entry ;
   Clear the semaphore that had been assigned to the event
     and return it to the pool ;
   Disable the event ;

If TRACE_FLAG
   List the processed step to the trace ;

/*
** Make the next step in the steplist current
*/
(call sSLLnext(ISargs->SCRIPT_DATA->SCRIPT->STEP_LIST,
           ISargs->SCRIPT_DATA->SCRIPT)) ;
```

NAME:
ISindex;5

TITLE:
Mini_Spec

PARAMETERS:
ISargs : data_In
SCROP_INDEX : data+control_In

LOCALS:

BODY:

```
If VERBOSE_FLAG
   List the step prior to processing ;

Convert to integer and increment the UNIT value of the STATION_NAME ;
Copy UNIT into a unit buffer for storage ;

Update station information for WIP tracking (call PSET:setstatn()) ;

Signal console processes displaying the station to update the
 WIP status screen(s) ;

If TRACE_FLAG
   List the processed step to the trace ;

/*
** Make the next step in the steplist current
*/
(call sSLLnext (ISargs->SCRIPT_DATA->SCRIPT->STEP_LIST,
            ISargs->SCRIPT_DATA->SCRIPT)) ;
```

NAME:
ISinterpret;5

TITLE:
Mini_Spec

PARAMETERS:
SCROP_INTERPRET : data+control_In
ISargs : data_In

LOCALS:

BODY:

```
If VERBOSE_FLAG
   List the step prior to processing ;

If TRACE_FLAG
   List the processed step to the trace ;

Recurse ScrInterp on the subroutine script ;
```

```
/*
** Make the next step in the steplist current
*/
(call sSLLnext(ISargs->SCRIPT_DATA->SCRIPT->STEP_LIST,
              ISargs->SCRIPT_DATA->SCRIPT)) ;
*/
Set MCTL_REQUEST->SEMKEYID= SCROP_ISS_SET->SEMKEYID ;
Set MCTL_REQUEST->VERBOSE_FLAG= ISargs->VERBOSE_FLAG ;
(call PCOM:request) using MCTL_REQUEST ;

If this is a foreground operation
   Wait on the semaphore ;

/*
** Make the next step in the steplist current
*/
(call sSLLnext(ISargs->SCRIPT_DATA->SCRIPT->STEP_LIST,
              ISargs->SCRIPT_DATA->SCRIPT)) ;
```

NAME:
ISiss_set;4

TITLE:
Mini_Spec

PARAMETERS:
ISargs : data_In
SCROP_ISS_SET : data+control_In

LOCALS:

BODY:

```
/*
** Wait for parmset to become available
*/
Start loop
   (call PCOM:wsemti(PARM_SEMAPHORE,10)) ;
   If PARMSET->BUSY_FLAG equals true
      (call sgsem(PARM_SEMAPHORE)) ;
   Else
      Break loop (call UNIX:nap(100)) ;

Set PARMSET->BUSY_FLAG ;
(call PCOM:sgsem(PARM_SEMAPHORE)) ;

/*
** Stuff context information into parameter set
*/
Switch on SCROP_ISS_SET->AUGMENTOR
   Case UNIT: C
      Copy ISargs->CONTEXT->LOT_ID into PARMSET->STRUCT_AUGMENT ;
      Copy ISargs->CONTEXT->UNIT_ID into PARMSET->STRUCT_AUGMENT ;
      Copy ISargs->CONTEXT->JOB_ID into PARMSET->STRUCT_AUGMENT ;
```

```
    Case LOT:
       Copy ISargs->CONTEXT->LOT_ID into PARMSET->STRUCT_AUGMENT ;
       Copy ISargs->CONTEXT->JOB_ID into PARMSET->STRUCT_AUGMENT ;

Case JOB:
       Copy ISargs->CONTEXT->UNIT_ID into PARMSET->STRUCT_AUGMENT ;

If VERBOSE_FLAG
    List the step prior to processing ;

/*
** Set parameter set specified handling data
*/
MCTL_REQUEST->PSOFFSET = SCROP_ISS_SET->PSOFFSET ;
MCTL_REQUEST->AUGMENTOR = SCROP_ISS_SET->AUGMENTOR ;

If SCROP_ISS_SET->SEMKEYID is assigned
   Wait on it's completion ;
Else
   Assign a new semaphore and add it to the SemOutLst ;

/*
** Request machine control
```

NAME:
ISload;4

TITLE:
Mini_Spec

PARAMETERS:
SCROP_LOAD : data+control_In
ISargs : data_In

LOCALS:

BODY:

```
If VERBOSE_FLAG
   List the step prior to processing ;

Verify that SCROP_LOAD->STATION_NAME has an appropriate status for loading ;

"receive" product quality data for the product job and lot of context
 from the network router ;

Store quality parameters for the product ;

Set product and status fields of the station's STATION_RECORD in STATION_DB ;

If TRACE_FLAG
   List the processed step to the trace ;

/*
** Make the next step in the steplist current
*/
call sSLnext(ISargs->SCRIPT_DATA->SCRIPT->STEP_LIST,
              ISargs->SCRIPT_DATA->SCRIPT)
```

NAME:
ISmove;4

TITLE:
Mini_Spec

PARAMETERS:
SCROP_MOVE : data+control_In
ISargs : data_In

LOCALS:

BODY:

```
If VERBOSE_FLAG
   List the step prior to processing ;

Verify that statuses of the FROM_STATION_NAME and TO_STATION_NAME are
 appropriate for moving ;

Update the product identification fields in both station's STATION_RECORDs
 in STATION_DB ;

Update status fields in STATION_DB as appropriate ;

If TRACE_FLAG
   List the processed step to the trace ;

/*
** Make the next step in the steplist current
*/
(call sSLnext(ISargs->SCRIPT_DATA->SCRIPT->STEP_LIST,
              ISargs->SCRIPT_DATA->SCRIPT)) ;
```

NAME:
ISnotice;6

TITLE:
Mini_Spec

PARAMETERS:
ISargs : data_In
SCROP_NOTICE : data+control_In

LOCALS:

BODY:

```
If VERBOSE_FLAG
   List the step prior to processing ;

If operation has a previously assigned semaphore
    (call wsem(SCROP_NOTICE->SEMKEYID) to wait on the operation) ;
Else
    (call PCOM:getspool(BCKGRONDPOOL,&(SCROP_NOTICE->SEMKEYID))) ;
    (call SLALLOC()) and (call SLpush()) to add it to the SEMOUTLIST ;
```

```
/*
** Gain access to event set
*/
(call PSET:geteset()) ;
Find the EVENT in the event set ;
Add this process to the enable list of the EVENT ;
Release the event set ;

If this is a foreground operation
   Wait on the semaphore ;
   Return the semaphore to the pool (call PCOM:retspool()) ;
   Null out the SEMKEYID in SCROP_NOTICE ;
   Remove this process' entry on the EVENT's enable list ;

/*
** Make the next step in the steplist current
*/
(call sSLLnext(ISargs->SCRIPT_DATA->SCRIPT->STEP_LIST,
               ISargs->SCRIPT_DATA->SCRIPT)) ;
```

NAME:
ISplot_set;6

TITLE:
Mini_Spec

PARAMETERS:
SCROP_PLOT_SET : data+control_In
ISargs : data_In

LOCALS:

BODY:

```
If VERBOSE_FLAG
   List the step prior to processing ;

/*
** Stuff the table information
*/
Switch SCROP_PLOT_SET->AUGMENTOR
   Case UNIT:
      Copy ISargs->CONTEXT->LOT_ID into SCROP_PLOT_SET->STRUCT_HEADINGS
              ->AUGMENT_KEY->LOT_ID ;
      Copy ISargs->CONTEXT->UNIT_ID into SCROP_PLOT_SET->STRUCT_HEADING
              ->AUGMENT_KEY->UNIT_ID ;
      Copy ISargs->CONTEXT->JOB_NAME into SCROP_PLOT_SET->STRUCT_HEADING
              ->ARGUMENT_KEY->JOB_NAME ;

Case LOT:
      Copy ISargs->CONTEXT->LOT_ID into SCROP_PLOT_SET->STRUCT_HEADINGS
              ->AUGMENT_KEY->LOT_ID ;
      Copy ISargs->CONTEXT->JOB_NAME into SCROP_PLOT_SET->STRUCT_HEADING
              ->ARGUMENT_KEY->JOB_NAME ;
```

```
    Case JOB:
        Copy ISargs->CONTEXT->JOB_NAME into SCROP_PLOT_SET->STRUCT_HEADING
                    ->ARGUMENT_KEY->JOB_NAME Copy SCROP_PLOT_SET into PLOT_REQUEST ;
(call PCCM:request using PLOT_REQUEST) ;

If TRACE_FLAG
    List the processed step to the trace ;

/*
** Make the next step in the steplist current
*/
(call sSLLnext(ISargs->SCRIPT_DATA->SCRIPT->STEP_LIST,
            ISargs->SCRIPT_DATA->SCRIPT)) ;
```

NAME:
ISprompt;5

TITLE:
Mini_Spec

PARAMETERS:
ISargs : data_in
SCROP_PROMPT : data+control_in

LOCALS:

BODY:

```
If VERBOSE_FLAG
    List the step prior to processing ;

Perform run-time symbol substitution on the PROMPT_LIST ;

/*
** Append the message
*/
Wait on exclusive access to console's MESSAGE_BUFFER ;
Allocate for a new message ;

If no room left in segment
    Truncate messages from the top ;

Add new message, i.e. PROMPT_LIST, to end of list ;

/*
** Notify all processes displaying console of updated message buffer
*/
For all processes on CONSOLE->PROCESS_LIST
    (call PCCM:wsem(DISPLAYING_PROCESS->SEM)) ;
    (call UNIX:kill(DISPLAYING_PROCESS->PID, NEW_MESSAGES_SIGNAL)) ;

If TRACE_FLAG
    List the processed step to the trace ;

/*
```

```
**  Make the next step in the steplist current
*/
(call sSLLnext(ISargs->SCRIPT_DATA->SCRIPT->STEP_LIST,
               ISargs->SCRIPT_DATA->SCRIPT)) ;
```

NAME:
ISquit;3

TITLE:
Mini_Spec

PARAMETERS:
ISargs : data_In
STEP_CTL : data+control_In

LOCALS:

BODY:

```
If VERBOSE_FLAG
   List the step prior to processing ;

If TRACE_FLAG
   List the processed step to the trace ;

Return(QUIT) ;
Set MCTL_REQUEST->SEMKEYID= SCROP_REP_SET->SEMKEYID ;
Set MCTL_REQUEST->VERBOSE_FLAG= ISargs->VERBOSE_FLAG ;
(call PCOM:request using MCTL_REQUEST) ;

If this is a foreground operation
   Wait on the semaphore ;

/*
**  Make the next step in the steplist current
*/
(call sSLLnext(ISargs->SCRIPT_DATA->SCRIPT->STEP_LIST,
               ISargs->SCRIPT_DATA->SCRIPT)) ;
```

NAME:
ISrep_set;4

TITLE:
Mini_Spec

PARAMETERS:
ISargs : data_In
SCROP_REP_SET : data+control_In

LOCALS:

BODY:

```
/*
**  Wait for parmset to become available
*/
```

```
Start loop
   (call PCCM:wsemti(PARM_SEMAPHORE,10)) ;
   If PARMSET->BUSY_FLAG equals true
      (call sgsem(PARM_SEMAPHORE)) ;
   Else
      break loop ;

(call UNIX:nap(100) ;

Set PARMSET->BUSY_FLAG ;
(call PCCM:sgsem(PARM_SEMAPHORE)) ;

/*
** Stuff context information into parameter set
*/
Switch on SCROP_REP_SET->AUGMENTOR
   Case UNIT:
      Copy ISargs->CONTEXT->LOT_ID into PARMSET->STRUCT_AUGMENT ;
      Copy ISargs->CONTEXT->UNIT_ID into PARMSET->STRUCT_AUGMENT ;
      Copy ISargs->CONTEXT->JOB_ID into PARMSET->STRUCT_AUGMENT ;

Case LOT:  Copy ISargs->CONTEXT->LOT_ID into PARMSET->STRUCT_AUGMENT ;
              Copy ISargs->CONTEXT->JOB_ID into PARMSET->STRUCT_AUGMENT ;

Case JOB:  Copy ISargs->CONTEXT->UNIT_ID into PARMSET->STRUCT_AUGMENT ;

If VERBOSE_FLAG
   List the step prior to processing ;

/*
** Set parameter set specified handling data
*/
MCTL_REQUEST->PSOFFSET= SCROP_REP_SET->PSOFFSET ;
MCTL_REQUEST->AUGMENTOR= SCROP_REP_SET->AUGMENTOR ;

If SCROP_REP_SET->SEMKEYID is assigned
   Wait on it's completion ;
Else
   Assign a new semaphore and add it to the SemOutLst ;

/*
** Request machine control
*/
Set tmout= 15 ;
```

NAME:
ISrepeat;5

TITLE:
Mini_Spec

PARAMETERS:
ISargs : data_In
SCROP_REPEAT : data+control_In

LOCALS:

BODY:

```
If VERBOSE_FLAG
   List the step prior to processing ;

/*
** Open a new block
*/
(call ASALLOC(STACK_RECORD)) ;

Set STACK_RECORD->BLOCK_TYPE equal to "REPEAT" ;
Set STACK_RECORD->CLOSE_NUMBER equal to SCROP_REPEAT->CLOSE_NUMBER ;
Set STACK_RECORD->OPEN_STEP equal to SCROP_REPEAT ;
Set STACK_RECORD->NUMBER_OF_ITERS equal to "0" ;
(call ASPUSH(SCRIPT->BLOCK_STACK)) ;

If TRACE_FLAG
   List the processed step to the trace ;

/*
** Make the next step in the steplist current
*/
(call PDATA_SLL:sSLLnext(ISargs->SCRIPT_DATA->SCRIPT->STEP_LIST,
         ISargs->SCRIPT_DATA->SCRIPT)) ;
```

NAME:
ISreset;4

TITLE:
Mini_Spec

PARAMETERS:
ISargs : data_in
SCROP_RESET : data+control_in

LOCALS:

BODY:

```
If VERBOSE_FLAG
   List the step prior to processing ;

Real-time symbol substitution of SCROP_RESET element STATION_PARAMETER ;

Update station information for WIP tracking (call PSET:setstatn()) ;

Signal console processes displaying the station to update the
 WIP status screen(s) ;

If TRACE_FLAG
   List the processed step to the trace ;

/*
** Make the next step in the steplist current
*/
(call PDATA_SLL:sSLLnext (ISargs->SCRIPT_DATA->SCRIPT->STEP_LIST,
            ISargs->SCRIPT_DATA->SCRIPT)) ;
```

NAME:
ISrun;4

TITLE:
Mini_Spec

PARAMETERS:
SCROP_RUN : data+control_In
ISargs : data_In

LOCALS:

BODY:

```
If VERBOSE_FLAG
   List the step prior to processing ;

Call the FUNCTION_TO_RUN, passing it current context ;

If TRACE_FLAG
   List the processed step to the trace ;

/*
** Make the next step in the steplist current
*/
(call PDATA_SLL:sSLLnext(ISargs->SCRIPT_DATA->SCRIPT->STEP_LIST,
           ISargs->SCRIPT_DATA->SCRIPT)) ;
```

NAME:
ISset;4

TITLE:
Mini_Spec

PARAMETERS:
ISargs : data_In
SCROP_SET : data+control_In

LOCALS:

BODY:

```
If VERBOSE_FLAG
   List the step prior to processing ;

Real-time symbol substitution of SCROP_SET element STATION_PARAMETER ;

Real-time symbol substitution of SCROP_SET element VALUE ;

Update station information for WIP tracking (call PSET:setstatn()) ;

Signal console processes displaying this station to update the
 WIP status screen(s) ;
```

```
If TRACE_FLAG
   List the processed step to the trace ;

/*
** Make the next step in the steplist current
*/
(call PDATA_SLL:sSLLnext (ISargs->SCRIPT_DATA->SCRIPT->STEP_LIST,
            ISargs->SCRIPT_DATA->SCRIPT)) ;
```

NAME:
ISshell;5

TITLE:
Mini_Spec

PARAMETERS:
SCROP_SHELL : data+control_In
ISargs : data_In

LOCALS:

BODY:

```
If VERBOSE_FLAG
   List the step prior to processing ;

/*
** Use the system service to execute the shell script
*/
(call UNIX:system(COMMAND_TO_SHELL)) ;

If TRACE_FLAG
   List the processed step to the trace ;

If shell script returned success .
   /*
   ** Make the next step in the steplist current
   */
   (call PDATA_SLL:sSLLNEXT(ISargs->SCRIPT_DATA->SCRIPT->STEP_LIST,
               ISargs->SCRIPT_DATA->SCRIPT)) ;
   Return (SUCCESS) ;

Else
   Return (ERROR) ;
```

NAME:
ISshow_set;4

TITLE:
Mini_Spec

PARAMETERS:
ISargs : data_In
SCROP_SHOW_SET : data+control_In

LOCALS:

BODY:

```
Switch SCROP_SHOW_SET->AUGMENTOR

Case UNIT:
      Copy ISargs->CONTEXT->LOT_ID into PARMSET->STRUCT_AUGMENT ;
      Copy ISargs->CONTEXT->UNIT_ID into PARMSET->STRUCT_AUGMENT ;
      Copy ISargs->CONTEXT->JOB_NAME into PARMSET->STRUCT_AUGMENT ;

Case LOT:
      Copy ISargs->CONTEXT->LOT_ID into PARMSET->STRUCT_AUGMENT ;
      Copy ISargs->CONTEXT->JOB_NAME into PARMSET->STRUCT_AUGMENT ;

Case JOB:
      Copy ISargs->CONTEXT->JOB_NAME into PARMSET->STRUCT_AUGMENT ;

If VERBOSE_FLAG
   List the step prior to processing ;

/*
** Get the values from the database
*/
(call PSET:getdbvals(PARMSET, SCROP_SHOW_SET->AUGMENTOR, ISargs->VERBOSE_FLAG)) ;

/*
** Append the parameter triples onto the massage buffer
*/
Wait on exclusive access to console's MESSAGE_BUFFER ;

While more parameters to show
   Allocate in message buffer ;
   If no room left in segment
      Truncate messages from the top ;

Add new message, i.e. the parameter triple, to end of list ;

/*
** Notify all processes displaying console of updated message buffer
*/
For all processes on CONSOLE->PROCESS_LIST
   (call PCOM:wsem(DISPLAYING_PROCESS->SEM)) ;
   (call UNIX:kill(DISPLAYING_PROCESS->PID, NEW_MESSAGES_SIGNAL)) ;
```

```
If TRACE_FLAG
   List the processed step to the trace ;

/*
** Make the next step in the steplist current
*/
 (call sSLLnext(ISargs->SCRIPT_DATA->SCRIPT->STEP_LIST,
          ISargs->SCRIPT_DATA->SCRIPT)) ;
```
D - 104

NAME:
ISsleep;5

TITLE:
Mini_Spec

PARAMETERS:
SCROP_SLEEP : data+control_In
ISargs : data_In

LOCALS:

BODY:

```
If VERBOSE_FLAG
   List the step prior to processing ;

(call UNIX:sleep(SCROP_SLEEP->NUMBER_OF_SECONDS)) ;

If TRACE_FLAG
   List the processed step to the trace ;

/*
** Make the next step in the steplist current
*/
(call PDATA_SLL:sSLLnext(ISargs->SCRIPT_DATA->SCRIPT->STEP_LIST,
          ISargs->SCRIPT_DATA->SCRIPT)) ;
```

NAME:
ISstart_op;9

TITLE:
Mini_Spec

PARAMETERS:
ISargs : data_In
SCROP_START_OP : data+control_In

LOCALS:

BODY:

```
If VERBOSE_FLAG
   List the step prior to processing ;

/*
```

```
** Set request data
*/
MCTL_REQUEST->OPERATION_NAME = SCROP_START_OP->OPERATION_NAME ;
MCTL_REQUEST->MACHINE_NAME = SCROP_START_OP->MACHINE_NAME ;

If SCROP_START_OP->SEMKEYID is assigned
   Wait on it's completion ;
Else
   Assign a new semaphore and add it to SEMOUTLIST ;

/*
** Request machine control
*/
Set MCTL_REQUEST->SEMKEYID= SCROP_START_OP->SEMKEYID ;
Set MCTL_REQUEST->VERBOSE_FLAG= ISargs->VERBOSE_FLAG ;
(call PCOM:request using MCTL_REQUEST) ;

If this is a foreground operation
   Wait on the semaphore ;

If TRACE_FLAG
   List the processed step to the trace ;

/*
** Make the next step in the steplist current
*/
(call PDATA_SLL:sLLnext (ISargs->SCRIPT_DATA->SCRIPT->STEP_LIST,
            ISargs->SCRIPT_DATA->SCRIPT)) ;
```

NAME:
ISsto_set;6

TITLE:
Mini_Spec

PARAMETERS:
SCROP_STO_SET : data+control_In
ISargs : data_In

LOCALS:

BODY:

```
Switch SCROP_STO_SET->AUGMENTOR
   Case UNIT:
      Copy ISargs->CONTEXT->JOB_NAME into PARMSET->STRUCT_AUGMENT ;
      Copy ISargs->CONTEXT->LOT_ID into PARMSET->STRUCT_AUGMENT ;
      Copy ISargs->CONTEXT->UNIT_ID into PARMSET->STRUCT_AUGMENT ;

Case LOT:
      Copy ISargs->CONTEXT->JOB_NAME into PARMSET->STRUCT_AUGMENT ;
      Copy ISargs->CONTEXT->LOT_ID into PARMSET->STRUCT_AUGMENT ;

Case JOB:
      Copy ISargs->CONTEXT->JOB_NAME into PARMSET->STRUCT_AUGMENT ;
```

```
If VERBOSE_FLAG
   List the step prior to processing ;

Perform run-time symbol substitutions on each parameter's VALUE ;

/*
** Post the values to the database
*/
(call PSET:postdbvals(PARMSET, SCROP_STO_SET->AUGMENTOR,
                               ISargs->VERBOSE_FLAG) ;

If TRACE_FLAG
   List the processed step to the trace ;

/*
** Make the next step in the steplist current
*/
(call PDATA_SLL:sSLLnext(ISargs->SCRIPT_DATA->SCRIPT->STEP_LIST,
          ISargs->SCRIPT_DATA->SCRIPT)) ;
```

NAME:
ISstop_op;6

TITLE:
Mini_Spec

PARAMETERS:
ISargs : data_In
SCROP_STOP_OP : data+control_In

LOCALS:

BODY:

```
If VERBOSE_FLAG
   List the step prior to processing ;

/*
** Set request data
*/
MCTL_REQUEST->OPERATION_NAME= SCROP_STOP_OP->OPERATION_NAME ;
MCTL_REQUEST->MACHINE_NAME= SCROP_STOP_OP->MACHINE_NAME ;

If SCROP_STOP_OP->SEMKEYID is assigned
   Wait on it's completion ;
Else
   Assign a new semaphore and add it to SEMOUTLIST ;

/*
** Request machine control
*/
Set MCTL_REQUEST->SEMKEYID= SCROP_STOP_OP->SEMKEYID ;
Set MCTL_REQUEST->VERBOSE_FLAG= ISargs->VERBOSE_FLAG ;
(call PCOM:request using MCTL_REQUEST) ;
```

If this is a foreground operation
   Wait on the semaphore ;

If TRACE_FLAG
   List the processed step to the trace ;

```
/*
** Make the next step in the steplist current
*/
(call PDATA_SLL:sLLnext (ISargs->SCRIPT_DATA->SCRIPT->STEP_LIST,
         ISargs->SCRIPT_DATA->SCRIPT)) ;
```

NAME:
issueset;7

TITLE:
Mini-spec

PARAMETERS:
PARMSET_PTR : data_In
VERBOSE_FLAG : control_In

LOCALS:

BODY:

Initialize the local parameter set pointer ;

For all servers (call PDATA_BST:sBSTinorder(issuemach)) in MACHINE_TABLE
   For all machines (call PDATA_BST:sBSTinorder(issuemset) in MACHINE_TABLE
      For all parameters in the set associated with this machine
         Initialize timeout value ;

Set the parmset offset (MSETOFFSET) appropriately
          for the parameter set to be issued ;

Request the appropriate machine server (call request)
          to issue the set ;

If the server returns an error
            Set err_flg = ERROR ;

RETURN(STATUS) ;

NAME:
ISunload;4

TITLE:
Mini_Spec

PARAMETERS:
SCROP_UNLOAD : data+control_In
ISargs : data_In

LOCALS:

BODY:

If VERBOSE_FLAG

List the step prior to processing ;

Verify that there is product to unload at SCROP_UNLOAD->STATION_NAME and that the station has an appropriate status ;

Extract product identification from STATION_DB ;

Extract quality parameters for the product ;

Write the data to a suitable buffer ;

"ship" the data by transferring to the network router ;

Reset product and status fields of the STATION_RECORD to reflect unload ;

If TRACE_FLAG
   List the processed step to the trace ;

/*
** Make the next step in the steplist current
*/
(call PDATA_SLL:sSLLnext(ISargs->SCRIPT_DATA->SCRIPT->STEP_LIST,
          ISargs->SCRIPT_DATA->SCRIPT)) ;

NAME:
ISuntil;6

TITLE:
Mini_Spec

PARAMETERS:
ISargs : data_In
SCROP_UNTIL : data+control_In

LOCALS:

BODY:

If the ITERATION_STRING requires run_time symbol substitution
   Copy ITERATION_STRING to iterstring ;
   Convert iterstring into integer representation NUMBER_OF_ITERS ;

If VERBOSE_FLAG
   List the step prior to processing ;

/*
** Retrieve the block opening step
*/
(call ASTOP(ISargs->SCRIPT->BLOCK_STACK)) to retrieve STACK_RECORD ;
Increment STACK_RECORD->ITERS_SO_FAR ;

If TRACE_FLAG
   List the processed step to the trace ;

If another iteration is required
   /*
   ** Make the block opener step current

```
             */
             (call PDATA_SLL:sSLLMAKECUR(STACK_RECORD->OPEN_STEP,
                         ISargs->SCRIPT_DATA->SCRIPT->STEP_LIST,
                         ISargs->SCRIPT_DATA->SCRIPT)) ;
Else
   /*
   ** Make the next step in the steplist current
   */
   (call sSLLnext (ISargs->SCRIPT_DATA->SCRIPT->STEP_LIST,
              ISargs->SCRIPT_DATA->SCRIPT)) ;
```

NAME:
ISupload;2

TITLE:
Mini_Spec

PARAMETERS:
ISargs : data_In
SCROP_UPLOAD : data+control_In

LOCALS:

BODY:

```
If VERBOSE_FLAG
   List the step prior to processing ;

/*
** Set request data
*/
MCTL_REQUEST->FILENAME = SCROP_UPLOAD->FILENAME ;
MCTL_REQUEST->MACHINE_NAME = SCROP_UPLOAD->MACHINE_NAME ;

If SCROP_UPLOAD->SEMKEYID is assigned
   Wait on it's completion ;
Else
   Assign a new semaphore and add it to SEMOUTLIST ;

/*
** Request machine control
*/
Set MCTL_REQUEST->SEMKEYID = SCROP_UPLOAD->SEMKEYID ;
Set MCTL_REQUEST->VERBOSE_FLAG = ISargs->VERBOSE_FLAG ;
(call PCOM:request using MCTL_REQUEST) ;

If this is a foreground operation
   Wait on the semaphore ;

If TRACE_FLAG
   List the processed step to the trace ;

/*
** Make the next step in the steplist current
*/
(call PDATA_SLL:sSLLnext(ISargs->SCRIPT_DATA->SCRIPT->STEP_LIST,
           ISargs->SCRIPT_DATA->SCRIPT)) ;
```

NAME:
ISwait;7

TITLE:
Mini_Spec

PARAMETERS:
ISargs : data_In
SCROP_WAIT : data+control_In

LOCALS:

BODY:

If VERBOSE_FLAG
   List the step prior to processing ;

Determine what semaphore is in use by the step
 to be waited on ;

Wait on the semaphore to be signalled ;

If TRACE_FLAG
   List the processed step to the trace ;

```
/*
** Make the next step in the steplist current
*/
(call PDATA_SLL:sSLLnext (ISargs->SCRIPT_DATA->SCRIPT->STEP_LIST,
            ISargs->SCRIPT_DATA->SCRIPT)) ;
```

NAME:
ISwhen;5

TITLE:
Mini_Spec

PARAMETERS:
ISargs : data_In
SCROP_WHEN : data+control_In

LOCALS:

BODY:

If VERBOSE_FLAG
   List the step prior to processing ;

(call PCOM:geteset()) and (call PDATA_BST:sBSTfind()) to find
 the event in the event set ;

If the event is not enabled
   Get a semaphore (call PCOM:getspool) ;
   Enable the event by copying in the SEMKEYID obtained from the pool ;

Make an entry on the WHEN_EVENT_LIST ;

```
If TRACE_FLAG
   Indicate that the event is enabled ;

If TRACE_FLAG
   List the processed step to the trace ;

/*
** Make the next step in the steplist current
*/
(call PDATA_SLL:sSLLnext(ISargs->SCRIPT_DATA->SCRIPT->STEP_LIST,
            ISargs->SCRIPT_DATA->SCRIPT)) ;
```

NAME:
listparm;3

TITLE:
MINI SPEC

PARAMETERS:
SET_ELEMENT : data_In
LIST_MODE : data_In

LOCALS:

BODY:

```
if LIST_MODE  requested is STANDARD mode
   Print header information;

Switch (SET_ELEMENT->DATA_TYPE)
     Case "I":
        Initialize array of type Integer ;

For (SET_ELEMENT->NUMBER_OF_READINGS)
           Print the elements integer value(s) to LISTFILE ;

Case "R":
        Initialize array of type Float ;
        For (SET_ELEMENT->NUMBER_OF_READINGS)
           Print the elements float value(s) to LISTFILE ;

Case "S":
        Initialize array of type String ;
        For (SET_ELEMENT->NUMBER_OF_READINGS)
           Print the elements string value(s) to LISTFILE ;

If LIST_MODE  requested is PREPROCESS mode
  Print header information ;
  If a token was assigned
     Print the tokens value (SET_ELEMENT->token) ;
  Else
     Print the actual value ;
     Switch (SET_ELEMENT->DATA_TYPE)
        Case "I":
           Initialize array of type Integer ;
           For (SET_ELEMENT->NUMBER_OF_READINGS)
              Print the elements integer value(s) to LISTFILE ;
```

```
Case "R":
    Initialize array of type Float ;
    For (SET_ELEMENT->NUMBER_OF_READINGS)
        Print the elements float value(s) to LISTFILE ;

Case "S":
    Initialize array of type String ;
    For (SET_ELEMENT->NUMBER_OF_READINGS)
        Print the elements string value(s) to LISTFILE ;
```

NAME:
LSask;3

TITLE:
Mini_Spec

PARAMETERS:
LSargs : data_In
SCROP_ASK : data+control_In

LOCALS:

BODY:

```
If LIST_FLAG
    List the step prior to processing to listfile ;

Assembly time symbol substitution on SCROP_ASK element CONSOLE_NAME ;
Assembly time symbol substitution on SCROP_ASK element PROMPT_LIST ;
Assembly time symbol substitution on SCROP_ASK element EXPECTED_RESPONSE ;

(call PDATA_BST:SBSTfind(CONSOLE_NAME, CONSOLE_SEGMENT, CONSOLE_SEMAPHORE)) ;
Copy CONSOLE_REQUEST_KEY and CONSOLE_REPLY_KEY into SCROP_ASK ;

If LIST_FLAG
    List the processed step to list ;
```

NAME:
LSbrace;4

TITLE:
Mini_Spec

PARAMETERS:
LSargs : data_In
SCROP_BRACE : data+control_In

LOCALS:

BODY:

```
If LIST_FLAG
    List the step to the listfile ;

Check for corresponding block opening step using
 ASTOP to observe top STACK_RECORD on LSargs->SCRIPT->
 BLOCK_STACK ;
```

Using STACK_RECORD, set CLOSE_NUMBER in SCROP_REPEAT
to the number of this step ;

(call ASPOP (LSargs->SCRIPT->BLOCK_STACK)) ;

If LIST_FLAG
   List the step prior to processing to listfile ;

NAME:
LScheck_for;3

TITLE:
Mini_Spec

PARAMETERS:
LSargs : data_In
SCROP_CHECK_FOR : data+control_In

LOCALS:

BODY:

If LIST_FLAG
   List the step to the listfile ;

Assembly-time symbol substitution on SCROP_CHECK_FOR
 element STATUS ;

Assembly-time symbol substitution on SCROP_CHECK_FOR
 element STATION_NAME ;

Verify that STATION_NAME is in STATION_DB ;

If LIST_FLAG
   List the processed step to the listfile ;

NAME:
LSdefine;3

TITLE:
Mini_Spec

PARAMETERS:
LSargs : data_In
SCROP_DEFINE : data+control_In

LOCALS:

BODY:

If LIST_FLAG
   List the step to the listfile ;

If LIST_FLAG
   List the processed step to the listfile ;

Insert SCROP_DEFINE into LSAargs->SCRIPT->SYMBOL_TABLE ;

NAME:
LSdownload;3

TITLE:
Mini_Spec

PARAMETERS:
LSargs : data_In
SCROP_DOWNLOAD : data+control_In

LOCALS:

BODY:

```
If LIST_FLAG
   List the step to the listfile ;

Assembly-time symbol substitution on SCROP_DOWNLOAD
 element FILENAME ;

Assembly-time symbol substitution on SCROP_DOWNLOAD
 element MACHINE_NAME ;

Verify that MACHINE_NAME is in MACHINE_DB ;

If LIST_FLAG
   List the processed step to the listfile ;
```

NAME:
LSeject;3

TITLE:
Mini_Spec

PARAMETERS:
STEP_CTL : data+control_In
LSargs : data_In

LOCALS:

BODY:

```
If LIST_FILE
   Write a formfeed character on the listfile ;
```

NAME:
LSexec;4

TITLE:
Mini_Spec

PARAMETERS:
SCROP_EXEC : data+control_In
LSargs : data_In

LOCALS:

BODY:

If LIST_FLAG
   List the step to the listfile ;

Assembly-time symbol substitution on SCROP_EXEC
 element COMMAND_TO_EXEC ;

Verify that COMMAND_TO_EXEC exists and has
 appropriate permissions ;

If LIST_FLAG
   List the processed step to the listfile ;

NAME:
LSext_set;3

TITLE:
Mini_Spec

PARAMETERS:
SCROP_EXT_SET : data+control_In
LSargs : data_In

LOCALS:

BODY:

If LIST_FLAG
   List the step to the listfile ;

Assembly-time symbol substitution on SCROP_EXT_SET
 element PARMSET_NAME ;

If LIST_FLAG
   List the partially processed step to listfile ;

/*
** Verify the step and freeze in parameter set makeup
*/
(call bldset (SCROP_EXT_SET->PARMSET_NAME, LSargs->LIST_FLAG)) ;

Set PSOFFSET in SCROP_EXT_SET to the built set ;

/*
** Check for explicitly listed parameters
** if PARAMETER_LIST2 is empty
*/
If empty
   Synthesize and write tokens for each parameter in the set ;
Else
   Prune the set to include only those parameters
     listed, form a new set and replace the full set
     with the new ;

If LIST_FLAG
   List the processed step to the listfile ;

NAME:
LSgoto;3

TITLE:
Mini_Spec

PARAMETERS:
LSargs : data_In
SCROP_GOTO : data+control_In

LOCALS:

BODY:

```
If LIST_FLAG
   List the step to the listfile ;

Assembly-time symbol substitution on SCROP_GOTO
 element LABEL ;

Find the labelled step in LSargs->SCRIPT->LABEL_TABLE
 and set STEP_OFFSET in SCROP_GOTO ;

Copy LSargs->SCRIPT->SCRIPT_NAME to SCROP_GOTO element
 SCRIPT_NAME ;

If LIST_FLAG
   List the processed step to the listfile ;
```

NAME:
LSignore;3

TITLE:
Mini_Spec

PARAMETERS:
LSargs : data_In
SCROP_IGNORE : data+control_In

LOCALS:

BODY:

```
If LIST_FLAG
   List the partially processed step to the listfile ;

Assembly-time symbol substitution on SCROP_IGNORE
 element EVENT_NAME ;

Assembly-time symbol substitution on SCROP_IGNORE
 element MACHINE_NAME ;

If LIST_FLAG
   List the processed step to the listfile ;
```

NAME:
LSindex;4

TITLE:
Mini_Spec

PARAMETERS:
LSargs : data_In
SCROP_INDEX : data+control_In

LOCALS:

BODY:

If LIST_FLAG
   List the step to the listfile ;

Assembly-time symbol substitution on SCROP_INDEX
 element VALUE ;

Assembly-time symbol substitution on SCROP_INDEX
 element STATION_NAME ;

If LIST_FLAG
   List the processed step to the listfile ;

NAME:
LSinterpret;4

TITLE:
Mini_Spec

PARAMETERS:
SCROP_INTERPRET : data+control_In
LSargs : data_In

LOCALS:

BODY:

If LIST_FLAG
   List the step to the listfile ;

If LIST_FLAG
   List the processed step to the listfile ;

Recurse ScrPass2() on the script in SCROP_INTERPRET ;

NAME:
LSiss_set;3

TITLE:
Mini_Spec

PARAMETERS:
lSargs : data_In
SCROP_ISS_SET : data+control_In

LOCALS:

BODY:

```
If LIST_FLAG
   List the step to the listfile ;

Assembly-time symbol substitution on SCROP_ISSUE
 element PARMSET_NAME ;

If LIST_FLAG
   List the processed step to the listfile ;

/*
** Verify the step and freeze in parameter set makeup
*/
(call bldset (SCROP_ISS_SET->PARMSET_NAME, LSargs->LIST_FLAG)) ;
(call bldmset(SCROP_ISS_SET->PARMSET_NAME, LSargs->LIST_FLAG)) ;

Set SEMKEYID SEM_KEY equal to NULL, i.e., so as to initialize it ;

If LIST_FLAG
   List parameters in the set issued ;
```

NAME:
LSload;4

TITLE:
Mini_Spec

PARAMETERS:
SCROP_LOAD : data+control_In
LSargs : data_In

LOCALS:

BODY:

```
If LIST_FLAG
   List the step prior to processing to listfile ;

/*
** Verify that the station is valid
*/
Assembly time substitution on SCROP_LOAD element STATION_NAME ;

(call PDATA_BST:SBSTfind(STATION_NAME,STATION_SEGMENT,STATION_SEMAPHORE)) ;
If NULL returned
   Return(ERROR) ;
```

NAME:
LSmove;4

TITLE:
Mini_Spec

PARAMETERS:
SCROP_MOVE : data+control_In
LSargs : data_In

LOCALS:

BODY:

```
If LIST_FLAG
   List the step prior to processing to listfile ;

/*
** Verify that the to station is valid
*/
Assembly time substitution on SCROP_MOVE element TO_STATION_NAME ;

(call PDATA_BST:SBSTfind(TO_STATION_NAME,STATION_SEGMENT,STATION_SEMAPHORE)) ;

if NULL returned
   Return(ERROR) ;

(call PDATA_BST:SBSTrelease(STATION_SEGMENT)) ;

/*
** Verify that the from station is valid
*/
Assembly time substitution on SCROP_MOVE element FROM_STATION_NAME ;

(call PDATA_BST:SBSTfind(FROM_STATION_NAME,STATION_SEGMENT,STATION_SEMAPHORE)) ;

if NULL returned
   Return(ERROR) ;

(call PDATA_BST:SBSTrelease(STATION_SEGMENT)) ;

If LIST_FLAG
   List the processed step to the listfile ;
```

NAME:
LSnotice;4

TITLE:
Mini_Spec

PARAMETERS:
LSargs : data_In
SCROP_NOTICE : data+control_In

LOCALS:

BODY:

If LIST_FLAG
   List the step to the listfile ;

Assembly-time symbol substitution on SCROP_NOTICE
 element EVENT_NAME ;

Assembly-time symbol substitution on SCROP_NOTICE
 element MACHINE_NAME ;

Set SEMKEYID SEM_KEY equal to NULL; i.e., so as to
 initialize it ;

If LIST_FLAG
   List the processed step to the listfile ;

NAME:
LSplot_set;4

TITLE:
Mini_Spec

PARAMETERS:
SCROP_PLOT_SET : data+control_In
LSargs : data_In

LOCALS:

BODY:

If LIST_FLAG
   List the partially processed step to the listfile ;

Assembly-time symbol substitution on SCROP_PLOT_SET->PARMSET_NAME ;

Assembly-time symbol substitution on SCROP_PLOT_SET->HEADINGS_NAME ;

Assembly-time symbol substitution on SCROP_PLOT_SET->ALGORITHM_NAME

```
/*
** build the set specified as the HEADINGS_NAME in order to
** extract information on formatting and labelling
*/
(call PSET:bldset (SCROP_PLOT_SET->HEADINGS_NAME,LSargs->LIST_FLAG)) ;

/*
** extract out orientation, form size, desired labels, etc; and
** write to STRUCT_HEADINGS in SCROP_PLOT_SET
*/
(call PDATA:sBSTfind()) ;
``` flush (call PSET:flushset) the (no longer needed) headings set find the index for the named algorithm in the array of
site specific plot analysis functions that are specific at
link time

```
/*
** now verify the parameter set by virtue of building it,
** but then flush it; it will be built at run-time local to the
** plotter process
*/
(call PSET:bldset(scrop_PLOT_SET->PARMSET_NAME, )) ;
(call PSET:flushset()) ;
```

NAME:
LSprompt;3

TITLE:
Mini_Spec

PARAMETERS:
LSargs : data_In
SCROP_PROMPT : data+control_In

LOCALS:

BODY:

```
If LIST_FLAG
   List the step prior to processing to listfile ;

Assembly-time symbol substitution of SCROP_PROMPT element CONSOLE_NAME ;

(call PDATA_BST:SBSTfind (CONSOLE_NAME, CONSOLE_SEGMENT, CONSOLE_SEMAPHORE)) ;

Copy CONSOLE_MESSAGE_SEG and CONSOLE_MESSAGE_SEM into SCROP_PROMPT ;

If LIST_FLAG
   List the processed step to the listfile ;
```

NAME:
LSquit;3

TITLE:
Mini_Spec

PARAMETERS:
LSargs : data_In
STEP_CTL : data+control_In

LOCALS:

BODY:

```
If LIST_FLAG
   List the processed step to the listfile ;
```

NAME:
LSrep_set;3

TITLE:
Mini_Spec

PARAMETERS:
LSargs : data_In
SCROP_REP_SET : data+control_In

LOCALS:

BODY:

If LIST_FLAG
   List the step to the listfile ;

Assembly-time symbol substitution on SCROP_REP_SET
 element PARMSET_NAME ;

(call bldset (SCROP_REP_SET->PARMSET_NAME,LSargs->LIST_FLAG)) ;

Set SEMKEYID SEM_KEY equal to NULL; i.e., so as to initialize it ;

If LIST_FLAG
   List the processed step to the listfile ;

NAME:
LSrepeat;4

TITLE:
Mini_Spec

PARAMETERS:
LSargs : data_In
SCROP_REPEAT : data+control_In

LOCALS:

BODY:

If LIST_FLAG
   List the step to the listfile ;

Allocate memory for a new block represented by STACK_RECORD ;

Set TYPE equal to 'repeat' ;

Set OPENSTEP equal to SCROP_REPEAT ;

Push STACK_RECORD to LSargs->SCRIPT->BLOCK_STACK ;

If LIST_FLAG
   List the processed step to the listfile ;

NAME:
LSreset;3

TITLE:
Mini_Spec

PARAMETERS:
LSargs : data_In
SCROP_RESET : data+control_In

LOCALS:

BODY:

```
If LIST_FLAG
   List the step to the listfile ;

Assembly-time symbol substitution on SCROP_RESET
 element STATION_PARAMETER ;

Assembly-time symbol substitution on SCROP_RESET
 element STATION_NAME ;

If LIST_FLAG
   List the processed step to the listfile ;
```

NAME:
LSrun;4

TITLE:
Mini_Spec

PARAMETERS:
SCROP_RUN : data+control_In
LSargs : data_In

LOCALS:

BODY:

```
If LIST_FLAG
   List the step to the listfile ;

Assembly-time symbol substitution on SCROP_RUN
 element FUNCTION_TO_RUN ;

Set the index of this function from the site-specific
 function array (set at link time) into SCROP_RUN ;

If LIST_FLAG
   List the processed step to the listfile ;
```

NAME:
LSset;3

TITLE:
Mini_Spec

PARAMETERS:
LSargs : data_In
SCOP_SET : data+control_In

LOCALS:

BODY:

```
If LIST_FLAG
   List the step to the listfile ;

Assembly-time symbol substitution on SCROP_SET
 element STATION_PARAMETER ;

Assembly-time symbol substitution on SCROP_SET
 element STATION_NAME ;

Assembly-time symbol substitution on SCROP_SET
 element VALUE ;

If LIST_FLAG
   List the processed step to the listfile ;
```

NAME:
LSshell;3

TITLE:
Mini_Spec

PARAMETERS:
SCROP_SHELL : data+control_In
LSargs : data_In

LOCALS:

BODY:

```
If LIST_FLAG
   List the step to the listfile ;

Assembly-time symbol substitution on SCROP_SHELL
 element COMMAND_TO_SHELL ;

Verify existance and permissions on COMMAND_TO_SHELL ;

If LIST_FLAG
   List the processed step to the listfile ;
```

NAME:
LSshow_set;3

TITLE:
Mini_Spec

PARAMETERS:
LSargs : data_In
SCROP_SHOW_SET : data+control_In

LOCALS:

BODY:

```
If LIST_FLAG
   List the step to the listfile ;

Assembly-time symbol substitution on SCROP_SHOW_SET
 element PARMSET_NAME ;

If LIST_FLAG
   List the partially processed step to listfile ;

/*
** Verify the step and freeze in parameter set makeup
*/
(call bldset (SCROP_SHOW_SET->PARMSET_NAME, LSargs->LIST_FLAG)) ;

Set PSOFFSET in SCROP_SHOW_SET to the built set ;

Check for explicitly listed parameters, i.e., if PARAMETER_LIST2 is empty ;
If empty
   Synthesize and write tokens for each parameter in the set ;
Else
   Prune the set to include only those parameters
     listed, form a new set and replace the full set
     with the new ;

Assembly-time symbol substitution of SCROP_SHOW_SET element CONSOLE_NAME ;

(call PDATA_BST:SBSTfind (CONSOLE_NAME, CONSOLE_SEGMENT, CONSOLE_SEMAPHORE)) ;

Copy CONSOLE_MESSAGE_SEG and CONSOLE_MESSAGE_SEM into SCROP_SHOW_SET ;

If LIST_FLAG
   List the processed step to the listfile ;
```

NAME:
LSsleep;3

TITLE:
Mini_Spec

PARAMETERS:
SCROP_SLEEP : data+control_In
LSargs : data_In

LOCALS:

BODY:

```
If LIST_FLAG
   List the step to the listfile ;

Assembly-time symbol substitution on SCROP_SLEEP
 element SECOND_STRING ;

Convert SECOND_STRING into integer representation NUMBER_OF_SECONDS ;

If LIST_FLAG
   List the processed step to the listfile ;
```

NAME:
LSstart_op;4

TITLE:
Mini_Spec

PARAMETERS:
lSargs : data_In
SCROP_START_OP : data+control_In

LOCALS:

BODY:

```
If LIST_FLAG
   List the step to the listfile ;

Assembly-time symbol substitution on SCROP_START_OP
 element PROGRAM_TO_START ;

Assembly-time symbol substitution on SCROP_START_OP
 element MACHINE_NAME ;

Check thgat PROGRAM_TO_START is valid for the named
 machine ;

If LIST_FLAG
   List the processed step to the listfile ;
```

NAME:
LSsto_set;4

TITLE:
Mini_Spec

PARAMETERS:
SCROP_STO_SET : data+control_In
LSargs : data_In

LOCALS:

BODY:

If LIST_FLAG
   List the step to the listfile ;

Assembly-time symbol substitution on SCROP_STO_SET
 element PARMSET_NAME ;

If LIST_FLAG
   List the partially processed step to the listfile ;

/*
** Verify the step and freeze in parameter set makeup
*/
(call bldset (SCROP_STO_SET->PARMSET_NAME,LSargs->LIST_FLAG)) ;

Set PSOFFSET in SCROP_STO_SET to point to built set ;

For all data triples
   Assembly-time symbol substitution on PARAMETER_LIST
      element PARAMETER_NAME ;

Assembly-time symbol substitution on PARAMETER_LIST
      element MACHINE_NAME '

Assembly-time symbol substitution on PARAMETER_LIST
      element VALUE ;

Look for parameter in set and set its value in, or the
   run-time token if run-time symbol substitution will be
   required ;

If LIST_FLAG
   List the processed step to the listfile ;

NAME:
LSstop_op;2

TITLE:
Mini_Spec

PARAMETERS:
LSargs : data_In
SCROP_STOP_OP : data+control_In

LOCALS:

BODY:

```
If LIST_FLAG
   List the step to the listfile ;

Assembly-time symbol substitution on SCROP_STOP_OP
 element PROGRAM_TO_STOP ;

Assembly-time symbol substitution on SCROP_STOP_OP
 element MACHINE_NAME ;

Check that PROGRAM_TO_STOP is valid for the named
 machine ;

If LIST_FLAG
   List the processed step to the listfile ;
```

NAME:
LSunload;4

TITLE:
Mini_Spec

PARAMETERS:
SCROP_UNLOAD : data+control_In
LSargs : data_In

LOCALS:

BODY:

```
If LIST_FLAG
   List the step prior to processing to listfile ;

/*
** Verify that the station is valid
*/
Assembly time substitution on SCROP_UNLOAD element STATION_NAME ;

(call PDATA_BST:SBSTfind(STATION_NAME,STATION_SEGMENT,STATION_SEMAPHORE) ;

If NULL returned
   Return(ERROR) ;
```

```
(call PDATA_BST:SBSTrelease(STATION_SEGMENT)) ;

If LIST_FLAG
   List the processed step to the listfile ;
```

NAME:
LSuntil;4

TITLE:
Mini_Spec

PARAMETERS:
LSargs : data_In
SCROP_UNTIL : data+control_In

LOCALS:

BODY:

```
If LIST_FLAG
   List the step to the listfile ;

Assembly-time symbol substitution on SCROP_UNTIL
 element ITERATION_STRING ;

Convert ITERATION_STRING into integer representation
 NUMBER_OF_ITERS ;

Check for corresponding block opening step using
 ASTOP to observe top STACK_RECORD on LSargs->SCRIPT->BLOCK_STACK ;

Using STACK_RECORD, set CLOSE_NUMBER in SCROP_REPEAT
 to the number of this step ;

(call ASPOP (LSargs->SCRIPT->BLOCK_STACK)) ;

If LIST_FLAG
   List the processed step to the listfile ;
```

NAME:
LSupload;2

TITLE:
Mini_Spec

PARAMETERS:
LSargs : data_In
SCROP_UPLOAD : data+control_In

LOCALS:

BODY:

```
If LIST_FLAG
   List the step to the listfile ;

Assembly-time symbol substitution on SCROP_UPLOAD
 element FILENAME ;
```

Assembly-time symbol substitution on SCROP_UPLOAD
  element MACHINE_NAME ;

Verify that MACHINE_NAME is in MACHINE_DB ;

If LIST_FLAG
   List the processed step to the listfile ;

NAME:
LSwait;4

TITLE:
Mini_Spec

PARAMETERS:
LSargs : data_In
SCROP_WAIT : data+control_In

LOCALS:

BODY:

If LIST_FLAG
   List the step to the listfile ;

/*
** Find the labeled step
*/
(call PDATA_BST:BSTfind (step->label, script->lbltbl)) ;

Set the STEP_OFFSET in SCROP_WAIT to the step ;

If LIST_FLAG
   List the partially processed step to the listfile ;

Verify the chosen step is "waitable"; i.e., is of proper
  type and sequence with respect to this step ;

Check that chosen step is a background task ;

NAME:
LSwhen;4

TITLE:
Mini_Spec

PARAMETERS:
LSargs : data_In
SCROP_WHEN : data+control_In

LOCALS:

BODY:

If LIST_FLAG
   List the step to the listfile ;

Assembly-time symbol substitution of SCROP_WHEN element EVENT_NAME ;
Assembly-time symbol substitution of SCROP_WHEN element MACHINE_NAME ;

Process the step at STEP_OFFSET (call ScrPass2()) ;

Set SEMKEYID SEM_KEY equal to NULL; i.e., so as to initialize it ;

If LIST_FLAG
   List the processed step to the listfile ;

NAME:
mach_signals;7

TITLE:
CON_MS

PARAMETERS:

LOCALS:

BODY:

Modify service routines for signals using UNIX:signal() as follows:

```
   PENDING_QUESTION_REGION_SIGNAL : "update_quest" ;
   STATION_UPDATE_SIGNAL          : SIG_IGN ;
   MESSAGE_REGION_UPDATE_SIGNAL   : SIG_IGN ;
   INTERRUPT_SIGNAL               : "UNIX: return() " ;
   TRANSCRIPT_UPDATE_SIGNAL       : SIG_IGN ;
   ALARM_SIGNAL                   : "update_mach_parms" ;
   MACHINE_UPDATE_SIGNAL          : "update_mach_detail" ;
```

NAME:
MANAGE_MACHINE_SCREEN;7

TITLE:
CON_MS

PARAMETERS:

LOCALS:

BODY:

Outer_loop:
   /*
   ** Initialize machine screen
   */

/*
   ** Guarantee process will not be signalled
   ** while in this critical region
   */
   (call PCOM:wsem) to wait on this process' semaphore ;

(call update_machine_detail) to initialize the machine
    detail region ;

(call machine_signals) to establish proper signal trapping ;

(call update_machine_parms) to initialize the general parameters and
events data structures and screen regions ;

```
/*
** Handle signals and operator input
*/
Read_loop:
   (call PCOM:sgsem) to enable signalling from other processes ;

Read operator input (call PTXT:getscreen) ;
   If interrupted during the read
      Continue from read_loop ;
   Else
      /*
      ** Branch on input received
      */
      Case "!" in answer field:
         (call answer_quest(input received)) ;

Others:
          (call PSET:issueset() to issue updated general parameter value(s)) ;

End Read_loop ;

End Outer_loop ;
```

NAME:
MANAGE_MAIN_SCREEN;13

TITLE:
CON_MS

PARAMETERS:

LOCALS:

BODY:

```
Loop:
   /*
   ** Initialize main screen
   */
   (call PCOM:wsem) ;

(call update_quest) to initialize the pending question screen region ;

(call update_stations) to initialize the station screen region ;

(call update_list_region) to initialize the message screen region ;

(call con_signals) to establish proper signal trapping ;

/*
   ** Handle signals and operator input
   */
   Read_loop:
      Enable signalling from other processes (call PCOM:sgsem) ;
```

```
    Read operator input (call PTXT: getscreen ) ;

If interrupted during read
       Continue from read_loop ;

/*
    ** Branch on input received:
    */
    Case 'return':
       (call scroll_region (CONSOLE->MESSAGE_SEG, message_region, DOWN)) ;

Case 'ctl_u':
       (call scroll_region (CONSOLE->MESSAGE_SEG, message_region, UP)) ;

Case "right":
       (call shift_stations (RIGHT)) ;

Case "left":
       (call shift_stations (LEFT)) ;

Case '!':
       (call answer_quest (input_received)) ;

Others:
       (call manage_station_screen(input_received)) ;
       Break read_loop ;

End Read_loop ;

End Loop ;
```

NAME:
MANAGE_STATION_SCREEN;11

TITLE:
CON_MS

PARAMETERS:

LOCALS:

BODY:

```
Outer loop:
   /*
   ** Initialize station screen
   */

/*
   ** Guarantee process will not be signalled
   ** while in this critical region.
   */
   (call PCOM:wsem) ;
   (call update_quest) to initialize pending question region ;

(call update_station_detail) to initialize the station detail region ;
```

```
(call station_signals) to to establish proper signal trapping ;

(call update_list_region) to initalize the transcript region ;

/*
** Handle signals and operator input
*/
Read_loop:
    (call PCOM:sgsem) to enable signalling from other processes ;

Read operator input (call PTXT:getscreen) ;
    If interrupted during read
        Continue from read_loop ;
    Else
        /*
        ** Branch on input received
        */

Case 'return':
            (call scroll_region(STATION->TRANSCRIPT_SEG, transcript_region, DOWN )) ;

Case 'ctl_u':
            (call scroll_region( STATION->TRANSCRIPT_SEG, transcript_region, UP )) ;

Case "pause":
            Signal the interpreter to pause execution ;

Case "resume":
            Signal the interpreter to resume execution ;

Case "halt":
            Signal the interpreter to halt execution ;

Case '!':
            (call answer_quest(input_received)) ;

Others:
            (call manage_machine_screen ( input_received )) ;
            Break Read_loop ;   /* i.e. reinitialize */

End Read_loop ;

End Outer_loop ;
```

NAME:
mc_cleanup;6

TITLE:
Mini-spec

PARAMETERS:
STATUS : data_In
VERBOSE_FLAG : control_In

LOCALS:

BODY:

Set the message reply flag to STATUS ;

Wait on access (call PCOM_SEM:wsem) to the parameter segment for this operation ;

Set the access flag (PARMSET->busy_flag) to FALSE ;

Release (call PCOM_SEM:sgsem) the parameter segment ;

If an operation semaphore requested was passed in the
message (MCTL_REQ->OPSEM was NON-NULL)
    Signal it (call PCOM_SEM:sgsem) such that the calling process
      will notice this fact;

NAME:
ObtainSet;2

TITLE:
Mini-Spec

PARAMETERS:
STEP : data_In, control_In
CONTEXT : data_In, control_In
PARMSET_PTR : data_out

LOCALS:

BODY:

Gain access (call PSET:getset) to the specified parameter set using STEP->psoffset
  and returning the pointer to the parameter set on return ;

Load the appropriate parameter set elements (from those of current context),
  based on the appropriate AUGMENTOR ;

Switch (STEP->table)
      Case UNIT:
        /*
        ** Load job, lot and unit elements
        */
        Load the job element from CONTEXT->job ;
        Load the lot element from CONTEXT->lot ;
        Load the unit element from CONTEXT->unit ;

```
    Case LOT :
       /*
       ** Load job and lot elements
       */
       Load the job element from CONTEXT->job ;
       Load the lot element from CONTEXT->lot ;

case JOB :
       /*
       ** Load job element
       */
       Load the job element from CONTEXT->job ;

Return(PARMSET_PTR) ;
```

NAME:
pick_up;3

TITLE:
Mini-Spec

PARAMETERS:
PD_BASE_ADR : data_In
VERBOSE_FLAG : control_In

LOCALS:

BODY:

```
(call PSET:getstatn(PD_BASE_ADR->STATION_NAME)) ;

Verify that status of station is appropriate for an
 unload operation ;

If verification passes:
   (call respond(ACCEPT, PD_BASE_ADR->DOCK_NAME, VERBOSE_MODE)) ;
   Set status of station to BUSY ;
   Set status of dock to PICKING ;
   Return(SUCCESS) ;
Else
   (call respond(REJECT, PD_BASE_ADR->DOCK_NAME, VERBOSE_MODE)) ;
   Return(ERROR) ;
```

NAME:
pltstub;2

TITLE:
Mini-Spec

PARAMETERS:
STRUCT_CURVE: data_out
SET_ELEMENT: data_In

LOCALS:

BODY:

/*

* This function may serve as a template from which development of an
 * application specific algorithm may begin. As this stub stands, it
 * writes the input values directly to the y array in the curve structure
 * and writes an index value into the corresponding x array.
 */

Initialize the input/output array pointers;

For each value (I) in the input array (SET_ELEMENT->VALUE_LIST)
   Copy the index (I) to the x-axis value (STRUCT_CURVE->X_VALUES);
   Copy the input array value to the y-axis value (STRUCT_CURVE->Y_VALUES);

Set the total number of points to plot (STRUCT_CURVE->NUMBER_POINTS);

Return (STRUCT_CURVE);

NAME:
plot_port;5

TITLE:
Mini_Spec

PARAMETERS:
PORT_ID : data_In
VERBOSE_FLAG : control_In

LOCALS:

BODY:

Open the plotter serial interface port (call UNIX:open) with default configuration ;

Get the plotter port current configuration (call ioctl) ;

Set the plotter port to the new desired configuration (call ioctl) as follows:

Input processing  : map CR into CRLF, strip MS bit, enable software
                       handshake xon/xoff ;
   Output processing: disable ;
   Hardware control  : 9600 baud, 8 bits, 1 stop bit, enable read, local
                       mode (no hangup) ;
   Live discipline   : enable canonical processing ;

NAME:
pltcurve;5

TITLE:
Mini_Spec

PARAMETERS:
VERBOSE_FLAG : control_In
ALGINDEX : data_In
SET_ELEMENT : data_In

LOCALS:

BODY:

Ignore non-numeric parameters ;

Run the user specified algorithm on the data ;

Plot the curve (call wrt_curve) ;

NAME:
postdbvals;8

TITLE:
Mini-spec

PARAMETERS:
PARMSET_PTR : data_In
AUGMENTOR : control_In
VERBOSE_FLAG : control_In

LOCALS:

BODY:

Determine how this record is to be augmented and branch on it :
Switch ( AUGMENTOR )
   Case JOB   : compose JOBKEY ;
   Case UNIT  : compose UNITKEY ;
   Case LOT   : compose LOTKEY ;
   Case TIME  : compose TIMEKEY ;
   Case SETUP : compose SETUPKEY ;

Determine the parameter's data type and branch on it :
Switch ( PARMSET->TYPE )
   Case "I" : set data_type = INT ;
   Case "R" : set data_type = REAL ;
   Case "S" : set data_type = STRING ;

For all parameters in PARMSET
   For all parametes values to be posted to database
     Compose parameter's key (PARMSET_KEY) ;
     Compute the FUNCTION_INDEX (type + (TABLE * MAX_TYPES)) ;

Dispatch TTaddrec() function on appropriate record in table
       from the function index ;
     Add a record of the appropriate type ;

Dispatch TTpfield() function on appropriate field in record
       from the function index ;
     Add the value to the field indicated ;

RETURN(STATUS) ;

NAME:
PREPARE_SCRIPTS_AND_CAD_DATA;7

TITLE:
Mini_Spec

PARAMETERS:
PROCESS_COMMAND : data_In

LOCALS:

BODY:

Initialize database access (call DBMS:opendb) ;

Wait on a message request (call PCOM:wreq) ;

On receipt of a message request, branch on the command:

```
Switch (PROCESS_COMMAND)
   Case "PREP":
      Extract the process definition data (call get_procdef) ;
      Post-process the CAD data (call get_data) for this job according
       to the process definition ;
      Access the parameter segment (call PCOM:acshmti) to initialize
       PARMSEG_PTR ;

Freeze (call Freeze) the specified script (SCRIPT_NAME)
       into SCRIPT_SEGMENT ;

If Freezing fails then release (PDATA_SBST:SBSTRELEASE) the
        SCRIPT_SEGMENT ;

If verbose requested then print out script statistics ;

Deaccess (call PCOM_SHM:deshm) the parameter segment ;
      Send a reply (call PCOM_MSG:send_reply) to the calling process ;

case "FREEZE":
      Access the parameter segment (PCOM:acshmti) to initialize
       PARMSEG_PTR ;

Freeze (call Freeze) the specified script (DPRE_REQ->SCRIPT_NAME)
       into SCRIPT_SEGMENT ;

If Freezing fails then release (PDATA_SBST:SBSTRELEASE) the
        SCRIPT_SEGMENT ;

If verbose requested then print out script statistics ;

Deaccess (call PCOM_SHM:deshm) the parameter segment ;
      Send a reply (call PCOM_MSG:send_reply) to the calling process ;

case "FLUSH":
      Flush (call Flush) the specified script (DPREP_REQ->SCRIPT_NAME)
       from the SCRIPT_SEGMENT ;

Send a reply (call PCOM_MSG:send_reply) to the calling process ;
```

NAME:
read_conf;7

TITLE:
Mini-spec

PARAMETERS:
STRUCT_REQ_CONF : data_In
FILENAME : data_In

LOCALS:

BODY:

```
/*
** Function to read the WCC configuration file
*/

/*
** Open the configuration file and find the first
** occurrence of line beginning with '*' char,
** indicating a configuration block
*/

(call (UNIX:fopen()) to open FILENAME) ;

While more lines in FILENAME and '*' not found and not EOF
   Init buffer with line from FILENAME (call PTXT:getfield) ;
   Check for occurrence of '*' control char ;

/*
** Found valid entry. Branch on contents of second field
*/
Switch (RESOURCE)
   MESSAGE_QUEUES:
      /*
      ** Read FILENAME to extract block values
      */
      While not EOF and '*' control char not found
         Get next line in FILENAME and number of fields (call PTXT:getfield) ;
         If not a blank line and not a comment
            For the number of fields
               Initialize system key with value (call UNIX:atoi) ;

SEMAPHORE_POOL:
     MESSAGE_QUEUES:
      /*
      ** Read FILENAME to extract block values
      */
      While not EOF and '*' control char not found
         Get next line in FILENAME and number of fields (call PTXT:getfield) ;
         If not a blank line and not a comment
            For the number of fields
               Initialize system key with value (call UNIX:atoi) ;
```

```
   SEMAPHORES   :
      MESSAGE_QUEUES:
      /*
      ** Read FILENAME to extract block values
      */
      While not EOF and '*' control char not found
         Get next line in FILENAME and number of fields (call PTXT:getfield) ;
         If not a blank line and not a comment
            For the number of fields
               Initialize system key with value (call UNIX:atoi) ;

SHARED_MEMORY :
      MESSAGE_QUEUES:
      /*
      ** Read FILENAME to extract block values
      */
      While not EOF and '*' control char not found
         Get next line in FILENAME and number of fields (call PTXT:getfield) ;
         If not a blank line and not a comment
            For the number of fields
               Initialize system key with value (call UNIX:atoi) ;

TASKS         :
      MESSAGE_QUEUES:
      /*
      ** Read FILENAME to extract block values
      */
      While not EOF and '*' control char not found
         Get next line in FILENAME and number of fields (call PTXT:getfield) ;
         If not a blank line and not a comment
            For the number of fields
               Initialize system key with value (call UNIX:atoi) ;

UNKNOWN_BLK_ID:
      /*
      ** Invalid block identifier detected
      **  cause while loop to terminate
      */
```

NAME:
REPORT_ON_A_PARAMETER_SET;3

TITLE:
Mini-Spec

PARAMETERS:

LOCALS:

BODY:

```
/*
** This represents a simple example of how script
** operations may be executed immediately (adhoc)
** by invoking it from th command line; All script
** operations may be represented by a similar adhoc.
*/
```

If no arguements were passed
   (call PTXT:getscreen) ;
   Invoke the appropriate screen to capture required
   data input ;

(call UNIX:getopt) to validate the number and type of
 arguements passed ;

Display and capture (call PTXT:getscreen) for the appropriate
 lot and unit data if required for this operation ;

Access the parameter segment (call PCOM:acshmti) ;

Set up the record structure and invoke (call fGSrepset)
   the get_step function ;

Invoke the link function (call LSrep_set) ;

Interpret (call ISrep_set) the operation ;

Wait (call PCOM_SEM:wsem) on the Parmaeter Segment ;

Deaccess (call PCOM:deshm) the Parameter Segment ;

(call UNIX:exit) to exit this program ;

NAME:
reportset;8

TITLE:
pset_lib_fun

PARAMETERS:
PARMSET_PTR : data_In
VERBOSE_FLAG : control_In

LOCALS:

BODY:

Initialize the local parameter set pointer ;
For all servers (call PDATA_BST:sBSTinorder(reportmach)) in MACHINE_TABLE
   For all machines (call PDATA_BST:sBSTinorder(reportmset) in MACHINE_TABLE
      For all parameters in the set associated with this machine
         Initialize timeout value ;

Set the parmset offset (MSETOFFSET) appropriately
            for the parameter set to be reported ;

Request the appropriate machine server (request)
            to report on the set ;

If the server returns an error
            Set err_flg = ERROR ;

NAME:
respond;4

TITLE:
Mini_Spec

PARAMETERS:
MOVER_COMMAND : data_In
PD_BASE_ADR : data_In
VERBOSE_FLAG : control_In

LOCALS:

BODY:

```
/*
** Full handshaking only used of caller needs it,
** by virtue of setting the DOCK_INDEX parameter
*/
If PD_BASE_ADR is valid
    Write PD_BASE_ADR to the mover via LOCAL VEHICLE INTERFACE ;
    Receive acknowledgement ;

Write MOVER_COMMAND to mover via LOCAL VEHICLE INTERFACE ;

If PD_BASE_ADR is valid
    Receive acknowledgement ;
```

NAME:
runjob;5

TITLE:
Mini-Spec

PARAMETERS:
JOB_NAME : data_In
VERBOSE_FLAG : control_In

LOCALS:

BODY:

```
/* Access the database records previously entered by
** 'enterjob()'
*/
Access the record for JOB_NAME in JOB_DB ;

(call PSET:getdbvals("jobdata", JOB, VERBOSE_MODE));

Make the set of lot records for this job ;

/*
** Request that the job startup be executed, and reply
** indicating that the job has started
*/
(call PCOM:request( LCTL_REQUEST)) with:
    JOB_NAME as LCTL_REQUEST->JOB_NAME ;
```

```
  (null) as LCTL_REQUEST->PRODUCT_NAME ;
  (null) as LCTL_REQUEST->LOT_ID ;
  "0000" as LCTL_REQUEST->OPERATION ;
  "job-startup" as LCTL_REQUEST->SCRIPT_NAME ;
  And verbose and trace flags ;

(call PCOM:send_reply()) replying with status returned
 by the previous request ;

/*
** Process the lots of the job
*/
For all lots of the job
   (call runlot (JOB_NAME, LOT_ID, NAME_GEN, WAIT_MODE)) ;

/*
** Request cleanup of the job
*/
(call pcom:request(LCTL_REQUEST)) with:
  JOB_NAME as LCTL_REQUEST->JOB_NAME ;
  (null) as LCTL_REQUEST->PRODUCT_NAME ;
  (null) as LCTL_REQUEST->LOT_ID ;
  "9999" as LCTL_REQUEST->OPERATION ;
  "job-cleanup" as LCTL_REQUEST->SCRIPT_NAME ;
  And verbose and trace flags ;
```

NAME:
runlot;4

TITLE:
Mini-Spec

PARAMETERS:
LOT_ARGS : data+control_In

LOCALS:

BODY:

```
/*
** Access the lot data previously entered
*/
(call PSET:getdbvals("lotdata", LOT, VERBOSE_MODE)) ;

/*
** Access information regarding the lot
*/
Access LOT_RECORD->route ;
Access LOT_RECORD->product ;
Access ROUTE_DB to determine the operations along
 the lot's route ;

/*
** Process the lot along its route; do this according
** to the discipline implied by WAIT_MODE
*/
```

```
Switch on WAIT_MODE:
   case WAIT_ALL:
      /* Used when processing operations is
      ** sequential and all units complete
      ** operations prior to any of the units
      ** proceeding to the next operation
      */
      for each OPERATION on the ROUTE, first to last order:
         Generate the SCRIPT_NAME, using optionally route,
           product, operation, and/or station names based
           on NAME_GEN ;

(call PSET:getques) to get the request queue keys
          for the interpreter serving the station named
          in the ROUTE OPERATION record ;

/*
         ** Request processing, and wait on a reply
         ** before proceeding
         */
         (call PCOM:request(LCTL_REQUEST)) ;

case CONTIN:
      /* Used in a continuous and/or web process
      ** where processing through operations is
      ** sequential but units of the lot proceed
      ** through operations independently
      */
      For each OPERATION on the ROUTE, last to first order:
         Generate the SCRIPT_NAME, using optionally route,
           product, operation, and/or station names based
           on NAME_GEN ;

(call PSET:getques) to get the request queue keys
          for the interpreter serving the station named
          in the ROUTE OPERATION record ;

If this is the first operation on the route
            /*
            ** All requests downstream are posted; wait
            ** for all units of the lot to clear the first
            ** operation
            */
            (call PCOM:request(LCTL_REQUEST) ;
         Else
            /*
            ** Can't wait
            */
            (call pcom:rqnorp(LCTL_REQUEST) ;

. . .
/*
** Other disciplines
*/
```

```
default:
   /* When no particular discipline fits, or
   ** in any event is'nt supported, we assume
   ** nothing about order of processing an/or
   ** how units in the lot are processed
   */
   For each OPERATION on the ROUTE, in any order:
      Generate the SCRIPT_NAME, using optionally route,
       product, operation, and/or station names based
       on NAME_GEN ;

(call PSET:getques() to get the request queue keys
       for the interpreter serving the station named
       in the ROUTE record ;
       /*
       ** Request processsing without waiting on reply
       */
      (call PCOM:rqnorp(LCTL_REQUEST) ;
```

NAME:
ScrFlush;5

TITLE:
Mini_Spec

PARAMETERS:
SCRIPT : data_In
SCRIPT_SEGMENT : data_In
VERBOSE_FLAG : control_In

LOCALS:

BODY:
```
/*
** Treat the step list as a queue, "serving" each step on the list by.
** performing step-type specific flushing, if required, and ultimately
** freezing and unlinking the step itself
*/
While (call PDATA_SLL:sSLLHEAD(SCRIPT->STEP_LIST,SCRIPT)) yields a step
   If it is an "interpret" step
      Recurse ;

If it uses a parameter set
         Attach to the PARM_SEGMENT ;
         Flush the set (call PSET:flushset) ;
         If it is a "store" or "extract"
            Flush its parameter list ;

Detach from the PARM_SEGMENT ;

If the step utilizes a list of objects:
         Flush the list ;

/*
** Finish up
*/
Flush the SCRIPT's label and symbol tables, (call PDATA:BSTflush) ;
Flush the SCRIPT's block stack using (call PDATA:ASflush) ;
```

NAME:
ScrInterp;6

TITLE:
Mini_Spec

PARAMETERS:
CONTEXT : data_In
PARENT_SYMBOL_TABLE : data_In
SCRIPT : data_In

LOCALS:

BODY:

```
Initialize ISargs element SCRIPT_DATA ;

Set 'step' to first step on SCRIPT->STEP_LIST ;

While 'step' is not NULL
   (call ISdispatch[step->STEP_CTL->STEP_TYPE](ISargs,CONTEXT)) ;
   If ISdispatch returned an error, or Quit, or a non-local Goto
      Break loop ;

If ISdispatch returned a local Goto
         Pop off SCRIPT->BLOCK_STACK records bypassed
          by the Goto ;
         Make the target of the Goto current ;

Update 'step' to be that which was left current

If CONTEXT->TRACE_MODE  .GT. 1
   Trace contents of SCRIPT->SYMBOL_TABLE (call PDATA_BST:BSTinorder(writesym) ;

/*
** Flush out script's run-time structures
*/
(call PDATA_BST:BSTflush(SCRIPT->SYMBOL_TABLE) ;
(call PDATA_BST:ASflush(SCRIPT->BLOCK_STACK) ;

/*
** Return semaphores allocated for when-events and background
** steps, and disable events no longer needed
*/
(call PSET:geteset) to gain exclusive access to event set ;

For all elements on SCRIPT_DATA->SEMOUTLIST:
   (call flushsem(SEMOUTELT,SEMOUTLIST,event set)) ;

For all when-events on CONTEXT->WHEN_EVENT_LIST pushed by this script
   (call flushsem(SEMOUTELT,WHEN_EVENT_LIST,event set)) ;

Release the event set ;

Return(either the non-local Goto, or NULL, as appropriate) ;
```

NAME:
scroll_region;6

TITLE:
CON_MS

PARAMETERS:
DATA_SEGMENT : data_In
REGION_SPEC : data_In
DIRECTION : data_In

LOCALS:

BODY:

Adjust the displayed window according to DIRECTION using
 data from the DATA_SEGMENT ;

Display the new REGION_SPEC (call PTXT:putscreen) ;

NAME:
ScrPass1;5

TITLE:
Mini_Spec

PARAMETERS:
VERBOSE_MODE : control_In
SCRIPT_SEGMENT : data_In
SCRIPT : data_In

LOCALS:

BODY:

Initialize SCRIPT's STEP_LIST, LABEL_TABLE, SYMBOL_TABLE and
 BLOCK_STACK ;

Open script source file ;

While there are more steps in the source file:
   While (call PTXT:getfield) does not return EOF
      Truncate comments ;

If line is now blank
         Continue loop ;

If first field is a label
         Allocate, but do not yet insert, memory for the label
          set the "step labeled" flag ;

Look through the set of mnemonics for the source
          operation ;

Use the index of the matched operation to index into the
          array of fGS functions for operand acquisition and
          SCROP allocation ;

```
    Set the type of the SCROP ;

If "step labeled"
        Insert the label into SCRIPT->LABEL_TABLE ;

If EOF
    break ;

(call PDATA_SLL:sSLLappend(SCROP,SCRIPT->STEP_LIST,SCRIPT,SCRIPT_SEGMENT)) ;
```

Close the script's source file ;

NAME:
SERVE_MACHINES;1

TITLE:
Mini-Spec

PARAMETERS:
SERVER_REQUEST: data_In

LOCALS:

BODY:

Build a table (MISC_FUNCS:bldsrvrtbl) to associate machines with
  their respective servers as configured in the database ;

Wait on a message request (call PCOM_MSG:wreqti) ;

On receipt of a message request, branch on the command:

```
  Switch (SERVER_REQUEST->PROCESS_COMMAND)

Case "ISSUE": (call srvr_issue) to issue the parameter set to the machine specified;

Case "REPORT": (call srvr_report) to report on the parameter set for the machine specified;

Case "UPLOAD":(call srvr_upload) to upload a file from the machine specified;

Case "DNLOAD":(call srvr_download) to download a file to the machine specified;

Case "START_OP:(call srvr_start) to start an application on the machine specified;

Case "STOP_OP:(call srvr_stop) to stop an application on the machine specified;
```

NAME:
SERVE_MOVERS;5

TITLE:
Mini_Spec

PARAMETERS:
VERBOSE_FLAG : control_In
FILESERVER : data_In

LOCALS:

BODY:

```
Obtain the command-line arguments (call UNIX:getopt) and initialize
 FILESERVER specified ;
Initialize appropriate docks served (call PSET:setdock) ;

Wait on a mover request (call getreq) ;

On receipt of a mover request
   Validate (call validate) that the request is appropriate for the dock ;

Branch on the request
   Switch (MOVER_MESSAGE->MOVER_REQUEST)

Case "PICKUP":
        Mover picks up (call pick_up) the materials from the dock ;

Case "DELIVER":
         Mover delivers (call deliver) materials to the dock ;

Case "SUCCEEDED":
         Mover has succeeded (call succeeded) in performing the
          operation requested ;

Case "FAILED":
         Mover has failed (call failed) in performing the
          operation requested ;
```

NAME:
SERVE_OPERATOR;3

TITLE:
CON_MS

PARAMETERS:

LOCALS:

BODY:

```
/*
** Initialize the console session
*/
(call init_console) ;
```

```
/*
** Now paint the main screen;
** further screens are handled from
** within
*/
(call manage_main_screen) ;
```

NAME:
setdock;5

TITLE:
Mini-Spec

PARAMETERS:
DOCK_NAME : data_In
STATION_NAME : data_In
DOCK_STATUS : data_out

LOCALS:

BODY:

Compose the dock key from the DOCK_NAME and STATION_NAME ;

Access (call DBMS:acckey) the dock specified by key (DOCKKEY) ;

Set the dock's status (DOCK_STATUS) of this database record ;

Release/unlock the dock (call PCOM_SEM:sgsem) ;

NAME:
setstatn;3

TITLE:
Mini-Spec

PARAMETERS:
CONTEXT : data_In, control_In

LOCALS:

BODY:

Access (call DBMS:acckey) the station specified (CONTEXT->STATION_NAME) ;

Set the job component of this database record from that of
    context (CONTEXT->JOB_NAME) ;

Set the lot component of this database record from that of
    context (CONTEXT->LOT_ID) ;

Set the unit component of this database record from that of
    context (CONTEXT->UNIT_ID) ;

NAME:
shift_stations;7

TITLE:
CON_MS

PARAMETERS:
DIRECTION : data_In

LOCALS:

BODY:

Adjust the displayed window according to DIRECTION ;

Display the new station region (call PTXT:putscreen) ;

NAME:
srvr_download;2

TITLE:
Mini-Spec

PARAMETERS:
APPLIC_NAME : data_In
STRUCT_FILENAMES : data_In
VERBOSE_FLAG : control_In

LOCALS:

BODY:

Initiate appropriate protocol specific service to send the specified source
 file (STRUCT_FILENAME->SOURCE) to the named application (APPLIC_NAME) ;

NAME:
srvr_issue;6

TITLE:
Mini-Spec

PARAMETERS:
APPLIC_NAME : data_In
PARMSET_ENTRY : data_In
VERBOSE_FLAG : control_In

LOCALS:

BODY:

For each specified parameter in the "PARMSET_ENTRY" (call PDATA_SBST:sBSTinorder)
    Send parameter name with associated value to the named application (APPLIC_NAME)
     utilizing given protocol ;

NAME:
srvr_report;5

TITLE:
Mini-Spec

PARAMETERS:
APPLIC_NAME : data_In
PARMSET_ENTRY : data_In
VERBOSE_FLAG : control_In

LOCALS:

BODY:

For each specified parameter in the "PARMSET_ENTRY" (call PDATA_SBST: sBSTinorder)
    Send parameter name to the named application (APPLIC_NAME) requesting
    parameter's current value to be returned and utilizing given protocol ;

Receive and store the parameter's value ;

NAME:
srvr_start;2

TITLE:
Mini-Spec

PARAMETERS:
APPLIC_NAME : data_In
VERBOSE_FLAG : control_In

LOCALS:

BODY:

Send appropriate command string utilizing specified protocol to the named
 application (APPLIC_NAME) commanding that application to "START" performing
 its normal operations ;

NAME:
srvr_stop;2

TITLE:
Mini-Spec

PARAMETERS:
APPLIC_NAME : data_In
VERBOSE_FLAG : control_In

LOCALS:

BODY:

Send appropriate command string utilizing specified protocol to the named
 application (APPLIC_NAME) commanding that application to "STOP" performing
 its normal operations ;

NAME:
srvr_upload;3

TITLE:
Mini-Spec

PARAMETERS:
APPLIC_NAME : data_In
STRUCT_FILENAMES : data_In
VERBOSE_FLAG : control_In

LOCALS:

BODY:

Initiate appropriate protocol specific service to request the named
 application (APPLIC_NAME) to send the specified file (STRUCT_FILENAMES->SOURCE) ;

Receive the specified source file into the destination
 file (STRUCT_FILENAMES->DESTIN) according to the protocol ;

NAME:
statn_signals;7

TITLE:
CON_MS

PARAMETERS:

LOCALS:

BODY:

Modify service routines for signals using UNIX:signal() as follows:

```
    PENDING_QUESTION_REGION_SIGNAL  : "update_quest" ;
    STATION_UPDATE_SIGNAL           : "update_station_detail" ;
    MESSAGE_REGION_UPDATE_SIGNAL    : SIG_IGN ;
    INTERRUPT_SIGNAL                : "UNIX:return()" ;
    TRANSCRIPT_UPDATE_SIGNAL        : "update_list_region" ;
    ALARM_SIGNAL                    : SIG_IGN ;
    MACHINE_UPDATE_SIGNAL           : SIG_IGN ;
```

NAME:
succeeded;4

TITLE:
Mini-Spec

PARAMETERS:
PD_BASE_ADR : data_In
VERBOSE_FLAG : control_In

LOCALS:

BODY:

```
/*
** Verify that the success followed a valid request to
** operate
*/
Verify that dock status was PICKING or DELIVERING;

/*
** we'll re-use scrop functions for the feed-forward
*/
Synthesize within a buffer arguments as if this operation
 had been scripted, according to the form unload/load
 expects ;

/*
** Execute the unload/load operation
*/
If status of PD_BASE_ADR->DOCK_NAME was PICKING
    (call fGSunload) ;
    (call LSunload) ;
    (call ISunload) ;
Else
    (call fGSload) ;
    (call LSload) ;
    (call ISload) ;

/*
** Dismiss the mover
*/
(call respond(LEAVE, PD_BASE_ADR->DOCK_NAME, VERBOSE_MODE) ;

/*
** Set dock and station statuses to reflect the successful
** operation
*/
(call PSET:setdock) ;
(call PSET:setstatn) ;
```

NAME:
take_down;5

TITLE:
Mini-spec

PARAMETERS:
STRUCT_INST_RES : data_In

LOCALS:

BODY:

```
/*
** Function to take down the workcell computer system
**   resources indicated as being up in memory
*/

/*
** Remove system tasks
```

```
*/
For each of the system tasks
   Check if process is still alive (call UNIX:kill) ;
   if process still alive
      Kill process (call UNIX:kill) ;

/*
** Remove message queues
*/
For each of the message queues
   Remove message queue (call PCOM_MSG:rmmsg) ;

/*
** Remove semaphore pools
*/
For each of the semaphore pools
   Remove semaphore pool (call PCOM_SEM:rmsmpool) ;

/*
** Remove shared memory segments
*/
For each of the shared memory segments
   Remove shared memory segments (call PCOM_SHM:rmshm) ;

/*
** Remove semaphores
*/
For each semaphore
   Remove semaphore (call PCOM_SEM:rmsem ) ;
```

NAME:
TRACK_EVENTS;4

TITLE:
Mini-Spec

PARAMETERS:
TIMEOUT : data_in  * Event sampling rate *
VERBOSE_FLAG : control_in

LOCALS:

BODY:

```
Check to see if a request is pending (call PCOM_MSG:nwreq) ;

If no request pending and currently not tracking
   Nap for a short time (call UNIX:nap) as specified on initialization
     by the TIMEOUT value set ;
   Check for a pending request again ;

If a request was received
   Set requested flag and branch on the request
   Switch (PROCESS_COMMAND)
      Case "INIT_EVTRCK" :
         If currently tracking display error message and Continue;
         If verbose display initialization message;
```

```
          Access (PCOM_SHM:acshmti) the parameter segment;
          Build the list of events of interest (PSET:bldset) ;
          Build the server and machine lists for these events (call PSET:bldmset);
          Release the event set for access by other processes (PARMSET->BUSY = FALSE);
          Release (call PCOM_SEM:sgsem) the parameter segment ;
          Set the TRACK_FLAG and INIT_FLAG ;

Case "START_EVTRCK":
        If the event set has not yet been loaded, display error
        message and Continue
           Set the tracking flag ;
           If verbose
              Display tracking message;
           Access (call PSET:geteset) the event table ;
           Report (call PSET:reportset) on event parameters ;
           Check (call chkevts) for occurrance of enabled events
            and handle them appropriately ;
           Release (PARMSET->BUSY = FALSE) the event set ;

Case "STOP_EVTRCK" :
        If verbose and tracking, display stopped tracking message ;
        Reset track flag (TRACKING = FALSE) ;

If requested
   Send a reply (call PCOM_MSGS:send_reply) to the calling process ;
```

NAME:
TRACK_PROCESS_PARAMETERS;3

TITLE:
Mini-Spec

PARAMETERS:
VERBOSE_FLAG : control_In

LOCALS:

BODY:

```
Set the nap time value to TIMEOUT ;

Set the default interval period to DEF_PERIOD ;

Wait on a message request, timing out if
 the interval period is up (call PCOM_MSG:wreqti) ;

If no request pending and currently not tracking
  Nap for a short time (call UNIX:nap) as specified on initialization
   by the TIMEOUT value set ;
  Wait on a message request again ;

If a request was received then set requested flag and branch on the request
   Switch (PROCESS_COMMAND)
      Case "INIT_INTRCK" :
         If currently tracking display error message and Continue ;
         If verbose display initialization message ;
         Access (call PCOM_SHM:acshmti) the parameter segment ;
         Build the list of parameters to be tracked on interval (call PSET:bldset) ;
```

Build the server and machine lists for these parameters (call PSET:bldmset) ;
Release the parameter set for access by other processes (PARMSET->BUSY = FALSE) ;
Release (call PCOM_SEM:sgsem) the parameter segment ;
Set the TRACK_FLAG and INIT_FLAG ;

Case "START_INTRCK":
      If the parameter set has not yet been loaded, display error
       message and Continue ;
      Set the tracking flag ;
      If verbose, display tracking message;
      Access (call PSET:getset) the interval parameter table ;
      Report (call PSET:reportset) on process parameters whose sample time is due ;
      Post (call PSET:postdbvals) the parameter values collected to the database ;
      Determine the next scheduled sample time (Sample rate + current time)
      For all parameters in the set that were just sampled ;
         Find out how long to sleep (timeout) before the  next (minimum)
           scheduled sample time ;
         Release (PARMSET->BUSY = FALSE) the interval parameter set ;

Case "STOP_INTRCK" :
      If verbose and tracking, display stopped tracking message ;
         Reset track flag (TRACKING = FALSE) ;

If requested then send a reply (call PCOM_MSGS:send_reply) to the calling process ;

NAME:
TTacckey;2

TITLE:
Mini-Spec

PARAMETERS:
COMBKEY : data_in

LOCALS:

BODY:

```
/*
** Contains an array of functions associated with accessing
** a database record by exact key (HASH table entry);
** The appropriate function is dispatched based on the
** computed function index (FCNIDX = (table + (table * MAX_TYPES)))
** which selects the appropriate  database table by the AUGMENTOR
** (Job, Lot, Unit, Setup, Time) requested and the parameter's
** DATA_TYPE (Integer, Float, String). Format of the function
** name is as follows:
** IUacckey --> I (DATA_TYPE), U (AUGMENTOR) acckey (function).
*/

Switch (FUNCTION_INDEX)
   Case  1: IUacckey(COMBKEY) ;
   Case  2: FUacckey(COMBKEY) ;
   Case  3: SUacckey(COMBKEY) ;
   Case  4: ILacckey(COMBKEY) ;
   Case  5: FLacckey(COMBKEY) ;
   Case  6: SLacckey(COMBKEY) ;
```

```
    Case  7: ITacckey(COMBKEY) ;
    Case  8: FTacckey(COMBKEY) ;
    Case  9: STacckey(COMBKEY) ;
    Case 10: ISacckey(COMBKEY) ;
    Case 11: FSacckey(COMBKEY) ;
    Case 12: SSacckey(COMBKEY) ;
    Case 13: IJacckey(COMBKEY) ;
    Case 14: FJacckey(COMBKEY) ;
    Case 15: SJacckey(COMBKEY) ;
```

NAME:
TTaddrec;2

TITLE:
Mini-Spec

PARAMETERS:
COMBKEY : data_In

LOCALS:

BODY:

```
/*
** Contains an array of functions associated with adding
** a database record by exact key (HASH table entry);
** The appropriate function is dispatched based on the
** computed function index (FCNIDX = (table + (table * MAX_TYPES)))
** which selects the appropriate database table by the AUGMENTOR
** (Job, Lot, Unit, Setup, Time) requested and the parameter's
** DATA_TYPE (Integer, Float, String). Format of the function
** name is as follows:
**   IUaddrec --> I (DATA_TYPE), U (AUGMENTOR) addrec (function).
*/

Switch (FUNCTION_INDEX)
    Case  1: IUaddrec(COMBKEY) ;
    Case  2: FUaddrec(COMBKEY) ;
    Case  3: SUaddrec(COMBKEY) ;
    Case  4: ILaddrec(COMBKEY) ;
    Case  5: FLaddrec(COMBKEY) ;
    Case  6: SLaddrec(COMBKEY) ;
    Case  7: ITaddrec(COMBKEY) ;
    Case  8: FTaddrec(COMBKEY) ;
    Case  9: STaddrec(COMBKEY) ;
    Case 10: ISaddrec(COMBKEY) ;
    Case 11: FSaddrec(COMBKEY) ;
    Case 12: SSaddrec(COMBKEY) ;
    Case 13: IJaddrec(COMBKEY) ;
    Case 14: FJaddrec(COMBKEY) ;
    Case 15: SJaddrec(COMBKEY) ;
```

NAME:
TTgfield;2

TITLE:
Mini-Spec

PARAMETERS:
SET_ELEMENT : data_In
NUMBER_OF_READINGS : data_In

LOCALS:

BODY:

```
/*
** Contains an array of functions associated with getting
** a database field from the specified, current record;
** The appropriate function is dispatched based on the
** computed function index (FCNIDX = (table + (table * MAX_TYPES)))
** which selects the appropriate  database table by the AUGMENTOR
** (Job, Lot, Unit, Setup, Time) requested and the  parameter's
** DATA_TYPE (Integer, Float, String). Format of the function
** name is as follows:
** IUgfield --> I (DATA_TYPE), U (AUGMENTOR) gfield (function).
*/ switch (FUNCTION_INDEX)
    Case  1: IUgfield(SET_ELEMENT, NUMBER_OF_READINGS) ;
    Case  2: FUgfield(SET_ELEMENT, NUMBER_OF_READINGS) ;
    Case  3: SUgfield(SET_ELEMENT, NUMBER_OF_READINGS) ;
    Case  4: ILgfield(SET_ELEMENT, NUMBER_OF_READINGS) ;
    Case  5: FLgfield(SET_ELEMENT, NUMBER_OF_READINGS) ;
    Case  6: SLgfield(SET_ELEMENT, NUMBER_OF_READINGS) ;
    Case  7: ITgfield(SET_ELEMENT, NUMBER_OF_READINGS) ;
    Case  8: FTgfield(SET_ELEMENT, NUMBER_OF_READINGS) ;
    Case  9: STgfield(SET_ELEMENT, NUMBER_OF_READINGS) ;
    Case 10: ISgfield(SET_ELEMENT, NUMBER_OF_READINGS) ;
    Case 11: FSgfield(SET_ELEMENT, NUMBER_OF_READINGS) ;
    Case 12: SSgfield(SET_ELEMENT, NUMBER_OF_READINGS) ;
    Case 13: IJgfield(SET_ELEMENT, NUMBER_OF_READINGS) ;
    Case 14: FJgfield(SET_ELEMENT, NUMBER_OF_READINGS) ;
    Case 15: SJgfield(SET_ELEMENT, NUMBER_OF_READINGS) ;
```

NAME:
TTpfield;2

TITLE:
Mini-Spec

PARAMETERS:
SET_ELEMENT : data_In
NUMBER_OF_READINGS : data_In

LOCALS:

BODY:

```
/*
** Contains an array of functions associated with putting
** a database field into the specified, current record;
** The appropriate function is dispatched based on the
** computed function index (FCNIDX = (table + (table * MAX_TYPES)))
** which selects the appropriate database table by the AUGMENTOR
** (Job, Lot, Unit, Setup, Time) requested and the parameter's
** DATA_TYPE (Integer, Float, String). Format of the function
** name is as follows:
** IUpfield --> I (DATA_TYPE), U (AUGMENTOR) pfield (function).
*/

Switch (FUNCTION_INDEX)
   Case  1: IUpfield(SET_ELEMENT, NUMBER_OF_READINGS) ;
   Case  2: FUpfield(SET_ELEMENT, NUMBER_OF_READINGS) ;
   Case  3: SUpfield(SET_ELEMENT, NUMBER_OF_READINGS) ;
   Case  4: ILpfield(SET_ELEMENT, NUMBER_OF_READINGS) ;
   Case  5: FLpfield(SET_ELEMENT, NUMBER_OF_READINGS) ;
   Case  6: SLpfield(SET_ELEMENT, NUMBER_OF_READINGS) ;
   Case  7: ITpfield(SET_ELEMENT, NUMBER_OF_READINGS) ;
   Case  8: FTpfield(SET_ELEMENT, NUMBER_OF_READINGS) ;
   Case  9: STpfield(SET_ELEMENT, NUMBER_OF_READINGS) ;
   Case 10: ISpfield(SET_ELEMENT, NUMBER_OF_READINGS) ;
   Case 11: FSpfield(SET_ELEMENT, NUMBER_OF_READINGS) ;
   Case 12: SSpfield(SET_ELEMENT, NUMBER_OF_READINGS) ;
   Case 13: IJpfield(SET_ELEMENT, NUMBER_OF_READINGS) ;
   Case 14: FJpfield(SET_ELEMENT, NUMBER_OF_READINGS) ;
   Case 15: SJpfield(SET_ELEMENT, NUMBER_OF_READINGS) ;
```

NAME:
uniq_key;4

TITLE:
Mini-spec

PARAMETERS:
STRUCT_REQ_CONF : data_In

LOCALS:

BODY:

```
/*
** Function to verify the uniqueness of various IPC resource keys
*/
For each of the RESOURCE types check for unique key
   Switch (RESOURCE)
      MESSAGE_QUEUES:
         Check for duplicate message queues (call kver) ;
         Check for duplicate pool queues (call kver) ;

SEMAPHORE_POOL:
      SEMAPHORES    :
         Check for pool queue as a duplicate message queue (call kver) ;
         Check for duplicate pool queue (call kver) ;
         /*
         ** Ensure semaphores are unique
         */
```

Check that pool does not overlap other pools (call pver) ;
Check that this pool does not include any single semaphores (call psver) ;

SEMAPHORE_KEYS :
   Check for duplicate semaphores (call kver) ;
   Check for it as being included in a pool queue (call spver) ;

SHARED_MEMORY :
SEMAPHORES    :
   Check for duplicate segment (call kver) ;
   Check that the governing semaphore is unique (call kver) ;

NAME:
update_list_region;8

TITLE:
CON_MS

PARAMETERS:
region_signal_number : data+control_in

LOCALS:
data_segment
region

BODY:

```
/*
** Determine which region to update
*/

If region_signal_number is MESSAGE_REGION_UPDATE_SIGNAL
   Region = console_message_region ;
   Data_segment = CONSOLE->MESSAGE_SEG ;
Else
   Region = station_transcript_region ;
   Data_segment = STATION->TRANSCRIPT_SEG ;

/*
** Display the data in the screen region
*/
Set the screen window to include the most recently listed data lines
 in the data_segment (MESSAGE_SEGMENT for MAIN_SCREEN,
                      TRANSCRIPT_SEGMENT for STATION_SCREEN) ;

(call PTXT:putscreen) to display the region to the screen ;
```

NAME:
update_mach_detail;6

TITLE:
CON_MS

PARAMETERS:

LOCALS:

BODY:

Obtain machine detail information for this machine from the
 database (call DBMS:acckey) ;

(call PTXT:putscreen) to write screen region ;

NAME:
update_mach_parms;5

TITLE:
CON_MS

PARAMETERS:
In_signal : data_In

LOCALS:

BODY:

If ( in_signal == ALARM_SIGNAL)
    (call PCOM:wsem) to suspend other signalling of this process ;

(call PSET:reportset) to report on the general parameters and events
 in the machine's display set ;

(call PTXT:putscreen) to write the values to the screen region ;

Reset the alarm for interval tracking ;

NAME:
update_quest;10

TITLE:
CON_MS

PARAMETERS:

LOCALS:

BODY:

(call PCOM:wsem(CONSOLE_SEMAPHORE)) ;

/*
* The signal may be received for one of two reasons:
* If the pending question is null, then another process
* answered the question and only an update is required.
*

```
 * Otherwise, a new question has been asked - so a request
 * will have been posted to the console's request queue.
 * The purpose of the request is to convey appropriate
 * header information used when the question is answered
 * and a reply routed to the interpreter process which
 * asked the question.  At least one of the console processes
 * must accept the request and write the header to the
 * CONSOLE (even though it may be a different console process
 * that uses it later).
 */
Check CONSOLE->PENDING_QUESTION;

If not null
    (call PCOM:nwreq(CONSOLE->CONSOLE_REQUEST_KEY)) ;

If a message was received
   Copy message header to CONSOLE ;

(call PCOM:sgsem(CONSOLE_SEMAPHORE)) to enable signalling from other
 processes ;

Update pending question screen region (call PTXT:putscreen) ;
```

NAME:
update_station_detail;5

TITLE:
CON_MS

PARAMETERS:
STATION_NAME : data_In

LOCALS:

BODY:

(call PSET:getstatn) to obtain station detail information for
 this station ;

(call PTXT:putscreen) to write screen region ;

NAME:
update_stations;5

TITLE:
CON_MS

PARAMETERS:

LOCALS:

BODY:

For each station of the console
    (call PSET:getstatn) to get the current summary
     information about the station ;

Write the information to the screen buffer ;

(call PTXT:putscreen) to put the station region to the screen ;

NAME:
validate;3

TITLE:
Mini-Spec

PARAMETERS:
MOVER_MESSAGE : data_In
VALIDATED : control_out

LOCALS:

BODY:

Verify that MOVER_MESSAGE->PD_BASE_ADR->DOCK_NAME exists in DOCK_DB ;

If MOVER_REQUEST is 'Pick_up' or 'Deliver':
   Verify that dock's status is 'IDLE' ;

Else if MOVER_REQUEST is 'Succeeded' or 'Failed'
    Verify that dock's status is 'PICKING' or 'DELIVERING' ;

If verification succeeded
   (call respond (ACK, NOFULL, VERBOSE_MODE)) ;
   Return(VALIDATED) ;
Else
   (call respond (NAK, NOFULL, VERBOSE_MODE)) ;
   Return(NOT_VALIDATED) ;

NAME:
wcinit;5

TITLE:
Mini_Spec

PARAMETERS:
VERBOSE_MODE : control_In
MODE_FLAG : control_In

LOCALS:

BODY:

(call PDATA:SBSTinit) to initaialize the CONSOLE_SEGMENT
and CONSOLE_SEMAPHORE ;

For each CONSOLE_RECORD in CONSOLE_LIST_DB
   Make a CONSOLE_ENTRY in CONSOLE_SEGMENT (call PDATA:SBSTalloc) and
    (call PDATA:SBSTinsert) ;
   For each CONSOLE_STATION_ASSOCIATION involving the console in CONSOLE_TABLE
      Add the CONSOLE_STATION_ASSOCIATION to
      the CONSOLE_ENTRY (call PDATA:sSLLappend) ;

```
(call PDATA:SSLLinit) to initialize the consoles'
 CONSOLE_MESSAGE_SEM and CONSOLE_MESSAGE_SEM ;

(call PDATA:SBSTinit() to initialize the STATION_SEGMENT and STATION_SEMAPHORE ;

For each STATION_RECORD in STATION_DB
   Make a STATION_ENTRY in STATION_SEGMENT ;
   (call PDATA:SSLLinit) to initialize the stations'
    STATION_TRANSCRIPT_SEG and STATION_TRANSCRIPT_SEM ;

If MODE_FLAG implies use of parameter segment
   (call PDATA:SBSTinit(PARM_SEGMENT,PARM_SEMAPHORE));

If MODE_FLAG implies use of machine control subsystem
   Request "mach_ctl" process to initialize ;

If MODE_FLAG implies use of event tracking subsystem
   Request "evtrck" process to initialize ;

If MODE_FLAG implies that tracking should start immediately
   Request "evtrck" process to start tracking ;

If MODE_FLAG impplies use of process scripts
   Request "lot_ctl" process to initialize the script segment ;
```

NAME:
writesym;4

TITLE:
Mini_Spec

PARAMETERS:
PARENT_SYMBOL_TABLE : data_In

LOCALS:

BODY:

Print the SYMBOL's TOKEN and VALUE to the tracefile ;

NAME:
wrtcurve;4

TITLE:
Mini_Spec

PARAMETERS:
VERBOSE_FLAG : control_In
STRUCT_CURVE : data_In

LOCALS:

BODY:

Select appropriate pen for this plot (call newpen) ;

Move to the first point on the plot with the pen up (call plot) ;

For ALL the points given on the curve
   Plot a straight line from the current point to the next point (call plot)
   with the pen down ;

NAME:
wrt_hdgs;5

TITLE:
Mini_Spec

PARAMETERS:
VERBOSE_FLAG : control_In
STRUCT_HEADINGS : data_In

LOCALS:

BODY:

```
Get offset coordinates of the first point of the plot for step and
 density axes from the heading structure (hdg) ;

Initialize the plotter (call plots) ;
Set plotter units to milimeters (call zunit) ;
Set the line quality to midrange (call zqual) ;
Bring pen down and up (call plot()) ;
Specify proportional font for plotting characters (call zfont) ;

Branch on the plot type (plot type is an integer indicating number of
 90 degree axes rotations) ;

Switch (type)
   Case "0":
      Currently unimplemented, return with error indication ;

Case "1":
      VERTICAL DENSITY plot ;
      Calculate scaling factors for step axis and density axis ;
      Rotate plot 90 degrees for VERTICAL DENSITY plot (call zrotat) ;
      Reset plotter origin to intersection of plotter's x,y axes (call origin) ;
      Clip the plot window to stay within the chart paper boundaries (call zwindo) ;
      Plot the main title, step-axis label and density-axis label (call symb77) ;
      Plot appropriate labels for UNIT, LOT, JOB, NONLOT and SETUP ;

case "2":
      HORIZONTAL DENSITY plot ;
      Calculate scaling factors for step axis and density axis ;
      Rotate plot 180 degrees for HORIZONTAL DENSITY plot (call zrotat) ;
      Reset plotter origin to intersection of plotter's x,y axes (call origin) ;
      Clip the plot window to stay within the chart paper boundaries (call zwindo) ;
      Plot the main title, step-axis label and density-axis label (call symb77) ;
      Plot appropriate labels for UNIT, LOT, JOB, NONLOT and SETUP ;

case "3":
      Currently unimplemented, return with error indication ;
```

Appendix E

PCOM Manual Pages

NAME acshmnw — access shared memory segment, do not wait if already in use

SYNTAX

```
#include \wkcell/token.h/
#include \wkcell/pcom.h/
extern char far *shmat();
char far *acshmnw (shmnam, semnam) key_t shmnam;
key_t semnam;
```

INPUT PARAMETERS shmnam — shared memory segment key name
    semnam — shared memory segment access semaphore key name

RETURN VALUE

SUCCESS — far pointer ( long address ) to shared mem segment

FAILURE — far pointer to char with the pointer value set to "PTRERR" ( −1 )

DESCRIPTION

This utility function enables the calling process to access a shared memory segment for reading/writing the data stored there. If the shared memory segment is not currently in use, it will be locked for exclusive use by the calling process, and the function returns the segment's address. Otherwise, the function will immediately return with the error indication without waiting for the segment to become unlocked. Locking mechanism is provided by the dedicated semaphore arbitrating access to the shared memory segment on mutually exclusive basis.

NAME acshmti — access shared memory segment, wait for
             the specified timeout duration if
             already in use

SYNTAX include \wkcell/token.c/
    #include \wkcell/pcom.h/
    extern char far    *shmat();
    char far  *acshmti (shmnam, semnam, timeout) key_t
             shmnam;
    key_t semnam;
    int timeout;

INPUT PARAMETERS shmnam — shared memory segment key name
    semnam — shared memory segment access semaphore
             key name
    timeout — timeout value in seconds

RETURN VALUE

SUCCESS — far pointer ( long address ) to shared
              mem segment
    FAILURE — far pointer to char with the pointer
              value set to "PTRERR" ( −1 )

DESCRIPTION

This utility function enables the calling
process to access a shared memory segment for
reading/writing the data stored there.  If the shared
memory segment is not currently in use, it will be
locked for exclusive use by the calling process, and
the function returns the segment's address. If the
shared memory segment is locked by another process,
the function will suspend the calling process for the
timeout duration.  If the timeout expires and the
segment is still locked, the function returns with the
timeout error. Locking mechanism is provided by the
dedicated semaphore arbitrating access to the shared
memory segment on mutually exclusive basis.

NAME acshmw  — access shared memory segment, wait
            indefinitely if already locked

SYNTAX include \wkcell/token.h/ #include \wkcell/pcom.h/
   extern char far    *shmat();
   char far   *acshmw (shm_nam, sem_nam) key_t
       shm_nam; key_t sem_nam;

INPUT PARAMETERS shm_nam — shared memory segment key name
   sem_nam — shared memory segment access semaphore
            key name RETURN VALUE SUCCESS — far pointer ( long address )
                       to shared mem segment FAILURE —    far pointer to char with the pointer
             value set to "PTRERR" ( -1 )

DESCRIPTION

This utility function enables the calling process to access a shared memory segment for reading/writing the data stored there. If the shared memory segment is not currently in use, it will be locked for exclusive use by the calling process, and the function returns the segment's address. If the shared memory segment is locked for use by another process, the calling process is suspended for indefinite period of time until the shared segment is unlocked. Locking mechanism is provided by the dedicated semaphore arbitrating access to the shared memory segment on mutually exclusive basis.

NAME crsem —   create a set of one binary semaphore

SYNTAX include  \wkcell/token.h/
   #include  wkcell/pcom.h/
   int crsem (semnam) key_t semnam;

INPUT PARAMETERS
    semnam —  semaphore name (key) of the type "key_t"
              (long)

RETURN VALUE
    SUCCESS — "0" ( SUCCESS )
    FAILURE — "-1" ( ERROR ) and "errno" is set to
              corresponding err value DESCRIPTION
        This utility function creates an instance of
a binary semaphore and initializes its status to
"BUSY". The binary semaphore (mutex) provides
mutually exclusive access to a resource that must be
shared among two or more competing processes.

NAME
    crshmlk — create shared memory segment and lock it
              out

SYNTAX
    #include \wkcell/token.h/
    #include \wkcell/pcom.h/
    extern char    far *shmat();
    extern int errno;
    char far  *crshmlk (shm_nam, shm_sem, size) key_t
              shm_nam;
    key_t shm_sem;
    int size;

INPUT PARAMETERS
    shm_nam — shared memory segment key name
    shm_sem — shared memory segment access semaphore
              key name
    size —    shared memory segment size in bytes RETURN VALUE
    SUCCESS — far pointer ( long address ) to shared
              mem segment FAILURE — far pointer to char with the pointer
value set to "PTRERR" ( −1 )

DESCRIPTION

This utility function creates a shared memory
segment of specified size, locks it out initially, and
then attaches to it. The process which called this
function is therefore assured of having first access
to that memory segment before any other process can
access it. It enables the process that creates the
shared memory segment, to initialize it to a known
state before any other process has the chance to use
the data from that segment. This function creates
both the shared memory segment and the semaphore
arbitrating access to it. Locking mechanism is
provided by the dedicated semaphore arbitrating access
to the shared memory segment on mutually exclusive
basis.

NAME crsmpool —    create a semaphore pool

SYNTAX

```
#include  \wkcell/token.h/
#include  \wkcell/pcom.h/
extern int errno;
int crsmpool   (poolkey, minkey, maxkey) key_t
                poolkey;
key_t minkey;
key_t maxkey;
```

INPUT PARAMETERS poolkey — semaphore pool message queue key
    minkey — first semaphore key in the pool
    maxkey — last semaphore key in the pool

RETURN VALUE

SUCCESS — semaphore pool id as an integer number
    FAILURE — "−1" ( ERROR )

DESCRIPTION

This utility function creates a semaphore pool. The semaphore pool is implemented as a message queue with semaphore element structures stored on that queue in FIFO order. Each semaphore element structure contains three memebers: semaphore pool identifier, semaphore key and semaphore id. First the message queue is created which will serve as the pool by holding semaphore element structures. Next, individual semaphores are created one by one and their element structures sent to the message queue, thus forming the semaphore pool. The information about number of semaphores to be contained in the pool is passed to the function in form of two semaphore keys, one key ( minkey ) representing the first semaphore and second key ( maxkey ) representing the last semaphore in the semaphore pool.

NAME deshm — deaccess shared memory segment

SYNTAX include \wkcell/token.h/
    #include \wkcell/pcom.h/ int deshm (shmadr, sem_nam)
    char far *shmadr;
    key_t sem_nam;

INPUT PARAMETERS shmadr — far pointer ( 32 bit address ) to shared memory segment
    sem_nam — shared memory segment access semaphore key name

RETURN VALUE

SUCCESS — "0" ( SUCCESS )
    FAILURE — "-1" ( ERROR )

DESCRIPTION

This utility function allows the calling process to de-access the shared memory segment. First the function detaches from the shared memory segment. Next it signals the semaphore arbitrating access to the shared memory segment. This unlocks the memory segment and makes it available for access by other processes. This function must be executed by the process after it finished using the shared memory segment to unlock it for other processes vying for access.

NAME getspool — get semaphore element structure from the semaphore pool

SYNTAX

```
#include \errno.h/
#include \wkcell/token.h/
#include \wkcell/pcom.h/
extern int errno;
int getspool (sempoolkey, sempt)
key_t sempoolkey;
struct semkeyid * sempt;
```

INPUT PARAMETERS sempoolkey — semaphore pool key name sempt — pointer to semaphore structure containing semaphore pool identifier, semaphore key and semaphore id

RETURN VALUE

SUCCESS — "0" and values of semaphore pool id, semaphore key and semaphore id are returned in the semaphore element structure, address of which was passed to this function

FAILURE

"-1" ( ERROR ) — system error from message queue operation

"-5" ( POOLEMPTY ) — semaphore pool is empty

DESCRIPTION

This utility function gets the semaphore element structure of the next available semaphore from the semaphore pool. The semaphore element structure is received from the head of the message queue acting as the actual semaphore pool. In case the semaphore pool is empty ( all semaphores are in use by other processes ), the appropriate error indication is returned back to the calling process.

NAME nwreq — check for request from another process, do not wait if no request pending

SYNTAX

```
#include \wkcell/token.h/
#include \wkcell/pcom.h/
int nwreq (destin, rqbufp)
struct rqkey *destin;
struct ipcmsg *rqbufp;
```

INPUT PARAMETERS destin — pointer to structure of request and reply keys rqbufp — pointer to request message buffer structure

RETURN VALUE

SUCCESS — number of bytes received in the request message excluding the message type ( long ) but including the rest of the header

FAILURE

"-1" ( ERROR ) — system error from message queue operation

DESCRIPTION

This utility function enables a process to check for any requests pending on its request message queue. If there is at least one request pending, the function pulls the first request from the head of the queue, puts the request contents into the processes'
request message buffer and returns successfully with
the number of bytes received in the request message.
If there are no requests pending, the function returns
immediately with an error without waiting for any
request to arrive at the request message queue

NAME nwsem — check semaphore status without wait

SYNTAX

```
#include \errno.h/
#include \wkcell/token.h/
#include \wkcell/pcom.h/
extern int errno;
int nwsem (semnam)
key_t semnam;
```

INPUT PARAMETERS semnam — semaphore key name

RETURN VALUE

SUCCESS — "0" ( SUCCESS )

FAILURE

"-1" ( ERROR ) —    system error during semaphore operation

"-6" ( LOCKED) —    resource protected by the semaphore is locked ( in use )

DESCRIPTION

This utility function attempts to gain an access to the resource in a mutually exclusive manner. Access to the resource is governed by the specified semaphore. If the semaphore is "BUSY" ( resource locked by another process ), the function returns immediately with the error status "-6" ( LOCKED ) without waiting for the resource to become unlocked. If the semaphore is "NOT BUSY" ( resource unlocked ), the function locks up the resource and returns with the "0" ( SUCCESS ) status

NAME openti — open file, pipe or device for reading or writing with the timeout

SYNTAX include \signal.h/
    #include \errno.h/
    #include \wkcell/token.h/
    extern int errno;
    int openti (path, oflag, timeout)
    char *path;
    int oflag;
    int timeout;

INPUT PARAMETERS path — pointer to a pathname naming the file or device
    oflag — file or device status flags
    timeout — timeout value in seconds

RETURN VALUE

SUCCESS — nonnegative integer — file descriptor
    FAILURE — "−1" ( ERROR )— system error during open operation
            — "−2" ( TMOUT ) — timed out waiting on open to complete

DESCRIPTION

This utility opens a file descriptor for the named file, pipe or device and sets the status flags according to the value of "oflag". If the open can not be completed within specified timeout limit the function returns with the timeout error indication.

NAME readti — read from specified file or device with timeout

SYNTAX include \signal.h/
    #include \errno.h/

```
#include \wkcell/token.h/
#include \wkcell/laser.h/
extern int errno;
extern int wccerr;
int readti (fildes, buf, nbyte, timeout)
int fildes;
char * buf;
unsigned nbyte;
int timeout;
```

INPUT PARAMETERS
    fildes — file or device descriptor
    buf — pointer to a character buffer
    nbyte — max number of bytes to read
    timeout — timeout value in seconds RETURN VALUE
    SUCCESS — number of bytes actually read
    FAILURE — "−1" ( ERROR ) — system error during read operation
                 "−2" ( TMOUT ) — timed out waiting on read completion DESCRIPTION
    This utility function provides enhanced file and peripheral device read capability. It provides the timeout capability, such that if the read is not completed within the timeout limit as specified in seconds, the read is aborted and proper error indication returned to the caller. If the read successfully completes, the function returns the number of bytes actually read from the file or device.

NAME
    reply — send a reply to the requesting process

SYNTAX
```
#include \wkcell/token.h/
#include \wkcell/pcom.h/
```

```
int reply (destin, rplbufp, size)
struct rqkey *destin;
struct ipcmsg *rplbufp;
int size;
```

INPUT PARAMETERS
    destin — pointer to structure of request and reply keys
    rplbufp — pointer to reply message buffer structure
    size — number of bytes in entire reply message structure including header and message type ( long )

RETURN VALUE
    SUCCESS — "0" ( SUCCESS )
    FAILURE — "-1" ( ERROR ) system error during msg or sem oper
    "-2" ( TMOUT ) — requesting process already timed out waiting for reply

DESCRIPTION

This utility function is used by the destination process to send the reply to the requesting process. The reply message is deposited on the destination process'es reply queue. There are three cases for the reply:
- no reply expected by requesting process
- there is no reply message sent and the function returns immediately with "SUCCESS" status
- reply expected by requesting process
- reply message is sent to the reply message queue to be retrieved by the requesting process who is waiting to receive it
- reply with timeout expected by requesting process
- first the timeout semaphore is checked to see if requesting process has already timed out or not if the requesting process is still waiting, the semaphore is signalled to prevent the requesting process from timing out, and the reply message is sent to the reply message queue. If the requesting process has already timed out as
indicated by the semaphore, the semaphore is
returned back to the semaphore pool, no reply
message is sent and the function returns with the
"TMOUT" error status

NAME request — Function to request a module, providing
           appropriate error detection with a
           simplified set of return statuses.

SYNTAX request (module, cmd, ti, v)

TAKES AS ARGUMENTS struct msgs *module —    module who is to be
                                       requested
    int cmd — request of the process
    int ti —  timeout for the reply
    int v —   verbose mode flag

RETURN CODES

TMOUT    — Timed out waiting on reply from the
                module.
    ERROR    — System or other fatal error.
    WARNING — Module replied properly, but it gave an
                error.
    SUCCESS — Reply from module indicated success.

DESCRIPTION

The "request" function is used to simplify
the operation of requesting a module when the
expectation is that that module will reply within some
timeout. The function provides the calling program a
simplified call without compromising error detection
and handling.

The module is requested, with its reply
checked for size. In the event that a reply is not
available within the specified timeout, an error is given to the standard error output and an appropriate status is returned to the calling function. In the event that a reply was received, but that the errflg did not indicate success, an error is printed at the standard error output and a warning status is given to the calling function. If a system error occurred, or the size of the reply was not appropriate, an error status is returned with appropriate reporting at the standard error output. If all goes well, the returned status indicates this event and nothing is printed at the standard error output.

NAME retspool -    return semaphore back to the semaphore pool

SYNTAX

```
#include \wkcell/token.h/
#include \wkcell/pcom.h/
int retspool (semelmpt)
struct semkeyid * semelmpt;
```

INPUT PARAMETERS semelmpt -    pointer to semaphore element structure containing semaphore pool id, semaphore key and id

RETURN VALUE

SUCCESS - "0"  ( SUCCESS )
    FAILURE - "-1" ( ERROR )

DESCRIPTION

This utility function returns the semaphore element structure back to the semaphore pool. The semaphore element structure is comprised of: semaphore pool id, semaphore key and semaphore id. The semaphore element structure is sent to the message queue ( semaphore pool ) and is appended to the tail of the queue. This function must be executed by the process after it finishes using the semaphore in order to make it available for use by other processes.

NAME rmmsg —    remove message queue

SYNTAX include \wkcell/token.h/
    #include \wkcell/pcom.h/
    int rmmsg (msgnam)
    key_t msgnam;

INPUT PARAMETERS msgnam —   message queue key name

RETURN VALUE

SUCCESS — "0" ( SUCCESS )
    FAILURE — "−1" ( ERROR )

DESCRIPTION

This utility function removes the specified
message queue from the system.  Any messages that
might still be on the queue will be lost.  All
processes that are waiting to receive message from
this queue will return from "msgrcv" system call with
an error indication.

NAME rmsem —    remove semaphore

SYNTAX include \wkcell/token.h/
    #include \wkcell/pcom.h/
    int rmsem (semnam)
    key_t semnam;

INPUT PARAMETERS semnam —   semaphore key name

RETURN VALUE

SUCCESS — "0" ( SUCCESS )
    FAILURE — "−1" ( ERROR )

DESCRIPTION

This utility function removes the specified semaphore from the system. All processes waiting on that semaphore will return with an error indication

NAME rmshm — remove shared memory segment and associated semaphore

SYNTAX

```
#include \wkcell/token.h/
#include \wkcell/pcom.h/
int rmshm (shmadr, shmnam, shmsem)
char far *shmadr;
key_t shmnam;
key_t shmsem;
```

INPUT PARAMETERS shmnam — shared memory segment key name
    shmsem — shared memory segment access semaphore key name

RETURN VALUE

SUCCESS — "0" ( SUCCESS )
    FAILURE — "-7" ( ERMSHM ) — error in removing the shared memory segment
        "-8" ( ERMSEM ) — error in removing the semaphore arbitrating access to shared mem

DESCRIPTION

This utility function removes specified shared memory segment and the associated semaphore arbitrating access to the shared memory segment.

NAME rmsmpool — remove specified semaphore pool message queue and all semaphores associated with the pool

SYNTAX include \wkcell/token.h/
    #include \wkcell/pcom.h/
    int rmsmpool (poolnam, fsemnam, lsemnam)
    key_t poolnam;
    key_t fsemnam;
    key_t lsemnam;

INPUT PARAMETERS poolnam — semaphore pool message queue name
    fsemnam — key name of first semaphore in the pool
    lsemnam — key name of last semaphore in the pool

RETURN VALUE

SUCCESS — "0" ( SUCCESS )
    FAILURE — "-9" ( ERMPOOL ) — error in removing the semaphore pool message queue
    "-8" ( ERMSEM ) — error in removing semaphores associated with the pool

DESCRIPTION

This utility function removes the semaphore pool message queue and all the semaphores constituting the pool. First, the attempt is made to remove the message queue. If it fails, the function returns with the error "-9" ( ERMPOOL ) without any further attempts to remove semaphores. If it succeds, the function then attempts to remove all semaphores constituting the pool. In case of any errors there, it returns with the error status "-8" ( ERMSEM ). If there are no errors, the function returns successfully with the return status "0" ( SUCCESS )

NAME rqnorp — request a process, do not wait on the reply

SYNTAX include \wkcell/token.h/
    #include \wkcell/pcom.h/
    int rqnorp (destin, comnd, bufpt, size)
    struct rqkey *destin;
    int comnd;

```
    struct ipcmsg *bufpt;
    int size;
```

INPUT PARAMETERS destin — pointer to structure of request and reply msg keys of the destination process comnd — command for destination process bufpt — pointer to request message buffer structure size — size in bytes of the request structure including header and message type ( long )

RETURN VALUE

SUCCESS — "0" ( SUCCESS )

FAILURE — "-1" ( ERROR ) — system error during msg operation

"-3" ( MSGFULL ) — request message queue full

DESCRIPTION

This utility function requests specified destination process to perform an action as indicated by the command parameter. The request has a form of a message containing all necessary information for the destination process. The message is sent to the destination process'es request message queue. When the destination process receive the message from the queue, it then performs the requested action. The requesting process does not require any reply to be sent back by the destination process, and therefore it can proceed without any interruption. The destination process after performing the operation can simply go back to wait for another request to arrive at its request queue.

NAME rqrp —     request a process, wait indefinitely for the reply

SYNTAX

```
#include \errno.h/
#include \wkcell/token.h/
#include \wkcell/pcom.h/
extern int errno;
int rqrp (destin, comnd, rqbufp, rplbufp, size)
struct rqkey *destin;
int comnd;
struct ipcmsg *rqbufp;
struct ipcmsg *rplbufp;
int size;
```

INPUT PARAMETERS destin — pointer to structure of request and reply msg keys of the destination process comnd — command for destination process rqbufp — pointer to request message buffer structure rplbufp — pointer to reply message buffer structure size — size in bytes of the request structure including header and message type ( long )

RETURN VALUE

SUCCESS — positive integer — number of bytes received in reply message excluding msg type ( long )

FAILURE — "−1" ( ERROR ) — system error during msg operation

"−3" ( MSGFULL ) — request message queue full

"−4" ( MSGOVFL ) — message overflow on receiving the reply message

DESCRIPTION

This utility function requests specified destination process to perform an action as indicated by the command parameter. The request has a form of a message containing all necessary information for the destination process. The message is sent to the destination process'es request message queue. When the destination process receives the message from the queue, it then performs the requested action. The requesting process requires a reply message to be sent back by the destination process. The function will suspend the requesting process for an indefinite period of time until the reply message comes back from the destination process. The wait on reply is implemented as a message receive from the destination process'es reply message queue. Two separate buffers should be provided for this function call, one for the request message and one for the reply message.

NOTE : use of this function has a potential for creating a deadly embrace situation, where in case the destination process never sends any reply for whatever reason, the requesting process will be suspended forever never resuming execution. To avoid this situation the function "rqrpti" (request a process wait on reply with timeout) can be used.

NAME rqrpti — request a process, wait on the reply with timeout

SYNTAX

```
#include \errno.h/
#include \signal.h/
#include \wkcell/token.h/
#include \wkcell/pcom.h/
extern int errno;
int rqrpti    (destin, comnd, rqbufp, rplbufp,
                size, timeout)
```

```
struct rqkey *destin;
int comnd;
struct ipcmsg *rqbufp;
struct ipcmsg *rplbufp;
int size;
int timeout;
```

INPUT PARAMETERS destin   –   pointer to structure of request and reply msg keysof the destination process comnd   –   command for destination process rqbufp   –   pointer to request message buffer structure rplbufp   –   pointer to reply message buffer structure size   –   size in bytes of the request structure includingheader and message type ( long )

timeout   –   timeout value in seconds for waiting on reply

RETURN VALUE

SUCCESS – positive integer – number of bytes received in reply message excluding msg type (long)

FAILURE – "–1" ( ERROR ) – system error during msg operation

"–2" ( TMOUT ) – timed out waiting on reply from destination process

"–3" ( MSGFULL ) – request message queue full

"–4" ( MSGOVFL ) – message overflow on receiving the reply msg from destination process "–5" ( POOLEMPTY ) – semaphore pool is empty

DESCRIPTION

This utility function requests specified destination process to perform an action as indicated by the command parameter. The request has a form of a
message containing all necessary information for the
destination process. The message is sent to the
destination process'es request message queue. When
the destination process receives the message from the
queue, it then performs the requested action. The
requesting process requires a reply message to be sent
back by the destination process within the time period
as specified by the timeout value. The function will
suspend the requesting process until the reply is
received or timeout expires. Wait on reply is
implemented as a message receive from the destination
processes' reply message queue. Timeout feature is
implemented by using the system function "alarm()." and
the semaphore from the semaphore pool. The semaphore
is used to synchronize operation of both requesting
and destination processes when timeout occurs. Mainly
it prevents the destination process from sending the
reply message after the requesting process timed out
and is not waiting on a reply any more. This function
will not cause a deadly embrace situation in case the
destination process never comes back with the reply,
and therefore should be used in most situations when a
process requests another process to perform some
action or provide service.

NAME send_reply −   function to reply from a module

SYNTAX send_reply (module, stat, v)

TAKES AS ARGUMENTS struct msgs *module −   module who is replying
    int stat −   setting of errflg in reply
    int v −   verbose mode flag RETURN CODES
    WARNING — Usage error or other warning
    ERROR   — Fatal; failure DESCRIPTION
NAME
    sgsem —    signal semaphore SYNTAX
    #include \wkcell/token.h/
    #include \wkcell/pcom.h/
    int sgsem (sem_nam)
    key_t sem_nam;

INPUT PARAMETERS
    sem_nam — semaphore key name

RETURN VALUE
    SUCCESS — "0" ( SUCCESS )
    FAILURE — "−1" ( ERROR ) —    system error during
                                  sem operation DESCRIPTION
        This function unlocks access to the resource
which is being governed by the specified semaphore.
If there are any processes waiting to gain access to
the resource, "sgsem" causes the process which is next
in line on the semaphore's queue to be rescheduled for
execution. Otherwise if there are no processes
waiting to get access to the resource, "sgsem" leaves
the resource unlocked, so that next call to "wsem"
family of utilities will immediately lock up the
resource for exclusive use by the calling process.
"sgsem" function must be called by a process after it
finished using the shared resource to make it
available to all other processes vying for access.
Failure to do so would permanently lock up the shared
resource and make it unavailable for access by all the
other processes in the system.

NAME tread — read from specified file or device with timeout

SYNTAX

```
#include \signal.h/
#include \errno.h/
#include \wkcell/token.h/
extern int errno;
int tread (fildes, buf, nbyte, timeout)
int fildes;
char * buf;
unsigned nbyte;
int timeout;
```

INPUT PARAMETERS fildes — file or device descriptor
    buf — pointer to a character buffer
    nbyte — max number of bytes to read
    timeout — timeout value in seconds

RETURN VALUE

SUCCESS — number of bytes actually read
    FAILURE — "−1" ( ERROR ) — system error during read operation
    "−2" ( TMOUT ) — timed out waiting on read completion

DESCRIPTION

This utility function provides enhanced file and peripheral device read capability. It provides the timeout capability, such that if the read is not completed within the timeout limit as specified in seconds, the read is aborted and proper error indication returned to the caller. If the read successfully completes, the function returns the number of bytes actually read from the file or device.

NAME twrite — write to specified file or device with timeout

SYNTAX

```
#include \signal.h/
#include \errno.h/
#include \wkcell/token.h/
extern int errno;
int twrite (fildes, buf, nbyte, timeout)
int fildes;
char * buf;
unsigned nbyte;
int timeout;
```

INPUT PARAMETERS fildes — file or device descriptor
    buf — pointer to a character buffer
    nbyte — number of bytes to write
    timeout — timeout value in seconds

RETURN VALUE

SUCCESS — number of bytes actually written
    FAILURE — "−1" ( ERROR ) —   system error during write operation
                  "−2" ( TMOUT ) —   timed out waiting on write completion

DESCRIPTION

This utility function provides enhanced file and peripheral device write capability. It provides the timeout capability, such that if the write is not completed within the timeout limit as specified in seconds, the write is aborted and proper error indication returned to the caller. If the write successfully completes, the function returns the number of bytes actually written to the file or device.

NAME wreq —    wait on request from another process

SYNTAX include \wkcell/token.h/
    #include \wkcell/pcom.h/
    int wreq (destin, rqbufp)
    struct rqkey *destin;
    struct ipcmsg *rqbufp;

INPUT PARAMETERS destin —  pointer to structure of request and reply key names
    rqbufp —  pointer to request message buffer structure

RETURN VALUE

SUCCESS — positive integer — number of bytes received in request message excluding message type ( long )
    FAILURE — "−1" ( ERROR ) — system error during msg operation

DESCRIPTION

This utility function enables a process to wait on execution request from another process. If there are no requests pending on the request queue, the function will suspend the calling process until a request message is received. When this happens, the process is rescheduled for execution. After resuming execution, the process checks the command and based on that enters its application specific section of code to service that particular request.

NAME wreqti — wait on request from another process with timeout

SYNTAX

```
#include \wkcell/token.h/
#include \signal.h/
#include \errno.h/
#include \wkcell/pcom.h/
extern int errno;
int wreqti (destin, rqbufp, timeout)
struct rqkey *destin;
struct ipcmsg *rqbufp;
int timeout;
```

INPUT PARAMETERS destin — pointer to structure of request and reply key names rqbufp — pointer to request message buffer structure timeout — timeout value in seconds

RETURN VALUE

SUCCESS — positive integer — number of bytes received in request message excluding message type ( long )

FAILURE — "−1" ( ERROR ) — system error during msg operation

"−2" ( TMOUT ) — timed out waiting on request

DESCRIPTION

This utility function enables a process to wait on execution request from another process. If there are no requests pending on the request queue, the function will suspend the calling process until a request message is received or timeout expires. When this happens the process is rescheduled for execution. In case the request was received, the process checks the command and enters its application specific code. In case of timeout, the function returns with error. Handling of that condition will be application specific.

NAME writeti — write to specified file or device with timeout

SYNTAX

```
#include \signal.h/
#include \errno.h/
#include \wkcell/token.h/
#include \wkcell/laser.h/
extern int errno;
extern int wccerr:
int writeti (fildes, buf, nbyte, timeout)
int fildes;
char * buf;
unsigned nbyte;
int timeout;
```

INPUT PARAMETERS fildes — file or device descriptor
    buf — pointer to a character buffer
    nbyte — number of bytes to write
    timeout — timeout value in seconds

RETURN VALUE

SUCCESS — number of bytes actually written
    FAILURE — "−1" ( ERROR ) — system error during write operation
              "−2" ( TMOUT ) — timed out waiting on write completion

DESCRIPTION

This utility function provides enhanced file and peripheral device write capability. It provides the timeout capability, such that if the write is not completed within the timeout limit as specified in seconds, the write is aborted and proper error indication returned to the caller. If the write successfully completes, the function returns the number of bytes actually written to the file or device.

NAME wsem —    wait on semaphore

SYNTAX

```
#include \wkcell/token.h/
#include \wkcell/pcom.h/
int wsem (sem_nam)
key_t sem_nam;
```

INPUT PARAMETERS sem_nam — semaphore key name

RETURN VALUE

SUCCESS — "0" ( SUCCESS )
FAILURE — "-1" ( ERROR ) —    system error during sem operation

DESCRIPTION

This utility function attempts to gain access to a resource being arbitrated by the specified semaphore. If the semaphore is "BUSY" ( resource locked by another process ), the function suspends the calling process until the resource becomes available, perhaps indefinitely. One or more processes may be put to sleep on a queue of waiting processes in FIFO order until the process which currently has access to the resource frees it up by executing "sgsem" ( signal semaphore ) call. On successful return from "wsem" function call, the resource will be locked up by the calling process. Each access to the shared resource must be bracketed by "wsem" and "sgsem" function calls. It means, that in order for a process to gain an exclusive access to the resource, it must first execute "wsem" function call; upon successful return the process may proceed with using the resource, after the process finishes using the resource, it must then call "sgsem" function to unlock the resource for other processes to use.

NAME wsemti — wait on semaphore with timeout

SYNTAX

```
#include \signal.h/
#include \errno.h/
#include \wkcell/token.h/
#include \wkcell/pcom.h/
extern int errno;
int wsemti (sem_nam, timeout)
key_t sem_nam;
int timeout;
```

INPUT PARAMETERS sem_nam — semaphore key name
    timeout — timeout value in seconds

RETURN VALUE

SUCCESS — "0" ( SUCCESS )
    FAILURE — "-1" ( ERROR ) —   system error during sem operation
              "-2" ( TMOUT ) —   timed out waiting on semaphore

DESCRIPTION

This utility function attempts to gain access to a resource being arbitrated by the specified semaphore. If the semaphore is "BUSY" ( resource locked by another process ), the function suspends the calling process until the resource becomes available
or until timeout expires. One or more processes may
be put to sleep on a queue of waiting processes in
FIFO order until the process which currently has
access to the resource frees it up by executing
"sgsem" ( signal semaphore ) call. On successful
return from "wsem" function call, the resource will be
locked up by the calling process. In case the timeout
expires before the resource becomes available, the
function returns with the timeout error indication.
Each access to the shared resource must be bracketed
by "wsemti" and "sgsem" function calls. It means,
that in order for a process to gain an exclusive
access to the resource, it must first execute "wsemti"
function call; upon successful return the process may
proceed with using the resource, after the process
finishes using the resource, it must then call "sgsem"
function to unlock the resource for other processes to
use.

Appendix F
PDATA Manual Pages

MACROS type *ASALLOC(type)

type — Type of user stack record.
        Returns pointer to user allocation.
        void ASUNALLOC(p0)
            type *p0;
            p0 — Pointer to (prior) user allocation.
    Macro does not return a meaningful value.

bool ASEMPTY(as)
    ASTACK as;
        as — Array stack to check.
        Returns:
        TRUE  — Stack is empty.
        FASLSE — Stack is non-empty.
    char *ASTOP(as)

```
    ASTACK as;
    as - Array stack to return top of.
Returns pointer to user portion of top element.

int ASPOP(as)
    ASTACK as;
    as - Array stack to pop.
    Returns:
    ERROR   - Stack could not be popped, it was
              empty.
    SUCCESS - Stack popped.

type *BSTALLOC(type)
    type - Type of user element.
Returns pointer to user allocation.
        void BSTUNALLOC(p0)
        type *p0;
        p0 - Pointer to (prior) user element
             allocation.
Macro does not return a meaningful value.

SETUSED(flag, ctl)
        bool flag;
        unsigned ctl;
        flag - Boolean indicating 'used' of 'free'
        ctl - Control of block being set.
Macro does not return a meaningful value.

SETSIZE(size, ctl)
        int size;
        unsigned ctl;
        size - Integral size of block.
        ctl - Control of block being set.
Macro does not return a meaningful value.

bool USED(ctl)
```

```
        unsigned ctl;
        ctl - Control of block being checked.
Returns:
TRUE  - Block is in use.
FALSE - Block is available for allocation.
        int SIZE(ctl)
        unsigned ctl;
        ctl - Control of block whose size is returned.
        Returns size of the block exclusive of the
header and footer, but inclusive of the free list
offsets.

type *SLLALLOC(type)
        type - Type of user element.
Returns pointer to user allocation, or NULL if memory
is full.

char *SLLHEAD(sll)
    SLLIST sll;
        sll - List whose head is to be returned.
Returns pointer to the head element, or NULL if there
is none.

void SLLUNALLOC(p0)
        type *p0;
        p0 - Pointer to prior user allocation.
Macro does not return a meaningful value.

void SLLMAKECUR(eltp, sll)
        type *eltp;
        SLLIST sll;
        eltp -   Pointer to user part of already
                 linked in list cell.
        sll  -   List in which the element was
                 previously linked.
Macro does not return a meaningful value.
```

```
char *SLLCURRENT(sll)
    SLLIST sll;
    sll - List whose current is to be returned.
```
Returns a pointer to the current list element, or NULL if there is none.

```
char *SLLPEEK(sll)
    SLLIST sll;
    sll - List whose element after current is to
```
be returned.
Returns a pointer to the element after the current list element, or NULL if there is none.

```
void SBSTKEY(key, eltp)
    FARCHAR key;
    type far *eltp;
    key -     String within the element's segment
              which is to serve as the element's
              key.
    eltp -    Pointer to element requiring the
              key.
```
Macro does not return a meaningful value.

```
SBSTOFFSET far *FINDROOT(segptr)
FARCHAR segptr;
    segptr -Pointer to segment in which to look
    for the primary tree.
```
Returns a pointer to the offset of the segment's primary tree.

```
int SBSTRELEASE(segptr, sem)
    FARCHAR segptr;
    key_t sem;
    segptr - Pointer to segment of tree.
    sem - Key of semaphore arbitrating access to
    the segment.
```
Returns as pcom(deshm).

```
    type far *sBSTALLOC(segptr, type)
        FARCHAR segptr;
        segptr - Pointer to next-fit memory pool.
        type - Type of user element.
```
Returns a pointer to the user allocation, or NULL if the memory pool is full.

```
    void sBSTUNALLOC(segptr, p0)
        FARCHAR segptr;
        type far *p0;
        segptr - Pointer to next-fit memory pool from
        which allocation was made.
        p0 - Pointer returned from prior allocation.
```
Macro does not return a meaningful value.

```
    SSLLOFFSET far *FINDSSLL(segptr)
        FARCHAR segptr;
    segptr   - Pointer to segment containing the list
               as primary.
```
Returns a pointer to the offset of the segment's primary list.

```
    int SSLLRELEASE(segptr, sem)
        FARCHAR segptr;
        key_t sem;
        segptr - Pointer to segment of list.
        sem - Key of semaphore arbitrating access to
list.
```
Returns as pcom(deshm).

```
    type far *sSLLALLOC(segptr, type)
        FARCHAR segptr;
        segptr - Pointer to next-fit memory pool.
        type - Type of user element.
```
Returns a pointer to the user allocation or NULL if the pool is full.

```
void sSLLUNALLOC(segptr, p0)
    FARCHAR segptr;
    type far *p0;
    segptr - Pointer to next-fit memory pool.
    p0 - Pointer returned from prior allocation.
Macro does not return a meaningful value.

FARCHAR sSLLHEAD(offset, base)
    SSLLOFFSET offset;
    FARCHAR base;
    offset    - Offset of list whose head is to
                be returned.

base      - Base from which offset is
                calculated.
Returns a pointer to the head element or NULL if there
is one.

void sSLLMAKECUR(eltp, offset, base)
    type far *eltp;
    SSLLOFFSET offset;
    FARCHAR base;
    eltp - Pointer to element already linked
    within list.
    offset - Offset of list.
    base - Base from which offset is calculated.
Macro does not return a meaningful value.

FARCHAR sSLLCURRENT(offset, base)
    SSLLOFFSET offset;
    FARCHAR base;
    offset- Offset of list whose current is to be
    returned.
    base - Base from which offset is calculated.
Returns a pointer to the current element, or NULL if
there is none.
```

FUNCTIONS

NAME

ASflush: Flush an array stack.

SYNTAX include \wkcell/AS.h/
   void ASflush (asp)
   ASTACK *asp;

TAKES AS ARGUMENTS asp — Pointer to array stack.

RETURN CODES

The function does not return a meaningful value.

DESCRIPTION

The function first exhausts any elements left on the stack, then frees the memory of the stack itself.

SEE ALSO

ASpush

NAME

ASpop: Pop an element off of a stack that has been implemented as an array.

SYNTAX include \wkcell/AS.h/
   char *ASpop (as)
   ASTACK as;

TAKES AS ARGUMENTS as — array stack element is to be popped from

RETURN CODES

Function returns a pointer to the element popped, NULL if the stack does not exist or is empty.

DESCRIPTION

The function checks first if the stack given it is NULL, then if it is empty; if either is the case the function returns the NULL pointer. Otherwise, the element at the top of the stack is returned and the stack cursor is incremented to reflect one less element.

The code for the function is trivial and might more efficiently be implemented as a macro.

SEE ALSO

ASpush

NAME

ASpush: Push an element onto a stack that has been implemented as an array.

SYNTAX

```
#include \wkcell/AS.h/
int ASpush (eltp, asp)
char *eltp;
ASTACK *asp;
```

TAKES AS ARGUMENTS eltp - pointer to element to be pushed
asp  - pointer to array stack on which element is
       to be pushed

RETURN CODES

SUCCESS - Element has been pushed successfully.
ERROR   - The stack was full.

DESCRIPTION

The function first checks to see if the stack exists; i.e. if the stack is NULL. If so, space for the stack itself is allocated. Then, a pointer to the element is copied to the stack and the stack's 'top' cursor is updated.

SEE ALSO
    ASpop
NAME
    BSTdelete: Delete a node from a linked binary search tree.

SYNTAX
    #include \wkcell/BST.h/
    void BSTdelete (key, bstp)
    char *key;
    BSTREE *bstp;

TAKES AS ARGUMENTS
    key  - key of element to be deleted.
    bstp - (initially) root of tree containing the elt.

RETURN CODES
    Function does not return a meaningful value.

DESCRIPTION
    This algorithm is due to Aho, Hoppcroft, and Ullman, pp.158-9.

SEE ALSO
    sBSTdelete, SBSTdelete
NAME
    BSTfind: Find an element with a particular key in
             a linked binary search tree.

SYNTAX
    #include \wkcell/BST.h/
    char *BSTfind (key, bst)
    char key[];
    BSTREE bst;

TAKES AS ARGUMENTS
    key - character string considered as the key.
    bst - node of the tree in which to search.

RETURN CODES

Returns pointer to the element found or the NULL pointer if no element in the tree has the required key.

DESCRIPTION

BSTfind operates by recursively examining the node given it. If it is NULL, the function returns NULL (ie, no element in the tree has the required key).

If the node given it is not NULL, it checks the key against that of the node for lexicographic equivalence. If it is not equal, the appropriate subtree is traversed. If it is equal, the function returns a link to the node.

SEE ALSO

BSTinsert, BSTinorder

NAME

BSTflush: Used to flush a binary search tree.

SYNTAX

```
#include \wkcell/BST.h/
void BSTflush (bstp)
BSTREE *bstp;
```

TAKES AS ARGUMENTS bstp — Pointer to the node from which to flush.

RETURN CODES

Function does not return a meaningful value.

DESCRIPTION

The function operates by recursively flushing its left and right sub-trees, and then by freeing the memory used by the initial node passed to it.

SEE ALSO

SBSTflush

NAME

BSTinorder: Used to traverse a tree in inorder, applying a function to each node.

SYNTAX

```
#include \wkcell/BST.h/
int BSTinorder (bst, function, flag, faileltpp)
BSTREE bst;
int (*function)();
int flag;
char **faileltpp;
```

TAKES AS ARGUMENTS bst — Tree to be traversed.
function — Function to be performed at each node.
flag — 2nd argument passed to "function".
faileltpp — Pointer to pointer to element on which the "function" failed (if it failed).

RETURN CODES

As returned by the "function" argument. Note that "faileltpp" is also used as a mechanism of return.

DESCRIPTION

The function applies the "function" given as argument recursively to all nodes below the node given, including the node given. It traverses the tree in inorder, i.e. it traverses the left sub-tree, then applies the "function" to the parent (the node given it intitially), then traverses the right sub-tree (invoking itself recursively).

Everything continues so long as the "function" returns SUCCESS. If the "function" returns something else, "BSTinorder" returns that value. Additionally, "BSTinorder" sets a pointer to the element on which the "function" failed. The "faileltpp" argument has no meaning if the "function" does not fail.

Two arguments are passed to the "function": a pointer to the node's element, and the "flag" that was passed to "BSTinorder". The "flag" is not otherwise used within "BSTinorder".

SEE ALSO
    BSTfind, BSTinsert, SBSTBSTinorder

NAME
    BSTinsert: Insert an element with a particular key into a linked binary search tree.

SYNTAX
    #include \wkcell/BST.h/
    int BSTinsert (eltp, bstp)
    char *eltp;
    BSTREE *bstp;

TAKES AS ARGUMENTS
    eltp - Pointer to the element to be inserted.
    bstp- Pointer to the tree node under which element is to be inserted.

RETURN CODES
    SUCCESS - The element has been inserted into the tree; its key is new to the tree.
    WARNING - The key of the element was not new to the tree, other element data has superseded prior element data for the key.

DESCRIPTION
    BSTinsert operates by recursively examining the node given it.
    If it is NULL, it adds another, thereby adding the element in the appropriate leaf of the binary search tree.
    If the node given it is not NULL, it checks the key against that of the node for lexicographic equivalence. If it is not equal, the appropriate subtree is traversed. If it is equal, the function links in the new element and frees the old.

The function returns an indication of whether the element is redefined or new.

SEE ALSO

BSTfind, BSTinorder

NAME

NFMalloc: Next-fit allocate in a shared segment.

SYNTAX

```
#include \wkcell/NFM.h/
FARCHAR NFMalloc (memptr, blocksize)
FARCHAR memptr;
int blocksize;
```

TAKES AS ARGUMENTS memptr - starting address of the pool.
blocksize - size required for allocation.

RETURN CODES

User pointer if block may be allocated.
NULL if segment full.

DESCRIPTION

Adapted from p. 598 Knuth Vol. 1

Note that the size available for allocation, as obtained from a block's header, includes the free-list offsets. Because of this, it is not possible to allocate a block of less than the size of the two offsets, because if it is ever liberated the room for the offsets will be needed.

SEE ALSO

NFMinit, NFMfree

NAME

NFMfree: Next-fit liberation of a previous allocation.

SYNTAX

```
#include \wkcell/NFM.h\
void NFMfree (memptr, p0)
FARCHAR memptr;
FARCHAR p0;
```

TAKES AS ARGUMENTS memptr — pointer to the pool from which the allocation was made.

p0 — user pointer to block to free.

RETURN CODES

Function does not return a meaningful value.

DESCRIPTION:

Adapted from p. 442 Knuth Vol. 1 (with modification to modify 'rover' as appropriate).

SEE ALSO

NFMalloc, NFMinit

NAME

NFMinit: Used to initialize a memory pool according to next-fit convention.

SYNTAX

```
#include \wkcell/NFM.h\
void NFMinit (memptr, memsize)
FARCHAR memptr;
int memsize;
```

TAKES AS ARGUMENTS memptr — pointer to the pool to be initialized.

memsize — size of pool.

RETURN CODES
   Function does not return a value.

DESCRIPTION
   The function writes a header/footer used as the header of the avail list, as well as the header/footer or the first free block. It initializes the "avail" list head, as well as the roving pointer (the rover is what distinguishes the "next-fit" scheme from "first-fit").

After initialization, a map of the segment looks like this:
   !1!2! 3 ! 4 ! 5 !        6          ! 7 !8!

1 — Offset to the first available block, initialized to point to 3.
   2 — Offset to the so-called "next" available block, initialized to point to 3.
   3 — Header of a special block supporting the allocation and liberation schemes. It is peculiar as follows:
       It is considered the "first available block", so that the allocation algorithm can tell when the rover is going around for a second time (which is not desired).
       It's size is zero so that the allocation routine doesn't gobble it up (if it were allocated it couldn't serve the first listed use).
       It is marked as "used", so that coalescence during liberation doesn't gobble it up (again, so that it sticks around).
   4 — Footer for the absurd block mentioned above.
   5 — The first "real" block, i.e. the first which may be allocated. Its size is 'fullsize' less all this messy overhead. In particular, region 5 is the header for the block, and the block's size is calculated as the available size of the block. (The available size INCLUDES the space used by the free-list offsets when the block is free.)
6 — The usable (i.e., allocatable) stuff.
7 — Footer for the block of 5 and 6.
8 — A "dummy" header ctl, used to support the liberation scheme — to allow liberation of the very first block allocated. The ctl is just used to appear as a used block to the right of the first allocated block.

SEE ALSO
    NFMallocate, NFMfree

NAME
    SBSTalloc: Allocate memory for an element for use in a linked, shared, binary search tree.

SYNTAX
    #include \wkcell/SBST.h/
    FARCHAR SBSTalloc (name, sem, segp, blocksize)
    key_t name, sem;
    FARCHAR *segp;
    int blocksize;

TAKES AS ARGUMENTS
name—   Name of segment from which allocation is to occur.
sem —   Semaphore designated to the segment.
segp—   Pointer to storage of the pointer to the segment; not to be used by the calling function except in that it should be passed to the subsequent SBSTinsert or SBSTunalloc.
blocksize — Size of the block to be allocated (no need to worry about any overhead — its all taken care of).

RETURN CODES
    Returns pointer to the memory allocated, or:
    NULL if the named memory pool is full.

PTRERR if the was a problem accessing the segment within the time out (i.e., might be a time out, or worse). NOTE: if PTRERR is returned, it is also possible that it was due to a problem de-accessing the segment, which is only done in the event that the memory pool is full. One can not readily discern between the two situations as currently implemented.

DESCRIPTION

This function allocates for the programmer a block of the required size from the named segment. In so doing, it seeks access to the segment; upon return it maintains access to the segment so that modifications to the allocated block may be made. The function sets the segment pointer for use in the subsequent SBSTinsert or SBSTunalloc. This pointer should not be modified in any way between this and the insert or unalloc — it is required to bracket code which modifies data in the shared tree according to convention so that there is no corruption of the data and to ensure proper synchronization of concurrent processes.

An important exception is that the segment is de-accessed in the event that the pool was full; therfore, if this function returns the null pointer, it also returns the segment pointer as null and an attempt to insert or unalloc will cause a segmentation violation.

SEE ALSO
    SBSTfind, SBSTinsert, SBSTunalloc

NAME
    SBSTfind: Find an element with a particular key in a linked, shared, binary search tree.

SYNTAX
    #include \wkcell/SBST.h/
    FARCHAR SBSTfind (key, seg, sem, segp)

```
char key[];
key_t seg, sem;
FARCHAR *segp;
```

TAKES AS ARGUMENTS
    key  – character string considered as the key.
    seg  – Name of the segment of the tree.
    sem  – Semaphore arbitrating access to the named segment.
    segp – Pointer to storage for the pointer to the segment; not to be used by the calling function except in that it should be passed to the subsequent SBSTrelease.

RETURN CODES
    Generally as returned by sBSTfind, or:
    PTRERR if there was a problem accessing the segment within the timeout (i.e., might be a timeout, or it might be worse). NOTE: if PTRERR is returned, it is also possible that it was due to an error deaccessing the segment, which is only done in the event that no record is found with the required key. One can not readily discern between the two situations as currently implemented.

DESCRIPTION
    This function tries to find a record with the specified key within the tree located in the named segment. In so doing, it seeks access to the segment; upon return it maintains access to the segment so that modifications may be made to the record. The function also sets the segment pointer for use in a (required) subsequent call to the macro SBSTrelease. This pointer should not be modified in any way between this and the release – it is required to bracket code which accesses/modifies data in the shared tree according to convention so that there is no possibility to corrupt the data, and to ensure proper synchronization between processes which use it.

An important exception is that the segment is de-accessed without an explicit call to SBSTrelease if no record with the key is found; therefore, if this function returns the NULL pointer, it also returns the segment pointer as NULL and an attempt to release the tree with the pointer will cause a segmentation violation and abort the process.

The primary responsibility of the function is handled by the function "sBSTfind".

SEE ALSO
    BSTfind, sBSTfind
NAME
    SBSTflush: Used to flush a segment's primary tree.

SYNTAX
    #include \wkcell/SBST.h\
    int SBSTflush (seg, sem)
    key_t seg, sem;

TAKES AS ARGUMENTS
    seg - Segment of the tree.
    sem - Semaphore arbitrating access to the segment.

RETURN CODES
    SUCCESS - All flushed!
    ERROR- Problem accessing or de-accessing segment (can't currently tell if you got so far as to flush).

DESCRIPTION
    This function flushes the primary tree of a segment. In so doing, it seeks access to the segment; after flushing, it releases the segment for other processes.

The primary responsibility, that of flushing, is handled by the function "sBSTflush".

SEE ALSO
    sBSTflush

NAME
    SBSTinit:    Initialize a shared binary search tree memory pool.

SYNTAX
    #include \wkcell/SBST.h/
    int SBSTinit (name, sem)
    key_t name, sem;

TAKES AS ARGUMENTS
    name —key of the segment used by the tree,
    sem  — key of the semaphore arbitrating access to the named segment.

RETURN CODES
    ERROR — Error creating/accessing/de-accessing the segment.

DESCRIPTION
    The function is quite simple, essentially just hiding the underlying IPC and Next-Fit memory functions from the cavalier users of shared binary search trees.
    It also sets up the root offset to be zero (i.e., tree nonexistant).

SEE ALSO
    SBSTfind, SBSTinsert, NFMinit

NAME
    SBSTinorder:  Used to traverse a shared segment's tree in inorder, applying a function to each node.

SYNTAX
    #include \wkcell/SBST.h/

```
int SBSTinorder (seg, sem, function, flag,
faileltpp)
        key_t seg, sem;
        int (*function)();
        int flag;
        FARCHAR *faileltpp;
```

TAKES AS ARGUMENTS seg         —       Segment in which the tree is located.

sem        —       Semaphore used to arbitrate access to the segment.

function   —       Function to be performed at each node.

flag       —       2nd argument passed to "function".

faileltpp —       Pointer to pointer to element on which the "function" failed (if it failed).

RETURN CODES

Generally as returned by "sBSTinorder".

The return could be other than SUCCESS in two other situations (given below); to discern whether the return is due to the causes below, an additional test on the "faileltpp" must be made (i.e., if it is NULL, than the causes given below apply):

ERROR —    Error (or timeout) accessing or de-accessing segment.

DESCRIPTION

The function uses "sBSTinorder" for the traversal.

Before starting to traverse the tree, access to the segment obtained, and upon completion the segment is released. Thus, the process which uses this function has sole access to the segment during the entire traversal.

SEE ALSO

BSTinorder, sBSTinorder, SBSTfind, SBSTinsert

NAME

SBSTinsert: Insert an element with a particular key into a linked, shared, binary search tree.

SYNTAX

```
#include \wkcell/SBST.h/
int SBSTinsert (eltp, segptr, sem)
    FARCHAR eltp;
    FARCHAR segptr;
```

TAKES AS ARGUMENTS eltp — Pointer to the element to be inserted.
segptr — Pointer to the segment from which prior allocation was made.
sem — Semaphore arbitrating access to the segment.

RETURN CODES

Generally as returned by sBSTinsert, or:
ERROR — Error accessing or deaccessing the segment.

DESCRIPTION

This function inserts a previously allocated node into the primary tree of a shared segment. It assumes access to the tree's segment was obtained at time of allocation, and upon return from this function, de-access from the segment has been accomplished (i.e., this function does it). The actual insert is done by the recursive function "sBSTinsert".

SEE ALSO

BSTinsert, sBSTinsert

NAME

SBSTunalloc: Erradicate a previous allocation for a shared binary search tree node.

SYNTAX include \wkcell/SBST.h/
    int SBSTunalloc (eltp, segptr, sem)
        FARCHAR eltp;
        FARCHAR segptr;

TAKES AS ARGUMENTS eltp   — Pointer to the element to be
             "un-allocated".
    segptr — Pointer to the segment from which prior
             allocation was made.
    sem    — Semaphore arbitrating access to the
             segment.

RETURN CODES

SUCCESS — Memory returned and segment de-accessed.
    ERROR   — Error deaccessing the segment.

DESCRIPTION

This function frees a previously allocated node in a shared segment. It assumes access to the segment was obtained at time of allocation, and upon return from this function, de-access from the segment has been accomplished (i.e., this function does it).

SEE ALSO

SBSTalloc, sBSTunalloc, NFMfree

NAME

SLLappend:    Function to append an element after
                  the 'current' element in a
                  singly-linked list.

SYNTAX include \wkcell/SLL.h/
    int SLLappend (eltp, sllp)
    char *eltp;
    SLLIST *sllp;

TAKES AS ARGUMENTS
    eltp —Pointer to the element to be appended.
    sllp — Pointer to the list to which the element is
        added.

RETURN CODES
    SUCCESS — Element appended.
    ERROR   — List's "current" was null.

DESCRIPTION
        SLLappend first checks to see if the list is
existant.  If not, the list is created and the element
added as the first element on the list.  Otherwise,
the element is appended after the previous 'current'
element, but before the one immediately following.
        In either case, the newly added element
assumes 'current' status for the particular list.

SEE ALSO
    SLLwalk, SSLLappend

NAME
    SLLfirst:       Return a pointer to the first
                    element in a singly-linked list and
                    make it current.

SYNTAX
    #include \wkcell/SLL.h/
    char *SLLfirst (sll)
        SLLIST sll;

TAKES AS ARGUMENTS
    sll — List from which first is to be plucked.

RETURN CODES
        Returns pointer to the element found, or NULL
pointer if list was empty.

DESCRIPTION

If the list is empty, the NULL pointer is returned. Otherwise, the list's 'head' is returned and made the new current.

SEE ALSO sSLLfirst, SLLnext, SLLwalk

NAME

SLLnext: Return a pointer to the next element in a singly-linked list and make it current.

SYNTAX include \wkcell/SLL.h/
char *SLLnext (sll)
SLLIST sll;

TAKES AS ARGUMENTS sll - List from which next is to be plucked.

RETURN CODES

Returns pointer to the element found, or NULL pointer if list was empty.

DESCRIPTION

If the list is empty, the NULL pointer is returned. Otherwise, the 'current's 'next' is returned and made the new current. An exception is that if there is no 'next', i.e. it is NULL, then 'current' is set to NULL.

SEE ALSO sSLLnext, SLLfirst, SLLwalk

NAME

SLLpush: Function to append an element after the 'current' element in a singly-linked list.

SYNTAX include \wkcell/SLL.h/

```
void SLLpush (eltp, sllp)
char *eltp;
SLLIST *sllp;
```

TAKES AS ARGUMENTS
    eltp -  Pointer to the element to be appended.
    sllp -  Pointer to the list to which the element
            is added.

RETURN CODES
        The function does not return a value.

DESCRIPTION
        SLLpush first checks to see if the list is
existant. If not, the list is created and the element
added as the first element on the list. Otherwise,
the element is inserted as the new 'head' element.
The 'current' remains unchanged, unless of course the
list itself was created in which case the 'current'
becomes the element pushed.

SEE ALSO
    SLLappend, SLLwalk
NAME
    SLLserve:       Used to recognize service of the
                    head element of a list by removing
                    it from the list. This allows the
                    list to function as a queue.

SYNTAX
```
#include \wkcell/SLL.h/
void SLLserve (sllp)
SLLIST *sllp;
```

TAKES AS ARGUMENTS
    sllp - List from which element was served.

RETURN CODES

The function does not return a meaningful value.

DESCRIPTION

SLLserve functions by unlinking the head element, if there is one, and checking to see if list is now empty. If this has had the effect of making the list empty, the list header itself is freed.

SEE ALSO

SLLappend, sSLLserve

NAME

SLLunlink: Used to unlink the element after the 'current' element on a list. Generally used with SLLPEEK.

SYNTAX

```
#include <wkcell/SLL.h>
int SLLunlink (sllp)
SLLIST *sllp;
```

TAKES AS ARGUMENTS sllp – List from which element was served.

RETURN CODES

SUCCESS – Element unlinked.
ERROR   – No such element on list to unlink.

DESCRIPTION

SLLunlink functions by verifying that the required element is on the list, then unlinking it from the list. The memory used by the unlinked element is freed.

SEE ALSO

SLLappend, sSLLunlink

NAME

SLLwalk: Used to walk a singly-linked list, applying a function to each cell.

SYNTAX

```
#include <wkcell/SLL.h>
int SLLwalk (sll, function, flag)
SLLIST sll;
int (*function)();
int flag;
```

TAKES AS ARGUMENTS sll — List to walk.
function — Function to be applied at each cell.
flag — 2nd argument passed through to "function".

RETURN CODES

As returned by the "function" argument. Note that the list's 'current' will be changed if the return is other SUCCESS.

DESCRIPTION

SLLwalk operates by applying the "function" to all cells in the named list, starting with the head of the list and working its way down. Provided the "function" returns SUCCESS, the next cell is used, until the list has been fully walked. In the event that the function returns something other than SUCCESS, however, SLLwalk returns the value after setting the list's 'current' to the element upon which the "function" returned something other than SUCCESS.

Two arguments are passed to "function": a pointer to the cell's element, and a "flag" that was passed to SLLwalk. The "flag" is not otherwise used by SLLwalk.

SEE ALSO

SLLappend, SSLLwalk

NAME

SSLLalloc:    Allocate memory for an element for use in a shared, singly-linked list.

SYNTAX

```
#include \wkcell/SSLL.h/
FARCHAR SSLLalloc (name, sem, segp, blocksize)
key_t name, sem;
FARCHAR *segp;
int blocksize;
```

TAKES AS ARGUMENTS name —    Name of segment from which allocation is to occur.

sem—      Semaphore designated to the segment.

segp —    Pointer to storage of the pointer to the segment; not to be used by the calling function except in that it should be passed to the subsequent SSLLappend or SSLLunalloc.

blocksize — Size of the block to be allocated (no need to worry about any overhead — its all taken care of).

RETURN CODES

Returns pointer to the memory allocated, or:
NULL if the named memory pool is full.
PTRERR if the was a problem accessing the segment within the time out (i.e., might be a time out, or worse). NOTE: if PTRERR is returned, it is also possible that it was due to a problem de-accessing the segment, which is only done in the event that the memory pool is full. One can not readily discern between the two situations as currently implemented.

DESCRIPTION

This function allocates for the programmer a block of the required size from the named segment. In so doing, it seeks access to the segment; upon return
it maintains access to the segment so that
modifications to the allocated block may be made. The
function sets the segment pointer for use in the
subsequent SSLLappend or SSLLunalloc. This pointer
should not be modified in any way between this and the
append or unalloc - it is required to bracket code
which modifies data in the shared list according to
convention so that there is no corruption of the data
and to ensure proper synchronization of concurrent
processes.

An important exception is that the segment is
de-accessed in the event that the pool was full;
therfore, if this function returns the null pointer,
it also returns the segment pointer as null and an
attempt to append or unalloc will cause a segmentation
violation.

SEE ALSO
    SBSTalloc, SSLLappend, SSLLunalloc

NAME
    SSLLappend: Append an element to a shared,
singly-linked, list.

SYNTAX
    #include \wkcell/SSLL.h/
    int SSLLappend (eltp, segptr, sem)
    FARCHAR eltp;
    FARCHAR segptr;
    key_t sem;

TAKES AS ARGUMENTS
    eltp   - Pointer to the element to be appended.
    segptr - Pointer to the segment from which prior
             allocation was made.
    sem    - Semaphore arbitrating access to the
             segment.

RETURN CODES
    SUCCESS — Elt appended.
    ERROR   — Error deaccessing the segment.

DESCRIPTION

This function appends a previously allocated node into the primary list of a shared segment. It assumes access to the list's segment was obtained at time of allocation, and upon return from this function, de-access from the segment has been accomplished (i.e., this function does it). The actual append is done by the function "sSLLappend".

SEE ALSO
    SSLLalloc, sSLLappend

NAME
    SSLLfirst:    Function to return the first
                  element from a shared,
                  singly-linked list, and make it
                  current.

SYNTAX
    #include \wkcell/SSLL.h/
    FARCHAR SSLLfirst (seg, sem, segp)
    key_t seg, sem;
    FARCHAR *segp;

TAKES AS ARGUMENTS
    seg  —  Name of the segment of the list.
    sem  —  Semaphore arbitrating access to the named
            segment.
    segp —  Pointer to storage for the pointer to the
            segment; not to be used by the calling
            function except in that it should be
            passed to the subsequent SSLLRELEASE.

RETURN CODES
        Generally as returned by sSLLfirst, or:

PTRERR if there was a problem accessing the segment within the timeout (i.e., might be a timeout, or it might be worse). NOTE: if PTRERR is returned, it is also possible that it was due to an error deaccessing the segment, which is only done in the event that there was no first elt (i.e., empty list). One can not readily discern between the two situations as currently implemented.

DESCRIPTION

This function tries to return a pointer to the first elt on a list located in the named segment. In so doing, it seeks access to the segment; upon return it maintains access to the segment so that modifications may be made to the elt. The function also sets the segment pointer for use in a (required) subsequent call to the macro SSLLRELEASE. This pointer should not be modified in any way between this and the release — it is required to bracket code which accesses/modifies data in the shared list according to convention so that there is no possibility to corrupt the data, and to ensure proper synchronization between processes which use it. (See NOTE below, however, for a subtlety.)

An important exception is that the segment is de-accessed without an explicit call to SSLLRELEASE if there is no first elt; therefore, if this function returns the NULL pointer, it also returns the segment pointer as NULL and an attempt to release the list with the pointer will cause a segmentation violation and abort the process.

The primary responsibility of the function is handled by the function "sSLLfirst".

IMPORTANT NOTE: If more than one process walks (either explicitly or implicitly) the list at a time, the integrity of the list's "current" pointer is not guaranteed from the point of view of the processes. This is because the list only has one (1)

"current" pointer; separate notions of "current" for each process is not currently supported. This functionality is provided along with SSLLnext, in addition to SSLLwalk, however, to allow multiple processes to work on different parts of the list concurrently without having to walk the entire list or otherwise limit access to the list.

SEE ALSO
    SSLLwalk, SSLLnext, sSLLfirst

NAME
    SSLLinit: Initialize a shared, singly-linked list.

SYNTAX
    #include \wkcell/SSLL.h⫽
    int SSLLinit (name, sem)
    key_t name, sem;

TAKES AS ARGUMENTS
    name — key of the segment used by the list.
    sem  — key of the semaphore arbitrating access
           to the named segment.

RETURN CODES
    ERROR — Error creating/accessing/de-accessing the
            segment.

DESCRIPTION
        The function is quite simple, essentially just hiding the underlying IPC and Next-Fit memory functions from the cavalier users of shared lists.
        It also sets up the list head and current pointers to be NULL.

SEE ALSO
    SBSTinit, SSLLappend

NAME

SSLLnext: Function to return the next element from a shared, singly-linked list, and make it current.

SYNTAX

```
#include \wkcell/SSLL.h/
FARCHAR SSLLnext (seg, sem, segp)
    key_t seg, sem;
    FARCHAR *segp;
```

TAKES AS ARGUMENTS seg — Name of the segment of the list.
sem — Semaphore arbitrating access to the named segment.
segp — Pointer to storage for the pointer to the segment; not to be used by the calling function except in that it should be passed to the subsequent SSLLRELEASE.

RETURN CODES

Generally as returned by sSLLnext, or:
PTRERR if there was a problem accessing the segment within the timeout (i.e., might be a timeout, or it might be worse). NOTE: if PTRERR is returned, it is also possible that it was due to an error deaccessing the segment, which is only done in the event that there was no "next" elt. One cannot readily discern between the two situations as currently implemented.

DESCRIPTION

This function tries to return a pointer to the "next" elt on a list located in the named segment. In so doing, it seeks access to the segment; upon return it maintains access to the segment so that modifications may be made to the elt. The function also sets the segment pointer for use in a (required) subsequent call to the macro SSLLRELEASE. This pointer should not be modified in any way between this and the release — it is required to bracket code which accesses/modifies data in the shared list according to convention so that there is no possibility to corrupt the data, and to ensure proper synchronization between processes which use it. (See NOTE below, however, for a subtlety.)

An important exception is that the segment is de-accessed without an explicit call to SSLLRELEASE if there is no "next" elt; therefore, if this function returns the NULL pointer, it also returns the segment pointer as NULL and an attempt to release the list with the pointer will cause a segmentation violation and abort the process.

The primary responsibility of the function is handled by the function "sSLLnext".

IMPORTANT NOTE: If more than one process walks (either explicitly or implicitly) the list at a time, the integrity of the list's "current" pointer is not guaranteed from the point of view of the processes. This is because the list only has one (1) "current" pointer; separate notions of "current" for each process is not currently supported. This functionality is provided along with SSLLfirst in addition to SSLLwalk, however, to allow multiple processes to work on different parts of the list concurrently without having to walk the entire list or otherwise limit access to the list.

SEE ALSO
    SSLLwalk, SSLLfirst, sSLLnext

NAME

SSLLunalloc:    Erradicate a previous allocation for a shared binary search list elt.

SYNTAX include \wkcell/SSLL.h/
    int SSLLunalloc (eltp, segptr, sem)
    FARCHAR eltp;
    FARCHAR segptr;

TAKES AS ARGUMENTS eltp   - Pointer to the element to be "un-allocated".
    segptr - Pointer to the segment from which prior allocation was made.
    sem    - Semaphore arbitrating access to the segment.

RETURN CODES

SUCCESS - Memory returned and segment de-accessed.
    ERROR   - Error deaccessing the segment.

DESCRIPTION

This function frees a previously allocated elt in a shared segment. It assumes access to the segment was obtained at time of allocation, and upon return from this function, de-access from the segment has been accomplished (i.e., this function does it).

SEE ALSO

SSLLalloc, sSLLunalloc, NFMfree

NAME

SSLLwalk:    Used to walk a shared segment's singly-linked list from first to last, applying a function to each elt.

SYNTAX

```
#include \wkcell/SSLL.h/
int SSLLwalk (seg, sem, function, flag)
key_t seg, sem;
int (*function)();
int flag;
```

TAKES AS ARGUMENTS seg —    Segment in which the tree is located.

sem —    Semaphore used to arbitrate access to the segment.

function—    Function to be performed at each node.

flag —    2nd argument passed to "function".

RETURN CODES

Generally as returned by "sSLLwalk".

The return could be other than SUCCESS in two other situations (given below); to discern whether the return is due to the causes below, an additional test on the list's "current" must be made (i.e., if it is NULL, than the causes given below apply):

ERROR —  Error (or timeout) accessing or de-accessing segment.

DESCRIPTION

The function uses "sSLLwalk" for the walk.

Before starting to walk the list, access to the segment obtained, and upon completion the segment is released. Thus, the process which uses this function has sole access to the segment during the entire walk.

SEE ALSO sSLLwalk, SSLLappend

NAME
    sBSTdelete:    Delete a node from a linked,
                   shared, binary search tree.
    ASSUMES ACCESS TO THE TREE HAS ALREADY BEEN
    OBTAINED.

SYNTAX
    #include \wkcell/SBST.h/
    void sBSTdelete (key, offsetp, base, segptr)
        char *key;
        SBSTOFFSET far *offsetp;
        FARCHAR base;
        FARCHAR segptr;

TAKES AS ARGUMENTS
    key       -    key of element to be deleted.
    offsetp   -    pointer to offset of tree from
                   which to delete.
    base      -    base from which offset is relevant.
    segptr    -    segment from which memory for the
                   elt was allocated.

RETURN CODES
    Function does not return a meaningful value.

DESCRIPTION
        This algorithm is a modified version of Aho,
Hoppcroft, and Ullman, pp.158-9.

SEE ALSO
    BSTdelete, SBSTdelete

NAME
    sBSTfind:      Find an element with a particular
                   key in a linked, shared, binary
                   search tree.
        ASSUMES ACCESS TO THE TREE HAS ALREADY BEEN
        OBTAINED.

SYNTAX include \wkcell/SBST.h/
    FARCHAR sBSTfind (key, offset, base)
        char key[];
        SBSTOFFSET offset;
        FARCHAR base;

TAKES AS ARGUMENTS key    − character string considered as the key.
    offset − offset to tree node to start the search
             from.
    base   − base from which offset is calculated.

RETURN CODES

Returns pointer to the element found, or NULL pointer if no element in the tree has the required key.

DESCRIPTION

The function operates by recursively examining the node given it. If it is NULL, the function returns NULL (ie, no element in the tree has the required key). If the node given it is not NULL, it checks the key against that of the node for lexicographic equivalence. If it is not equal, the appropriate subtree is traversed. If it is equal, the function returns a link to the node.

SEE ALSO

BSTfind, SBSTfind
NAME
    sBSTflush:     Used to flush a shared binary
                   search tree.

SYNTAX include \wkcell/SBST.h/
    void sBSTflush (offsetp, base, segptr)
    SBSTOFFSET far *offsetp;
        FARCHAR base;

FARCHAR segptr;

TAKES AS ARGUMENTS
    offsetp — Pointer to offset where flush is to start.
    base — Base from which offset is calculated.
    segptr — Pointer to the segment in which the tree is located.

RETURN CODES
    Function does not return a meaningful value.

DESCRIPTION
    The function operates by recursively flushing its left and right sub-trees, and then by freeing the memory used by the initial node passed to it.

SEE ALSO
    SBSTflush

NAME
    sBSTinorder: Used to traverse a shared segment's tree in inorder, applying a function to each node.
    ASSUMES ACCESS TO THE SEGMENT ALREADY OBTAINED SYNTAX
```
#include \wkcell/SBST.h/
int sBSTinorder (offset, base, function, flag,
faileltpp)
SBSTOFFSET offset;
FARCHAR base;
int (*function)();
int flag;
FARCHAR far *faileltpp;
```

TAKES AS ARGUMENTS
    offset — Offset of node from which to start.

base        —   Base from which offset is
                calculated.
function    —   Function to be performed at each
                node.
flag        —   2nd argument passed to "function".
faileltpp   —   Pointer to pointer to element on
                which the "function" failed (if it
                failed).

RETURN CODES

Generally as returned by the "function" argument. Note that "faileltpp" is also used as a mechanism of return; it is non-NULL iff the "function" returned other than SUCCESS.

DESCRIPTION

The function applies the "function" given as argument recursively to all nodes in the tree starting from the node given. It traverses the tree in "inorder", i.e. it recursively traverses the left sub-tree, then applies the "function" to the parent, then traverses the right sub-tree. Everything continues so long as the "function" returns SUCCESS. If the "function" returns something else, "sBSTinorder" returns that value. Additionally, a pointer to the element on which the "function" failed is set. The "faileltpp" argument has no meaning if the "function" does not fail.

Two arguments are passed to the "function": a pointer to the node's element, and the "flag" that was passed to "sBSTinorder". The "flag" is not otherwise used within "sBSTinorder".

SEE ALSO

BSTinorder, SBSTinorder

NAME sBSTinsert:    Insert an element with a particular key into a linked, shared, binary search tree.

SYNTAX include \wkcell/SBST.h/ int sBSTinsert (eltp, offsetp, base, segptr)
        FARCHAR eltp;
        SBSTOFFSET far *offsetp;
        FARCHAR base;
        FARCHAR segptr;

TAKES AS ARGUMENTS

| | | |
|---|---|---|
| eltp | – | Pointer to the element to be inserted. |
| offsetp | – | Pointer to the offset of the tree from base. |
| base | – | Base of offset. |
| segptr | – | Pointer to the segment from which to free redefined nodes. |

RETURN CODES

| | | |
|---|---|---|
| SUCCESS | – | The element has been inserted into the tree; its key is new to the tree. |
| WARNING | – | The key of the element was not new to the tree, other element data has superseded prior element data for the key. |

DESCRIPTION

"sBSTinsert" operates by recursively examining the node given it, which is found by adding the offset to the base. A pointer to this offset is used such that this function may update its value. If the offset is 0, a node is added, thereby adding the element in the appropriate leaf of the binary search tree. If the node given it is not NULL, it checks the key against that of the node for lexicographic equivalence. If it is not equal, the appropriate subtree is traversed. If it is equal, the function links in the new element and frees the old.

The function returns an indication of whether the element is redefined or new.

SEE ALSO
    BSTinsert, SBSTinsert

NAME
    sSLLappend:    Function to append an element after the 'current' element in a shared, singly-linked list.

SYNTAX
    #include \wkcell/SSLL.h/
    int sSLLappend (eltp, offsetp, base, segptr)
    FARCHAR eltp;
    SSLLOFFSET far *offsetp;
    FARCHAR base;
    FARCHAR segptr;

TAKES AS ARGUMENTS
    eltp     —    Pointer to the element to be appended.
    offsetp  —    Pointer to offset of list.
    base     —    Base from which offset is calculated.
    segptr   —    Pointer to segment from which to allocate should list not yet exist.

RETURN CODES
    SUCCESS — Element appended.
    ERROR   — List's "current" was null.

DESCRIPTION sSLLappend first checks to see if the list is existant. If it is not, memory is allocated and it is made to contain the element. If it does exist but is empty, the element is added as the first on the list. Otherwise, the element is appended after the previous 'current' element, but before the one immediately following.

In either case, the newly added element assumes 'current' status for the particular list.

SEE ALSO

SSLLappend, SLLappend, sSLLwalk

NAME sSLLfirst: Return a pointer to the first element in a shared, singly-linked list and make it current.

ASSUMES ACCESS TO THE LIST HAS ALREADY BEEN OBTAINED.

SYNTAX

```
#include \wkcell/SSLL.h/
    FARCHAR sSLLfirst (offset, base)
    SSLLOFFSET offset;
    FARCHAR base;
```

TAKES AS ARGUMENTS offset − Offset to list from which first is to be plucked.

base − Base from which offset is to be calculated.

RETURN CODES

Returns pointer to the element found, or NULL pointer if list was empty.

DESCRIPTION

The function simply sets the 'current' to the 'head' and returns it. If the head is NULL, so be it.

SEE ALSO
    SSLLfirst

NAME
    sSLLnext:     Return a pointer to the next
                  element in a shared, singly-linked
                  list and make it current.
        ASSUMES ACCESS TO THE LIST HAS ALREADY BEEN
        OBTAINED.

SYNTAX
    #include \wkcell/SSLL.h/
        FARCHAR sSLLnext (offset, base)
        SSLLOFFSET offset;
        FARCHAR base;

TAKES AS ARGUMENTS
    offset - Offset of list from which next is to be
             plucked.
    base   - Base from which offset is calculated.

RETURN CODES
        Returns pointer to the element found, or NULL
pointer if list was empty.

DESCRIPTION
        If the list is empty, the NULL pointer is
returned. Otherwise, the 'current's 'next' is
returned and made the new current. An exception is
that if there is no 'next', i.e. it is NULL, then
'current' is set to NULL.

SEE ALSO
    SSLLnext, sSLLfirst, sSLLwalk

NAME
    sSLLserve:    Used to recognize service of the
                  head element of a shared list by
                  removing it from the list. This allows the list to function as a shared queue.

SYNTAX include \wkcell/SSLL.h/
    void sSLLserve (offsetp, base, segptr)
    SSLLOFFSET far *offsetp;
        FARCHAR base;
        FARCHAR segptr;

TAKES AS ARGUMENTS
    offsetp —    Pointer to offset of list from which to serve.
    base    —    Base from which offset is calculated.
    segptr  —    Pointer to segment from which served element was allocated.

RETURN CODES

The function does not return a meaningful value.

DESCRIPTION sSLLserve functions by unlinking the head element, if there is one, and checking to see if list is now empty. If this has had the effect of making the list empty, the list header itself is freed.

SEE ALSO
    SLLappend, ssSLLserve

NAME
    sSLLwalk:    Used to walk a shared, singly-linked list, applying a function to each element.

SYNTAX
    #include \wkcell/SSLL.h/

```
int sSLLwalk (offset, base, function, flag)
    SSLLOFFSET offset;
    FARCHAR base;
    int (*function)();
    int flag;
```

TAKES AS ARGUMENTS offset    —    Offset to list to walk.
    base      —    Base from which offset is
                   calculated.
    function  —    Function to be applied at each
                   element.
    flag      —    2nd argument passed through to
                   "function".

RETURN CODES

As returned by the "function" argument. Note that the list's 'current' will be changed if the return is other SUCCESS.

DESCRIPTION sSLLwalk operates by applying the "function" to all cells in the named list, starting with the head of the list and working its way down. Provided the "function" returns SUCCESS, the next cell is used, until the list has been fully walked. In the event that the function returns something other than SUCCESS, however, sSLLwalk returns the value after setting the list's 'current' to the element upon which the "function" returned something other than SUCCESS.

Two arguments are passed to "function": a pointer to the cell's element, and a "flag" that was passed to sSLLwalk. The "flag" is not otherwise used by sSLLwalk.

SEE ALSO

SSLLwalk, sSLLnext, sSLLappend

NAME

SubSym:       "Link-Step" function for "store"

SYNTAX

```
int SubSym (field, length, symtbl, parsymtbl, id)
    char field[];
    BSTREE symtbl;
    BSTREE parsymtbl;
    char id;
```

TAKES AS ARGUMENTS

| | | |
|---|---|---|
| field | – | Character field. |
| length | – | Length of character field. |
| symtbl | – | Preferred symbol table. |
| parsymtbl | – | Symbol table for the step's "containing" script (i.e., distinct from the step's script). |
| id | – | De-reference character. |

RETURN CODES

SUCCESS – Field is reduced to its absolute value.
    WARNING – Symbol undefined.

DESCRIPTION

This function is used to perform iterative symbol substitution on the field given, looking first to the first symbol table given, and second to the "parsymtbl" given.

SEE ALSO

LS functions, IS functions

Appendix G
PTXT Manual Pages

NAME agetfield: Function to read and present fields, with allocation of buffers most flexible.

SYNTAX int agetfield (file, line, field_ptrs, buffer)
   char line[],
   *field_ptrs[],
   buffer[];
   FILE *file;

TAKES AS ARGUMENTS line    — Pointer to memory where source line is read.

field_ptrs — Array of pointers this function will set.

buffer — Pointer to memory where the parsed fields will be read.

file    — Previously opened file from which the input will be taken.

RETURN CODES

Returns EOF if end of file is read, otherwise the number of fields found on that line. Blank lines return 0.

WARNING

This function has no way to check if it is running beyond the size of the buffers, and it does not do so.

DESCRIPTION

Function reads from previously opened file (*file) the next line of data. The buffers 'buffer' and 'line' are updated; 'line' contains the entire line, null terminated. 'Buffer' contains each field, separated by the nulls that terminate each individually. The 'field_ptrs' array is updated with pointers into 'buffer' for each individual field.

Fields are separated by combinations of either tabs or spaces. Lines are delimited with newlines, and leading white space is ignored except that it is included in the 'line' buffer exactly as it was in the input line (it is not part of the first field). It is recommended that the standard getfield be used if it is not important to retain the information in the buffers between calls — i.e., if the required fields are to be copied from the buffers elsewhere, or the processing is such that the data is not required for later processing, use 'getfield'.

SEE ALSO
    getfield, sgetfield

NAME:
    bsrvrtbl:   Builds a table of machines associated
                with the server specified.

SYNTAX
    BSTREE bsrvrtbl (server, v)
    char *server;
    int v;

TAKES AS ARGUMENTS
    server  -   server named for which table is to be
                loaded
    v       -   verbose mode flag.

RETURN CODES:
    BSTREE  -   pointer to the newly created tree.
    ERROR   -   fatal error.

DESCRIPTION

This function will build a table that specifies the machines associated with this server such that they may be initialized and their port assignment may be soft-coded.

NAME getfield: Function to read and present fields.

SYNTAX include \wkcell/getfield.h/
int getfield (gf_ptr);
GETFIELD gf_ptr;

TAKES AS ARGUMENTS gf_ptr - Pointer to the getfield argument/return structure.

RETURN CODES

Returns EOF if end of file is read, otherwise the number of fields found on that line. Blank lines return 0.

WARNING

Due to the dynamic allocation of the line and field_buffer, the function will bomb if more than one getfield structure is used.

DESCRIPTION

Function reads from previously opened file (*file) the next line of data. The pointers 'field buffer' and 'line' are updated; 'line' points to the entire line, null terminated. 'Field_buffer' points to memory where each field is written, separated by the nulls that terminate each individually. The 'field_ptrs' array is updated with pointers into 'field_buffer' for each individual field.

Fields are separated by combinations of either tabs or spaces. Lines are delimited with newlines, and leading white space is ignored except that it is included in the 'line' buffer exactly as it was in the input line (it is not part of the first field).

The maximum number of fields this function will read is MAXLINE; if more exist on the line they will remain unread.

An escape character is supported, allowing either field separators, or indeed newlines, to be 'escaped'.

NAME getscreen: Function to load a screen and collect data based on configurable field descriptions.

SYNTAX

```
#include \wkcell/getscreen.h/
int getscreen (frame, screen, field_arr)
char *frame;
char *screen;
struct field_desc *field_arr;
```

TAKES AS ARGUMENTS frame     — Base of structure for non-listed members.

screen    — Name of screen to use.

field_arr — Array of field descriptors for the screen.

RETURN CODES

SUCCESS — Successfully obtained data.

WARNING — Operator has chosen to abort the function.

ERROR   — An error occurred while attempting to get the data.

DESCRIPTION

The function is used to isolate programs from much of the 1st sections, option strings. In concert
with the "Advanced Field Attribute" capability of the
Unify forms package, it supports default values, range
checking, informational messages, and error messages.

FUNCTION GETTIME: Function to return the pointer to a
string containing the current system time.

Class: Callable Subroutine.

char *gettime ()

Return codes:

pointer to string with the time on success.
    pointer to the string "time unknown" on
    failure.

FUNCTION ITOA from page 60 of K+R

Class: Callable Subroutine.

int itoa (n, s)

char s[];

int n;

Function converts the integer n to its ASCII
character string representation in s. Uses
subroutine 'reverse'.

Return value not meaningful.

NAME load_SF: function to load data from a
    structured file.

SYNTAX load_SF (filespec, ptr, size, sem)

TAKES AS ARGUMENTS filespec — structured file to be read
    ptr — pointer to data structure to be loaded
    size — size in bytes of data block to be read
    sem — semaphore key protecting this file

RETURN CODES

SUCCESS  - On successful access and load.

TMOUT    - Unable to access the file within 15 seconds.

ERROR    - On error

NAME putfield: Function to put a field of data to the screen.

SYNTAX

```
#include \wkcell/getscreen.h/
void putfield (spec, num, target_type, frame)
Single spec;
int num;
TARGET_TYPE target_type;
char *frame;
```

RETURN CODES

This function does not return a meaningful value.

DESCRIPTION

This function is used to write an individual field, or a listed region, to the screen.

SEE ALSO putscreen, getscreen

NAME putscreen: Function to load a screen and put data to it according to a configurable description.

SYNTAX

```
#include \wkcell/getscreen.h/
int putscreen (frame, screen, field_arr)
char *frame;
char *screen;
struct field_desc *field_arr;
```

TAKES AS ARGUMENTS
    frame     — Base of structure for non-listed members.
    screen    — Name of screen to use.
    field_arr — Array of field descriptors for the screen.

RETURN CODES
    SUCCESS — Successfully displayed screen with data.
    ERROR   — An error occurred while attempting to put the data.

DESCRIPTION
    The function is used to isolate programs from much of the screen handling duties. It supports required fields, scrolled list sections, option strings. In concert with the "Advanced Field Attribute" capability of the Unify forms package, it supports default values, range checking, informational messages, and error messages.

SEE ALSO
    putfield, getscreen

NAME
    redraw: Function to redraw a listed screen region.

SYNTAX
    #include \wkcell/getscreen.h/
    void redraw (region, listp)
    Listed region;
    SLLIST *listp;

RETURN CODES
    This function does not return a value.

FUNCTION REVERSE
   from page 59, K+R
   Class: Callable Subroutine.
      int reverse (s)
      char s[];
   Function to reverse the characters in string s.
   Return value not meaningful.

GETFIELD: FUNCTION TO READ STRINGS AND PRESENT FIELDS

Function reads from previously opened file (*file) the next line of data. The buffers 'buffer' and 'line' are updated; 'line' contains the entire line, null terminated. 'Buffer' contains each field, separated by the nulls that terminate each individually. The 'field_ptrs' array is updated with pointers into 'buffer' for each individual field.

Fields are separated by combinations of either tabs or spaces. Lines are delimited with newlines, and leading white space is ignored except that it is included in the 'line' buffer exactly as it was in the input line (it is not part of the first field). Returns EOF if end of file is read, otherwise the number of fields found on that line. Blank lines return 0.

NAME
   shmcpy: function to write/read shared memory from/to local memory.

SYNTAX
   shmcpy (memptr, shmadr, flag, size)

TAKES AS ARGUMENTS
   memptr  — pointer to local memory.
   shmadr  — address of a segment to which the calling function has previously gained access.
   flag    — 'R' for reading the shared memory; 'W' for writing.
   size    — Number of bytes to transfer.

RETURN CODES
    SUCCESS - Success.
    ERROR   - Fatal error, failure.

NAME
    spx_strcpy - function to copy a string excluding the null.

SYNTAX
    spx_strcpy(str1, str2, n)
    char *str1, *str2;
    int n;
    TAKES AS ARGUMENTS
    str1 - destination string
    str2 - source string
    n - number of characters to copy RETURN CODES
    none Appendix H Script Operation Referenced

ASK

OVERVIEW

The "ask" script operation is used to obtain from the operator a response to be checked against an expected response. It is useful for both prompting an operator during the process and verifying that the operator and the system agree with regard to the question posed.

ASSEMBLE-TIME

This function accepts the following operation:
"Ask <console> {<prompt>} <expected response> [<scrop>]"

Where:

console — console to which question will be directed;

prompt  — arbitrary prompt string(s), may include assemble- and/or run-time symbols;

expected response — string expected back from the console;

scrop   — script operation to execute in the event that the response received differed from that which was expected.

Assemble-time substitutions typically are for either the prompt strings or the expected response. No verification of the "ask" operation is performed, except that performed for the conditionally executed script operation.

RUN-TIME

Entails prompting a message and seeking a response. If the response does not match the expected response, the specified operation is executed.

BRACE

OVERVIEW

The "}" script operation is used to close a block of script operations that had been opened by a "repeat". It takes no arguments, and implies a loop-forever unless broken by other means.

ASSEMBLE-TIME

This function accepts the following operation:
    "}"

No assemble-time symbol substitution is performed.

Verification of the "}" operation consists of ensuring proper block nesting, and that the block that this closes was opened with a "repeat".

RUN-TIME

The "}" is an alternative way to close a "repeat" loop; implying that the loop be re-executed indefinitely unless broken by other means.

CHECK-FOR

OVERVIEW

The "check-for" script operation is used for internal WIP station synchronization, based on the flow of material through the stations of the cell. Generally, this is useful to synchronize either on delivery of raw materials and/or to pause processing at a station until processing at a prior station on the material's route within the cell has reached an appropriate station of completion.

ASSEMBLE-TIME

This function accepts the following operation: "Check-for <status> <station>"

Where:
    status  — Status that the station must have in order to continue.
    station — Name of the station which must have the mentioned status AND have the correct lot.

Assemble-time substitution may be used for the station name.

Verification of the "check-for" operation consists of validating that the named station exists and that the status value given is recognizable.

RUN-TIME

Entails waiting on materials of the proper type to arrive at the specified station, and further for the station to assume the specified status.

DEFINE

OVERVIEW

The "#define" script operation is used to specify the value that an assemble-time token is to assume. This is generally used to pass arguments to subroutine scripts, or to tokenize "magic numbers" that are used within a script. Assemble-time tokens are also useful in that they improve the readability of scripts.

ASSEMBLE-TIME

This function accepts the following operation:
"define <token> <value>"

Specifically, for "define" operations, this function makes an allocation for the token; it is not inserted into the symbol table until the second pass, however.

No assemble-time substitutions are made until parameters "define"d are actually used.

Assemble-time operation of the "define" entails adding the value given for the token to the symbol
table, for use in subsequent assembly.

RUN-TIME

"Define"s are no-ops at run-time (i.e., they are
ignored).

DOWNLOAD

OVERVIEW

The "download" script operation is used to
download bulk information, such as programs and
data files, to controllers which are capable of
receiving data organized as files.

ASSEMBLE-TIME

"Download <file> <machine> [&]"

Assemble-time substitutions typically are for the
file and machine names.

Verification of the "download" operation consists
of verifying access to the named file and ensuring
that the machine is of a type compatible with file
dnloads.

RUN-TIME

Entails downloading the specified file to the
specified machine. If this is done in the
background, script execution will proceed without
waiting for the download to complete.

EJECT

OVERVIEW

The "#eject" script operation is a directive which instructs the assembler to insert a formfeed character into the listing file at a point in the listing. This operation is not added to the memory image of the script which interpreters use.

ASSEMBLE-TIME

This function accepts the following operation:
"Eject"

"Eject"s are used during the assembly to generate a page break in the list file.

RUN-TIME

"Eject"s are no-ops at run-time (i.e., they are ignored).

EXEC

OVERVIEW

The "exec" script operation is used to spawn a process for use by a specified program. This operation may be used if programs written for highly application specific requirements need to be invoked at a point in the script.

This operation may be performed in the background. If it is, the interpreter will not wait for the spawned process to exit. The default, however, is that the interpreter will wait for the spawned process to exit.

"Exec" differs from "shell" in that "exec" assumes the specified program to be a binary, rather than a shell script.

ASSEMBLE-TIME

This function accepts the following operation:
"Exec <command> [&]"

Assemble-time substitution may be used for the command.

No verification of the "exec" operation is done.

RUN-TIME

Entails use of the "fork" and "exec" system services, thus establishing a new process and causing it to execute the named executable file. This may be done in the background, in which case script execution continues without waiting for the spawned process to exit. If it is done in the foreground, script interpretation will be suspended until the spawned process exits.

EXTRACT-SET

OVERVIEW

The "extract-set" script operation is used to extract values from the database into the run-time symbol table. These values are then accessible using run-time tokens. "Extract-set" will take from the specified parameter set and table values for the listed parameters. Parameters listed, therefore, must be part of the named parameter set; and value records must already have been posted to the database.

ASSEMBLE-TIME

>    This function accepts the following operation:
>    "Extract-set <parameter set>\
>        U|L|J|T|S { \
>        <parm> <mach> <token> }"
>
> Where:
>   parameter set  — Set of parameters from
>                    which to extract values;
>   U|L|J|T|S      — Desired augmentor;
>
>   and zero or more triples of:
>     parm  — parameter from the set to extract;
>     mach  — machine of the parameter;
>     token — name of the symbol to define by
>             virtue of the extraction.

When no triples are given, all parameters in the set are extracted, with tokens fabricated as the concentration of each parameter's name and machine. If any triples are given, values are extracted only for those parameters that are listed.

Assemble-time substitutions typically are for the parmset name, parameter or machine names, or tokens. The appropriate structure is built in the parameter segment, thus freezing in the parameter set makeup.

Verification of the "extract-set" operation consists of verifying that the parameter set and listed parameters exist. This occurs as a by-product of building the parameter segment structures.

RUN-TIME

> Entails extraction of the named parameters from
> the named set, with key augmentation specified.
> Values for these parameters are added to the
> run-time symbol table, accessible by the specified
> token.

GOTO

OVERVIEW

The "goto" script operation is used to cause
control to branch to the designated step. The
step must be in the same script as the "goto"
operation.

A particularly important use of the operation
is when it is used in conjunction with a "when"
operation. When used in this fashion, normal
script flow may be altered or broken off upon
receiving an important event.

ASSEMBLE-TIME

> This function accepts the following operation:
> "Goto <label>"

Assemble-time substitution may be used for the
label. The assembly freezes in the labelled
step's number and name of the current script.

Verification of the "goto" operation ensures that
a step with the label is present.

RUN-TIME

> Causes a branch in the course of execution to
> another step of the script. Typically, branches
> may only occur within the same script; an exception to this is that if a "goto" is specified as the operation of a "when", it is possible to jump out of a child script in response to the event.

IGNORE

OVERVIEW

The "ignore" script operation is used to disable an event. It is not important whether the event had been previously enabled, but typical usage is to "ignore" events which had previously enabled, either by virtue of a "when" or a background "notice".

ASSEMBLE-TIME

This function accepts the following operation:
"Ignore <event> <machine>"

Assemble-time substitution may be used for the event or machine names. The assembly establishes a link to the event in the appropriate event tracker's table.

Verification of the "ignore" operation is by virtue of finding the event in the tracker's table.

RUN-TIME

If the named event had been enabled previously, by a background "notice" or by a "when", then it will be disabled. If it hadn't been enabled, the "ignore" has no effect.

INDEX

OVERVIEW

The "index" script operation is used to increment the value of a numeric quantity at a WIP station.

ASSEMBLE-TIME

This function accepts the following operation:
"Index unit <quantity> <amount>"

Assemble-time substitution may be used for the station name.

Verification of the quantity operation is by virtue of validating that the station exists.

RUN-TIME

Entails incrementing the "unit" designator at the station of context by "amount".

INTERPRET

OVERVIEW

The "interpret" script operation is used to interpret a subroutine script. It is possible to do this as "deeply" as necessary. This operation may be considered as a mechanism to allow procedures which are used in many places, or by many scripts, to be written just once.

ASSEMBLE-TIME

This function accepts the following operation:
"Interpret <scriptspec>"

Specifically, for "interpret" operations, this function recurses ScrPass1 for the specified script, having the effect of hanging another steplist in the position of the current step.

Assembly consists of recursing the assembly process for the named, now considered child, script. The assemble-time symbol table, but not the label table or block stack, is provided to the child script.

Verification of the "interpret" operation consists of the recursive verification of the child script.

RUN-TIME

Entails executing the named script, making the current run-time symbol table, and active when-event list, available to the child script.

ISSUE-SET

OVERVIEW

The "issue-set" script operation is used to cause data from the database to be written out to a machine. More precisely, it causes the values of parameters in a parameter set to be written to the common memory area of machines which use this type of interface.

ASSEMBLE-TIME

This function accepts the following operation:
"Issue-set <parameter set> \
    U|L|J|T|S [&]"

Where:
    parameter set — Set of parameters to issue;

U|L|J|T|S    — Desired augmentor;

Assemble-time substitution may be used for the parameter set name. The assembly builds appropriate structure in the parameter segment, thus freezing in the parameter set makeup.

Verification of the "issue-set" operation consists of verifying that the parameter set exists. This occurs as a by-product of building the parameter segment structures.

RUN-TIME
Entails transmitting the current values for each of the parameters in the set to appropriate machines. The keys used to access the database value records is augmented as specified. This operation may be done in the background, which means that script execution would continue without waiting for the interaction with the various machines to complete.

LOAD

OVERVIEW

The "load" script operation is used to record the transfer of materials from outside the workcell to a station in the workcell, and obtain data fed-forward from prior processing (generally for purposes of conditioning the process to be performed on the materials at this workcell).

ASSEMBLE-TIME

This function accepts the following operation:
"Load <status> <station> <file@router>"

Assemble-time substitution may be used for the station name, status, file, or router.

Verification of the "load" operation consists of validating that the named station exists and that the status value given is recognizable.

RUN-TIME

The operation operates by gaining access to the material management database to obtain data relative to the station addressed by the argument list. The interpreter waits for the specified station to assume an "empty" status, and when it does, data descriptive of the loaded materials is obtained from the specified router. Finally, the station is given the status indicated as argument.

NOTICE

OVERVIEW

The "notice" script operation is used to synchronize the script processing with an externally generated event. In the typical case, where "notice" is used in the foreground, script execution is suspended until the specified event is trapped by the event tracking subsystem.

"Notice" may also be used in the background. In this case, a trap for the event is set, but script execution is not suspended. This is useful if a "wait" is done later.

ASSEMBLE-TIME

This function accepts the following operation:
"Notice <event> <machine> [&]"

Assemble-time substitution may be done for event or machine. Assembly consists of setting a link to the event in the appropriate tracker's table.

Verification of the "notice" operation is by virtue of finding the event in the tracker's table.

RUN-TIME

Entails enabling the named event for the appropriate event tracker. The operation may be done in the background, which means that script execution will continue without actually waiting for the event to occur (perhaps rendezvousing with a later "wait"), but the more typical use is to do it in the foreground. This implies that after enabling the event, the script's execution is suspended until the event has indeed occurred.

PLOT-SET

OVERVIEW

The "plot-set" script operation is used to run an algorithm on the values of parameters in a set and to plot the results.

ASSEMBLE-TIME

This function accepts the following operation:
"plot-set <parameter set> \
    U|L|J|T|S <form> <algorithm> [&]"

Where:
- parameter set — Set of parameters to be plotted;
- U|L|J|T|S — Desired augmentor;
- form — Desired plotting format;
- algorithm — Algorithm to use prior to plotting.

Assemble-time substitution may be used for the
parameter set name, the form name, and/or the
algorithm name. Assembly consists of building the
appropriate structures in the parameter segment,
which for "plot-set" include both the parameter
set and the form data. Extractions from the form
set are made and it is then flushed. The function
pointer for the algorithm is found by looking for
its name in the link-time structure for that
purpose.

Verification of the "plot-set" operation consists
of verifying that the parameter set exists, and
  that it may be built. It is removed, however,
  since the plotting process will build it for
  itself as required.

RUN-TIME
   Entails requesting the plotter subsystem to
   analyze and plot the current values for the named
   parameter set. This operation may be done in the
   background, in which case script execution
   continues waiting for the plot to complete.

The plotter subsystem first prints according to
   the specified form, and then derives and plots a
   curve based on the output of the algorithm when
   applied to parameter value lists.

PROMPT

OVERVIEW
       The "prompt" script operation is used to
   annunciate a message to an operator. The
   annunciation console is passed as an argument so
   that it is possible to target messsages.

An arbitrary number of literals, assemble-time tokens, or run-time tokens may be used.

ASSEMBLE-TIME

This function accepts the following operation:
"Prompt <console> {<prompt}>"

Where:
- console — Console to which message is targeted;
- prompt — String to use in making up the message, may use arbitrarily many and may consist of assemble- and/or run-time symbols.

Assemble-time substitution may be used within the prompt message, or for the console used in the prompting.

Verification of the "prompt" operation consists of verifying that the console is valid.

RUN-TIME

Entails annunciating the message to the named console.

QUIT

OVERVIEW

The "quit" script operation causes an immediate break of script execution. It is unnecessary when placed as the last operation in the top-level script, but may be considered as useful to document what is intended.

ASSEMBLE-TIME

This function accepts the following operation:
"Quit"

"Quit" requires no assembly processing, save adequate listing.

RUN-TIME

The quit bubbles up through any parent scripts, causing script execution to complete. In conjunction with "when", it is possible to quit based on the occurrence of an event.

REPORT-SET

OVERVIEW

The "report-set" script operation is used to take data from a machine and add it to the database. More precisely, values for parameters in the named set are taken from a common area shared with the named machine and adds database records for these values.

The operation takes as argument the desired database table to use. This means that, depending on what table is specified, appropriate data will be added to the key for later use.

ASSEMBLE-TIME

This function accepts the following operation:
"Report-set <parameter set> \
    U|L|J|T|S [&]"

Where:

parameter set — Set of parameters to be
             reported;
U|L|J|T|S    — Desired augmentor.

Assemble-time substitution may be used for the
parameter set name. The appropriate structures
are built in the parameter segment, thus freezing
in the parameter set makeup.

Verification of the "report-set" operation
consists of verifying that the parameter set
exists. This occurs as a by-product of building
the parameter segment structures.

RUN-TIME

Entails requesting values for the parameters in
the set from their respective machines. Records
are made in the database for the values, with keys
augmented as specified. This operation may be
done in the background, in which case script
execution continues without waiting for this
operation to complete.

REPEAT

OVERVIEW

The "repeat" script operation is used to open
a block that will be repeated. That is, the
operations scripted between this operation and the
next "until" or "}" will be repeated according
to the rules specified in the block-closing
operation used.

ASSEMBLE-TIME

This function accepts the following operation:
"Repeat"

Verification of the "repeat" operation consists of
checking that it has a corresponding "until" or "}" (brace), and is performed not within this function, but rather within LSuntil (or LSbrace) (to verify existence of a corresponding repeat) and ScrPass2 (to verify that all "block opening" steps have been satisfied during the course of subsequent steps).

RUN-TIME

Opens a block of steps to be executed in loop fashion. The block may be closed either by an "until" which implies that the block will be iterated a finite number of times, or a "}" which implies that it will loop indefinitely (i.e., until broken by other means).

RESET

OVERVIEW

The "reset" operation resets WIP station parameter(s) to their known, initial, state(s).

ASSEMBLE-TIME

This function accepts the following operation:
"Reset <parameter> <station>"

Where:
parameter — Name of a WIP station parameter (such as "unit", "lot", "status", etc) or "all" to specify one or all of the WIP station parameters.

Assemble-time substitution may be used for the station name.

Verification of the "reset" operation consists of validating that the named station exists.

RUN-TIME

Entails setting the desired WIP station parameter to a reset state, i.e., zero (0) if the parameter is numeric or the empty string if alphanumeric. If the parameter is given as "all", all parameters are reset in this manner.

RUN

OVERVIEW

The "run" script operation is used to run application specific functions from within the script. The functions must be linked into the interpreter executable.

ASSEMBLE-TIME

This function accepts the following operation: "Run <function>"

Assemble-time substitution may be used for the function name.

Verification of the "run" operation consists of validating that it is among those that were linked in at time of system tailor.

RUN-TIME

Entails calling the named algorithm, passing descriptive arguments considered useful to a highly application specific function.

SET

OVERVIEW

The "set" script operation is used to set the value of a parameter at a WIP station.

ASSEMBLE-TIME

This function accepts the following operation:
"Set <parameter> <value> <station>"

Assemble-time substitution may be used for the station name, the parameter, and the set-value.

Verification of the "set" operation consists validating the existence of the named station. Also, if the parameter being set is the station's "status", only recognizable statuses will be accepted. They include: INPUT-READY, OUTPUT-READY, PROCESS, BUSY, PENDING, IDLE.

RUN-TIME

Entails setting the named parameter of the named WIP station to the value given.

SHELL

OVERVIEW

The "shell" script operation is used to execute application specific shell scripts. "Shell" is distinguished from "exec" in that it provides a Bourne shell interpreter for the execution, and that it always waits until completion of the shell script before proceeding to the next step.

Shell scripts should be placed in the proper
directory. A "stub" script exists to illustrate
access to the contextual arguments which are
passed by the interpreter.

ASSEMBLE-TIME
   This function accepts the following operation:
   "Shell <shellscript>"

Assemble-time substitution may be used for the
   name of the command file.

Verification of the "shell" operation consists of
   validating access to the named command file.

RUN-TIME
   Entails using the system service "system" to
   interpret a shell script. The current context of
   execution, including job, lot, product, operation,
   and unit are passed as positional parameters to
   the shell script.

SHOW-SET

OVERVIEW
      The "show-set" script operation is used to
   show values from the database to an operator at a
   console. "Show-set" will take from the specified
   parameter set and table values for the listed
   parameters. Parameters listed, therefore, must be
   part of the named parameter set; and value records
   must already have been posted to the database.

ASSEMBLE-TIME
      The following syntax is accepted:

```
"Show-set <console> <parameter set>
    U|L|J|T|S { \
    <parm> <mach> }"
```

Assemble-time substitutions typically are for the parmset name, parameter or machine names. The appropriate structure is built in the parameter segment, thus freezing in the parameter set makeup.

Verification of the "show-set" operation consists of verifying that the parameter set and listed parameters exist. This occurs as a by-product of building in the parameter segment structures.

RUN-TIME

Entails showing of the named parameters from the named set, with key augmentation specified. The named console is used for the annunciation.

SLEEP

OVERVIEW

The "sleep" script operation suspends execution of the script by the number of seconds specified as argument.

ASSEMBLE-TIME

This function accepts the following operation:
"Sleep <seconds>"

Assemble-time substitution may be used for the seconds string.

No verification of the "sleep" operation is performed.

RUN-TIME

A call to the system service of the same name is used.

START-OP

OVERVIEW

The "start-op" script operation is used to send a command to machine controllers which accept textual command strings. Thus, "start-op" may do something other than start a process.

The default operation of "start-op" is to wait for command completion. However, "start-op" may be executed in the background, meaning that command completion is not required for continued execution of the script; it is possible to do subsequent "wait" if it is desired to synchronize on the completion of the command after other script operations have been executed.

ASSEMBLE-TIME

This function accepts the following operation:
"Start-op <operation> <machine> [&]"

Assemble-time substitution may be used for the string command or the machine name.

Verification of the "start-op" operation consists validating that the machine is of an appropriate type for such commands.

RUN-TIME

Entails giving the specified string command to the named machine. If this is done in the background, script execution will continue after the command has been given; if it is done in the fore ground, script execution will be suspended until the completion of the operation implied by the command has occurred. As with most other background steps, it is possible to rendezvous by using the "wait" subsequently.

STORE-SET

OVERVIEW

The "store-set" script operation is used to store values into the database. These values are listed for each parameter within the named parameter set; parameters not explicitly listed will be given the default values assigned to the parameter when it was configured. In any event, all parameters in the set will have values, some or all of which may be defaults.

Specified as argument to "store-set" is the database table to use. This means that additional information is used within the key of records added to allow particular associations in uses of the records later.

ASSEMBLE-TIME

This function accepts the following operation:
"Store-set <parameter set>
U|L|J|T|S { \
   <parm> <mach> <value> }"

Where:
  parameter set — Set of parameters for which
                to store values;
  U|L|J|T|S    — Desired augmentor;

and zero or more triples of:
  parm  — parameter in the set to store;
  mach  — machine of the parameter;
  value — value to store.

Only listed parameters will have values stored.

Assemble-time situations typically are for the parmset name, parameter or machine names, or values. The appropriate structure is built in the parameter segment, thus freezing in the parameter set makeup.

Verification of the "store-set" operation consists of verifying that the parameter set and listed parameters exist. This occurs as a by-product of building the parameter segment structures.

RUN-TIME
Entails storing values for all parameters in the named set. If a parameter in the set is not listed with a value, it will assume the default value specified for the parameter from its listing in the general parameter table.

STOP-OP

OVERVIEW
The "stop-op" script operation is used to send a command to machine controllers that accept textual command strings. "stop-op" will stop the specified operation in process.

The default operation of "stop-op" is to wait for command completion and background operation is not accepted.

ASSEMBLE-TIME
This function accepts the following operation:
"Stop-op <operation> <machine>"

Assemble-time substitution may be used for the string command or the machine name.

Verification of the "stop-op" operation consists of validating that the machine is of an appropriate type for such commands.

RUN-TIME

Entails stopping the specified operation at the named machine. Script execution can only be done in the foreground for this operation and will be suspended until the completion of the operation implied by the command has occurred.

UNLOAD

OVERVIEW

The "unload" script operation is used to record the fact that materials are leaving the workcell, and feed-forward data for possible use in downstream processing.

ASSEMBLE-TIME

This function accepts the following operation:
"Unload <status> <station> <file@router>"

Assemble-time substitution may be used for the station name, status, file, and router.

Verification of the "unload" operation consists of validating that the named station exists and that the status value given is recognizable.

RUN-TIME

> Entails waiting for the specified station to assume an "output waiting" status, extracting data to be fed-forward for use in conditioning the downstream process and writing this to the specified router, and leaving the station with the specified status.

UNTIL

OVERVIEW

> The "until" script operation is used to close a block of script operations that had been opened by a "repeat". It takes as argument an absolute or tokenized integer count, which it uses to define the number of times the block is repeated.

ASSEMBLE-TIME

> This function accepts the following operation:
> "Until <iterations>"

> Assemble-time substitution may be performed on the count.

> Verification of the "until" operation consists of validating that blocks are properly nested and that the block that this closes was opened with a "repeat".

RUN-TIME

> This step closes a block of steps that was opened by a prior "repeat", and is used to cause the block to be executed a number of times as specified.

UPLOAD

OVERVIEW

The "upload" script operation is used to upload bulk information, such as programs and data files, from controllers which are capable of sending data organized as files.

ASSEMBLE-TIME

This function accepts the following operation:
"Upload <file> <machine> [&]"

Assemble-time substitutions typically are for the file and machine names.

Verification of the "upload" operation consists of verifying access to the named file and ensuring that the machine is of a type compatible with file uploads.

RUN-TIME

Entails uploading the specified file from the specified machine. If this is done in the background, script execution will proceed without waiting for the upload to complete.

WAIT

OVERVIEW

The "wait" script operation is used to wait on a script operation that had previously been executed in the background. This is useful to rendezvous with something which had been initiated earlier.

ASSEMBLE-TIME

>This function accepts the following operation:
>"Wait <label>"

No assemble-time symbol substitution is performed.

Verification of the "wait" operation consists of checking if that step to be waited on is of a "waitable" type, is prior to the current step in the course of execution, and that it is to be done in the background.

RUN-TIME

This is a mechanism to rendezvous with a step which had previously been executed in the background. Script execution will be suspended until the operation implied by the step being waited on is complete.

WHEN

OVERVIEW

>The "when" script operation is used to set a trap for an externally generated event, and to specify an action to be taken when (if) the event occurs. The action is another script operation, such as an "interpret", which would cause non-sequenced execution of another process script; a "goto", which would alter the control flow based on the occurrence of an external event; or any other script operation, having the obvious meaning.

ASSEMBLE-TIME

>This function accepts the following operation:
>"When <event> <machine> <scrop>
>{<argument>}"

Where:

- event — Event for which a trap will be set;
- machine — Machine from which the event will be signalled;
- scrop — Script operation to execute on occurrence of the event;
- argument — argument(s) for the scrop.

Assemble-time substitution may be used for the event and/or machine names. Assembly consists of making a link to the event in the appropriate event tracker's table, and assembling the operation to be performed on event occurrence.

Verification of the "when" operation consists of finding the event in a tracker's table, and verifying the operation to be performed.

RUN-TIME

This operation effectively sets a "trap" for the named event. On executing a "when" step, an entry is made for the event in the "when-event" list, and it is enabled for the appropriate event tracker. At the end of each step's interpretation, a check is made to see if any when-events have occurred; if they have, the designated action is taken. When-events are passed down to child scripts. Generally, the action is taken "transparent" of the normal script execution much like typical interrupt service routines. Special cases, however, are if a "quit" or a "goto" is specified as the action; the former case causes the quit to bubble up just like any quit, whereas the latter will cause a "long jump" to the script in which the when is found in order to execute the goto. This latter case generally has the effect of breaking out of child scripts to a known place in the parent script.

APPENDIX I

Continuous Example Script I

; Store/Issue product id and lengths from the database.

Store-parm prod-id mach-X LOT !LOT
    Issue-parm prod-id mach-X LOT
    Issue-set lot-data LOT ; First, wait until a new product is noticed at the
; station-1.  When it is, reset the unit identification.

Notice new-prod mach-X
    Reset unit station-1

; Set up a trap for the finish product indicator, if it
; occurs prior; to completing the script.

When finish-prod mach-X Goto FINISH

; First set of repetitions of activity:

define COLOR 2
    #define SIZE 1
    #define TEXTURE 3
    #define TIME 0.5
    #define ITERS 3

Interpret activity-A

; Second set of repetitions of activity:
    #define COLOR 1
    #define SIZE 2
    #define TEXTURE 1
    #define TIME 0.25
    #define ITERS 6

Interpret activity-A

; We are now done.  Cause the interpreter to ignore
; indicators; no longer required by it, and cause mach-X
to ; stop.

Ignore finish-prod mach-X
    Issue-parm stop mach-X SETUP; command controller
                                              : to quit.

FINISH    Quit

; Quit execution.
; SUBROUTINE activity-A;

; This "subroutine" is used for repetitions of
; activity-A.  ; It uses; parameters set in the
; containing script.

```
; First, Store/Issue the required parameters for the
; iterated activities.

Store-set A-data UNIT color mach-X $COLOR
                             size mach-X $SIZE
                             texture mach-X $TEXTURE
                             time mach-X $TIME
        Issue-set A-data UNIT ; Now do the required iterations of the activity; i.e.,
;       For each new unit, index the unit identification
;       and perform the activity.

Repeat
          Notice new-unit mach-X
          Index unit station-1 1
          Issue-parm A-cmd mach-X SETUP
        Until $ITERS ; Return to the containing script.
```

APPENDIX J

Continuous Example Script II

```
; Store/Issue the product id and lengths.

Store-parm prod-id mach-Y LOT !LOT
        Issue-parm prod-id mach-Y LOT
        Issue-set lot-data LOT ; First, wait until a new product is noticed at the
; station-2.
; When it is, reset the unit identification.

Notice new-prod mach-Y
        Reset unit station-2

; Set up a trap for the finish product indicator, if it
; occurs prior to exhausting the routing.

When finish-prod mach-Y Goto FINISH

; First activity:

#define NUMBER     1
        #define HOLES      21
        #define SAMPLES    1
        #define ALGORITHM  alg1
        #define ITERS      3

Interpret activity-B

; Second activity:

#define NUMBER     2
        #define HOLES      15
```

```
        #define SAMPLES    3
        #define ALGORITHM  alg2
        #define ITERS      5

Interpret activity-B

; We are now done.  Cause the interpreter to ignore
; indicators no longer required by it, and cause mach-Y to
; stop.

Ignore finish-prod mach-Y
        Issue-parm stop mach-Y SETUP; command controller
                                   ; to quit.

FINISH  Quit

; Quit execution.

; SUBROUTINE activity-B

; This "subroutine" is used for repetitions of
; activity-B.  It uses parameters set in the containing
; script.

; First, Store/Issue parameters for the iterated activity.

Store-set B-data UNIT number mach-Y $NUMBER /
                              holes mach-Y $HOLES /
                              samples mach-Y $SAMPLES
        Issue-set B-data UNIT ; Now do the required iterations of the activity; i.e.,
;     For each new unit, index the product tracking
;     counter,
;     issue "B-cmd" command, collect Bitometry parameters,
;     and plot the data.

Repeat

Notice new-unit mach-Y
           Index unit station-2 1
           Issue-parm B-cmd mach-Y SETUP
           Notice B-cmd-done mach-Y
           Report-set B-parms UNIT
           Plot-set B-parms UNIT $ALGORITHM &

Until $ITERS

; Return to the containing script.

#eject
```

Appendix K

Discrete Example Script

```
;
; Download post-processed CAD data to robot and NC
;       machine
    Download $DEFVAR robot
    Download $DEFTPT robot
    Download $PARTPROG NC-machine
;
; Wait for a delivery and distribute product to workbases
    Check-for INPUT-READY Input-PD
    Start-op DESTACK robot
;
; Load machine and start cutting (in background)
    Start-op LOAD-MACH robot
NC  Start-op CUT NC-machine &
;
; Set traps for various robot events
    When perf-msg robot    Report-parm message robot TIME
    When pqd-msg robot     Report-set quality UNIT
    When move-msg robot    Interpret MOVE-SUB
    When err-msg robot     Goto ABORT
;
; Start the assembly process, waiting on its completion
;  (use of the RETRY label is shown in error handling
;       section)
RETRY Start-op ASSEMBLE robot
;
; Wait on completion of the cutting and unload the
;       machine
    Wait NC
    Start-op UNLOAD-MACH robot
;
; Restack the materials and quit
    Start-op STACK robot
    Quit
;
;
; Simple error handling example section
;
; Only a small example:
ABORT Report-parm message robot LOT   ; saves error to
                                      ; database
    Extract-parm message robot LOT
                    MESSAGE   ; enters it to
                              ; run-time table
    Prompt Assy-Console Lot !LOT ABORTED due to
                    !MESSAGE ; inform operator
    Ask Assy-Console Retry Lot !LOT ? Y /
       Quit  ; i.e., quit if he sais something different
                    ;                      than yes.
       Goto RETRY
```

Appendix L

System Resource Configuration, Continuous Example

```
!
! Workcell Computer Configuration File - contains computer
!     system resources used by the software modules of the
!     current invention.  Resources that are required for
!     proper operation are listed in this file in order
!     for them to be created and initialized.  This
!     includes such resources as message queues,
!     semaphores, shared memory and semaphore pools, as
!     well as, tasks to be spawned (run).
!
* message_queues
!  The following message queues will be created and
!  initialized!
!
! mstr ctl
1       2
!
! lot ctl(s)  (station-1 and station-2 respectively)
3       4
33      34
!
!   machine control message queues
5       6
!
! data prep
15      16
!
!   restart message queues
21      22
!
! plotter process queues
27      28
!
! server message queues
40      41
! server for event tracker to use
42      43
!
! event tracker queues
52      53
!
! "operator" console queues
71      72
!
* semaphores
!  The following semaphores will be created and
initialized!
! port access
400
! wip update
61
!
```

```
* shared_memory
! "station-1" transcript
95  95  32727
!
! "station-2" transcript
96  96  32727
!
! "operator" console message buffer
97  97  32727
!
! script segment
98  98  32727
!
! parameter segment
99  99  32727
!
* semaphore_pools
! general request with timeout pool
200   301   320
! script operation background processing pool
60    321   330
!
!
* tasks
!  The following tasks will be spawned and passed the
!  arguments
!  specified, if any!
!
mstr_ctl -vv -PSE
lot_ctl -vv station-1
lot_ctl -vv station-2
evtrck -t100
Server-x 40 41
Server-y 42 43
data_prep
plotter
mach_ctl -vv -e
.PA
```

APPENDIX M

<u>Configurable Parameter Listing</u>

Parameters for Machine: mach-Y

| Parameter Name | Type | Index |
|---|---|---|
| start | I | 5 |
| B-cmd | I | 6 |
| stop | I | 7 |
| hole-offset | I | 45 |
| holes | I | 46 |
| samples | I | 47 |
| number | I | 48 |
| sample-offset | I | 49 |

| Parameter Name | Type | Index |
|---|---|---|
| prod-length | I | 53 |
| start | I | 54 |
| end | I | 55 |
| in-between | I | 56 |
| new-prod | I | 90 |
| finish-prod | I | 91 |
| new-unit | I | 92 |
| B-cmd-done | I | 93 |
| alarm | I | 94 |
| dparm-W | R | 1 |
| dparm-Z | R | 22 |
| dparm-Y | R | 43 |
| dparm-X | R | 64 |

Parameters for Machine: mach-X

| Parameter Name | Type | Index |
|---|---|---|
| start | I | 0 |
| A-cmd | I | 1 |
| stop | I | 2 |
| color | I | 10 |
| size | I | 11 |
| texture | I | 12 |
| prod-length | I | 16 |
| start | I | 17 |
| end | I | 18 |
| in-between | I | 19 |
| alarm-id | I | 23 |
| new-prod | I | 80 |
| finish-prod | I | 81 |
| new-unit | I | 82 |
| A-cmd-done | I | 83 |
| alarm | I | 84 |
| time | R | 100 |
| release | S | 0 |
| product | S | 1 |
| operation | S | 2 |
| job-id | S | 6 |
| prod-id | S | 7 |
| unit-id | S | 8 |

PARAMETER SET TABLES

Parameters for Set : B-data

| Parameter Name | Machine Name |
|---|---|
| number | mach-Y |
| sample-offset | mach-Y |

```
      samples            mach-Y
      hole-offset        mach-Y
      holes              mach-Y
```

Parameters for Set :  B-lengths

```
      Parameter          Machine
        Name              Name
      ───────────────────────────── prod-length        mach-Y
      end                mach-Y
      in-between         mach-Y
      start              mach-Y
```

Parameters for Set :  B-parms

```
      Parameter          Machine
        Name              Name
      ───────────────────────────── dparm-X            mach-Y
      dparm-Y            mach-Y
      dparm-Z            mach-Y
      dparm-W            mach-Y
```

Parameters for Set :  events

```
      Parameter          Machine
        Name              Name
      ───────────────────────────── alarm              mach-Y
      alarm              mach-X
      A-cmd-done         mach-X
      finish-prod        mach-Y
      finish-prod        mach-X
      B-cmd-done         mach-Y
      new-prod           mach-Y
      new-prod           mach-X
      new-unit           mach-Y
      new-unit           mach-X
```

Parameters for Set :  info

```
      Parameter          Machine
        Name              Name
      ───────────────────────────── operation          mach-X
      product            mach-X
      release            mach-X
```

Parameters for Set : A-data

| Parameter Name | Machine Name |
|---|---|
| texture | mach-X |
| color | mach-X |
| time | mach-X |
| size | mach-X |

Parameters for Set : lot-data

| Parameter Name | Machine Name |
|---|---|
| routing | system |
| prod-length | mach-X |
| end | mach-X |
| in-between | mach-X |
| start | mach-X |

Appendix N

Workcell Resource Configuration, Contiuous Example

MACHINES / SERVERS LISTING

| Machine Name | Server Name | Port Name | Control ID |
|---|---|---|---|
| system | | | 0 |
| mach-x | server-x | a1 | 0 |
| mach-y | server-y | a2 | 0 |

STATION LISTING

| Station Name | Station Status | Job Name | Lot ID | Request Queue | Reply Queue |
|---|---|---|---|---|---|
| station-1 | IDLE | | | 33 | 34 |
| station-2 | IDLE | | | 3 | 4 |

CONSOLE LISTING

| Console | Console | Console | Message |
|---|---|---|---|

| Name | 597 Request | Reply | 598 Segment | Station(s) |
|---|---|---|---|---|
| operator | 71 | 72 | 97 | station-1<br>station-2 |

Appendix O

<u>Sample Cell Capability Database, Discrete Example</u>

```
Tools for Operation:  ZREG
     U-SENSOR    REG_PT

Tools for Operation:  VREG
     V-CAMERA    REG_PT
     SCAN-PE     REG_PT

Tools for Operation:  ADH_PT
     COND-ADH    SNG_PT

Tools for Operation:  Pick
     VAC-CUP     SNG_PT
     FINGERS     SNG_PT
     SHEET_GPR   SNG_PT Tools for Operation:  Place
     VAC_CUP     SNG_PT
     FINGERS     SNG_PT
     SHEET_GPR   SNG_PT Tools for Operation:  ADH_LINE
     COND_ADH    DBL_PT Tools for Operation:  U_SEAL
     Round-Tip   SNG_PT
```

Appendix P

Sample Process Definition, Discrete Example

```
!
!  Process Definition File for "ASSEMBLY-X"
!
!
!  General process information:
ASSEMBLY_ID              ASSEMBLY-X
    LOT_SIZE             4
!
!  Presentation of parts to/from the workcell:
STACK_SEQUENCE
    *INSTACK
        COMPONENT_PLT    3
!
    *OUTSTACK
        ASSEMBLY_PLT     2
!
!  Workstations employed:
N_WKSTATN_TYPES          1
    ASSEMBLY_NEST        1
!
!  These tokens indicate to what files data_prep will
!  write the post-processed information:
 #define     DEFVAR       defvar
 #define     DEFTPT       deftpt
 #define     PARTPROG     ex-prog
!
!  Finally, an indication of what process script is to be
!  used:
 Interpret   DISC-EX
!
!
```

Appendix Q

Sample CAD Data File, Discrete Example

```
ASSEMBLY_NEST

!  FILE HEADER — CAD data file containing registration,
!                array and location information on the
!                workstation "nest" used for the
!                "ASSEMBLY-NEST"
!
N_BLOCKS         1

!     Array Data        (offsets given in millimeters)
!
!
!
$ ARRAY_RCD      1        1        1

$ ARRAY_OFS      0        0        0
!
```

```
!       Registration Target Data
!
*ZREG    U_SENSOR
@               10.0    20.0    20.0    0.0

*VREG    V_CAMERA        1       (mode of operation)
@               20.0    20.0    10.0    0.0
@              150.0    20.0    10.0    0.0

!
!       Operation and Point Data
!

N_PART_TYPES    4

PART_ID         COMPONENT_A

*  PLACE    VAC_CUP       50      (time in milliseconds)
@               50.0    40.0     5.0    0.0

*ADH_PT    COND_ADH     1000     100
@               30.0    25.0    10.0    0.0
@               35.0    25.0    10.0    0.0

PART_ID         COMPONENT_B

*  PLACE    VAC_CUP       50
@               40.0    50.0    20.0   10.0

*U_SEAL    ROUND_TIP    1000     100
@               30.0    30.0     5.0    0.0
@               30.0    35.0     5.0    0.0
PART_ID         COMPONENT_C

*  PLACE    VAC_CUP       50
@               50.0    50.0    10.0   20.0

PART_ID         ASSEMBLY

*PICK      FINGERS        50
@               25.0    35.0    15.0    0.0
```

Appendix R

<u>Sample Token File, Discrete Example</u>

```
General Parameters Assigned from CELLCAP data!
     Total workstations req'd:          1

Lot Size - number of ass'ys:       4

1 workstation(s) are req'd for this ass'y.

Assignments for /usr/celldata/cad/Assembly_Nest
     Processing Array Data!
             Row count var:           A(49)
             Col count var:           A(50)
```

```
          Depth count var:        A(51)
          Offsets Used  -  0.000 0.000 0.000
Processing Reg Data!
   ZREG  PALLET  with U_SENSOR
         T40
   VREG  PALLETT with V_CAMERA
         T41
         T42
Processing Part Data!
   PLACE COMPONENT_A with VAC_CUP
         T212
   ADH_PT COMPONENT_A with COND_ADH
         T213
         T214
         No. of pts = 2
   PLACE COMPONENT _B with VAC_CUP
         T215

No. of pts = 1
U_SEAL COMPONENT_B with ROUND_TIP
         T216
         T217
         No. of pts = 2
   PLACE COMPONENT_C with VAC_CUP
         T218
         No. of pts = 1
   PICK ASSEMBLY_X with FINGERS
         T219
         No. of pts = 1
```

We claim:

1. A production control method for interfacing an automated material handling system to at least one manufacture workcell having processing equipment therein for performing processing jobs on provided material comprising the steps of:

forming an addressable library of program modules with each module defining a sequence of operations that are to be performed by at least one piece of processing equipment within a manufacturing workcell;

generating process scripts for addressing selected program modules;

selecting program modules for performing the desired processing operations on the provided material in accordance with formed job descriptions and said process scripts;

programming each piece of processing equipment to be responsive to the sequence of processing operations defined by the selected program modules;

executing said process scripts for causing the flow and processing of material to and through each workstation to be in accordance with the formed job descriptions and executing process scripts;

event tracking the processing operations of the processing equipment within a workcell for providing an indication of the performance of an operation, in the defined sequence of processing operations, being performed on the material; and tracking the work in process within a workcell to provide data representative of a quality rating for the operations being performed on the material.

2. The production control method according to claim 1 and further comprising the step of:

selecting at least one processing step to be applied to a previously processed material in accordance with the quality rating of the operations previously performed on the material.

3. The production control method according to claim 1 and further comprising the step of:

interval tracking select processing operations for collecting and storing specified process parameters on designated intervals.

4. The production control method according to claim 1 and further comprising the step of:

post-processing the provided data for adjusting one or more pieces of processing equipment.

5. The production control method according to claim 1 and further comprising the step of:

post-processing the provided data for directing one or more pieces of processing equipment.

6. The production control method according to claim 1 wherein the formed addressable library of program modules includes test modules for causing testing of the processed material to provide test data.

7. The production control method according to claim 1 and further comprising the step of:

forming a plurality of addressably stored libraries addressable by the formed script to provide miscellaneous processing functions.

8. The production control method according to claim 1 and further comprising the step of:

storing data generated from the processing of the provided material in a database for future use.

9. The production control method according to claim 1 and further comprising the step of:
monitoring the signalling from the event-tracking step for the occurrence of a signal corresponding to the occurrence of a particular event to initiate a non-sequenced operation.

10. The production control method according to claim 1 and further comprising the step of:
monitoring the signalling from the event-tracking step for the occurrence of a signal corresponding to the occurrence of a particular event to terminate a predetermined operation.

11. A production control method for interfacing an automated material handling system to at least one manufacture workcell having processing equipment therein for performing processing jobs on provided material comprising the steps of:
forming an addressable library of program modules with each module defining a sequence of operations that are to be performed by at least one piece of processing equipment within a manufacturing workcell;
generating process scripts for addressing selected program modules;
selecting program modules for performing the desired processing operations on the provided material in accordance with formed job descriptions and said process scripts wherein at least on of said scripts includes a step of calling at least one other script;
programming each piece of processing equipment to be responsive to the sequence of processing operations defined by the selected program modules;
executing said process scripts for causing the flow and processing of material to and through each workstation to be in accordance with the formed job descriptions and executing process scripts; and
event tracking the processing operations of the processing equipment within a workcell for providing an indication of the performance of an operation in the defined sequence of processing operations being performed on the material.

12. The production control method according to claim 11 and further comprising the step of displaying in real time data representative of the operations being performed on the material.

13. The production control method according to claim 11 and further comprising the step of:
forming a file of processing events associated with the execution of each process script.

14. The production control method according to claim 11 and further comprising the steps of:
enunciating the activities within a manufacturing workcell; and
forming a file of selected sequence of operations within a manufacturing workcell.

15. A production control method for interfacing an automated material handling system to at least one manufacture workcell having processing equipment therein for performing processing jobs on provided material comprising the steps of:
forming an addressable library of program modules with each module defining a sequence of operations that are to be performed by at least one piece of processing equipment within a manufacturing workcell;
selecting program modules for performing the desired processing operations on the provided material in accordance with formed job descriptions and process scripts;
programming each piece of processing equipment to be responsive to the sequence of operations defined by the selected program modules;
executing said process scripts and controlling the flow of material to and through each workstation in accordance with the formed job descriptions and executed process scripts;
event tracking the processing operations of the processing equipment within a workcell for signalling the performance of an operation in the defined sequence of processing operations being performed on the material; and
forming a capability table for each manufacturing workcell for verification of the capability of performing a scripted task.

16. The production control method according to claim 15 and further comprising the step of:
integrating user supplied plotter algorithm(s) with the selected program modules for processing data.

17. A production control method for interfacing an automated material handling system to at least one manufacture workcell having processing equipment therein for performing processing jobs on provided material comprising the steps of:
forming an addressable library of program modules with each module defining a sequence of operations that are to be performed by at least one piece of processing equipment within a manufacturing workcell;
generating process scripts for addressing selected program modules;
embedding operator selectable operations in said generated process scripts to provide the ability to tailor operations by operator interaction;
selecting program modules for performing the desired processing operations on the provided material in accordance with formed job descriptions and said process scripts;
programming each piece of processing equipment to be responsive to the sequence of processing operations defined by the selected program modules;
executing said process scripts for causing the flow and processing of material to and through each workstation to be in accordance with the formed job descriptions and executing process scripts; and
event tracking the processing operations of the processing equipment within a workcell for providing an indication of the performance of an operation in the defined sequence of processing operations being performed on the material.

18. The production control method according to claim 17 and further comprising the step of:
providing each of the selected program modules with the capability accessing other modules.

19. A production control method for interfacing an automated material handling system to at least one manufacture workcell having processing equipment therein for performing processing jobs on provided material comprising the steps of:
forming an addressable library of program modules with each module defining a sequence of operations that are to be performed by at least one piece of processing equipment within a manufacturing workcell;

generating process scripts for addressing selected program modules;

selecting program modules for performing the desired processing operations on the provided material in accordance with formed job descriptions and said process scripts;

programming each piece of processing equipment to be responsive to the sequence of processing operations defined by the selected program modules;

using parameters in a process script where the parameters are defined during processing run time;

executing said process scripts for causing the flow and processing of material to and through each workstation to be in accordance with the formed job descriptions and executing process scripts; and event tracking the processing operations of the processing equipment within a workcell for providing an indication of the performance of an operation in the defined sequence of processing operations being performed on the material.

20. The production control method according to claim 19 and further comprising the step of:

forming a table of attributes that are addressable by logical names appearing in a process script.

21. A computer based production control method for interfacing signal responsive machinery to manufacturing systems to automatically perform process operations on provided materials comprising the steps of:

forming an addressable library of software based process scripts each defining a process that is to be performed on provided materials;

forming an addressable library of program files each having lines of computer code for generating signals to be applied to the signal responsive machinery for causing a specific machine operation in response to a portion of a compiled script;

compiling a script for addressing select process scripts and program files;

verifying the compiling of said script;

deleting said compiled script when no longer needed; and causing said signal responsive machinery to automatically perform process operations on provided materials in response to the compiled script.

22. The production control method according to claim 21 and further comprising the step of:

event tracking the process operations of said signal responsive machinery and providing signals indicative of the occurrence of particular events.

23. The production control method according to claim 22 and further comprising the step of:

monitoring the event-tracking step for the occurrence of a signal corresponding to the occurrence of a particular event to initiate a non-sequenced operation.

24. The production control method according to claim 21 and further comprising the step of:

monitoring the signalling from the event tracking step to for the occurrence of a signal corresponding to the occurrence of a particular event terminate a predetermined operation.

25. The production control method according to claim 21 wherein at least one script includes a step of calling at least one other script.

26. The production control method according to claim 21 and further comprising the step of:

tracking the work in process to provide data representative of the process operations being performed on the provided material.

27. The production control method according to claim 26 and further comprising the step of:

storing data generated from the processing of the provided materials in a database for future use.

28. The production control method according to claim 21 and further comprising the steps of:

determining at each processing step the quality of the processed materials; and comparing the determined quality associated with a processed material against desired qualities and selecting future operations performed on the processed material as a function of the comparison.

29. The production control method according to claim 21 and further comprising the step of:

interval tracking select processing operations for collecting and storing specified process parameters on designated intervals.

30. The production control method according to claim 21 and further comprising the step of:

post-processing the provided data for adjusting one or more pieces of said signal responsive machinery.

31. The production control method according to claim 21 and further comprising the step of:

post-processing the provided data for directing one or more pieces of said signal responsive machinery.

32. The production control method according to claim 21 wherein the formed library of program files includes test modules for performing testing of the processed material to provide test data.

33. The production control method according to claim 21 and further comprising the step of:

forming a plurality of addressably stored libraries addressable by the complied script to provide miscellaneous processing functions.

34. The production control method according to claim 21 and further comprising the steps of:

enunciating the sequence of operations of said signal responsive machinery; and forming a file of selected enunciated activities.

35. The production control method according to claim 21 wherein at least one process script includes a step of calling at least one other process script.

36. The production control method according to claim 21 and further comprising the step of displaying in real time data representative of the operations being performed on the material.

37. The production control method according to claim 21 and further comprising the step of:

forming a file of processing events associated with the execution of each process script.

38. The production control method according to claim 21 and further comprising the step of:

forming a capability table for each signal responsive machine used for verification of the capability of performing a scripted task.

39. The production control method according to claim 21 and further comprising the step of:

embedding operator selectable operations in process scripts to provide the ability to tailor operations by selection.

40. The production control method according to claim 21 and further comprising the step of:

providing each of the selected program files with the capability of accessing other modules.

41. The production control method according to claim 21 and further comprising the step of:
   using parameters in a process script where the parameters are defined during processing run time.

42. The production control method according to claim 21 and further comprising the step of:
   forming a table of attributes that are addressable by logical names appearing in a process script.

43. A computer based production control method according to claim 21 and further comprising the step of:
   translating machine information to manufacturing computer system language to provide data on the process operations.

44. A computer based production control method for interfacing signal responsive machinery to manufacturing systems to automatically perform process operations on materials provided by an automated material handling system comprising the steps of:
   forming a library of software based process scripts each defining a process that is to be performed on provided materials;
   forming a library of program files each having lines of computer code for generating signals to be applied to the signal responsive machinery for causing a specific machine operation in response to a portion of a compiled script;
   compiling a script incorporating select process scripts and program files;
   causing said responsive machinery to automatically perform process operations on provided materials in response to the complied script;
   providing handshaking communications with the automated material handling system to synchronize process operations; and
   generating a report representing the status of process operations based on said provided data.

45. A computer based production control method according to claim 44 and further comprising the step of:
   translating machine information to manufacturing computer system language to provide data on the process operations.

46. A computer based production control method according to claim 44 and further comprising the steps of:
   enunciating the sequence of operations of said signal responsive machinery; and
   forming a file of selected enunciated activities.

47. A computer based production control method according to claim 44 and further comprising the steps of:
   determining quality data as to the quality of the process performed on a material at each stage of process; and
   selecting a succeeding process in accordance with the provided quality data.

48. The production control method according to claim 44 and further comprising the step of:
   interval tracking select processing operations for collecting and storing specified process parameters on designated intervals.

49. The production control method according to claim 44 and further comprising the step of:
   tracking the work in process to provide data representative of the process operations being performed on the provided material.

50. The production control method according to claim 49 and further comprising the step of:
   post-processing the provided data for adjusting one or more pieces of signal responsive machinery.

51. The production control method according to claim 49 and further comprising the step of displaying in real time, data representative of the operations being performed on the material.

52. The production control method according to claim 44 and further comprising the step of:
   post-processing the provided data for directing one or more pieces of signal responsive machinery.

53. The production control method according to claim 44 wherein the formed library of program files includes test modules for performing testing of the processed material to provide test data.

54. The production control method according to claim 44 and further comprising the step of:
   forming a plurality of addressably stored libraries addressable by the compiled script to provide miscellaneous processing functions.

55. The production control method according to claim 44 and further comprising the step of:
   storing data generated from the processing of the provided materials in a database for future use.

56. The production control method according to claim 44 and further comprising the step of:
   event tracking the process operations of said signal responsive machinery and providing signals indicative of the occurrence of particular events.

57. The production control method according to claim 56 and further comprising the step of:
   monitoring the signalling from the event tracking step for the occurrence of a signal corresponding to the occurrence of a particular event to terminate a predetermined operation.

58. The production control method according to claim 56 and further comprising the step of:
   monitoring the signalling from the event tracking step for the occurrence of a signal corresponding to the occurrence of a particular event to initiate a non-sequenced operation.

59. The production control method according to claim 44 wherein at least one script includes a step of calling at least one other script.

60. The production control method according to claim 44 and further comprising the step of:
   forming a file of processing events associated with the execution of each process script.

61. The production control method according to claim 44 and further comprising the step of:
   forming a capability table for each signal responsive machine used for verification of the capability of performing a scripted task.

62. The production control method according to claim 44 and further comprising the step of:
   embedding operator selectable operations in process scripts to provide the ability to tailor operations by selection.

63. The production control method according to claim 44 and further comprising the step of:
   providing each of the selected program modules with the capability of accessing other modules.

64. The production control method according to claim 44 and further comprising the step of:
   using parameters in a process script where the parameters are defined during run time.

65. The production control method according to claim 44 and further comprising the step of:
forming a table of attributes that are addressable by logical names appearing in a process script.

66. A production control system for interfacing an automated material handling system to at least one manufacture workcell having processing equipment therein for performing processing jobs on provided material comprising:
an addressable library means having a plurality of program modules with each module defining a sequence of operations that are to be performed by at least one piece of processing equipment within a manufacturing workcell;
means for generating process scripts;
selecting means for selecting program modules for performing the desired processing operations on the provided material in accordance with formed job descriptions and said generated process scripts;
means for programming each piece of processing equipment to be responsive to the sequence of processing operations defined by the selected program modules;
means for causing the flow and processing of material to and through each workstation to be in accordance with the formed job descriptions and process scripts;
means for event tracking the processing operations of the processing equipment within a workcell for providing an indication of the performance of an operation in the defined sequence of processing operations being performed on the material; and
means for tracking the work in process within a workcell to provide data representative of the operations being performed on the material.

67. The production control system according to claim 66 and further comprising:
means responsive to said provided data for acting upon previously processed material.

68. The production control system according to claim 66 and further comprising:
means for interval tracking selected processing operations for collecting and storing specified process parameters at designated intervals.

69. The production control system according to claim 66 and further comprising:
means for post-processing the provided data for adjusting one or more pieces of processing equipment.

70. The production control system according to claim 66 and further comprising:
means for post-processing the provided data, for directing one or more pieces of processing equipment.

71. The production control system according to claim 66 wherein said addressable library means includes test modules for performing testing of the processed material to provide test data.

72. The production control system according to claim 66 and further comprising:
means for monitoring the signalling from said means for event-tracking for the occurrence of a signal corresponding to the occurrence of a particular event to initiate a non-sequenced operation.

73. The production control system according to claim 66 and further comprising:
processing file means for forming a file of processing events associated with the execution of each process script.

74. The production control system according to claim 66 and further comprising:
means for enunciating the activities within a manufacturing workcell; and
an activity file means for forming a file of selected sequence of operations within a manufacturing workcell.

75. The production control system according to claim 66 and further comprising:
capability table means for forming a capability table for each manufacturing workcell used for verification of the capability of performing a scripted task.

76. The production control system according to claim 66 and further comprising:
means for embedding operator selectable operations in process scripts to provide the ability to tailor operations by selection.

77. A computer based production control system for interfacing signal responsive machinery to manufacturing systems to automatically perform process operations on provided materials comprising:
means for forming a library of software based process scripts each defining a process that be performed on provided materials;
means for forming a library of program files each having lines of computer code for generating signals to be applied to the signal responsive machinery for causing a specific machine operation in response to a portion of a compiled script; and
means for compiling a script incorporating select process scripts and program files;
means for verifying the compiling of said script;
means for causing said responsive machinery to automatically perform process operations on provided materials in response to the script from said means for compiling; and
means for deleting said compiled script when no longer needed.

78. The production control system according to claim 77 and further comprising:
means for forming an event table of select processing events or operations of the signal responsive machinery; and
means for tracking the process of said signal responsive machinery operations by comparing the present operation of the machinery with the events formed in said event table and for providing an indication of which event the machinery is undertaking.

79. The production control system according to claim 77 and further comprising:
means for determining the quality of the processed materials at each process operation; and
means for comparing the quality associated with a processed material to change future process operations performed on the processed material.

80. A computer based production control system for interfacing signal responsive machinery to manufacturing systems to automatically perform process operations on materials provided by an automated material handling system comprising:
means for forming a library of software based process scripts each defining a process that is to be performed on provided materials;

means for forming a library of program files each having lines of computer code for generating signals to be applied to the signal responsive machinery for causing a specific machine operation in response to a portion of a compiled script;

means for compiling a script incorporating select process scripts and program files;

means for causing said responsive machinery to automatically perform process operations on provided materials in response to the script from said means for compiling;

means for providing handshaking communications with the automated material handling system to synchronize process operations;

means for translating machine information to manufacturing computer system language to provide data on the process operations; and means for generating a report representing the status of process operations based on said provided data.

81. A computer based production control system according to claim 80 and further comprising:

means for providing quality data as to the quality of each of the process operations performed on a material; and means for selecting succeeding operations in accordance with the provided quality data.

* * * * *